US011622646B2

(12) United States Patent
Kihara et al.

(10) Patent No.: US 11,622,646 B2
(45) Date of Patent: Apr. 11, 2023

(54) BEVERAGE PRODUCING APPARATUS

(71) Applicant: Daito Giken, Inc., Tokyo (JP)

(72) Inventors: Kaishun Kihara, Tokyo (JP); Taisuke Torizu, Tokyo (JP)

(73) Assignee: Daito Giken, Inc., Tokyo (JP)

( * ) Notice: Subject to any disclaimer, the term of this patent is extended or adjusted under 35 U.S.C. 154(b) by 514 days.

(21) Appl. No.: 16/775,754

(22) Filed: Jan. 29, 2020

(65) Prior Publication Data

US 2020/0163485 A1 May 28, 2020

Related U.S. Application Data

(63) Continuation of application No. PCT/JP2018/028916, filed on Aug. 1, 2018.

(30) Foreign Application Priority Data

Aug. 7, 2017 (JP) ............................ JP2017-152703

(51) Int. Cl.
*A47J 31/41* (2006.01)
*A47J 19/02* (2006.01)
(Continued)

(52) U.S. Cl.
CPC ............... *A47J 31/41* (2013.01); *A47J 19/02* (2013.01); *A47J 31/42* (2013.01); *A47J 31/468* (2018.08)

(58) Field of Classification Search
CPC .......... A47J 31/41; A47J 31/468; A47J 19/02; A47J 31/42
See application file for complete search history.

(56) References Cited

U.S. PATENT DOCUMENTS 4,406,217 A 9/1983 Oota
5,392,694 A * 2/1995 Muller ................. F04B 53/101 99/295

(Continued)

FOREIGN PATENT DOCUMENTS

CN 1942126 A 4/2007
CN 101032376 A 9/2007

(Continued)

OTHER PUBLICATIONS

Japanese office Action issued in corresponding Japanese Application No. 2017-152703, dated Jul. 27, 2018.

(Continued)

*Primary Examiner* — Michael Collins
(74) *Attorney, Agent, or Firm* — Venable LLP

(57) ABSTRACT

A beverage producing apparatus configured to produce a beverage using an extraction target as a raw material, includes: a housing configured to form an exterior of the beverage producing apparatus; a control unit configured to control each producing operation of the beverage producing apparatus; and an operation unit configured to accept an operation of an operator. The housing includes a transmissive portion configured to make an interior of the housing visible from an outside. The control unit can control each producing operation in an automatic mode or a manual mode. In the automatic mode, each producing operation is automatically controlled in accordance with a condition set in advance. In the manual mode, each producing operation is controlled in accordance with an operation for the operation unit.

6 Claims, 268 Drawing Sheets

(51) Int. Cl.
*A47J 31/42* (2006.01)
*A47J 31/46* (2006.01)

(56) References Cited

U.S. PATENT DOCUMENTS

| | | | | |
|---|---|---|---|---|
| 6,752,069 | B1 | 6/2004 | Burke et al. | |
| 8,087,347 | B2 | 1/2012 | Halliday et al. | |
| 9,668,496 | B1 | 6/2017 | Lassota | |
| 9,670,047 | B2 * | 6/2017 | Carpenter | B67D 1/0041 |
| 9,962,030 | B2 * | 5/2018 | Avins | A23F 5/262 |
| 10,687,654 | B2 * | 6/2020 | Buchholz | A47J 31/42 |
| 10,695,773 | B2 * | 6/2020 | Kihara | B04C 5/187 |
| 11,116,351 | B2 * | 9/2021 | Salomon | A47J 31/002 |
| 11,246,326 | B2 * | 2/2022 | Feola | G07F 9/001 |
| 2003/0205146 | A1 | 11/2003 | Chang | |
| 2004/0074400 | A1 * | 4/2004 | Song | A23N 12/10 99/483 |
| 2008/0050496 | A1 * | 2/2008 | Boldor | C12G 3/04 426/569 |
| 2010/0161010 | A1 * | 6/2010 | Thomas | A61M 21/00 600/27 |
| 2011/0038998 | A1 * | 2/2011 | Kohli | A47J 31/521 426/433 |
| 2011/0168026 | A1 * | 7/2011 | Cahen | A47J 31/52 99/280 |
| 2015/0351582 | A1 * | 12/2015 | Roth | A47J 31/40 426/232 |
| 2016/0183717 | A1 * | 6/2016 | Ostan | A47J 31/10 99/280 |
| 2017/0367526 | A1 * | 12/2017 | Avins | A47J 31/5253 |
| 2018/0000108 | A1 * | 1/2018 | Boggavarapu | A47J 31/5253 |
| 2018/0000280 | A1 | 1/2018 | Dubief | |
| 2020/0163487 | A1 * | 5/2020 | Kihara | A47J 31/42 |

FOREIGN PATENT DOCUMENTS

| | | | |
|---|---|---|---|
| CN | 101738945 | A | 6/2010 |
| CN | 102217900 | A | 10/2011 |
| CN | 102411320 | A | 4/2012 |
| CN | 103207581 | A | 7/2013 |
| CN | 104161462 | A | 11/2014 |
| CN | 2060-044374 | U | 3/2017 |
| CN | 106998945 | A | 8/2017 |
| EP | 2279683 | A | 2/2011 |
| GB | 2397510 | A | 7/2004 |
| JP | 57110218 | A | 7/1982 |
| JP | 60109527 | U | 7/1985 |
| JP | 03104289 | | 2/1990 |
| JP | 0581544 | A | 4/1993 |
| JP | 0852081 | A | 2/1996 |
| JP | 10146285 | A | 6/1998 |
| JP | H10-191889 | A | 7/1998 |
| JP | H11-004769 | A | 1/1999 |
| JP | 2000-004769 | A | 1/2000 |
| JP | 20100004769 | A | 1/2000 |
| JP | 2002219055 | A | 8/2002 |
| JP | 2003024703 | A | 1/2003 |
| JP | 2004-046714 | A | 2/2004 |
| JP | 2004355052 | A | 12/2004 |
| JP | 2006280727 | A | 10/2006 |
| JP | 2007323532 | A | 12/2007 |
| JP | 2011167397 | A | 9/2011 |
| JP | 2013066697 | A | 4/2013 |
| KR | 10-2011-0052357 | A | 5/2011 |
| KR | 20140107850 | A | 9/2014 |
| WO | 2016178734 | A1 | 11/2016 |
| WO | 2019031363 | A1 | 2/2019 |
| WO | 2019031364 | A1 | 2/2019 |

OTHER PUBLICATIONS

International Search Report issued in corresponding Parent International Application No. PCT/JP2018/028916 dated Sep. 25, 2018.
Chinese Office Action dated Apr. 26, 2021 in counterpart Chinese Patent Appln. No. 201880050564.2.
Chinese Office Action dated Jan. 5, 2022 in corresponding Chinese Patent Appln. No. 201880050564.2.
Japanese Office Action dated Jul. 5, 2021 in counterpart Japanese Patent Appln. No. 2018-233678.
Extended European Search Report dated May 26, 2020 in counterpart European Application No. 18843133.2.
Chinese Office Action dated Jul. 5, 2022 in corresponding Chinese Patent Appln. No. 201880050564.2.

* cited by examiner

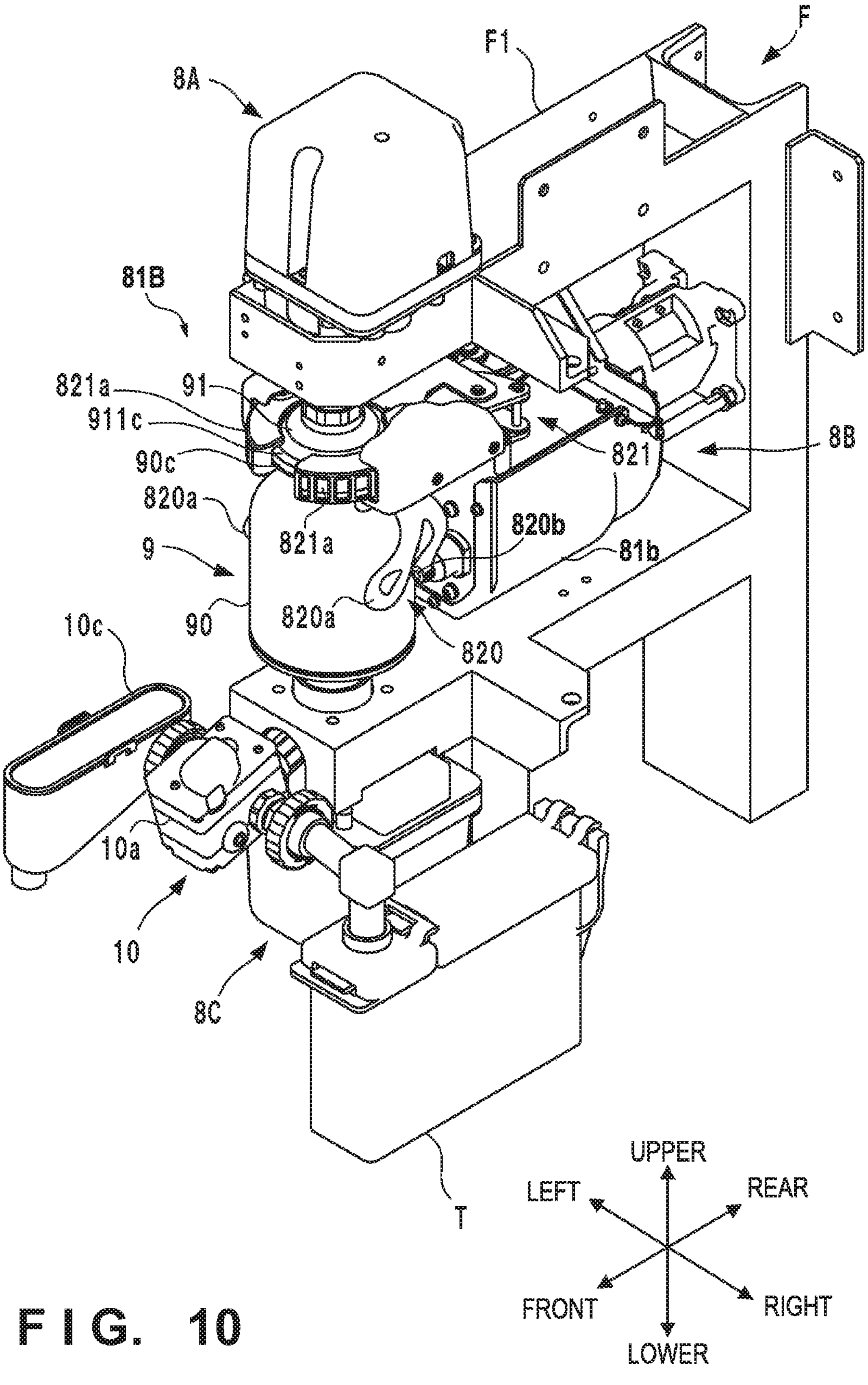
F I G. 10

FIG. 77

| No | PRODUCING COUNTRY | BRAND | REFINING | ROAST | SOURNESS | BITTERNESS | BODY |
|---|---|---|---|---|---|---|---|
| BLEND A | ○○ | □□ | W | MEDIUM LIGHT | HIGH | LOW | MEDIUM |
| BLEND B | ○○ | □□ | W | DEEP | LOW | HIGH | HEAVY |
| ... | ... | ... | ... | ... | ... | ... | ... |
| BLEND D | △△ | ◇◇ | PN | MEDIUM DEEP | MEDIUM | MEDIUM | MEDIUM |
| ... | ... | ... | ... | ... | ... | ... | ... |
| BLEND G | △△ | ◇◇ | PN | MEDIUM DEEP | MEDIUM | MEDIUM | MEDIUM |
| ... | ... | ... | ... | ... | ... | ... | ... |
| BLEND... | ◎◎ | ■■ | PN | DEEP | LOW | HIGH | HEAVY |

FIG. 78

| No | ... | AROMA | COMMENT | EXTRACTION |
|---|---|---|---|---|
| BLEND A | ... | FRUITY | FRUITY WITH A SMOOTH AFTERTASTE! | P01 |
| BLEND B | ... | SLIGHTLY BURNED | MILDLY BITTER DELIGHT! | P01 |
| ... | ... | ... | ... | ... |
| BLEND D | ... | CLASSIC COFFEE TASTE | BITTER AND SWEET | P02 |
| ... | ... | ... | ... | ... |
| BLEND G | ... | BRIGHT | EXQUISITE SOUR/BITTER BALANCE! | P01 |
| ... | ... | ... | ... | ... |
| BLEND... | ... | ROASTED NUT FLAVOR | BITTER WITH BODY! | P07 |

FIG. 79

| NAME | FEATURE | HOT WATER AMOUNT FOR STEAMING | STEAMING TIME | HOT WATER AMOUNT FOR EXTRACTION | EXTRACTION TIME | PARTICLE SIZE |
|---|---|---|---|---|---|---|
| P01 | STANDARD | 80 | 15 | 170 | 97 | PARTICLE SIZE 1 |
| P02 | LONG STEAMING | 80 | 180 | 170 | 97 | PARTICLE SIZE 3 |
| ... | ... | ... | ... | ... | ... | ... |
| P07 | EXCLUSIVE FOR ■■ | 40 | 5 | 190 | 105 | PARTICLE SIZE 10 |

FIG. 80

| NAME | ... | COMMENT |
| --- | --- | --- |
| P01 | ... | STANDARD EXTRACTION PROFILE |
| P02 | ... | EXTRACTION PROFILE FOR FRESH BEANS |
| ... | ... | ... |
| P07 | ... | EXTRACTION PROFILE OF EXCLUSIVE FOR ■■ OF ◎◎ COUNTRY |

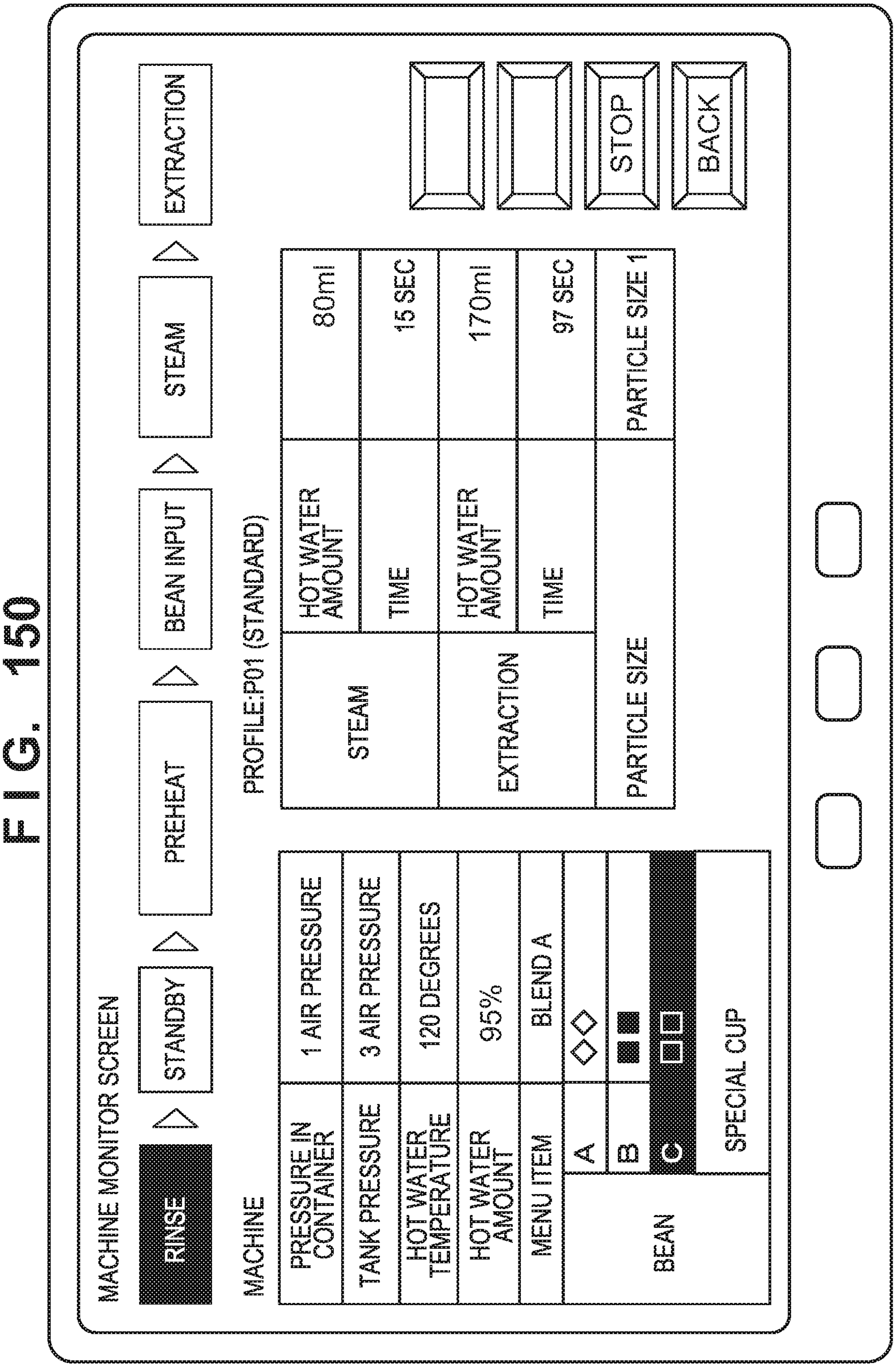

F I G. 150

| MACHINE MONITOR SCREEN | | | | | |
|---|---|---|---|---|---|
| RINSE ▷ | STANDBY ▷ | PREHEAT ▷ | BEAN INPUT ▷ | STEAM ▷ | EXTRACTION |

MACHINE

| PRESSURE IN CONTAINER | 1 AIR PRESSURE |
| TANK PRESSURE | 3 AIR PRESSURE |
| HOT WATER TEMPERATURE | 120 DEGREES |
| HOT WATER AMOUNT | 95% |
| MENU ITEM | BLEND A |
| A | ◇◇ |
| B | ■■ |
| C | □□ |
| BEAN | SPECIAL CUP |

PROFILE:P01 (STANDARD)

| STEAM | HOT WATER AMOUNT | 80ml |
| | TIME | 15 SEC |
| EXTRACTION | HOT WATER AMOUNT | 170ml |
| | TIME | 97 SEC |
| PARTICLE SIZE | | PARTICLE SIZE 1 |

STOP   BACK

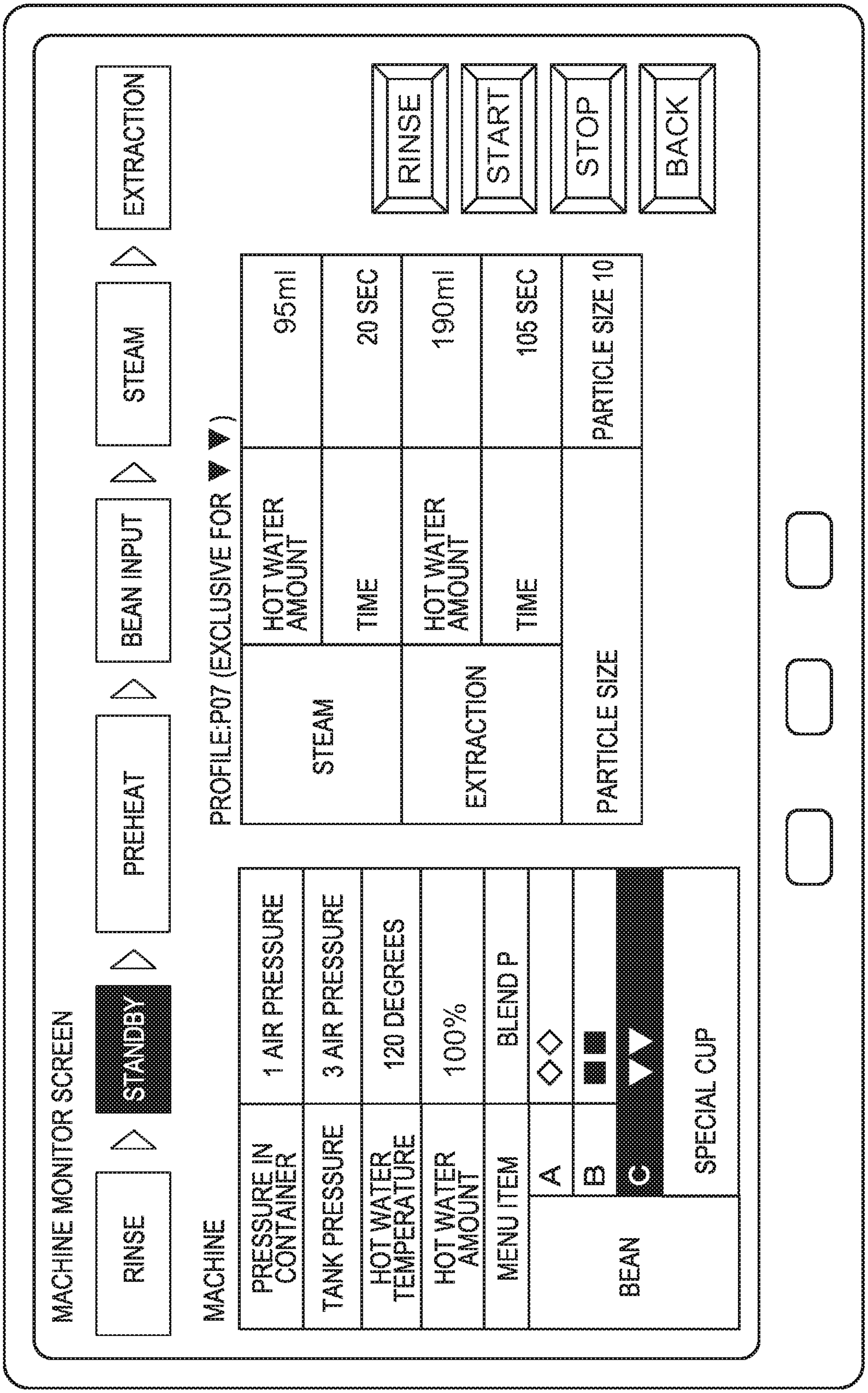

F I G. 172

MACHINE MONITOR SCREEN

| RINSE ▷ | STANDBY | PREHEAT ▷ | BEAN INPUT ▷ | STEAM ▷ | EXTRACTION |

MACHINE

| PRESSURE IN CONTAINER | 1 AIR PRESSURE |
| --- | --- |
| TANK PRESSURE | 3 AIR PRESSURE |
| HOT WATER TEMPERATURE | 120 DEGREES |
| HOT WATER AMOUNT | 100% |
| MENU ITEM | BLEND P |
| A | ◇◇ |
| B | ■■ |
| C | ▶ |
| BEAN | SPECIAL CUP |

PROFILE:P07 (EXCLUSIVE FOR ▼▼)

| STEAM | HOT WATER AMOUNT | 95ml |
| --- | --- | --- |
| | TIME | 20 SEC |
| EXTRACTION | HOT WATER AMOUNT | 190ml |
| | TIME | 105 SEC |
| PARTICLE SIZE | | PARTICLE SIZE 10 |

[RINSE] [START] [STOP] [BACK]

FIG. 188

STATE DISPLAY

| | |
|---|---|
| PRESSURE IN CONTAINER | 1atm |
| TANK PRESSURE | 3atm |
| HOT WATER AMOUNT | 100% |
| HOT WATER TEMPERATURE | 120 DEGREES |
| PARTICLE SIZE | PARTICLE SIZE 4 |

STATE DISPLAY/SETTINGS

| | | | |
|---|---|---|---|
| PROFILE | | P01 | |
| BEAN | A | ◇◇ | |
| | B | ■■ | |
| | C | □□ | |
| CONTAINER | | EXTRACTION | MILL |
| POSTURE | | UP | DOWN |
| LID | | OPEN | CLOSE |
| RETAINER | | RELEASE | FIX |
| PROBE A | | RELEASE | CONNECT |
| PROBE B | | RELEASE | CONNECT |
| INNER LID A | | CLOSE | OPEN |
| INNER LID B | | CLOSE | OPEN |
| HOT WATER SUPPLY VALVE | | CLOSE | OPEN |
| PRESSURIZATION VALVE | | CLOSE | OPEN |
| PRESSURE REDUCING VALVE | | CLOSE | OPEN |
| WATER SUPPLY VALVE | | CLOSE | OPEN |
| OUTLET VALUE | | DISCHARGE | SEND |
| BEAN A | | STOP | SEND |
| BEAN B | | STOP | SEND |
| BEAN C | | STOP | SEND |
| MILL A | | STOP | ROTATION |
| MILL B | | STOP | ROTATION |
| FAN | | STOP | ROTATION |

FIG. 190

LOG

2015/3/4 10:21:15
<2> START WATER SUPPLY 2015/3/4 10:21:16
<3> START HOT WATER DISCHARGE 2015/3/4 10:21:21
<2> END WATER SUPPLY 2015/3/4 10:21:28
<3> END HOT WATER DISCHARGE 2015/3/4 10:21:29
<4> START CONTAINER OPEN 2015/3/4 10:21:30
<4> END CONTAINER OPEN 2015/3/4 10:21:30
END RINSE
2015/3/4 10:21:30
END EXTRACTION STEP
2015/3/4 10:21:32
END TANK PRESSURIZATION
2015/3/4 10:21:43
END HOT WATER HEAT
2015/3/4 10:21:43
END PREPARATION

FIG. 198

LOG

2015/3/4 10:21:15
<2> START WATER SUPPLY 2015/3/4 10:21:16
<3> START HOT WATER DISCHARGE 2015/3/4 10:21:21
<2> END WATER SUPPLY2015/3/4 10:21:28
<3> END HOT WATER DISCHARGE 2015/3/4 10:21:29
<4> START CONTAINER OPEN 2015/3/4 10:21:30
<4> END CONTAINER OPEN 2015/3/4 10:21:30
END RINSE
2015/3/4 10:21:30
END EXTRACTION STEP
2015/3/4 10:21:32
END TANK PRESSURIZATION
2015/3/4 10:21:43
END HOT WATER HEAT
2015/3/4 10:21:43
END PREPARATION
2015/3/4 10:21:55
START EXTRACTION STEP
2015/3/4 10:21:55
START RINSE

STATE DISPLAY/SETTINGS

FIG. 202

| | | | |
|---|---|---|---|
| PROFILE | | P01 | |
| BEAN | A | ◇◇ | |
| | B | ■■ | |
| | C | □□ | |
| CONTAINER | | EXTRACTION | MILL |
| POSTURE | | UP | DOWN |
| LID | | OPEN | CLOSE |
| RETAINER | | RELEASE | FIX |
| PROBE A | | RELEASE | CONNECT |
| PROBE B | | RELEASE | CONNECT |
| INNER LID A | | CLOSE | OPEN |
| INNER LID B | | CLOSE | OPEN |
| HOT WATER SUPPLY VALVE | | CLOSE | OPEN |
| PRESSURIZATION VALVE | | CLOSE | OPEN |
| PRESSURE REDUCING VALVE | | CLOSE | OPEN |
| WATER SUPPLY VALVE | | CLOSE | OPEN |
| OUTLET VALUE | | DISCHARGE | SEND |
| BEAN A | | STOP | SEND |
| BEAN B | | STOP | SEND |
| BEAN C | | STOP | SEND |
| MILL A | | STOP | ROTATION |
| MILL B | | STOP | ROTATION |
| FAN | | STOP | ROTATION |

STATE DISPLAY/SETTINGS

FIG. 205

| | | | |
|---|---|---|---|
| PROFILE | | P07 | |
| BEAN | A | ◇◇ | |
| | B | ■■ | |
| | C | □□ | |
| CONTAINER | | EXTRACTION | MILL |
| POSTURE | | UP | DOWN |
| LID | | OPEN | CLOSE |
| RETAINER | | RELEASE | FIX |
| PROBE A | | RELEASE | CONNECT |
| PROBE B | | RELEASE | CONNECT |
| INNER LID A | | CLOSE | OPEN |
| INNER LID B | | CLOSE | OPEN |
| HOT WATER SUPPLY VALVE | | CLOSE | OPEN |
| PRESSURIZATION VALVE | | CLOSE | OPEN |
| PRESSURE REDUCING VALVE | | CLOSE | OPEN |
| WATER SUPPLY VALVE | | CLOSE | OPEN |
| OUTLET VALUE | | DISCHARGE | SEND |
| BEAN A | | STOP | SEND |
| BEAN B | | STOP | SEND |
| BEAN C | | STOP | SEND |
| MILL A | | STOP | ROTATION |
| MILL B | | STOP | ROTATION |
| FAN | | STOP | ROTATION |

STATE DISPLAY/SETTINGS

FIG. 206

| PROFILE | | P07 | |
|---|---|---|---|
| BEAN | A | ◇◇ | |
| | B | ■■ | |
| | C | □□ | |
| CONTAINER | | **EXTRACTION** | MILL |
| POSTURE | | **UP** | DOWN |
| LID | | OPEN | **CLOSE** |
| RETAINER | | RELEASE | **FIX** |
| PROBE A | | RELEASE | **CONNECT** |
| PROBE B | | RELEASE | **CONNECT** |
| INNER LID A | | **CLOSE** | OPEN |
| INNER LID B | | CLOSE | **OPEN** |
| HOT WATER SUPPLY VALVE | | **CLOSE** | OPEN |
| PRESSURIZATION VALVE | | **CLOSE** | OPEN |
| PRESSURE REDUCING VALVE | | **CLOSE** | OPEN |
| WATER SUPPLY VALVE | | **CLOSE** | OPEN |
| OUTLET VALUE | | **DISCHARGE** | SEND |
| BEAN A | | **STOP** | SEND |
| BEAN B | | **STOP** | SEND |
| BEAN C | | **STOP** | SEND |
| MILL A | | **STOP** | ROTATION |
| MILL B | | **STOP** | ROTATION |
| FAN | | **STOP** | ROTATION |

STATE DISPLAY/SETTINGS

FIG. 208

| | | | |
|---|---|---|---|
| PROFILE | | P07 | |
| BEAN | A | ◇◇ | |
| | B | ■■ | |
| | C | □□ | |
| CONTAINER | | EXTRACTION | MILL |
| POSTURE | | UP | DOWN |
| LID | | OPEN | CLOSE |
| RETAINER | | RELEASE | FIX |
| PROBE A | | RELEASE | CONNECT |
| PROBE B | | RELEASE | CONNECT |
| INNER LID A | | CLOSE | OPEN |
| INNER LID B | | CLOSE | OPEN |
| HOT WATER SUPPLY VALVE | | CLOSE | OPEN |
| PRESSURIZATION VALVE | | CLOSE | OPEN |
| PRESSURE REDUCING VALVE | | CLOSE | OPEN |
| WATER SUPPLY VALVE | | CLOSE | OPEN |
| OUTLET VALUE | | DISCHARGE | SEND |
| BEAN A | | STOP | SEND |
| BEAN B | | STOP | SEND |
| BEAN C | | STOP | SEND |
| MILL A | | STOP | ROTATION |
| MILL B | | STOP | ROTATION |
| FAN | | STOP | ROTATION |

STATE DISPLAY/SETTINGS

FIG. 211

| | | | |
|---|---|---|---|
| PROFILE | | P07 | |
| BEAN | A | ◇◇ | |
| | B | ■■ | |
| | C | □□ | |
| CONTAINER | | EXTRACTION | MILL |
| POSTURE | | UP | DOWN |
| LID | | OPEN | CLOSE |
| RETAINER | | RELEASE | FIX |
| PROBE A | | RELEASE | CONNECT |
| PROBE B | | RELEASE | CONNECT |
| INNER LID A | | CLOSE | OPEN |
| INNER LID B | | CLOSE | OPEN |
| HOT WATER SUPPLY VALVE | | CLOSE | OPEN |
| PRESSURIZATION VALVE | | CLOSE | OPEN |
| PRESSURE REDUCING VALVE | | CLOSE | OPEN |
| WATER SUPPLY VALVE | | CLOSE | OPEN |
| OUTLET VALUE | | DISCHARGE | SEND |
| BEAN A | | STOP | SEND |
| BEAN B | | STOP | SEND |
| BEAN C | | STOP | SEND |
| MILL A | | STOP | ROTATION |
| MILL B | | STOP | ROTATION |
| FAN | | STOP | ROTATION |

STATE DISPLAY/SETTINGS

FIG. 213

| | | | |
|---|---|---|---|
| PROFILE | | P07 | |
| BEAN | A | ◇◇ | |
| | B | ■■ | |
| | C | □□ | |
| CONTAINER | | EXTRACTION | MILL |
| POSTURE | | UP | DOWN |
| LID | | OPEN | CLOSE |
| RETAINER | | RELEASE | FIX |
| PROBE A | | RELEASE | CONNECT |
| PROBE B | | RELEASE | CONNECT |
| INNER LID A | | CLOSE | OPEN |
| INNER LID B | | CLOSE | OPEN |
| HOT WATER SUPPLY VALVE | | CLOSE | OPEN |
| PRESSURIZATION VALVE | | CLOSE | OPEN |
| PRESSURE REDUCING VALVE | | CLOSE | OPEN |
| WATER SUPPLY VALVE | | CLOSE | OPEN |
| OUTLET VALUE | | DISCHARGE | SEND |
| BEAN A | | STOP | SEND |
| BEAN B | | STOP | SEND |
| BEAN C | | STOP | SEND |
| MILL A | | STOP | ROTATION |
| MILL B | | STOP | ROTATION |
| FAN | | STOP | ROTATION |

STATE DISPLAY/SETTINGS

FIG. 215

| | | | |
|---|---|---|---|
| PROFILE | | P07 | |
| BEAN | A | ◇◇ | |
| | B | ■■ | |
| | C | □□ | |
| CONTAINER | | EXTRACTION | MILL |
| POSTURE | | UP | DOWN |
| LID | | OPEN | CLOSE |
| RETAINER | | RELEASE | FIX |
| PROBE A | | RELEASE | CONNECT |
| PROBE B | | RELEASE | CONNECT |
| INNER LID A | | CLOSE | OPEN |
| INNER LID B | | CLOSE | OPEN |
| HOT WATER SUPPLY VALVE | | CLOSE | OPEN |
| PRESSURIZATION VALVE | | CLOSE | OPEN |
| PRESSURE REDUCING VALVE | | CLOSE | OPEN |
| WATER SUPPLY VALVE | | CLOSE | OPEN |
| OUTLET VALUE | | DISCHARGE | SEND |
| BEAN A | | STOP | SEND |
| BEAN B | | STOP | SEND |
| BEAN C | | STOP | SEND |
| MILL A | | STOP | ROTATION |
| MILL B | | STOP | ROTATION |
| FAN | | STOP | ROTATION |

STATE DISPLAY/SETTINGS

FIG. 216

| | | | |
|---|---|---|---|
| PROFILE | | P07 | |
| BEAN | A | ◇◇ | |
| | B | ■■ | |
| | C | □□ | |
| CONTAINER | | EXTRACTION | MILL |
| POSTURE | | UP | DOWN |
| LID | | OPEN | CLOSE |
| RETAINER | | RELEASE | FIX |
| PROBE A | | RELEASE | CONNECT |
| PROBE B | | RELEASE | CONNECT |
| INNER LID A | | CLOSE | OPEN |
| INNER LID B | | CLOSE | OPEN |
| HOT WATER SUPPLY VALVE | | CLOSE | OPEN |
| PRESSURIZATION VALVE | | CLOSE | OPEN |
| PRESSURE REDUCING VALVE | | CLOSE | OPEN |
| WATER SUPPLY VALVE | | CLOSE | OPEN |
| OUTLET VALUE | | DISCHARGE | SEND |
| BEAN A | | STOP | SEND |
| BEAN B | | STOP | SEND |
| BEAN C | | STOP | SEND |
| MILL A | | STOP | ROTATION |
| MILL B | | STOP | ROTATION |
| FAN | | STOP | ROTATION |

STATE DISPLAY/SETTINGS

FIG. 218

| | | | |
|---|---|---|---|
| PROFILE | | P07 | |
| BEAN | A | ◇◇ | |
| | B | ■■ | |
| | C | □□ | |
| CONTAINER | | EXTRACTION | **MILL** |
| POSTURE | | **UP** | DOWN |
| LID | | **OPEN** | CLOSE |
| RETAINER | | **RELEASE** | FIX |
| PROBE A | | **RELEASE** | CONNECT |
| PROBE B | | **RELEASE** | CONNECT |
| INNER LID A | | **CLOSE** | OPEN |
| INNER LID B | | **CLOSE** | OPEN |
| HOT WATER SUPPLY VALVE | | **CLOSE** | OPEN |
| PRESSURIZATION VALVE | | **CLOSE** | OPEN |
| PRESSURE REDUCING VALVE | | **CLOSE** | OPEN |
| WATER SUPPLY VALVE | | **CLOSE** | OPEN |
| OUTLET VALUE | | **DISCHARGE** | SEND |
| BEAN A | | **STOP** | SEND |
| BEAN B | | **STOP** | SEND |
| BEAN C | | **STOP** | SEND |
| MILL A | | STOP | **ROTATION** |
| MILL B | | STOP | **ROTATION** |
| FAN | | **STOP** | ROTATION |

STATE DISPLAY/SETTINGS

FIG. 220

| | | | |
|---|---|---|---|
| PROFILE | | P07 | |
| BEAN | A | ◇◇ | |
| | B | ■■ | |
| | C | □□ | |
| CONTAINER | | EXTRACTION | MILL |
| POSTURE | | UP | DOWN |
| LID | | OPEN | CLOSE |
| RETAINER | | RELEASE | FIX |
| PROBE A | | RELEASE | CONNECT |
| PROBE B | | RELEASE | CONNECT |
| INNER LID A | | CLOSE | OPEN |
| INNER LID B | | CLOSE | OPEN |
| HOT WATER SUPPLY VALVE | | CLOSE | OPEN |
| PRESSURIZATION VALVE | | CLOSE | OPEN |
| PRESSURE REDUCING VALVE | | CLOSE | OPEN |
| WATER SUPPLY VALVE | | CLOSE | OPEN |
| OUTLET VALUE | | DISCHARGE | SEND |
| BEAN A | | STOP | SEND |
| BEAN B | | STOP | SEND |
| BEAN C | | STOP | SEND |
| MILL A | | STOP | ROTATION |
| MILL B | | STOP | ROTATION |
| FAN | | STOP | ROTATION |

STATE DISPLAY/SETTINGS

FIG. 223

| | | | |
|---|---|---|---|
| PROFILE | | P07 | |
| BEAN | A | ◇◇ | |
| | B | ■■ | |
| | C | □□ | |
| CONTAINER | | EXTRACTION | MILL |
| POSTURE | | UP | DOWN |
| LID | | OPEN | CLOSE |
| RETAINER | | RELEASE | FIX |
| PROBE A | | RELEASE | CONNECT |
| PROBE B | | RELEASE | CONNECT |
| INNER LID A | | CLOSE | OPEN |
| INNER LID B | | CLOSE | OPEN |
| HOT WATER SUPPLY VALVE | | CLOSE | OPEN |
| PRESSURIZATION VALVE | | CLOSE | OPEN |
| PRESSURE REDUCING VALVE | | CLOSE | OPEN |
| WATER SUPPLY VALVE | | CLOSE | OPEN |
| OUTLET VALUE | | DISCHARGE | SEND |
| BEAN A | | STOP | SEND |
| BEAN B | | STOP | SEND |
| BEAN C | | STOP | SEND |
| MILL A | | STOP | ROTATION |
| MILL B | | STOP | ROTATION |
| FAN | | STOP | ROTATION |

STATE DISPLAY/SETTINGS

FIG. 224

| | | | |
|---|---|---|---|
| PROFILE | | P07 | |
| BEAN | A | ◇◇ | |
| | B | ■■ | |
| | C | □□ | |
| CONTAINER | | EXTRACTION | MILL |
| POSTURE | | UP | DOWN |
| LID | | OPEN | CLOSE |
| RETAINER | | RELEASE | FIX |
| PROBE A | | RELEASE | CONNECT |
| PROBE B | | RELEASE | CONNECT |
| INNER LID A | | CLOSE | OPEN |
| INNER LID B | | CLOSE | OPEN |
| HOT WATER SUPPLY VALVE | | CLOSE | OPEN |
| PRESSURIZATION VALVE | | CLOSE | OPEN |
| PRESSURE REDUCING VALVE | | CLOSE | OPEN |
| WATER SUPPLY VALVE | | CLOSE | OPEN |
| OUTLET VALUE | | DISCHARGE | SEND |
| BEAN A | | STOP | SEND |
| BEAN B | | STOP | SEND |
| BEAN C | | STOP | SEND |
| MILL A | | STOP | ROTATION |
| MILL B | | STOP | ROTATION |
| FAN | | STOP | ROTATION |

STATE DISPLAY/SETTINGS

FIG. 226

| | | | |
|---|---|---|---|
| PROFILE | | P07 | |
| BEAN | A | ◇◇ | |
| | B | ■■ | |
| | C | □□ | |
| CONTAINER | | EXTRACTION | MILL |
| POSTURE | | UP | DOWN |
| LID | | OPEN | CLOSE |
| RETAINER | | RELEASE | FIX |
| PROBE A | | RELEASE | CONNECT |
| PROBE B | | RELEASE | CONNECT |
| INNER LID A | | CLOSE | OPEN |
| INNER LID B | | CLOSE | OPEN |
| HOT WATER SUPPLY VALVE | | CLOSE | OPEN |
| PRESSURIZATION VALVE | | CLOSE | OPEN |
| PRESSURE REDUCING VALVE | | CLOSE | OPEN |
| WATER SUPPLY VALVE | | CLOSE | OPEN |
| OUTLET VALUE | | DISCHARGE | SEND |
| BEAN A | | STOP | SEND |
| BEAN B | | STOP | SEND |
| BEAN C | | STOP | SEND |
| MILL A | | STOP | ROTATION |
| MILL B | | STOP | ROTATION |
| FAN | | STOP | ROTATION |

STATE DISPLAY/SETTINGS

FIG. 227

| | | | |
|---|---|---|---|
| PROFILE | | P07 | |
| BEAN | A | ◇◇ | |
| | B | ■■ | |
| | C | □□ | |
| CONTAINER | | EXTRACTION | MILL |
| POSTURE | | UP | DOWN |
| LID | | OPEN | CLOSE |
| RETAINER | | RELEASE | FIX |
| PROBE A | | RELEASE | CONNECT |
| PROBE B | | RELEASE | CONNECT |
| INNER LID A | | CLOSE | OPEN |
| INNER LID B | | CLOSE | OPEN |
| HOT WATER SUPPLY VALVE | | CLOSE | OPEN |
| PRESSURIZATION VALVE | | CLOSE | OPEN |
| PRESSURE REDUCING VALVE | | CLOSE | OPEN |
| WATER SUPPLY VALVE | | CLOSE | OPEN |
| OUTLET VALUE | | DISCHARGE | SEND |
| BEAN A | | STOP | SEND |
| BEAN B | | STOP | SEND |
| BEAN C | | STOP | SEND |
| MILL A | | STOP | ROTATION |
| MILL B | | STOP | ROTATION |
| FAN | | STOP | ROTATION |

STATE DISPLAY/SETTINGS

FIG. 232

| | | | |
|---|---|---|---|
| PROFILE | | P07 | |
| BEAN | A | ◇◇ | |
| | B | ■■ | |
| | C | □□ | |
| CONTAINER | | EXTRACTION | MILL |
| POSTURE | | UP | DOWN |
| LID | | OPEN | CLOSE |
| RETAINER | | RELEASE | FIX |
| PROBE A | | RELEASE | CONNECT |
| PROBE B | | RELEASE | CONNECT |
| INNER LID A | | CLOSE | OPEN |
| INNER LID B | | CLOSE | OPEN |
| HOT WATER SUPPLY VALVE | | CLOSE | OPEN |
| PRESSURIZATION VALVE | | CLOSE | OPEN |
| PRESSURE REDUCING VALVE | | CLOSE | OPEN |
| WATER SUPPLY VALVE | | CLOSE | OPEN |
| OUTLET VALUE | | DISCHARGE | SEND |
| BEAN A | | STOP | SEND |
| BEAN B | | STOP | SEND |
| BEAN C | | STOP | SEND |
| MILL A | | STOP | ROTATION |
| MILL B | | STOP | ROTATION |
| FAN | | STOP | ROTATION |

STATE DISPLAY/SETTINGS

FIG. 235

| | | | |
|---|---|---|---|
| PROFILE | | P07 | |
| BEAN | A | ◇◇ | |
| | B | ■■ | |
| | C | □□ | |
| CONTAINER | | EXTRACTION | MILL |
| POSTURE | | UP | DOWN |
| LID | | OPEN | CLOSE |
| RETAINER | | RELEASE | FIX |
| PROBE A | | RELEASE | CONNECT |
| PROBE B | | RELEASE | CONNECT |
| INNER LID A | | CLOSE | OPEN |
| INNER LID B | | CLOSE | OPEN |
| HOT WATER SUPPLY VALVE | | CLOSE | OPEN |
| PRESSURIZATION VALVE | | CLOSE | OPEN |
| PRESSURE REDUCING VALVE | | CLOSE | OPEN |
| WATER SUPPLY VALVE | | CLOSE | OPEN |
| OUTLET VALUE | | DISCHARGE | SEND |
| BEAN A | | STOP | SEND |
| BEAN B | | STOP | SEND |
| BEAN C | | STOP | SEND |
| MILL A | | STOP | ROTATION |
| MILL B | | STOP | ROTATION |
| FAN | | STOP | ROTATION |

STATE DISPLAY/SETTINGS

FIG. 236

| | | | |
|---|---|---|---|
| PROFILE | | P07 | |
| BEAN | A | ◇◇ | |
| | B | ■■ | |
| | C | □□ | |
| CONTAINER | | EXTRACTION | MILL |
| POSTURE | | UP | DOWN |
| LID | | OPEN | CLOSE |
| RETAINER | | RELEASE | FIX |
| PROBE A | | RELEASE | CONNECT |
| PROBE B | | RELEASE | CONNECT |
| INNER LID A | | CLOSE | OPEN |
| INNER LID B | | CLOSE | OPEN |
| HOT WATER SUPPLY VALVE | | CLOSE | OPEN |
| PRESSURIZATION VALVE | | CLOSE | OPEN |
| PRESSURE REDUCING VALVE | | CLOSE | OPEN |
| WATER SUPPLY VALVE | | CLOSE | OPEN |
| OUTLET VALUE | | DISCHARGE | SEND |
| BEAN A | | STOP | SEND |
| BEAN B | | STOP | SEND |
| BEAN C | | STOP | SEND |
| MILL A | | STOP | ROTATION |
| MILL B | | STOP | ROTATION |
| FAN | | STOP | ROTATION |

STATE DISPLAY/SETTINGS

FIG. 238

| | | | |
|---|---|---|---|
| PROFILE | | P07 | |
| BEAN | A | ◇◇ | |
| | B | ■■ | |
| | C | □□ | |
| CONTAINER | | EXTRACTION | MILL |
| POSTURE | | UP | DOWN |
| LID | | OPEN | CLOSE |
| RETAINER | | RELEASE | FIX |
| PROBE A | | RELEASE | CONNECT |
| PROBE B | | RELEASE | CONNECT |
| INNER LID A | | CLOSE | OPEN |
| INNER LID B | | CLOSE | OPEN |
| HOT WATER SUPPLY VALVE | | CLOSE | OPEN |
| PRESSURIZATION VALVE | | CLOSE | OPEN |
| PRESSURE REDUCING VALVE | | CLOSE | OPEN |
| WATER SUPPLY VALVE | | CLOSE | OPEN |
| OUTLET VALUE | | DISCHARGE | SEND |
| BEAN A | | STOP | SEND |
| BEAN B | | STOP | SEND |
| BEAN C | | STOP | SEND |
| MILL A | | STOP | ROTATION |
| MILL B | | STOP | ROTATION |
| FAN | | STOP | ROTATION |

STATE DISPLAY/SETTINGS

FIG. 239

| | | |
|---|---|---|
| PROFILE | P07 | |
| BEAN A | ◇◇ | |
| BEAN B | ■■ | |
| BEAN C | □□ | |
| CONTAINER | EXTRACTION | MILL |
| POSTURE | UP | DOWN |
| LID | OPEN | CLOSE |
| RETAINER | RELEASE | FIX |
| PROBE A | RELEASE | CONNECT |
| PROBE B | RELEASE | CONNECT |
| INNER LID A | CLOSE | OPEN |
| INNER LID B | CLOSE | OPEN |
| HOT WATER SUPPLY VALVE | CLOSE | OPEN |
| PRESSURIZATION VALVE | CLOSE | OPEN |
| PRESSURE REDUCING VALVE | CLOSE | OPEN |
| WATER SUPPLY VALVE | CLOSE | OPEN |
| OUTLET VALUE | DISCHARGE | SEND |
| BEAN A | STOP | SEND |
| BEAN B | STOP | SEND |
| BEAN C | STOP | SEND |
| MILL A | STOP | ROTATION |
| MILL B | STOP | ROTATION |
| FAN | STOP | ROTATION |

STATE DISPLAY/SETTINGS

FIG. 241

| | | | |
|---|---|---|---|
| PROFILE | | P07 | |
| BEAN | A | ◇◇ | |
| | B | ■■ | |
| | C | □□ | |
| CONTAINER | | EXTRACTION | MILL |
| POSTURE | | UP | DOWN |
| LID | | OPEN | CLOSE |
| RETAINER | | RELEASE | FIX |
| PROBE A | | RELEASE | CONNECT |
| PROBE B | | RELEASE | CONNECT |
| INNER LID A | | CLOSE | OPEN |
| INNER LID B | | CLOSE | OPEN |
| HOT WATER SUPPLY VALVE | | CLOSE | OPEN |
| PRESSURIZATION VALVE | | CLOSE | OPEN |
| PRESSURE REDUCING VALVE | | CLOSE | OPEN |
| WATER SUPPLY VALVE | | CLOSE | OPEN |
| OUTLET VALUE | | DISCHARGE | SEND |
| BEAN A | | STOP | SEND |
| BEAN B | | STOP | SEND |
| BEAN C | | STOP | SEND |
| MILL A | | STOP | ROTATION |
| MILL B | | STOP | ROTATION |
| FAN | | STOP | ROTATION |

STATE DISPLAY/SETTINGS

FIG. 242

| | | | |
|---|---|---|---|
| PROFILE | | P07 | |
| BEAN | A | ◇◇ | |
| | B | ■■ | |
| | C | □□ | |
| CONTAINER | | EXTRACTION | MILL |
| POSTURE | | UP | DOWN |
| LID | | OPEN | CLOSE |
| RETAINER | | RELEASE | FIX |
| PROBE A | | RELEASE | CONNECT |
| PROBE B | | RELEASE | CONNECT |
| INNER LID A | | CLOSE | OPEN |
| INNER LID B | | CLOSE | OPEN |
| HOT WATER SUPPLY VALVE | | CLOSE | OPEN |
| PRESSURIZATION VALVE | | CLOSE | OPEN |
| PRESSURE REDUCING VALVE | | CLOSE | OPEN |
| WATER SUPPLY VALVE | | CLOSE | OPEN |
| OUTLET VALUE | | DISCHARGE | SEND |
| BEAN A | | STOP | SEND |
| BEAN B | | STOP | SEND |
| BEAN C | | STOP | SEND |
| MILL A | | STOP | ROTATION |
| MILL B | | STOP | ROTATION |
| FAN | | STOP | ROTATION |

STATE DISPLAY/SETTINGS

FIG. 244

| | | | |
|---|---|---|---|
| PROFILE | | P07 | |
| BEAN | A | ◇◇ | |
| | B | ■■ | |
| | C | □□ | |
| CONTAINER | | EXTRACTION | MILL |
| POSTURE | | UP | DOWN |
| LID | | OPEN | CLOSE |
| RETAINER | | RELEASE | FIX |
| PROBE A | | RELEASE | CONNECT |
| PROBE B | | RELEASE | CONNECT |
| INNER LID A | | CLOSE | OPEN |
| INNER LID B | | CLOSE | OPEN |
| HOT WATER SUPPLY VALVE | | CLOSE | OPEN |
| PRESSURIZATION VALVE | | CLOSE | OPEN |
| PRESSURE REDUCING VALVE | | CLOSE | OPEN |
| WATER SUPPLY VALVE | | CLOSE | OPEN |
| OUTLET VALUE | | DISCHARGE | SEND |
| BEAN A | | STOP | SEND |
| BEAN B | | STOP | SEND |
| BEAN C | | STOP | SEND |
| MILL A | | STOP | ROTATION |
| MILL B | | STOP | ROTATION |
| FAN | | STOP | ROTATION |

STATE DISPLAY/SETTINGS

FIG. 246

| PROFILE | | P07 | |
|---|---|---|---|
| BEAN | A | ◇◇ | |
| | B | ■■ | |
| | C | □□ | |
| CONTAINER | | EXTRACTION | MILL |
| POSTURE | | UP | DOWN |
| LID | | OPEN | CLOSE |
| RETAINER | | RELEASE | FIX |
| PROBE A | | RELEASE | CONNECT |
| PROBE B | | RELEASE | CONNECT |
| INNER LID A | | CLOSE | OPEN |
| INNER LID B | | CLOSE | OPEN |
| HOT WATER SUPPLY VALVE | | CLOSE | OPEN |
| PRESSURIZATION VALVE | | CLOSE | OPEN |
| PRESSURE REDUCING VALVE | | CLOSE | OPEN |
| WATER SUPPLY VALVE | | CLOSE | OPEN |
| OUTLET VALUE | | DISCHARGE | SEND |
| BEAN A | | STOP | SEND |
| BEAN B | | STOP | SEND |
| BEAN C | | STOP | SEND |
| MILL A | | STOP | ROTATION |
| MILL B | | STOP | ROTATION |
| FAN | | STOP | ROTATION |

STATE DISPLAY/SETTINGS

FIG. 247

| | | | |
|---|---|---|---|
| PROFILE | | P07 | |
| BEAN | A | ◇◇ | |
| | B | ■■ | |
| | C | □□ | |
| CONTAINER | | EXTRACTION | MILL |
| POSTURE | | UP | DOWN |
| LID | | OPEN | CLOSE |
| RETAINER | | RELEASE | FIX |
| PROBE A | | RELEASE | CONNECT |
| PROBE B | | RELEASE | CONNECT |
| INNER LID A | | CLOSE | OPEN |
| INNER LID B | | CLOSE | OPEN |
| HOT WATER SUPPLY VALVE | | CLOSE | OPEN |
| PRESSURIZATION VALVE | | CLOSE | OPEN |
| PRESSURE REDUCING VALVE | | CLOSE | OPEN |
| WATER SUPPLY VALVE | | CLOSE | OPEN |
| OUTLET VALUE | | DISCHARGE | SEND |
| BEAN A | | STOP | SEND |
| BEAN B | | STOP | SEND |
| BEAN C | | STOP | SEND |
| MILL A | | STOP | ROTATION |
| MILL B | | STOP | ROTATION |
| FAN | | STOP | ROTATION |

STATE DISPLAY/SETTINGS

FIG. 249

| | | | |
|---|---|---|---|
| PROFILE | | P07 | |
| BEAN | A | ◇◇ | |
| | B | ■■ | |
| | C | □□ | |
| CONTAINER | | EXTRACTION | MILL |
| POSTURE | | UP | DOWN |
| LID | | OPEN | CLOSE |
| RETAINER | | RELEASE | FIX |
| PROBE A | | RELEASE | CONNECT |
| PROBE B | | RELEASE | CONNECT |
| INNER LID A | | CLOSE | OPEN |
| INNER LID B | | CLOSE | OPEN |
| HOT WATER SUPPLY VALVE | | CLOSE | OPEN |
| PRESSURIZATION VALVE | | CLOSE | OPEN |
| PRESSURE REDUCING VALVE | | CLOSE | OPEN |
| WATER SUPPLY VALVE | | CLOSE | OPEN |
| OUTLET VALUE | | DISCHARGE | SEND |
| BEAN A | | STOP | SEND |
| BEAN B | | STOP | SEND |
| BEAN C | | STOP | SEND |
| MILL A | | STOP | ROTATION |
| MILL B | | STOP | ROTATION |
| FAN | | STOP | ROTATION |

STATE DISPLAY/SETTINGS

FIG. 251

| | | | |
|---|---|---|---|
| PROFILE | | P07 | |
| BEAN | A | ◇◇ | |
| | B | ■■ | |
| | C | □□ | |
| CONTAINER | | EXTRACTION | |
| POSTURE | | UP | DOWN |
| LID | | OPEN | CLOSE |
| RETAINER | | RELEASE | FIX |
| PROBE A | | RELEASE | CONNECT |
| PROBE B | | RELEASE | CONNECT |
| INNER LID A | | CLOSE | OPEN |
| INNER LID B | | CLOSE | OPEN |
| HOT WATER SUPPLY VALVE | | CLOSE | OPEN |
| PRESSURIZATION VALVE | | CLOSE | OPEN |
| PRESSURE REDUCING VALVE | | CLOSE | OPEN |
| WATER SUPPLY VALVE | | CLOSE | OPEN |
| OUTLET VALUE | | DISCHARGE | SEND |
| BEAN A | | STOP | SEND |
| BEAN B | | STOP | SEND |
| BEAN C | | STOP | SEND |
| MILL A | | STOP | ROTATION |
| MILL B | | STOP | ROTATION |
| FAN | | STOP | ROTATION |

STATE DISPLAY/SETTINGS

FIG. 253

| | | | |
|---|---|---|---|
| PROFILE | | P07 | |
| BEAN | A | ◇◇ | |
| | B | ■■ | |
| | C | □□ | |
| CONTAINER | | EXTRACTION | |
| POSTURE | | UP | DOWN |
| LID | | OPEN | CLOSE |
| RETAINER | | RELEASE | FIX |
| PROBE A | | RELEASE | CONNECT |
| PROBE B | | RELEASE | CONNECT |
| INNER LID A | | CLOSE | OPEN |
| INNER LID B | | CLOSE | OPEN |
| HOT WATER SUPPLY VALVE | | CLOSE | OPEN |
| PRESSURIZATION VALVE | | CLOSE | OPEN |
| PRESSURE REDUCING VALVE | | CLOSE | OPEN |
| WATER SUPPLY VALVE | | CLOSE | OPEN |
| OUTLET VALUE | | DISCHARGE | SEND |
| BEAN A | | STOP | SEND |
| BEAN B | | STOP | SEND |
| BEAN C | | STOP | SEND |
| MILL A | | STOP | ROTATION |
| MILL B | | STOP | ROTATION |
| FAN | | STOP | ROTATION |

STATE DISPLAY/SETTINGS

FIG. 259

| | | | |
|---|---|---|---|
| PROFILE | | P07 | |
| BEAN | A | ◇◇ | |
| | B | ■■ | |
| | C | □□ | |
| CONTAINER | | EXTRACTION | MILL |
| POSTURE | | UP | DOWN |
| LID | | OPEN | CLOSE |
| RETAINER | | RELEASE | FIX |
| PROBE A | | RELEASE | CONNECT |
| PROBE B | | RELEASE | CONNECT |
| INNER LID A | | CLOSE | OPEN |
| INNER LID B | | CLOSE | OPEN |
| HOT WATER SUPPLY VALVE | | CLOSE | OPEN |
| PRESSURIZATION VALVE | | CLOSE | OPEN |
| PRESSURE REDUCING VALVE | | CLOSE | OPEN |
| WATER SUPPLY VALVE | | CLOSE | OPEN |
| OUTLET VALUE | | DISCHARGE | SEND |
| BEAN A | | STOP | SEND |
| BEAN B | | STOP | SEND |
| BEAN C | | STOP | SEND |
| MILL A | | STOP | ROTATION |
| MILL B | | STOP | ROTATION |
| FAN | | STOP | ROTATION |

STATE DISPLAY/SETTINGS

FIG. 261

| | | | |
|---|---|---|---|
| PROFILE | | P07 | |
| BEAN | A | ◇◇ | |
| | B | ■■ | |
| | C | □□ | |
| CONTAINER | | EXTRACTION | MILL |
| POSTURE | | UP | DOWN |
| LID | | OPEN | CLOSE |
| RETAINER | | RELEASE | FIX |
| PROBE A | | RELEASE | CONNECT |
| PROBE B | | RELEASE | CONNECT |
| INNER LID A | | CLOSE | OPEN |
| INNER LID B | | CLOSE | OPEN |
| HOT WATER SUPPLY VALVE | | CLOSE | OPEN |
| PRESSURIZATION VALVE | | CLOSE | OPEN |
| PRESSURE REDUCING VALVE | | CLOSE | OPEN |
| WATER SUPPLY VALVE | | CLOSE | OPEN |
| OUTLET VALUE | | DISCHARGE | SEND |
| BEAN A | | STOP | SEND |
| BEAN B | | STOP | SEND |
| BEAN C | | STOP | SEND |
| MILL A | | STOP | ROTATION |
| MILL B | | STOP | ROTATION |
| FAN | | STOP | ROTATION |

STATE DISPLAY/SETTINGS

FIG. 263

| | | | |
|---|---|---|---|
| PROFILE | | P07 | |
| BEAN | A | ◇◇ | |
| | B | ■■ | |
| | C | □□ | |
| CONTAINER | | EXTRACTION | MILL |
| POSTURE | | UP | DOWN |
| LID | | OPEN | CLOSE |
| RETAINER | | RELEASE | FIX |
| PROBE A | | RELEASE | CONNECT |
| PROBE B | | RELEASE | CONNECT |
| INNER LID A | | CLOSE | OPEN |
| INNER LID B | | CLOSE | OPEN |
| HOT WATER SUPPLY VALVE | | CLOSE | OPEN |
| PRESSURIZATION VALVE | | CLOSE | OPEN |
| PRESSURE REDUCING VALVE | | CLOSE | OPEN |
| WATER SUPPLY VALVE | | CLOSE | OPEN |
| OUTLET VALUE | | DISCHARGE | SEND |
| BEAN A | | STOP | SEND |
| BEAN B | | STOP | SEND |
| BEAN C | | STOP | SEND |
| MILL A | | STOP | ROTATION |
| MILL B | | STOP | ROTATION |
| FAN | | STOP | ROTATION |

BEVERAGE PRODUCING APPARATUS

CROSS-REFERENCE TO RELATED APPLICATION(S)

This application is a continuation of International Patent Application No. PCT/JP2018/028916 filed on Aug. 1, 2018, which claims priority to and the benefit of Japanese Patent Application No. 2017-152703 filed on Aug. 7, 2017, the entire disclosures of which are incorporated herein by reference.

BACKGROUND OF THE INVENTION

Field of the Invention

The present invention relates to a producing technique for a beverage.

Description of the Related Art

There have been proposed beverage producing apparatuses for producing a coffee beverage or the like (for example, Japanese Patent Laid Open No. 05-081544, Japanese Patent Laid Open No. 2003-024703, and Japanese Patent Laid Open No. 2013-66697).

Some beverages (for example, a coffee beverage) are beverages of high palatability, and differences in the taste and aroma influence the evaluation. Automation of beverage production is advantageous from the viewpoint of mass production. However, it is difficult to provide a beverage unique to a store or the like, which provides the beverage producing apparatus.

SUMMARY OF THE INVENTION

It is an object of the present invention to provide a beverage producing apparatus capable of producing a beverage matching the taste of a user.

According to an aspect of the present invention, there is provided a beverage producing apparatus configured to produce a beverage (for example, a coffee beverage) using an extraction target (for example, roasted coffee beans) as a raw material, comprising: a housing configured to form an exterior of the beverage producing apparatus; a control unit configured to control each producing operation of the beverage producing apparatus; and an operation unit configured to accept an operation of an operator wherein the housing includes a transmissive portion configured to make an interior of the housing visible from an outside, the control unit can control each producing operation in an automatic mode or a manual mode, in the automatic mode, each producing operation is automatically controlled in accordance with a condition set in advance, and in the manual mode, each producing operation is controlled in accordance with an operation for the operation unit.

Further features of the present invention will become apparent from the following description of exemplary embodiments (with reference to the attached drawings).

BRIEF DESCRIPTION OF THE DRAWINGS

FIG. 10 is a perspective view of a driving unit and an extraction container;

FIG. 48 is a view showing other examples of a collective conveyance path and the like;

FIG. 49 is a view showing other examples of the collective conveyance path and the like;

FIG. 50 is a view showing other examples of the collective conveyance path and the like;

FIG. 51 is a view showing other examples of the collective conveyance path and the like;

FIG. 52 is a view showing other examples of the collective conveyance path and the like;

FIG. 53 is a view showing other examples of the collective conveyance path and the like;

FIG. 54 is a view showing other examples of the collective conveyance path and the like;

FIG. 77 is a view showing an example of information stored in a storage unit;

FIG. 78 is a view showing an example of information stored in a storage unit;

FIG. 79 is a view showing an example of information stored in a storage unit;

FIG. 80 is a view showing an example of information stored in a storage unit;

FIG. 120 is a view showing an example of display on an operation unit;

FIG. 121 is a view showing an example of display on an operation unit;

FIG. 122 is a view showing an example of display on an operation unit;

FIG. 123 is a view showing an example of display on an operation unit;

FIG. 124 is a view showing an example of display on an operation unit;

FIG. 125 is a view showing an example of display on an operation unit;

FIG. 126 is a view showing an example of display on an operation unit;

FIG. 127 is a view showing an example of display on an operation unit;

FIG. 128 is a view showing an example of display on an operation unit;

FIG. 129 is a view showing an example of display on an operation unit;

FIG. 130 is a view showing an example of display on an operation unit;

FIG. 131 is a view showing an example of display on an operation unit;

Figure 132:
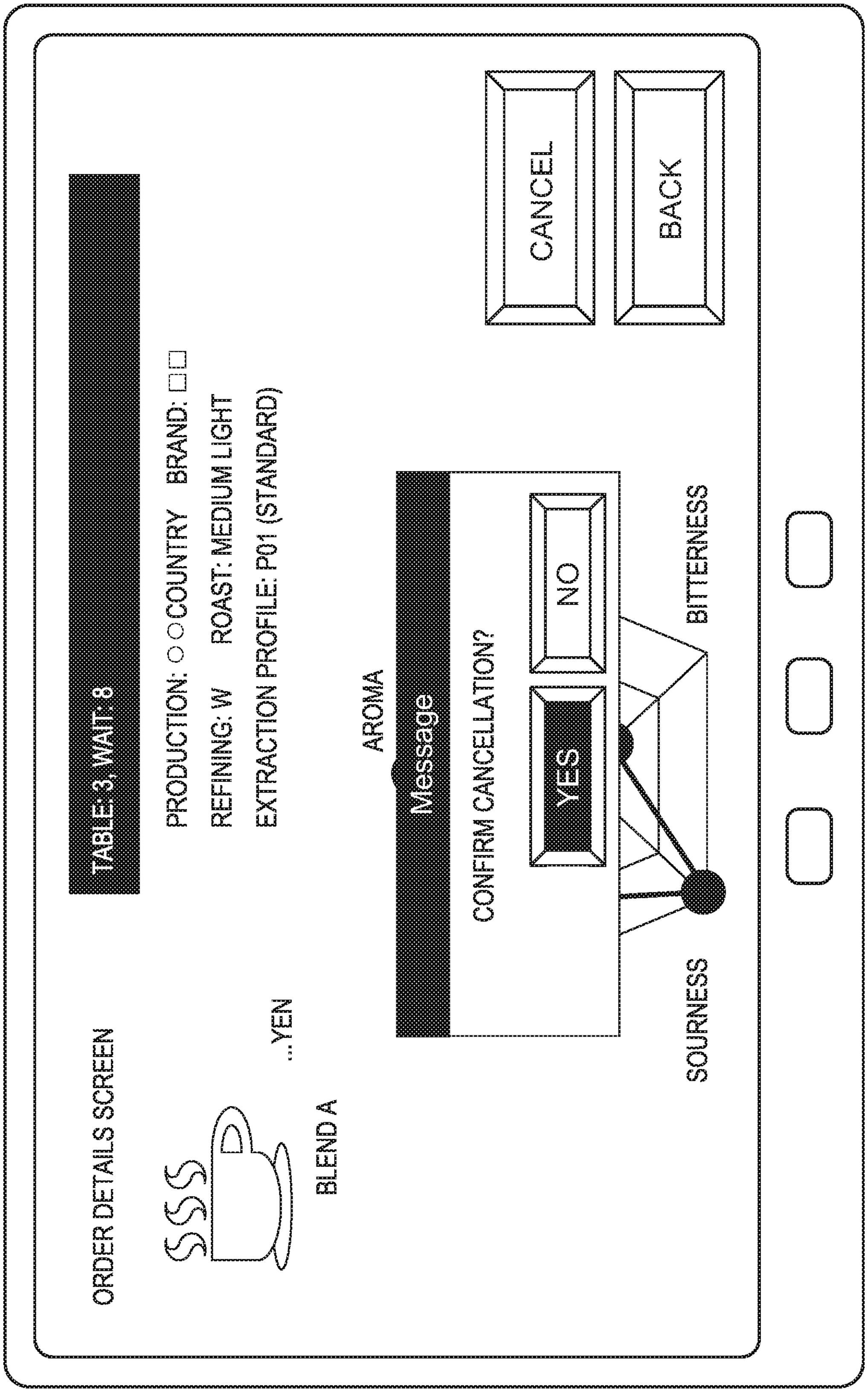
Figure 133:
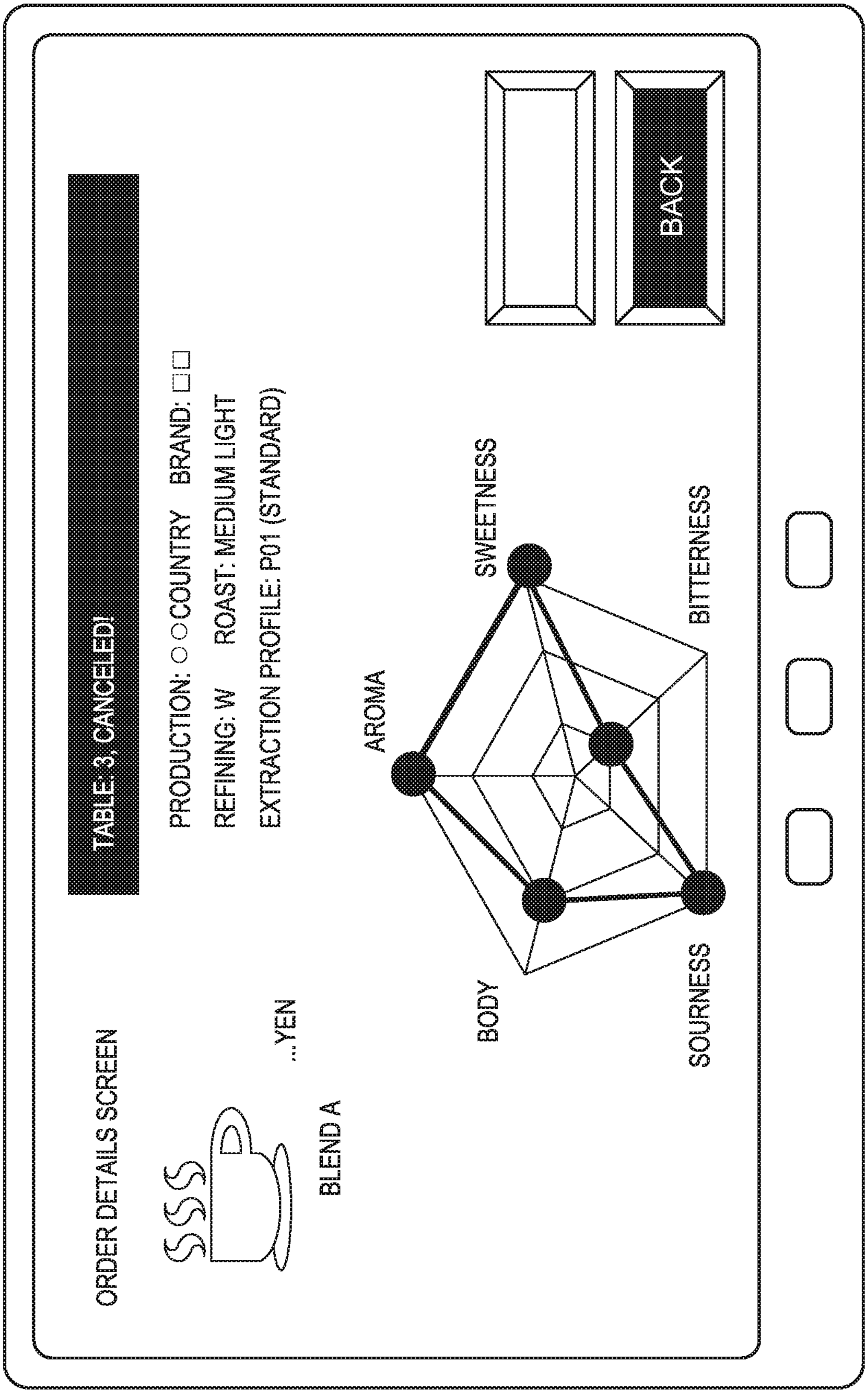
Figure 134:
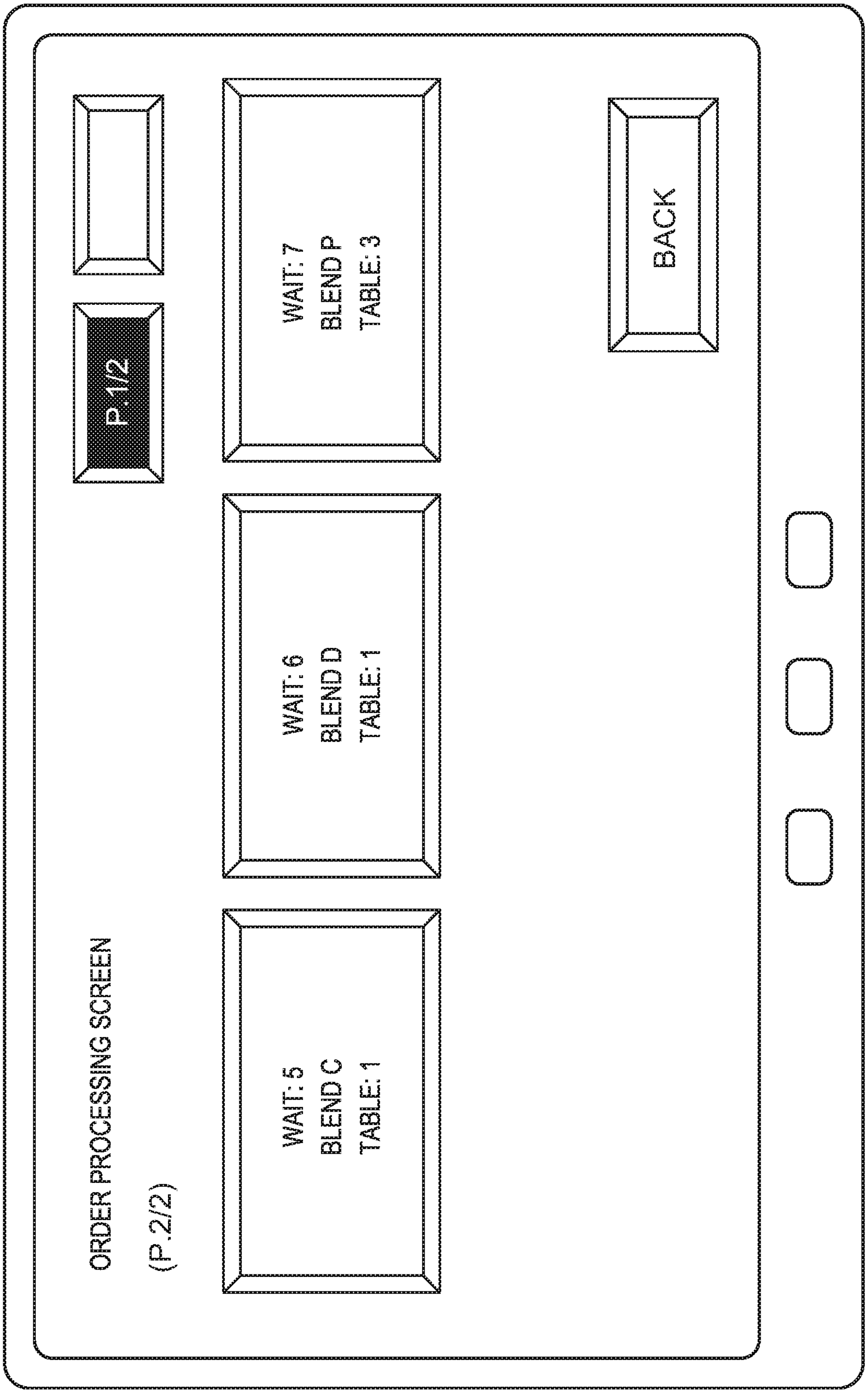
Figure 135:
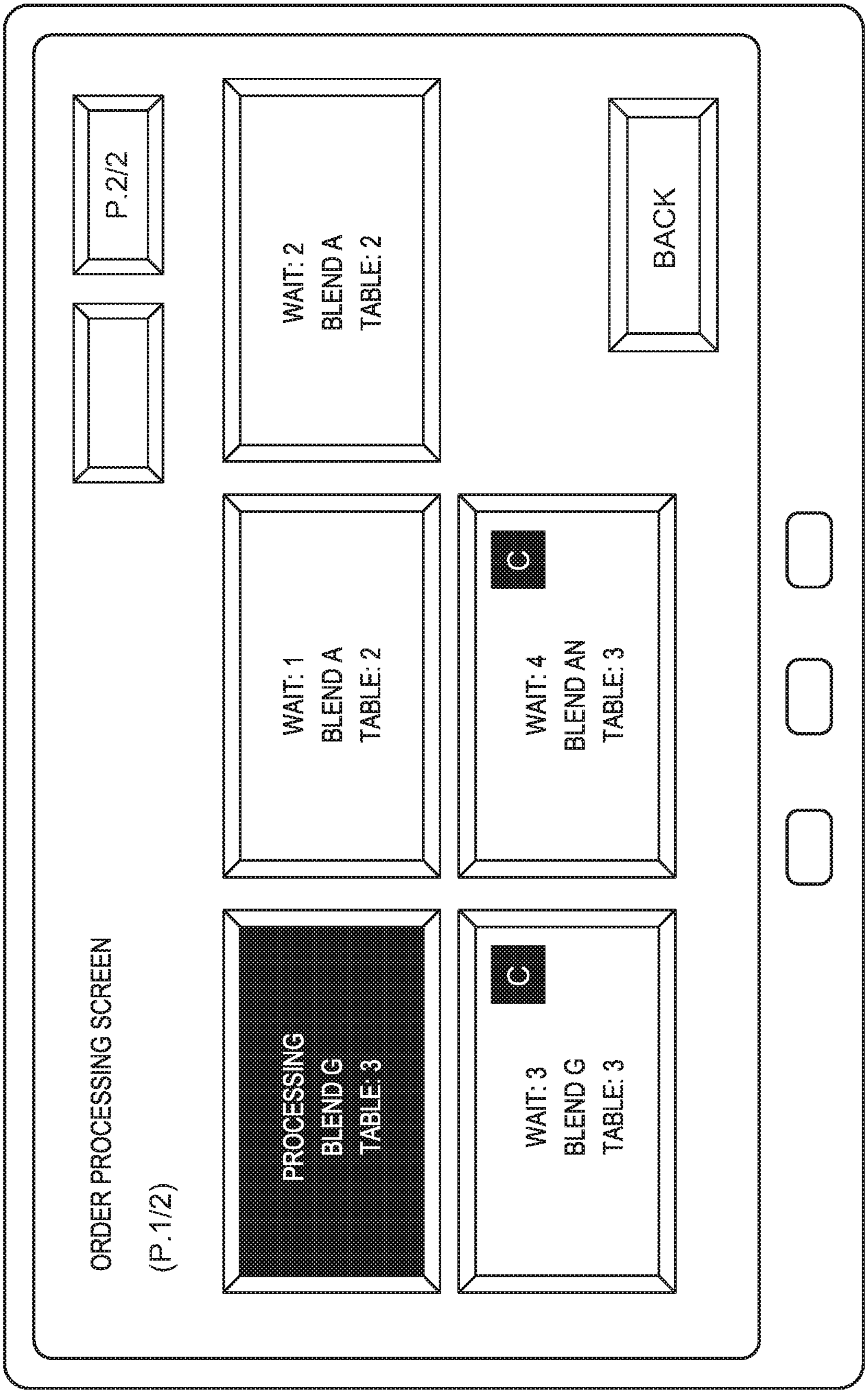
Figure 136:
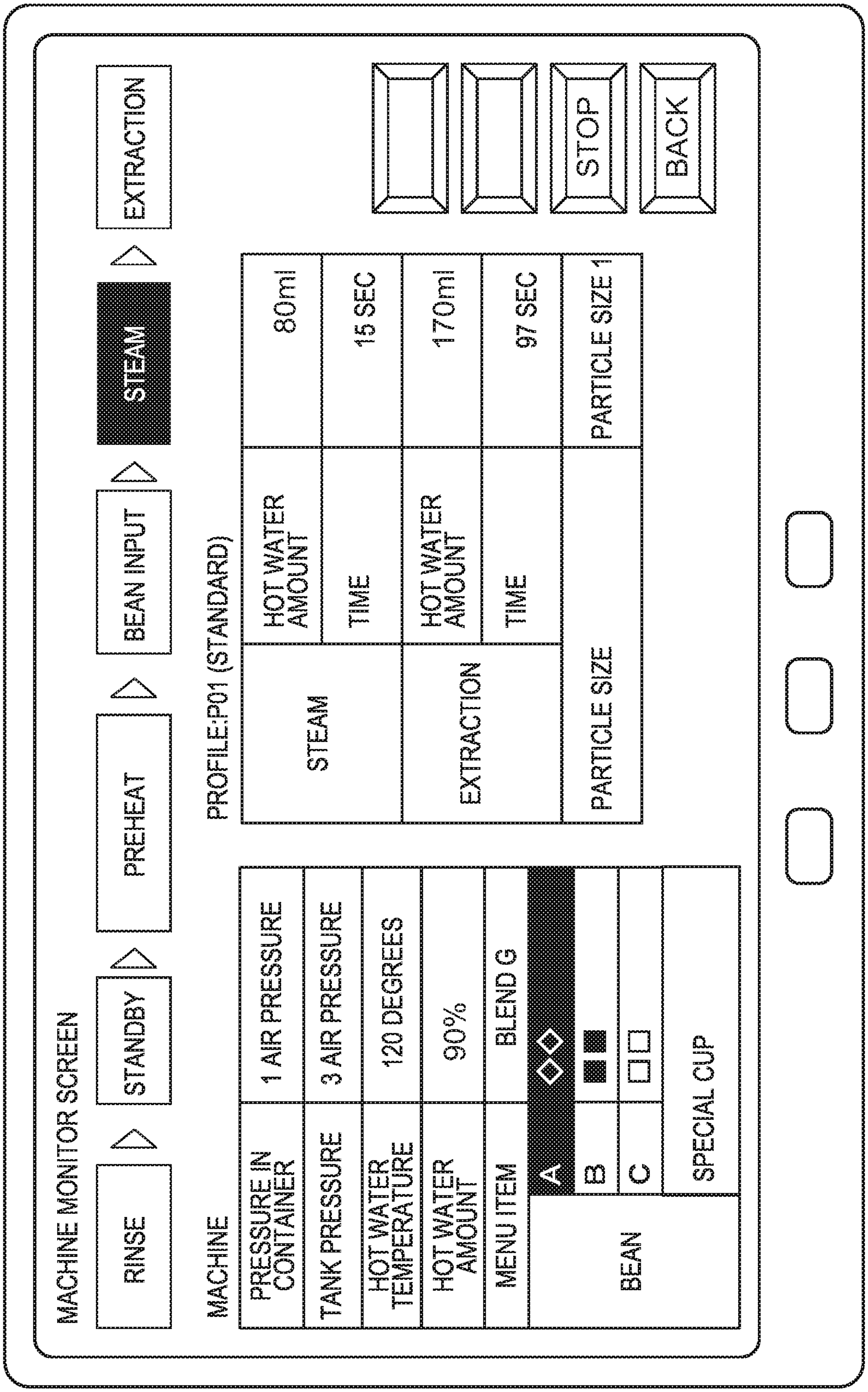
Figure 137:
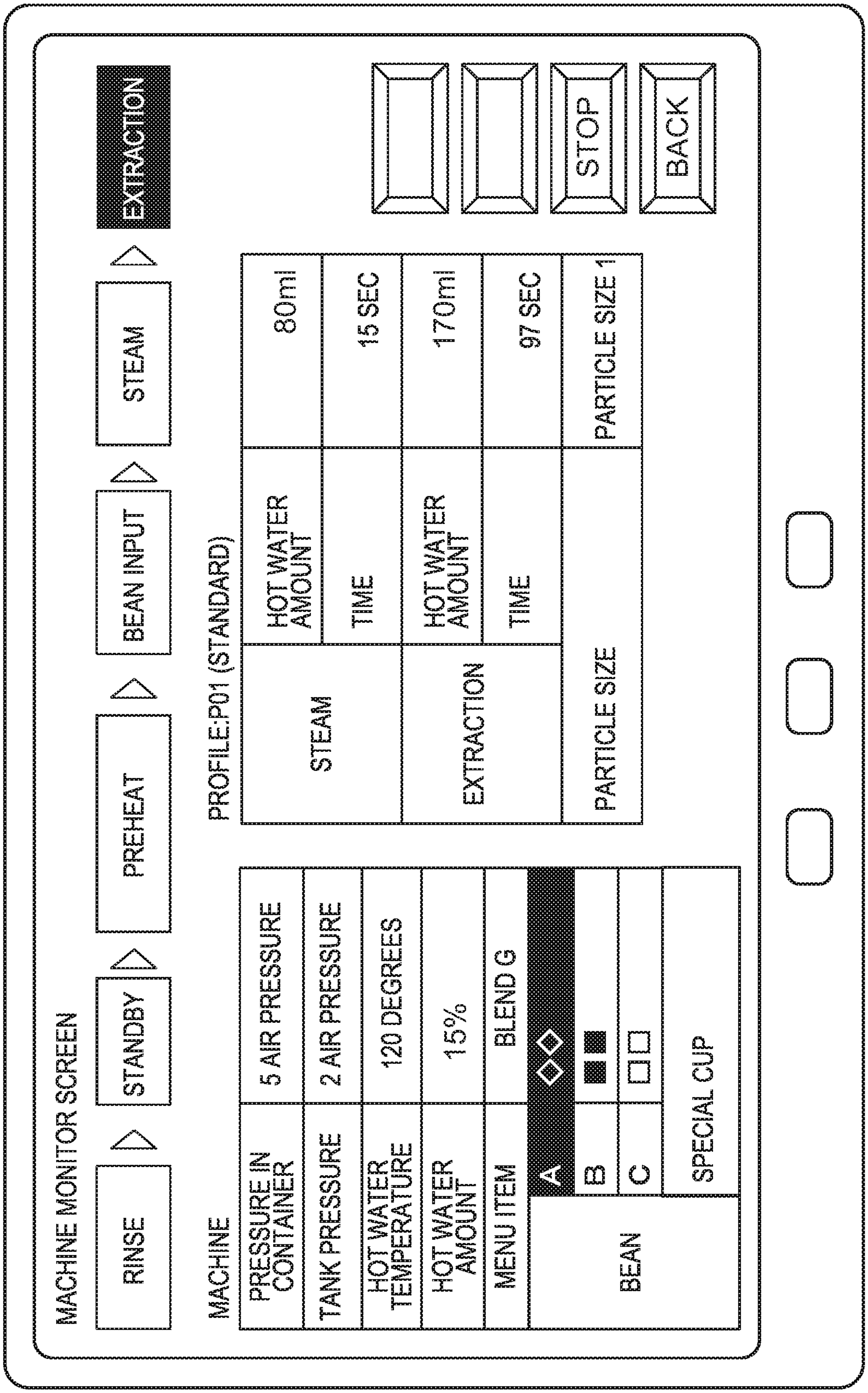
Figure 138:
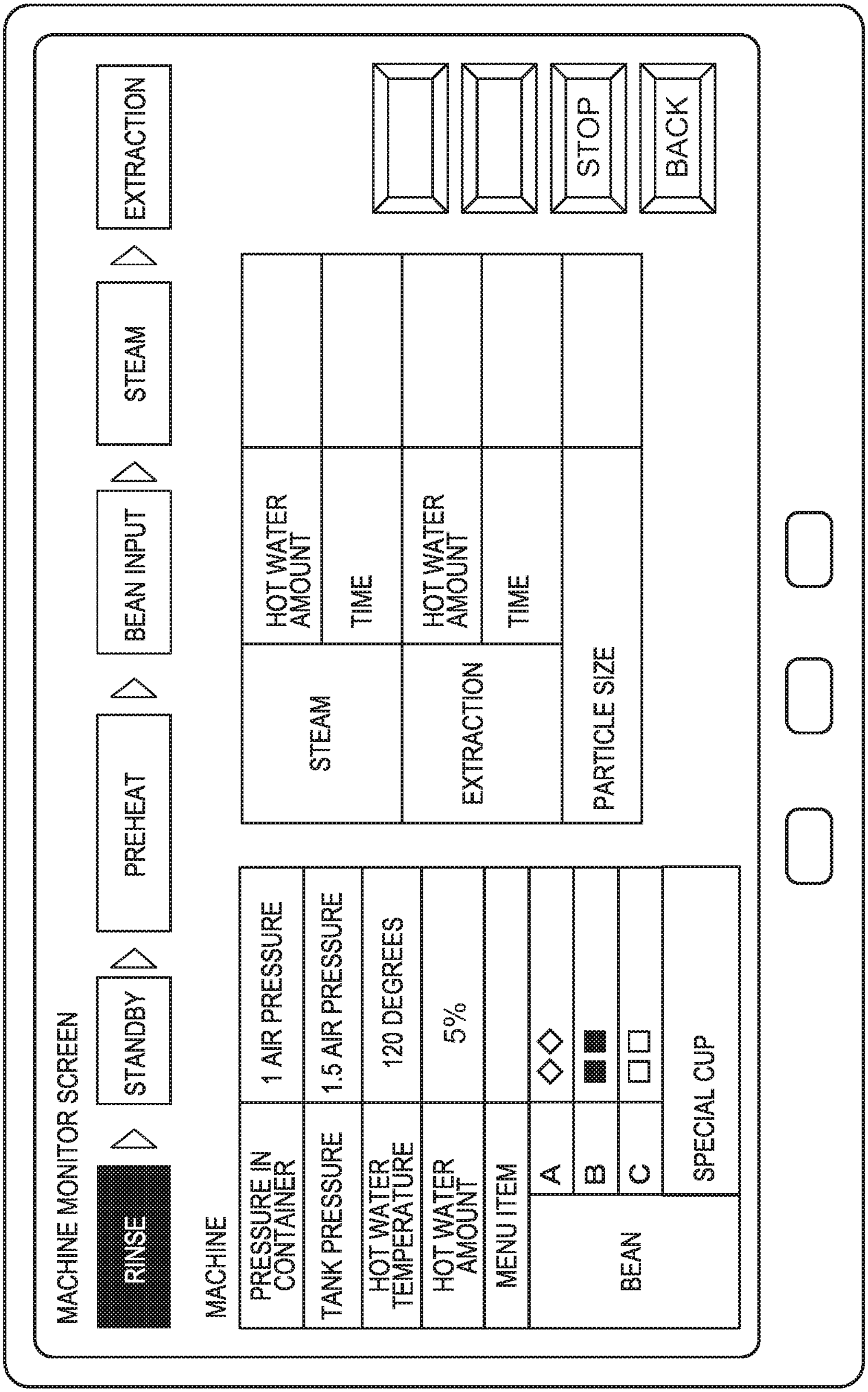
Figure 139:
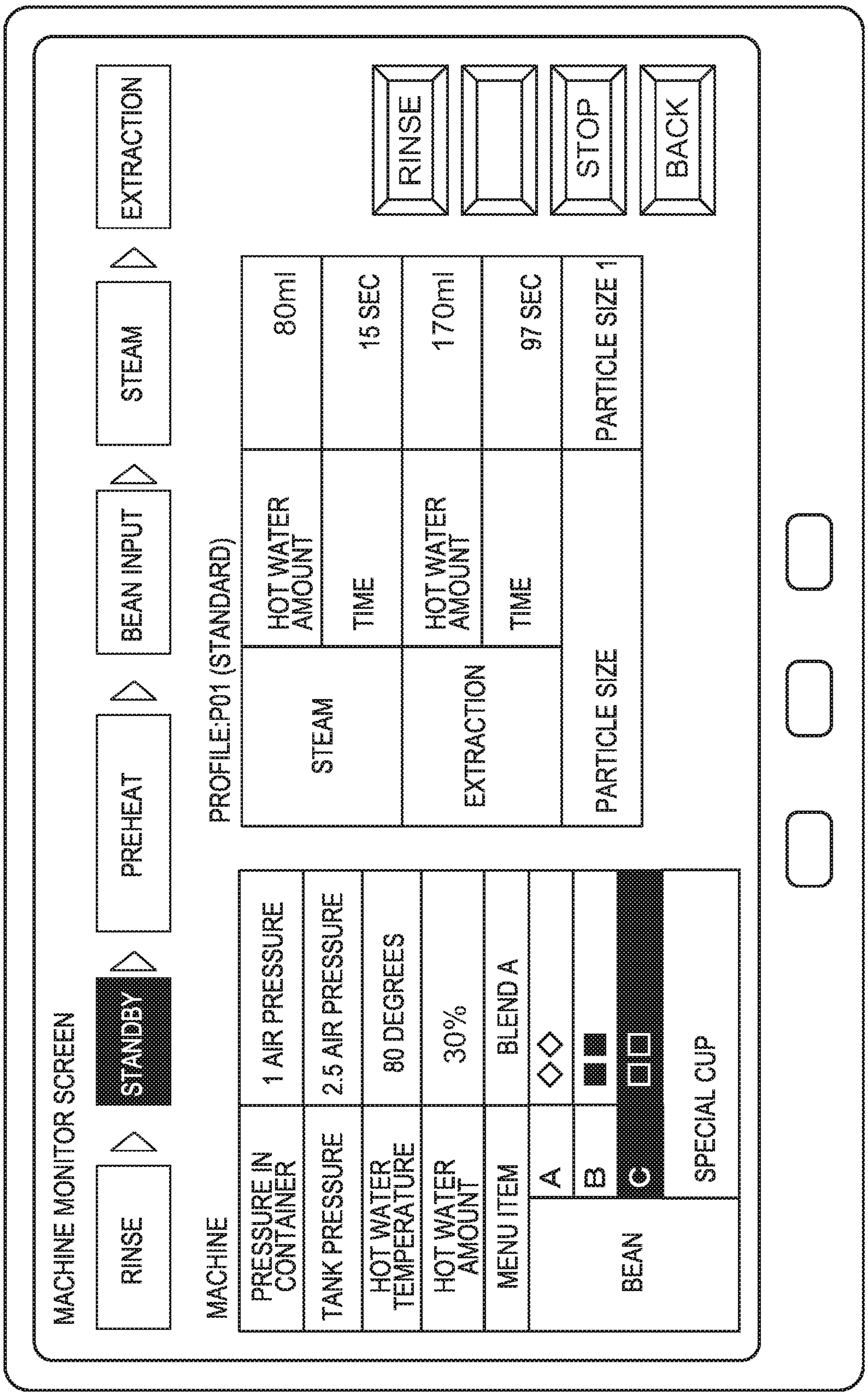
Figure 140:
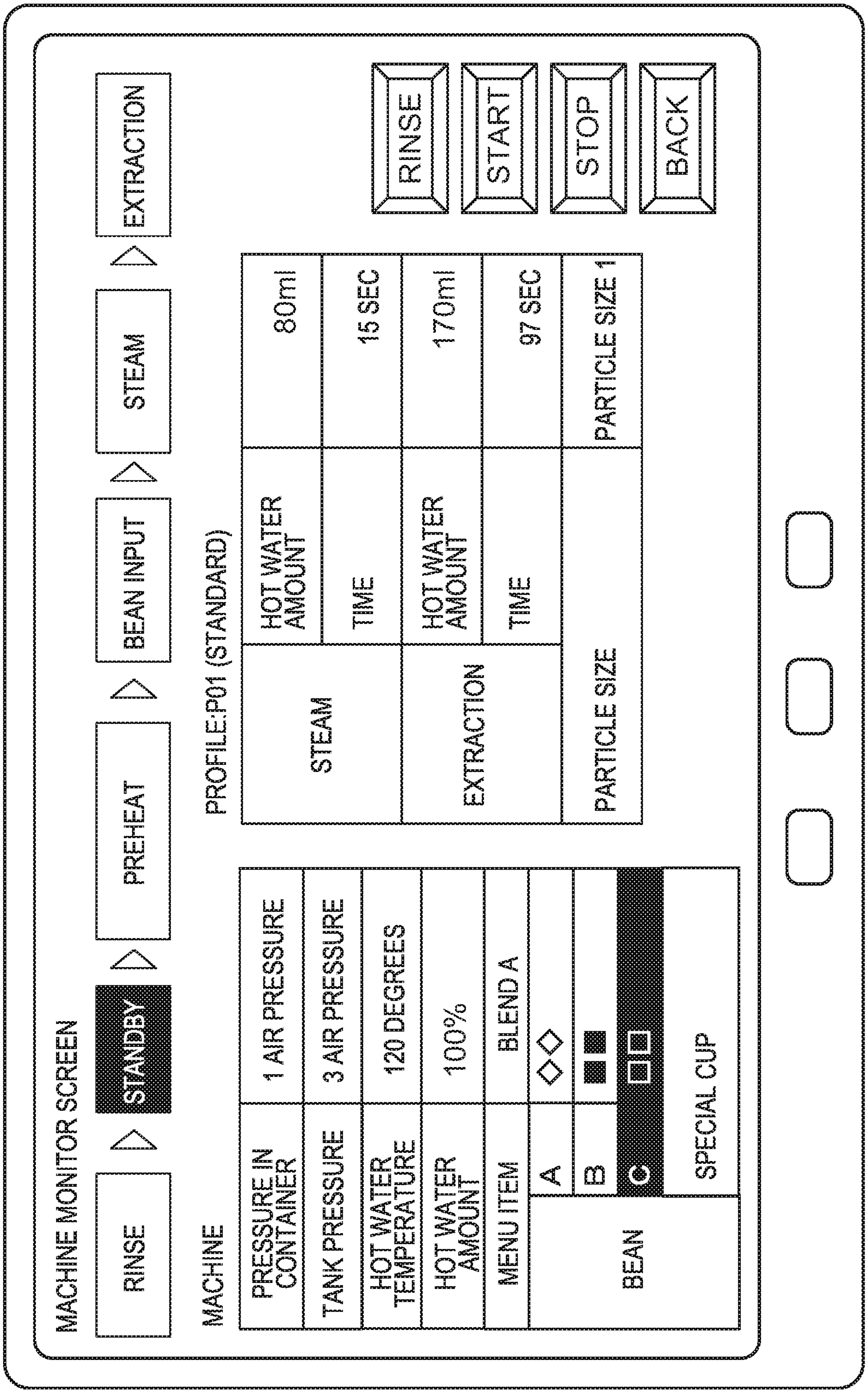
Figure 141:
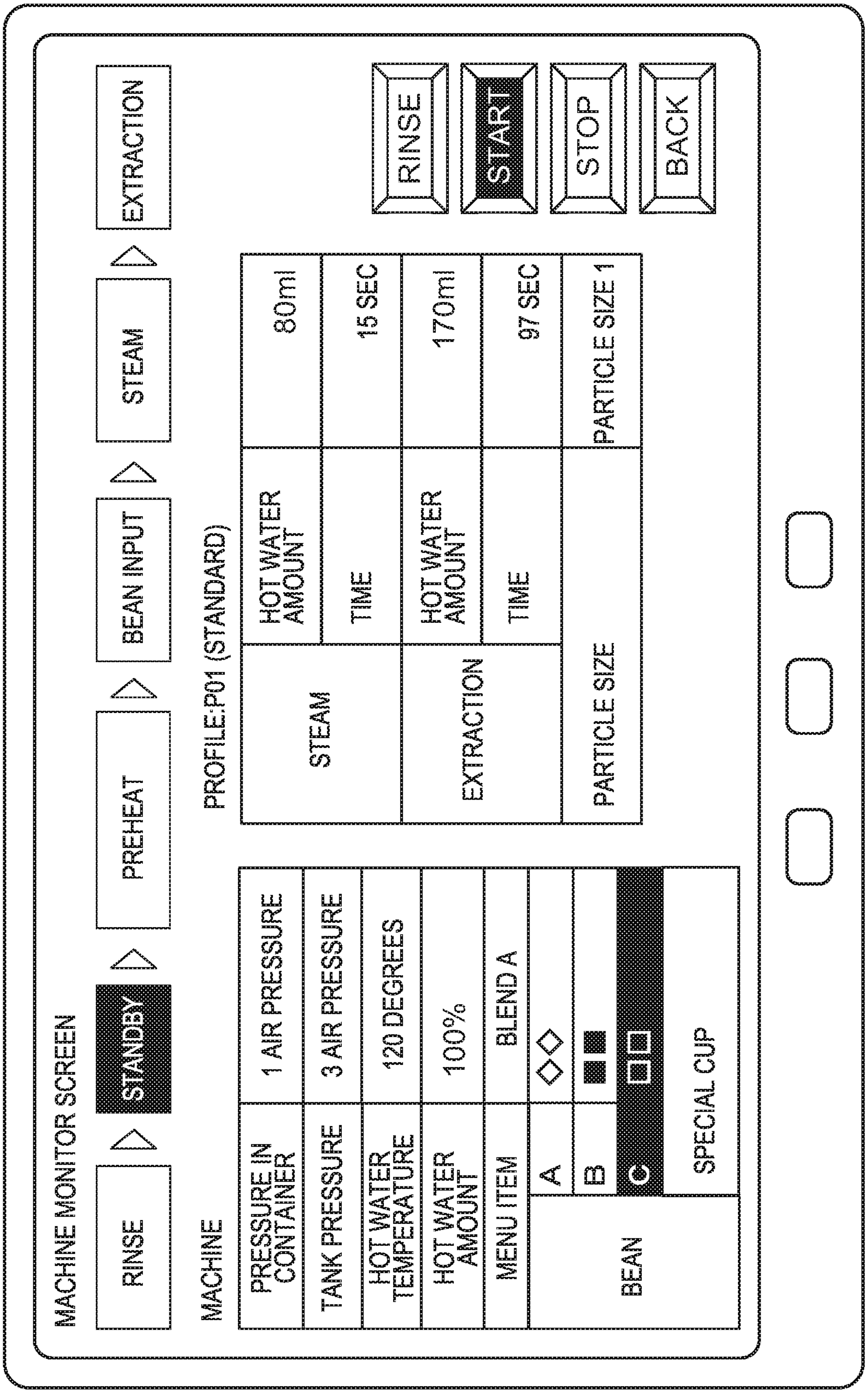
Figure 142:
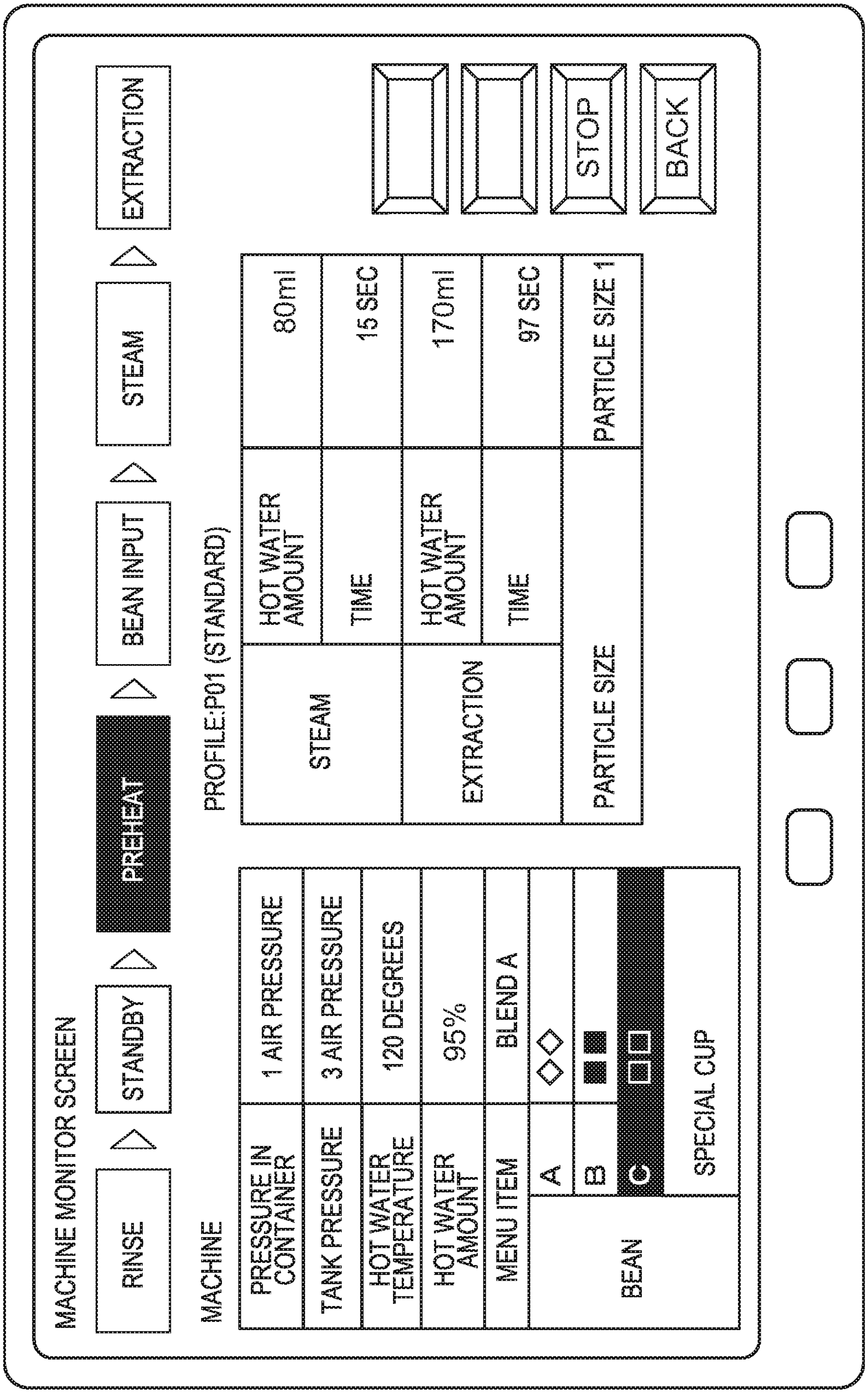
Figure 143:
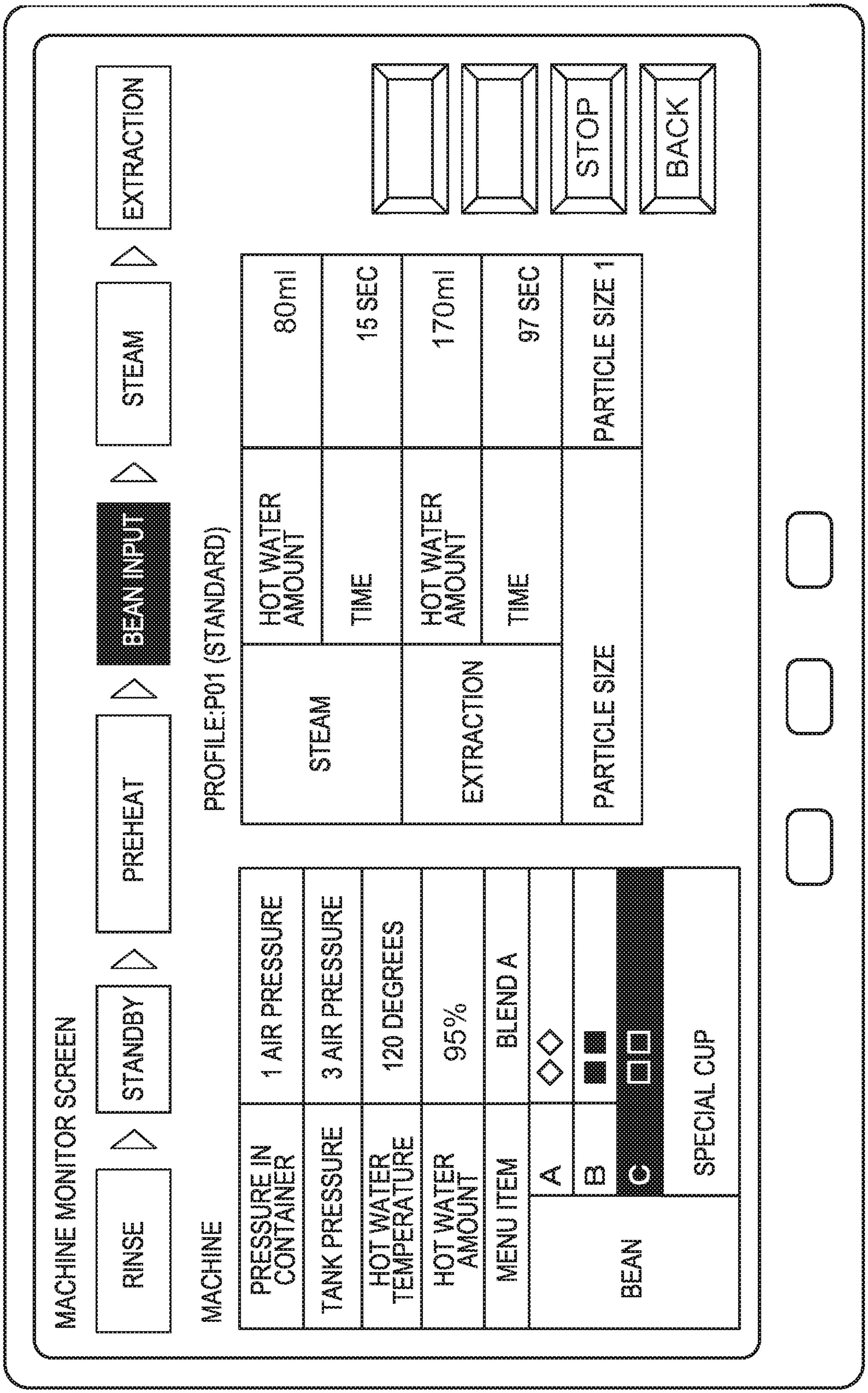
Figure 144:
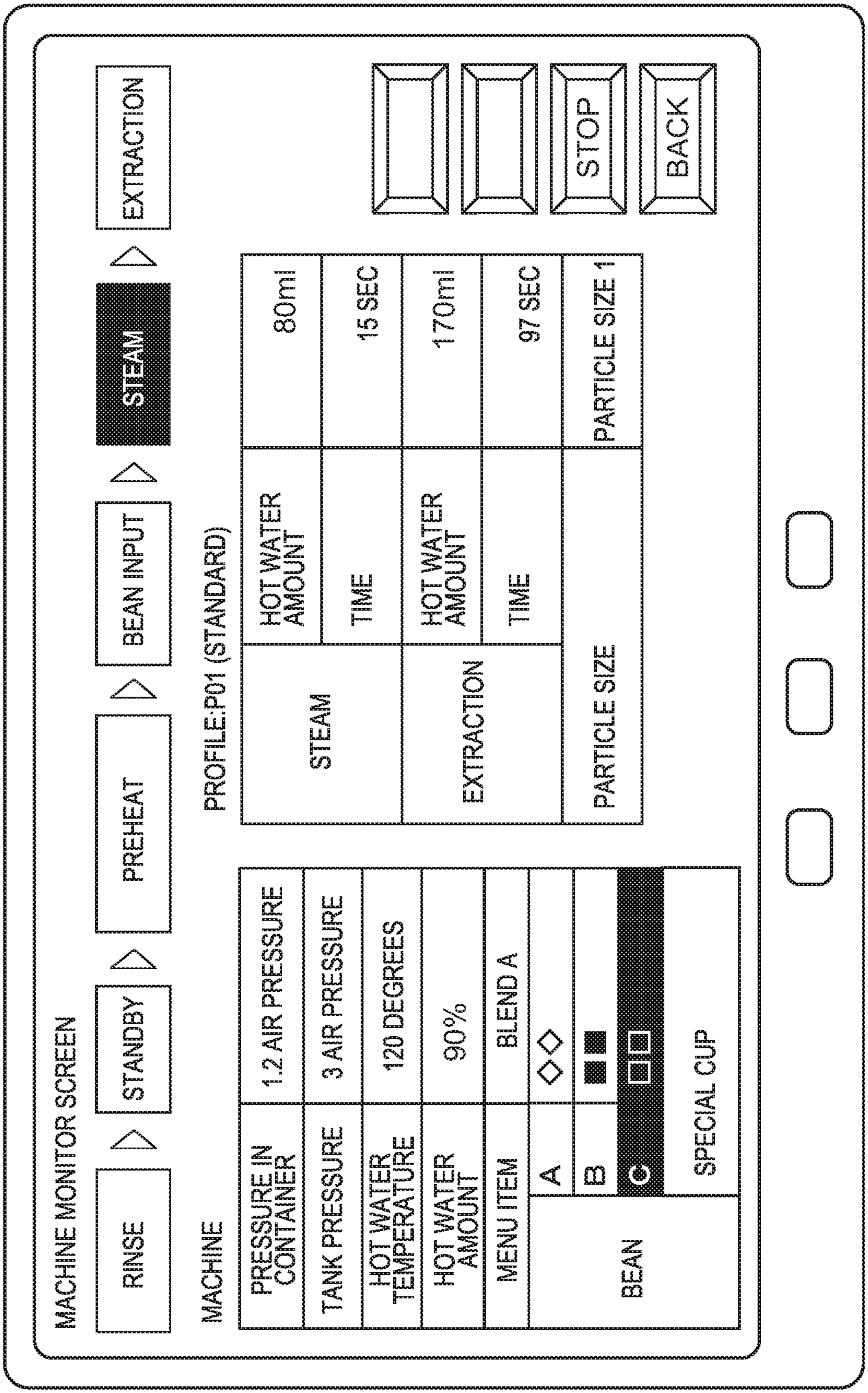
Figure 145:
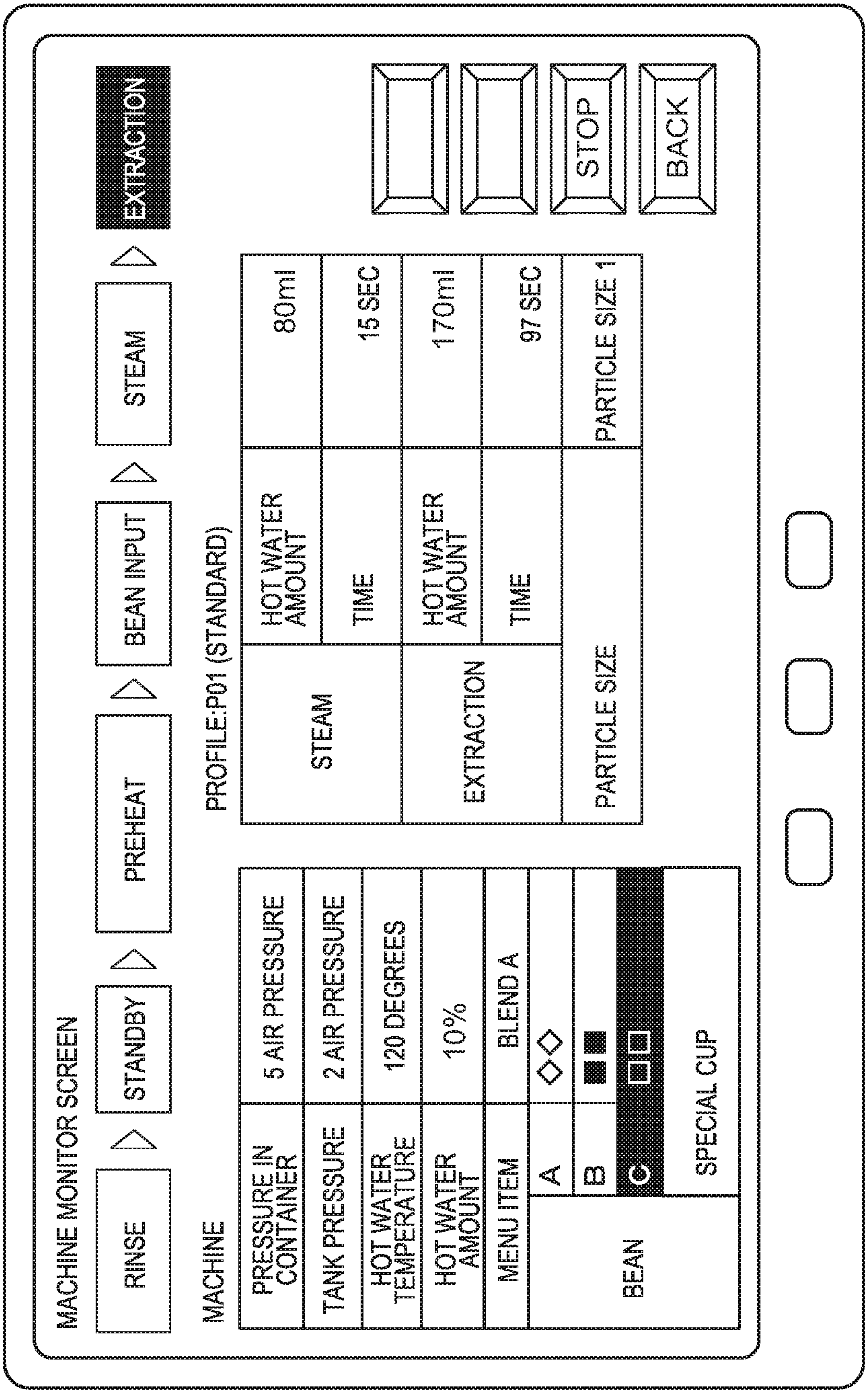
Figure 146:
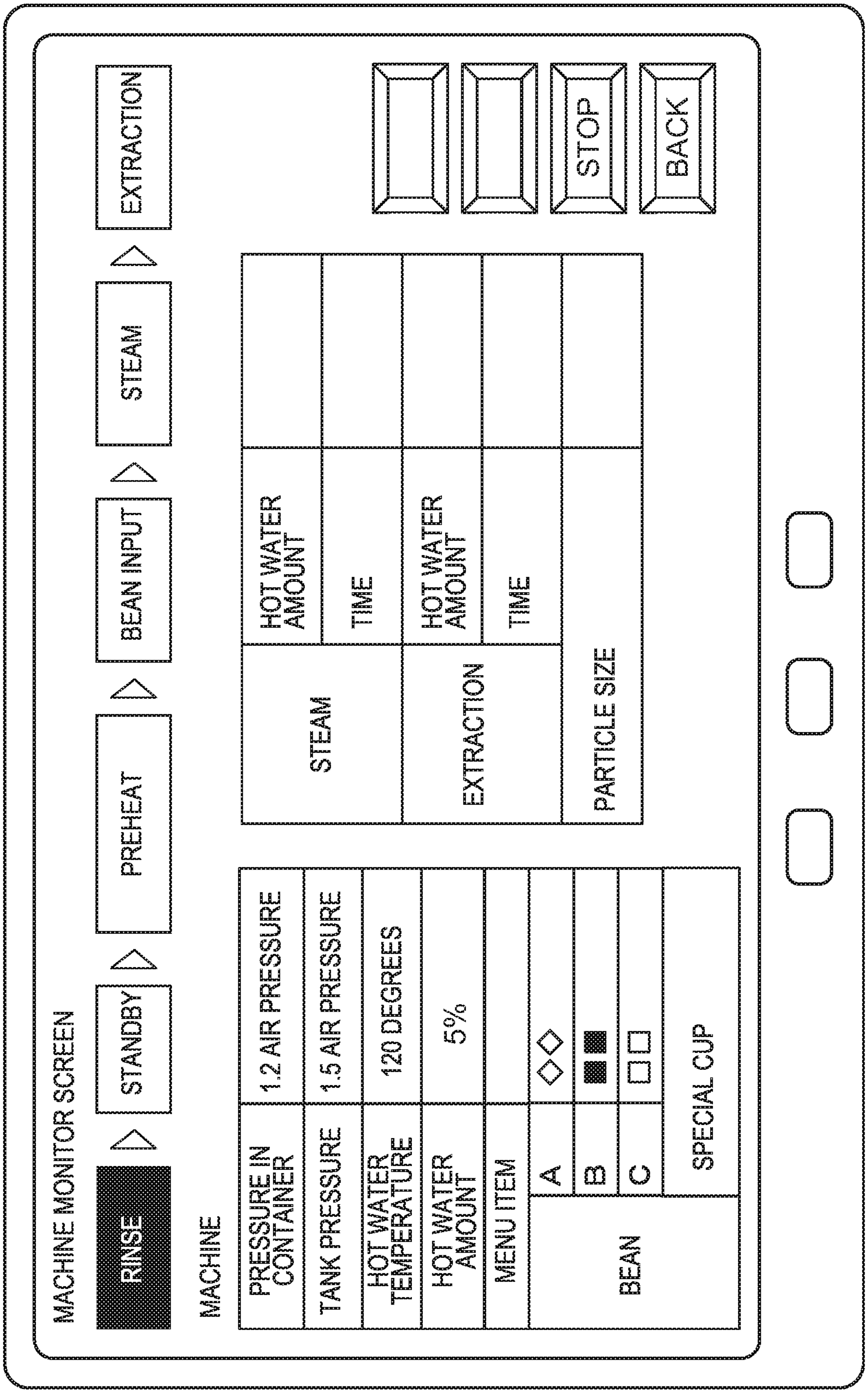
Figure 147:
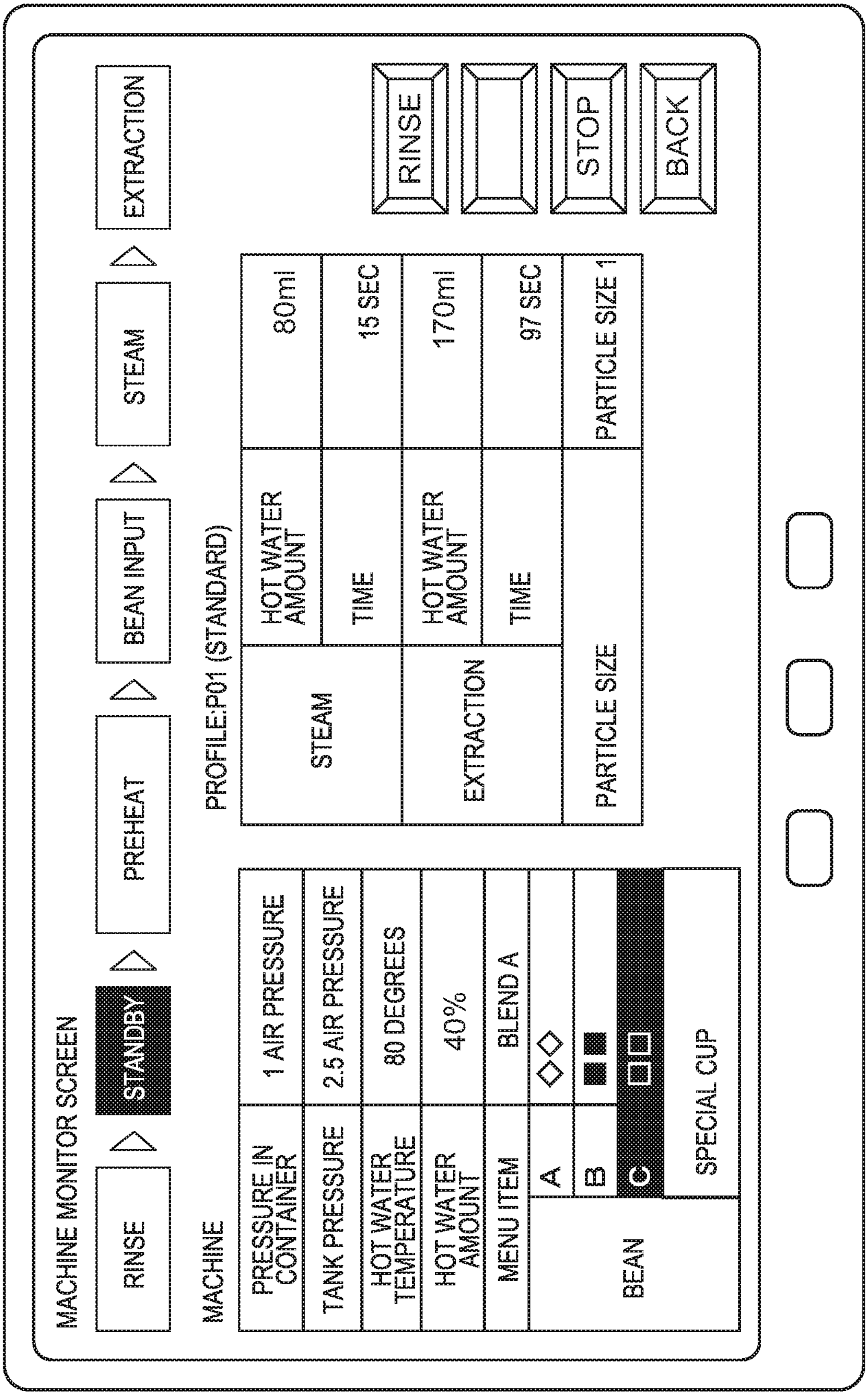
Figure 148:
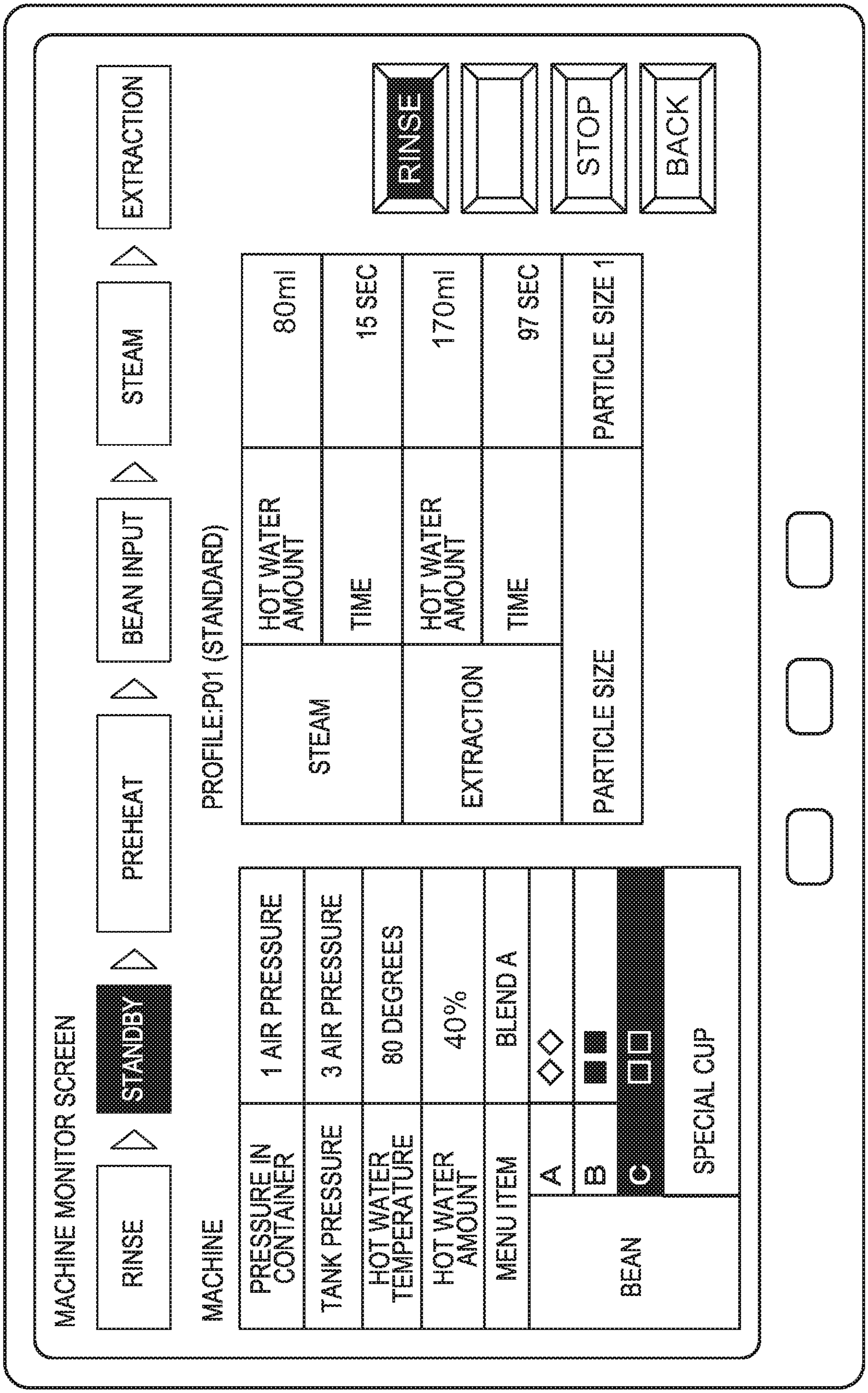
Figure 149:
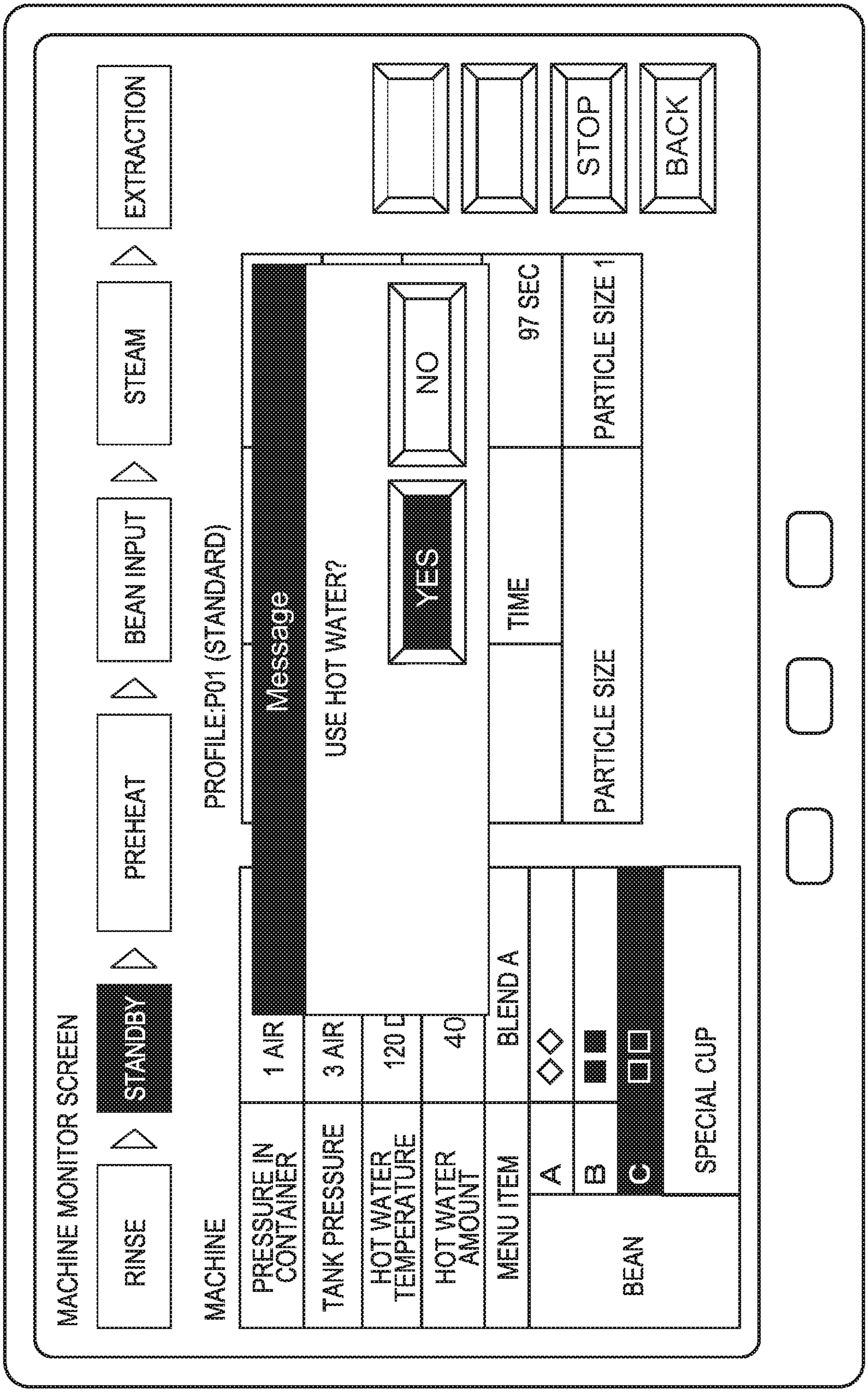
Figure 151:
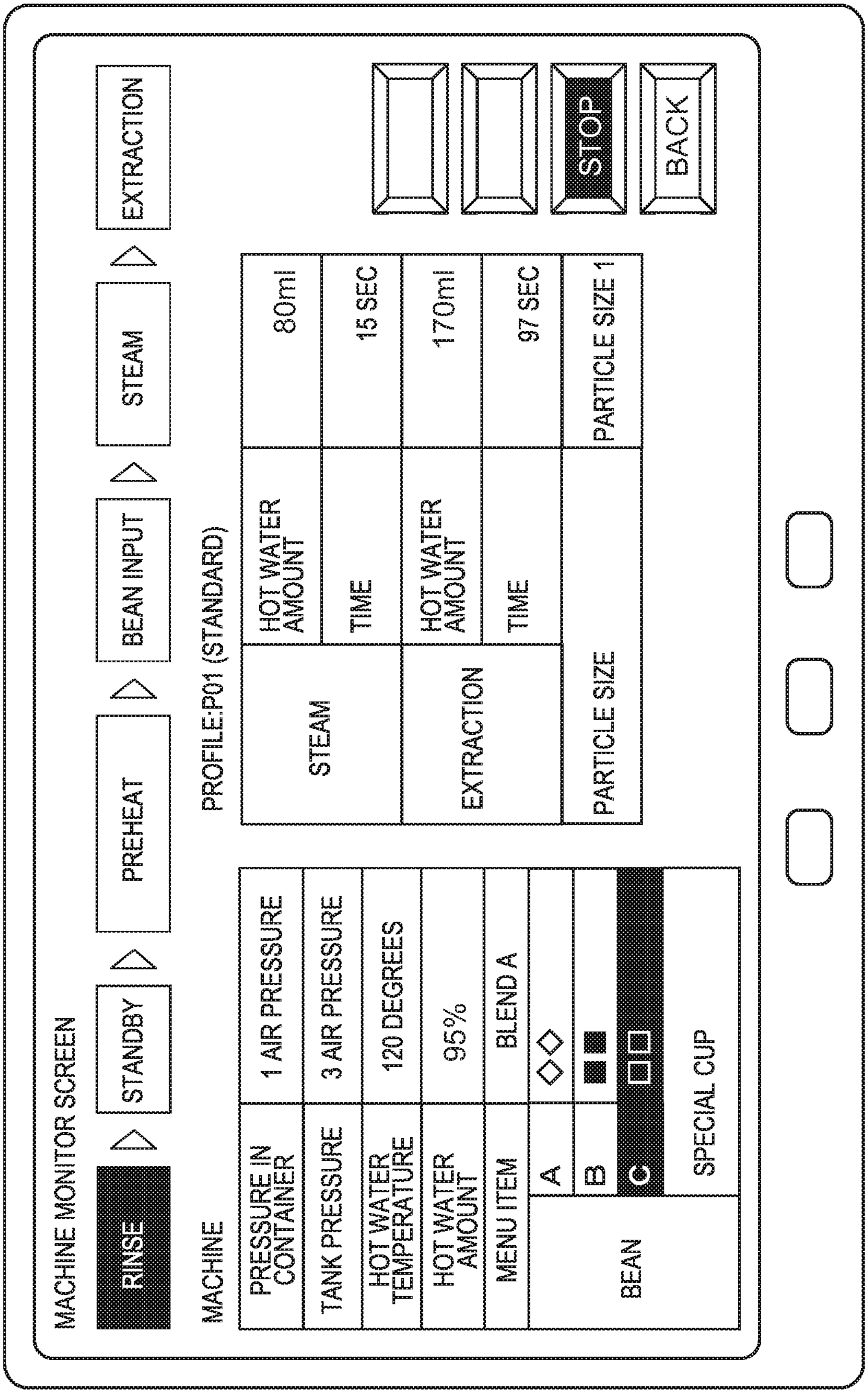
Figure 152:
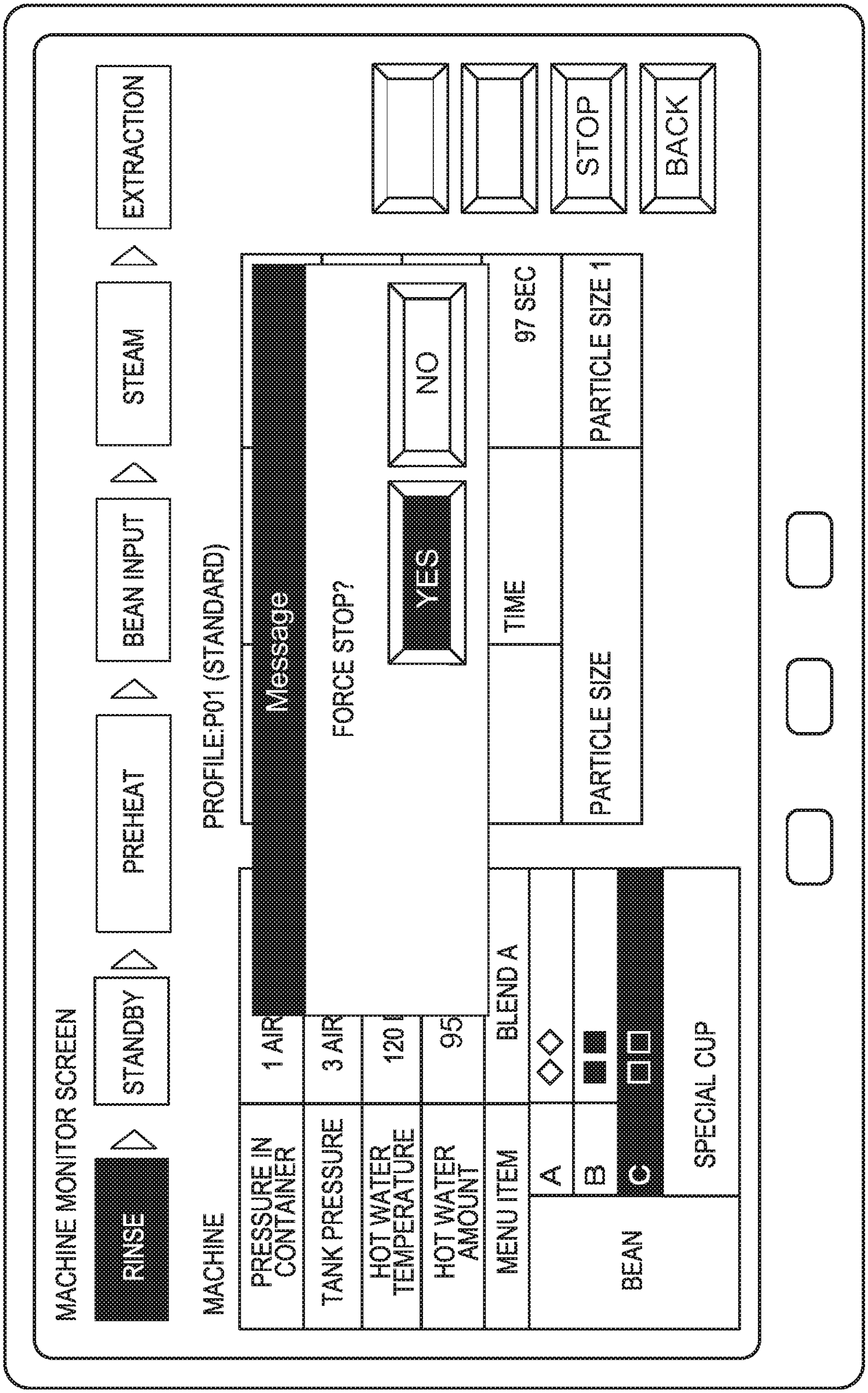
Figure 153:
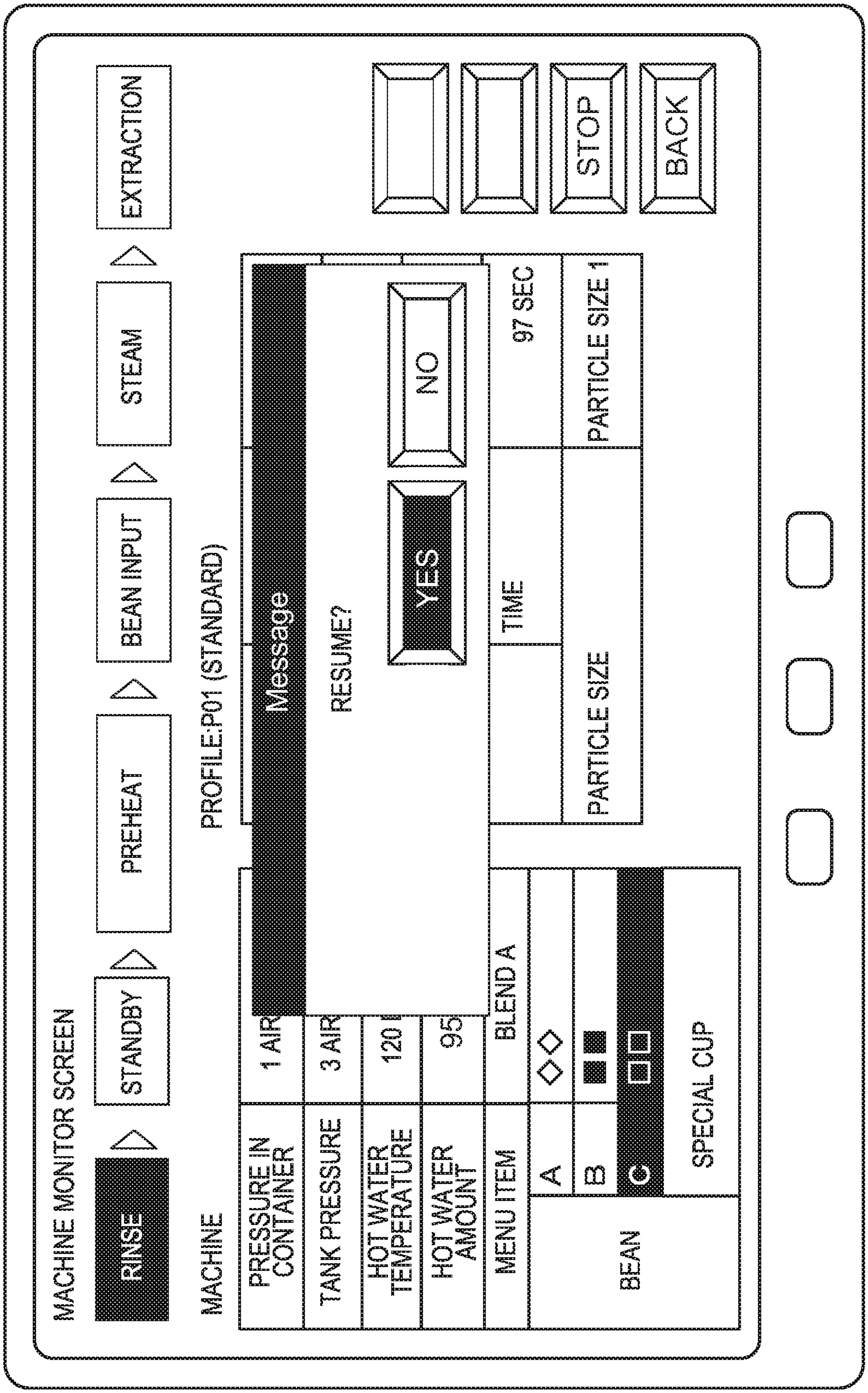
Figure 154:
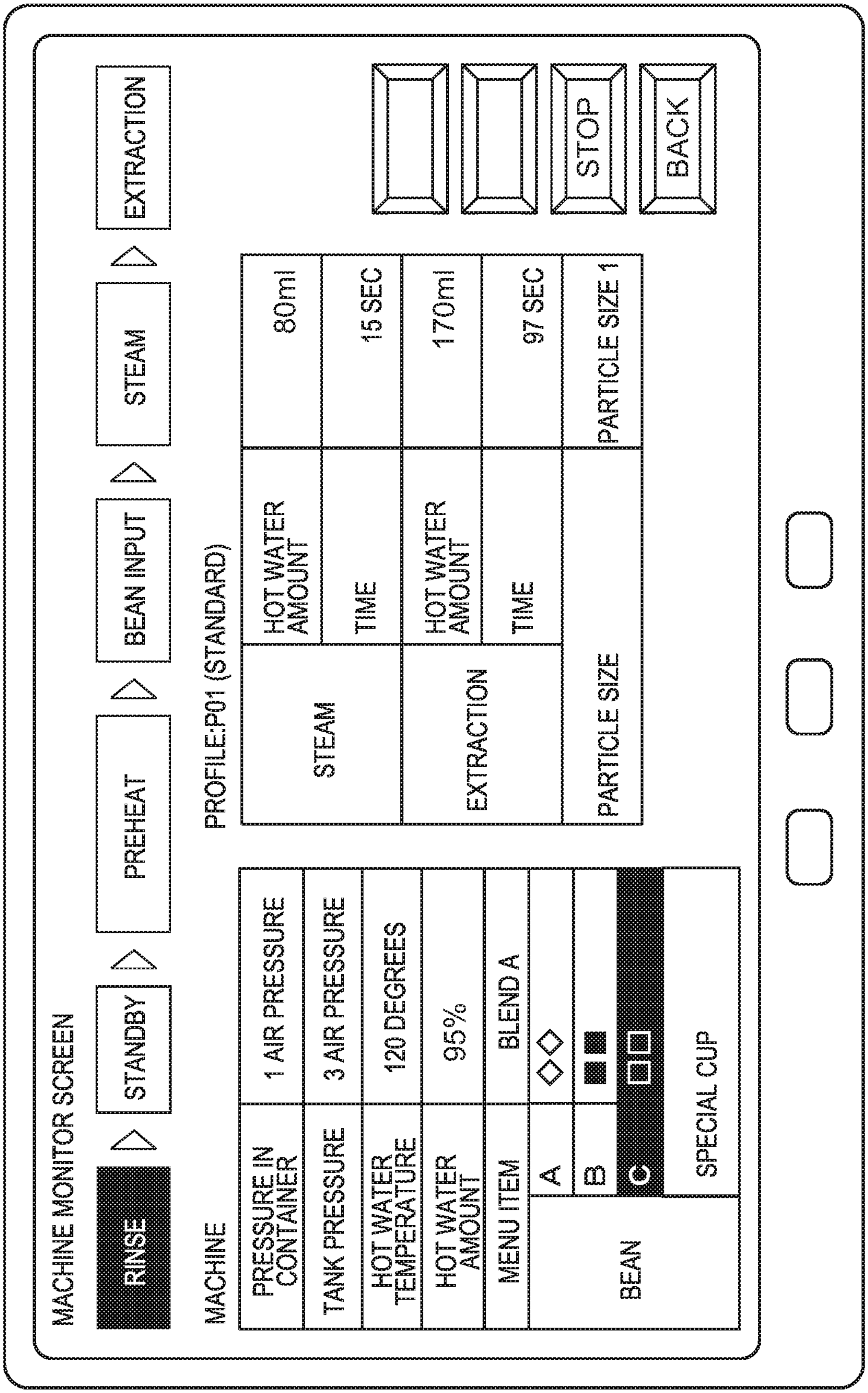
Figure 155:
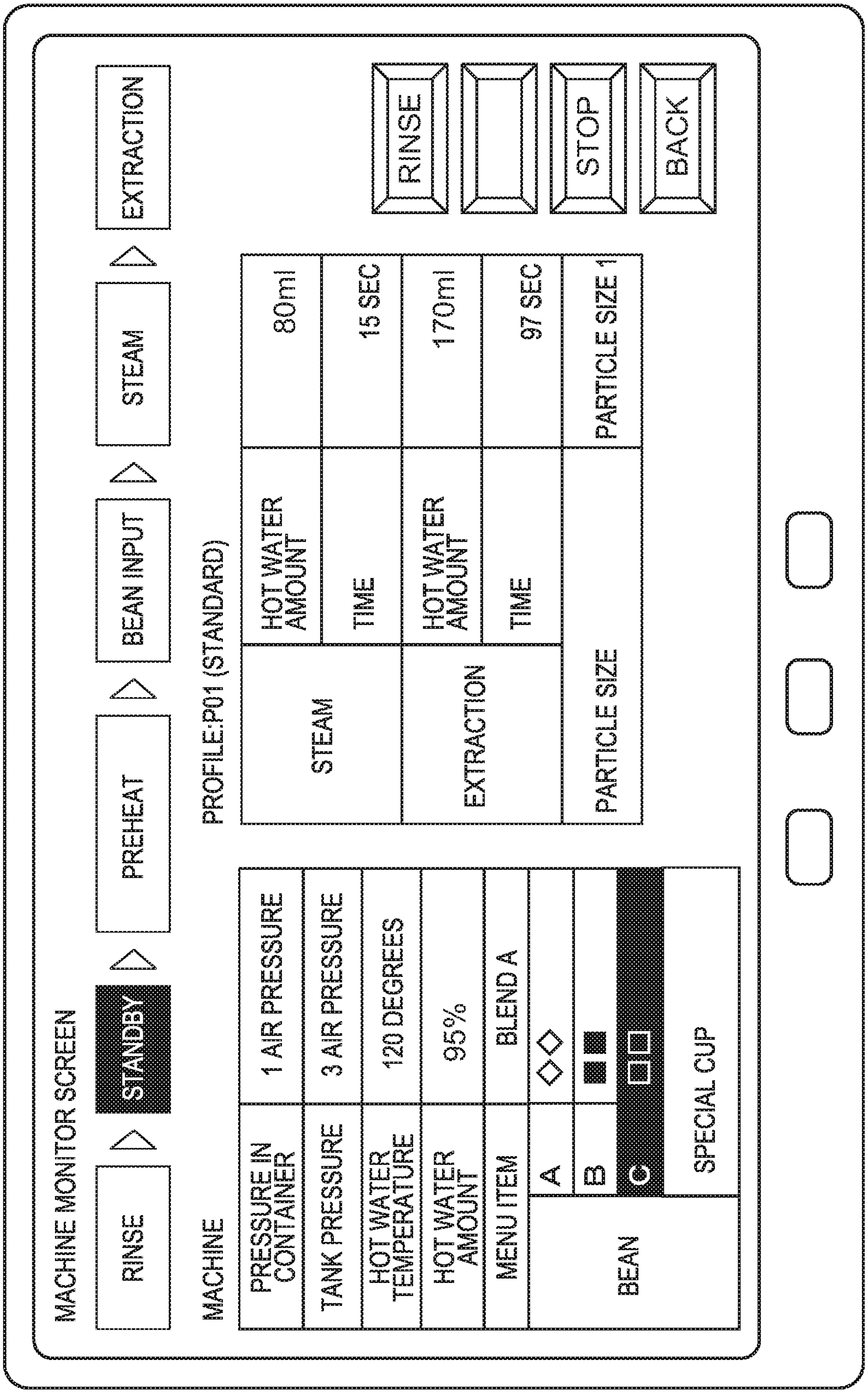
Figure 156:
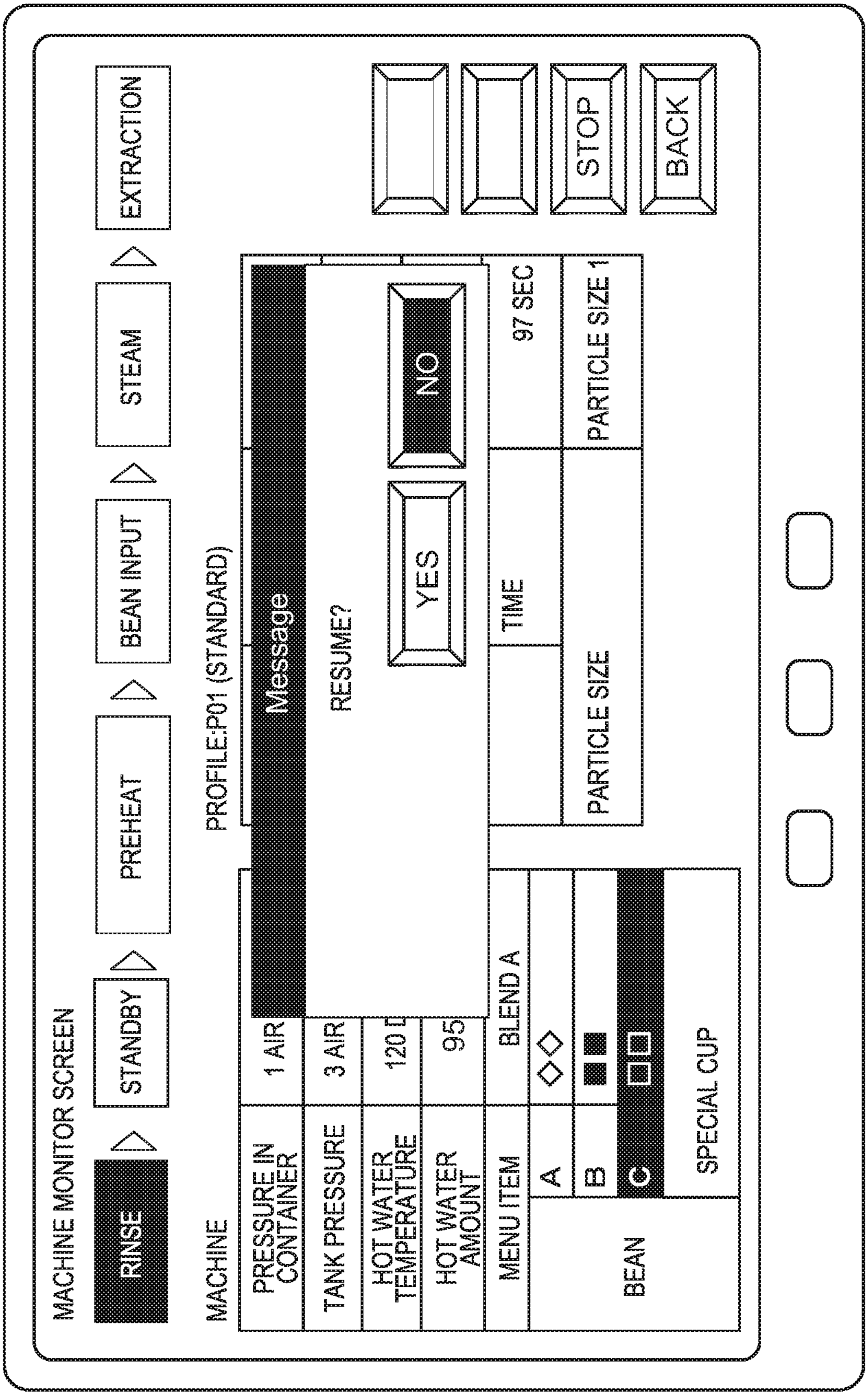
Figure 157:
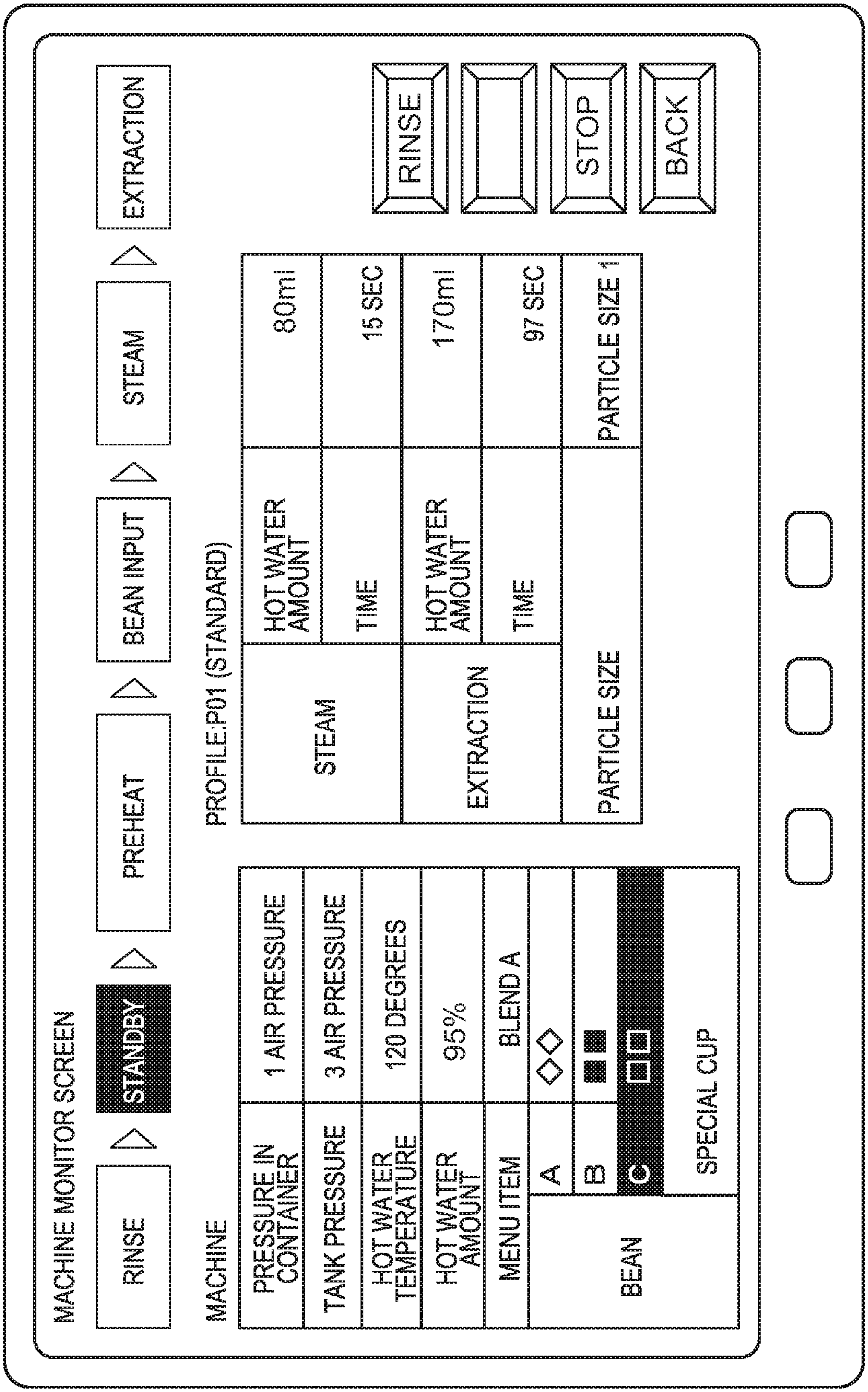
Figure 158:
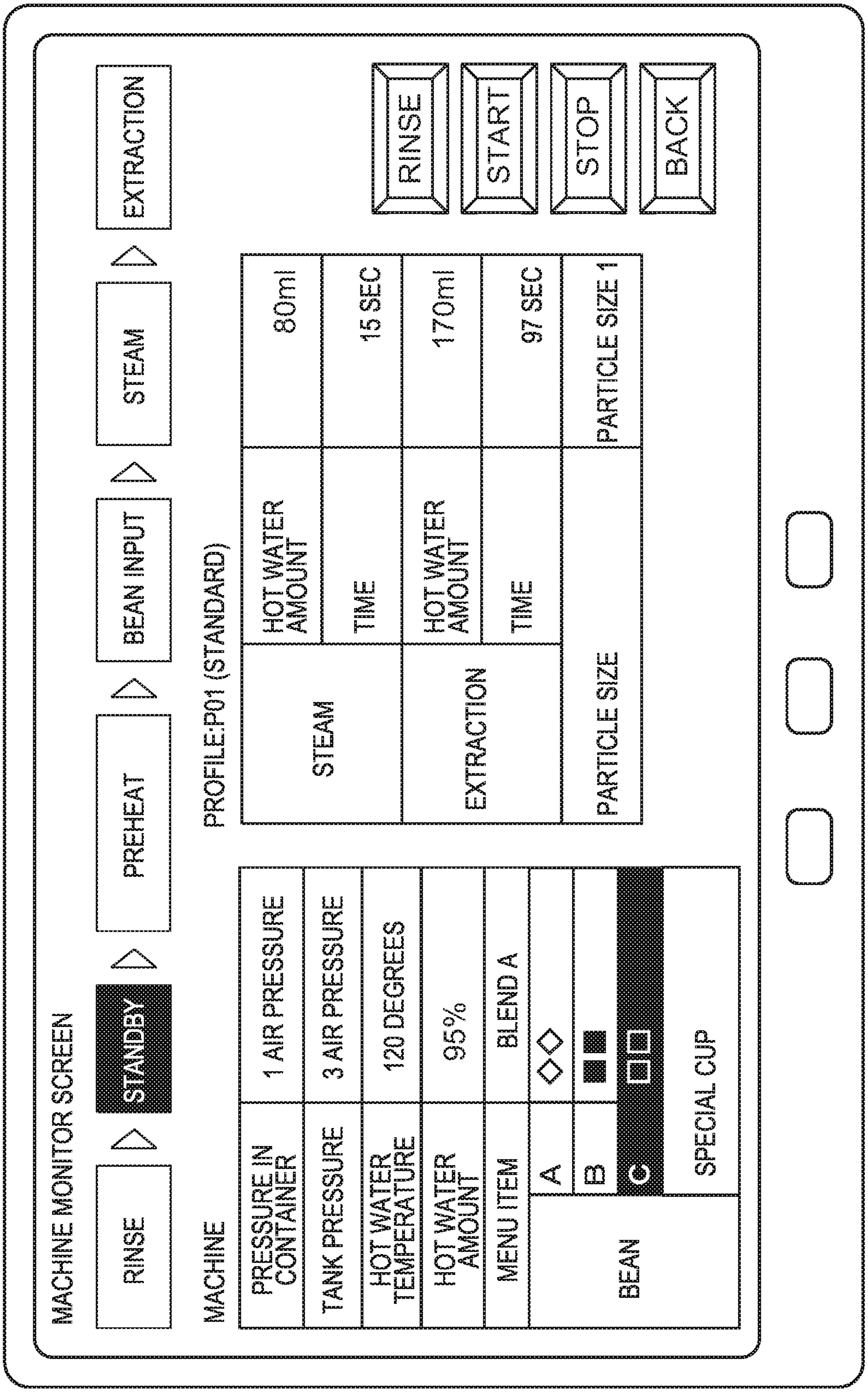
Figure 159:
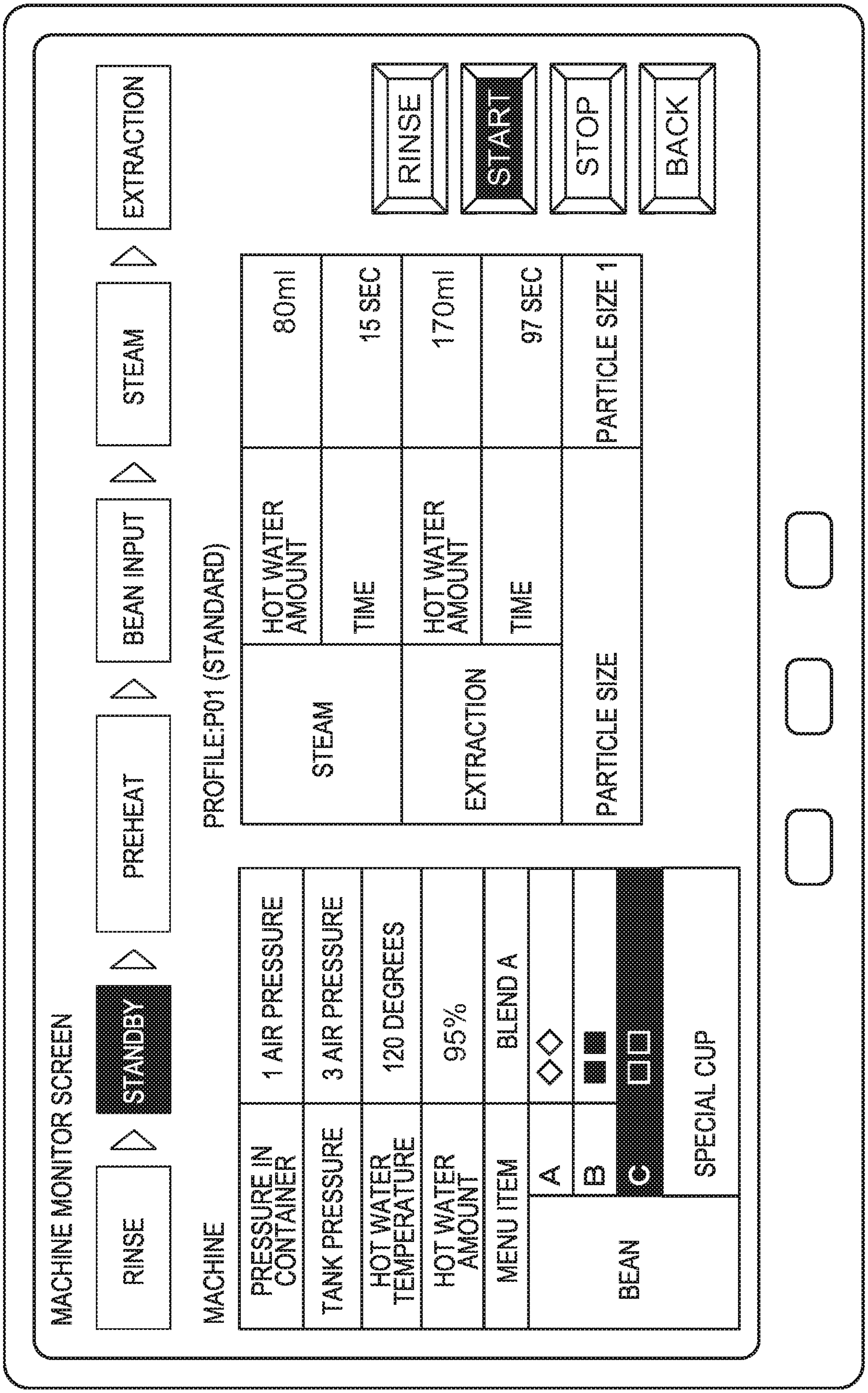
Figure 160:
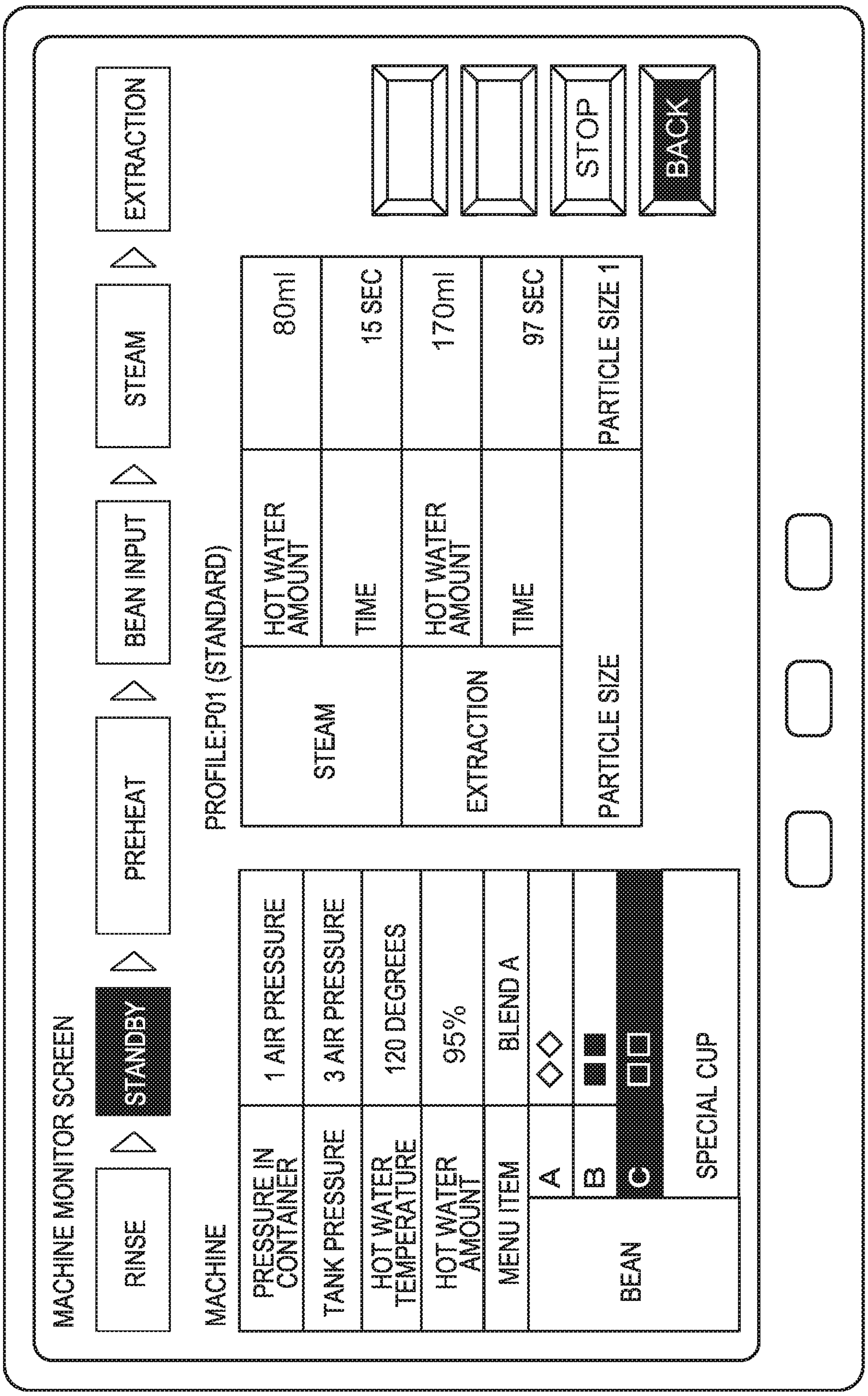
Figure 161:
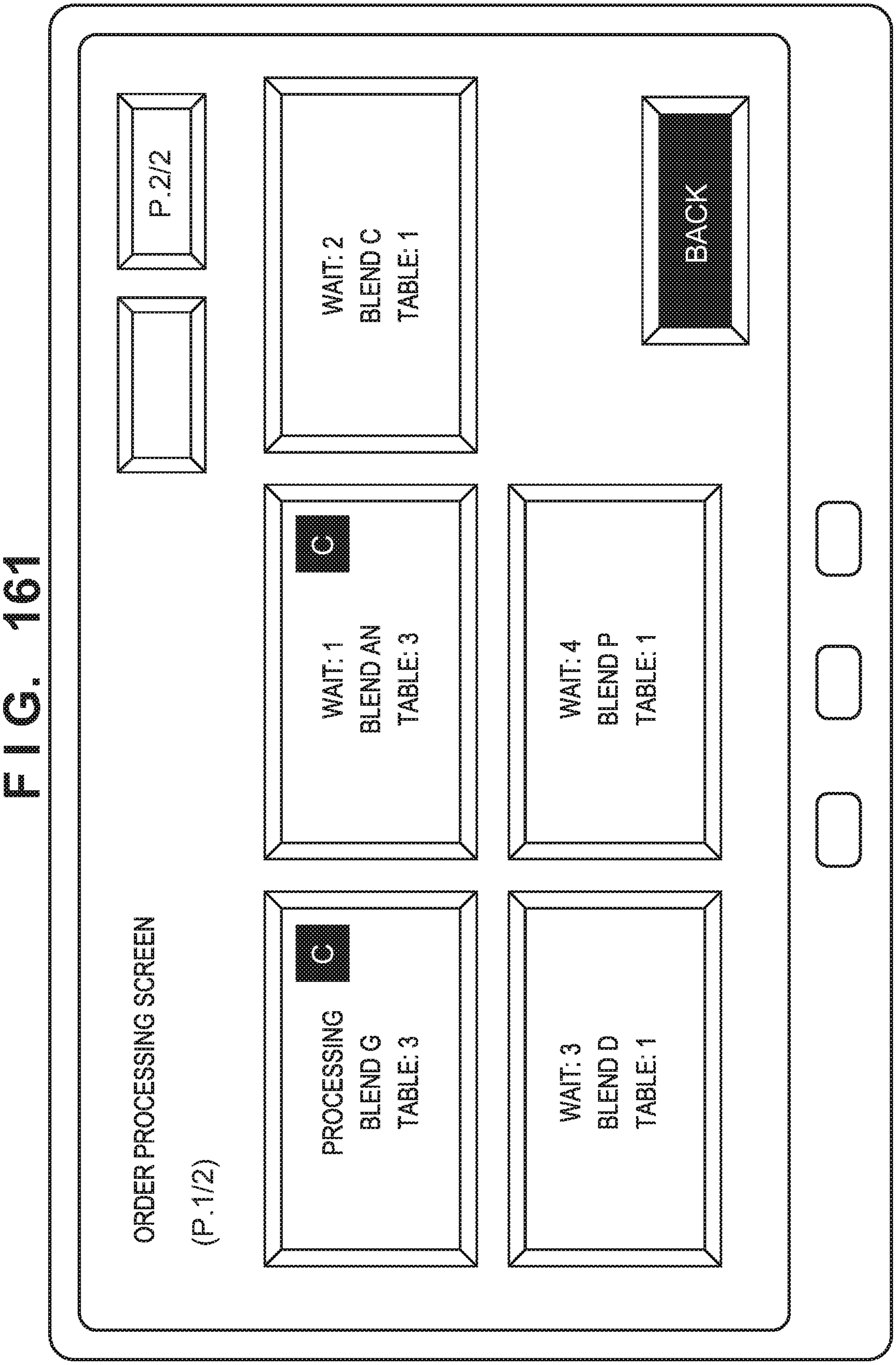
Figure 162:
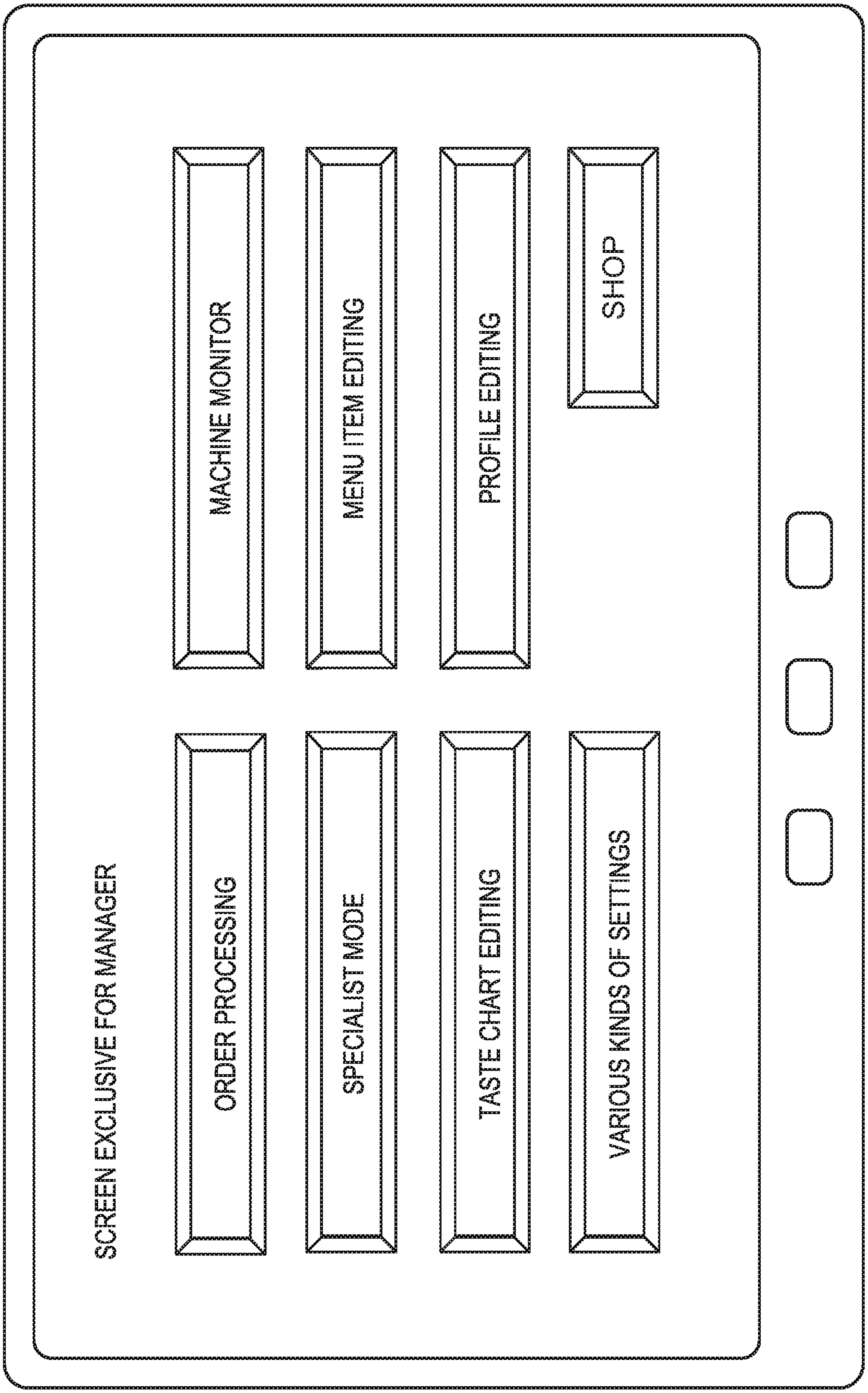
Figure 163:
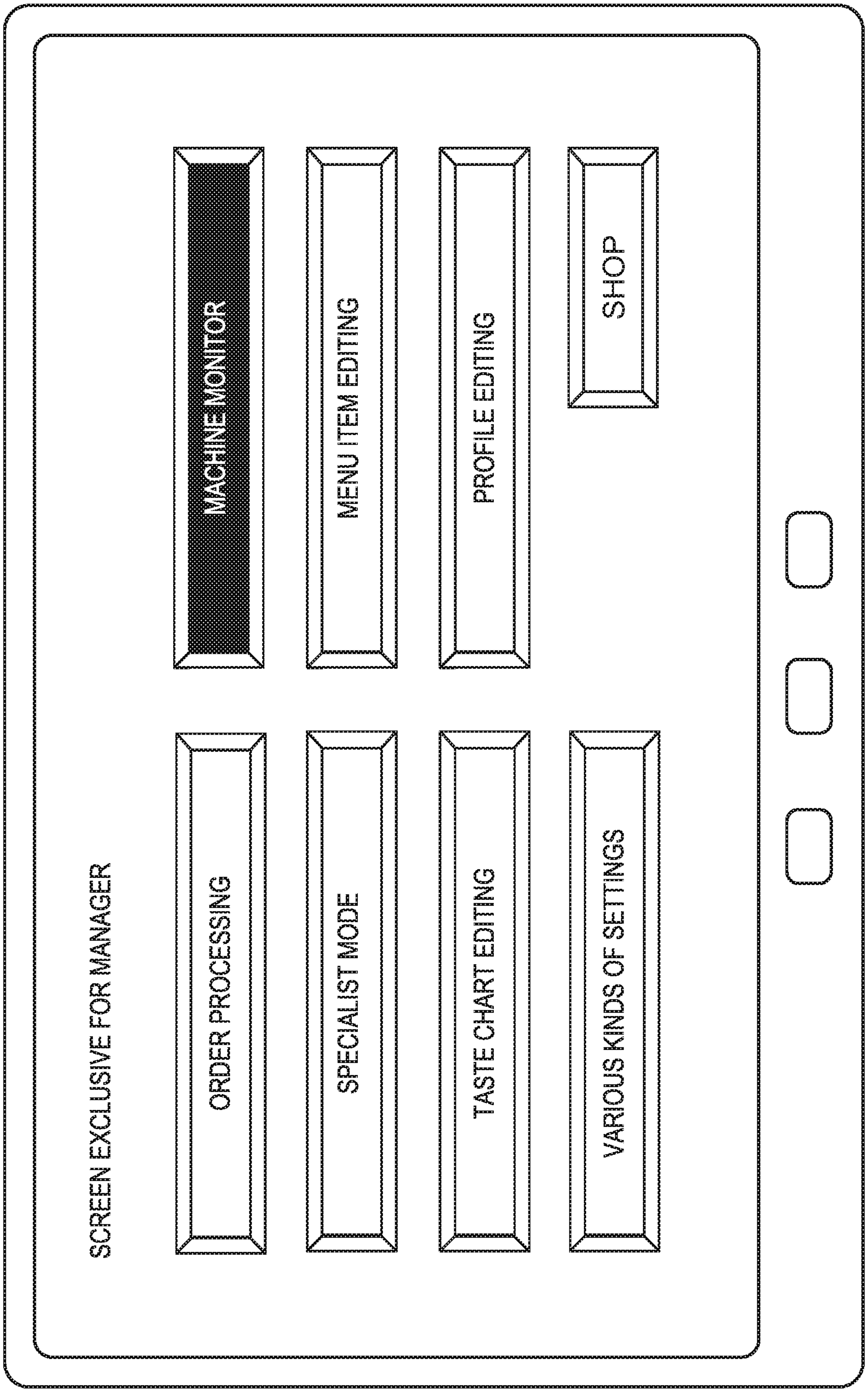
Figure 164:
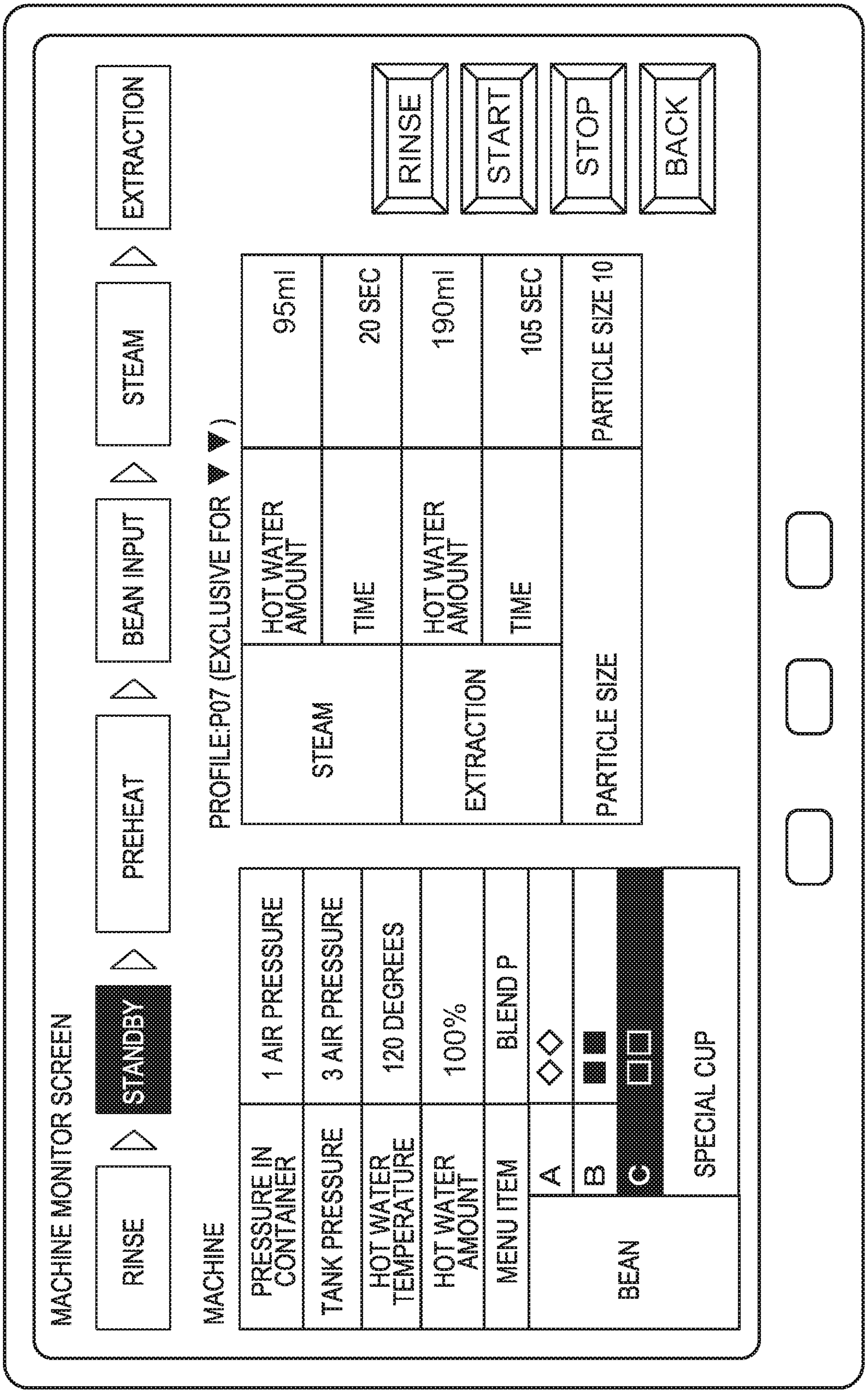
Figure 165:
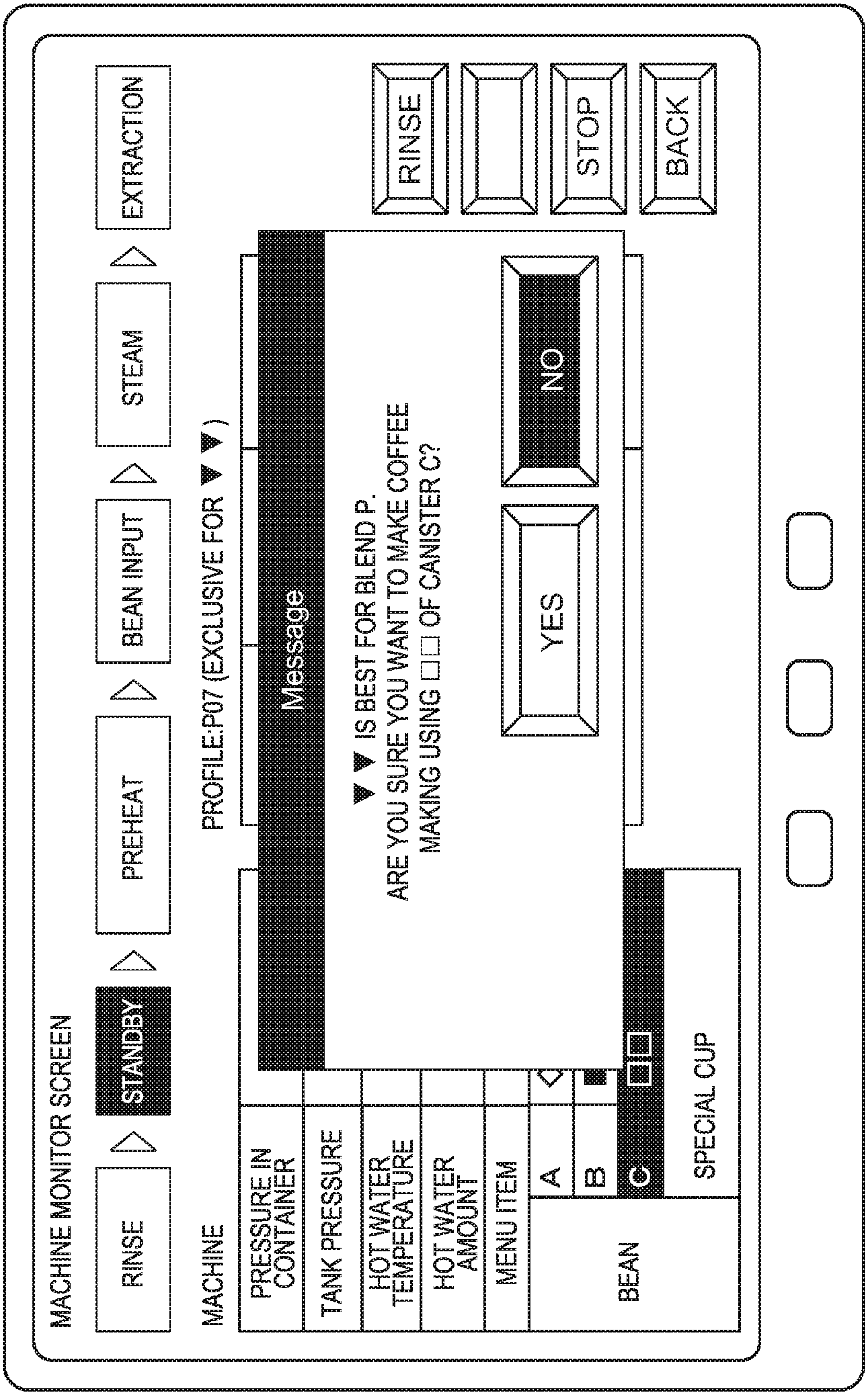
Figure 166:
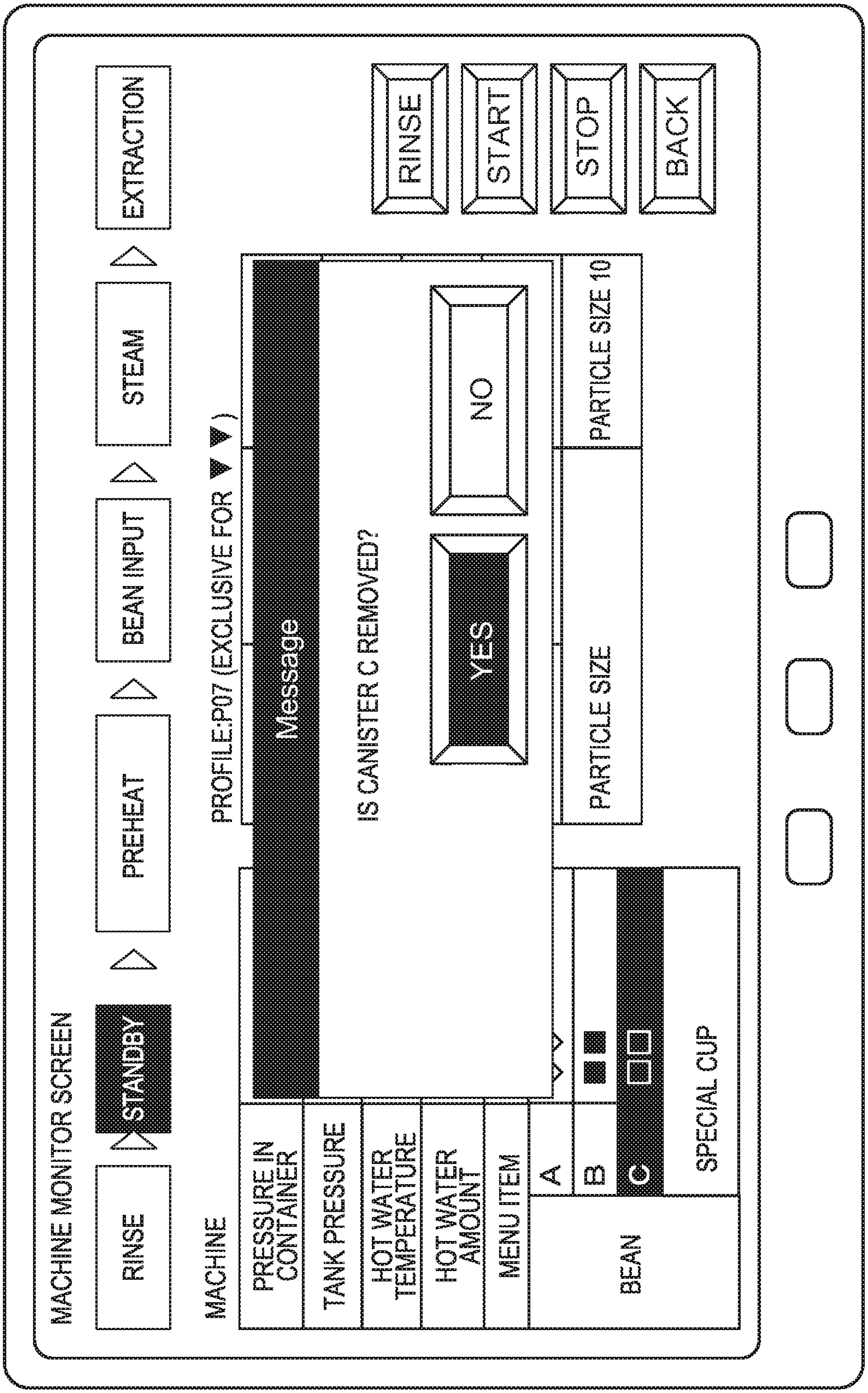
Figure 167:
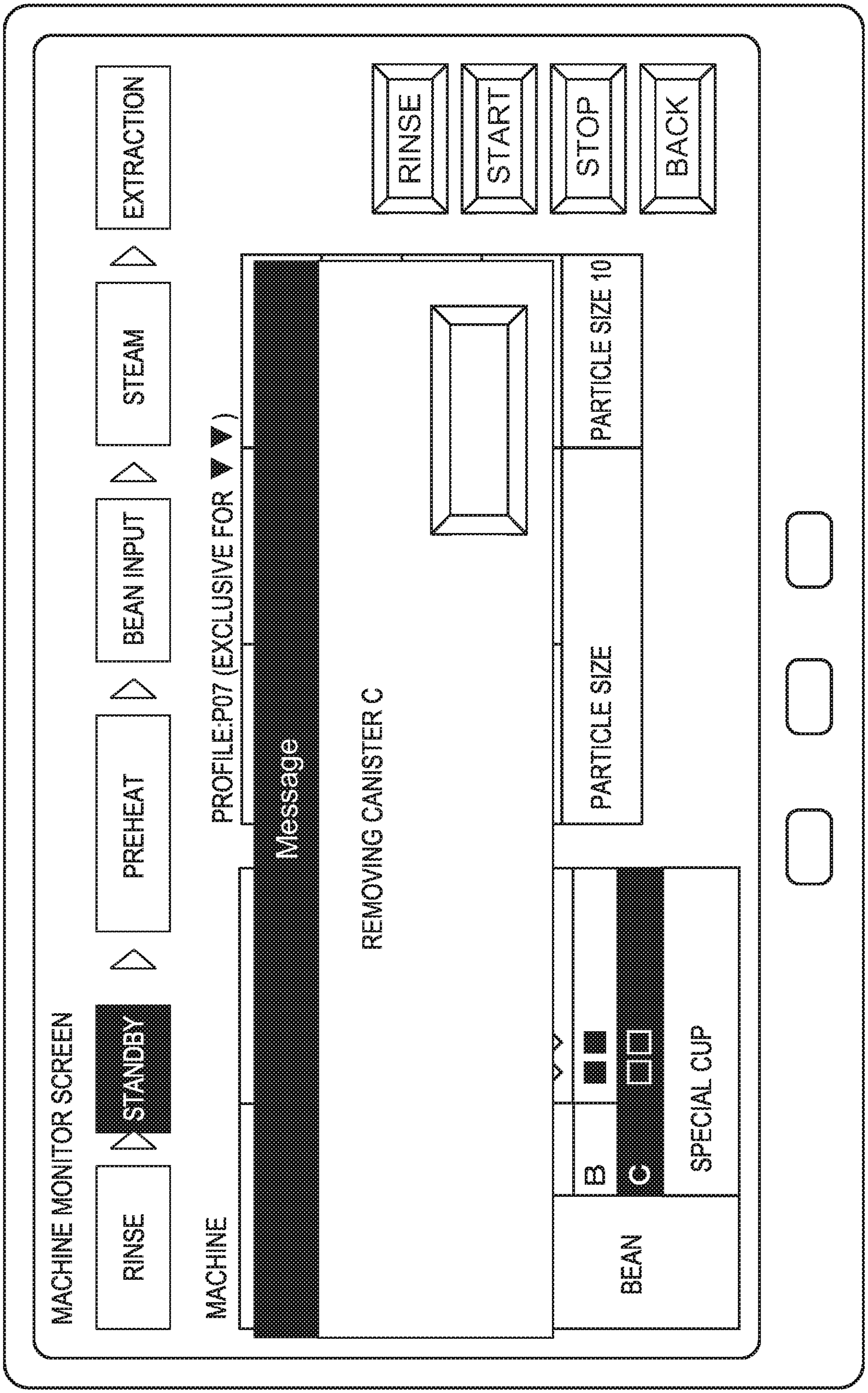
Figure 168:
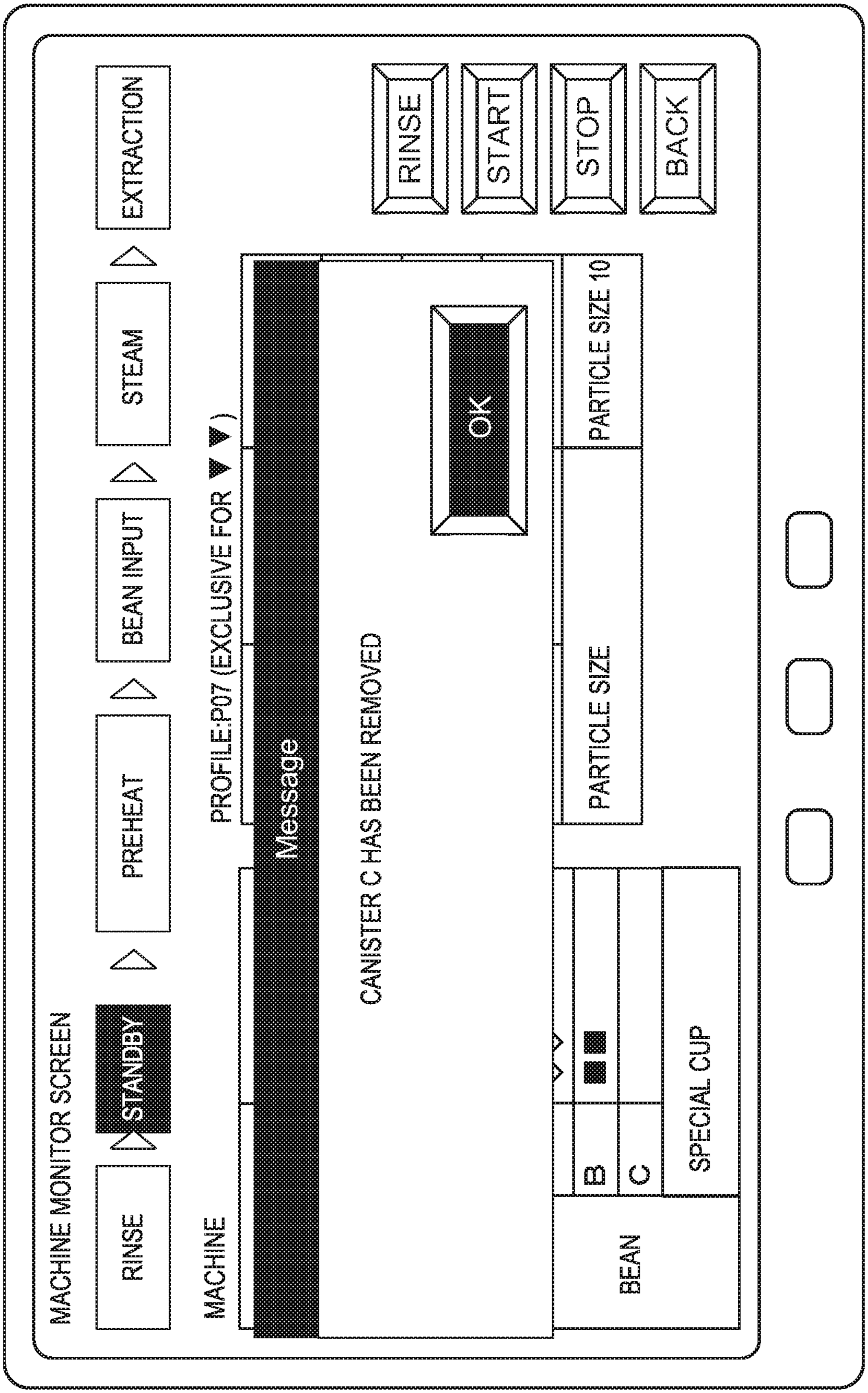
Figure 169:
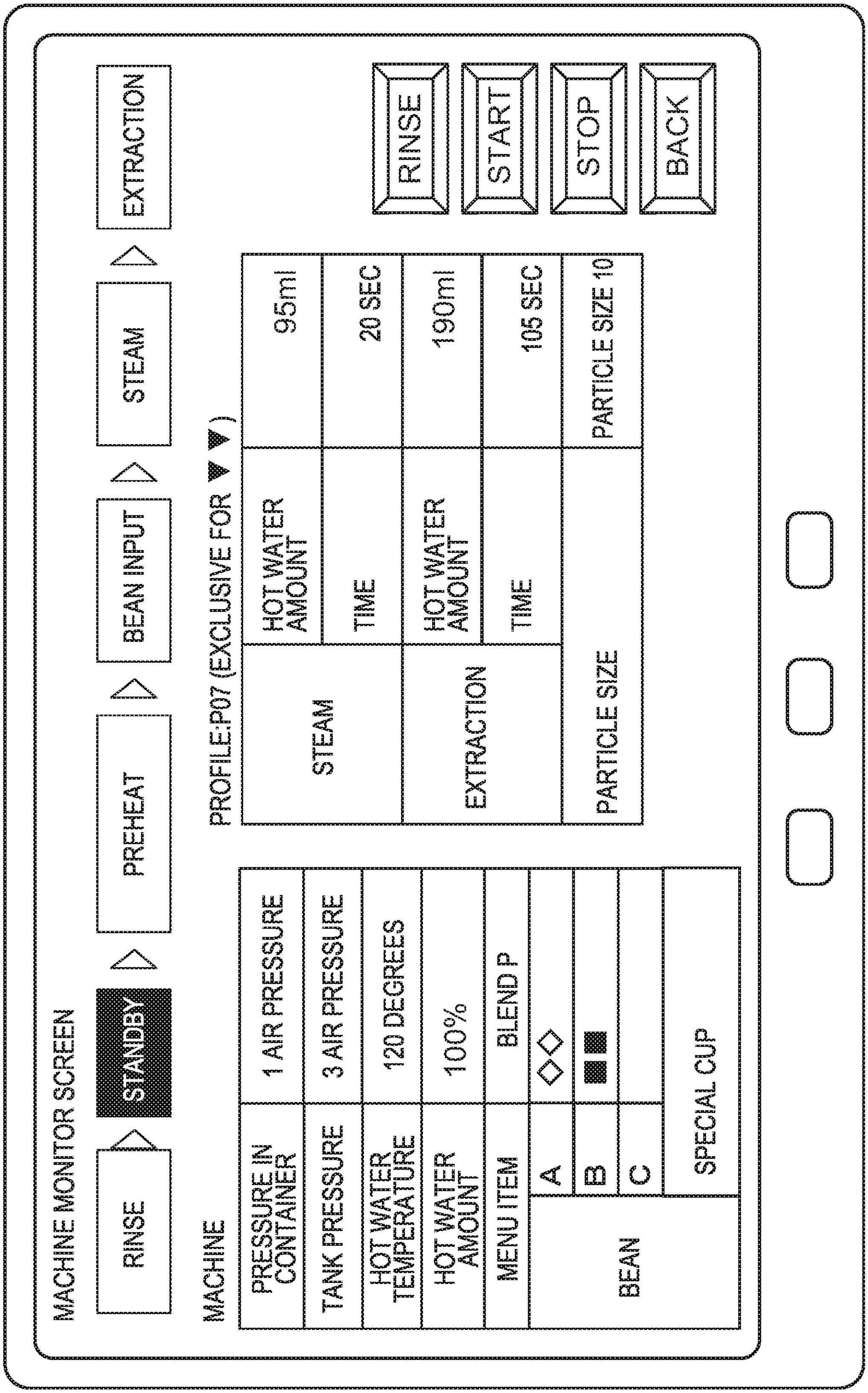
Figure 170:
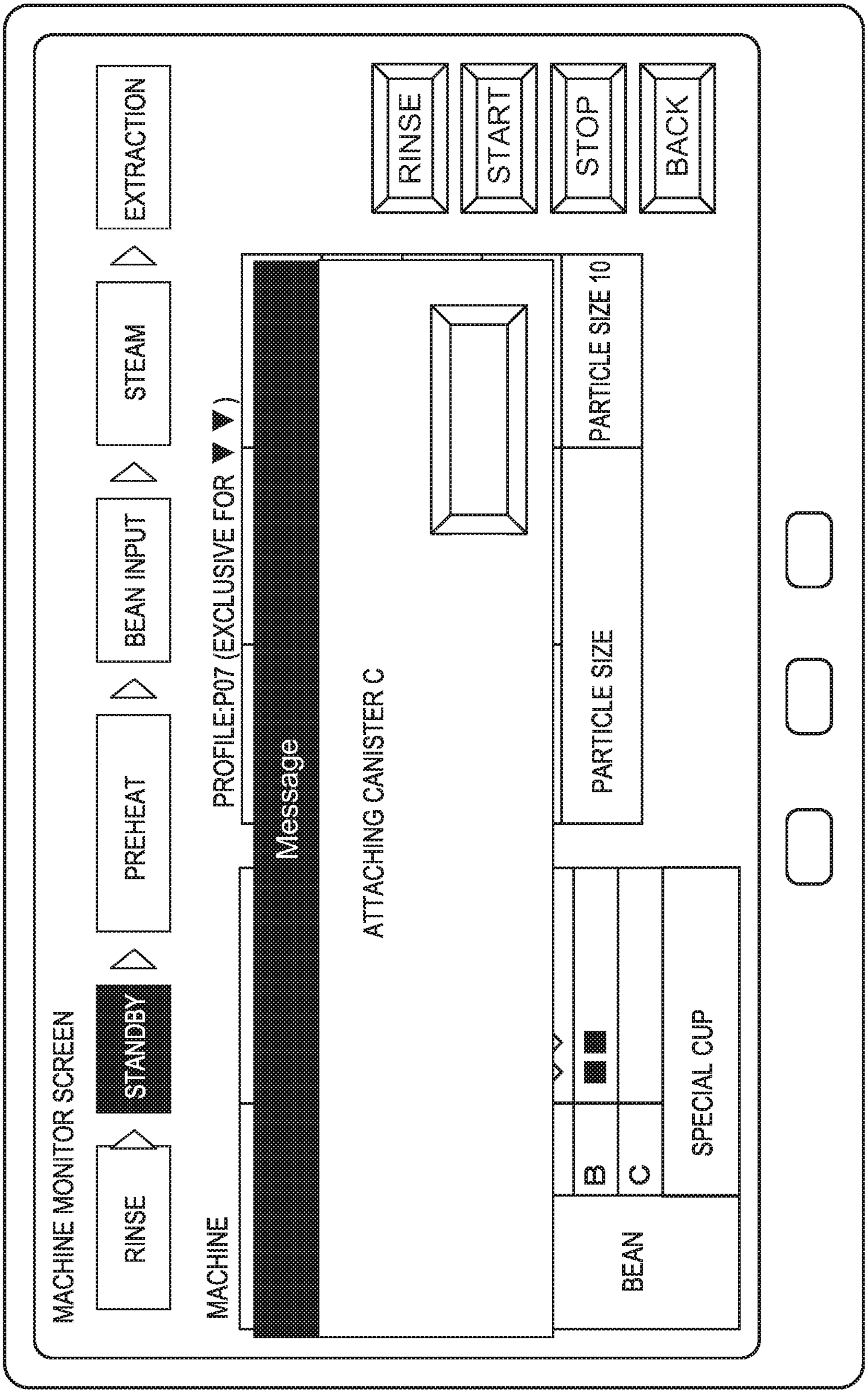
Figure 171:
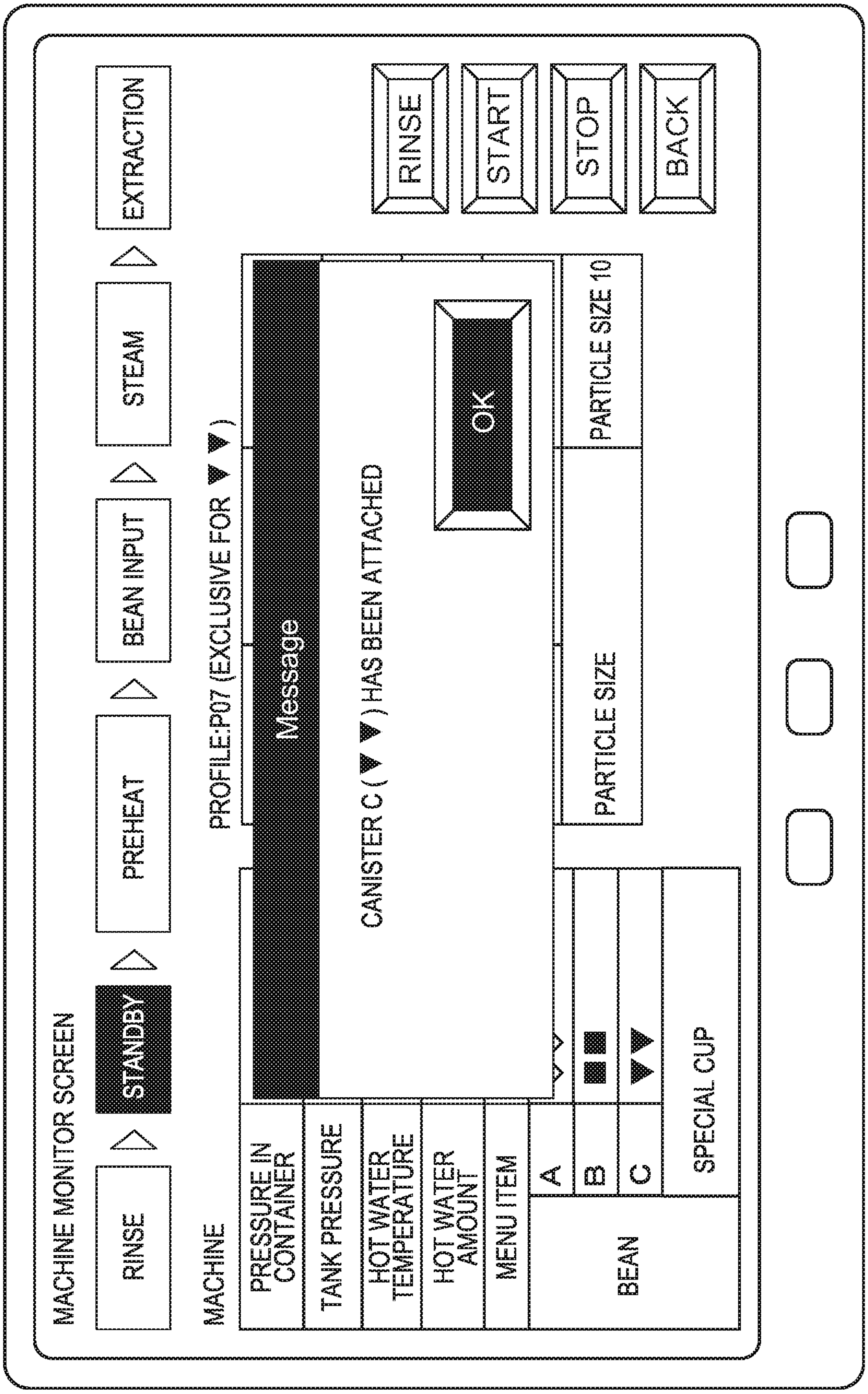
Figure 173:
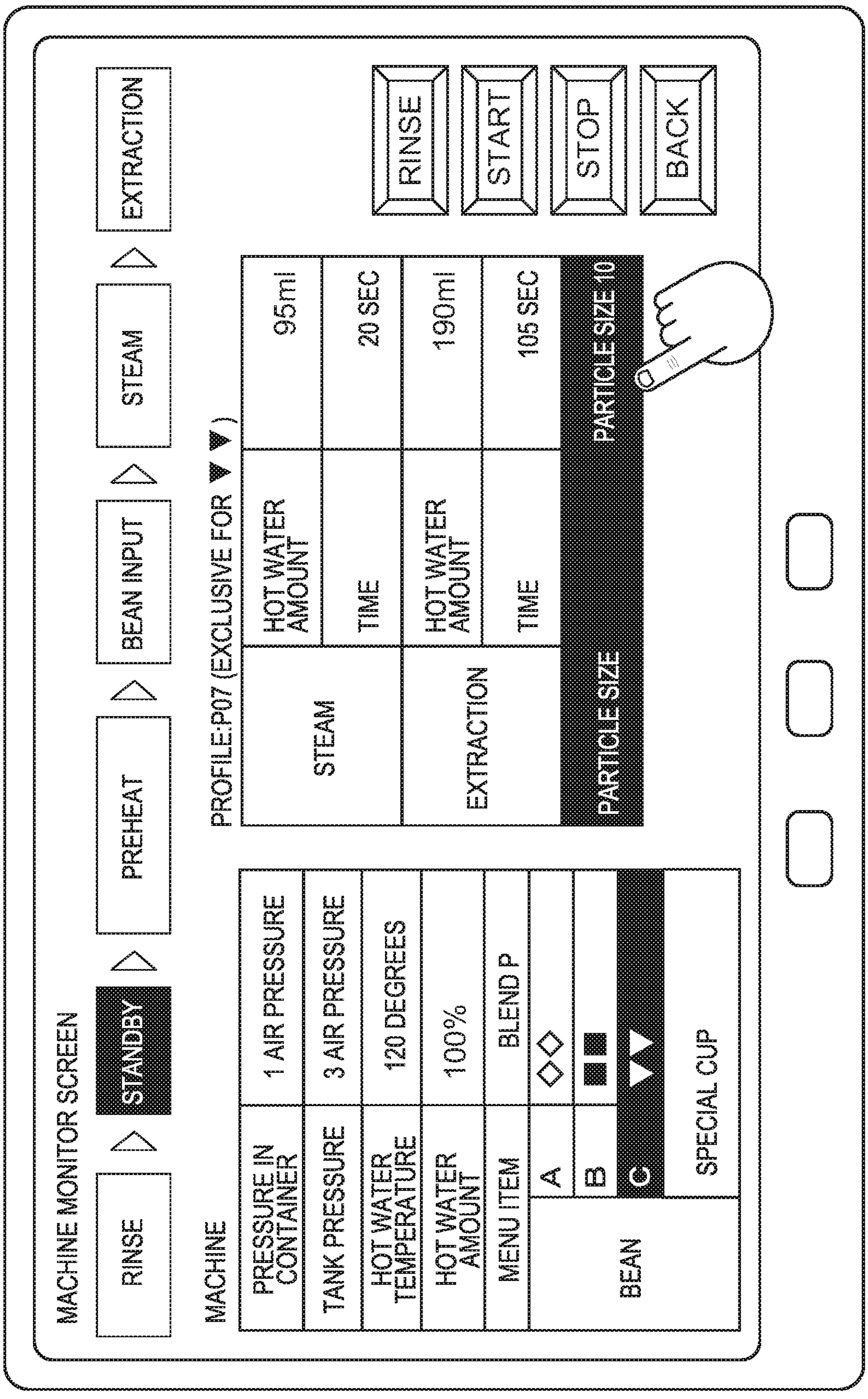
Figure 174:
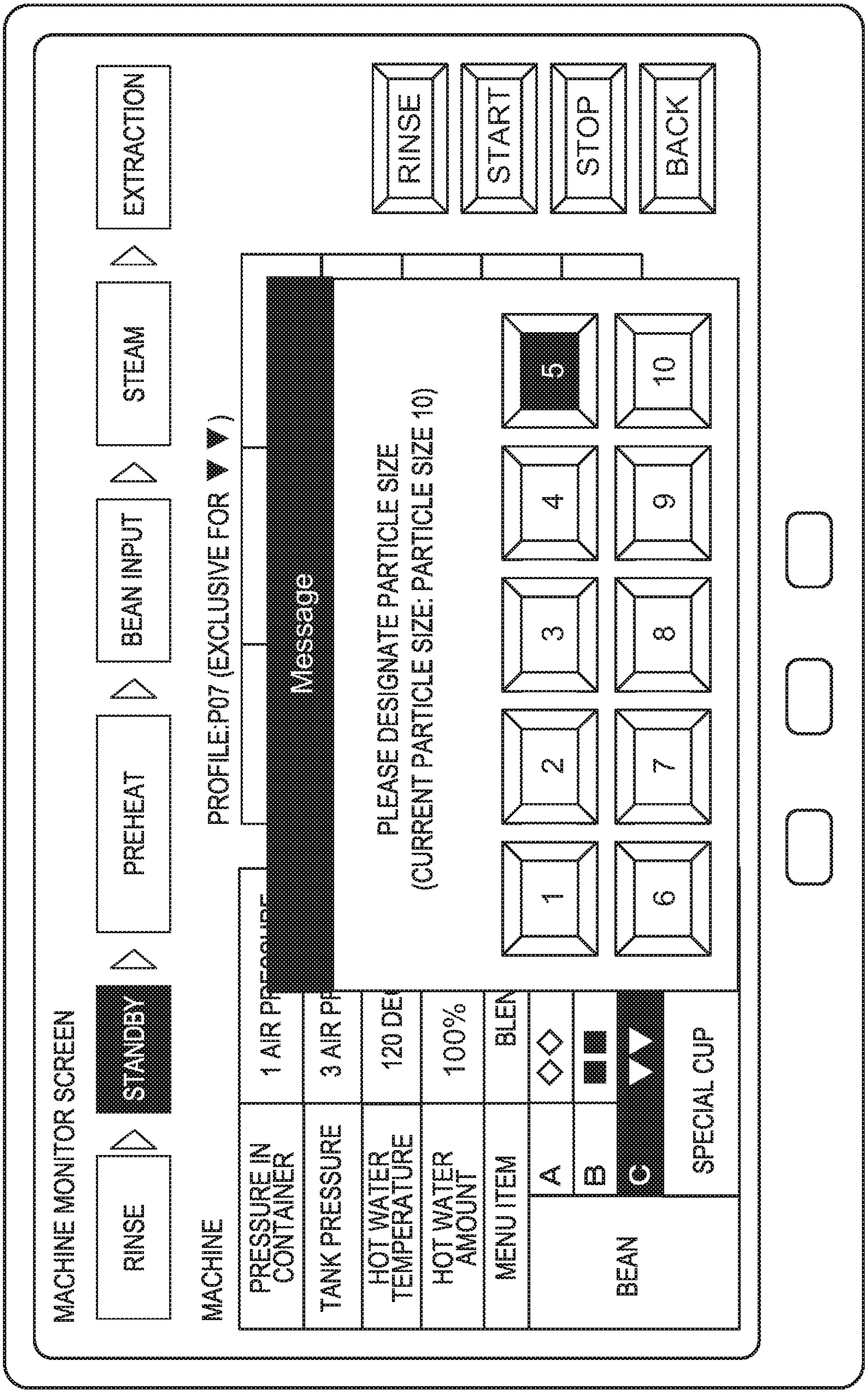
Figure 175:
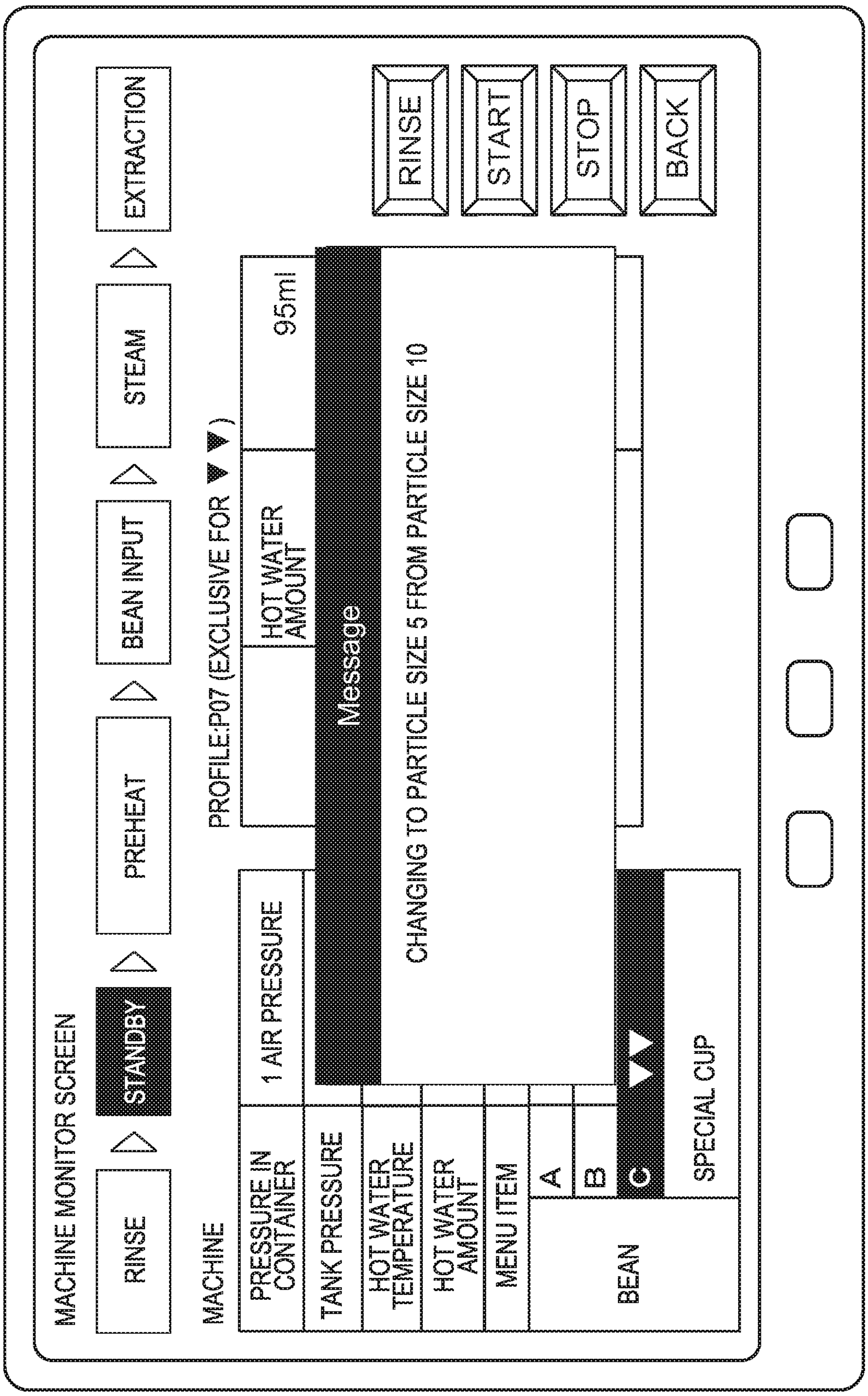
Figure 176:
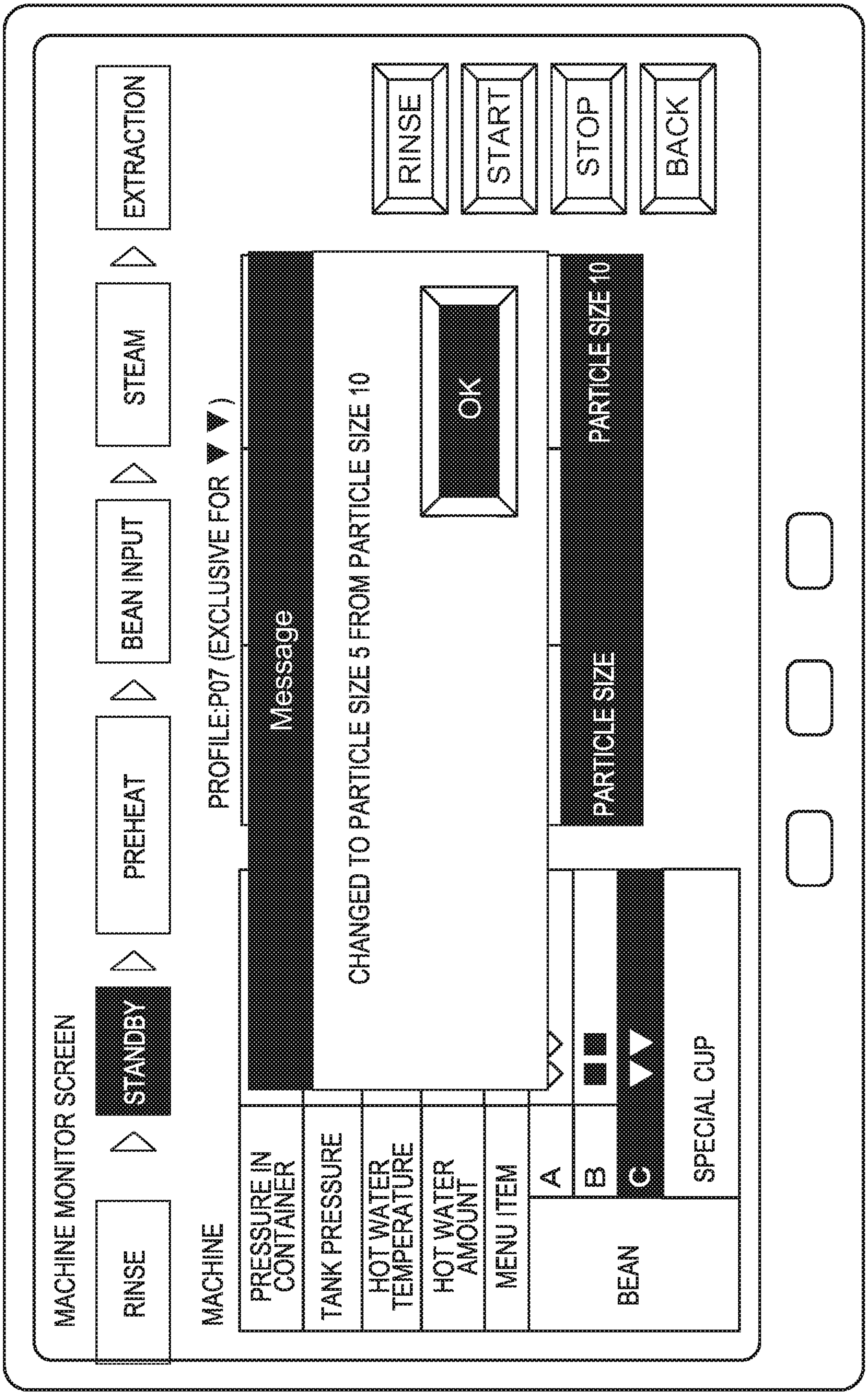
Figure 177:
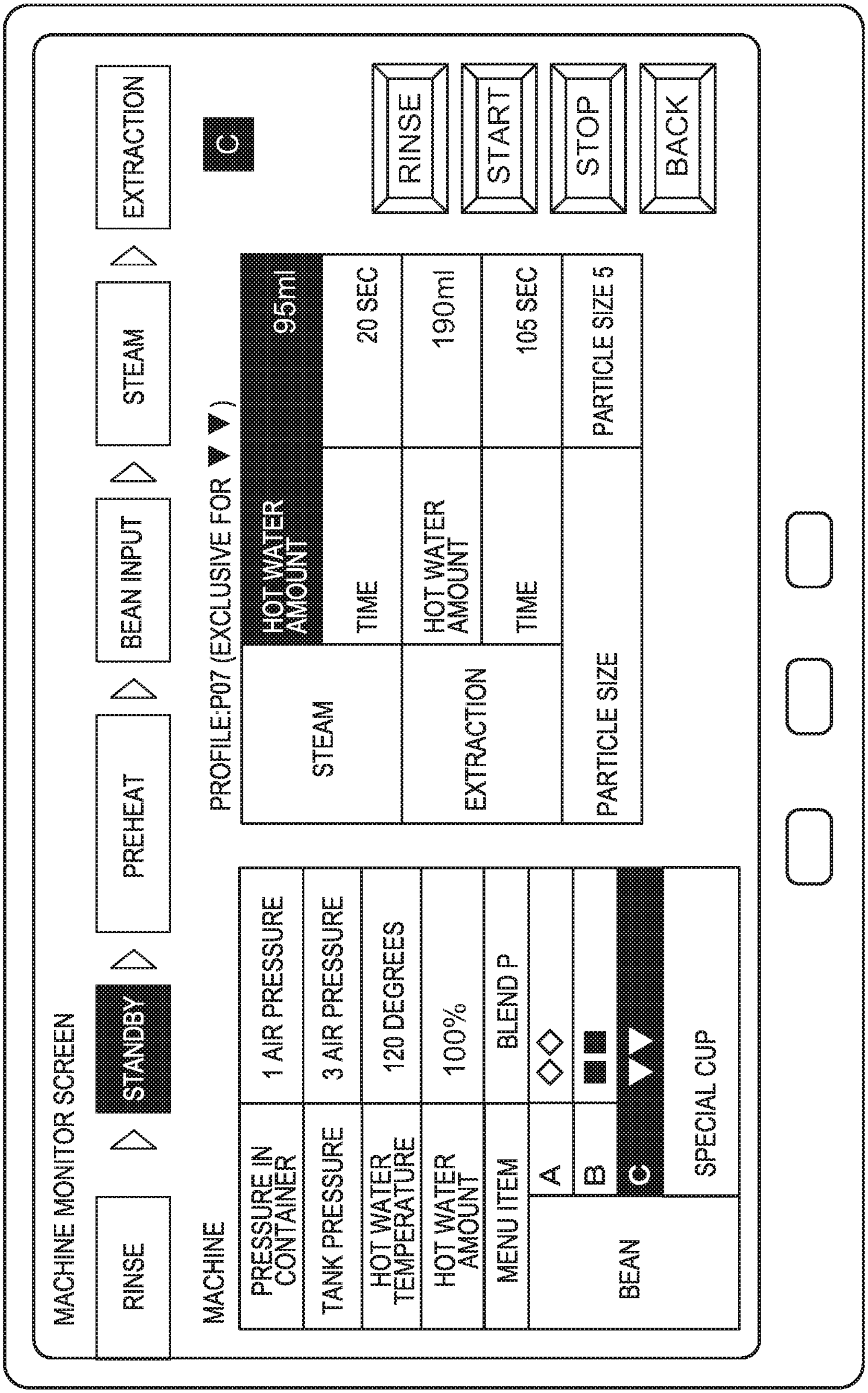
Figure 178:
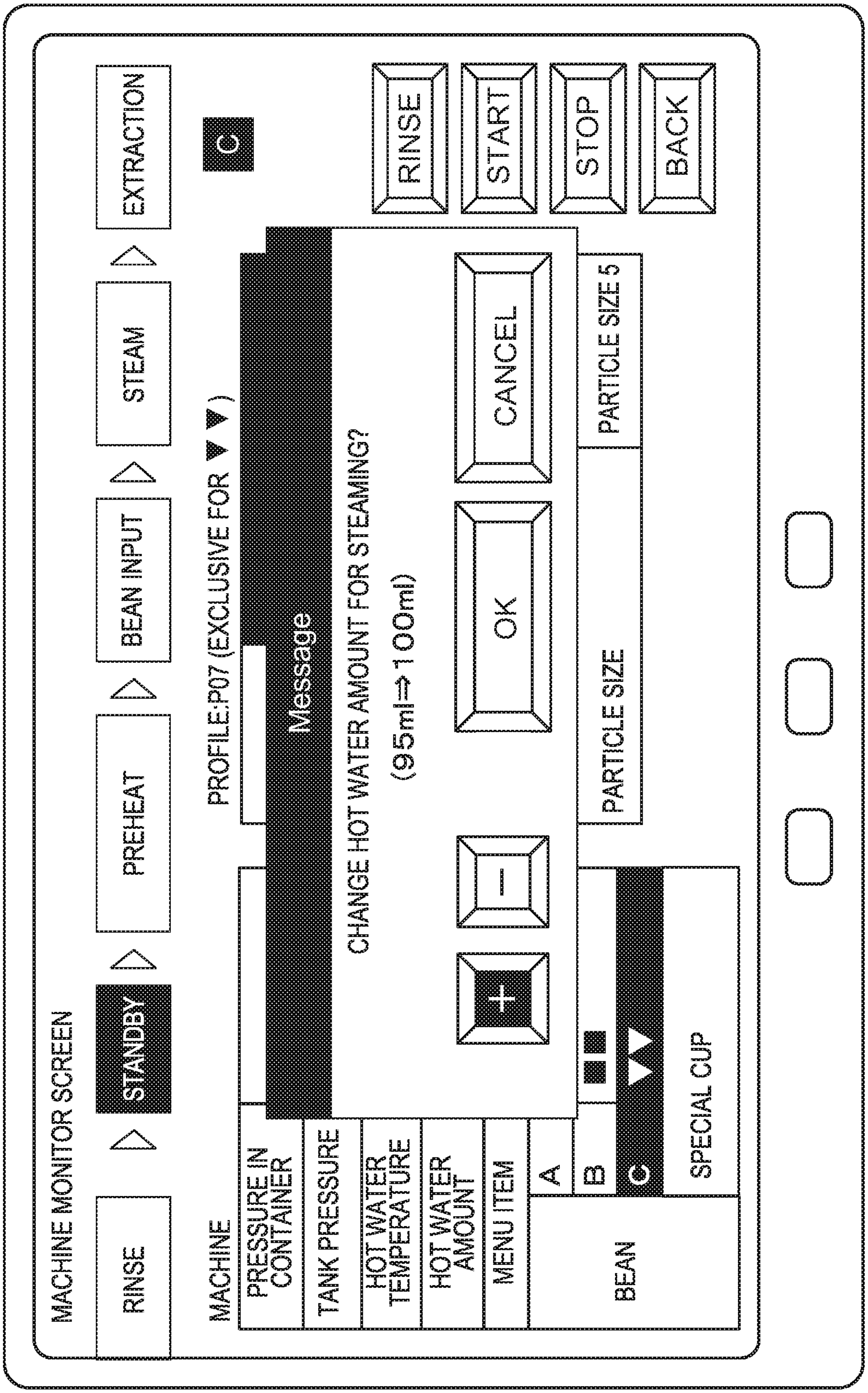
Figure 179:
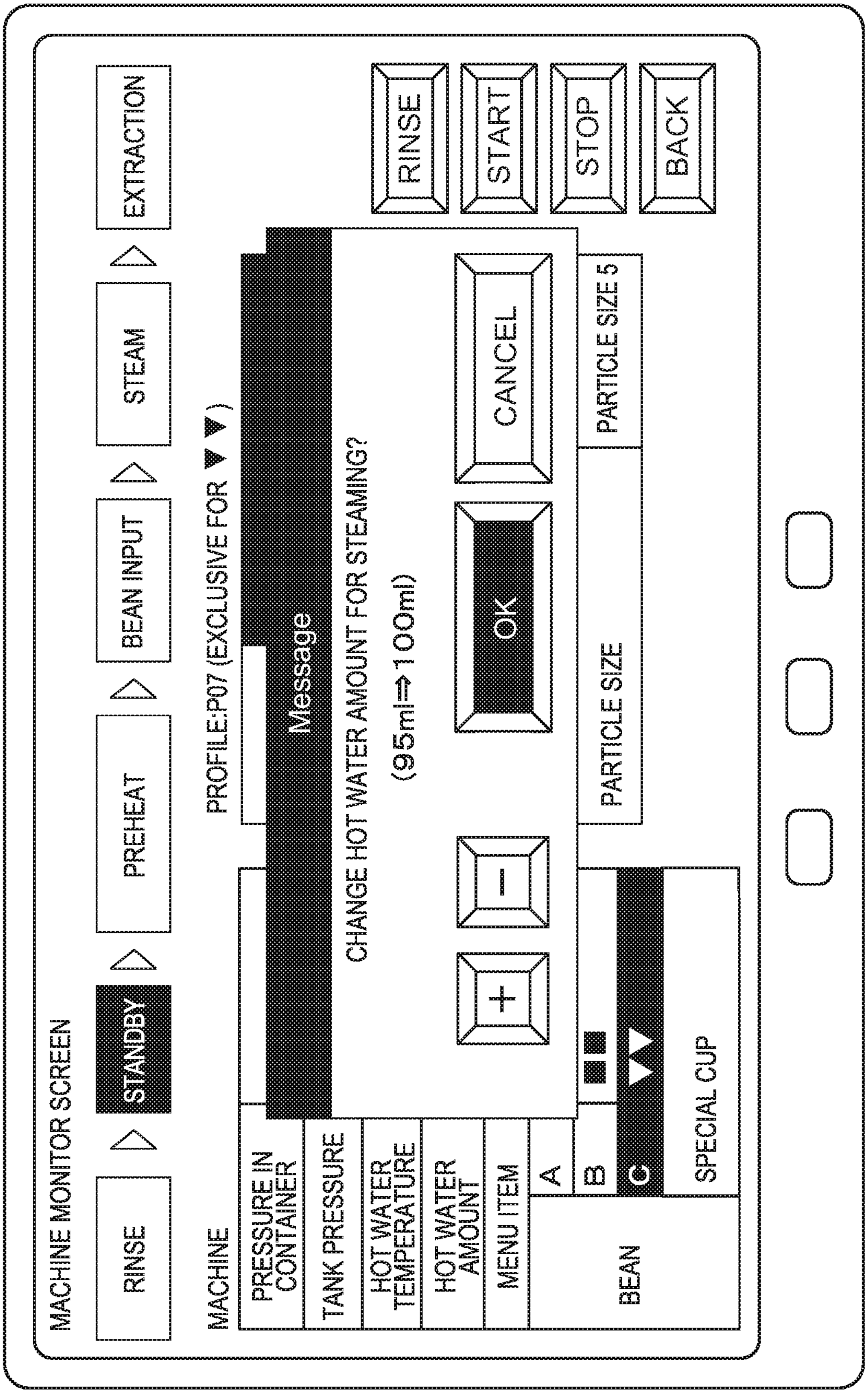
Figure 180:
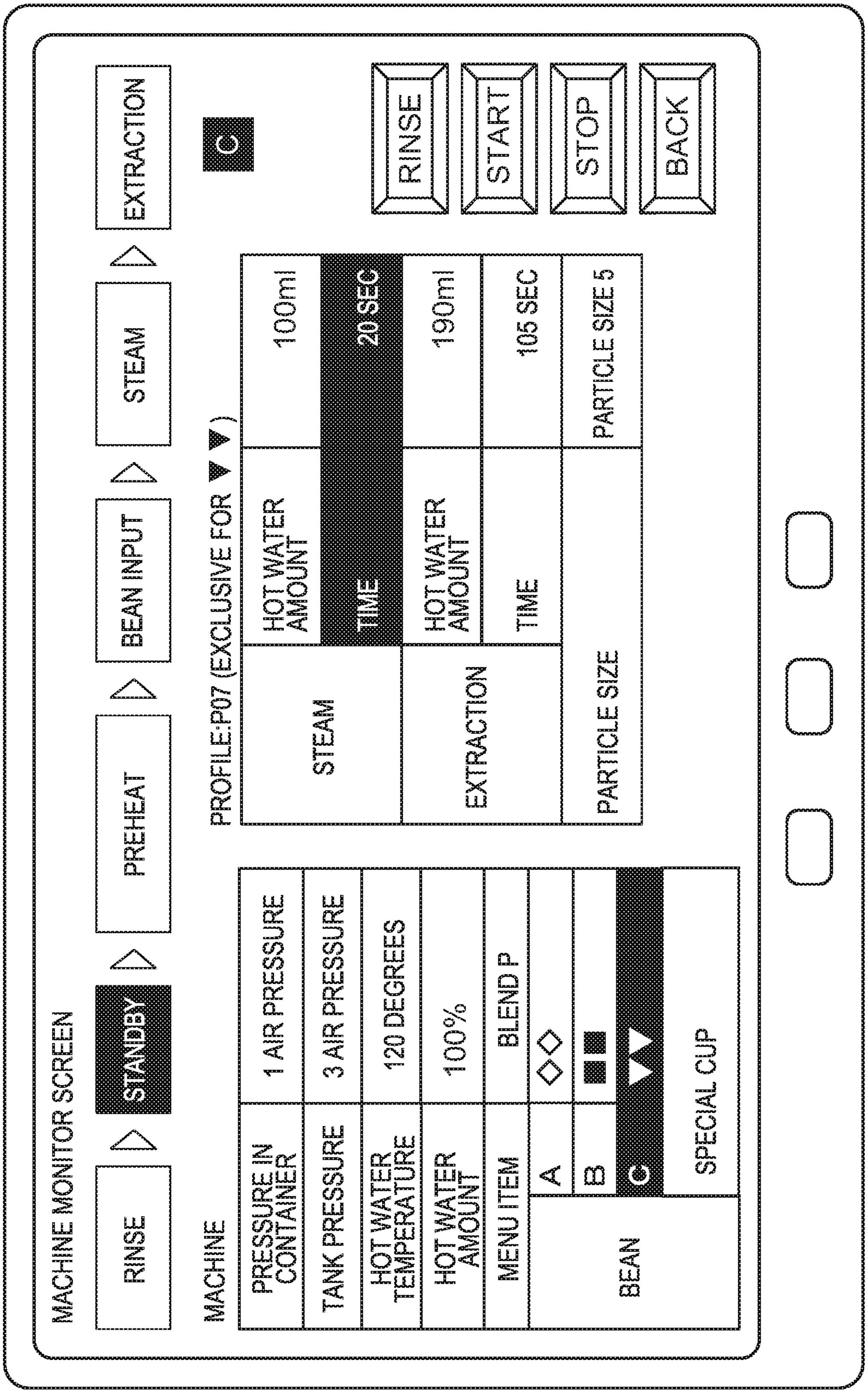
Figure 181:
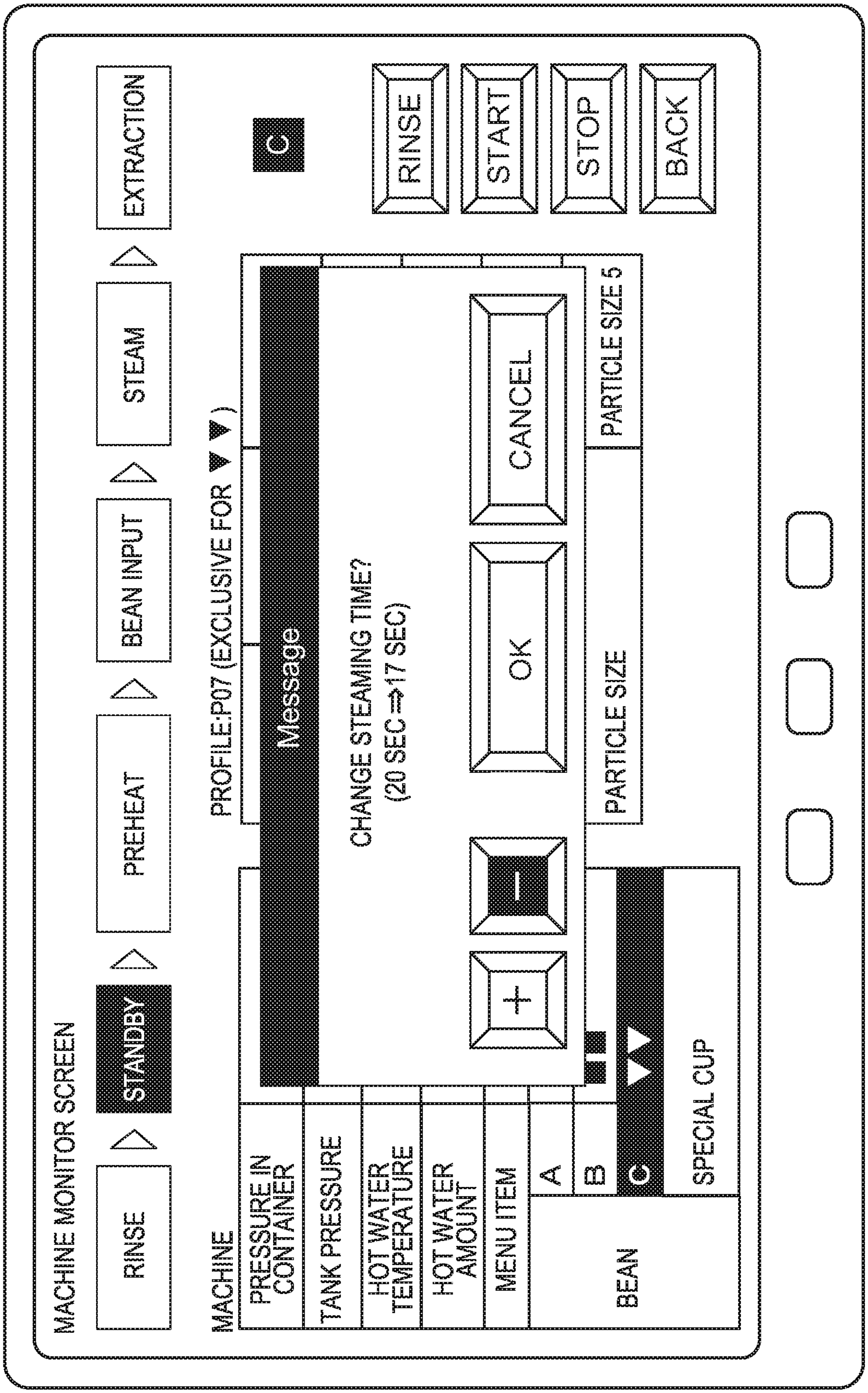
Figure 182:
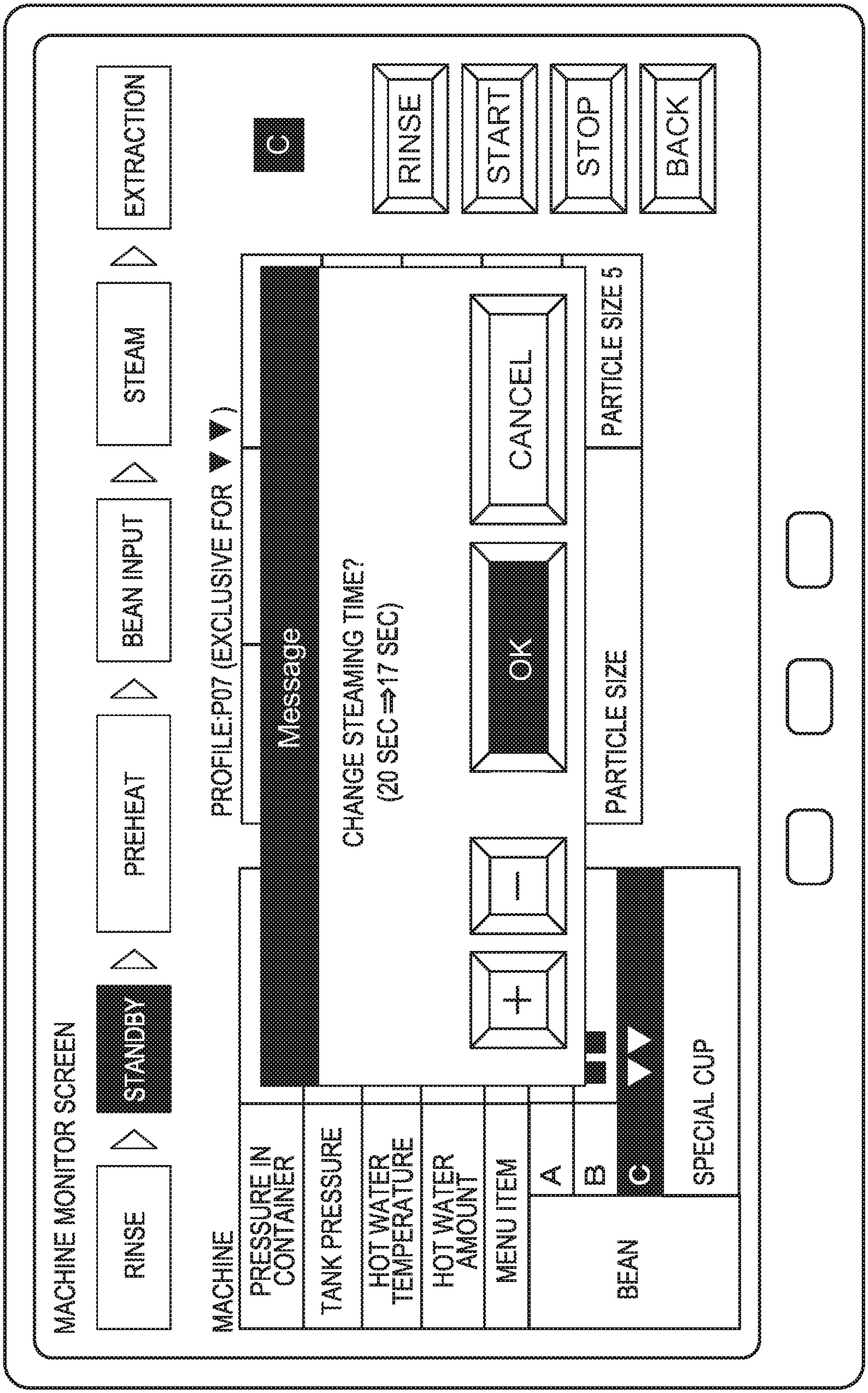
Figure 183:
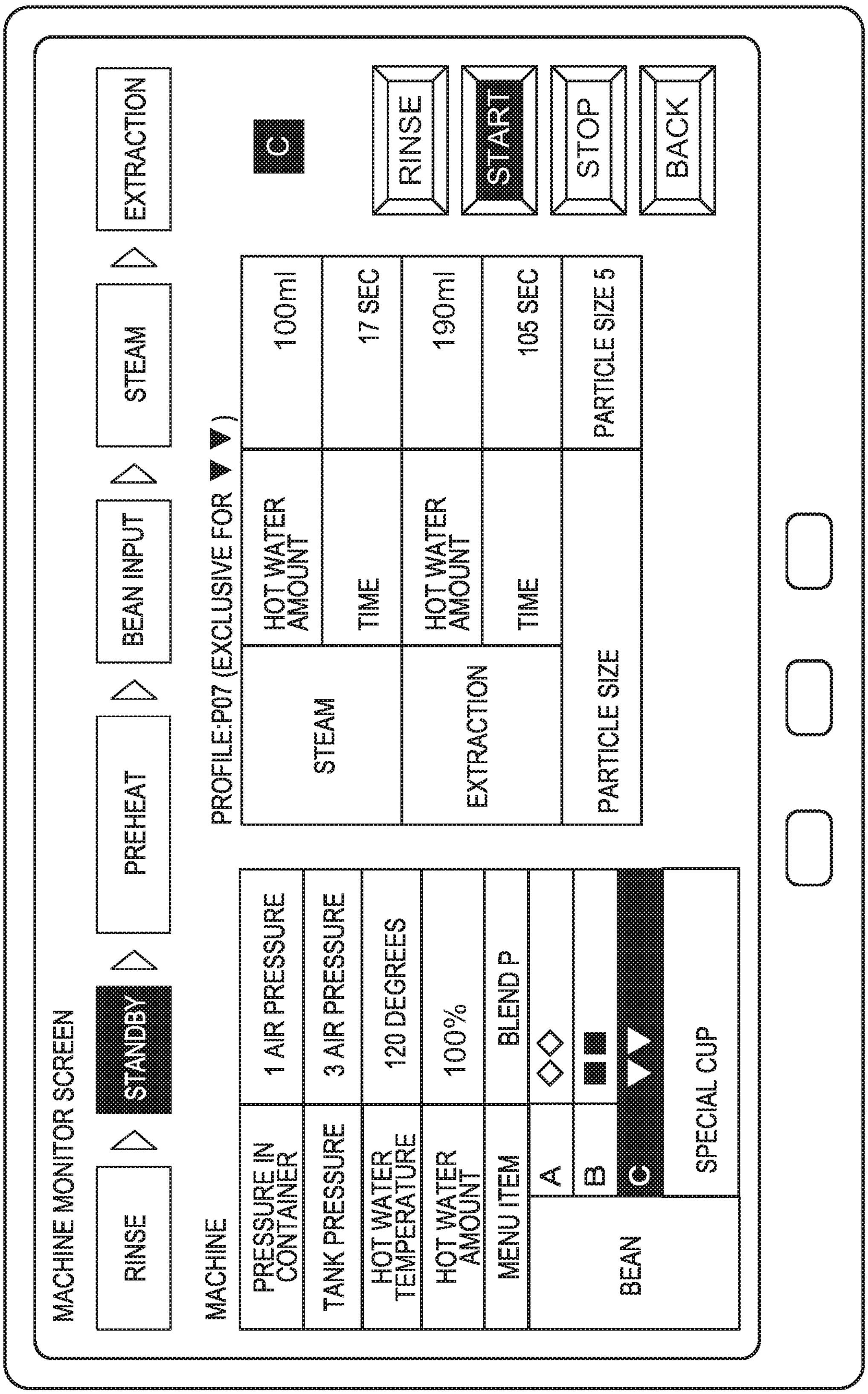
Figure 184:
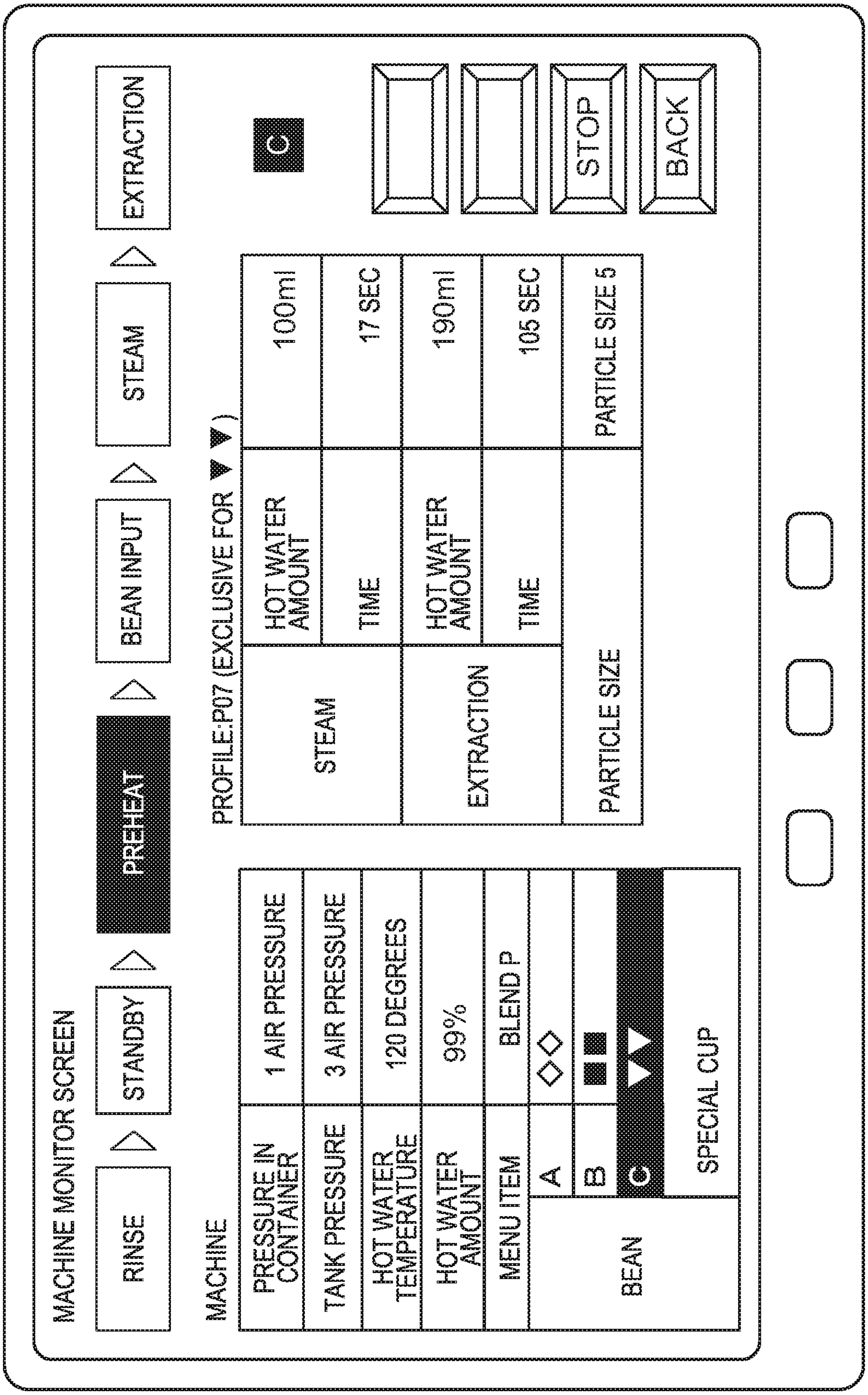
Figure 185:
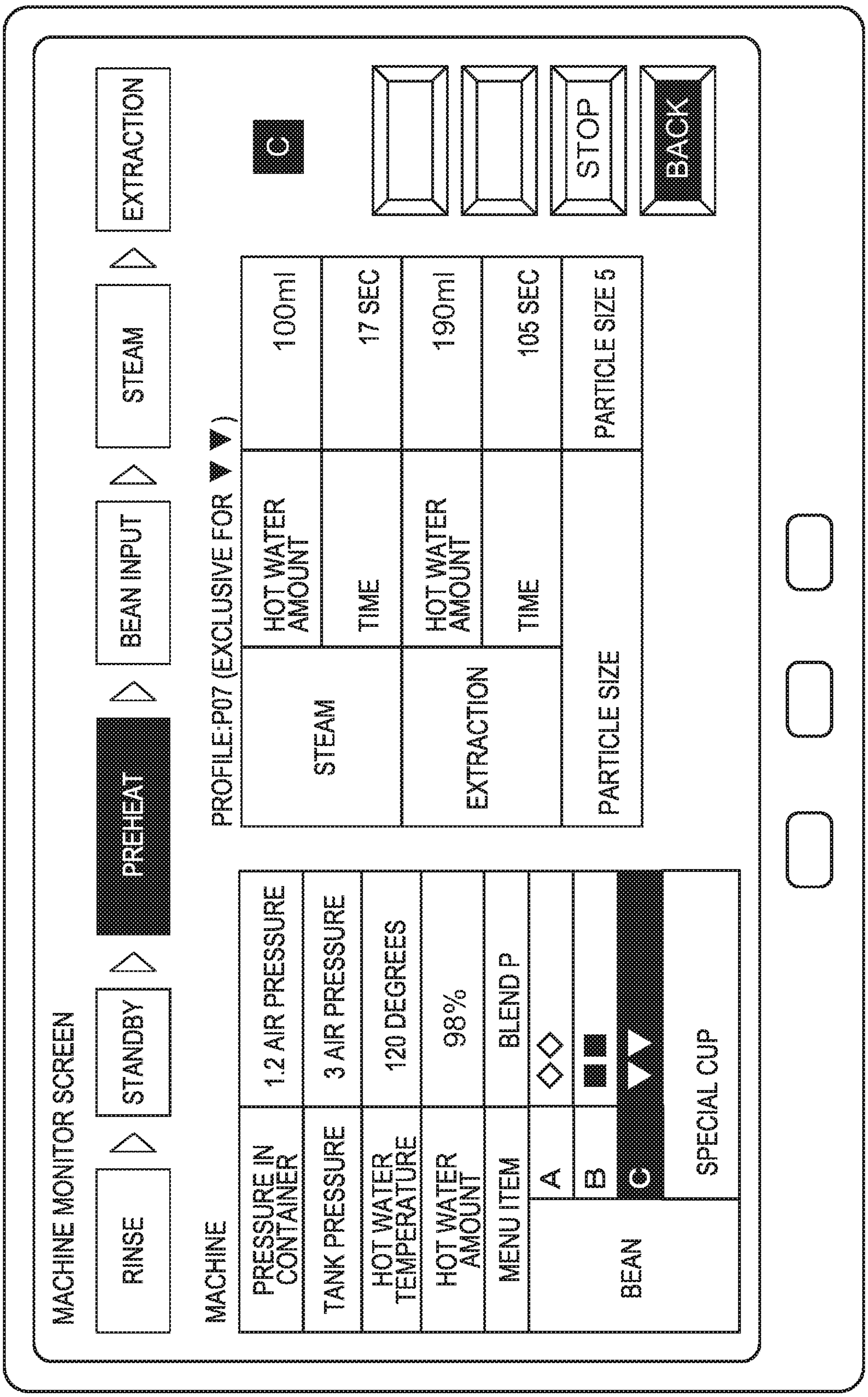
Figure 186:
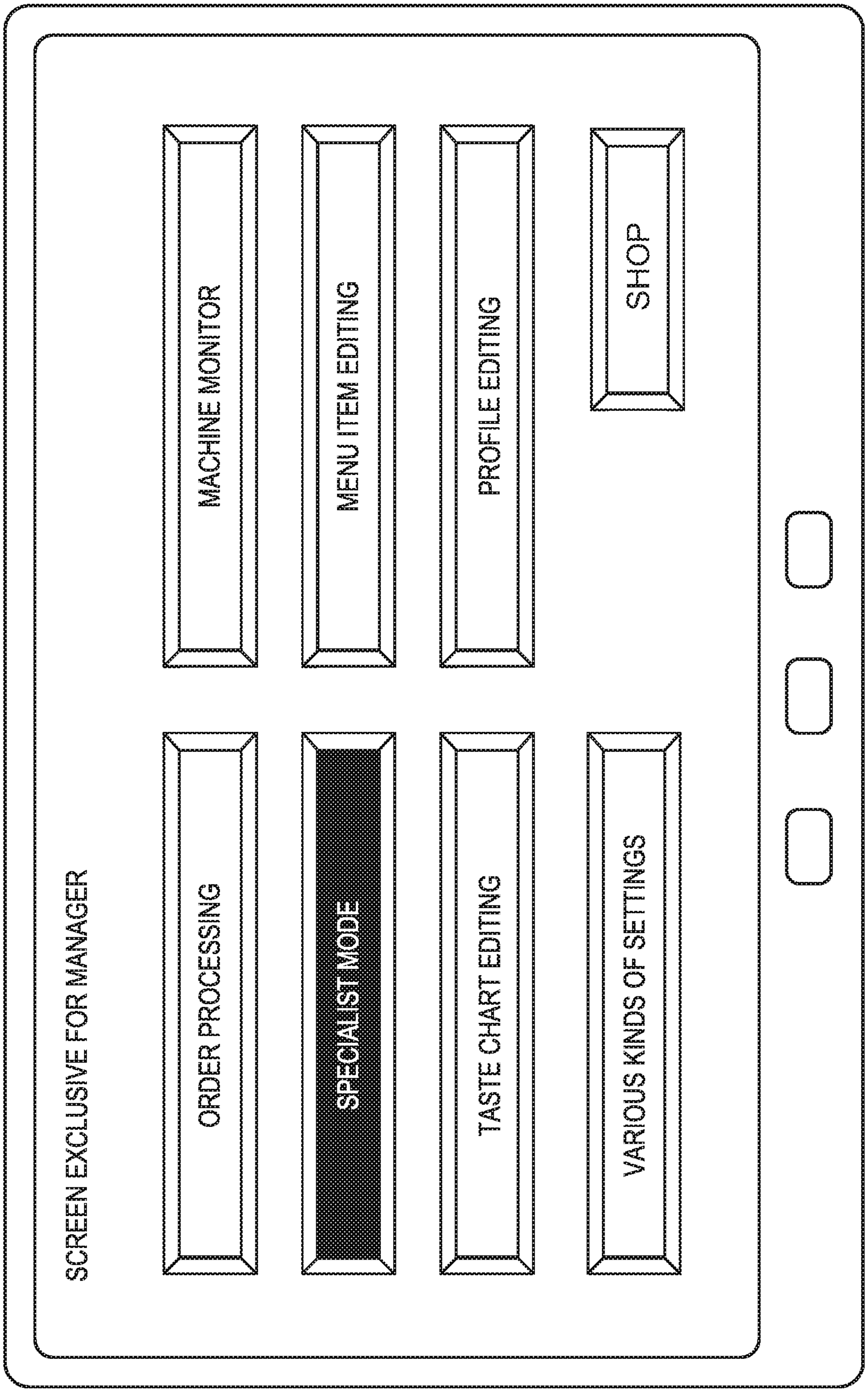
Figure 187:
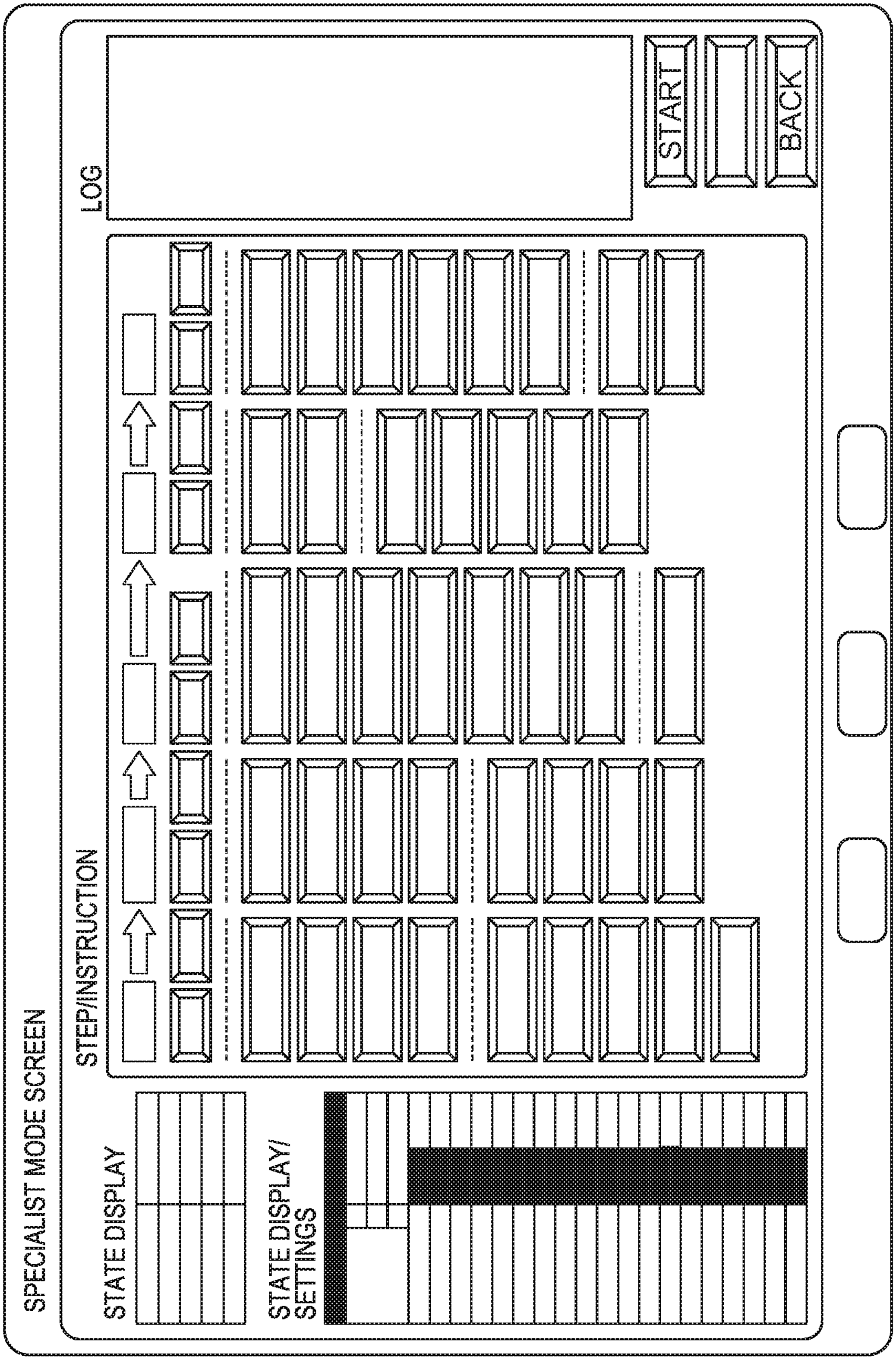
Figure 189:
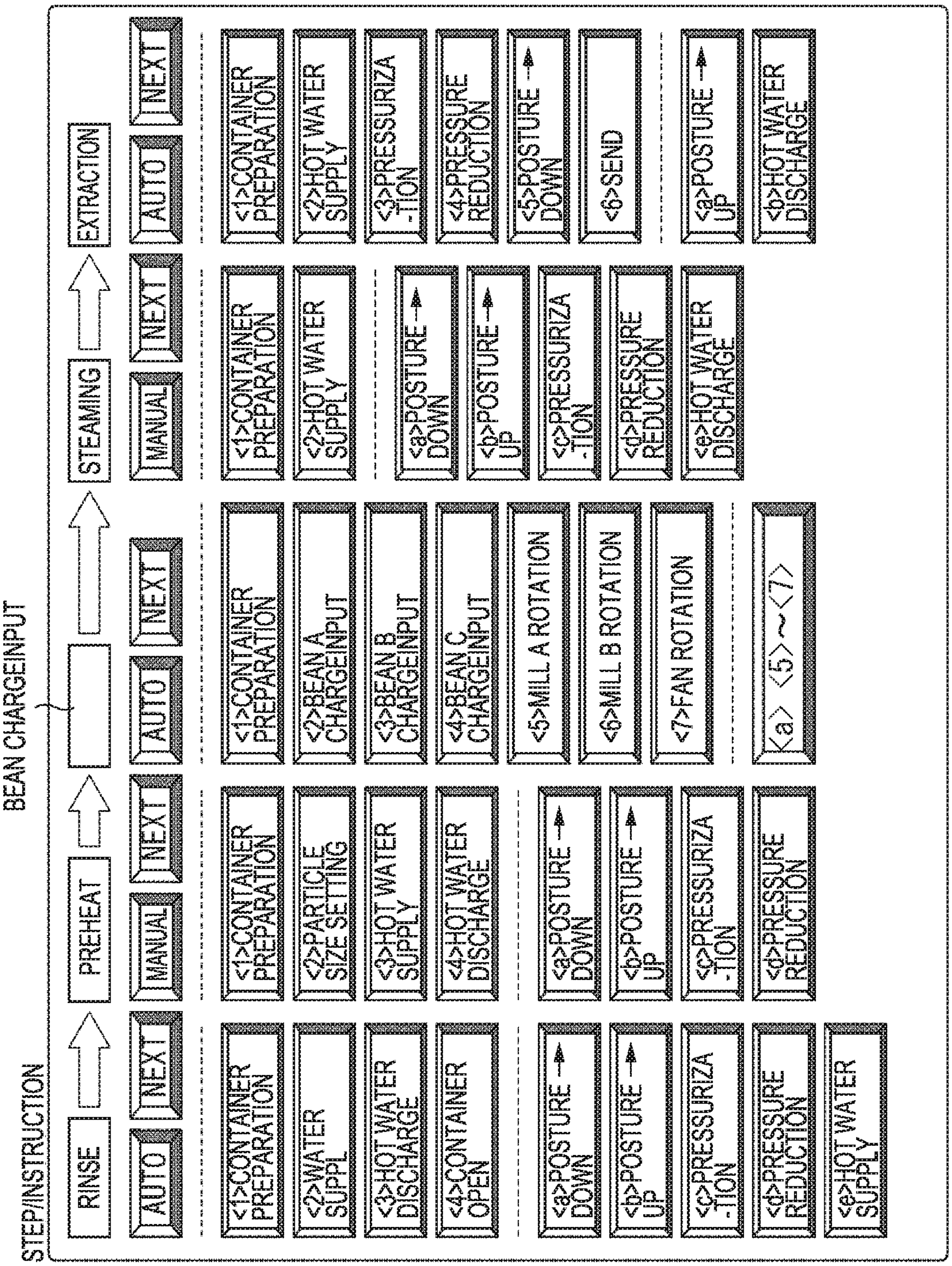
Figure 191:
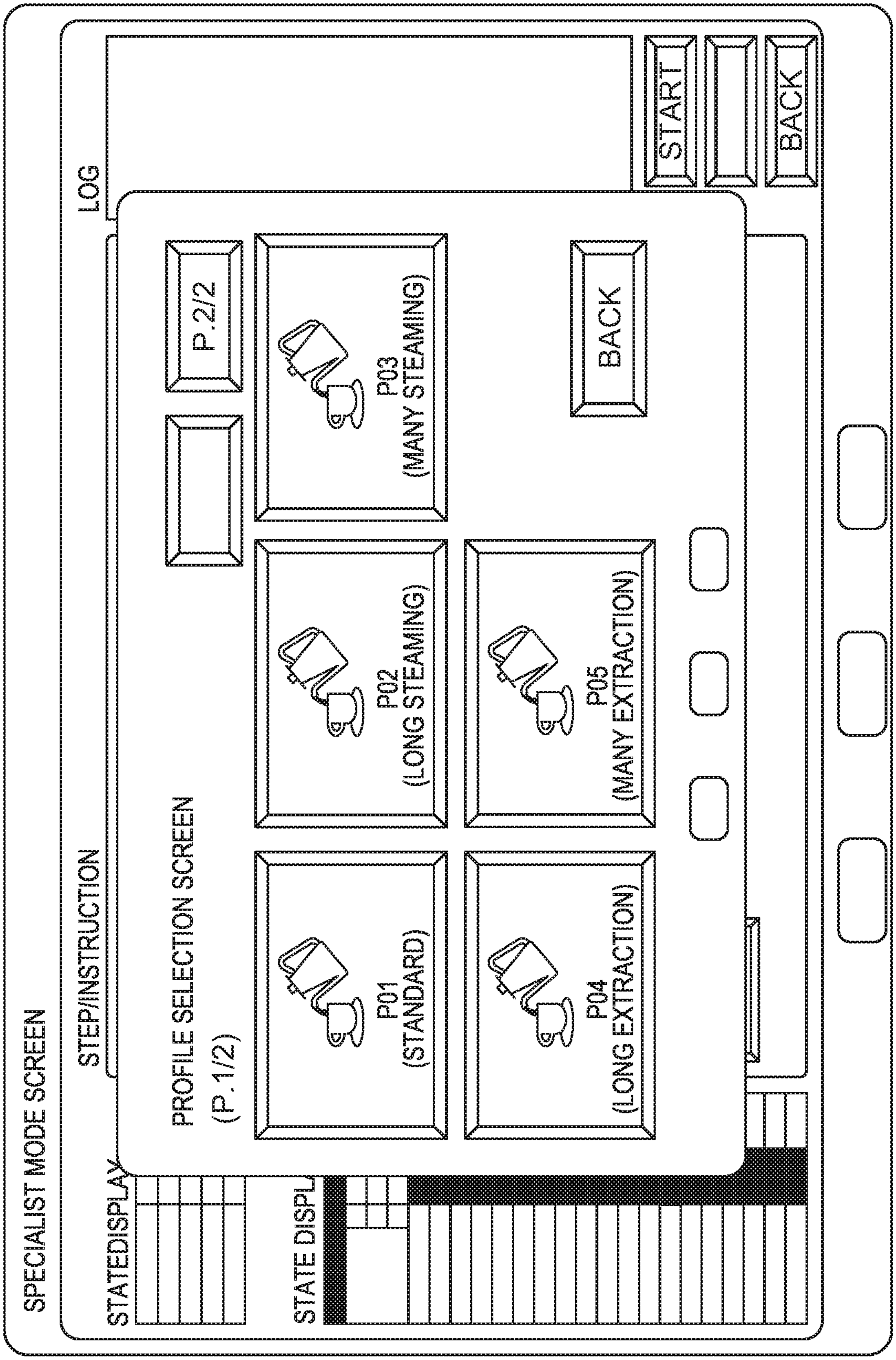
Figure 192:
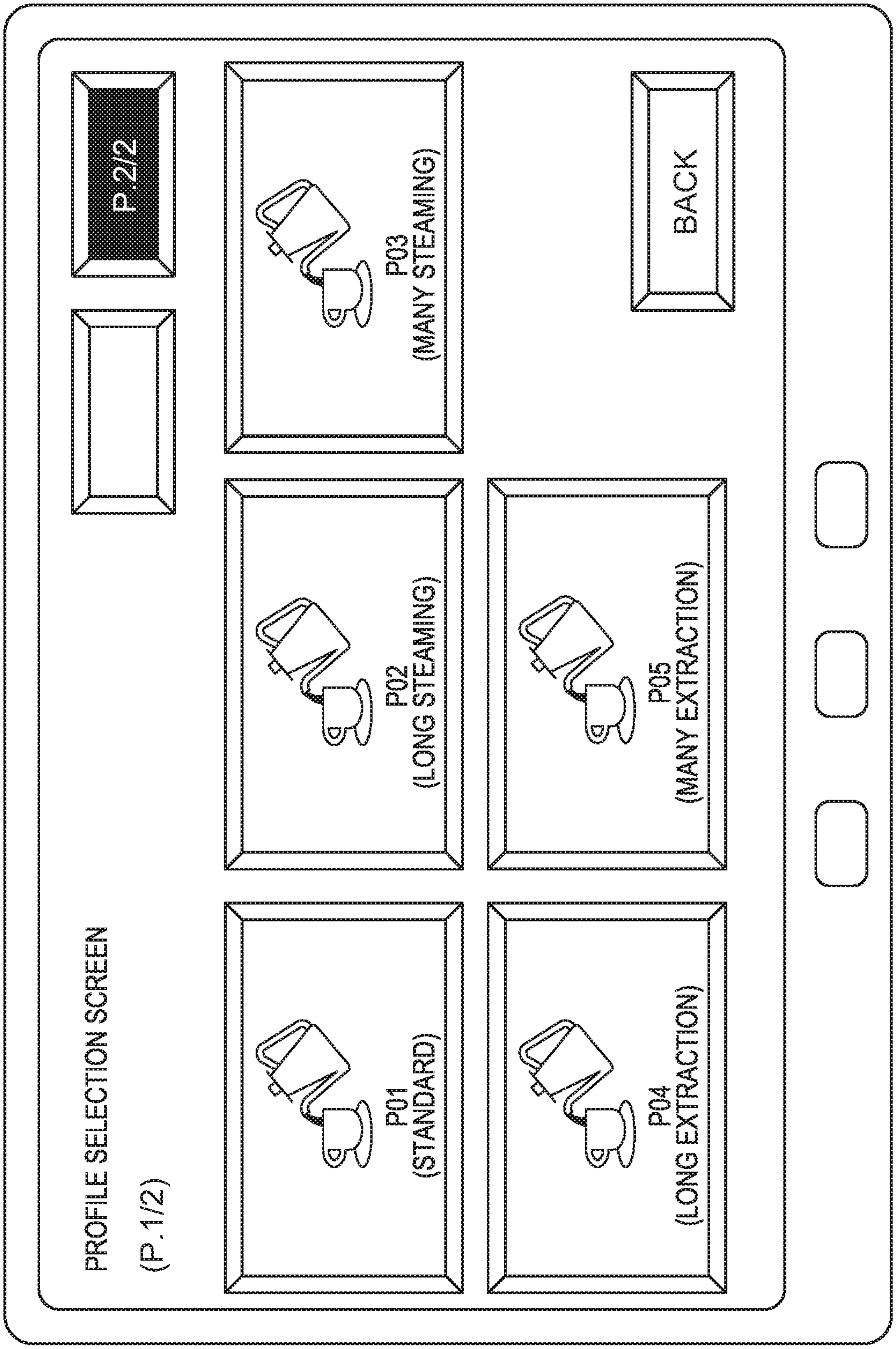
Figure 193:
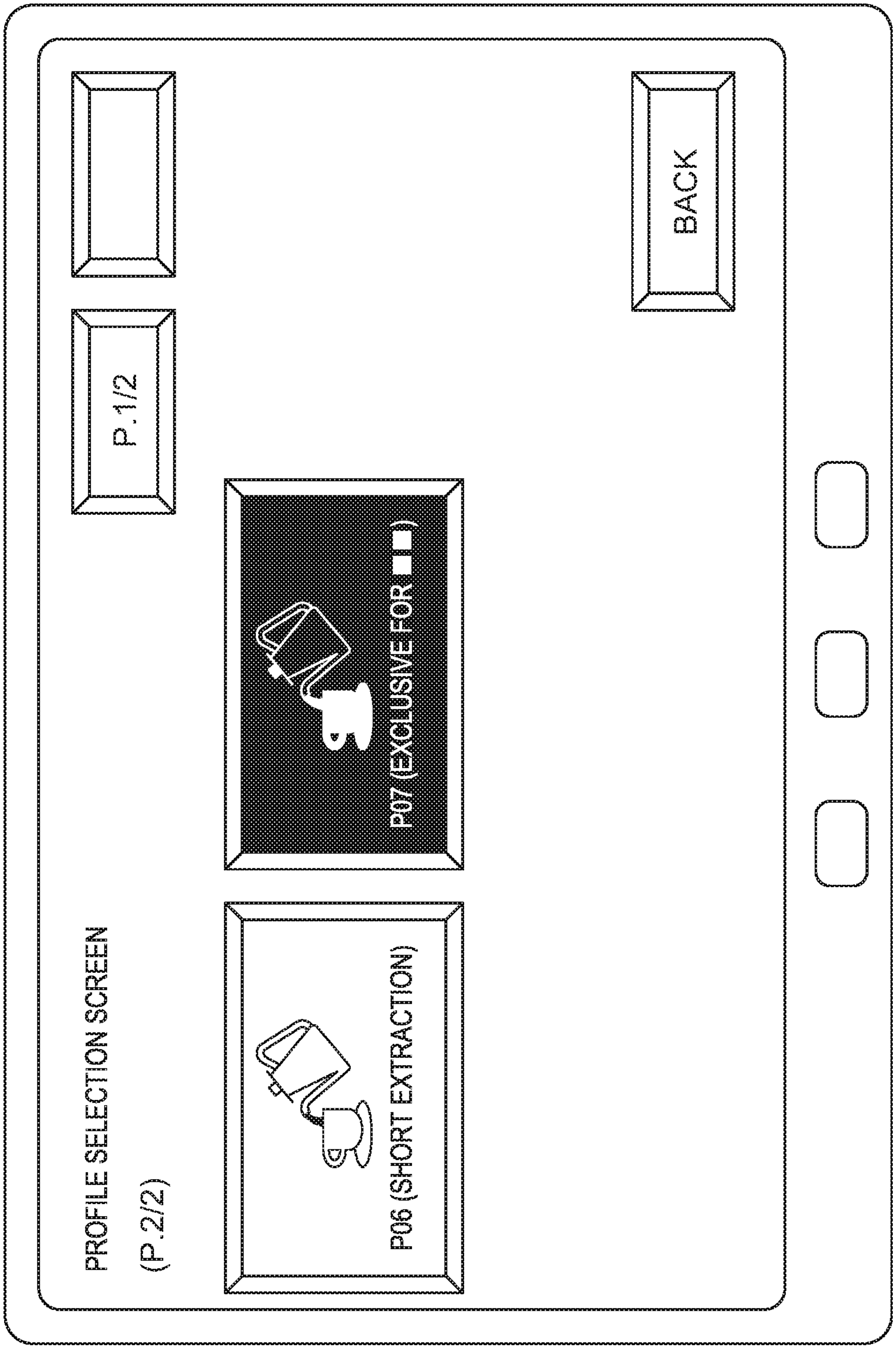
Figure 194:
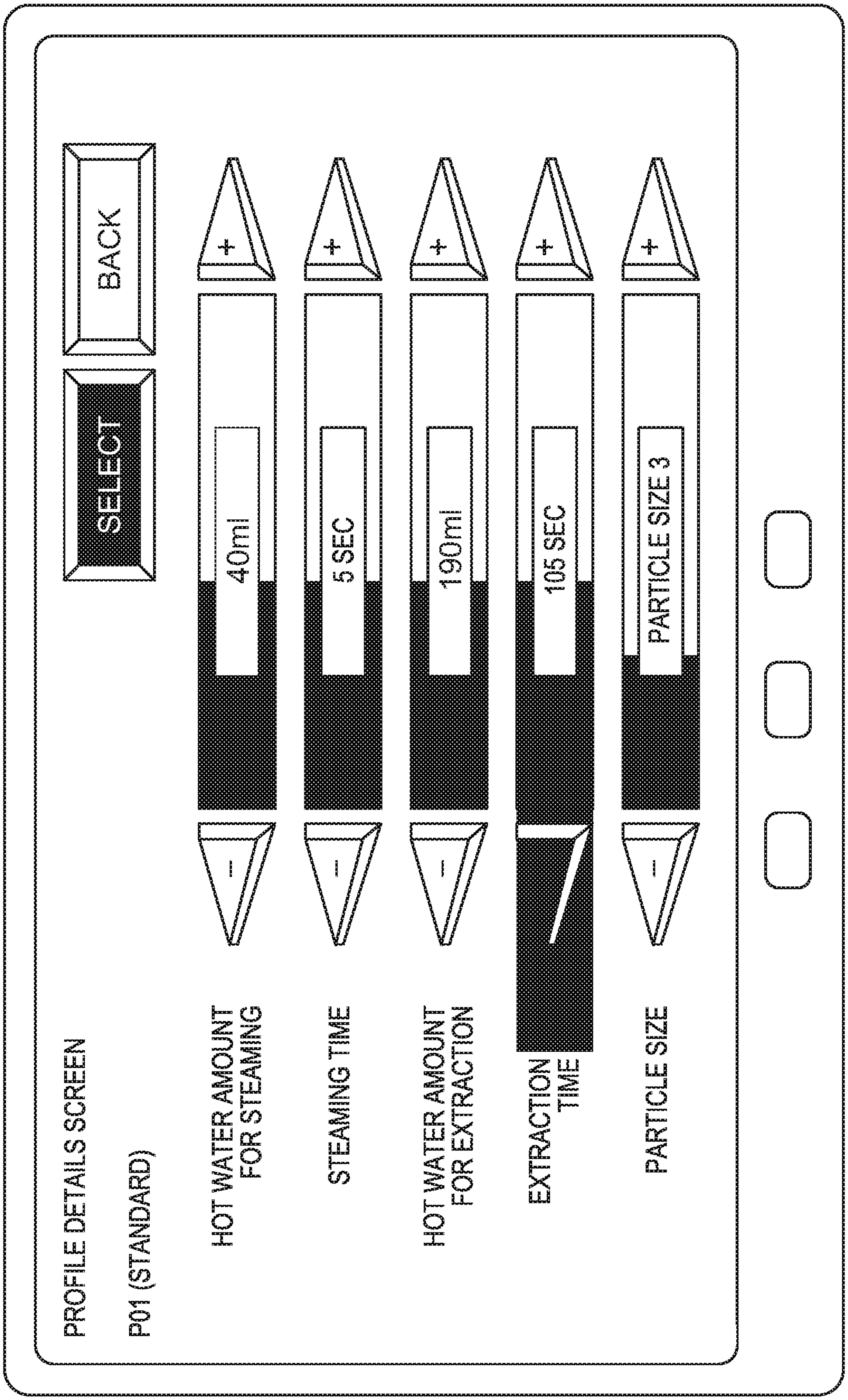
Figure 195:
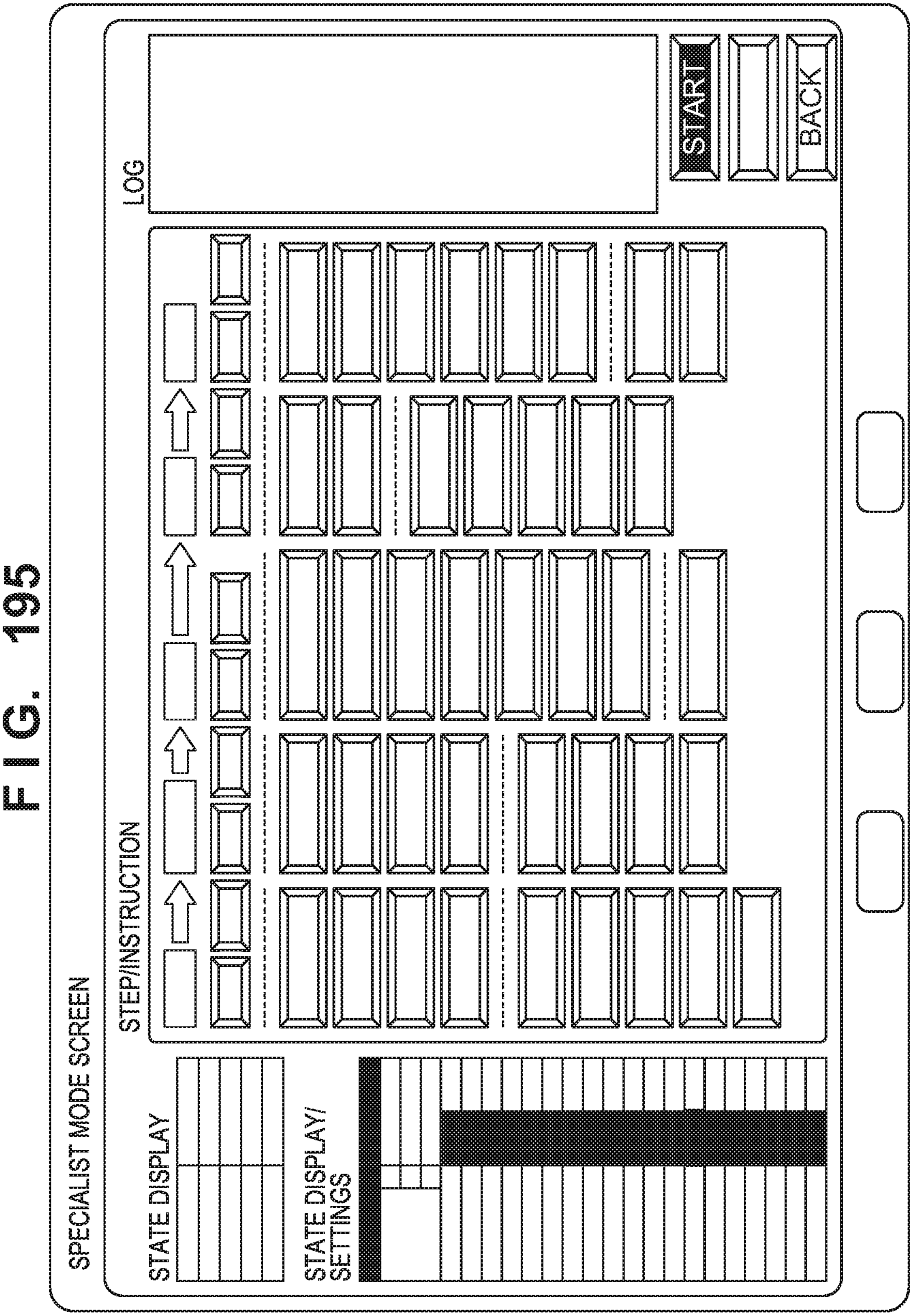
Figure 196:
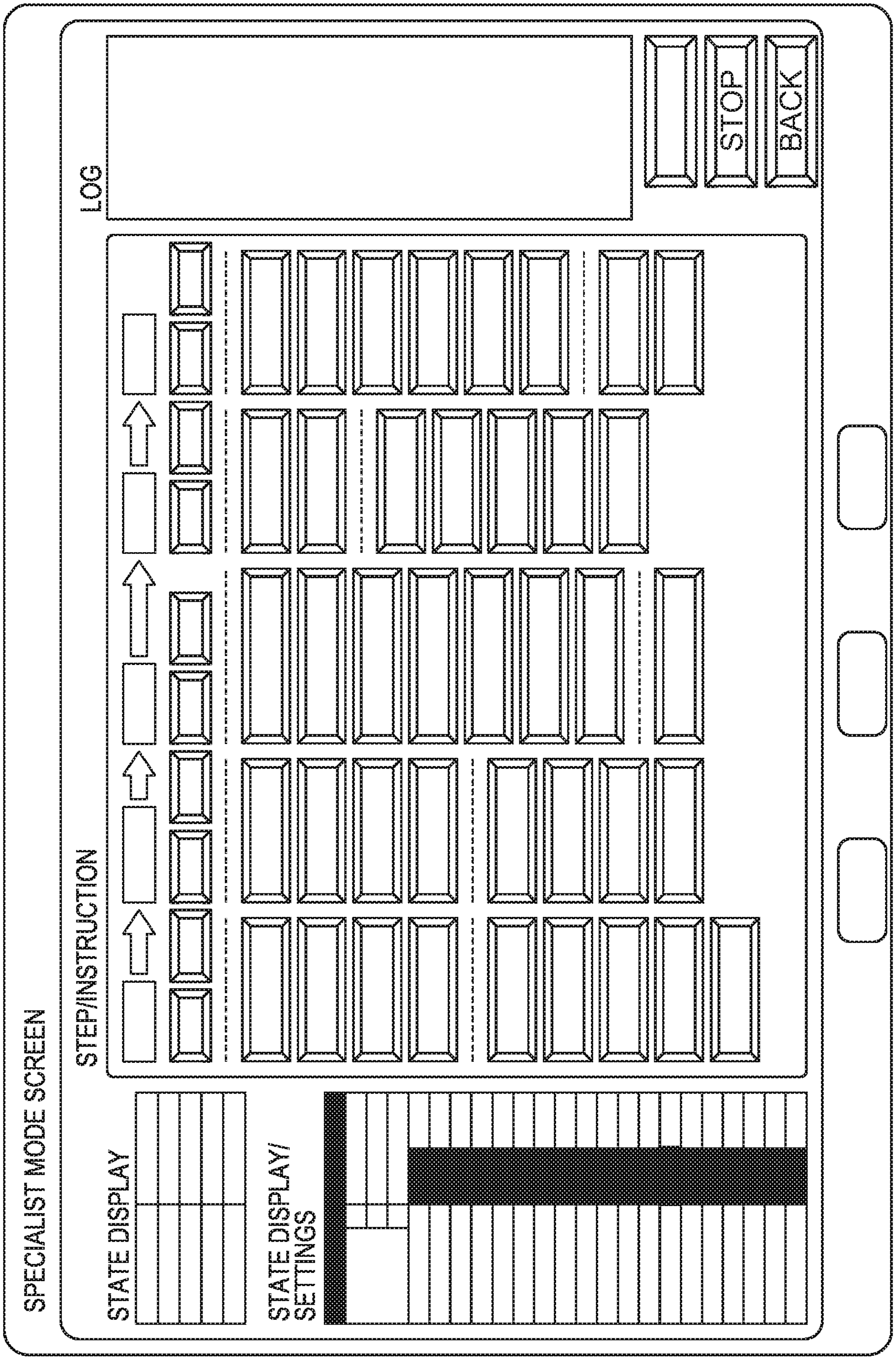
Figure 197:
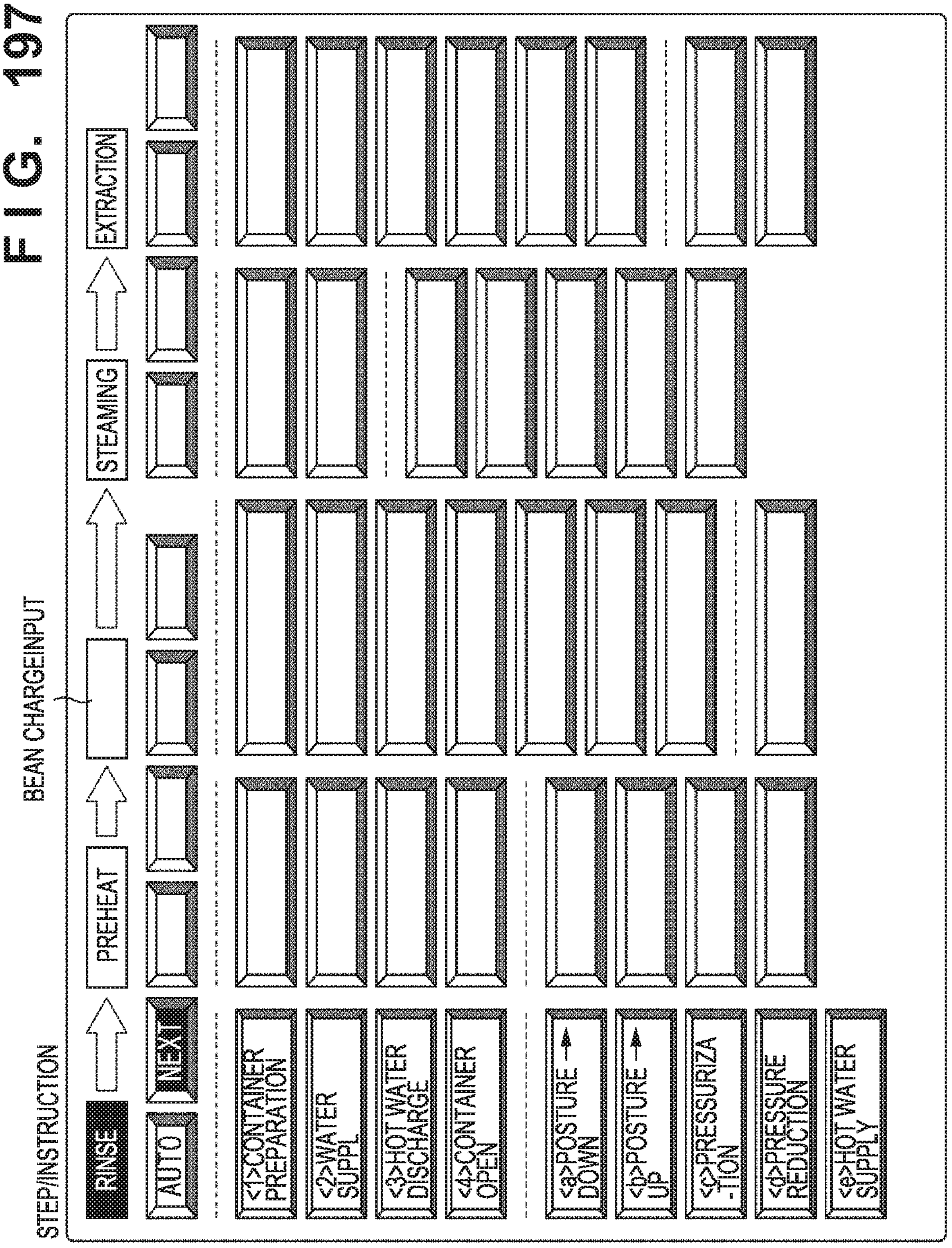
Figure 199:
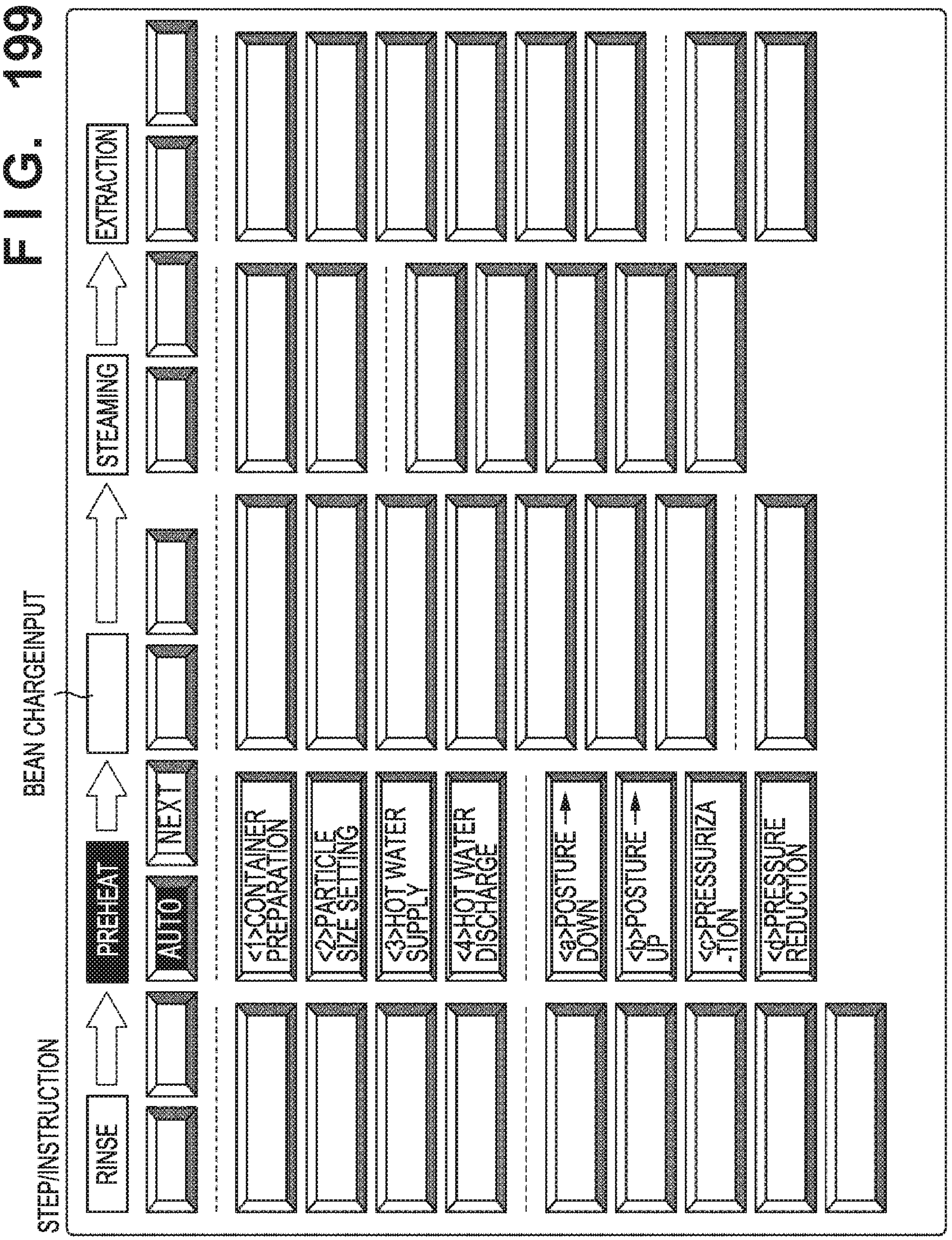
Figure 200:
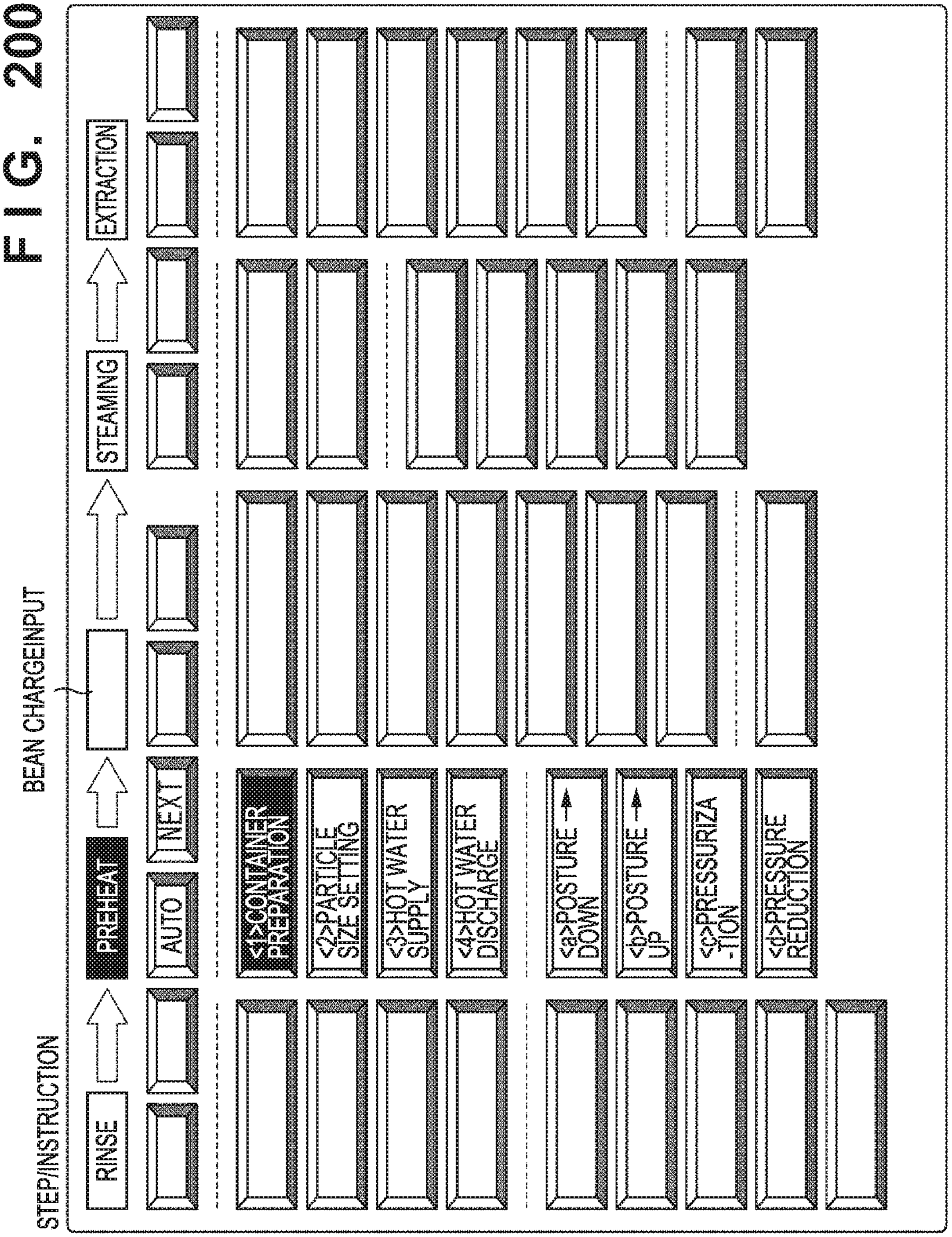
Figure 201:
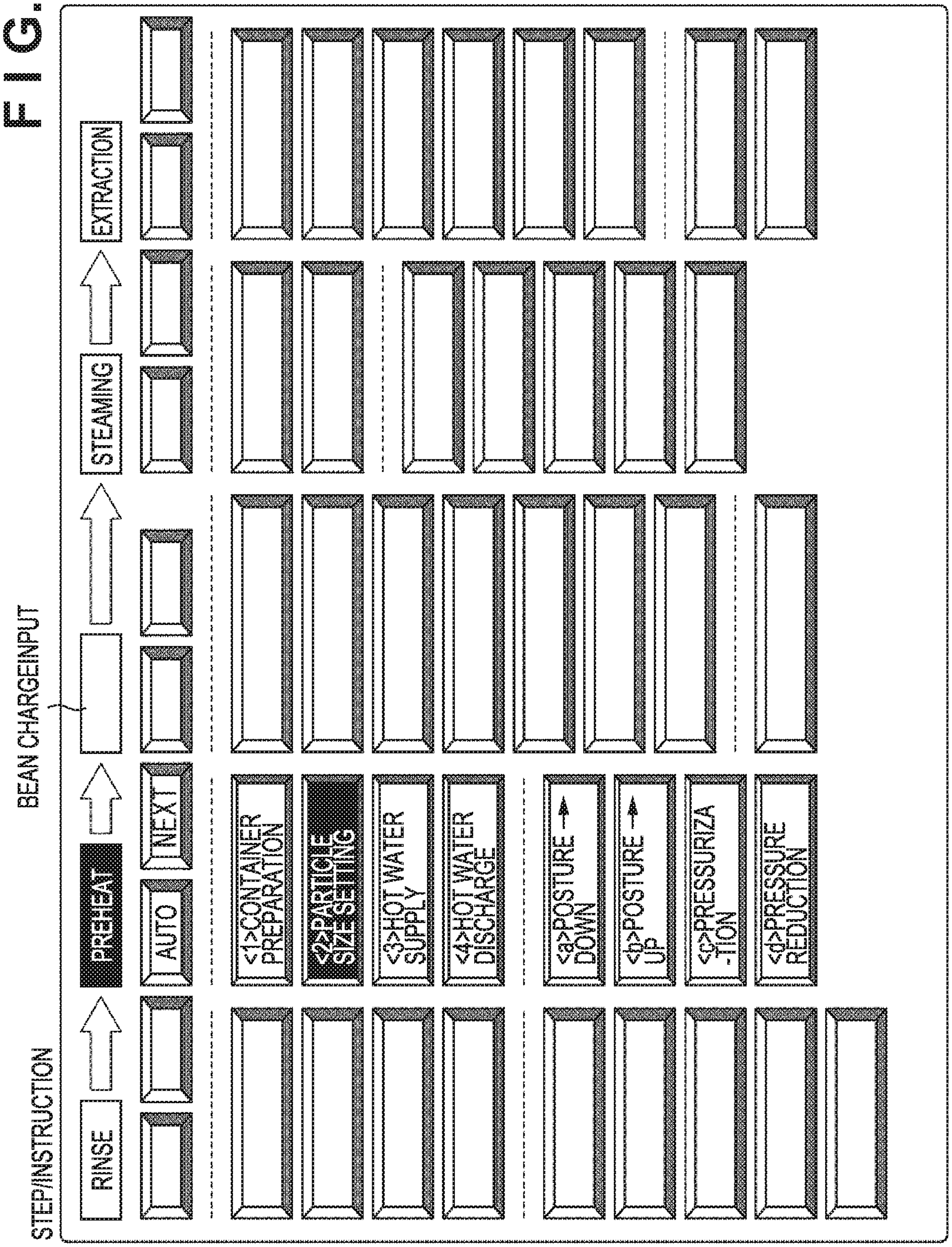
Figure 203:
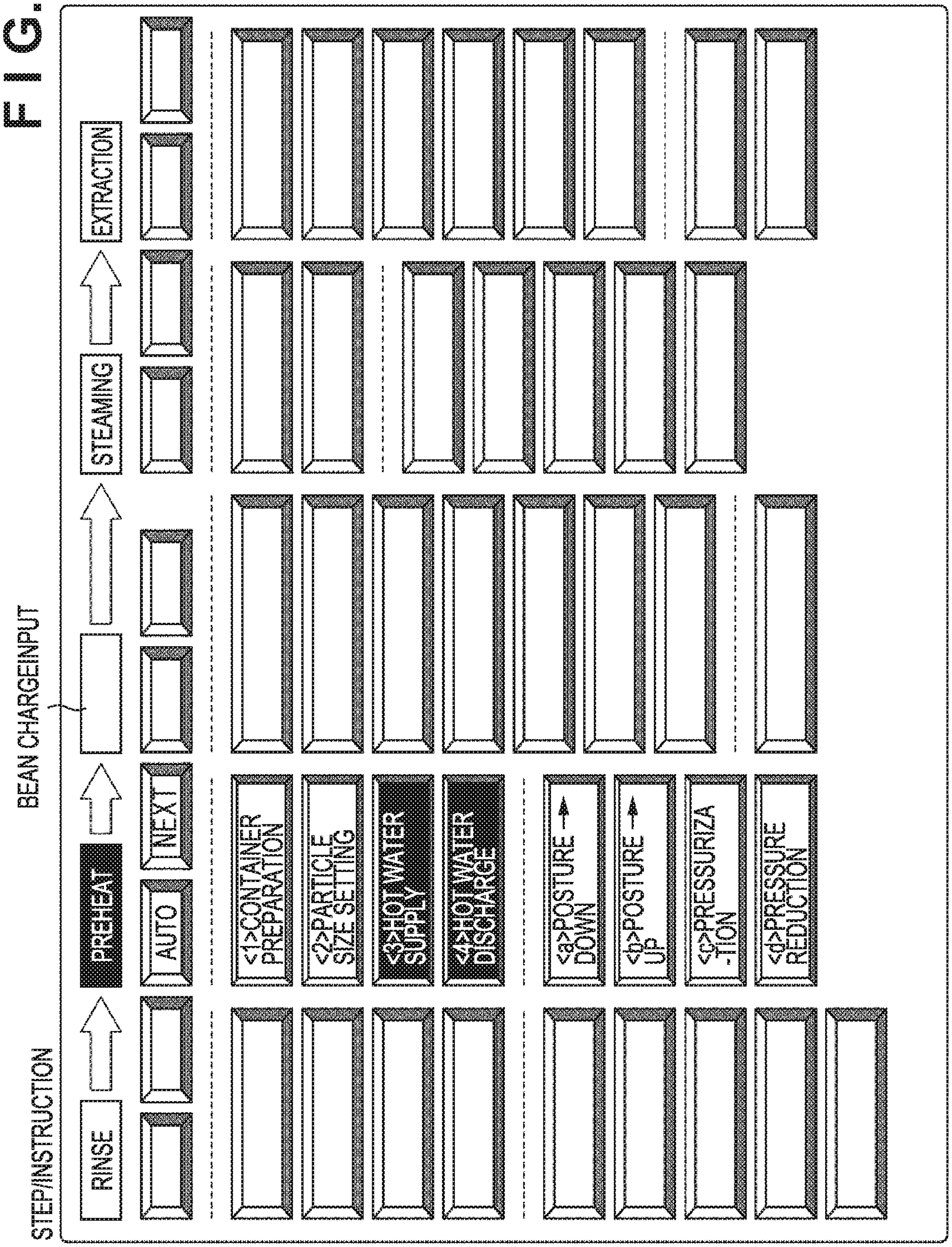
Figure 204:
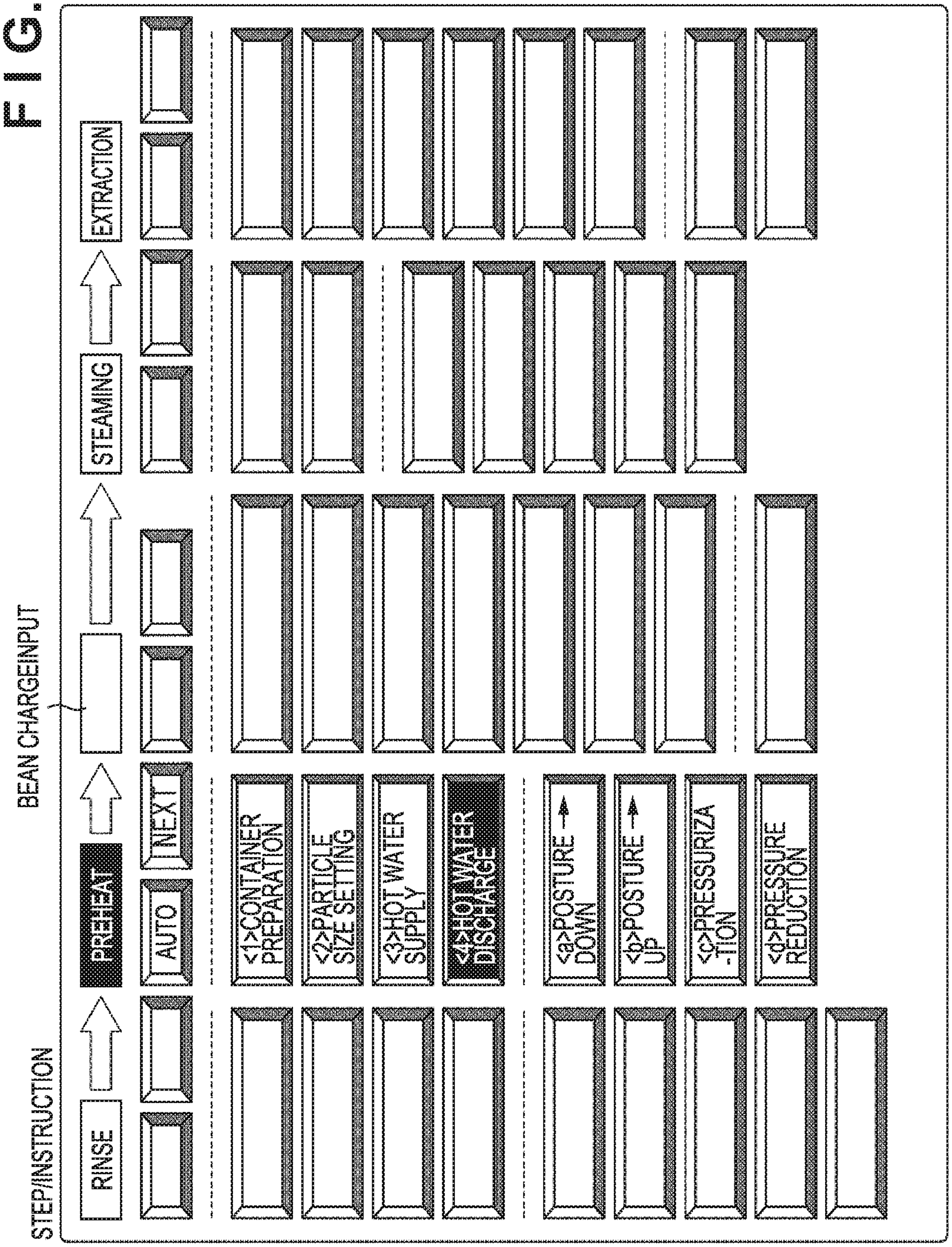
Figure 207:
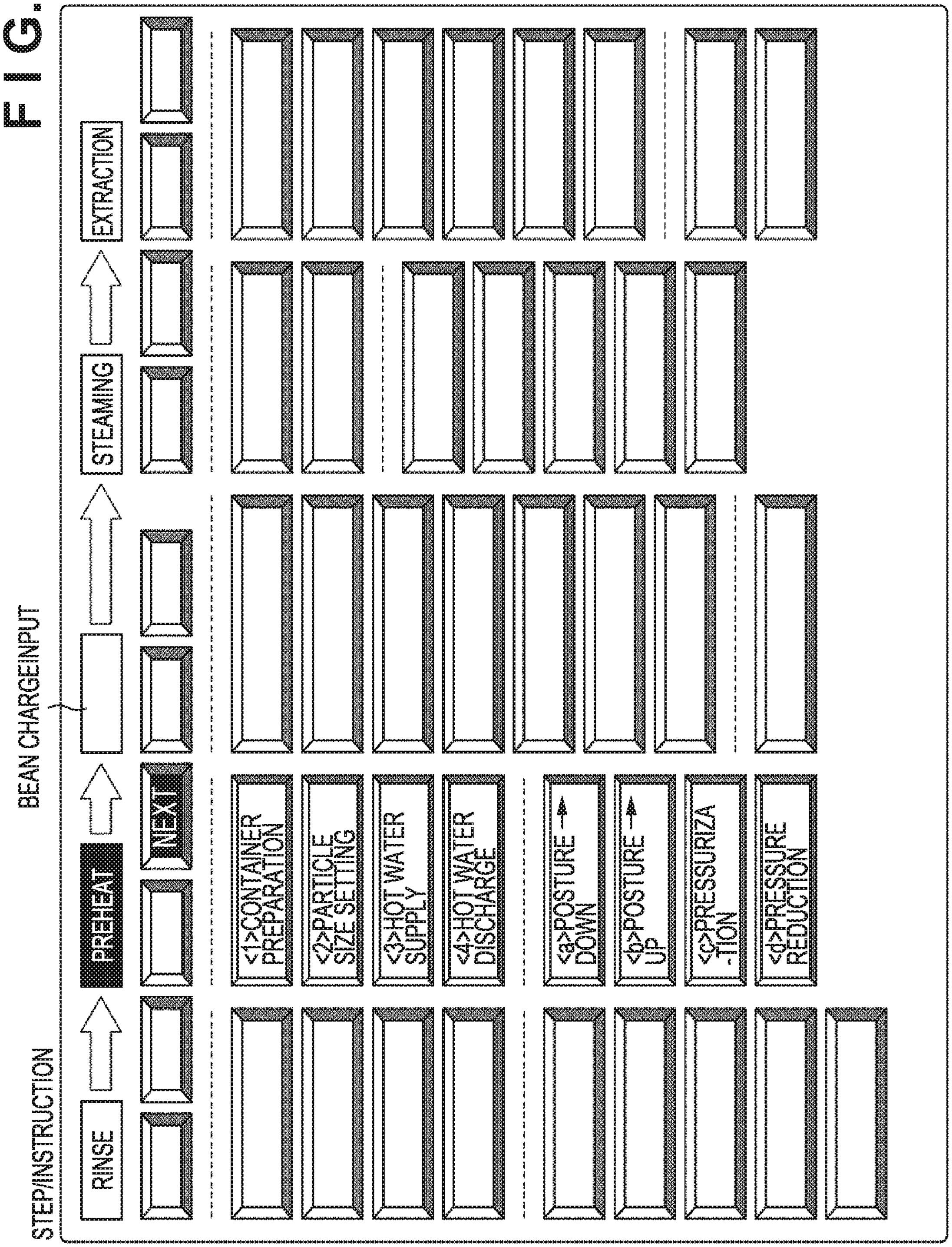
Figure 209:
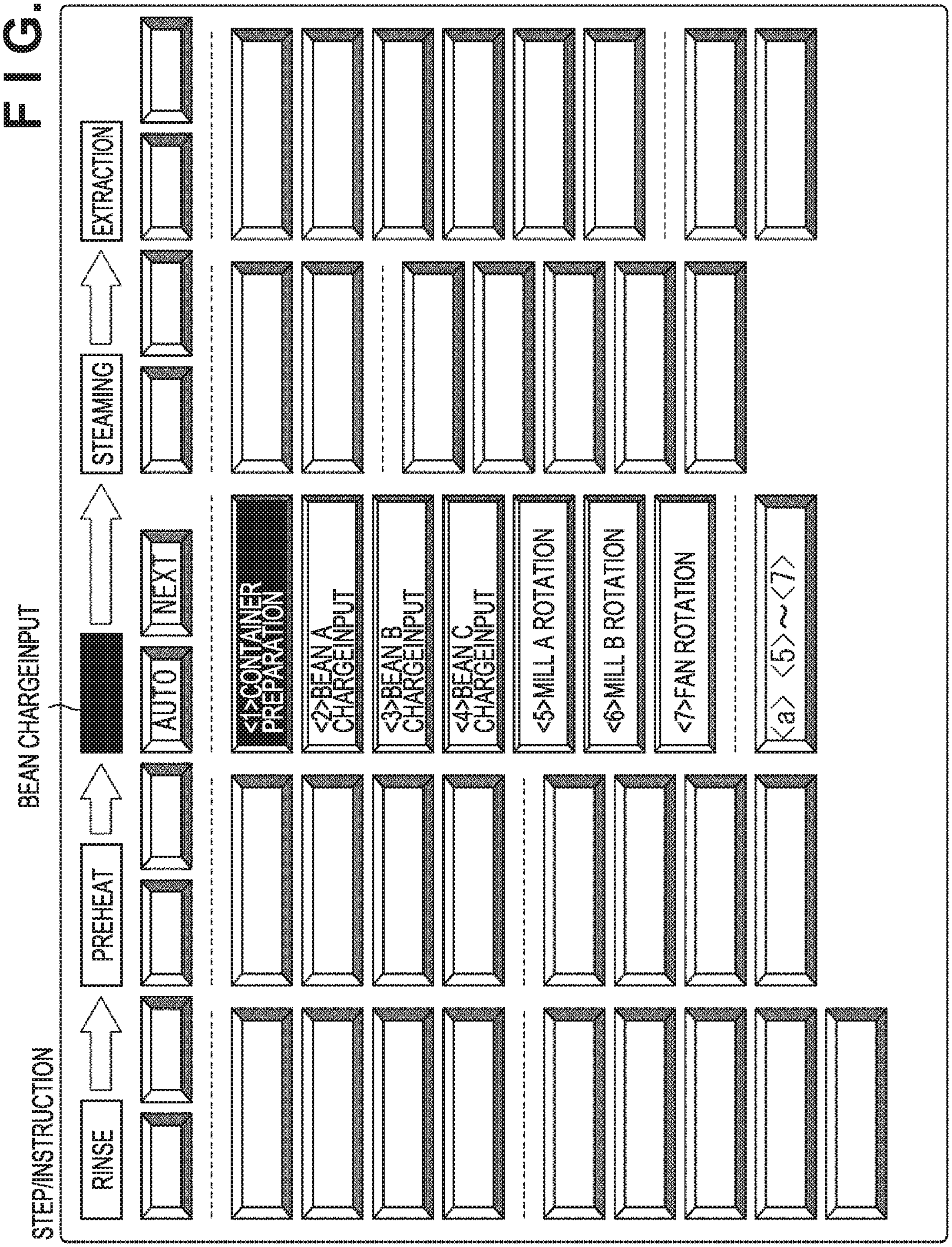
Figure 210:
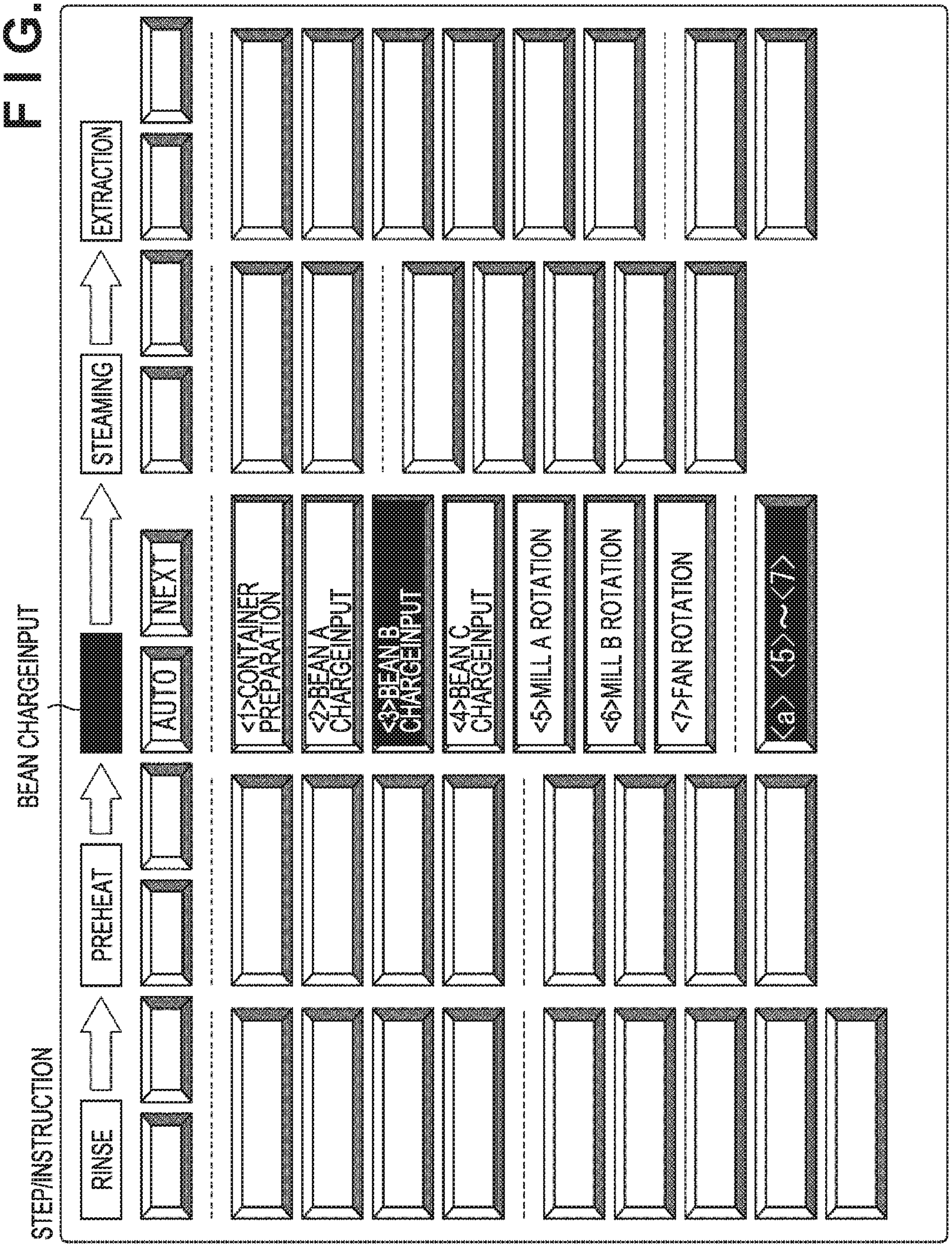
Figure 212:
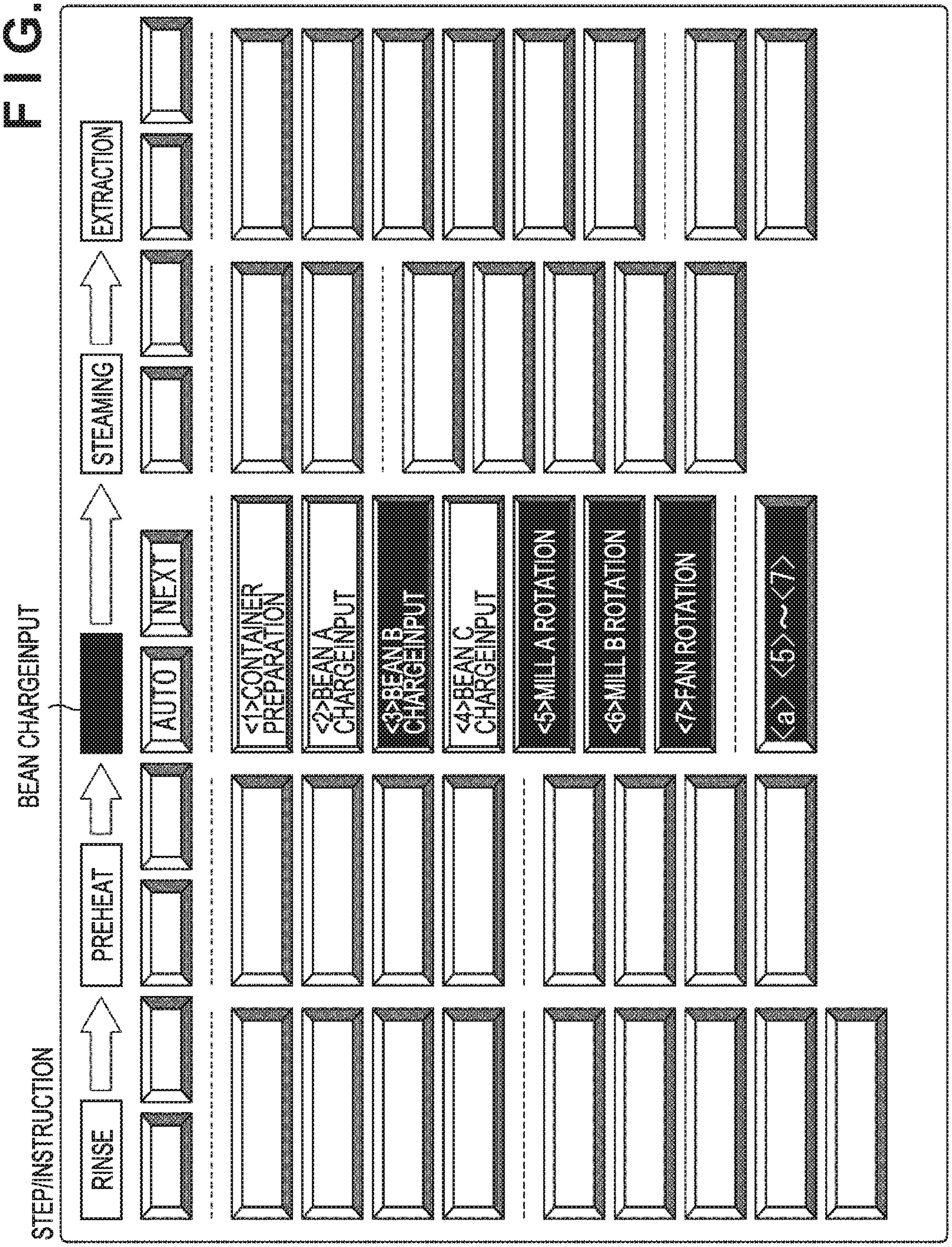
Figure 214:
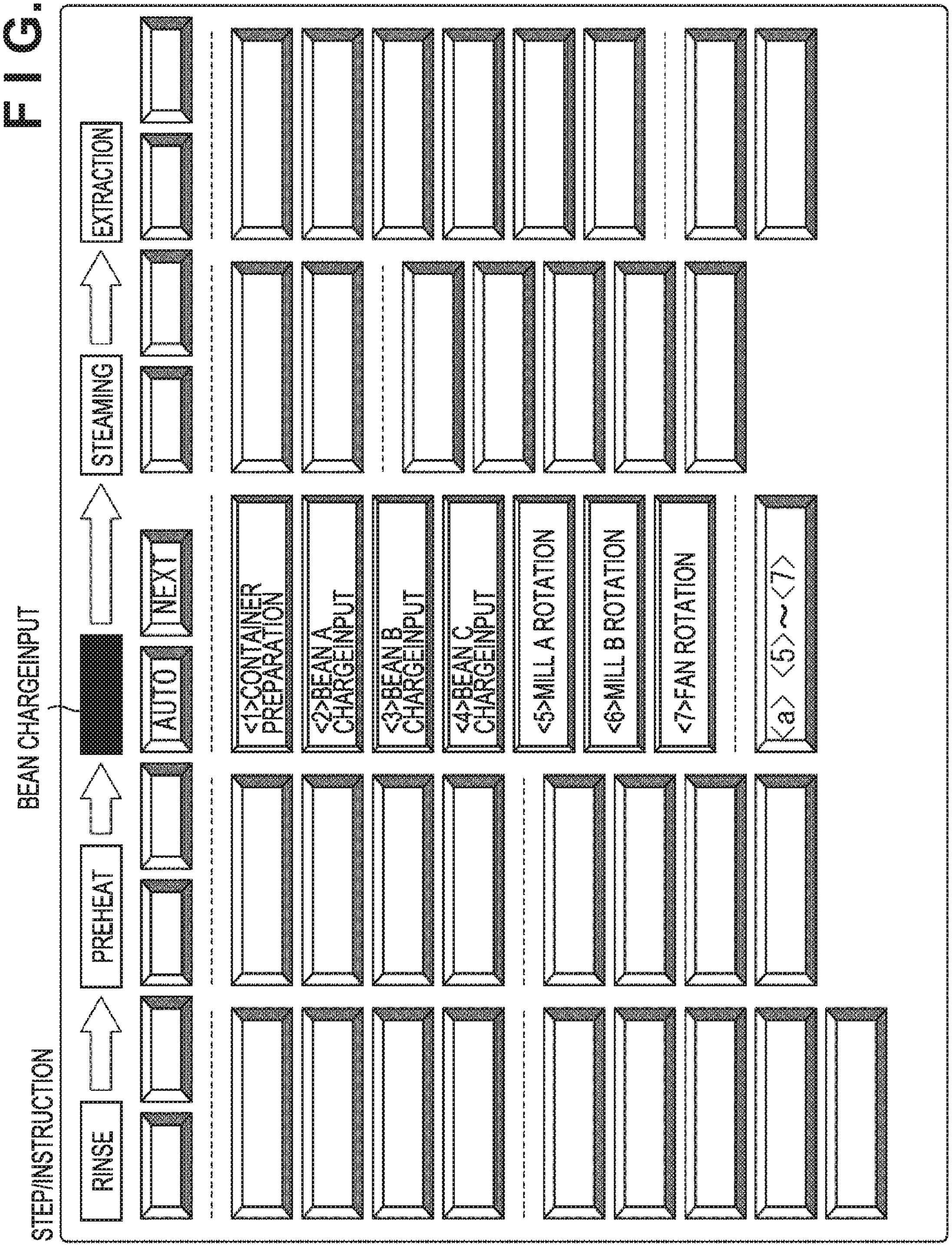
Figure 217:
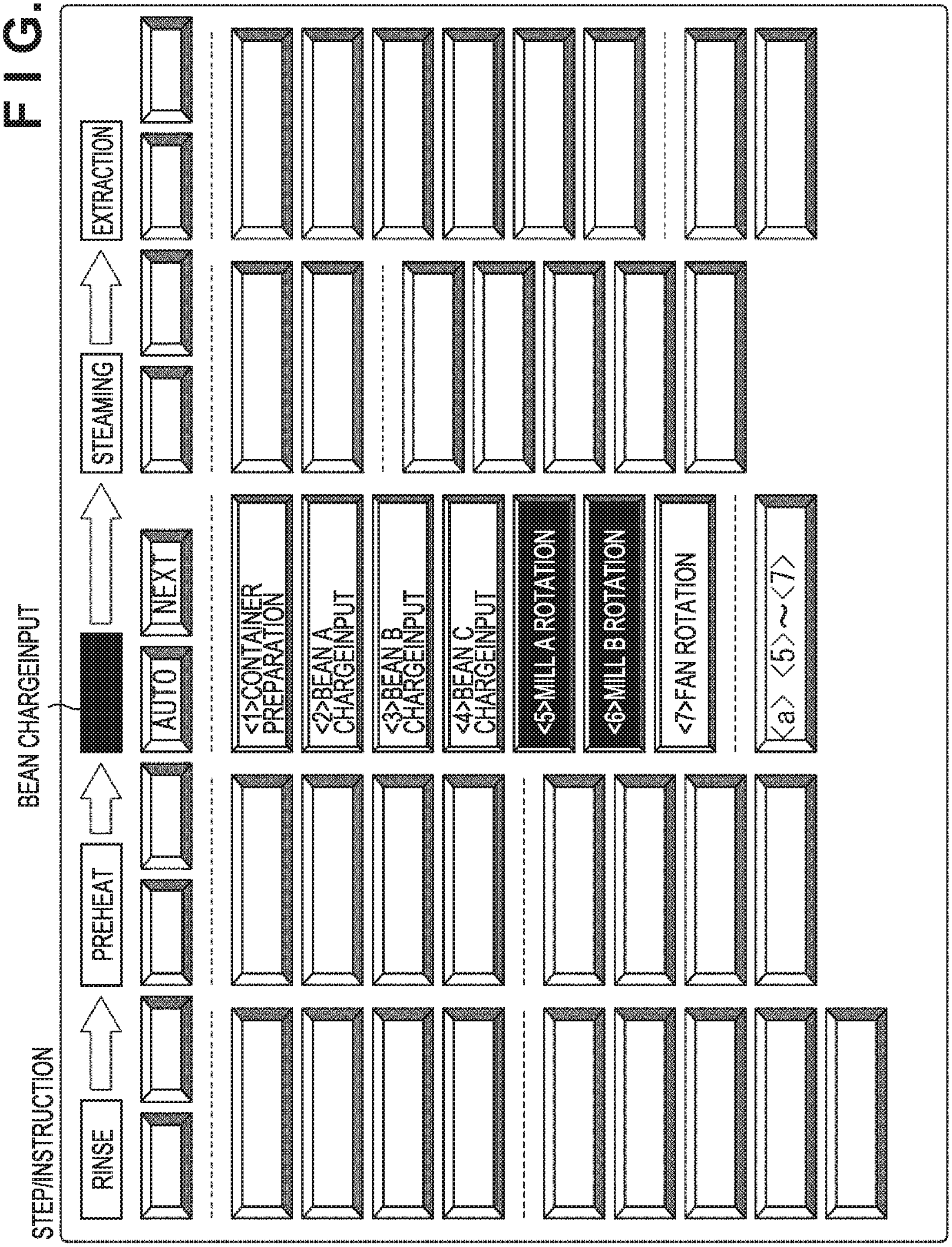
Figure 219:
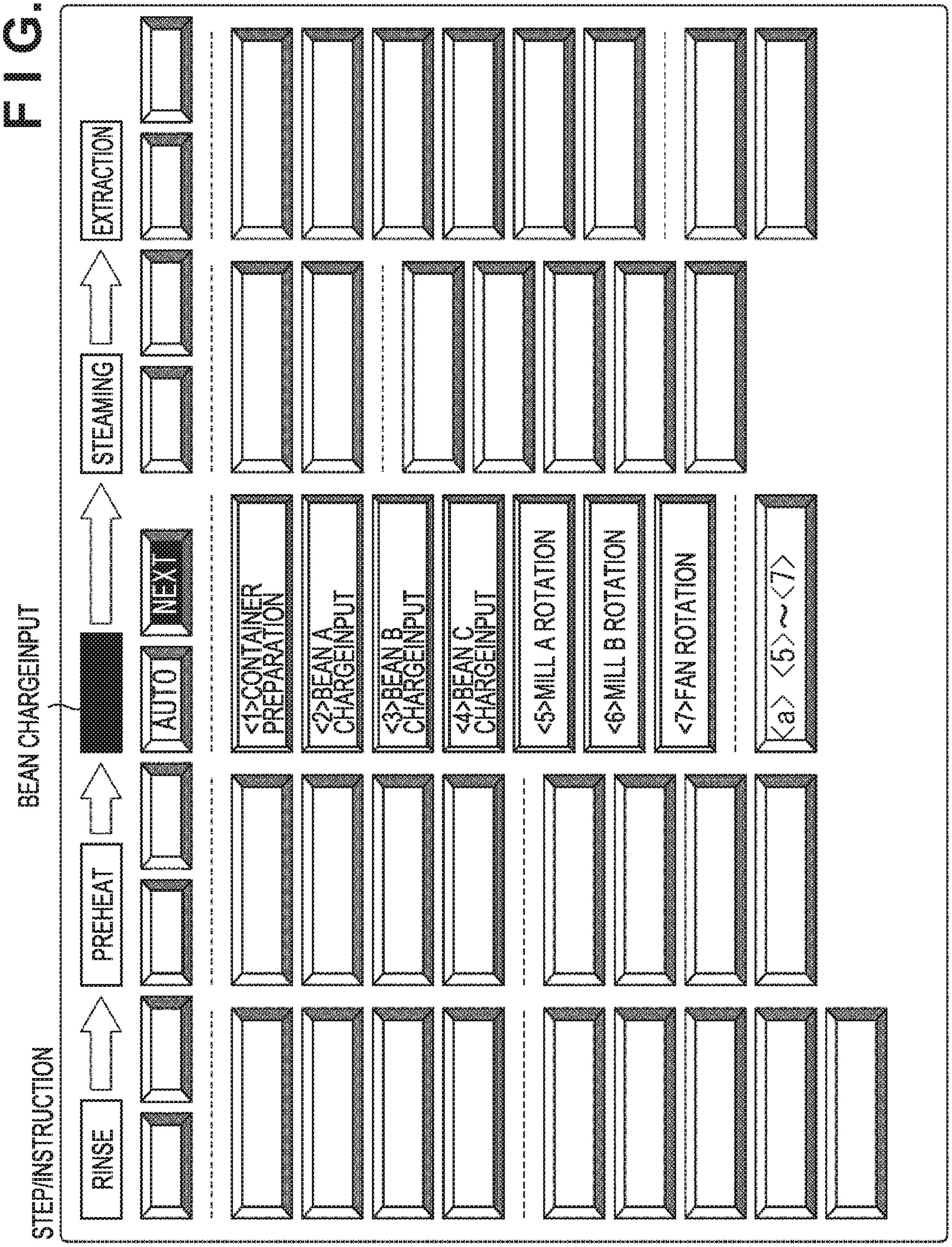
Figure 221:
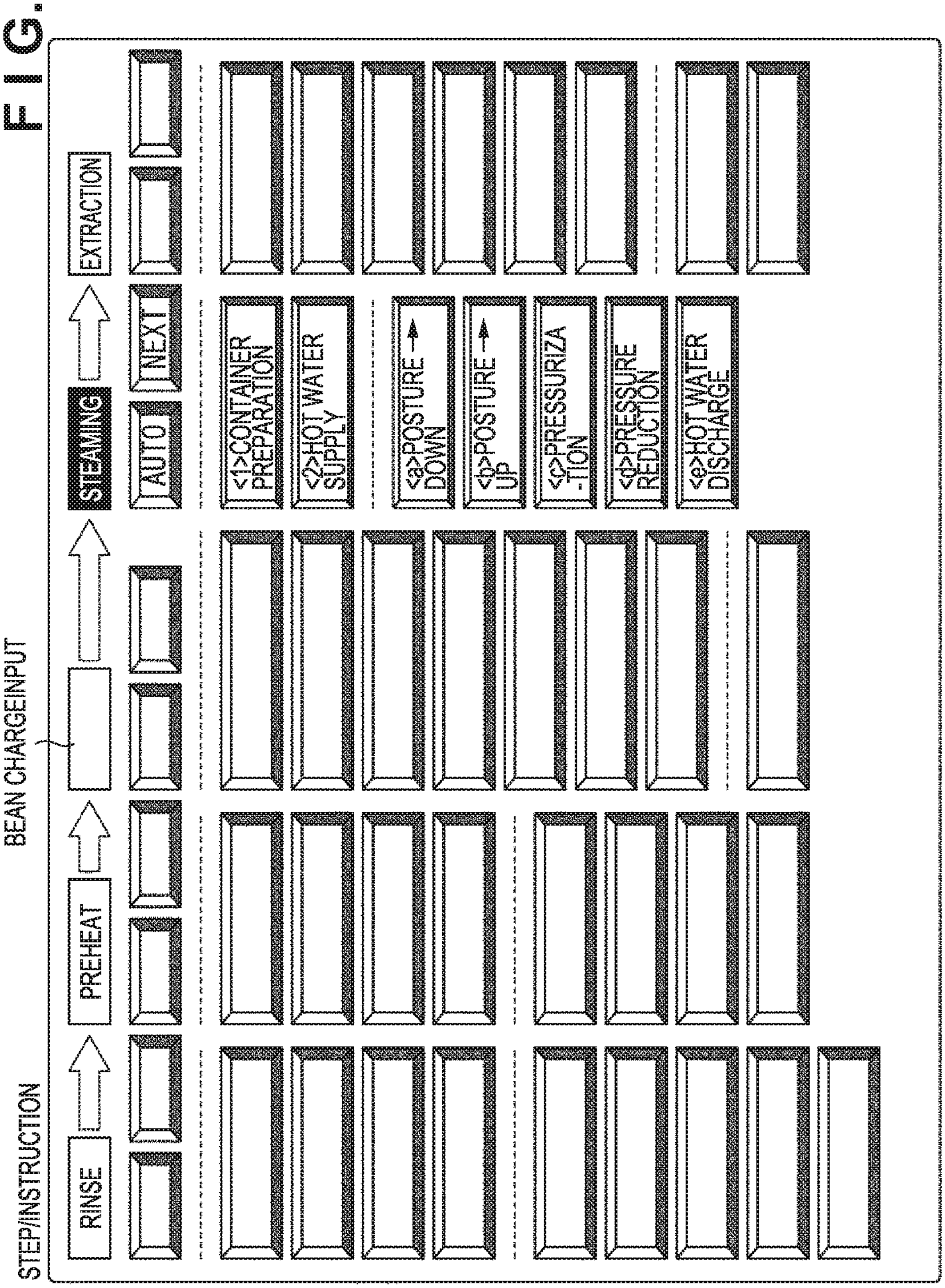
Figure 222:
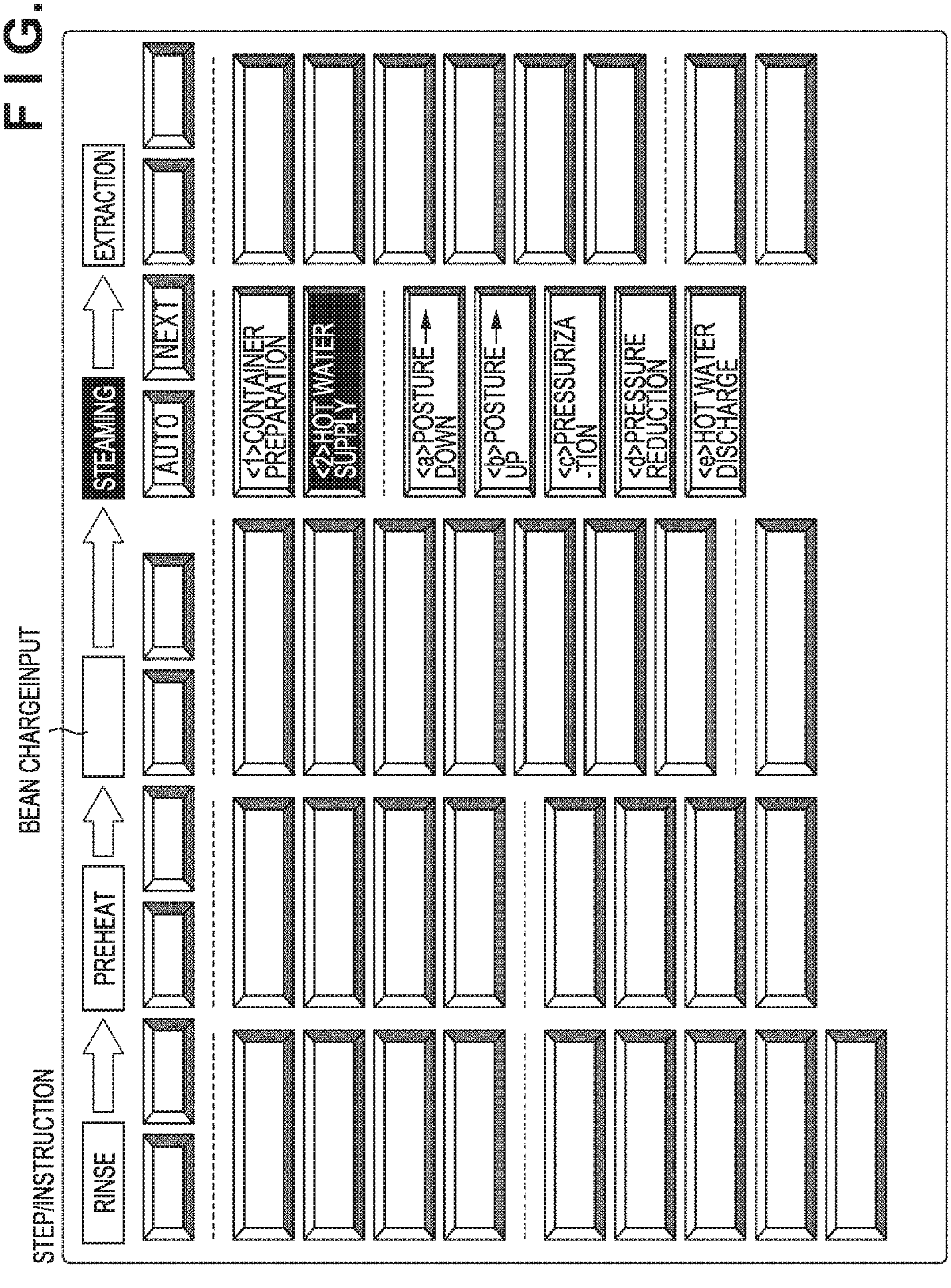
Figure 225:
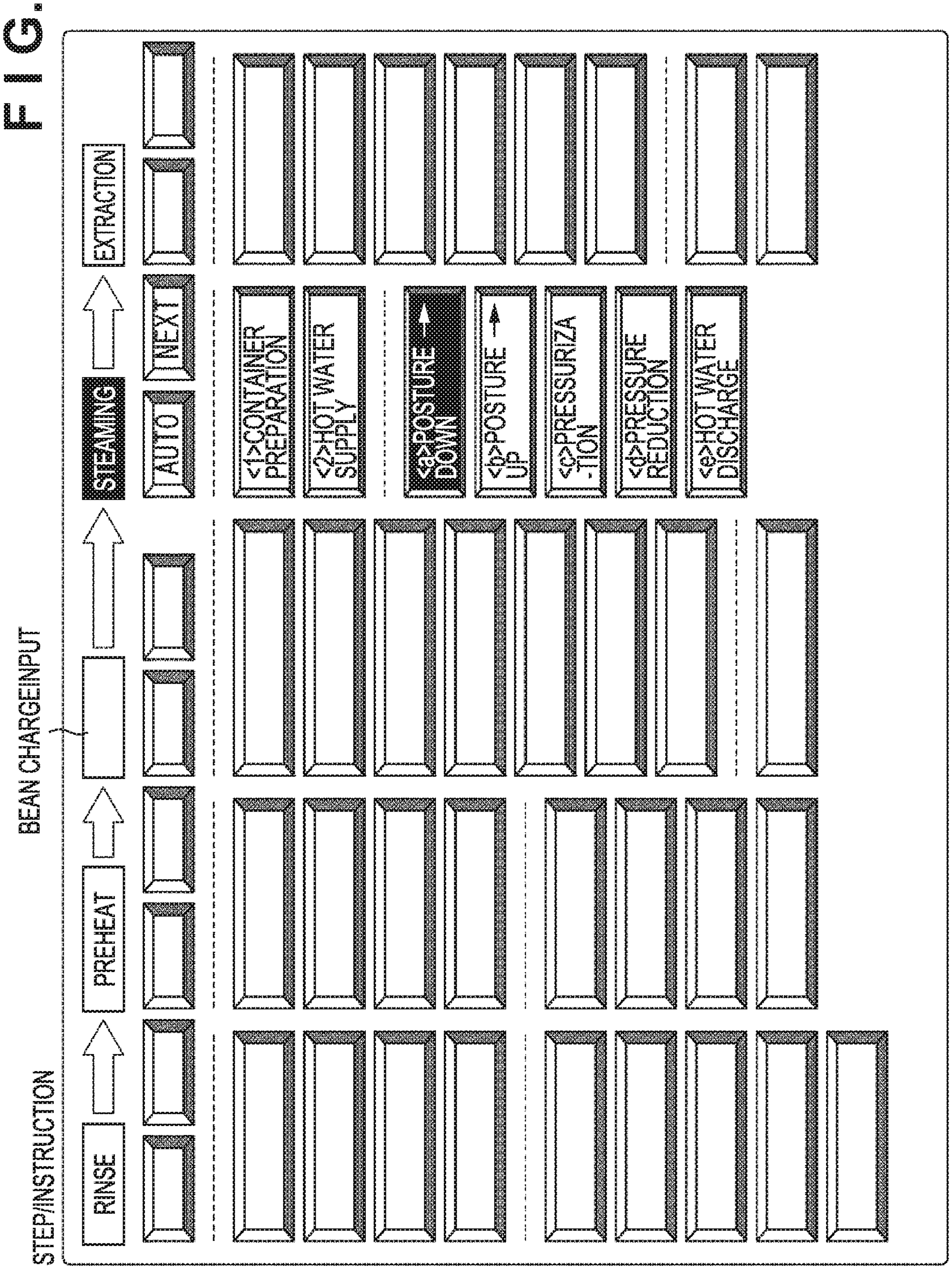
Figure 228:
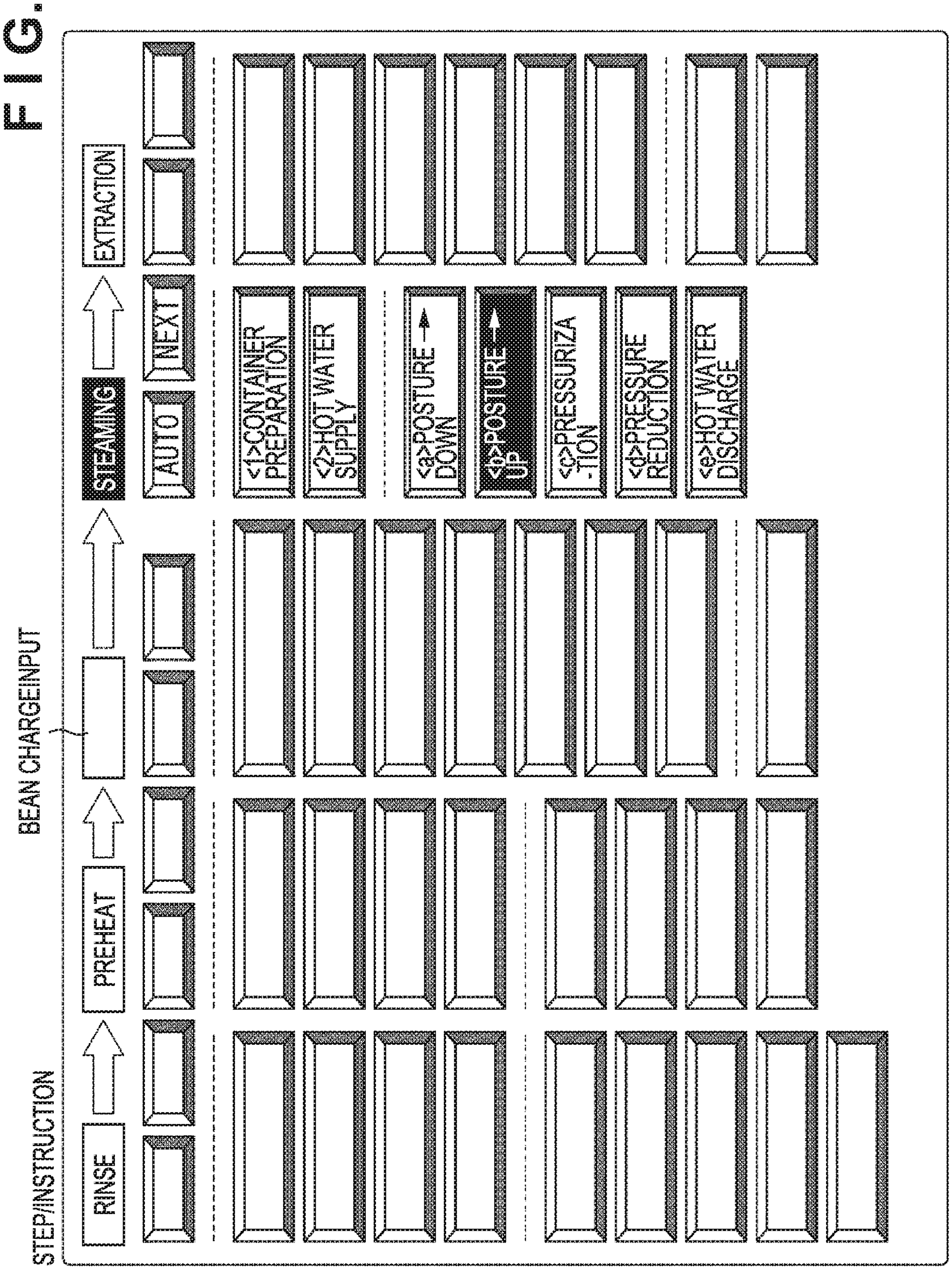
Figure 229:
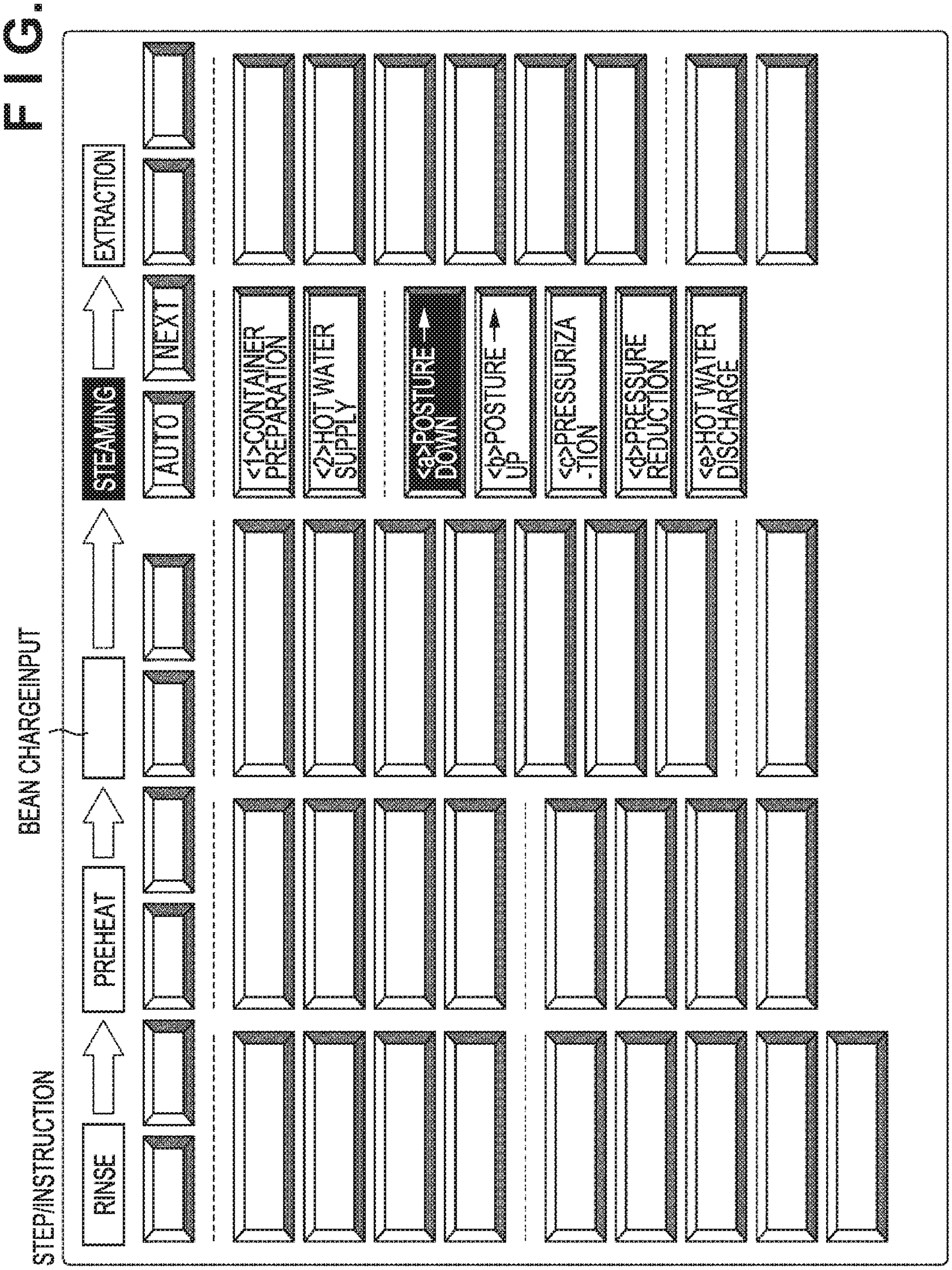
Figure 230:
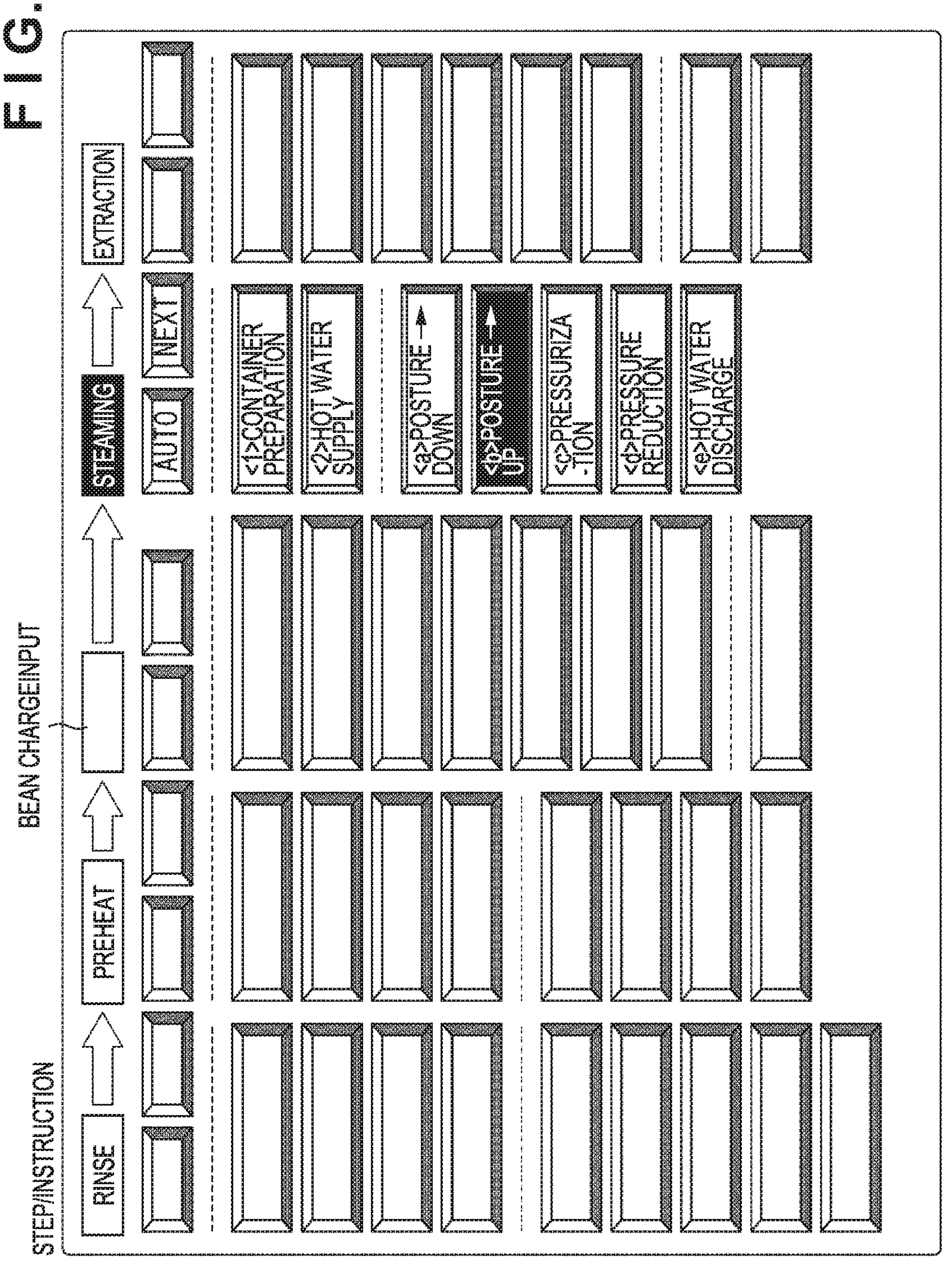
Figure 231:
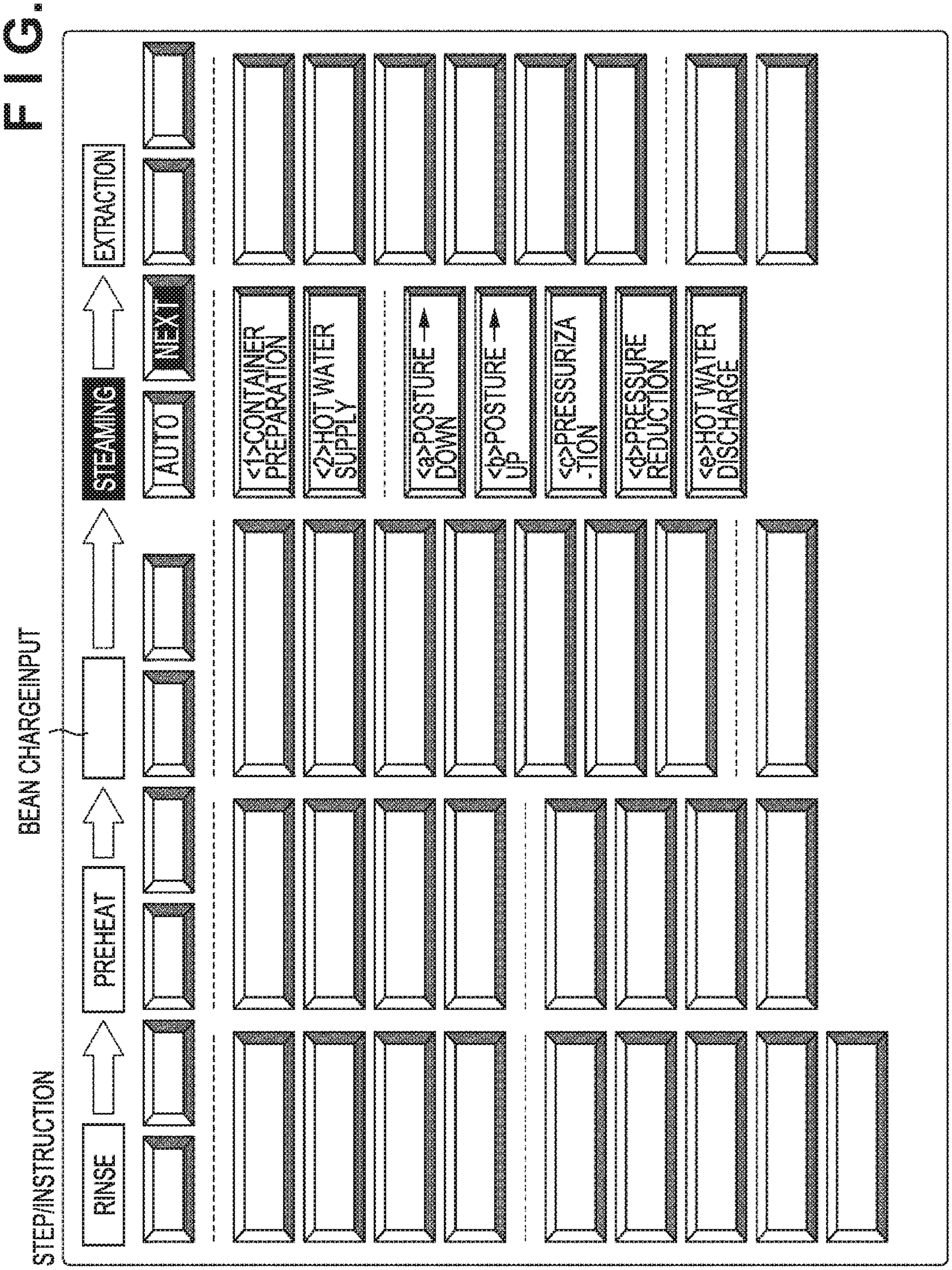
Figure 233:
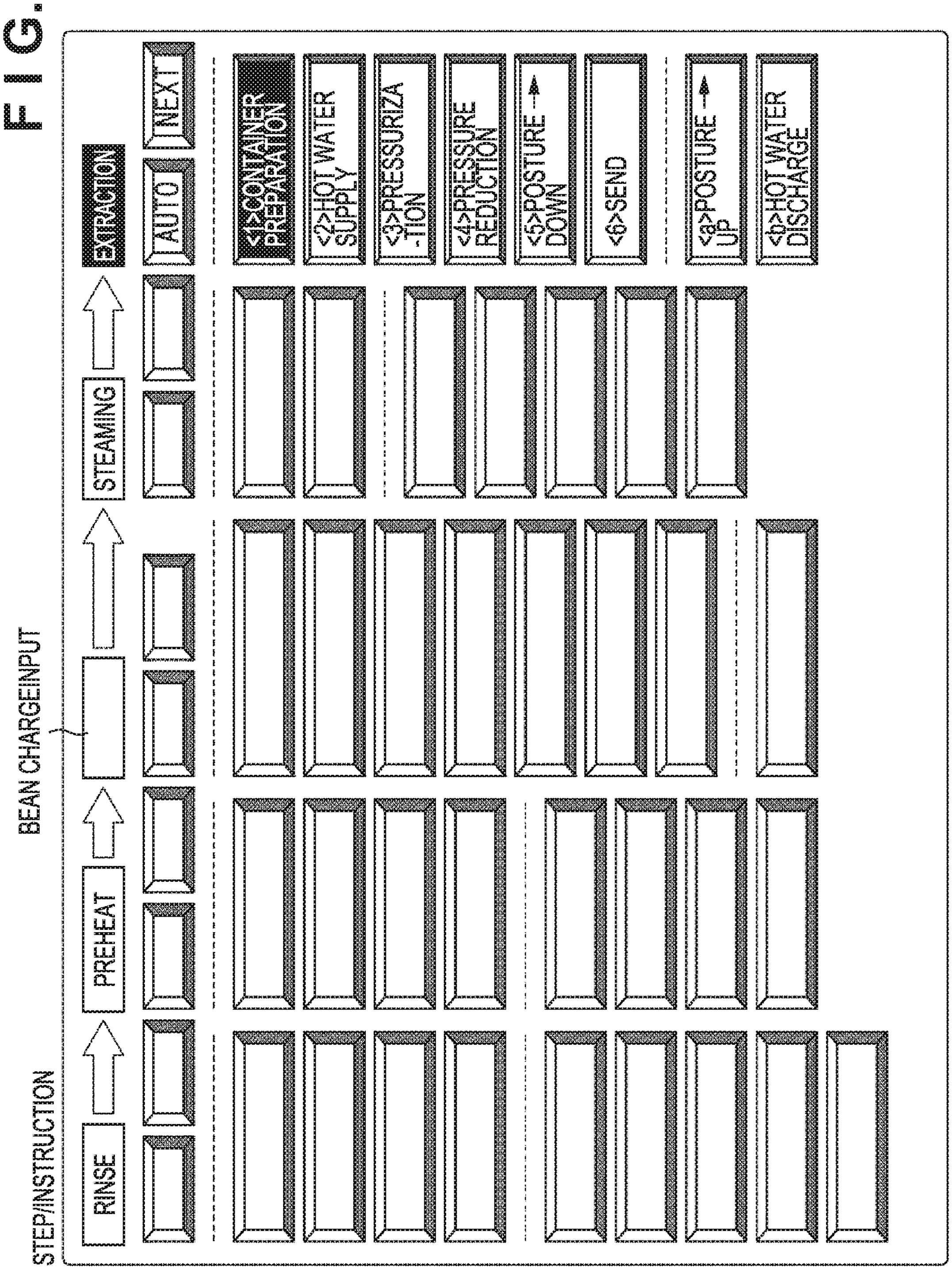
Figure 234:
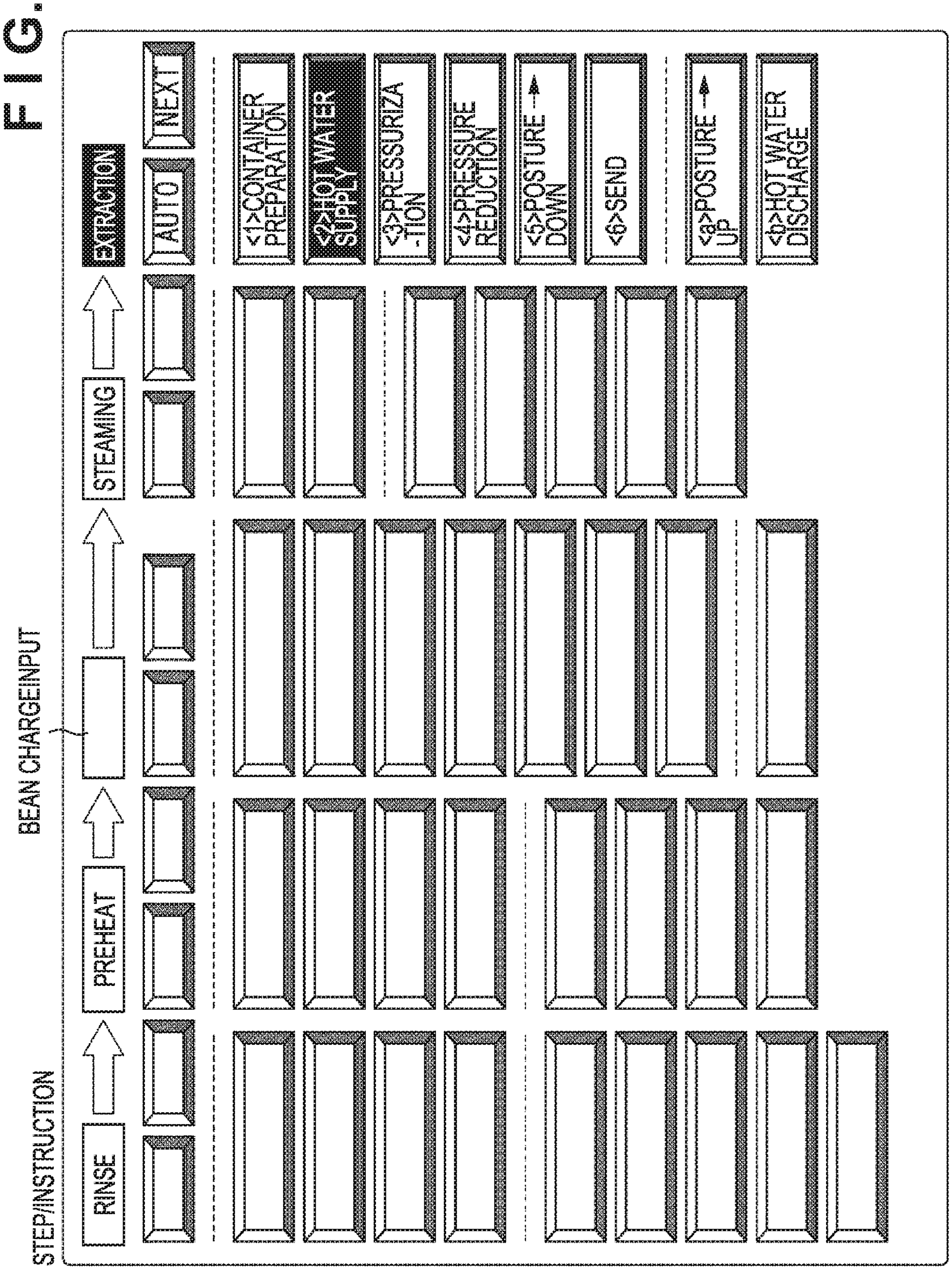
Figure 237:
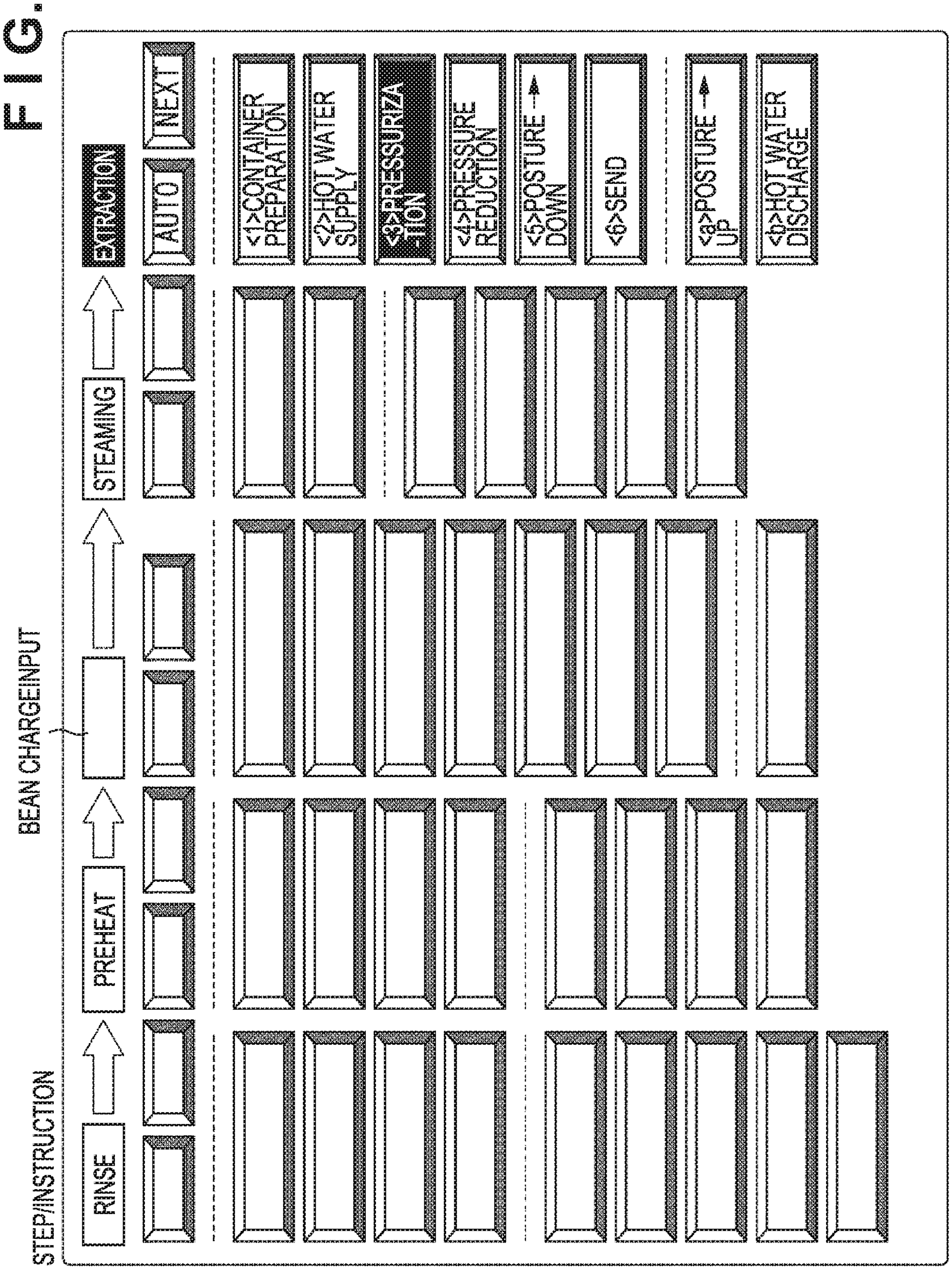
Figure 240:
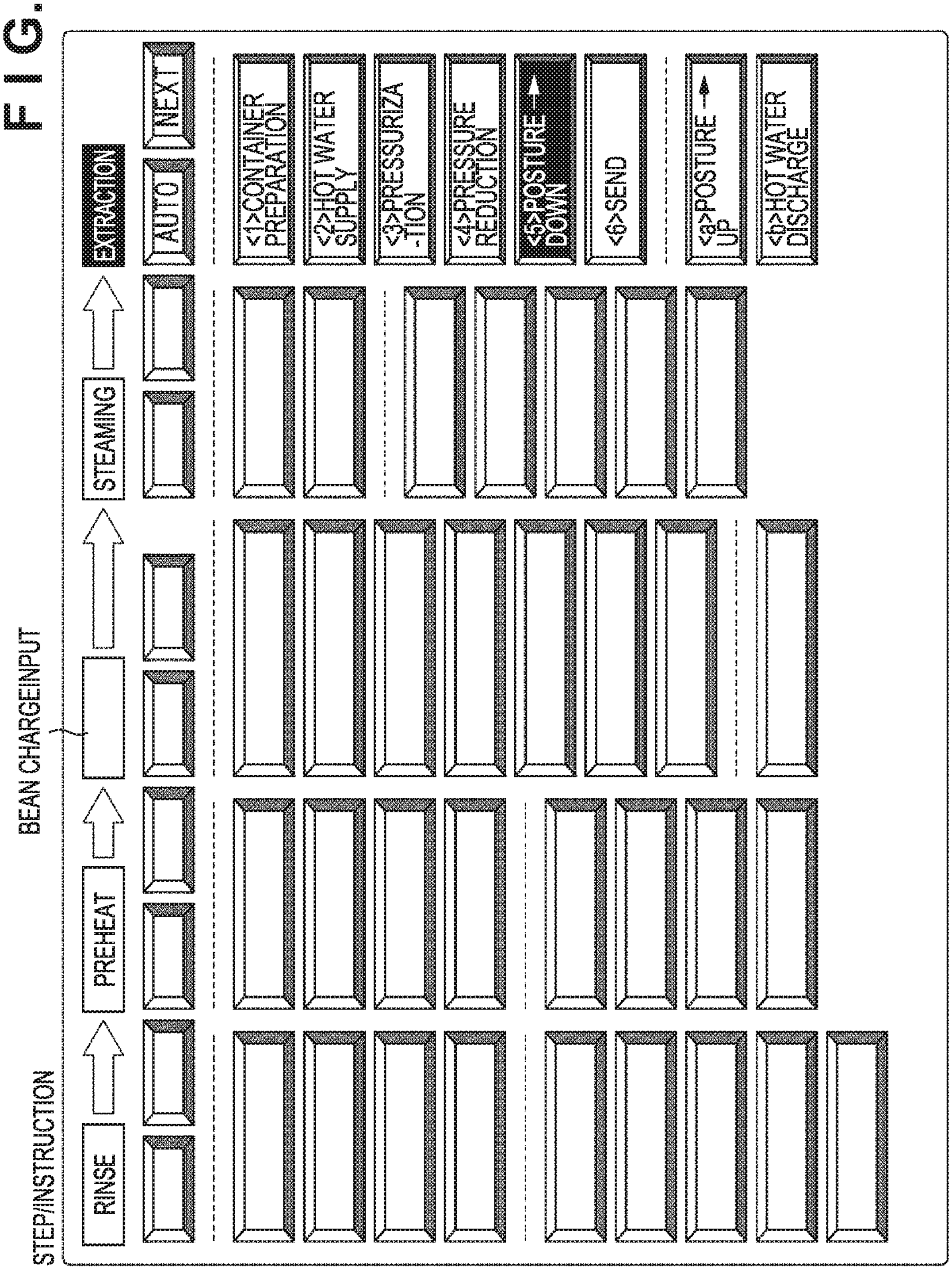
Figure 243:
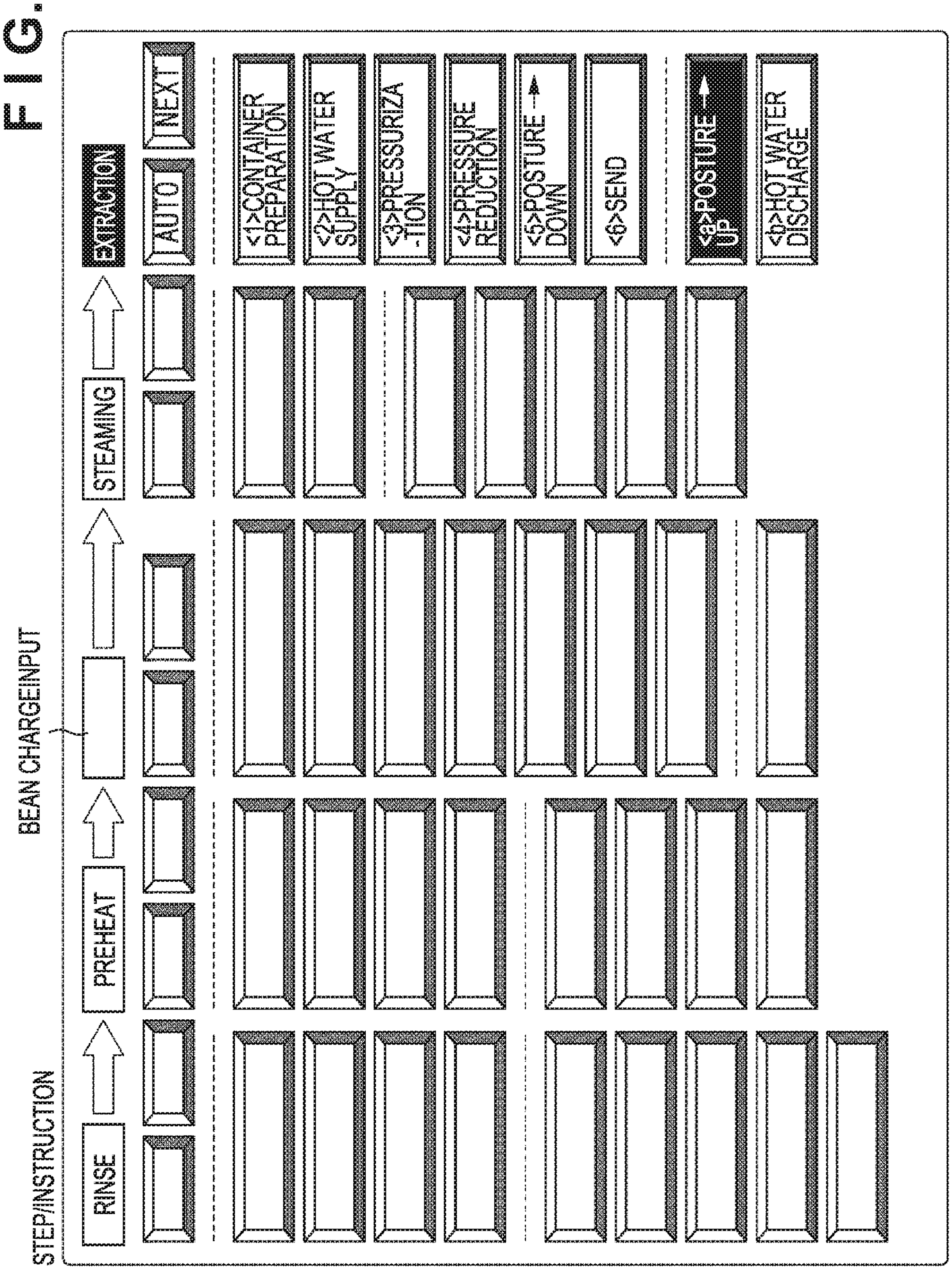
Figure 245:
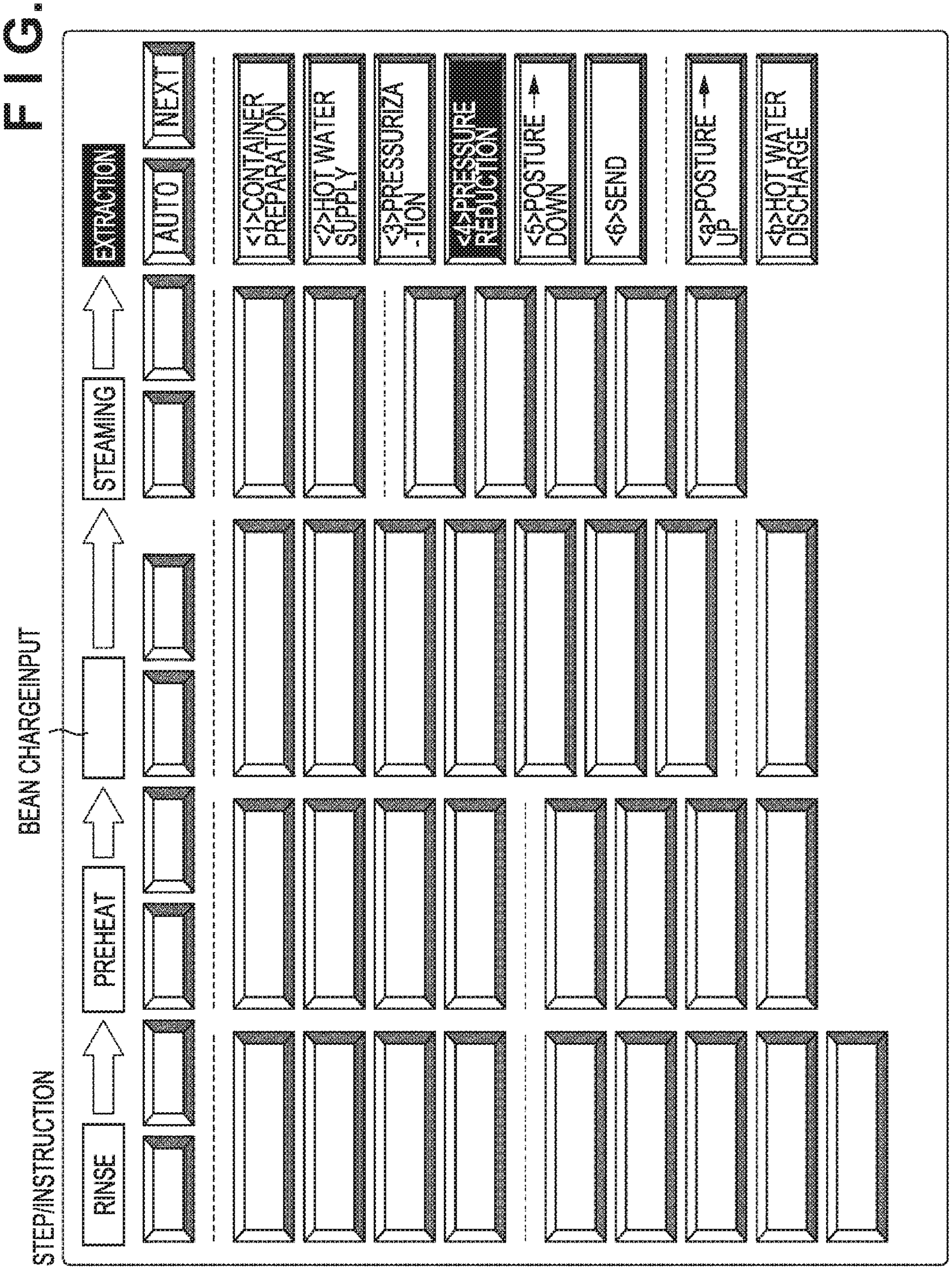
Figure 248:
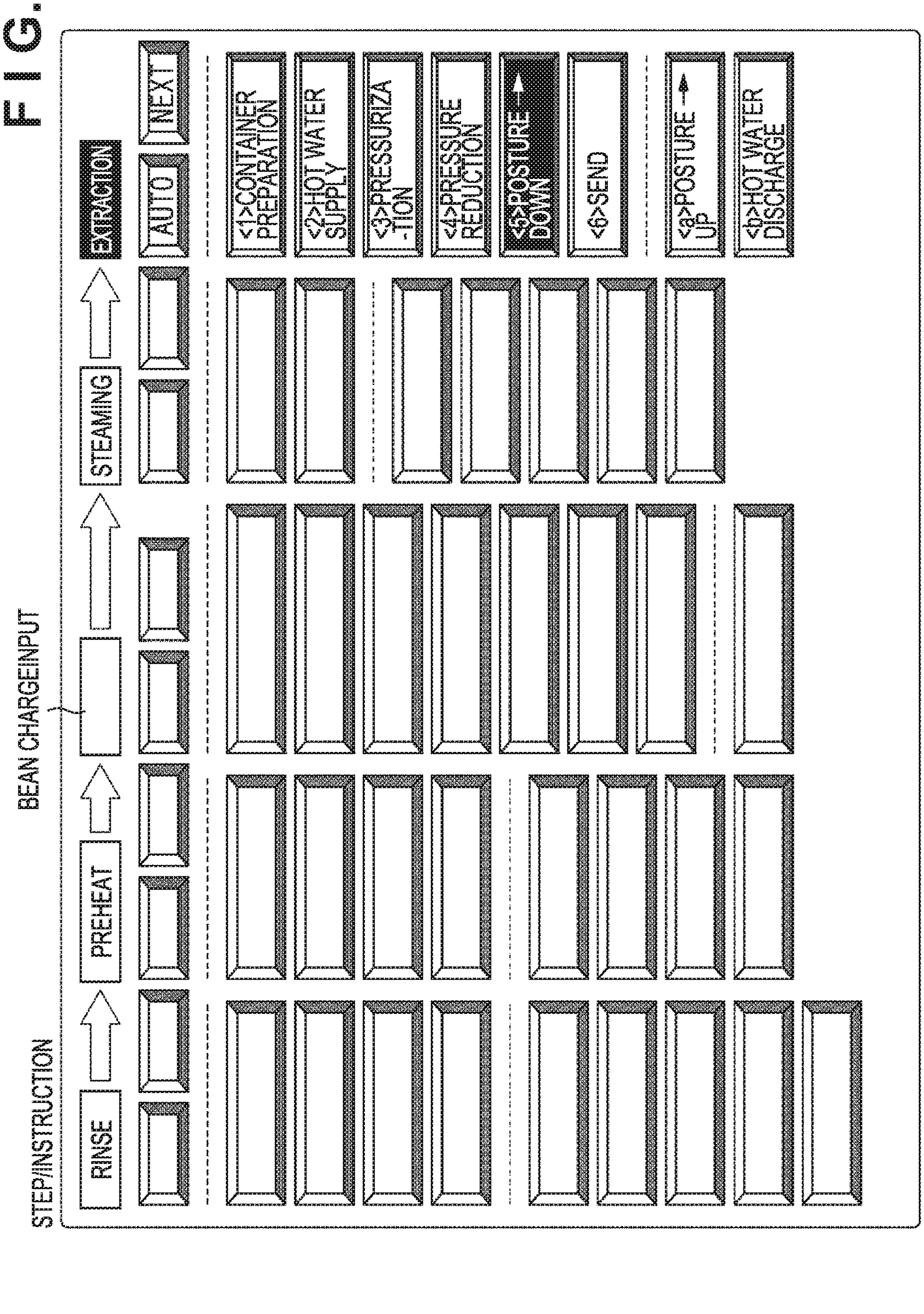
Figure 250:
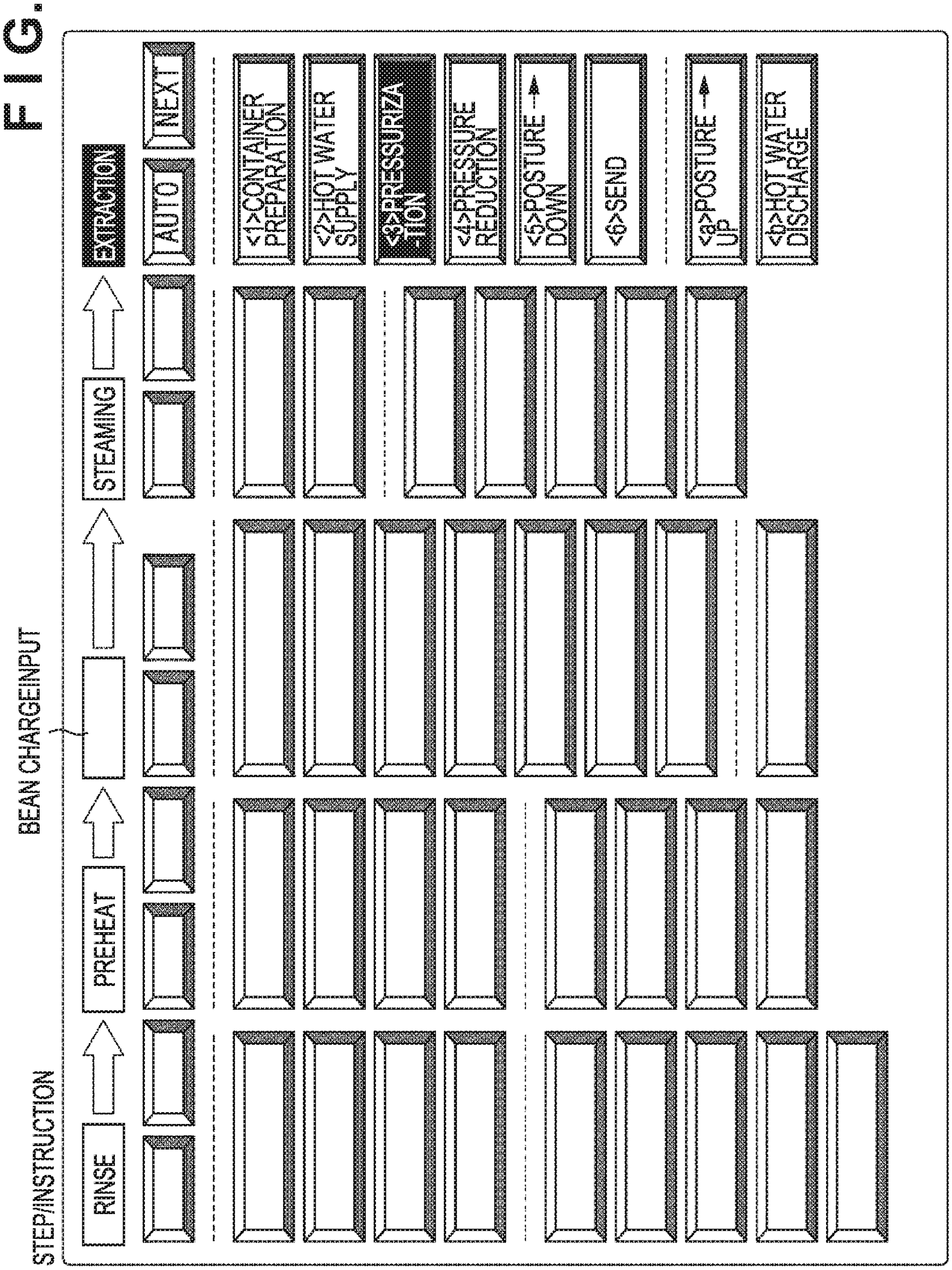
Figure 252:
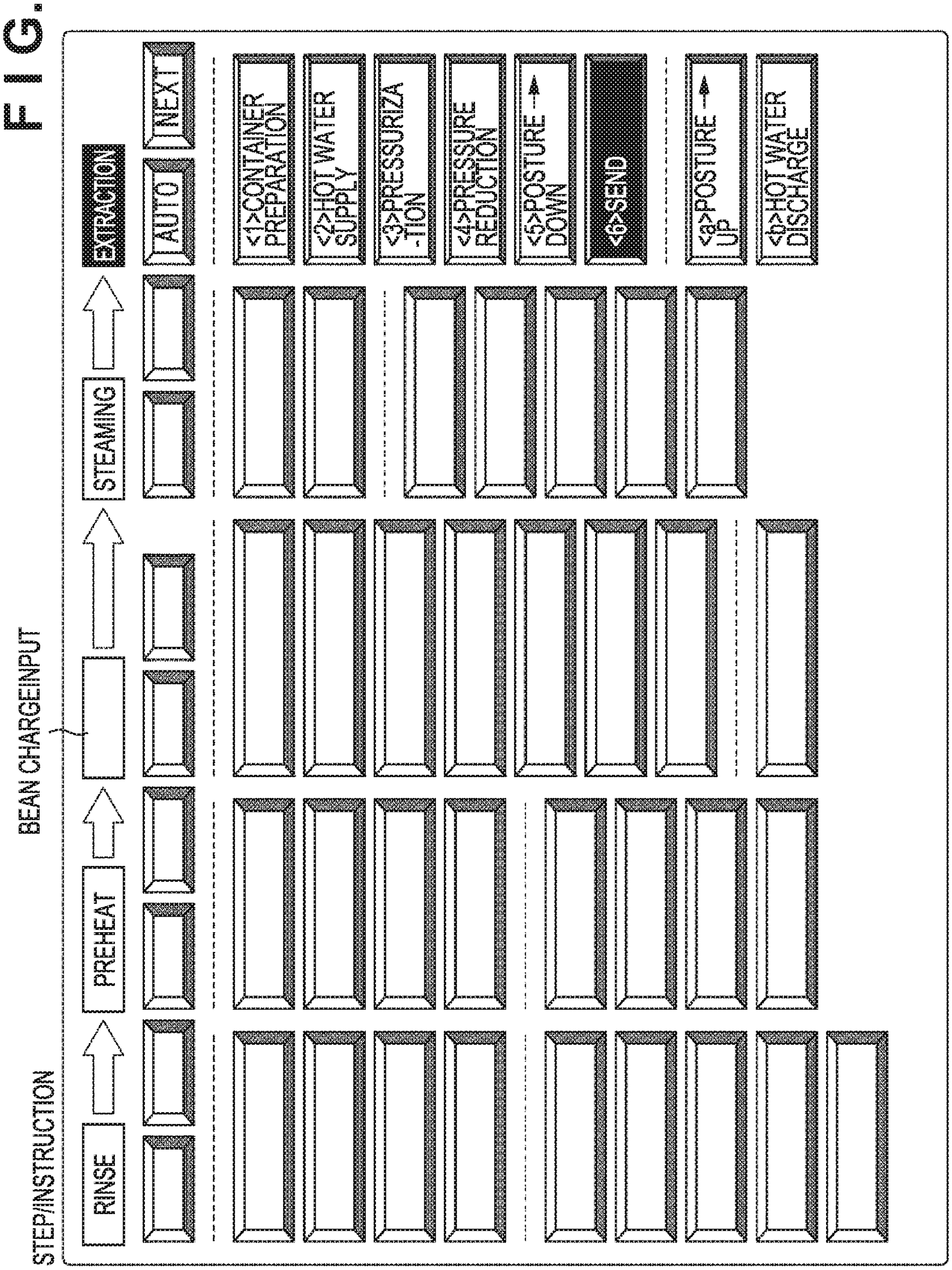
Figure 254:
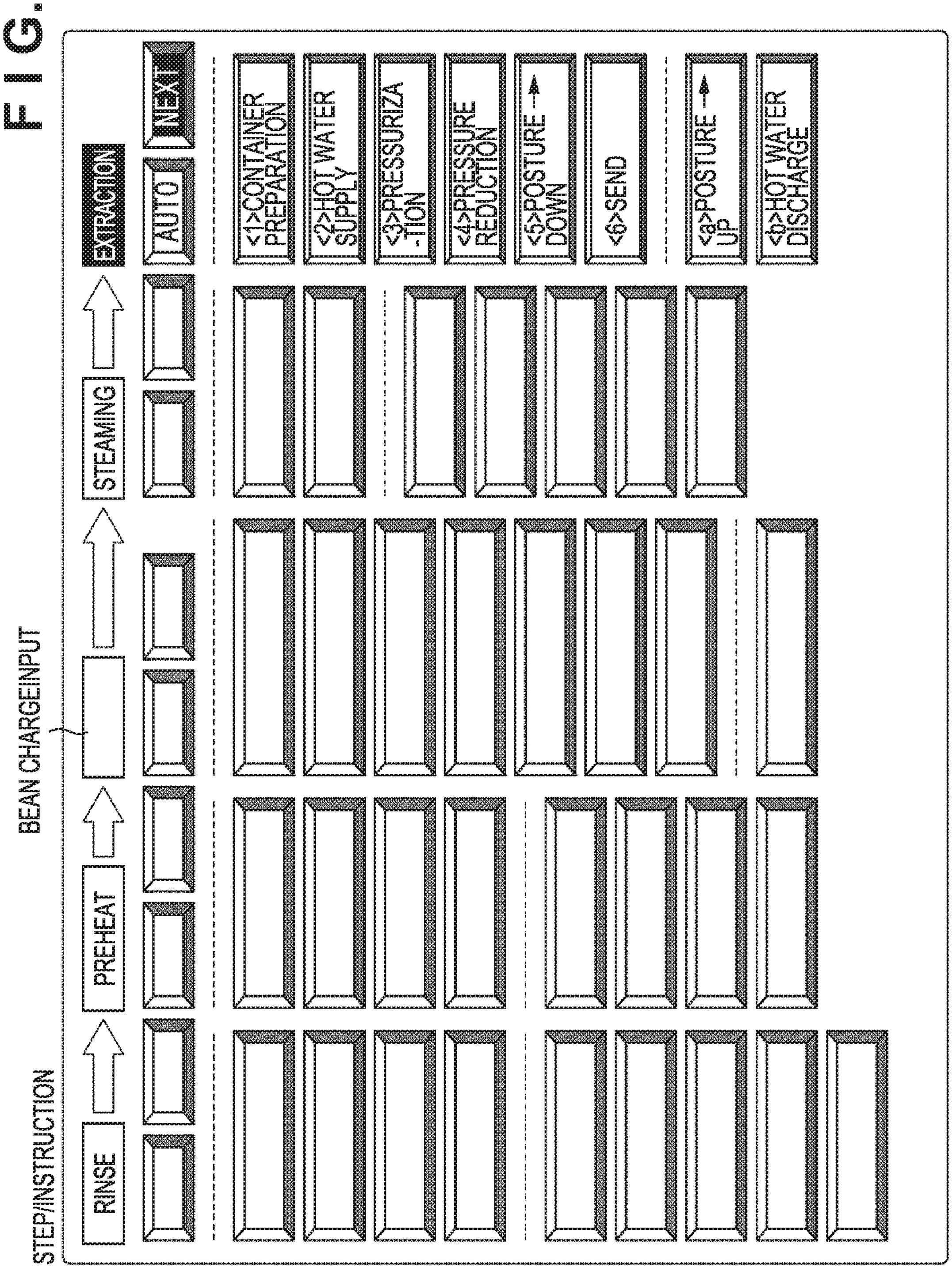
Figure 255:
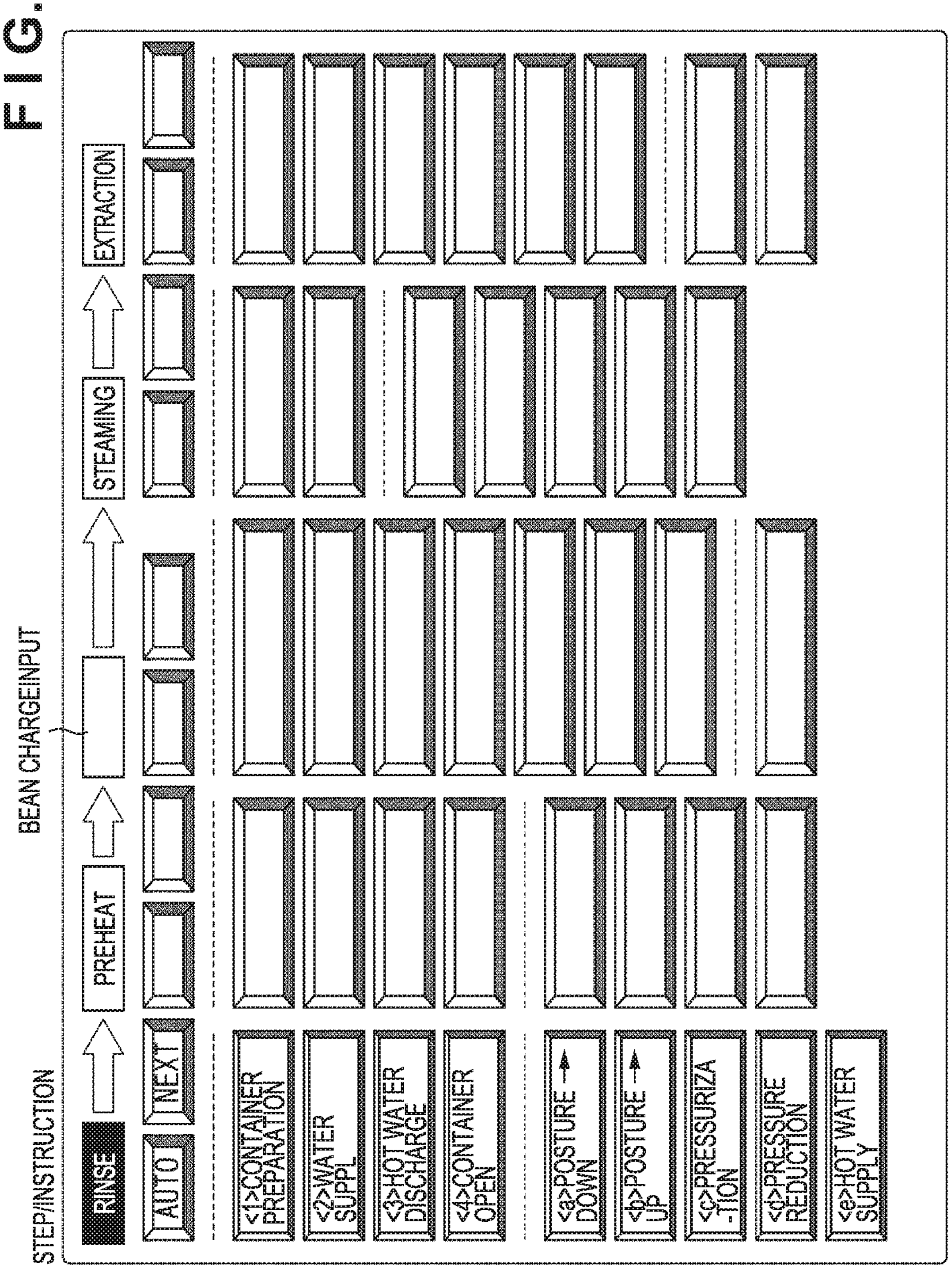
Figure 256:
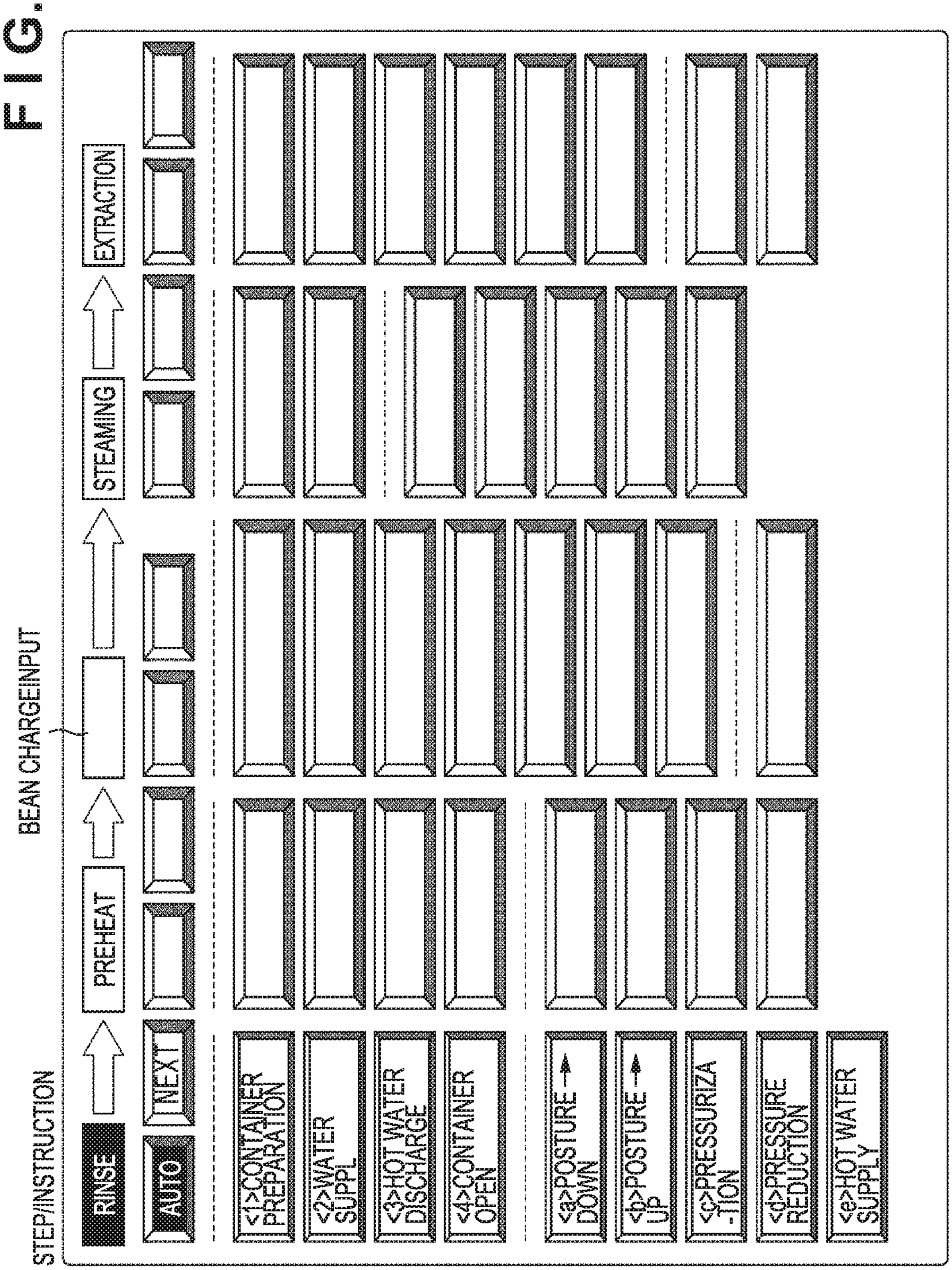
Figure 257:
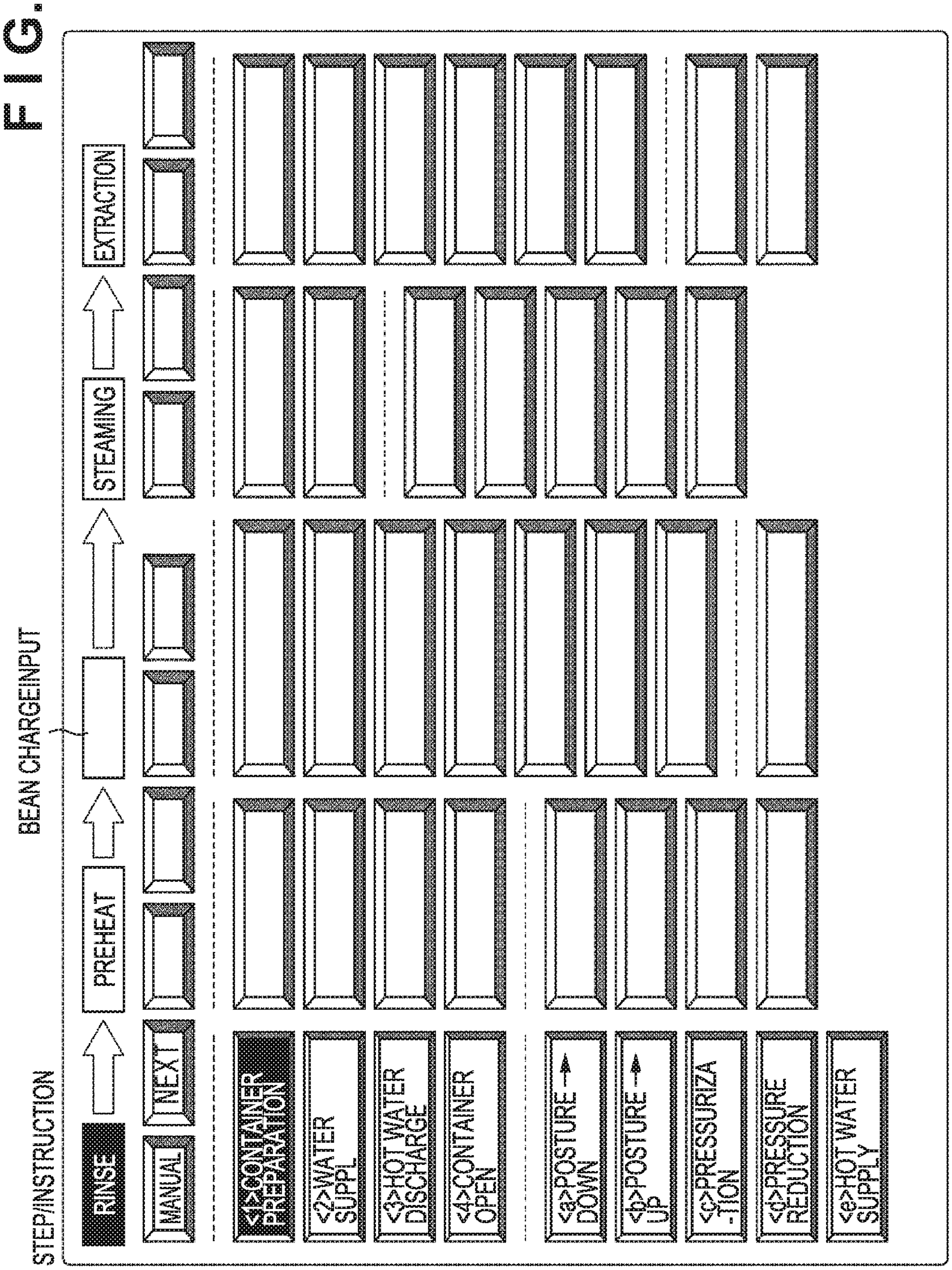
Figure 258:
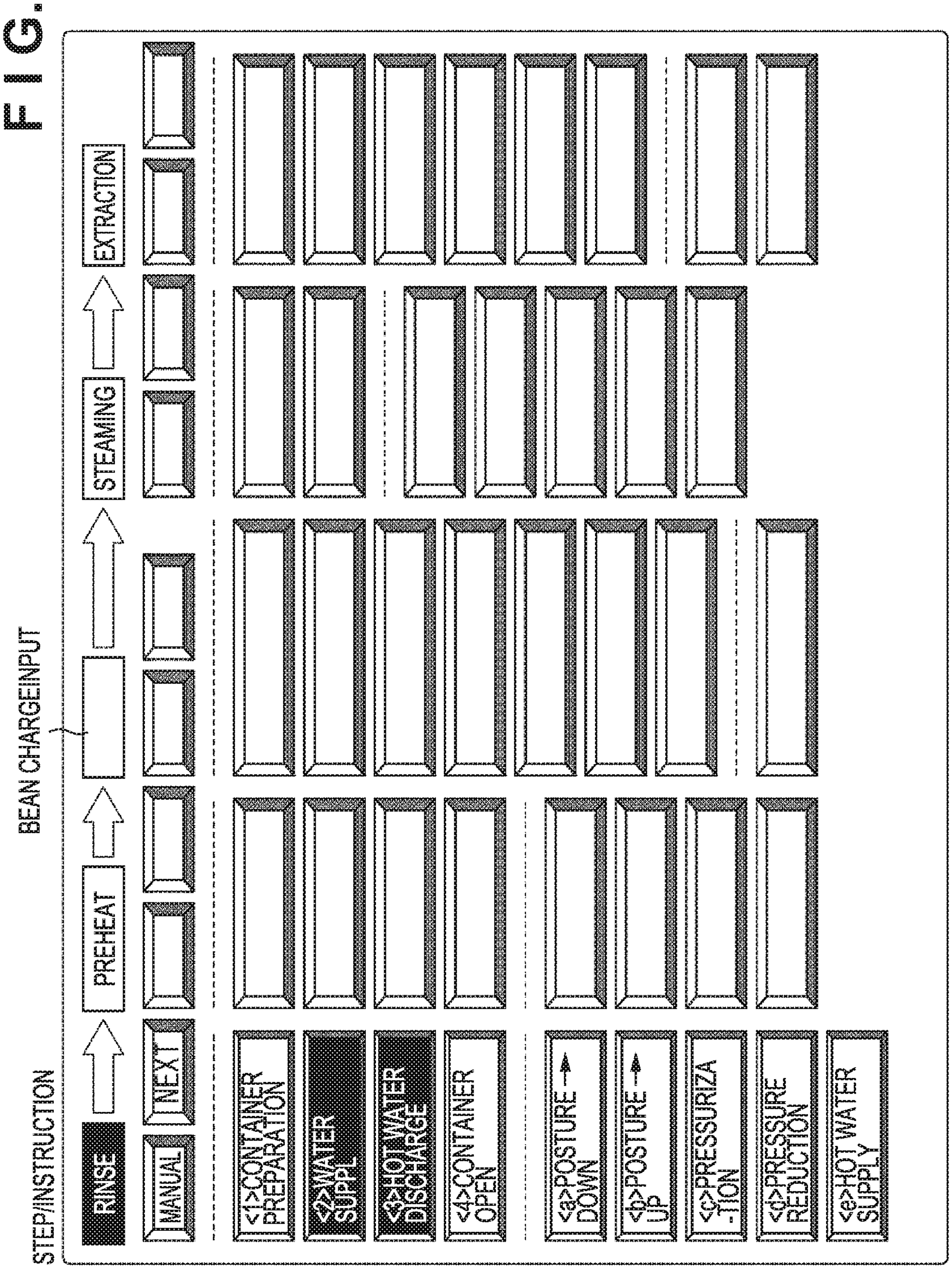
Figure 260:
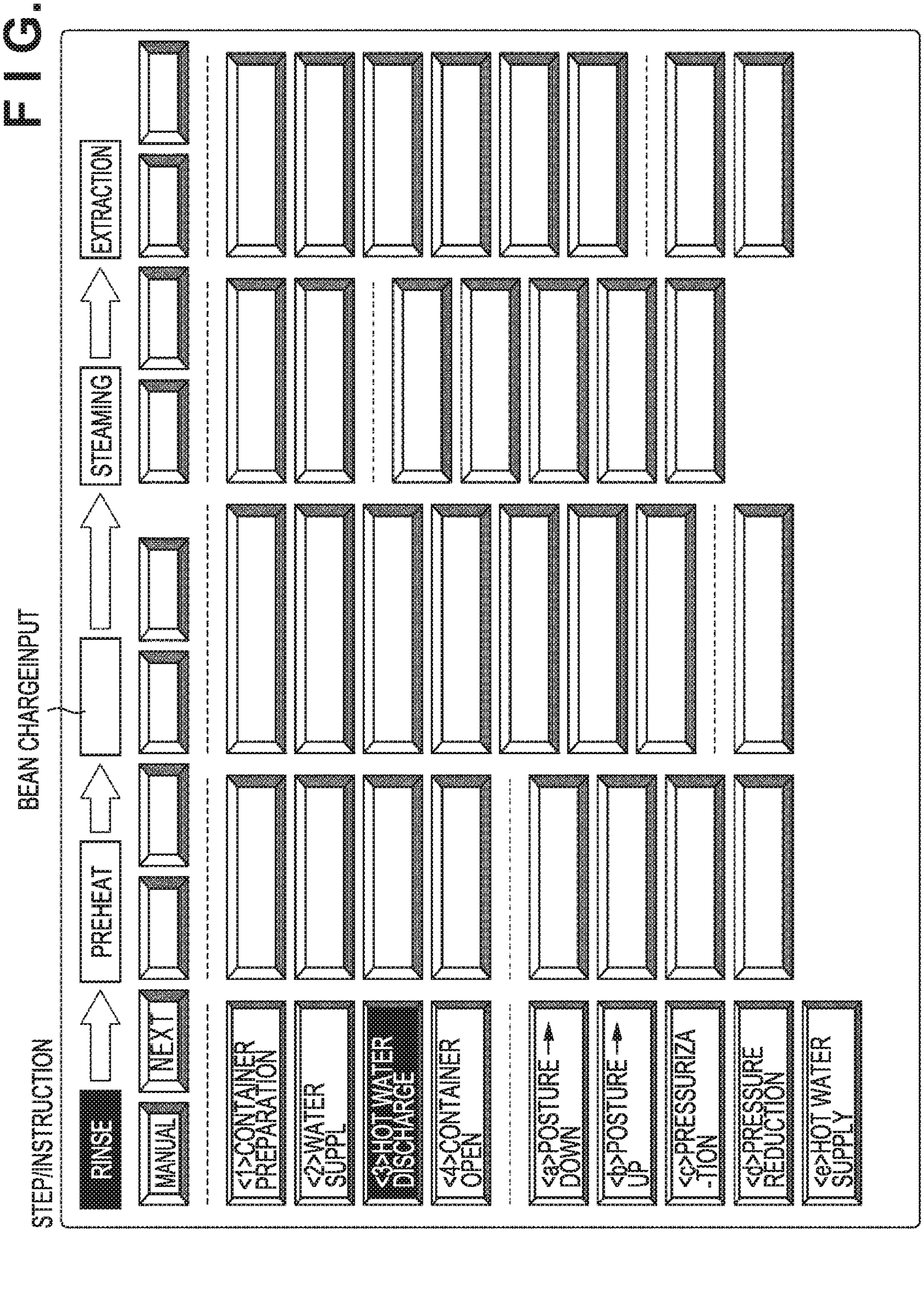
Figure 262:
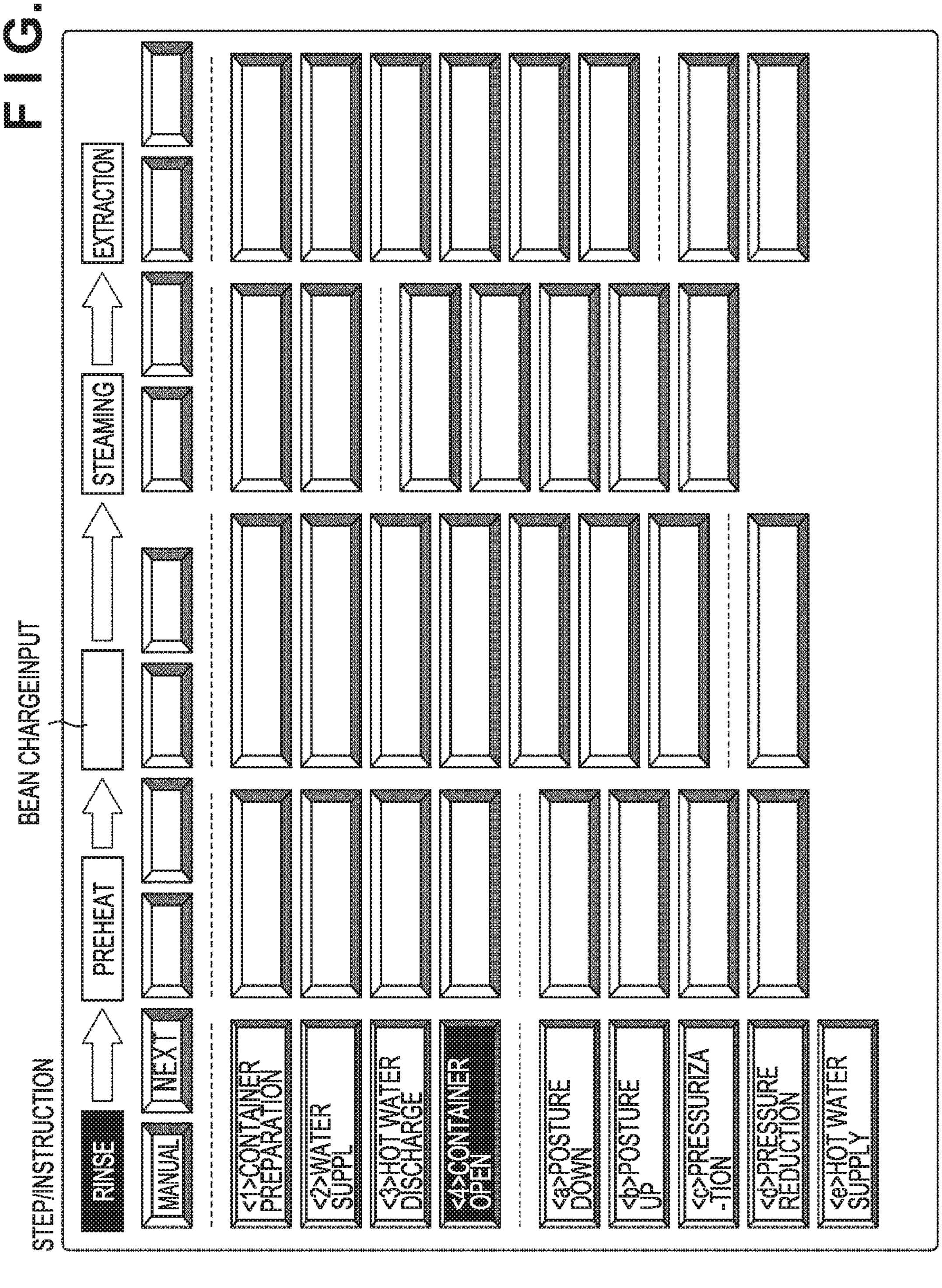
Figure 264:
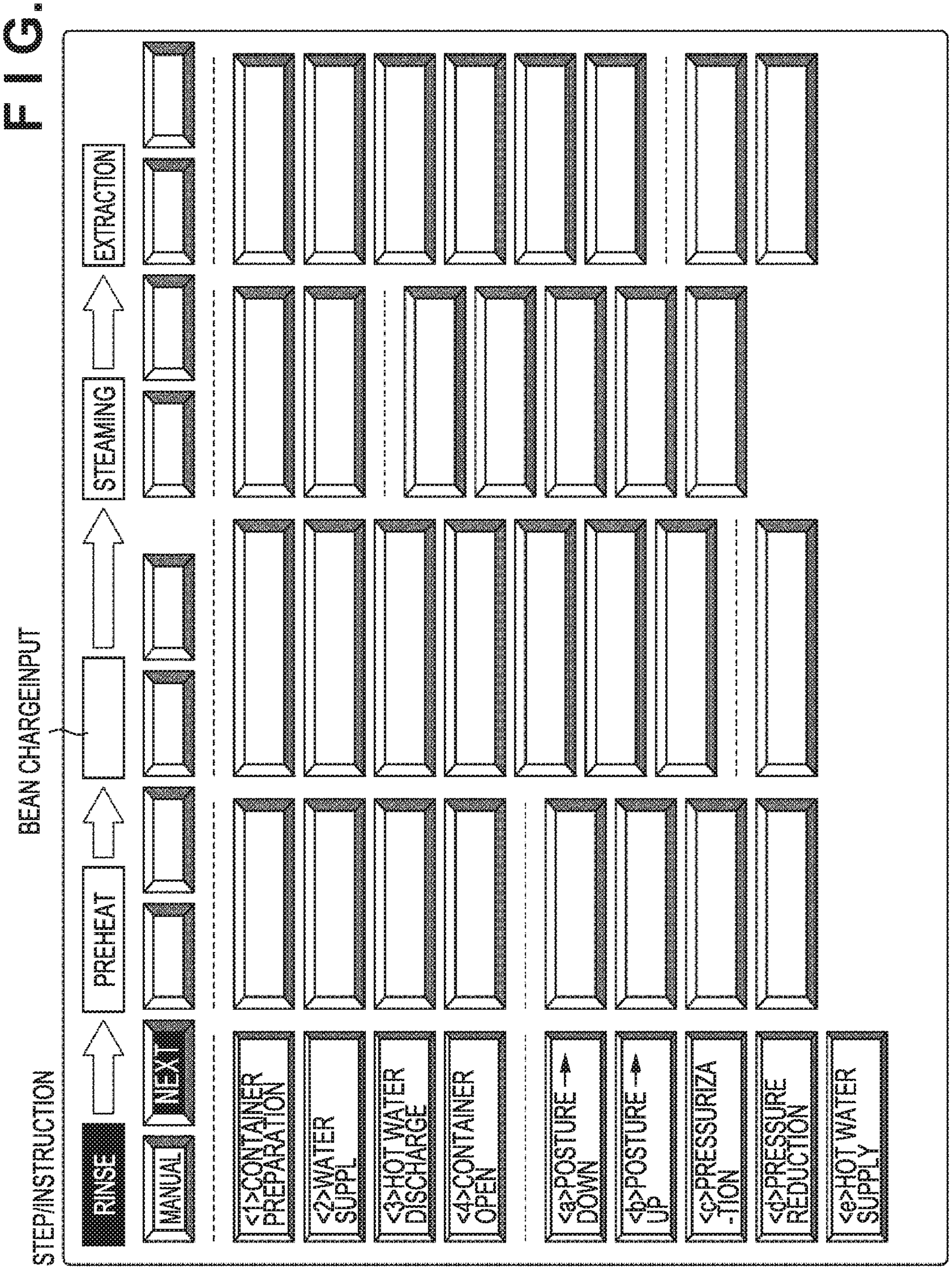
Figure 265:
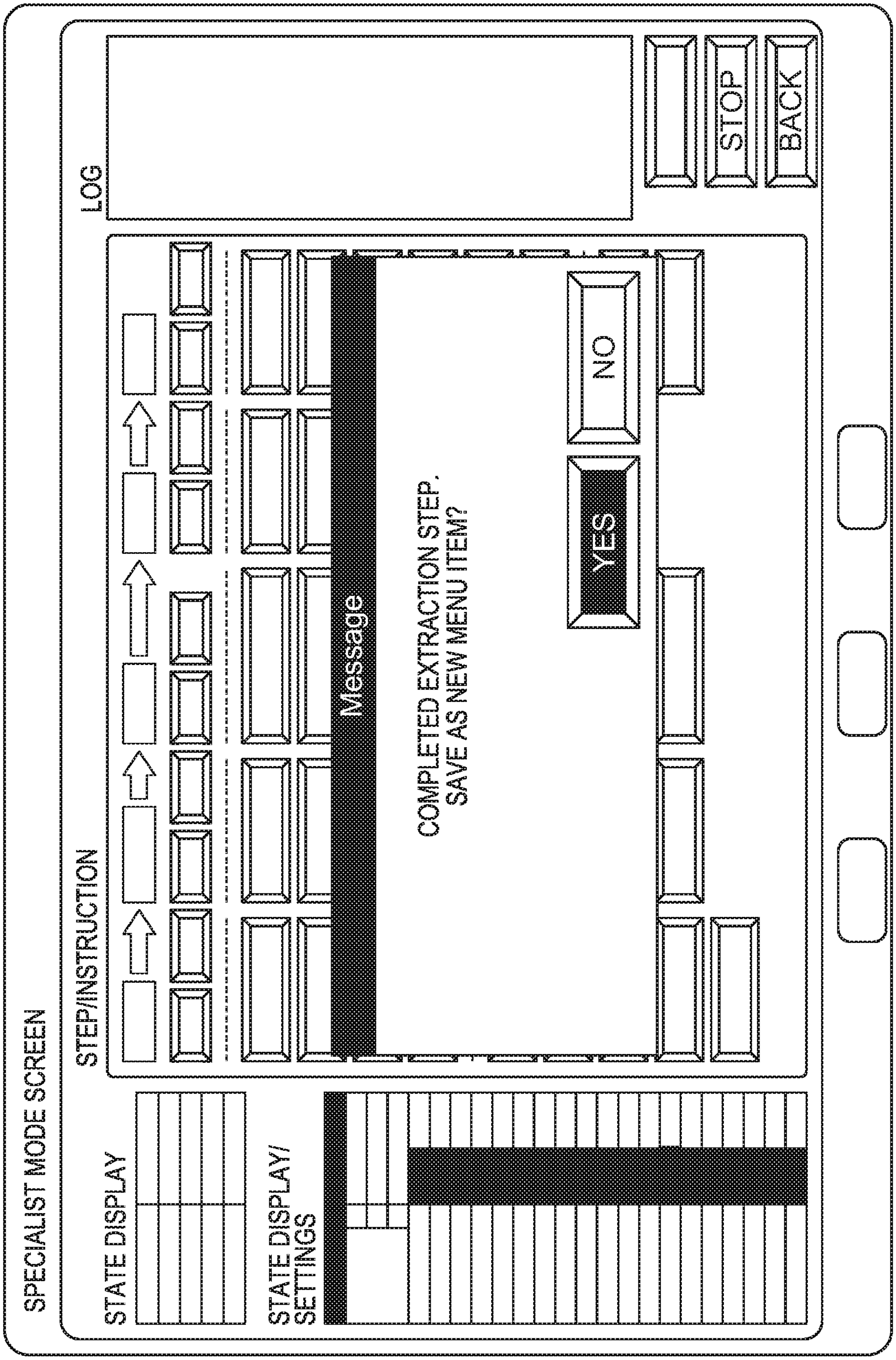
Figure 266:
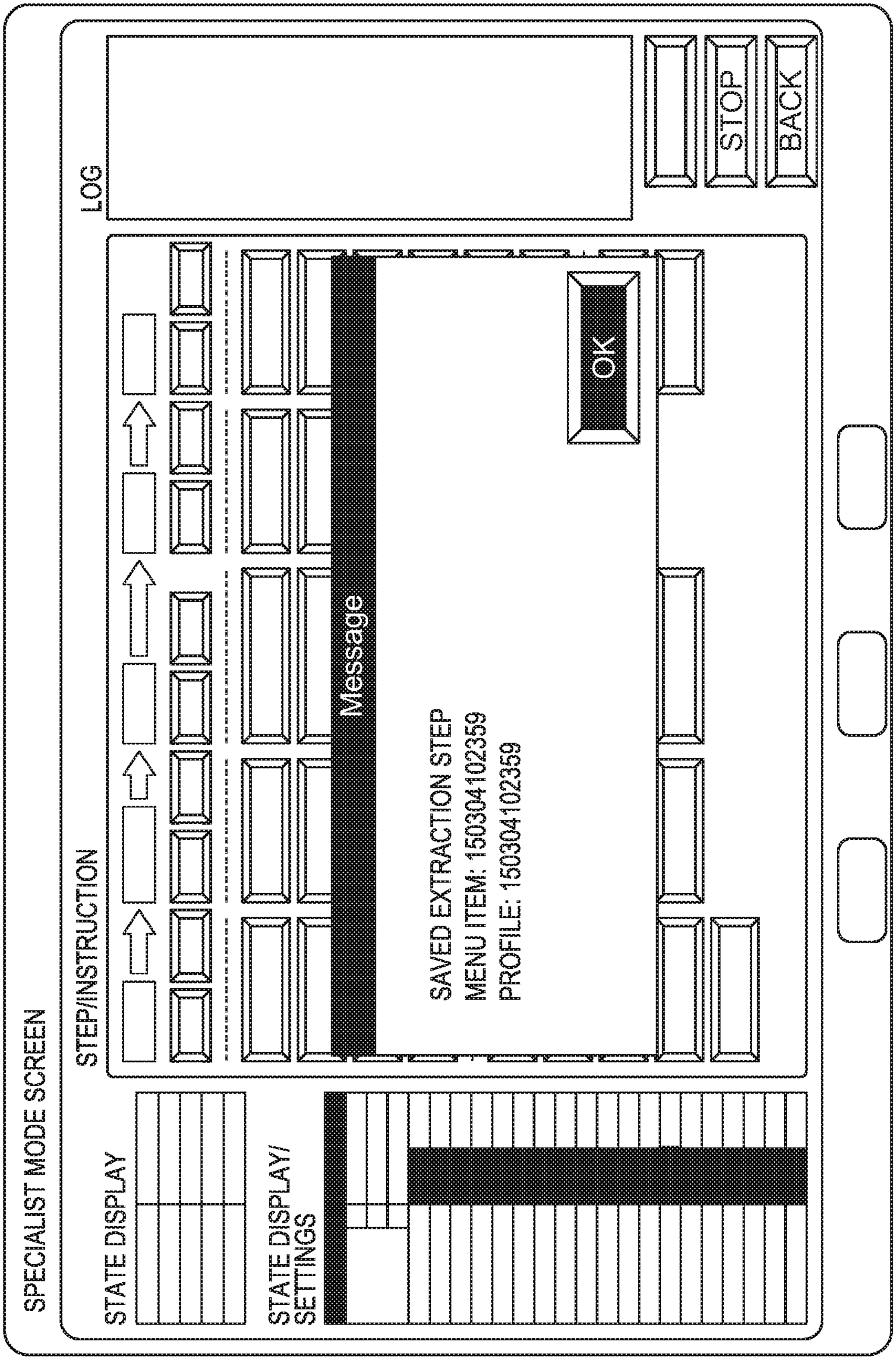
Figure 267:
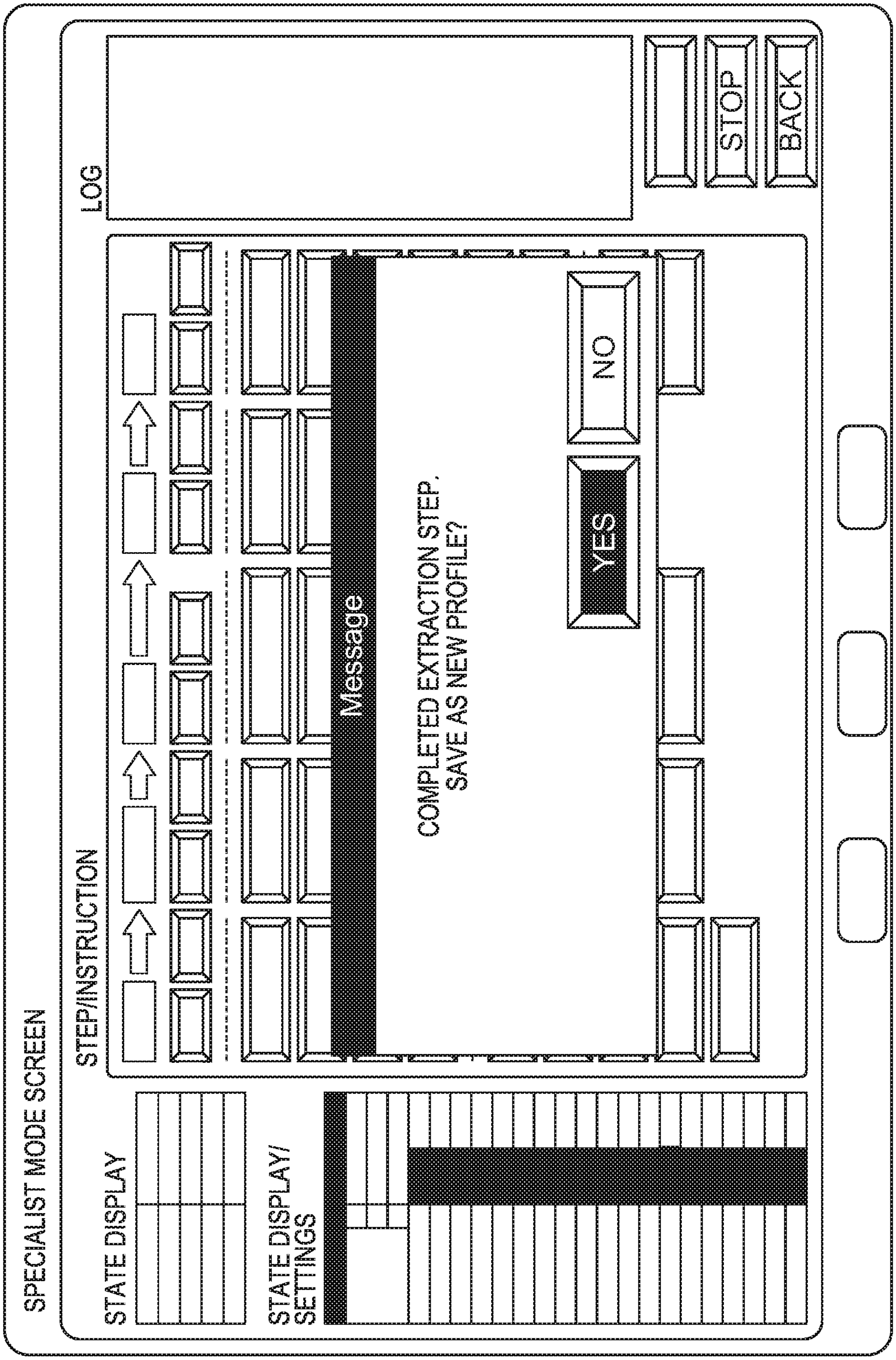
Figure 268:
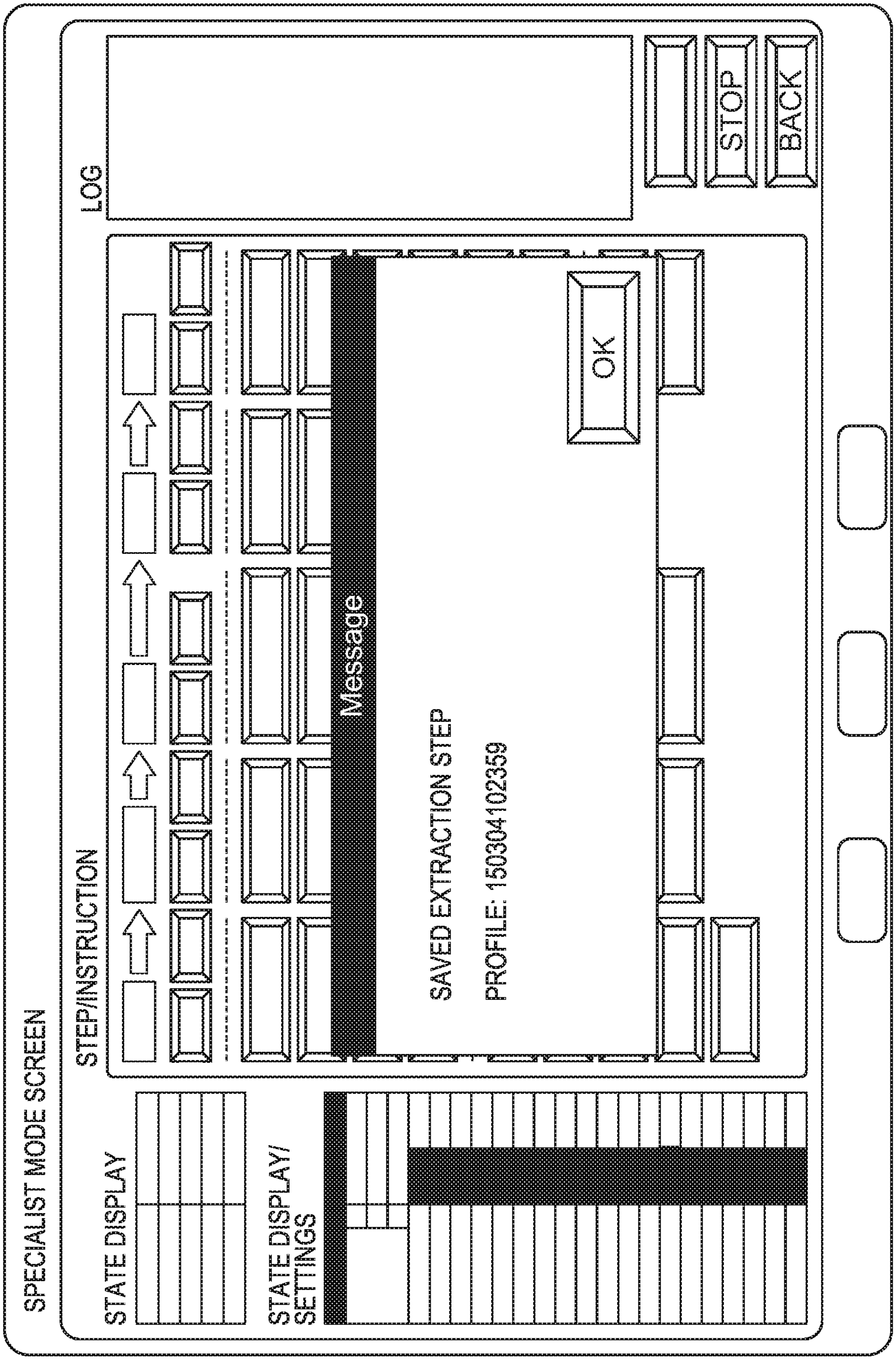

FIG. 132 is a view showing an example of display on an operation unit;

FIG. 133 is a view showing an example of display on an operation unit;

FIG. 134 is a view showing an example of display on an operation unit;

FIG. 135 is a view showing an example of display on an operation unit;

FIG. 136 is a view showing an example of display on an operation unit;

FIG. 137 is a view showing an example of display on an operation unit;

FIG. 138 is a view showing an example of display on an operation unit;

FIG. 139 is a view showing an example of display on an operation unit;

FIG. 140 is a view showing an example of display on an operation unit;

FIG. 141 is a view showing an example of display on an operation unit;

FIG. 142 is a view showing an example of display on an operation unit;

FIG. 143 is a view showing an example of display on an operation unit;

FIG. 144 is a view showing an example of display on an operation unit;

FIG. 145 is a view showing an example of display on an operation unit;

FIG. 146 is a view showing an example of display on an operation unit;

FIG. 147 is a view showing an example of display on an operation unit;

FIG. 148 is a view showing an example of display on an operation unit;

FIG. 149 is a view showing an example of display on an operation unit;

FIG. 150 is a view showing an example of display on an operation unit;

FIG. 151 is a view showing an example of display on an operation unit;

FIG. 152 is a view showing an example of display on an operation unit;

FIG. 153 is a view showing an example of display on an operation unit;

FIG. 154 is a view showing an example of display on an operation unit;

FIG. 155 is a view showing an example of display on an operation unit;

FIG. 156 is a view showing an example of display on an operation unit;

FIG. 157 is a view showing an example of display on an operation unit;

FIG. 158 is a view showing an example of display on an operation unit;

FIG. 159 is a view showing an example of display on an operation unit;

FIG. 160 is a view showing an example of display on an operation unit;

FIG. 161 is a view showing an example of display on an operation unit;

FIG. 162 is a view showing an example of display on an operation unit;

FIG. 163 is a view showing an example of display on an operation unit;

FIG. 164 is a view showing an example of display on an operation unit;

FIG. 165 is a view showing an example of display on an operation unit;

FIG. 166 is a view showing an example of display on an operation unit;

FIG. 167 is a view showing an example of display on an operation unit;

FIG. 168 is a view showing an example of display on an operation unit;

FIG. 169 is a view showing an example of display on an operation unit;

FIG. 170 is a view showing an example of display on an operation unit;

FIG. 171 is a view showing an example of display on an operation unit;

FIG. 172 is a view showing an example of display on an operation unit;

FIG. 173 is a view showing an example of display on an operation unit;

FIG. 174 is a view showing an example of display on an operation unit;

FIG. 175 is a view showing an example of display on an operation unit;

FIG. 176 is a view showing an example of display on an operation unit;

FIG. 177 is a view showing an example of display on an operation unit;

FIG. 178 is a view showing an example of display on an operation unit;

FIG. 179 is a view showing an example of display on an operation unit;

FIG. 180 is a view showing an example of display on an operation unit;

FIG. 181 is a view showing an example of display on an operation unit;

FIG. 182 is a view showing an example of display on an operation unit;

FIG. 183 is a view showing an example of display on an operation unit;

FIG. 184 is a view showing an example of display on an operation unit;

FIG. 185 is a view showing an example of display on an operation unit;

FIG. 186 is a view showing an example of display on an operation unit;

FIG. 187 is a view showing an example of display on an operation unit;

FIG. 188 is a view showing an example of display on an operation unit;

FIG. 189 is a view showing an example of display on an operation unit;

FIG. 190 is a view showing an example of display on an operation unit;

FIG. 191 is a view showing an example of display on an operation unit;

FIG. 192 is a view showing an example of display on an operation unit;

FIG. 193 is a view showing an example of display on an operation unit;

FIG. 194 is a view showing an example of display on an operation unit;

FIG. 195 is a view showing an example of display on an operation unit;

FIG. 196 is a view showing an example of display on an operation unit;

FIG. 197 is a view showing an example of display on an operation unit;

FIG. 198 is a view showing an example of display on an operation unit;

FIG. 199 is a view showing an example of display on an operation unit;

FIG. 200 is a view showing an example of display on an operation unit;

FIG. 201 is a view showing an example of display on an operation unit;

FIG. 202 is a view showing an example of display on an operation unit;

FIG. 203 is a view showing an example of display on an operation unit;

FIG. 204 is a view showing an example of display on an operation unit;

FIG. 205 is a view showing an example of display on an operation unit;

FIG. 206 is a view showing an example of display on an operation unit;

FIG. 207 is a view showing an example of display on an operation unit;

FIG. 208 is a view showing an example of display on an operation unit;

FIG. 209 is a view showing an example of display on an operation unit;

FIG. 210 is a view showing an example of display on an operation unit;

FIG. 211 is a view showing an example of display on an operation unit;

FIG. 212 is a view showing an example of display on an operation unit;

FIG. 213 is a view showing an example of display on an operation unit;

FIG. 214 is a view showing an example of display on an operation unit;

FIG. 215 is a view showing an example of display on an operation unit;

FIG. 216 is a view showing an example of display on an operation unit;

FIG. 217 is a view showing an example of display on an operation unit;

FIG. 218 is a view showing an example of display on an operation unit;

FIG. 219 is a view showing an example of display on an operation unit;

FIG. 220 is a view showing an example of display on an operation unit;

FIG. 221 is a view showing an example of display on an operation unit;

FIG. 222 is a view showing an example of display on an operation unit;

FIG. 223 is a view showing an example of display on an operation unit;

FIG. 224 is a view showing an example of display on an operation unit;

FIG. 225 is a view showing an example of display on an operation unit;

FIG. 226 is a view showing an example of display on an operation unit;

FIG. 227 is a view showing an example of display on an operation unit;

FIG. 228 is a view showing an example of display on an operation unit;

FIG. 229 is a view showing an example of display on an operation unit;

FIG. 230 is a view showing an example of display on an operation unit;

FIG. 231 is a view showing an example of display on an operation unit;

FIG. 232 is a view showing an example of display on an operation unit;

FIG. 233 is a view showing an example of display on an operation unit;

FIG. 234 is a view showing an example of display on an operation unit;

FIG. 235 is a view showing an example of display on an operation unit;

FIG. 236 is a view showing an example of display on an operation unit;

FIG. 237 is a view showing an example of display on an operation unit;

FIG. 238 is a view showing an example of display on an operation unit;

FIG. 239 is a view showing an example of display on an operation unit;

FIG. 240 is a view showing an example of display on an operation unit;

FIG. 241 is a view showing an example of display on an operation unit;

FIG. 242 is a view showing an example of display on an operation unit;

FIG. 243 is a view showing an example of display on an operation unit;

FIG. 244 is a view showing an example of display on an operation unit;

FIG. 245 is a view showing an example of display on an operation unit;

FIG. 246 is a view showing an example of display on an operation unit;

FIG. 247 is a view showing an example of display on an operation unit;

FIG. 248 is a view showing an example of display on an operation unit;

FIG. 249 is a view showing an example of display on an operation unit;

FIG. 250 is a view showing an example of display on an operation unit;

FIG. 251 is a view showing an example of display on an operation unit;

FIG. 252 is a view showing an example of display on an operation unit;

FIG. 253 is a view showing an example of display on an operation unit;

FIG. 254 is a view showing an example of display on an operation unit;

FIG. 255 is a view showing an example of display on an operation unit;

FIG. 256 is a view showing an example of display on an operation unit;

FIG. 257 is a view showing an example of display on an operation unit;

FIG. 258 is a view showing an example of display on an operation unit;

FIG. 259 is a view showing an example of display on an operation unit;

FIG. 260 is a view showing an example of display on an operation unit;

FIG. 261 is a view showing an example of display on an operation unit;

FIG. 262 is a view showing an example of display on an operation unit;

FIG. 263 is a view showing an example of display on an operation unit;

FIG. 264 is a view showing an example of display on an operation unit;

FIG. 265 is a view showing an example of display on an operation unit;

FIG. 266 is a view showing an example of display on an operation unit;

FIG. 267 is a view showing an example of display on an operation unit;

FIG. 268 is a view showing an example of display on an operation unit;

DESCRIPTION OF THE EMBODIMENTS

Embodiments of the present invention will now be described with reference to the accompanying drawings.

First Embodiment

<1. Outline of Beverage Producing Apparatus>

Figure 1:
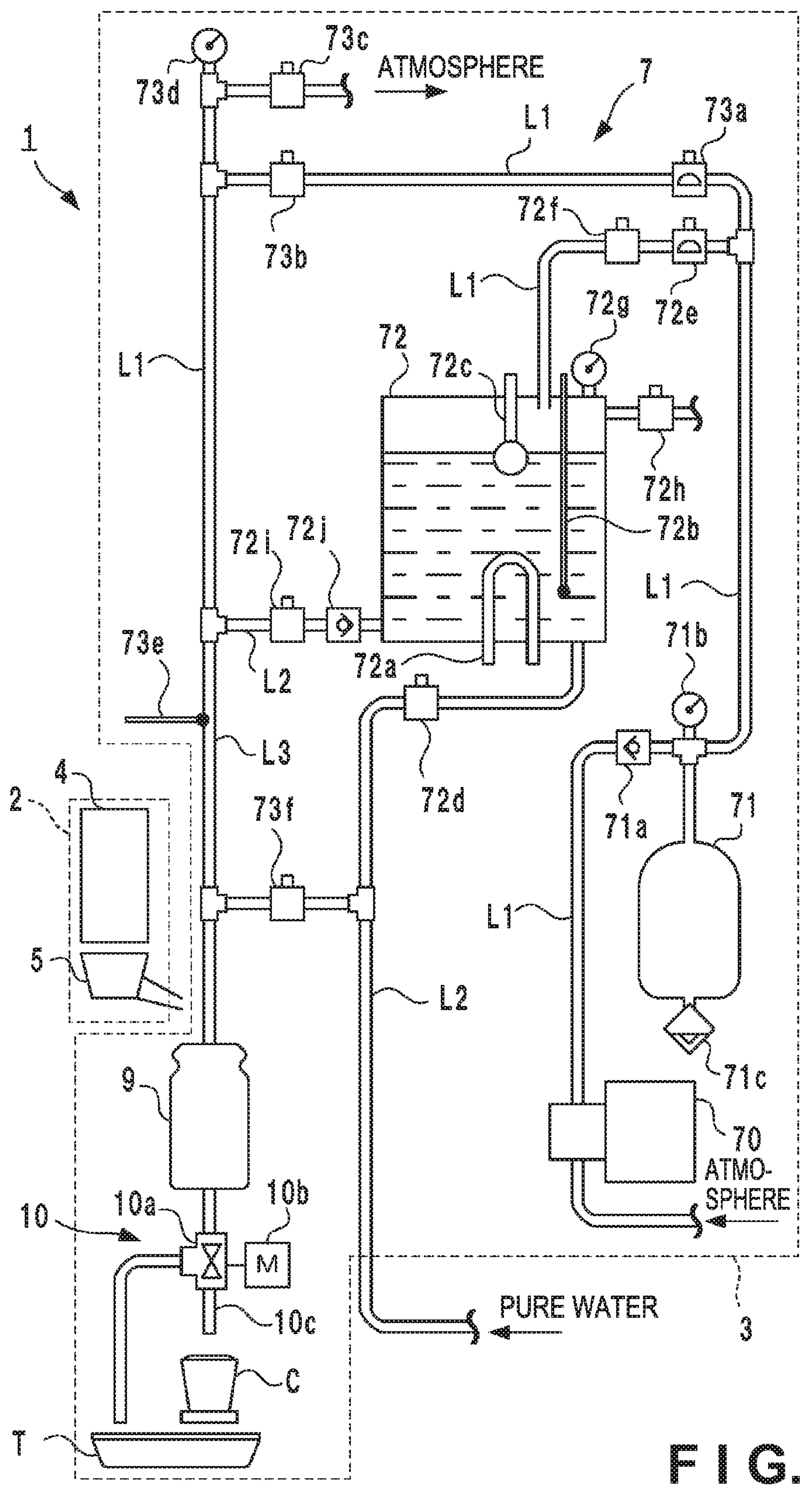
FIG. 1 is a schematic view of a beverage producing apparatus according to an embodiment of the present invention.
Figure 2:
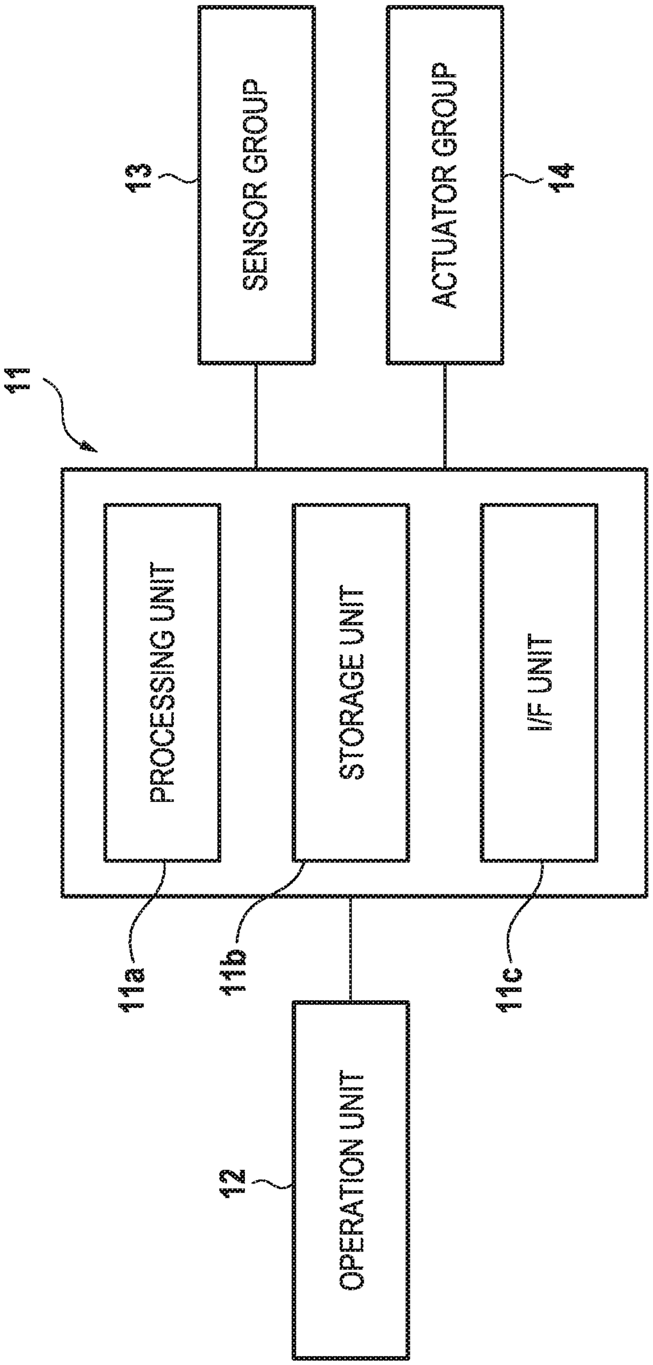
FIG. 2 is a block diagram of the control apparatus of the beverage producing apparatus shown in FIG. 1.

FIG. 1 is a schematic view of a beverage producing apparatus 1, and FIG. 2 is a block diagram of a control apparatus 11 of the beverage producing apparatus 1. The beverage producing apparatus 1 is an apparatus that automatically produces a coffee beverage from roasted coffee beans and a liquid (here, water), and can produce a cup of coffee beverage by one producing operation. The beverage producing apparatus 1 includes a bean processing apparatus 2, an extracting apparatus 3 and the control apparatus 11.

The control apparatus 11 controls the entire beverage producing apparatus 1. The control apparatus 11 includes a processing unit 11*a*, a storage unit 11*b* and an I/F (interface) unit 11*c*. The processing unit 11*a* is, for example, a processor such as a CPU. The storage unit 11*b* is, for example, a RAM or a ROM. The I/F unit 11*c* performs input/output of a signal between an external device and the processing unit 11*a*.

The processing unit 11*a* executes a program stored in the storage unit 11*b*, and controls an actuator group 14 based on an instruction from an operation unit 12 or detection results of a sensor group 13. The operation unit 12 is a unit that receives an instruction input of a user and includes, for example, a touch panel or a mechanical switch. The user can instruct production of a coffee beverage via the operation unit 12. The sensor group 13 includes various kinds of sensors (for example, a temperature sensor for hot water, an operation position detection sensor of a mechanism, a pressure sensor and the like) provided in the beverage producing apparatus 1. The actuator group 14 includes various kinds of actuators (for example, a motor, a solenoid valve, a heater and the like) provided in the beverage producing apparatus 1.

The bean processing apparatus 2 generates ground beans from roasted coffee beans. The extracting apparatus 3 extracts a coffee liquid from the ground beans supplied from the bean processing apparatus 2. The extracting apparatus 3 includes a fluid supply unit 7, a driving unit 8 to be described later, an extraction container 9 and a switching unit 10. The ground beans supplied from the bean processing apparatus 2 are input into the extraction container 9. The fluid supply unit 7 inputs hot water into the extraction container 9. A coffee liquid is extracted from the ground beans in the extraction container 9. The hot water containing the extracted coffee liquid is sent as a coffee beverage to a cup C via the switching unit 10.

<2. Fluid Supply Unit and Switching Unit>

The arrangements of the fluid supply unit 7 and the switching unit 10 will be described with reference to FIG. 1. First, the fluid supply unit 7 will be described. The fluid supply unit 7 performs supply of hot water to the extraction container 9, control of the air pressure in the extraction container 9 and the like. Note that in this specification, when an air pressure is represented by a number, it means an absolute pressure unless otherwise specified, and a gauge pressure is an air pressure based on an atmospheric pressure of 0 atm. The atmospheric pressure indicates an air pressure on the periphery of the extraction container 9 or an air pressure in the beverage producing apparatus. For example, when the beverage producing apparatus is placed at a point at an altitude of 0 m, the atmospheric pressure is the standard atmospheric pressure (1013.25 hPa) at an altitude of 0 m in International Standard Atmosphere [abbreviated as ISA] defined by International Civil Aviation Organization [abbreviated as ICAO] in 1976.

The fluid supply unit 7 includes pipes L1 to L3. The pipe L1 is a pipe to circulate air, and the pipe L2 is a pipe to circulate water. The pipe L3 is a pipe capable of circulating both air and water.

The fluid supply unit 7 includes a compressor 70 as a pressurizing source. The compressor 70 compresses air and sends it. The compressor 70 is driven by, for example, a motor (not shown) serving as a driving source. The compressed air sent from the compressor 70 is supplied to a reserve tank (accumulator) 71 via a check valve 71*a*. The air pressure in the reserve tank 71 is monitored by a pressure sensor 71*b*, and the compressor 70 is driven such that the air pressure is maintained at a predetermined air pressure (in this embodiment, 7 atm (6 atm in the gauge pressure)). The reserve tank 71 is provided with a drain 71*c* for drainage, and water generated by compressing air can be discharged.

Hot water (water) that forms a coffee beverage is stored in a water tank 72. The water tank 72 is provided with a heater 72*a* that heats the water in the water tank 72 and a temperature sensor 72*b* that measures the temperature of the water. The heater 72*a* maintains the temperature of the stored hot water at a predetermined temperature (in this embodiment, 120° C.) based on the detection result of the temperature sensor 72*b*. The heater 72*a* is, for example, turned on when the temperature of the hot water is 118° C. and turned off at 120° C.

The water tank 72 is also provided with a water level sensor 72*c*. The water level sensor 72*c* detects the water level of the hot water in the water tank 72. If the water level sensor 72*c* detects that the water level has fallen below a predetermined water level, water is supplied to the water tank 72. In this embodiment, tap water is supplied via a water purifier (not shown). A solenoid valve 72*d* is provided halfway through the pipe L2 from the water purifier. When the water level sensor 72*c* detects lowering of the water level, the solenoid valve 72*d* is opened to supply water. When the water level reaches a predetermined water level, the solenoid valve 72*d* is closed to cut off the water supply. The hot water in the water tank 72 is thus maintained at a predetermined water level. Note that the water supply to the water tank 72 may be done every time the hot water used for one production of a coffee beverage is discharged.

The water tank 72 is also provided with a pressure sensor 72*g*. The pressure sensor 72*g* detects the air pressure in the water tank 72. The air pressure in the reserve tank 71 is supplied to the water tank 72 via a relief valve 72*e* and a solenoid valve 72*f*. The relief valve 72*e* reduces the air pressure supplied from the reserve tank 71 to a predetermined air pressure. In this embodiment, the air pressure is reduced to 3 atm (2 atm in the gauge pressure). The solenoid valve 72*f* performs switching between supply of the air pressure controlled by the relief valve 72*e* to the water tank 72 and cut-off of the supply. Opening/closing of the solenoid valve 72*f* is controlled such that the air pressure in the water tank 72 is maintained at 3 atm except when supplying tap water to the water tank 72. When supplying tap water to the water tank 72, the air pressure in the water tank 72 is reduced by a solenoid valve 72*h* to a pressure (for example, less than 2.5 atm) lower than the water pressure of the tap water such that the tap water is smoothly supplied to the water tank 72 by the water pressure of the tap water. The solenoid valve 72*h* switches whether to release the interior of the water tank 72 to the atmosphere or not. At the time of pressure reduction, the interior of the water tank 72 is released to the atmosphere. In addition, except when supplying tap water to the water tank 72, when the air pressure in the water tank 72 exceeds 3 atm, the solenoid valve 72*h* releases the interior of the water tank 72 to the atmosphere, thereby maintaining the pressure in the water tank 72 at 3 atm.

The hot water in the water tank 72 is supplied to the extraction container 9 via a check valve 72*j*, a solenoid valve 72*i* and the pipe L3. When the solenoid valve 72*i* is opened, the hot water is supplied to the extraction container 9. When the solenoid valve 72*i* is closed, the supply of the hot water is cut off. The supply amount of the hot water to the extraction container 9 can be managed by the opening time of the solenoid valve 72*i*. However, the supply amount may be measured, and the opening/closing of the solenoid valve 72*i* may be controlled. The pipe L3 is provided with a temperature sensor 73*e* that measures the temperature of the hot water, and the temperature of the hot water supplied to the extraction container 9 is monitored.

The air pressure in the reserve tank 71 also is supplied to the extraction container 9 via a relief valve 73*a* and a solenoid valve 73*b*. The relief valve 73*a* reduces the air pressure supplied from the reserve tank 71 to a predetermined air pressure. In this embodiment, the air pressure is reduced to 5 atm (4 atm in the gauge pressure). The solenoid valve 73*b* performs switching between supply of the air pressure controlled by the relief valve 73*a* to the extraction container 9 and cut-off of the supply. The air pressure in the extraction container 9 is detected by a pressure sensor 73*d*. When raising the air pressure in the extraction container 9, the solenoid valve 73*b* is opened based on the detection result of the pressure sensor 73*d*, and the pressure in the extraction container 9 is raised to a predetermined air pressure (in this embodiment, 5 atm at maximum (4 atm in the gauge pressure)). The air pressure in the extraction container 9 can be reduced by a solenoid valve 73*c*. The solenoid valve 73*c* switches whether to release the interior of the extraction container 9 to the atmosphere or not. At the time of a pressure anomaly (for example, when the air pressure in the extraction container 9 exceeds 5 atm), the interior of the extraction container 9 is released to the atmosphere.

In this embodiment, when one production of a coffee beverage ends, the interior of the extraction container 9 is washed with tap water. A solenoid valve 73*f* is opened at the time of washing and supplies tap water to the extraction container 9.

The switching unit 10 will be described next. The switching unit 10 is a unit that switches the sending destination of a liquid sent from the extraction container 9 to one of a pouring portion 10*c* and a waste tank T. The switching unit 10 includes a selector valve 10*a* and a motor 10*b* that drives the selector valve 10*a*. When sending the coffee beverage in the extraction container 9, the selector valve 10*a* switches the channel to the pouring portion 10*c*. The coffee beverage is poured from the pouring portion 10*c* to the cup C. When discharging a waste fluid (tap water) and a residue (ground beans) in washing, the channel is switched to the waste tank T. In this embodiment, the selector valve 10*a* is a 3-port ball valve. Since the residue passes through the selector valve 10*a* at the time of washing, the selector valve 10*a* is preferably a ball valve. The motor 10*b* rotates its rotating shaft, thereby switching the channel.

<3. Bean Processing Apparatus>

Figure 3:
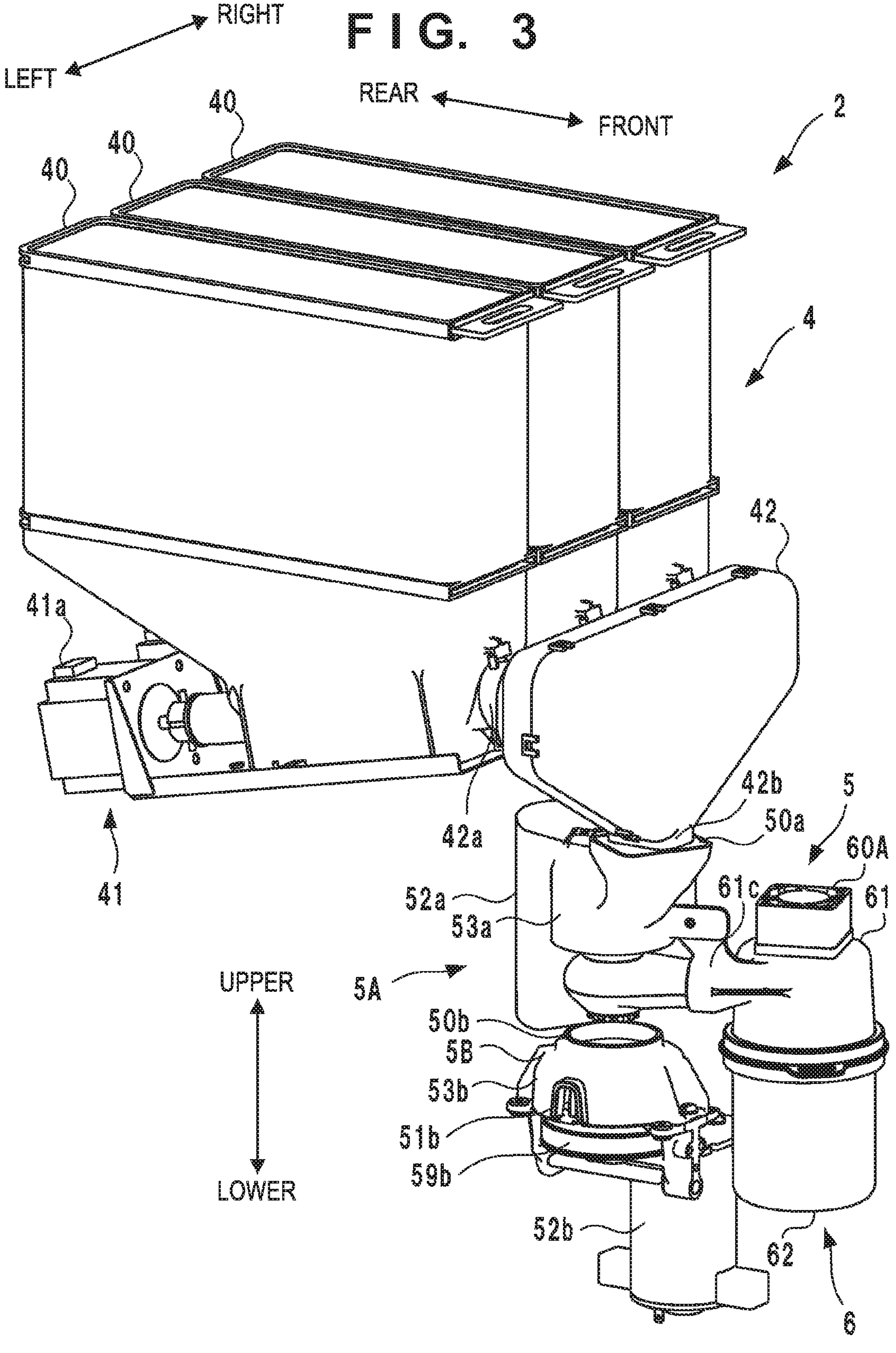
FIG. 3 is a perspective view of a bean processing apparatus.

The bean processing apparatus 2 will be described with reference to FIG. 3. FIG. 3 is a perspective view of the bean processing apparatus 2. The bean processing apparatus 2 includes a storage apparatus 4 and a grinding apparatus 5.

<3-1. Storage Apparatus>

The storage apparatus 4 includes a plurality of canisters 40 in which coffee beans after roasting are stored. In this embodiment, three canisters 40 are provided. When discriminating the three canisters 40, they will be referred to as canisters 40A, 40B and 40C. The canisters 40A to 40C may store roasted coffee beans of types different from each other and the type of roasted coffee beans to be used to produce a coffee beverage may be selected by an operation input to the operation unit 12. The roasted coffee beans of different types are, for example, roasted coffee beans of different varieties of coffee beans. Alternatively, the roasted coffee beans of different types may be roasted coffee beans of the same variety of coffee beans but different roasting degrees. Otherwise, the roasted coffee beans of different types may be roasted coffee beans of different varieties and different roasting degrees. At least one of the three canisters 40 may store roasted coffee beans in which roasted coffee beans of a plurality of varieties are mixed. In this case, the degrees of roasting may almost equal in the roasted coffee beans of the varieties.

Note that in this embodiment the plurality of canisters 40 are provided. However, only one canister 40 may be provided. In addition, when the plurality of canisters 40 are provided, roasted coffee beans of the same type may be stored in all or a plurality of canisters 40.

A conveyor 41 is individually provided for each canister 40. The conveyor 41 is a sending mechanism (conveyance mechanism) that automatically sends a predetermined amount of roasted coffee beans stored in the canister 40 to the downstream side. The conveyor 41 according to this embodiment is a screw conveyor using a motor 41*a* as a driving source, and serves as a measuring unit that automatically measures the roasted coffee beans. The sending amount of the roasted coffee beans can be controlled by the rotation amount of the motor 41*a* (the rotation amount of the screw). Each conveyor 41 discharges the roasted coffee beans to a collective conveyance path 42 on the downstream side. The collective conveyance path 42, the collective conveyance path 42 is formed from a hollow member, and includes an inlet 42*a* for each conveyor 41 and a common outlet 42*b*. The roasted coffee beans are supplied from the common outlet 42*b* to the grinding apparatus 5.

<3-2. Grinding Apparatus>

Figure 4:
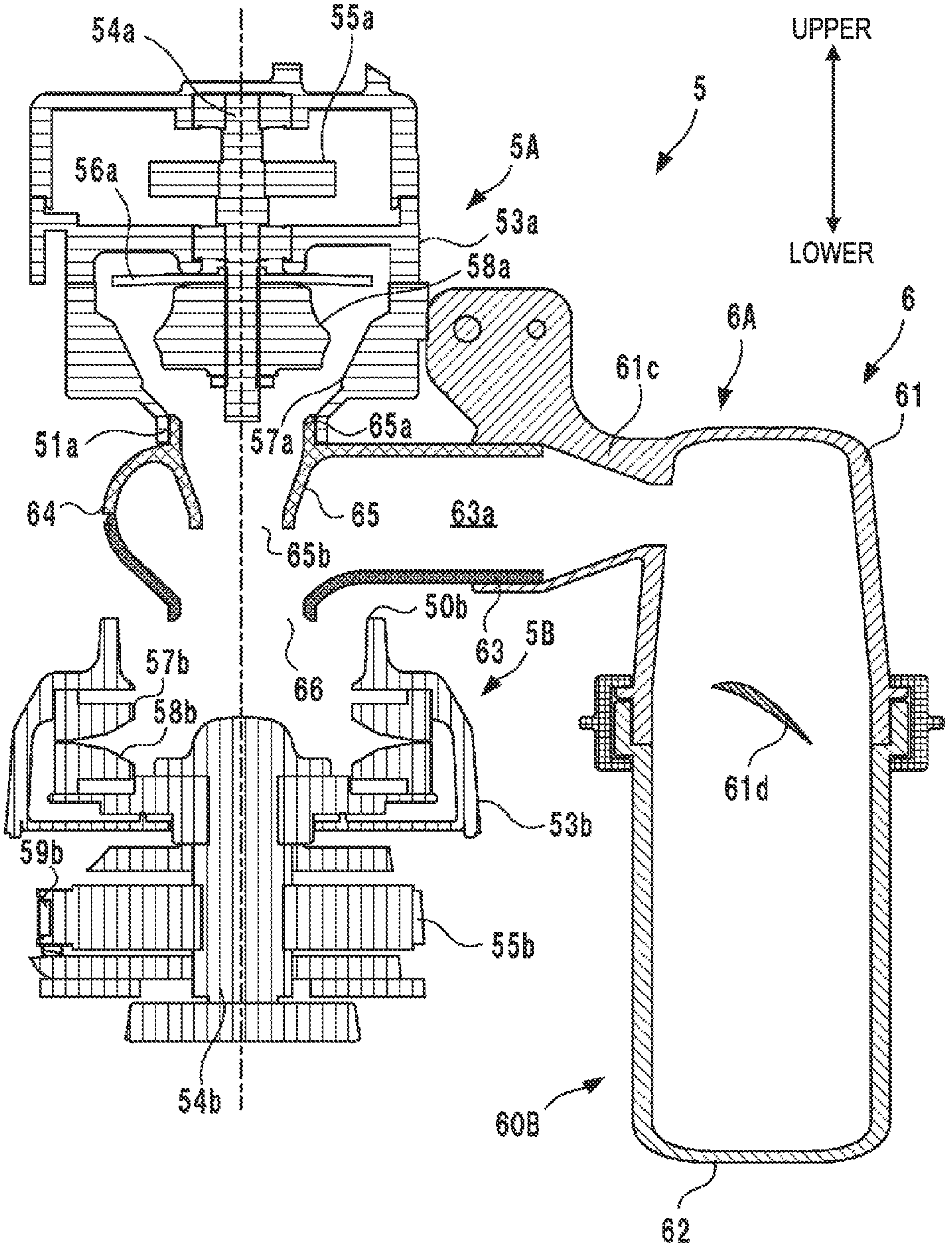
FIG. 4 is a longitudinal sectional view of a grinding apparatus.

The grinding apparatus 5 will be described with reference to FIGS. 3 and 4. FIG. 4 is a longitudinal sectional view of the grinding apparatus 5. The grinding apparatus 5 includes grinders 5A and 5B and a separation apparatus 6. The grinders 5A and 5B are mechanisms that grind the roasted coffee beans supplied from the storage apparatus 4. The grinders 5A and 5B grind the beans to different particle sizes. The grinder 5A is a grinder for coarse grinding, and the grinder 5B is a grinder for fine grinding.

<3-2-1. Grinder>

The grinder 5A includes a motor 52*a* and a main body portion 53*a*. The motor 52*a* is the driving source of the grinder 5A. The main body portion 53*a* is a unit that stores a cutter, and incorporates a rotating shaft 54*a*. The rotating shaft 54*a* is provided with a gear 55*a*, and the driving force of the motor 52*a* is transmitted to the rotating shaft 54*a* via the gear 55*a*.

The rotating shaft 54*a* is also provided with a rotary blade 58*a* that is a cutter. A stationary blade 57*a* that is a cutter is also provided on the periphery of the rotary blade 58*a*. The interior of the main body portion 53*a* communicates with an inlet 50*a* and an outlet 51*a*. The roasted coffee beans supplied from the collective conveyance path 42 enter from the inlet 50*a* formed in a side portion of the main body portion 53*a* into the main body portion 53*a* in the horizontal direction and are ground while being sandwiched between the rotary blade 58*a* and the stationary blade 57*a*. A suppression plate 56*a* is provided on the upper side of the rotary blade 58*a* of the rotating shaft 54*a*. The suppression plate 56*a* suppresses escape of the roasted coffee beans to the upper side. The grinder 5A grinds the roasted coffee beans to, for example, about ¼. The ground beans are discharged from the outlet 51*a* to the separation apparatus 6.

Note that the roasted coffee beans supplied to the inlet 50*a* may be supplied not from above the rotary blade 58*a* but to a height to hit the side surface. In this case, since escape of the roasted coffee beans to the upper side is suppressed by the rotary blade 58*a*, the suppression plate 56*a* need not be provided.

The grinder 5A may change the rotation speed of the rotary blade 58*a*, thereby changing the size of the roasted coffee beans discharged after grinding. In addition, the distance between the rotary blade 58*a* and the stationary blade 57*a* may be changed by manual adjustment.

The separation apparatus 6 is a mechanism that separates an unwanted substance from the ground beans. The separation apparatus 6 is arranged between the grinder 5A and the grinder 5B. That is, in this embodiment, the roasted coffee beans supplied from the storage apparatus 4 are coarsely ground by the grinder 5A first, and an unwanted substance is separated from the coarse-ground beans by the separation apparatus 6. The coarse-ground beans from which the unwanted substance is separated are finely ground by the grinder 5B. The unwanted substance separated by the separation apparatus 6 is representatively chaff or a fine powder. This may spoil the taste of a coffee beverage. The separation apparatus 6 is a mechanism that separates the unwanted substance by the suction force of air, and details will be described later.

The grinder 5B includes a motor 52*b* and a main body portion 53*b*. The motor 52*b* is the driving source of the grinder 5B. The main body portion 53*b* is a unit that stores a cutter, and incorporates a rotating shaft 54*b*. The rotating shaft 54*b* is provided with a pulley 55*b*, and the driving force of the motor 52*b* is transmitted to the rotating shaft 54*b* via a belt 59*b* and the pulley 55*b*.

The rotating shaft 54*b* is also provided with a rotary blade 58*b*. A stationary blade 57*b* is also provided on the upper side of the rotary blade 58*b*. The interior of the main body portion 53*b* communicates with an inlet 50*b* and an outlet 51*b*. The ground beans falling from the separation apparatus 6 enter from the inlet 50*b* into the main body portion 53*b* and are further ground while being sandwiched between the rotary blade 58*b* and the stationary blade 57*b*. The ground beans ground to a powder are discharged from the outlet 51*b*. Note that the particle size of the ground beans in the grinder 5B can be adjusted by adjusting the gap between the rotary blade 58*b* and the stationary blade 57*b*.

Grinding of the roasted coffee beans may be one grinder (grinding of one step). However, when grinding is performed in two steps by the two grinders 5A and 5B as in this embodiment, the particle sizes of the ground beans can readily become even, and the degree of extraction of a coffee liquid can be made constant. When grinding beans, heat is generated in some cases due to friction between the cutter and the beans. When grinding is performed in two steps, it is possible to suppress heat generation caused by friction at the time of grinding and prevent degradation of ground beans (for example, loss of flavor).

In addition, since the steps of coarse grinding→separation of unwanted substance→fine grinding are performed, the mass difference between the unwanted substance and the ground beans (necessary portion) can be made large when separating the unwanted substance such as chaff. This makes it possible to raise the separation efficiency of the unwanted substance and also prevent the ground beans (necessary portion) from being separate as the unwanted substance. In addition, when unwanted substance separation processing using suction of air intervenes between coarse grinding and fine grinding, heat generation of the ground beans can be suppressed by air cooling. This can prevent degradation of ground beans (for example, loss of flavor).

<3-2-2. Separation Apparatus>

Figure 5:
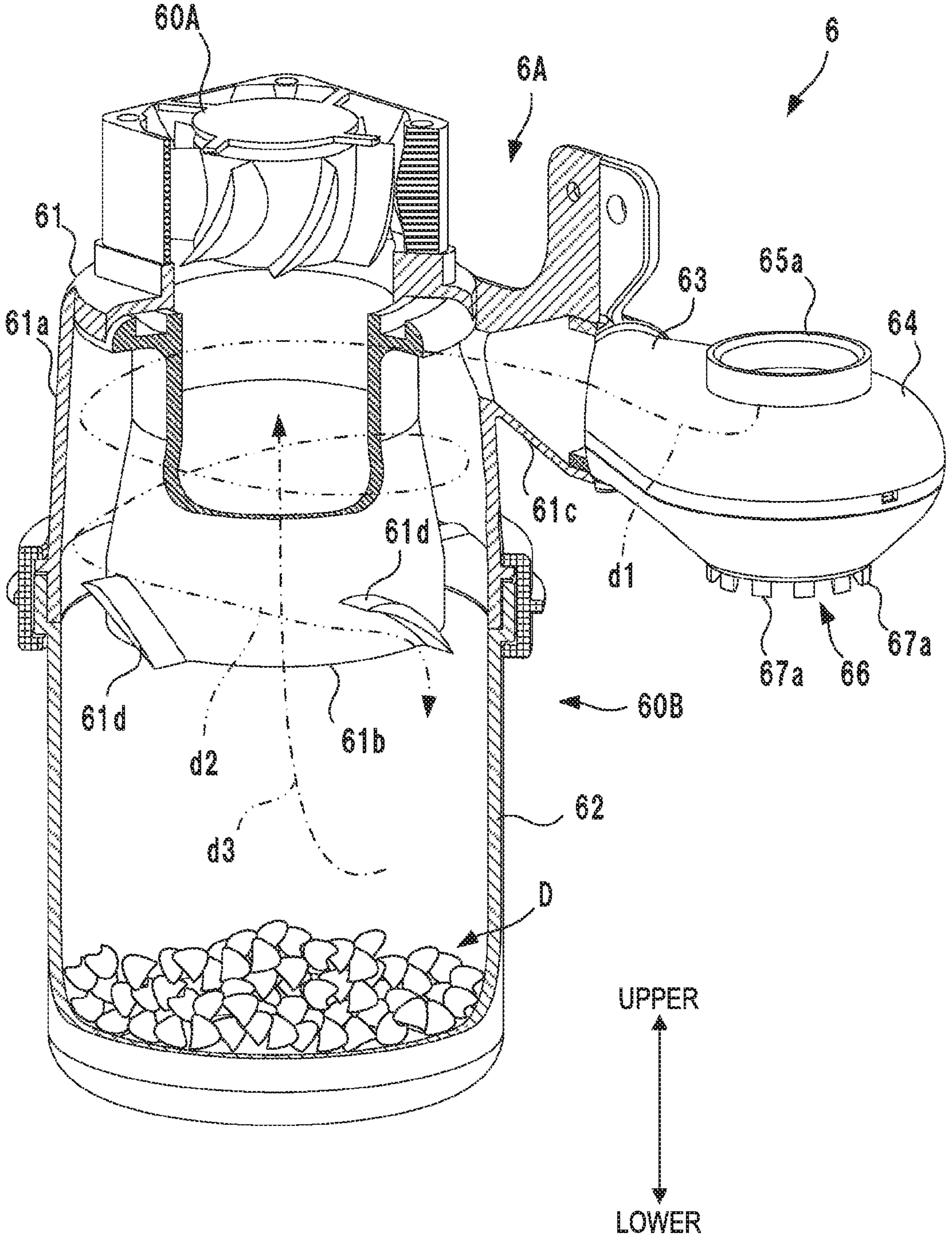
FIG. 5 is a partially cutaway perspective view of a separation apparatus.

The separation apparatus 6 will be described next with reference to FIGS. 3 to 5. FIG. 5 is a partially cutaway perspective view of the separation apparatus 6. The separation apparatus 6 includes a suction unit 6A and a forming unit 6B. The forming unit 6B is a hollow body that forms a separation chamber SC which the ground beans making a free fall from the grinder 5A pass through. The suction unit 6A is a unit that communicates with the separation chamber SC in a direction (in this embodiment, the horizontal direction) crossing the passing direction (in this embodiment, the vertical direction) of the ground beans and sucks air in the separation chamber SC. When the air in the separation chamber SC is sucked, a lightweight object such as chaff or a fine powder is sucked. The unwanted substance can thus be separated from the ground beans.

The suction unit 6A is a centrifugal mechanism. The suction unit 6A includes a blower unit 60A and a collection container 60B. In this embodiment, the blower unit 60A is a fan motor, and expels air in the collection container 60B upward.

The collection container 60B includes an upper portion 61 and a lower portion 62, which separably engage with each other. The lower portion 62 has a tubular shape with an open top and a closed bottom, and forms a space to store an unwanted substance. The upper portion 61 forms a lid portion attached to the opening of the lower portion 62. The upper portion 61 includes a cylindrical outer peripheral wall 61*a* and an exhaust stack 61*b* formed to be coaxial with the outer peripheral wall 61*a*. The blower unit 60A is fixed to the upper portion 61 on the upper side of the exhaust stack 61*b* so as to suck air in the exhaust stack 61*b*. The upper portion 61 also includes a tubular connecting portion 61*c* extended in the radial direction. The connecting portion 61*c* is connected to the forming unit 6B and makes the separation chamber SC and the collection container 60B communicate. The connecting portion 61*c* opens to a lateral side of the exhaust stack 61*b*.

When the blower unit 60A is driven, an airflow indicated by arrows d1 to d3 in FIG. 5 is generated. By this airflow, air containing an unwanted substance is sucked from the separation chamber SC into the collection container 60B through the connecting portion 61*c*. Since the connecting portion 61*c* opens to a lateral side of the exhaust stack 61*b*, the air containing the unwanted substance turns around the exhaust stack 61*b*. An unwanted substance D in the air falls by the weight of its own and is collected to a portion of the collection container 60B (accumulates on the bottom surface of the lower portion 62). The air passes through the exhaust stack 61*b* and is expelled to above.

A plurality of fins 61*d* are integrally formed on the peripheral surface of the exhaust stack 61*b*. The plurality of fins 61*d* are arrayed in the circumferential direction of the exhaust stack 61*b*. Each fin 61*d* obliquely tilts with respect to the axial direction of the exhaust stack 61*b*. By providing the fins 61, turn of the air containing the unwanted substance D around the exhaust stack 61*b* is promoted. In addition, separation of the unwanted substance D is promoted by the fins 61. As a result, the length of the suction unit 6A in the vertical direction can be suppressed, contributing to downsizing of the apparatus.

Additionally, in this embodiment, the forming unit 6B is arranged in the falling path of the ground beans by the grinders 5A and 5B, whereas the centrifugal suction unit 6A is arranged on a lateral side of the falling path. A centrifugal mechanism readily becomes long in the vertical direction. However, when the suction unit 6A is moved from the falling path and arranged on the lateral side, the suction unit 6A can be lined up in the horizontal direction with respect to the grinders 5A and 5B. This contributes to suppressing of the length of the apparatus in the vertical direction. In particular, when grinding is performed in two steps by the two grinders 5A and 5B, as in this embodiment, the length of the apparatus in the vertical direction tends to increase. For this reason, such an arrangement of the suction unit 6A is effective for downsizing of the apparatus.

Figure 6:
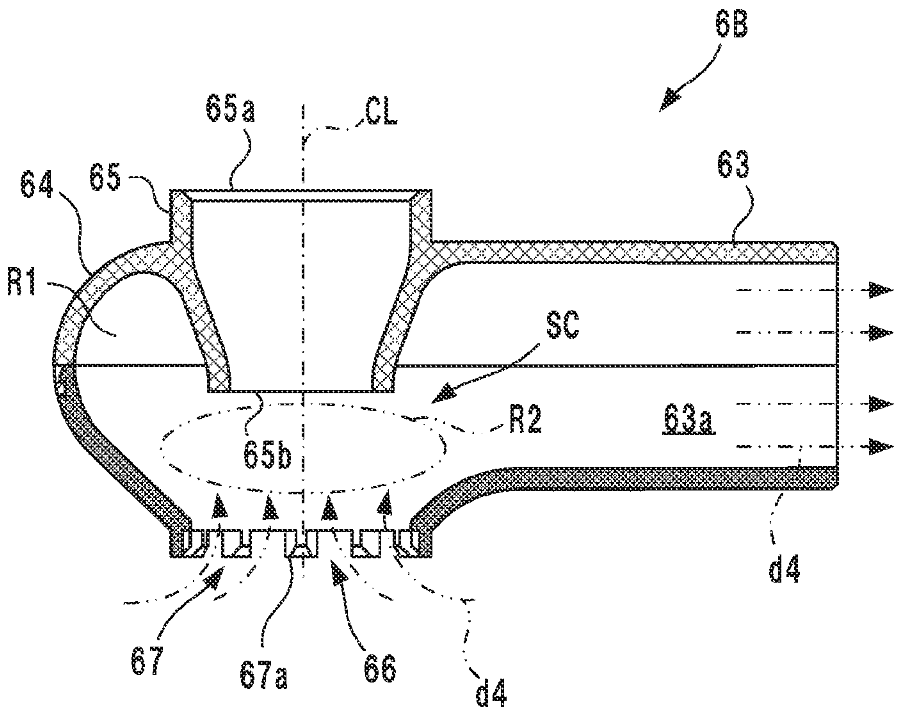
FIG. 6 is a longitudinal sectional view of a forming unit.
Figure 7:
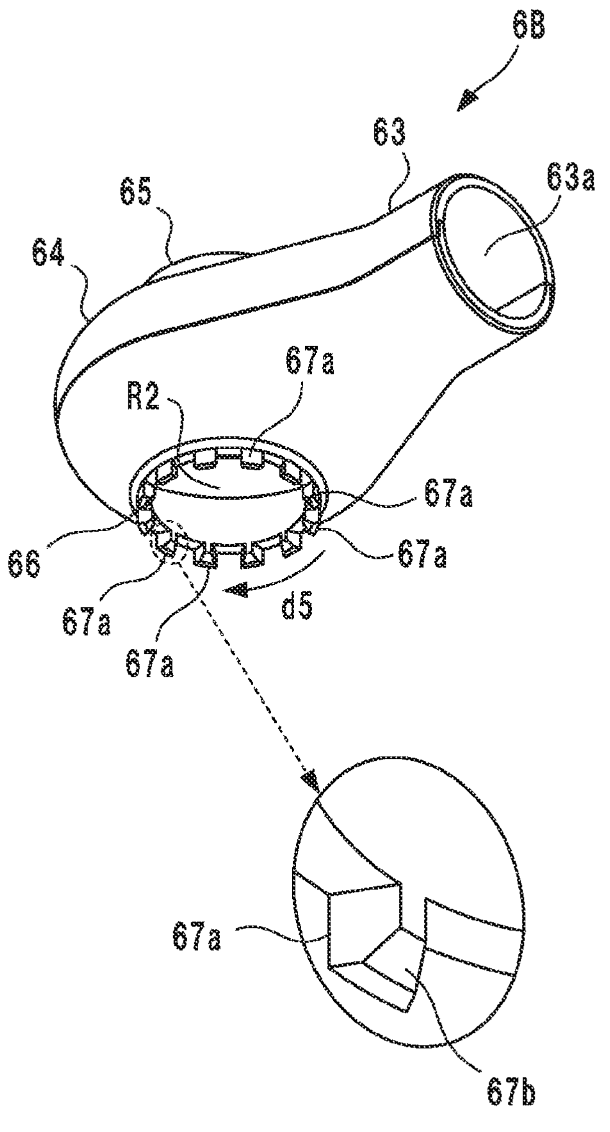
FIG. 7 shows a perspective view and a partially enlarged view of the forming unit shown in FIG. 6.
Figure 8:
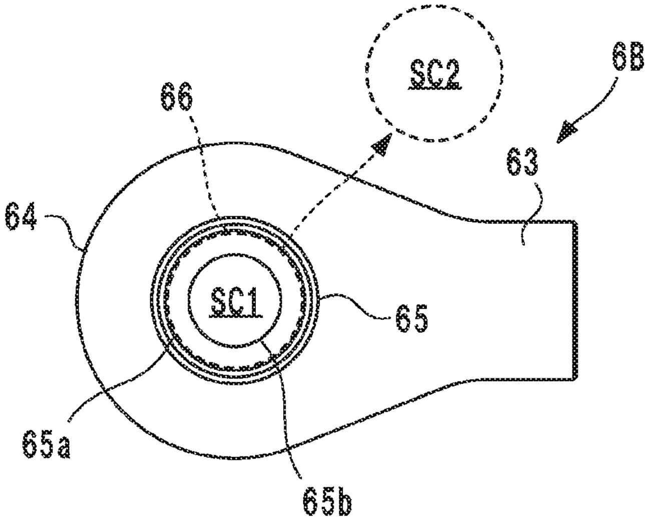
FIG. 8 is an explanatory view of comparison of sectional areas.

The forming unit 6B will be described with reference to FIGS. 3 to 9. FIG. 6 is a longitudinal sectional view of the forming unit 6B. FIG. 7 shows a perspective view and a partially enlarged view of the forming unit 6B. FIG. 8 is a plan view of the forming unit 6B, which is an explanatory view of comparison of sectional areas.

In this embodiment, the forming unit 6B is formed by connecting two members divided into halves in the vertical direction. The forming unit 6B includes a pipe portion 63 and a separation chamber forming portion 64 and has a spoon shape in a plan view. The pipe portion 63 is a tubular body that forms a communicating path 63*a* to the suction unit 6A, and is extended in the horizontal direction (a direction crossing a center line CL to be described later). The separation chamber forming portion 64 is an annular hollow body opening at the center in the vertical direction, which is connected to the pipe portion 63 and forms the separation chamber SC.

In this embodiment, when separating the unwanted substance from the ground beans, a method of applying a wind pressure in the horizontal direction to the ground beans falling from the grinder 5A and sucking the unwanted substance is employed. This is advantageous because the length in the vertical direction can be decreased as compared to the centrifugal method.

The separation chamber forming portion 64 includes a tubular portion 65 extended in the vertical direction. A portion from the center portion to the lower portion of the tubular portion 65 in the vertical direction projects into the separation chamber SC. The tubular portion 65 includes an opening portion 65*a* at one end. The opening portion 65*a* forms the inlet for ground beans, which communicates with the separation chamber SC. The opening portion 65*a* is located outside the separation chamber SC and connected to the outlet 51*a* of the grinder 5A. Accordingly, the ground beans falling from the outlet 51*a* are introduced into the separation chamber forming portion 64 without leaking. The tubular portion 65 includes an opening portion 65*b* at the other end on the lower side. The opening portion 65*b* is located in the separation chamber SC. Since the opening portion 65*b* faces the separation chamber SC, the ground beans falling from the outlet 51*a* are introduced into the separation chamber SC without leaking.

In this embodiment, the tubular portion 65 has a cylindrical shape, and the opening portions 65*a* and 65*b* have concentric circular shapes located on the center line CL. The ground beans falling from the outlet 51*a* thus readily pass through the tubular portion 65. The tubular portion 65 has a tapered shape in which the sectional area of the internal space gradually becomes small from the side of the opening portion 65*a* to the side of the opening portion 65*b*. Since the inner wall of the tubular portion 65 forms a mortar shape, the falling ground beans readily collide against the inner wall. The ground beans falling from the grinder 5A sometimes fall as a lump with particles adhered to each other. If the ground beans are in a lump state, the separation efficiency of the unwanted substance may lower. In this embodiment, when the ground beans forming a lump collide against the inner wall of the tubular portion 65, the lump breaks, and the unwanted substance is easily separated.

Note that the inner wall of the tubular portion 65 need not always have the mortar shape to break the lump of ground beans. If the tubular portion 65 has, in its middle portion, a portion where the sectional area of the internal space is smaller than in the opening portion 65*a*, and an inner wall tilting (not level) with respect to the center line CL thus exists, it is possible to make the ground beans smoothly fall while promoting collision with the lump. In addition, the tubular portion 65 need not project into the separation chamber SC, and may have only a portion projecting upward from the outer surface of the separation chamber forming portion 64. However, when the tubular portion 65 projects into the separation chamber SC, the wind velocity around the tubular portion 65 can be improved. For this reason, the unwanted substance separation effect by the wind pressure can be enhanced in a region R1 relatively far from the pipe portion 63.

The separation chamber forming portion 64 includes an outlet 66 communicating with the separation chamber SC, to which the ground beans after separation of the unwanted substance are discharged. In this embodiment, the outlet 66 is located under the opening portion 65*b*. The ground beans that have passed through the tubular portion 65 pass through the separation chamber SC and freely fall from the outlet 66. In this embodiment, the outlet 66 is a circular opening located on the center line CL, which is an opening concentric to the opening portions 65*a* and 65*b*. For this reason, the ground beans readily pass through the separation chamber forming portion 64 by free fall, and the ground beans can be prevented from accumulating in the separation chamber forming portion 64.

As shown in FIG. 8, in this embodiment, a sectional area SC2 of the outlet 66 is larger than a sectional area SC1 of the opening portion 65*b*. In this embodiment, the opening portion 65*b* and the outlet 66 overlap each other when viewed in the vertical direction. Hence, when the opening portion 65*b* is projected in vertical direction to the outlet 66, the opening portion 65*b* is fitted inside the outlet 66. In other words, the opening portion 65*b* is within a region formed by extending the outlet 66 in the vertical direction. An arrangement in which the opening portion 65*b* and the outlet 66 are not located on the same center line but overlap or an arrangement in which at least one of the opening portion 65*b* and the outlet 66 is not circular, but they overlap can also be employed.

The ratio of the sectional area SC1 to the sectional area SC2 is, for example, 95% or less or 85% or less and, for example, 60% or more or 70% or more. Since the opening portion 65*b* and the outlet 66 are concentric circles, they overlap each other when viewed in the direction of the center line CL. For this reason, the ground beans freely falling from the opening portion 65*b* are readily discharged from the outlet 66. It is also possible to prevent the falling ground beans from colliding against the edge of the outlet 66 and bouncing to the side of the pipe portion 63 and also suppress suction of necessary ground beans into the suction unit 6A. The opening area of the one-end opening portion (for example, 65*a*) is smaller than the opening area of the outlet (for example, 66), as exemplified above. However, the opening area of the outlet (for example, 66) and the opening area of the one-end opening portion (for example, 65*a*) may equal, or the opening area of the one-end opening portion (for example, 65*a*) may be larger than the opening area of the outlet (for example, 66). The opening area of the other-end opening portion (for example, 65*b*) is smaller than the opening area of the outlet (for example, 66), as exemplified above. However, the opening area of the outlet (for example, 66) and the opening area of the other-end opening portion (for example, 65*b*) may equal, or the opening area of the other-end opening portion (for example, 65*b*) may be larger than the opening area of the outlet (for example, 66). The suction unit (for example, 6A) sucks air from the outlet 66 and the inlet (for example, 65*a*, 65*a*'), as exemplified above. However, the amount of air sucked from the outlet 66 may be made larger than the amount of air sucked from the inlet (for example, 65*a*, 65*a*'). This may be implemented by making the other-end opening portion (for example, 65*b*) project into the separation chamber, by making the size of the sectional area of the outlet 66 larger than the size of the opening area of the one-end opening portion (for example, 65*a*), by making the size of the sectional area of the outlet 66 larger than the size of the opening area of the other-end opening portion (for example, 65*b*), by making the distance from the outlet 66 to the separation chamber shorter than the distance from the one-end opening portion (for example, 65*a*) to the separation chamber, by making the distance from the outlet 66 to the exhaust stack 61*b* shorter than the distance from the one-end opening portion (for example, 65*a*) to the exhaust stack 61*b*, or by making the distance from the outlet 66 to the blower unit 60A shorter than the distance from the one-end opening portion (for example, 65*a*) to the blower unit 60A. One of the inner wall portions of the members (63 to 65) that form the forming unit 6B and the separation chamber SC, the tubular portion 65, or the other-end opening portion (for example, 65*b*) may be configured to come into contact with the grinder (at least one of the grinders 5A and 5B) directly or indirectly via another member and vibrate by receiving a vibration transmitted from the grinder that rotates. For example, in the case of the beverage producing apparatus 1 according to this embodiment, since these members are in direct or indirect contact, during the grinder operation one of the inner wall portions of the members (63 to 65) that form the forming unit 6B and the separation chamber SC, the tubular portion 65, or the other-end opening portion (for example, 65*b*) vibrates, a brake is applied by turbulent air generated by the vibration in the separation chamber SC to a lightweight unwanted substance that enters from the other-end opening portion (for example, 65*b*) into the separation chamber SC, and the unwanted substance is readily sucked by the suction unit (for example, 6A). In particular, as in the beverage producing apparatus 1 according to the embodiment, the forming unit 6B is in direct contact with the grinder 5A of the grinders 5A and 5B. An appropriate vibration may be applied to the forming unit 6B by bringing it into direct contact with one grinder in this way, thereby readily sucking a lightweight unwanted substance.

In this embodiment, the air sucked by the suction unit 6A is mainly sucked from the outlet 66. For this reason, a gap is provided between the outlet 66 and the inlet 50*b* of the grinder 5B, and suction of air is promoted. An arrow d4 schematically represents the direction of the flow of air sucked by the suction unit 6A. When air is sucked from the outlet 66, the unwanted substance is hardly discharged from the outlet 66, the separation performance between the ground beans and the unwanted substance can be improved. Note that the air sucked by the suction unit 6A is sucked from the opening portion 65*a* as well.

A turbulence promoting portion 67 is formed on the peripheral wall that defines the outlet 66. The turbulence promoting portion 67 generates turbulence in the air sucked from the outlet 66 into the separation chamber SC. When the turbulence promoting portion 67 is formed, turbulence readily occurs especially in a region R2 between the opening portion 65*b* and the outlet 66. Additionally, in this embodiment, since the wind velocity improves on the periphery of the tubular portion 65, generation of turbulence in the region R2 can synergistically be promoted.

The ground beans input into the inlet 65*a* are stirred by the influence of the turbulence when passing through the region R2. In this embodiment, particularly, since the sectional area SC2 of the outlet 66 is larger than the sectional area SC1 of the opening portion 65*b* as described above, the ground beans always pass through the region R2. By the turbulence, an unwanted substance such as chaff or a fine powder is readily separated from the ground beans. Hence, even if the separation chamber SC is a small space, the unwanted substance separation efficiency can be improved. In particular, this contributes to reduction of the length of the separation chamber SC in the vertical direction and is advantageous for downsizing of the apparatus in which grinding is performed in two steps by the two grinders 5A and 5B, as in this embodiment.

In this embodiment, the turbulence promoting portion 67 includes a plurality of turbulence promoting elements 67*a*. The turbulence promoting elements 67*a* are projections projecting downward in the vertical direction. The projecting direction of the turbulence promoting elements 67*a* can be any direction. However, the direction is preferably a direction within the range from the downward direction to inward in the radial direction because the turbulence can more easily be generated in the separation chamber SC. More preferably, since the projecting direction is the downward direction, as in this embodiment, the ground beans that have fallen are never caught.

As for the sectional shape of the turbulence promoting element 67*a*, a trapezoidal prism is arranged such that the upper base of the section is directed in the direction of the center line CL, and chamfering 67*b* is applied to the inside at the distal end. The shape of the turbulence promoting element 67*a* is not limited to the shape according to this embodiment. A shape that three-dimensionally complicates the shape of the outlet 66 is preferable.

In this embodiment, the turbulence promoting elements 67*a* are repetitively formed in a peripheral direction d5 of the outlet 66. Accordingly, air blows from multiple directions into a region R, and generation of turbulence is promoted. The pitches of the adjacent turbulence promoting elements 67*a* may be different pitches. In this embodiment, however, equal pitches are used. Twelve turbulence promoting elements 67*a* are formed. However, the number of turbulence promoting elements 67*a* is arbitrary.

<3-2-3. Other Examples of Arrangement>

Figure 9:
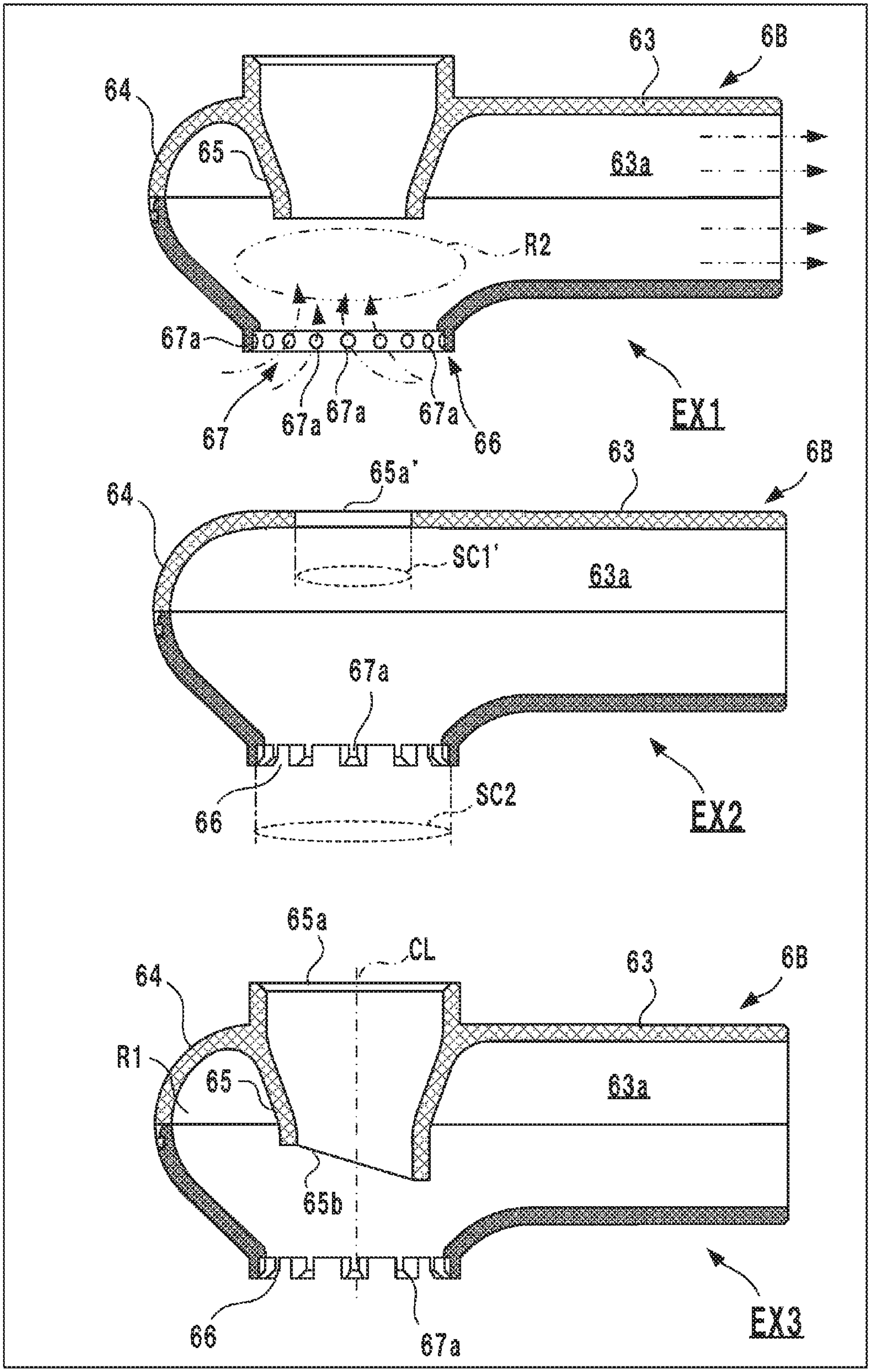
FIG. 9 is an explanatory view of other examples.

Other examples of the arrangement of the separation chamber forming portion 64 will be described with reference to FIG. 9. The turbulence promoting element 67*a* may be not a projection but a notch or a hole. An example EX1 shown in FIG. 9 shows an example in which the turbulence promoting element 67*a* is a through hole formed in the peripheral wall of the outlet 66. Such a hole can also promote generation of turbulence in the region R2.

An example EX2 shown in FIG. 9 shows an example in which the tubular portion 65 is not provided. Even in this case, an arrangement that makes the sectional area SC2 of the outlet 66 larger than a sectional area SC1' of an inlet 65*a*' is preferable.

The opening portion 65*b* of the tubular portion 65 may be not an opening on a horizontal level but an opening on a tilting plane. In an example EX3 shown in FIG. 9, the lower end of the tubular portion 65 on the side of the pipe portion 63 projects downward as compared to the lower end on the opposite side. With this arrangement, the ground beans are readily guided to the side of the region R1, stay time of the ground beans in the separation chamber SC can be prolonged, and the separation effect can be enhanced <4. Driving Unit and Extraction Container>

<4-1. Outline>

The driving unit 8 and the extraction container 9 of the extracting apparatus 3 will be described with reference to FIG. 10. FIG. 10 is a perspective view of the driving unit 8 and the extraction container 9.

The driving unit 8 is supported by a frame F. The frame F includes upper and lower beam portions F1 and F2 and a column portion F3 that supports the beam portions F1 and F2. The driving unit 8 is roughly divided into three units, that is, an upper unit 8A, a middle unit 8B and a lower unit 8C. The upper unit 8A is supported by the beam portion F1. The middle unit 8B is supported by the beam portion F1 between the beam portion F1 and the beam portion F2. The lower unit 8C is supported by the beam portion F2.

The extraction container 9 is a chamber including a container main body 90 and a lid unit 91. The extraction container 9 will sometimes be referred to as a chamber. The middle unit 8B includes an arm member 820 that detachably holds the container main body 90. The arm member 820 includes a holding member 820*a* and a pair of shaft members 820*b* spaced apart to the left and right sides. The holding member 820*a* is an elastic member made of a resin or the like and formed into a C-shaped clip shape. The holding member 820*a* holds the container main body 90 by the elastic force. The holding member 82*a* holds the left and right side portions of the container main body 90 and exposes the front side of the container main body 90. The inside of the container main body 90 can thus be readily visible in a front view.

Attachment/detachment of the container main body 90 to/from the holding member 820*a* is done by a manual operation. When the container main body 90 is pressed against the holding member 820*a* rearward in the longitudinal direction, the container main body 90 is attached to the holding member 820*a*. In addition, when the container main body 90 is removed frontward in the longitudinal direction from the holding member 820*a*, the container main body 90 can be separated from the holding member 820*a*.

Each of the pair of shaft members 820*b* is a rod extended in the longitudinal direction and serves as a member that supports the holding member 820*a*. Note that in this embodiment, the number of shaft members 820*b* is two. However, the number of shaft members 820*b* may be one or may be three or more. The holding member 820*a* is fixed to the ends of the pair to shaft members 820*b* on the front side. The pair of shaft members 820*b* are moved in the longitudinal direction by a mechanism to be described later. The holding member 820*a* thus moves in the longitudinal direction and can perform a moving operation of translating the container main body 90 in the longitudinal direction. The middle unit 8B can also perform a pivotal operation of turning the extraction container 9 upside down as will be described later.

<4-2. Extraction Container>

Figure 11:
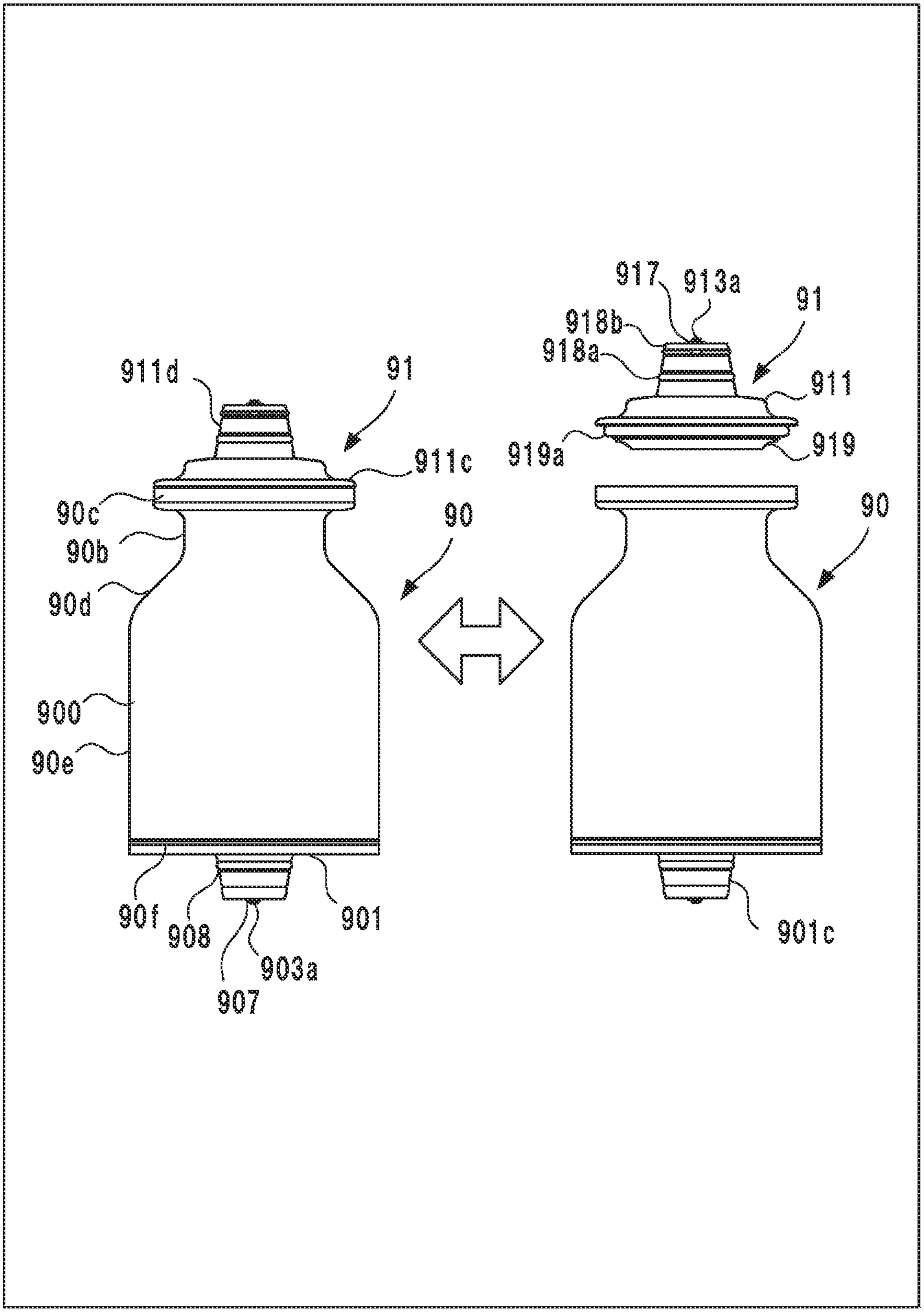
FIG. 11 is a view showing the closed state and the open state of the extraction container shown in FIG. 10.
Figure 12:
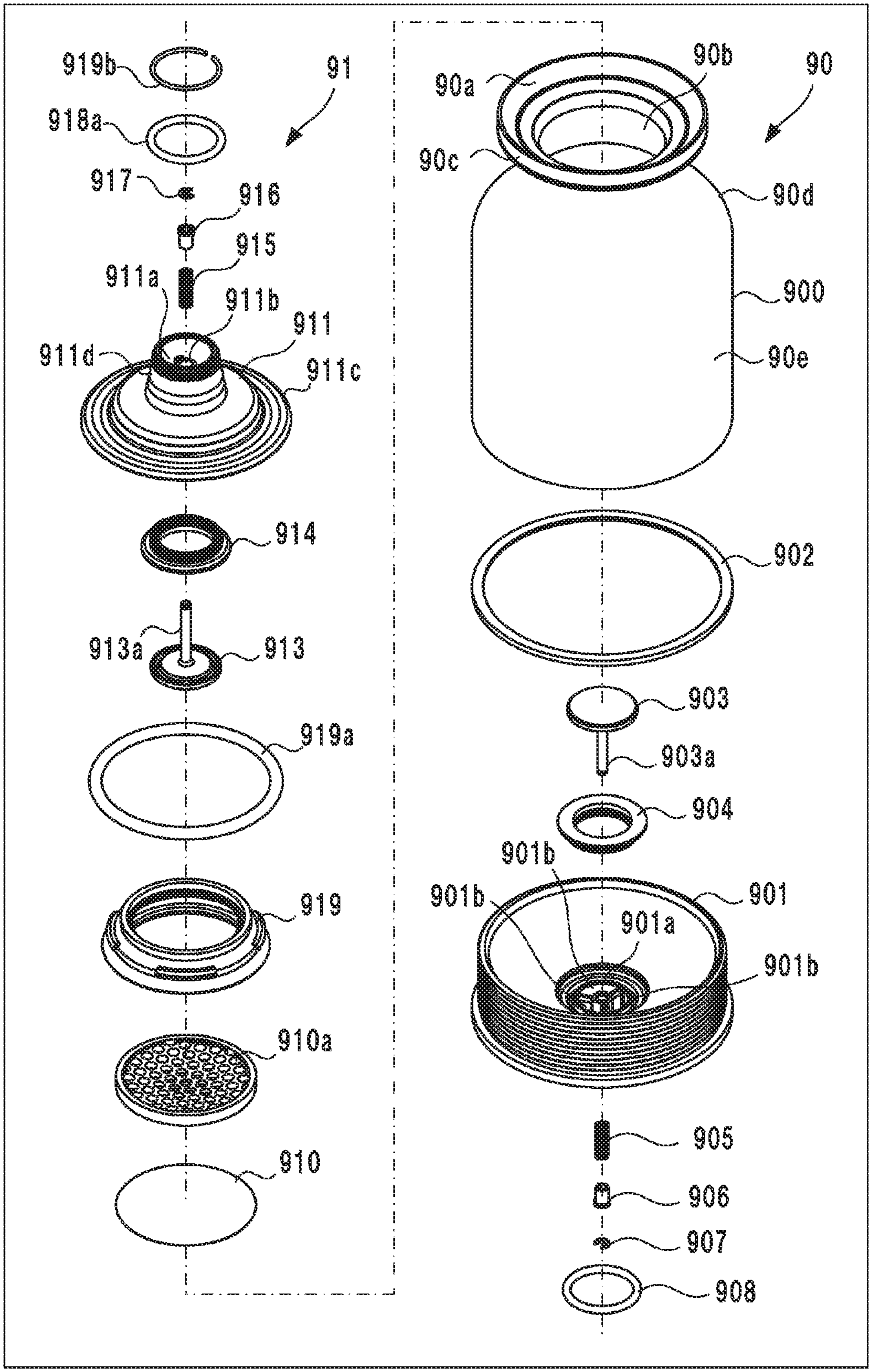
FIG. 12 is an exploded perspective view of the extraction container shown in FIG. 10.

The extraction container 9 will be described with reference to FIGS. 11 and 12. FIG. 11 is a view showing the closed state and the open state of the extraction container 9, and FIG. 12 is an exploded perspective view of the extraction container 9. As described above, the extraction container 9 is turned upside down by the middle unit 8B. The extraction container 9 shown in FIGS. 10 and 11 shows a basic posture in which the lid unit 91 is located on the upper side. When describing a positional relationship in the vertical direction in the following explanation, it means a positional relationship in the vertical direction in the basic posture unless otherwise specified.

The container main body 90 is a container with a closed bottom, and has a bottle shape including a neck portion 90*b*, a shoulder portion 90*d*, a trunk portion 90*e* and a bottom portion 90*f*. The whole portion or a part of the container main body 90 may have a transmissive portion. The transmissive portion may be made of a colorless transparent material or a color transparent material. This makes the inside of the container main body 90 visible from the outside. A flange portion 90*c* that defines an opening 90*a* communicating with the internal space of the container main body 90 is formed at an end of the neck portion 90*b* (the upper end of the container main body 90).

The neck portion 90*b* and the trunk portion 90*e* each have a cylindrical shape. In the neck portion 90*b*, a region where the sectional area or the sectional shape of the internal space is unchanged extends in the vertical direction. In the trunk portion 90*e* as well, a region where the sectional area or the sectional shape of the internal space is unchanged extends in the vertical direction, and the length is larger than that of the neck portion 90*b*. The sectional area of the internal space is larger in the trunk portion 90*e* than in the neck portion 90*b*. The ratio of the sectional area of the neck portion 90*b* to that of the trunk portion 90*e* is, for example, 65% or less, 50% or less, or 35% or less, and for example, 10% or more, or 20% or more. The shoulder portion 90*d* is a portion between the neck portion 90*b* and the trunk portion 90*e*, and has a tapered shape such that the sectional area of the internal space gradually becomes small from the side of the trunk portion 90*e* to the side of the neck portion 90*b*. However, the neck portion 90*b* is only named for the descriptive convenience for a portion closer to the opening 90*a* than the bottom portion 90*f*. The sectional area of the internal space is not always larger in the trunk portion 90*e* than in the neck portion 90*b*, and the neck portion 90*a* may be a part of the trunk portion 90*e*. That is, the extraction container 9 need not have a shape with a narrow portion as shown in FIG. 10 and the like, and may have a cylindrical shape or a cylindrical shape with the opening 90*a* or a flange portion like the flange portion 90*c* near the opening 90*a*.

The lid unit 91 is a unit that opens/closes the opening 90*a*. The opening/closing operation (elevating operation) of the lid unit 91 is performed by the upper unit 8A.

The container main body 90 includes a main body member 900 and a bottom member 901. The main body member 900 is a tube member that forms the neck portion 90*b*, the shoulder portion 90*d* and the trunk portion 90*e* and is open to the upper and lower sides. The bottom member 901 is a member that forms the bottom portion 90*f*, and is inserted into the lower portion of the main body member 900 and fixed. A seal member 902 intervenes between the main body member 900 and the bottom member 901 and improves the airtightness in the container main body 90.

A convex portion 901*c* is provided at the center of the bottom member 901. A shaft hole 901*b* is formed in the convex portion 901*c*. In addition, a plurality of communicating holes 901*a* are formed around the shaft hole 901*b*. The communicating holes 901*a* are through holes that make the interior of the container main body 90 communicate with the outside, and are mainly used to discharge a waste liquid and a residue when washing the interior of the container main body 90.

The shaft hole 901*b* extends through the bottom member 901. A shaft 903*a* of a plug member 903 is inserted into the shaft hole 901*b*. The plug member 903 opens/closes the communicating holes 901*a* from the inside of the container main body 90. A seal member 904 is provided between the plug member 903 and the inner surface (upper surface) of the bottom member 901, and improves the airtightness in the container main body 90 when closing the plug member 903.

On the outer side (lower side) of the bottom member 901, a coil spring 905 and a cylindrical spring bearing 906 are attached to the shaft 903*a*, and an E ring 907 further engages with an end of the shaft 903*a*. The coil spring 905 and the spring bearing 906 are held between the bottom member 901 and the E ring 907, and the coil spring 905 biases the plug member 903 in a closing direction. The convex portion 901*c* is provided with a seal member 908. The seal member 908 is a member configured to maintain the airtightness between the bottom member 901 and the upper unit 8A or the lower unit 8C.

The lid unit 91 includes a hat-shaped base member 911. The base member 911 includes a convex portion 911*d* and a collar portion 911*c* that overlaps the flange portion 90*c* at the time of closing. The base member 911 is provided with an opening/closing mechanism that is the same as the plug member 903 in the container main body 90. More specifically, a shaft hole 911*b* is formed at the center of the base member 911. A plurality of communicating holes 911*a* are formed around the shaft hole 911*b*. The communicating holes 911*a* are through holes that make the interior of the container main body 90 communicate with the outside, and are mainly used to pour hot water into the container main body 90 and send a coffee beverage.

The shaft hole 911*b* extends through the base member 911. A shaft 913*a* of a plug member 913 is inserted into the shaft hole 911*b*. The plug member 913 opens/closes the communicating holes 911*a* from the inside of the container main body 90. A seal member 914 is provided between the plug member 913 and the inner surface of the base member 911, and improves the airtightness in the container main body 90 when closing the plug member 913.

On the outer side (upper side) of the base member 911, a coil spring 915 and a cylindrical spring bearing 916 are attached to the shaft 913*a*, and an E ring 917 further engages with an end of the shaft 913*a*. The coil spring 915 and the spring bearing 916 are held between the base member 911 and the E ring 917, and the coil spring 915 biases the plug member 913 in a closing direction. The convex portion 911*d* is provided with a seal member 918*a* and a ring spring 918*b*. The seal member 918*a* is a member configured to maintain the airtightness between the base member 911 and the upper unit 8A or the lower unit 8C. The ring spring 918*b* is an engaging member configured to hold the lid unit 91 in the upper unit 8A at the time of opening of the lid unit 91.

A fixed member 919 is fixed to the inner side (lower side) of the base member 911. The fixed member 919 supports a filter 910 and a holding member 910*a*. The filter 910 is a filter used to separate a coffee beverage from the residue of ground beans and is, for example, a metal filter. By using the metal filter, a coffee beverage containing coffee oil can be provided to a user. The holding member 910*a* is a porous member that suppresses deformation of the filter 910. A seal member 919*a* is supported by the fixed member 919. In this embodiment, the fixed member 919 is an elastic member, and the fixed member 919 and the seal member 919*a* improve the airtightness between the lid unit 91 and the container main body 90 at the time of closing of the lid unit 91.

Note that an arrangement that brings the flange portion 90*c* and the collar portion 911*c* into hermetic contact, and thus does not use the seal member 919*a* can also be employed.

<4-3. Upper Unit and Lower Unit>

Figure 13:
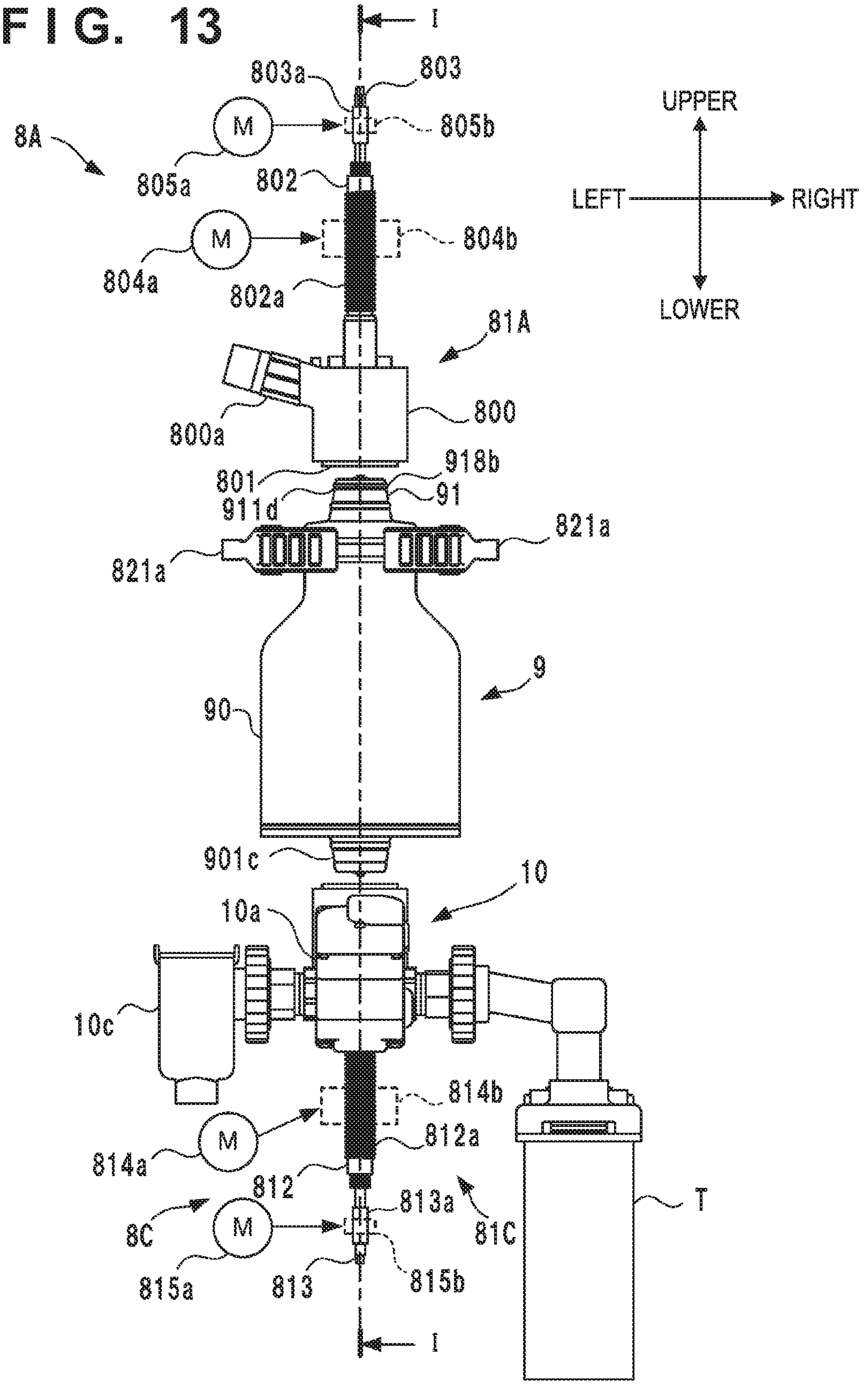
FIG. 13 is a front view showing the arrangements of parts of an upper unit and a lower unit.
Figure 14:
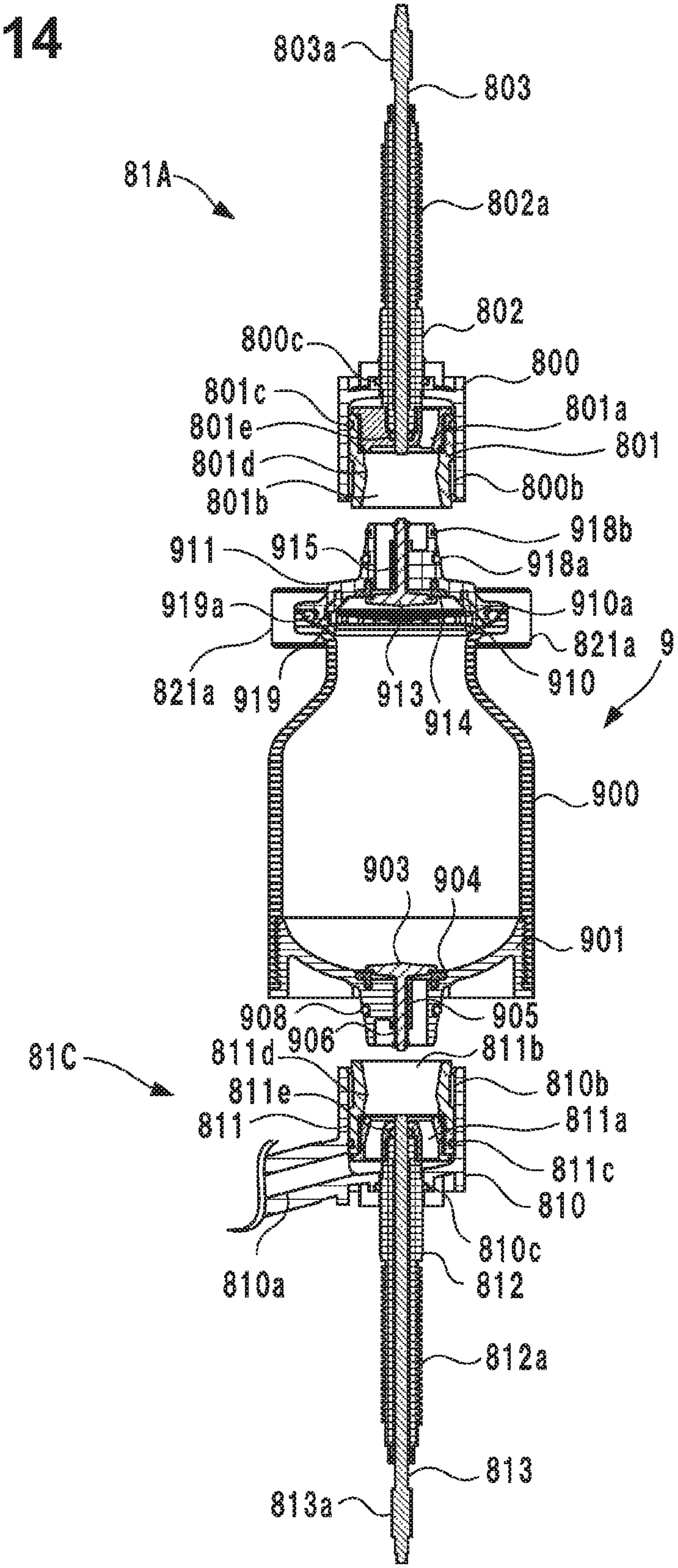
FIG. 14 is a sectional view taken along a line I-I in FIG. 13.

The upper unit 8A and the lower unit 8C will be described with reference to FIGS. 13 and 14. FIG. 13 is a front view showing the arrangements of parts of the upper unit 8A and the lower unit 8B. FIG. 14 is a sectional view taken along a line I-I in FIG. 13.

The upper unit 8A includes an operation unit 81A. The operation unit 81A performs an opening/closing operation (elevating) of the lid unit 91 with respect to the container main body 90 and an opening/closing operation of the plug members 903 and 913. The operation unit 81A includes a support member 800, a holding member 801, an elevating shaft 802 and a probe 803.

The support member 800 is stationarily provided so as not to change the position relative to the frame F. The support member 800 includes a storage portion 800*b* that stores the holding member 801. The storage portion 800*b* is a cylindrical space that is open to the lower side and has a closed top. The support member 800 also includes a communicating portion 800*a* that makes the pipe L3 and the interior of the storage portion 800*b* communicate with each other. Hot water, tap water and an air pressure supplied from the pipe L3 are introduced into the storage portion 800*b* via the communicating portion 800*a*.

The holding member 801 is a member that detachably holds the lid unit 91. The holding member 801 includes a storage portion 801*b* that receives the convex portion 911*d* of the lid unit 91 or the convex portion 901*c* of the bottom member 901. The storage portion 801*b* is a cylindrical space that is open to the lower side and has a closed top. The holding member 801 also includes a communicating portion 801*a* that makes the storage portion 800*b* and the storage portion 801*b* communicate with each other. Hot water, tap water and an air pressure supplied from the pipe L3 are introduced into the storage portion 801*b* via the communicating portions 800*a* and 801*a*. The holding member 801 is a movable member provided to be slidable in the vertical direction in the storage portion 800*b*. A seal member 801*c* that seals between the holding member 801 and the storage portion 800*b* is formed on the holding member 801, and the airtightness in the storage portion 800*b* is maintained even during sliding of the holding member 801.

An engaging portion 801*d* protruding inward in the radial direction is formed on the inner wall of the storage portion 801*b*. When the engaging portion 801*d* and the ring spring 918 of the lid unit 91 engage with each other, the lid unit 91 is held by the holding member 801. When a predetermined force or more to separate the holding member 801 and the lid unit 91 in the vertical direction acts, the engagement between the engaging portion 801*d* and the ring spring 918 is canceled by the elastic deformation of the ring spring 918*b*. The lid unit 91 and the holding member 801 are thus separated.

The elevating shaft 802 is provided such that its axial direction becomes the vertical direction. The elevating shaft 802 extends through the top portion of the support member 800 in the vertical direction and is provided to freely rise/lower in the vertical direction with respect to the support member 800. A seal member 800*c* is provided in the portion of a hole of the support member 800 through which the elevating shaft 802 passes, and the airtightness in the storage portion 800*b* is maintained even during sliding of the elevating shaft 802.

Figure 15:
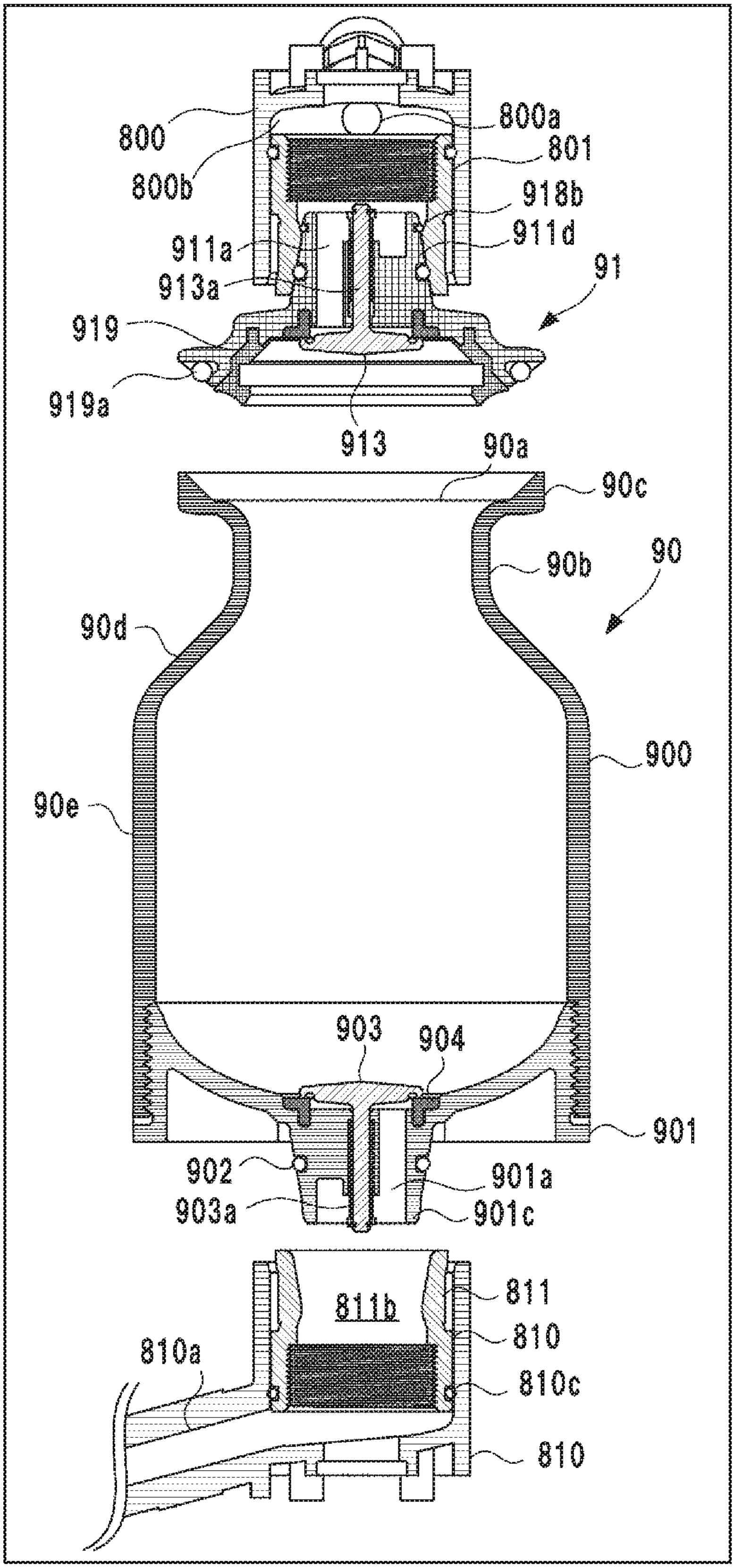
FIG. 15 is a view showing the open state of a lid unit.

The top portion of the holding member 801 is fixed to the lower end of the elevating shaft 802. When the elevating shaft 802 rises/lowers, the holding member 801 slides in the vertical direction, and attachment of the holding member 801 to the convex portion 911*d* or the convex portion 901*c* and removal of the holding member 801 can be performed. In addition, opening/closing of the lid unit 91 with respect to the container main body 90 can be done. FIG. 15 shows a case in which the lid unit 91 is in an open state. The holding member 801 that holds the lid unit 91 is located at the raised position, and the held lid unit 91 is separated to the upper side of the container main body 90. Note that some components are not illustrated in FIG. 15

A screw 802*a* that forms a lead screw mechanism is formed on the outer peripheral surface of the elevating shaft 802. A nut 804*b* is threadably engaged with the screw 802*a*. The upper unit 8A includes a motor 804*a*, and the nut 804*b* is rotated at that position (without moving in the vertical direction) by the driving force of the motor 804*a*. Along with the rotation of the nut 804*b*, the elevating shaft 802 rises/lowers.

The elevating shaft 802 is a tubular shaft with a through hole in the central axis, and the probe 803 is inserted into the through hole so as to be slidable in the vertical direction. The probe 803 extends through the top portion of the holding member 801 in the vertical direction and is provided to freely rise/lower in the vertical direction with respect to the support member 800 and the holding member 801. A seal member 801*e* is provided in the portion of a hole of the holding member 801 through which the probe 803 passes, and the airtightness in the storage portion 801*b* is maintained even during sliding of the probe 803.

The probe 803 is provided on the same axis as the shaft 903*a* of the plug member 903 (and the shaft 913*a* of the plug member 913). When the probe 803 lowers, it presses the shaft 903*a* of the plug member 903 downward, and the plug member 903 can be changed from a closed state to an open state. Note that it is also possible to press the plug member 903 and change it from a closed state to an open state using the air pressure of air or the water pressure of water supplied to the extraction container 9 without using the probe 803. In this case, the air pressure or water pressure is made higher than the biasing force of the coil spring 905.

Figure 16:
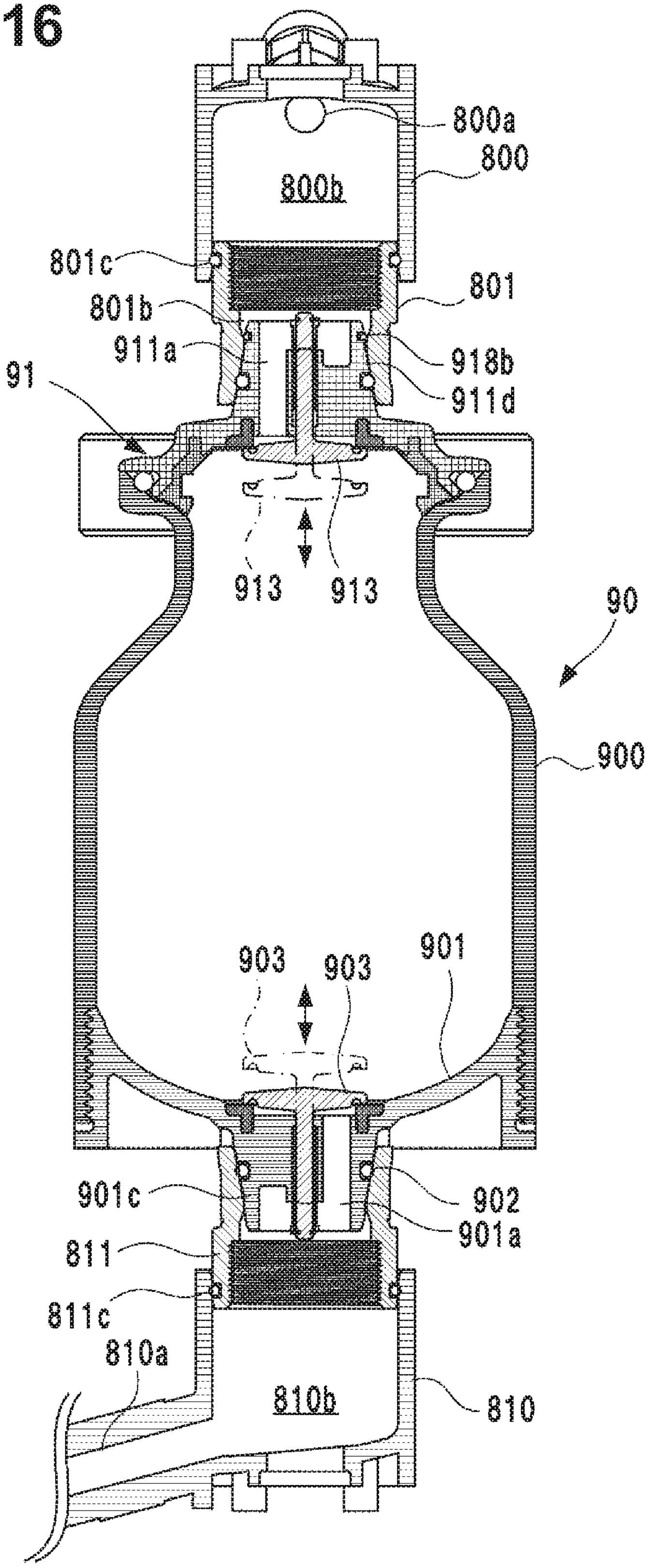
FIG. 16 is a view showing the open/closed form of upper and lower plug members.

FIG. 16 shows the open/closed form of the plug member 903 (and the plug member 913). The holding member 801 is located at the lowered position, and the convex portion 911*d* is inserted into the holding member 801. It can be understood that the plug member 903 can be displaced to the open state indicated by a broken line by lowering the probe 803 (not shown in FIG. 16). When the extraction container 9 is turned upside down, the plug member 913 can be changed from the close state to the open state. Note that some components are not illustrated in FIG. 16.

A screw 803*a* that forms a lead screw mechanism is formed on the outer peripheral surface of the probe 803. A nut 805*b* is threadably engaged with the screw 803*a*. The upper unit 8A includes a motor 805*a*, and the nut 805*b* is provided to be rotated at that position (without moving in the vertical direction) by the driving force of the motor 805*a*. Along with the rotation of the nut 805*b*, the probe 803 rises/lowers.

The lower unit 8C includes an operation unit 81C. The operation unit 81C has an arrangement obtained by turning the operation unit 81A upside down and performs an opening/closing operation of the plug members 903 and 913. The operation unit 81C also has an arrangement capable of opening/closing the lid unit 91. In this embodiment, the operation unit 81C is not used to open/close the lid unit 91.

The followings are almost the same as the description of the operation unit 81A, and the operation unit 81C will be described. The operation unit 81C includes a support member 810, a holding member 811, an elevating shaft 812 and a probe 813.

The support member 810 is stationarily provided so as not to change the position relative to the frame F. The support member 810 includes a storage portion 810*b* that stores the holding member 811. The storage portion 810*b* is a cylindrical space that is open to the upper side and has a closed bottom. The support member 810 also includes a communicating portion 810*a* that makes the selector valve 10*a* of the switching unit 10 and the interior of the storage portion 810*b* communicate with each other. A coffee beverage, tap water and the residue of ground beans in the container main body 90 are introduced into the selector valve 10*a* via the communicating portion 810*a*.

The holding member 811 includes a storage portion 811*b* that receives the convex portion 911*d* of the lid unit 91 or the convex portion 901*c* of the bottom member 901. The storage portion 811*b* is a cylindrical space that is open to the upper side and has a closed bottom. The holding member 811 also includes a communicating portion 811*a* that makes the storage portion 810*b* and the storage portion 811*b* communicate with each other. A coffee beverage, tap water and the residue of ground beans in the container main body 90 are introduced into the selector valve 10*a* via the communicating portions 810*a* and 811*b*. The holding member 811 is a movable member provided to be slidable in the vertical direction in the storage portion 810*b*. A seal member 811*c* that seals between the holding member 811 and the storage portion 810*b* is formed on the holding member 811, and the airtightness in the storage portion 810*b* is maintained even during sliding of the holding member 811.

An engaging portion 811*d* protruding inward in the radial direction is formed on the inner wall of the storage portion 811*b*. When the engaging portion 811*d* and the ring spring 918*b* of the lid unit 91 engage with each other, the lid unit 91 is held by the holding member 811. When a predetermined force or more to separate the holding member 811 and the lid unit 91 in the vertical direction acts, the engagement between the engaging portion 811*d* and the ring spring 918*b* is canceled by the elastic deformation of the ring spring 918*b*. The lid unit 91 and the holding member 811 are thus separated.

The elevating shaft 812 is provided such that its axial direction becomes the vertical direction. The elevating shaft 812 extends through the bottom portion of the support member 800 in the vertical direction and is provided to freely rise/lower in the vertical direction with respect to the support member 810. A seal member 810*c* is provided in the portion of a hole of the support member 810 through which the elevating shaft 812 passes, and the airtightness in the storage portion 810*b* is maintained even during sliding of the elevating shaft 812.

The bottom portion of the holding member 811 is fixed to the lower end of the elevating shaft 812. When the elevating shaft 812 rises/lowers, the holding member 811 slides in the vertical direction, and attachment of the holding member 811 to the convex portion 901*c* or the convex portion 911*d* and removal of the holding member 811 can be performed. A screw 812*a* that forms a lead screw mechanism is formed on the outer peripheral surface of the elevating shaft 812. A nut 814*b* is threadably engaged with the screw 812*a*. The lower unit 8C includes a motor 814*a*, and the nut 814*b* is rotated at that position (without moving in the vertical direction) by the driving force of the motor 814*a*. Along with the rotation of the nut 814*b*, the elevating shaft 812 rises/lowers.

The elevating shaft 812 is a tubular shaft with a through hole in the central axis, and the probe 813 is inserted into the through hole so as to be slidable in the vertical direction. The probe 813 extends through the bottom portion of the holding member 811 in the vertical direction and is provided to freely rise/lower in the vertical direction with respect to the support member 810 and the holding member 811. A seal member 811*e* is provided in the portion of a hole of the holding member 811 through which the probe 813 passes, and the airtightness in the storage portion 811*b* is maintained even during sliding of the probe 813.

The probe 813 is provided on the same axis as the shaft 913*a* of the plug member 913 (and the shaft 903*a* of the plug member 903). When the probe 813 rises, it presses the shaft 913*a* of the plug member 913 upward, and the plug member 913 can be changed from a closed state to an open state. Note that it is also possible to press the plug member 913 and change it from a closed state to an open state using the air pressure of air or the water pressure of water supplied to the extraction container 9 without using the probe 813. In this case, the air pressure or water pressure is made higher than the biasing force of the coil spring 915. For example, in at least one or both of inputting of a liquid (for example, hot water) used for steaming and inputting of a liquid (for example, pure water, hot water, or a detergent) used for cleaning of the extraction container 9, instead of opening the liquid inputting portion (the plug member 913 or the plug member 903) in advance and injecting a liquid, the inputting portion (the plug member 913 or the plug member 903) is preferably set in a closed state or open state less than a full open state and opened by the water pressure of the inputted liquid in some cases according to the user's taste or to make the manner the interior is shown to the user through the transmissive portion 101 or the degree of the power of a liquid different from the usual. In some cases, for example, a liquid instantaneously enters the extraction container 9 or pours on the inner wall portion of the extraction container 9 or the extraction target (for example, ground beans of roasted coffee) like a shower.

FIG. 16 shows the open/closed form of the plug member 913 (and the plug member 903). The holding member 811 is located at the raised position, and the convex portion 901*c* is inserted into the holding member 811. It can be understood that the plug member 913 can be displaced to the open state indicated by a broken line by raising the probe 813 (not shown in FIG. 16). When the extraction container 9 is turned upside down, the plug member 903 can be changed from the close state to the open state.

A screw 813*a* that forms a lead screw mechanism is formed on the outer peripheral surface of the probe 813. A nut 815*b* is threadably engaged with the screw 813*a*. The lower unit 8C includes a motor 815*a*, and the nut 815*b* is provided to be rotated at that position (without moving in the vertical direction) by the driving force of the motor 815*a*. Along with the rotation of the nut 815*b*, the probe 813 rises/lowers.

<4-4. Middle Unit>

Figure 17:
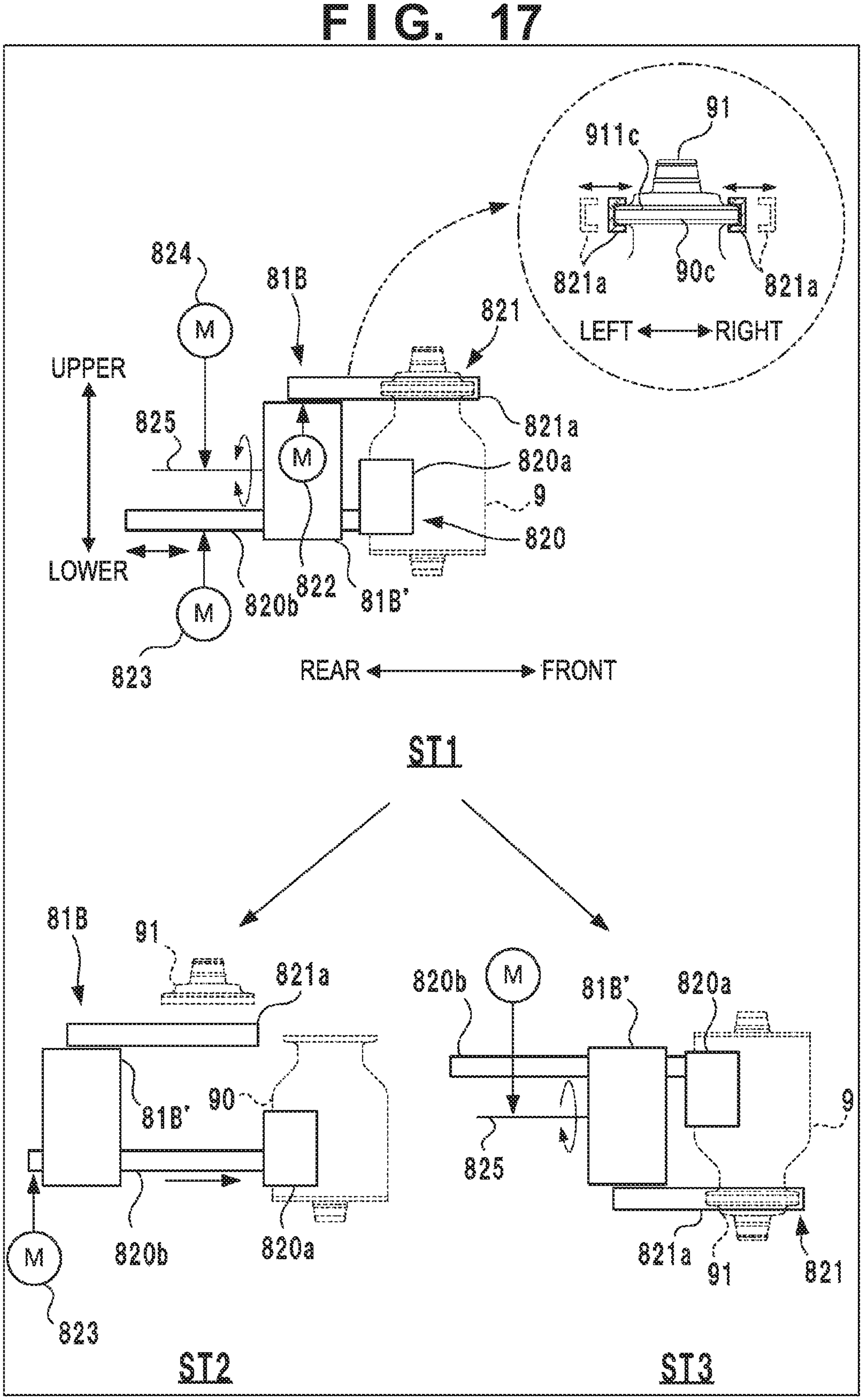
FIG. 17 is a schematic view of a middle unit.

The middle unit 8B will be described with reference to FIGS. 10 and 17. FIG. 17 is a schematic view of the middle unit 8B. The middle unit 8B includes a support unit 81B that supports the extraction container 9. The support unit 81B includes a unit main body 81B' that supports a lock mechanism 821, in addition to the above-described arm member 820.

The lock mechanism 821 is a mechanism that maintains the lid unit 91 in a closed state with respect to the container main body 90. The lock mechanism 821 includes a pair of grip members 821*a* that sandwich the collar portion 911*c* of the lid unit 91 and the flange portion 90*c* of the container main body 90 from the upper and lower sides. The pair of grip members 821*a* have a C-shaped section each that is fitted on the collar portion 911*c* and the flange portion 90*c* so as to sandwich them and are opened/closed in the horizontal direction by the driving force of a motor 822. When the pair of grip members 821*a* are in a closed state, as indicated by solid lines in the encircled view of FIG. 17, each grip member 821*a* is fitted on the collar portion 911*c* and the flange portion 90*c* so as to sandwich them from the upper and lower sides, and the lid unit 91 is hermetically locked to the container main body 90. In the lock state, even if the holding member 801 is raised by the elevating shaft 802 to open the lid unit 91, the lid unit 91 does not move (the lock is not canceled). That is, the force of lock by the lock mechanism 821 is set to be larger than the force of opening the lid unit 91 using the holding member 801. This can prevent the lid unit 91 from being set in an open state with respect to the container main body 90 at the time of abnormality.

Additionally, when the pair of grip members 821*a* are in an open state, as indicated by broken lines in the encircled view of FIG. 17, each grip member 821*a* is separated from the collar portion 911*c* and the flange portion 90*c*, and the lock between the lid unit 91 and the container main body 90 is canceled.

Note that the C-shaped section of the grip member 821*a* has a rectangular shape (the upper side and the lower side are parallel) in the example of FIG. 17, but may have a trapezoidal shape that narrows the sectional area on the opening end side. This can more firmly lock the collar portion 911*c* and the flange portion 90*c*.

When the engaging portion 801*d* of the holding member 801 and the ring spring 918*b* of the lid unit 91 are in an engaging state, and the holding member 801 is raised from the lowered position to the raised position, if the pair of grip members 821*a* are in the open state, the lid unit 91 is separated from the container main body 90. Conversely, if the pair of grip members 821*a* are in the closed state, the engagement between the engaging portion 801*d* and the ring spring 918*b* is canceled, and only the holding member 801 rises.

Figure 18:
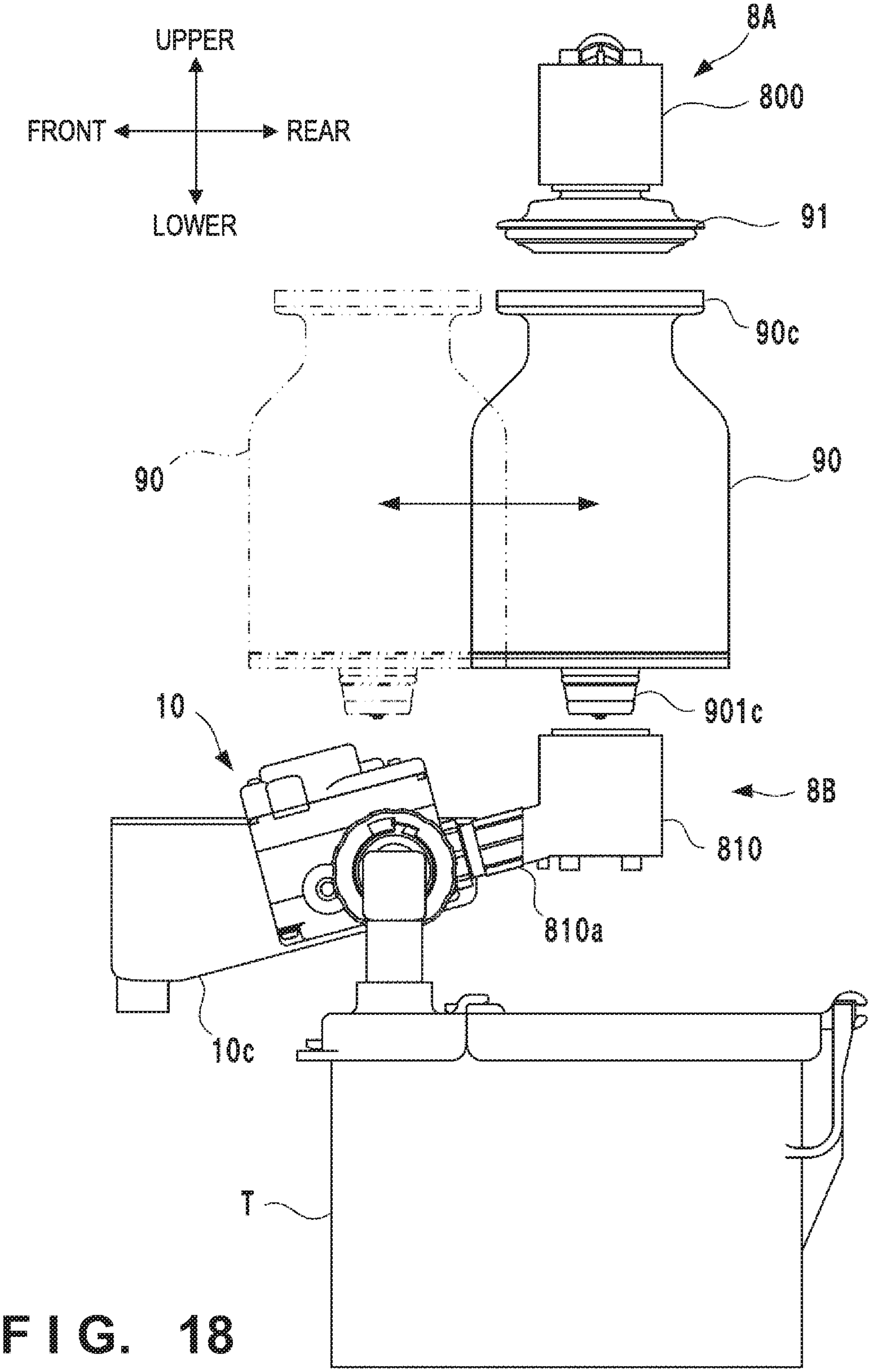
FIG. 18 is a view showing an example of the operation of the middle unit.

The middle unit 8B also includes a mechanism that horizontally moves the arm member 820 in the longitudinal direction using a motor 823 as a driving source. The container main body 90 supported by the arm member 820 can thus be moved between an extraction position (state ST1) on the rear side and a bean inputting position (state ST2) on the front side. FIG. 18 shows a moving form of the container main body 90. Referring to FIG. 18, the position of the container main body 90 indicated by a solid line represents the extraction position, and the position of the container main body 90 indicated by a broken line represents the bean inputting position. The bean inputting position is a position to input ground beans into the container main body 90. Ground beans ground by the grinder 5B are input into the opening 90*a* of the container main body 90 from which the lid unit 91 is separated. The extraction position is a position where the operation of the container main body 90 by the operation units 81A and 81C is possible. This is a position on the same axis as the probes 803 and 813 where extraction of a coffee liquid is performed. FIGS. 10 and 13 to 16 all show a case in which the container main body 90 is located at the extraction position. When the position of the container main body 90 is thus changed between ground beans inputting and coffee liquid extraction and water supply, steam generated at the time of coffee liquid extraction hardly adheres to the outlet 51*b* of the grinder 5B that is a ground bean supply unit, and the ground beans can be prevented from adhering to the outlet 51*b* due to the water of the steam.

Figure 19:
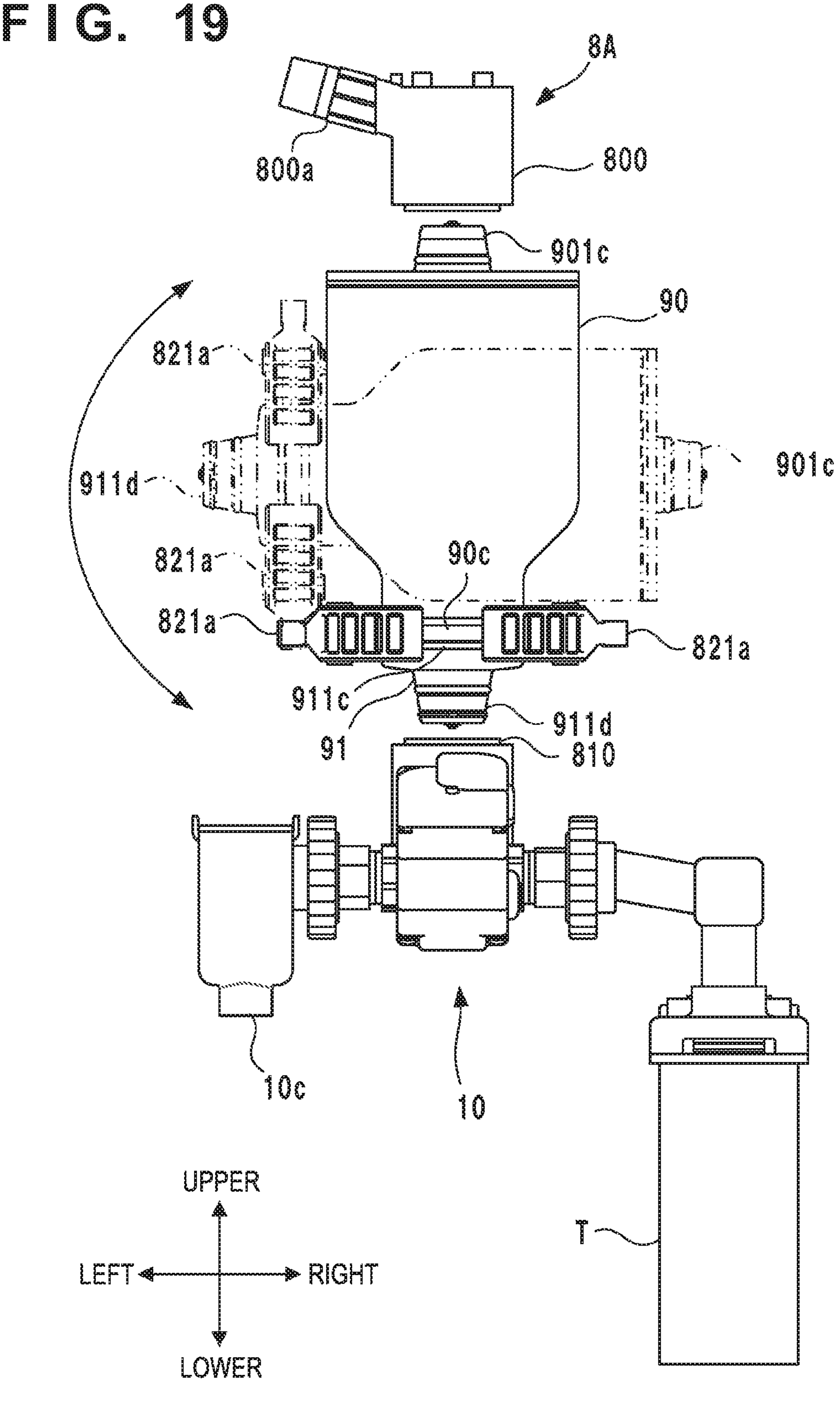
FIG. 19 is a view showing an example of the operation of the middle unit.

Referring back to FIG. 17, the middle unit 8B also includes a mechanism that rotates the support unit 81B about a shaft 825 in the longitudinal direction using a motor 824 as a driving source. The posture of the container main body 90 (extraction container 9) can thus be changed from an erect posture (state ST1) in which the neck portion 90*b* is located on the upper side to an inverted posture (state ST3) in which the neck portion 90*b* is located on the lower side. FIG. 13 shows a state in which the extraction container 9 is in the erect posture. FIG. 19 shows a state in which the posture of the extraction container 9 is changed by making it pivot. During the pivotal movement of the extraction container 9, a state in which the lid unit 91 is locked to the container main body 90 is maintained by the lock mechanism 821. The extraction container 9 indicated by a solid line in FIG. 19 shows the state of the inverted posture, and the extraction container 9 indicated by a broken line shows an intermediate state between the erect posture and the inverted posture (a posture halfway through the pivotal movement). The extraction container 9 is turned upside down between the erect posture and the inverted posture. At the position of the convex portion 901*c* in the erect posture, the convex portion 911*d* is located in the inverted posture. In addition, at the position of the convex portion 911*d* in the erect posture, the convex portion 901*c* is located in the inverted posture. For this reason, in the inverted posture, the opening/closing operation for the plug member 903 can be performed by the operation unit 81A, and the opening/closing operation for the plug member 913 can be performed by the operation unit 81C.

Note that the grip members 821*a* may include a grip portion cover. In this case, to suppress the radius of gyration of the entire lock mechanism 821 in a rotating operation, the grip portion cover may have a shape with a cut portion on the outside in a front view of the plane of rotation. This makes it possible to protect the lock mechanism while preventing interference with other components.

Figure 24:
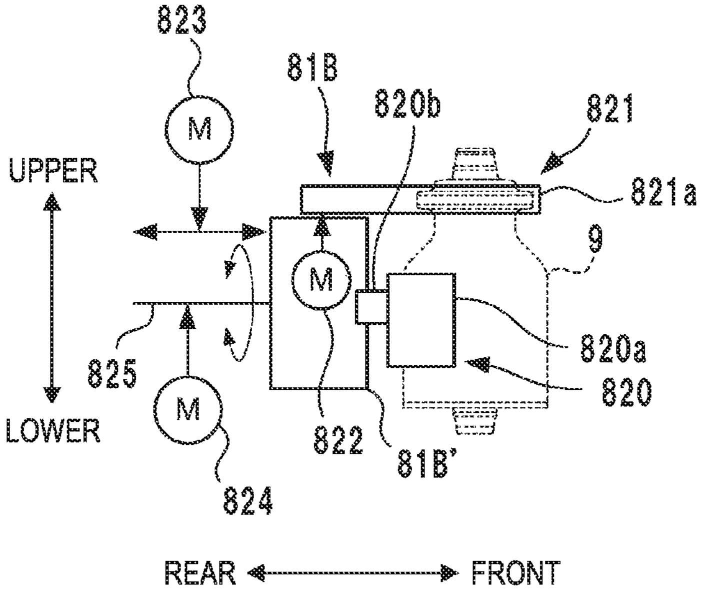
FIG. 24 is a schematic view showing another example of the middle unit.

In the example of FIG. 17, the mechanism moves the arm member 820 in the longitudinal direction relative to the unit main body 81W. However, a mechanism that fixes the arm member 820 to the unit main body 81B', as shown in the example of FIG. 24, can also be employed. In the example of FIG. 24, a mechanism using the motor 823 as a driving source horizontally moves the unit main body 81B' in the longitudinal direction. Accordingly, since the arm member 820 also moves in the longitudinal direction, the container main body 90 can be moved between the extraction position and the bean inputting position.

<5. Example of Operation Control>

Figure 20:
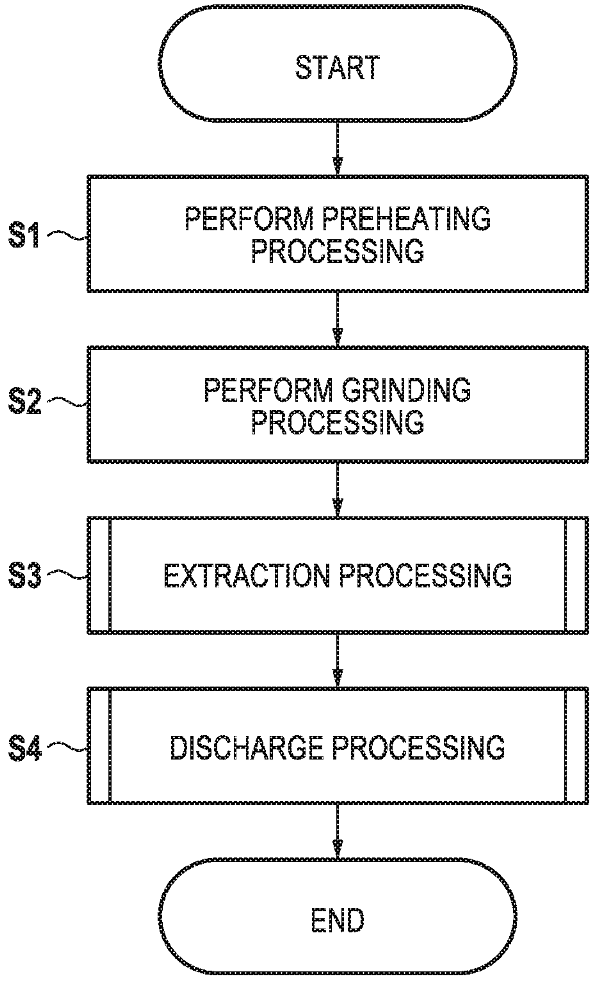
FIG. 20 is a flowchart showing an example of control executed by the control apparatus shown in FIG. 2.
Figure 21:
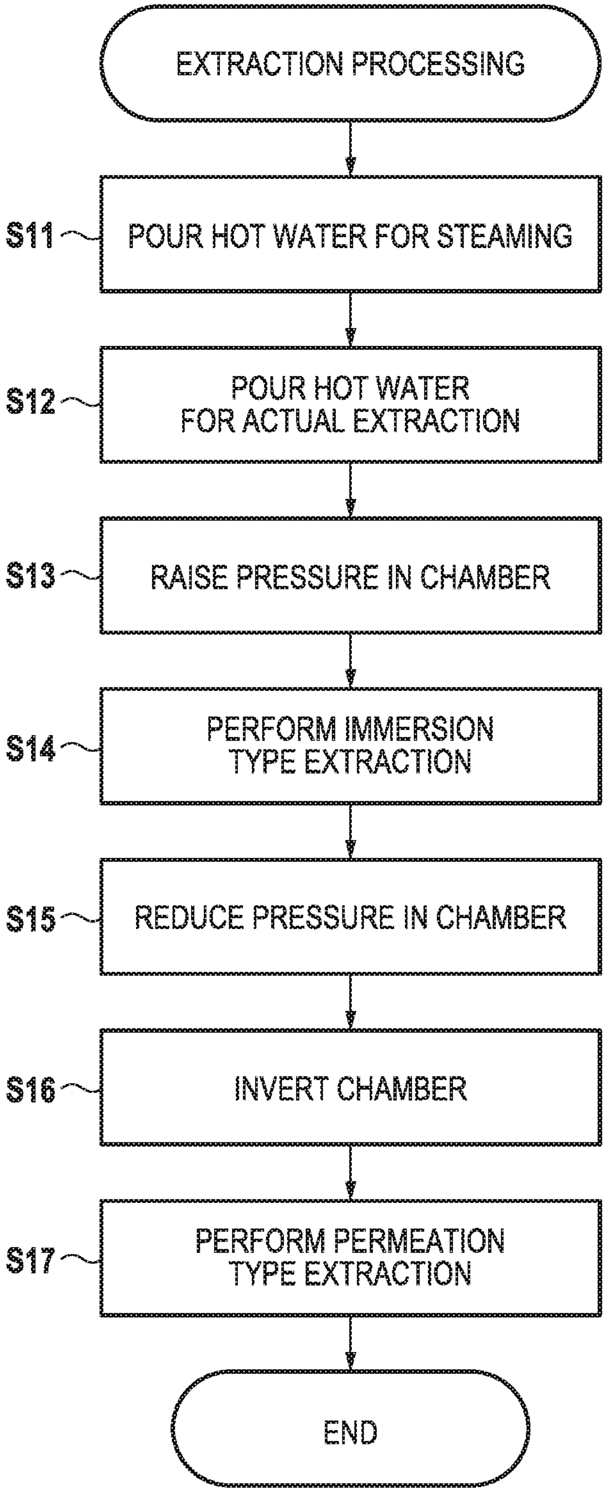
FIG. 21 is a flowchart showing an example of control executed by the control apparatus shown in FIG. 2.

An example of control processing of the beverage producing apparatus 1 executed by the processing unit 11*a* will be described with reference to FIGS. 20 to 22. FIG. 20 shows an example of control associated with one coffee beverage producing operation. The state of the beverage producing apparatus 1 before a production instruction will be referred to as a standby state. The states of the mechanisms in the standby state are as follows.

The extracting apparatus 3 is in the state shown in FIG. 10. The extraction container 9 is in the erect posture and is located at the extraction position. The lock mechanism 821 is in the closed state, and the lid unit 91 closes the opening 90*a* of the container main body 90. The holding member 801 is located at the lowered position and attached to the convex portion 911*d*. The holding member 811 is located at the raised position and attached to the convex portion 901*c*. The plug members 903 and 913 are in the closed state. The selector valve 10*a* makes the communicating portion 810*a* of the operation unit 81C communicate with the waste tank T. The standby state is not limited to the state shown in FIG. 10. For example, the extraction container 9 may be in the erect posture and be located at the extraction position, the lock mechanism 821 may be in the open state, and the lid unit 91 may open the opening 90*a* of the container main body 90.

In the standby state, when a coffee beverage production instruction is input, processing shown in FIG. 20 is executed. In step S1, preheating processing is executed. This processing is processing of pouring hot water in the container main body 90 to warm the container main body 90 in advance. First, the plug members 903 and 913 are set in the open state. The pipe L3, the extraction container 9, and the waste tank T are thus set in a communicating state.

The solenoid valve 72*i* is opened for only a predetermined time (for example, 1,500 ms) and then closed. Hot water is thus poured from the water tank 72 into the extraction container 9. Next, the solenoid valve 73*b* is opened for only a predetermined time (for example, 500 ms) and then closed. The pressure of the air in the extraction container 9 is thus raised to promote discharge of the hot water to the waste tank T. With the above-described processing, the interior of the extraction container 9 and the pipe L2 are preheated, and cooling of the hot water in the subsequent production of a coffee beverage can be reduced.

In addition, when pouring the hot water into the extraction container 9 in this preheating processing, the hot water passes through the filter 910. Even if a residue of ground beans used in the previous coffee beverage production or oil generated by extraction of the coffee liquid adheres to the filter 910, it is washed away and discharged.

In step S2, grinding processing is performed. Here, roasted coffee beans are ground, and the ground beans are input into the container main body 90. First, the lock mechanism 821 is set in the open state, and the holding member 801 is raised to the raised position. The lid unit 91 is held by the holding member 801 and rises together with the holding member 801. As a result, the lid unit 91 separates from the container main body 90. The holding member 811 lowers to the lowered position. The container main body 90 is moved to the bean inputting position. Next, the storage apparatus 4 and the grinding apparatus 5 are operated. Accordingly, roasted coffee beans for one cup are supplied from the storage apparatus 4 to the grinder 5A. The roasted coffee beans are ground in two steps by the grinders 5A and 5B, and the separation apparatus 6 separates unwanted substances. The ground beans are input into the container main body 90.

The container main body 90 is returned to the extraction position. The holding member 801 is lowered to the lowered position, and the lid unit 91 is attached to the container main body 90. The lock mechanism 821 is set in the closed state, and the lid unit 91 is hermetically locked to the container main body 90. The holding member 811 rises to the raised position. Of the plug members 903 and 913, the plug member 903 is set in the open state, and the plug member 913 is set in the closed state.

In step S3, extraction processing is performed. Here, a coffee liquid is extracted from the ground beans in the container main body 90. FIG. 21 is a flowchart of the extraction processing in step S3.

In step S11, to steam the ground beans in the extraction container 9, hot water in an amount less than a cup of hot water is poured into the extraction container 9. Here, the solenoid valve 72*i* is opened for a predetermined time (for example, 500 ms) and closed. Hot water is thus poured from the water tank 72 into the extraction container 9. After that, the processing waits for a predetermined time (for example, 5,000 ms), and the process of step S11 ends. The ground beans can be steamed by this processing. Note that the pressure and temperature in the extraction container 9 after this processing slightly rise but do not change much from those before the processing.

By steaming the ground beans, carbon dioxide gas contained in the ground beans can be emitted, and the extraction effect later can be enhanced. To steam the whole ground beans, the amount of hot water for steaming is preferably an amount to evenly moisten the ground beans. To do this, when pouring the hot water for steaming into the extraction container 9, the hot water may be poured while reducing the pressure in the water tank 72 by temporarily opening the solenoid valve 72*h*. Since this makes it possible to dampen the force of hot water for steaming and moisten the beans with the hot water evenly as much as possible, the effect of steaming can be enhanced. Note that the air pressure in the extraction container 9 at the time of steaming may be an air pressure (an air pressure at which the hot water does not boil) lower than the air pressure in subsequent immersion type extraction to be described later (step S14). This can promote emission of the carbon dioxide gas. When bringing the ground beans with a liquid (for example, hot water), for example, as for the carbon dioxide gas emitted from the ground beans at the time of steaming, immersion, or the like, the release valve 73*c* may be opened once after steaming to release the extraction container 9 to the atmosphere. Instead of releasing, when immersing the ground beans in a liquid (for example, hot water) later, the immersion may be performed by applying the pressure of the carbon dioxide gas as well. For example, in the beverage producing apparatus 1, steaming of the ground beans is performed at 2 atm (3 atm in the absolute pressure) or 0 atm (1 atm in the absolute pressure). After that, a cup of liquid (for example, hot water) is poured into the extraction container 9 at 2 atm (3 atm in the absolute pressure), the ground beans are immersed at 4 atm (5 atm in the absolute pressure), the liquid is bumped at the atmospheric pressure (0 atm (1 atm in the absolute pressure), the extraction container 9 is rotated, and after that, immersion or sending to the outside of the extraction container 9 is performed while applying a pressure of 0.7 atm (1.7 atm in the absolute pressure) into the extraction container 9. However, the steaming, immersion, or sending of the ground beans may be performed by applying the pressure of the carbon dioxide gas emitted from the ground beans as well. The steaming may be performed after the carbon dioxide gas is emitted to the atmosphere before execution. The carbon dioxide gas may be emitted to the atmosphere before immersion at 4 atm. The carbon dioxide gas may be emitted to the atmosphere before immersion at 2 atm before the immersion at 4 atm. The carbon dioxide gas may be emitted to the atmosphere before immersion at 0.7 atm or sending after the immersion at 4 atm. The steaming may be performed while applying the pressure of the carbon dioxide gas as well, the immersion at 4 atm may be performed while applying the pressure of the carbon dioxide gas as well (for example, the immersion may be performed at 4 atm+pressure of carbon dioxide gas), the immersion at 2 atm before the immersion at 4 atm may be performed while applying the pressure of the carbon dioxide gas as well (for example, the immersion may be performed at 2 atm+ pressure of carbon dioxide gas), or the immersion at 0.7 atm after the immersion at 4 atm may be performed while applying the pressure of the carbon dioxide gas as well (for example, the immersion may be performed at 0.7 atm+ pressure of carbon dioxide gas).

Note that the presence/absence of steaming may be selectable by a setting. If steaming is not performed, one water pouring operation suffices. Hence, an effect of shortening the time until completion of coffee beverage production can be obtained.

In step S12, the remaining amount of hot water is poured into the extraction container 9 such that a cup of hot water is stored in the extraction container 9. Here, the solenoid valve 72*i* is opened for a predetermined time (for example, 7,000 ms) and closed. Hot water is thus poured from the water tank 72 into the extraction container 9. Note that in this embodiment, the amount of hot water is managed by the opening time of the solenoid valve 72*i*. However, the pouring amount of hot water may be managed by measurement using a flow meter or measurement using another method.

By the process of step S12, the interior of the extraction container 9 can be set in a state at a temperature (for example, about 110° C.) more than 100° C. at 1 atm. Next, in step S13, the pressure in the extraction container 9 is raised. Here, the solenoid valve 73*b* is opened for only a predetermined time (for example, 1,000 ms) and closed to raise the pressure in the extraction container 9 to an air pressure at which the hot water does not boil (for example, about 4 atm (about 3 atm in the gauge pressure)). After that, the plug member 903 is set in the closed state.

Subsequently, this state is maintained for a predetermined time (for example, 7,000 ms), and immersion type coffee liquid extraction is performed (step S14). Extraction of a coffee liquid by the immersion type under a high temperature and high pressure is thus performed. In the immersion type extraction under a high temperature and high pressure, the following effects are expected. As the first effect, when the pressure is raised, the hot water can be readily infiltrated into the ground beans, and extraction of the coffee liquid can be promoted. As the second effect, when the temperature is raised, extraction of the coffee liquid is promoted. As the third effect, when the temperature is raised, the viscosity of oil contained in the ground beans lowers, and extraction of the oil is promoted. An aromatic coffee beverage can thus be produced. Note that there is an opinion that when a coffee liquid is extracted at a high temperature, the taste readily becomes harsh. In this embodiment, an unwanted substance such as chaff that is the cause of harsh taste is removed by the separation apparatus 6. For this reason, even when a coffee liquid is extracted at a high temperature, the harsh taste can be suppressed.

The temperature of hot water (high-temperature water) need only exceed 100° C. However, a higher temperature is advantageous in extracting the coffee liquid. On the other hand, to raise the temperature of hot water, the cost increases in general. Hence, the temperature of hot water may be set to, for example, 105° C. or more, 110° C. or more, or 115° C. or more and, for example, 130° C. or less or 120° C. or less. The air pressure can be any air pressure at which the hot water does not boil.

In step S15, the pressure in the extraction container 9 is reduced. Here, the air pressure in the extraction container 9 is switched to an air pressure at which hot water boils. More specifically, the plug member 913 is set in the open state, and the solenoid valve 73*c* is opened for a predetermined time (for example, 1,000 ms) and closed. The interior of the extraction container 9 is released to the atmosphere. After that, the plug member 913 is set in the closed state again.

The pressure in the extraction container 9 is abruptly reduced to an air pressure lower than the boiling point pressure, and the hot water in the extraction container 9 boils at once. The hot water and the ground beans in the extraction container 9 scatter explosively in the extraction container 9. This allows the hot water to evenly boil. In addition, breakage of the cell walls of the ground beans can be promoted, and extraction of the coffee liquid after that can further be promoted. Furthermore, since the ground beans and the hot water can be stirred by this boiling, extraction of the coffee liquid can be promoted. In this embodiment, the coffee liquid extraction efficiency can be improved in this way. The open valve (73C) is opened to do rapid pressure reduction in the extraction container 9. The rapid pressure reduction may be, for example, reducing the pressure at a speed at which one of a bumping state and a state close to bumping occurs, and more specifically, reducing the air pressure in the extraction container 9 at a speed at which the pressure lowers to a pressure less than a vapor pressure (a saturated vapor pressure, an equilibrium vapor pressure, or the like) or reducing the pressure at a speed at which the liquid (for example, hot water or a mixture of hot water and a coffee liquid) in the extraction container 9 abruptly boils at a temperature more than the boiling point. Breakage of the cells of the ground beans or stirring of the ground beans and hot water may be done by bumping (for example, a phenomenon in which an unboiled liquid (for example, hot water) abruptly boils at a temperature more than the boiling point).

Figure 23:
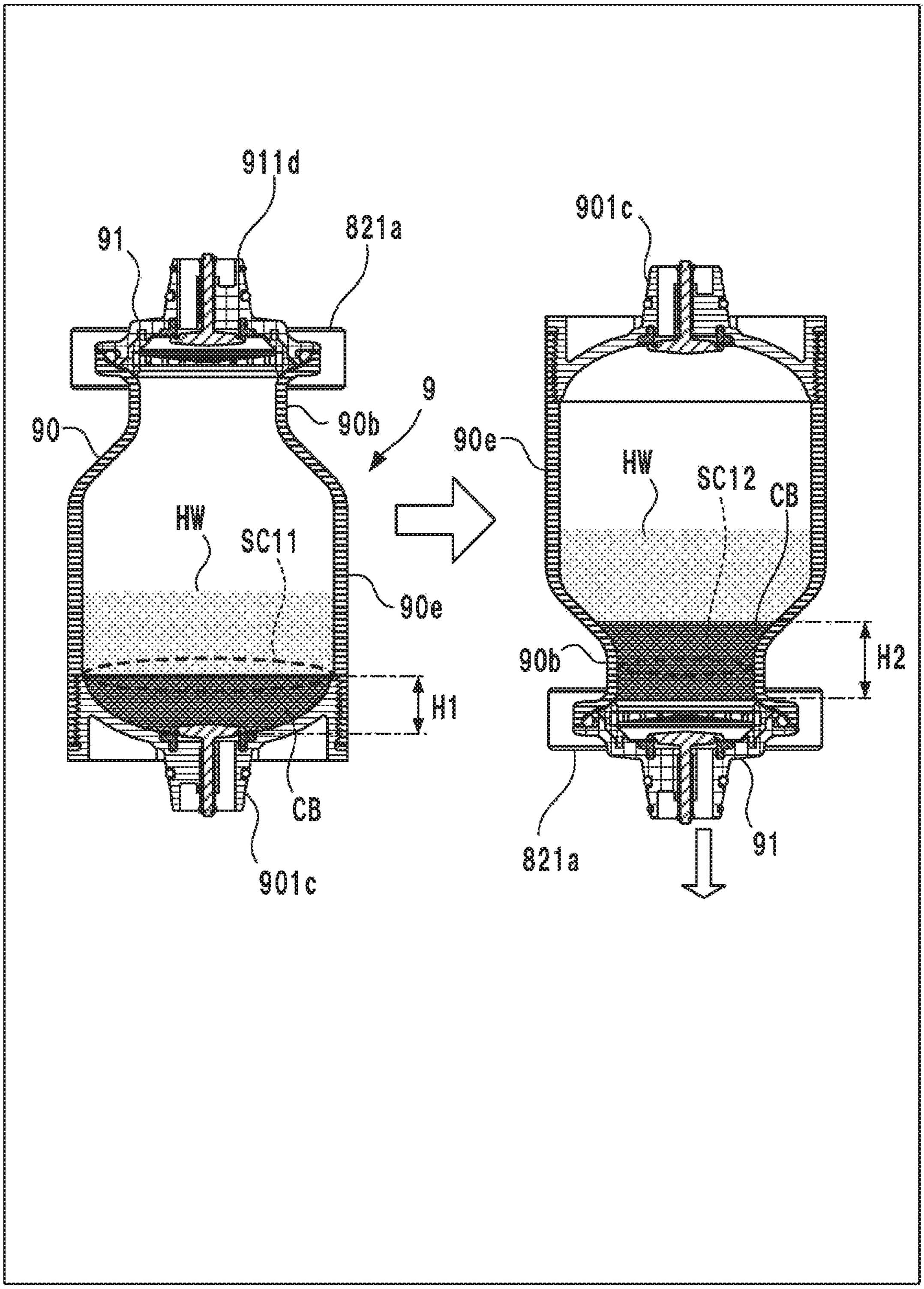
FIG. 23 is a view showing changes in hot water and ground beans caused by a change in the posture of the extraction container.

In step S16, the extraction container 9 is inverted from the erect posture to the inverted posture. Here, the holding member 801 is moved to the raised position, and the holding member 811 is moved to the lowered position. Then, the support unit 81B is rotated. After that, the holding member 801 is returned to the lowered position, and the holding member 811 is returned to the raised position. FIG. 23 shows the states in the extraction container 9 before and after the inversion. The extraction container 9 in the erect posture is shown on the left side of FIG. 23, and the extraction container 9 in the inverted posture is shown on the right side of FIG. 23. The lid unit 91 including the neck portion 90*b* and the filter 910 is located on the lower side. Inversion from the erect posture to the inverted posture is not limited to rotating the extraction container 9 by 180° by performing an operation with the rotation of the extraction container 9. The extraction container 9 may be rotated to an angle (for example, 170°) smaller than 180° or an angle (for example, 190°) larger than 180°. The extraction container 9 may be rotated to an angle more than ±90°. For example, as for the erect posture or inverted posture, concerning a portion that forms the opening 90*a* of the extraction container 9 and, of portions that do not form the opening 90*a* of the extraction container 9, a portion that is farthest from that portion, the erect posture may be a posture in which the portion is located at a position higher than the far portion, and the inverted posture may be a posture in which the portion is located at a position lower than the far portion. The erect posture may be a posture in which the portion stands still in a state in which it is located at a position higher than the far portion, and the inverted posture may be a posture in which the portion stands still in a state in which it is located at a position lower than the far portion. In addition, when rotating from the erect posture to the inverted posture, any action can be performed during the posture change from the erect posture to the inverted posture and, for example, the extraction container 9 is rotated by 360° a predetermined number of times (for example, once or a plurality of times). Furthermore, instead of making a simple rotation, the extraction container 9 in the erect posture and the extraction container 9 in the inverted posture may be located at different positions in the longitudinal direction, vertical direction, and horizontal direction.

In step S17, permeation type coffee liquid extraction is performed, and a coffee beverage is sent to the cup C. Here, the selector valve 10*a* is switched to make the pouring portion 10*c* and the communicating portion 810*a* of the operation unit 81C communicate. In addition, both the plug members 903 and 913 are set in the open state. Furthermore, the solenoid valve 73*b* is opened for a predetermined time (for example, 10,000 ms) to set the pressure in the extraction container 9 to a predetermined air pressure (for example, 1.7 atm (0.7 atm in the gauge pressure)). In the extraction container 9, a coffee beverage in which the coffee liquid is dissolved in the hot water passes through the filter 910 and is sent to the cup C. The filter 910 restricts the leakage of the residue of the ground beans. By using both immersion type extraction in step S14 and permeation type extraction in step S17, the coffee liquid extraction efficiency can further be improved. The extraction processing thus ends. Here, an example in which the pressure by the carbon dioxide gas is not released to the atmosphere before the permeation type coffee liquid extraction has been described. However, before the permeation type coffee liquid extraction, it is preferable to open the release valve 73*c* to release the carbon dioxide gas emitted from the ground beans in the extraction container 9 to the atmosphere, thereby releasing the pressure of the carbon dioxide gas to the atmosphere.

Note that when performing the permeation type coffee liquid extraction in step S17, only the plug member 903 may be set in the open state to release the interior to the atmospheric pressure once. The air pressure in the extraction container 9, which is raised by the carbon dioxide gas generated during the immersion type extraction, can be lowered in this way. After this operation is performed, the plug member 913 may be set in the open state, and the solenoid valve 73*b* may be opened, thereby extracting the coffee liquid.

The end of the extraction processing may be determined based on a change in the pressure in the extraction container 9 during the extraction processing. For example, to maintain 1.7 atm, if the air pressure falls below 1.7 atm, the pressure is raised by opening/closing the solenoid valve 73*b*. When the time interval from the pressure rising to the next pressure rising becomes a half or less from the start of sending, it may be determined that the sending is completed, and the extraction processing may be ended. Alternatively, the determination may be done when the number of times of pressure rising per unit time increases.

The relationship between the inverting operation in step S16 and the permeation type coffee liquid extraction in step S17 will be described here with reference to FIG. 23. In a state in which the extraction container 9 is in the erect posture, the ground beans accumulate from the trunk portion 90*e* to the bottom portion 90*f*. On the other hand, in a state in which the extraction container 9 is in the inverted posture, the ground beans accumulate from the shoulder portion 90*d* to the neck portion 90*b*. A sectional area SC11 of the trunk portion 90*e* is larger than a sectional area SC12 of the neck portion 90*b*, and an accumulation thickness H2 of the ground beans in the inverted posture is larger than an accumulation thickness H1 in the erect posture. That is, the ground beans accumulate relatively thin and widely in the state in which the extraction container 9 is in the erect posture, and accumulate relatively thick and narrowly in the state in which the extraction container 9 is in the inverted posture.

In this embodiment, since the immersion type extraction in step S14 is performed in the state in which the extraction container 9 is in the erect posture, the hot water and the ground beans can be brought into contact in a wide range and the coffee liquid extraction efficiency can be improved. In this case, however, the hot water and the ground beans tend to partially contact. On the other hand, since the permeation type extraction in step S17 is performed in the state in which the extraction container 9 is in the inverted posture, the hot water passes through the accumulated ground beans while contacting more ground beans. The hot water comes into contact with the ground beans more uniformly, and the coffee liquid extraction efficiency can further be improved.

When decreasing the sectional area of the internal space of the extraction container 9 on the side of the opening 90*a*, the neck portion 90*b* may be formed into a shape that gradually narrows (continuously tilts) up to the opening 90*a*. However, it is preferable that a portion in which the neck portion 90*b* has a predetermined sectional area is ensured in a predetermined length in the vertical direction, as in this embodiment. Since this can almost uniform the amount of hot water passing through the ground beans per unit area, it is possible to improve the efficiency of permeation type extraction while preventing over-extraction. In addition, the sectional shape of the extraction container 9 is not limited to the cylindrical shape and may be a rectangular tubular shape. However, if the sectional shape is the cylindrical shape, as in this embodiment, the coffee liquid can be extracted more evenly.

Additionally, when inverting the extraction container 9, the hot water and the ground beans are stirred. Hence, the coffee liquid extraction efficiency can further be improved. In this embodiment, since the shoulder portion 90*d* is formed between the trunk portion 90*e* and the neck portion 90*b*, the ground beans can be moved smoothly from the trunk portion 90*e* to the neck portion 90*b* at the time of inversion.

Note that after pressure reduction, an operation of shaking the extraction container 9 may be performed for the purpose of stirring the contents in the extraction container 9. More specifically, for example, an operation of tilting and returning the posture of the extraction container 9 within the range of 30° may be repeated a plurality of times. This shaking operation may be performed before the inversion of the extraction container 9 or after the inversion.

Additionally, in this embodiment, the immersion type extraction is performed in step S14 before pressure reduction. However, the immersion type extraction may be performed after pressure reduction. In this case, the process of step S14 may be eliminated. Alternatively, the process of step S14 may also be performed, and the immersion type extraction may be performed before and after the pressure reduction.

Furthermore, in this embodiment, as the pressure reduction method in step S15, the interior of the extraction container 9 is released to the atmosphere. However, the present invention is not limited to this, and any method such as a method of connecting a container with a pressure (equal to or higher than the atmospheric pressure or equal to or lower than the atmospheric pressure) lower than the pressure in the extraction container 9 may be employed. However, the method of this embodiment is advantageous from the viewpoint of the temperature in the subsequent extraction, the temperature of the coffee beverage to be sent, the ease of pressure reduction and the pressure reduction width. The open time of the release valve 73*c* may be adjusted such that the pressure after the pressure reduction becomes a pressure (for example, 1.1 atm) higher than the atmospheric pressure, as a matter of course. The pressure after the pressure reduction may be set to a pressure (for example, 0.9 atm) lower than the atmospheric pressure. The pressure after the pressure reduction may be set to the atmospheric pressure, as a matter of course.

Additionally, to set the interior of the extraction container 9 to a high-temperature/high-pressure state, in this embodiment, a method of pouring hot water at a high temperature and high pressure into the extraction container is employed. However, the present invention is not limited to this. For example, a method of pouring water or hot water at a temperature lower than a desired temperature into the extraction container 9 and, after that, raising the temperature and pressure may be employed.

Referring back to FIG. 20, after the extraction processing in step S3, discharge processing in step S4 is performed. Here, processing associated with cleaning in the extraction container 9 is performed. FIG. 22 is a flowchart of the processing.

In step S21, the extraction container 9 is inverted from the inverted posture to the erect posture. Here, the plug members 903 and 913 are set in the closed state first. The holding member 801 is moved to the raised position, and the holding member 811 is moved to the lowered position. The support unit 81B is rotated. The lid unit 91 including the neck portion 90*b* and the filter 910 is located on the upper side. After that, the holding member 801 is returned to the lowered position, and the holding member 811 is returned to the raised position. It is possible to perform cleaning in the extraction container 9 without detaching the filter 910. In addition, it is possible to promote separation and fall of the residue of the ground beans adhered to the filter 910 from the filter 910 by a vibration at the time of inversion of the extraction container 9 or an impact at the time of completion of inversion.

In step S22, the plug member 913 is set in the open state. The solenoid valve 73*f* is opened for a predetermined time (for example, 2,500 ms) and closed. Tap water (pure water) is thus poured into the extraction container 9. The hot water in the water tank 72 can also be used for cleaning. However, when the hot water is consumed, continuous coffee beverage production performance degrades. For this reason, tap water (pure water) is used in this embodiment. However, the hot water in the water tank 72 or a detergent sent from a detergent tank (not shown) may be used for cleaning.

In this embodiment, a portion having a predetermined sectional outer shape exists near the end (neck portion 90*b*) on the side of the filter 910. For this reason, when pouring water for cleaning into the extraction container 9, the water can be poured along the wall surface of the extraction container 9, and the cleaning effect can be enhanced.

Note that the interior of the extraction container 9 may be released to the atmosphere only for a predetermined time (for example, 500 ms) before the water pouring in step S22 or before the inversion in step S21. The pressure remaining in the extraction container 9 can be released, and the water pouring in step S22 can smoothly be performed.

When the interior of the extraction container 9 is released to the atmosphere in this way, the pressure in the extraction container 9 becomes 0 atm in the gauge pressure. Hence, at the time of water pouring, the plug member 913 may automatically be set in the open state by the water pressure. In this case, the processing of setting the plug member 913 in the open state is unnecessary. When the plug member 913 is set in the open state by the water pressure, the water readily runs along the inner wall surface and the like of the extraction container 9 by the equilibrium between the water pressure and the force of returning the plug member 913 to the closed state, and the water is readily supplied to the enter interior of the extraction container 9.

In step S23, the plug member 903 is set in the open state. The selector valve 10*a* makes the communicating portion 810*a* of the operation unit 81C communicate with the waste tank T. The pipe L3, the extraction container 9 and the waste tank T are thus set in a communicating state. The solenoid valve 73*b* is opened for a predetermined time (for example, 1,000 ms) and closed. The pressure in the extraction container 9 is thus raised, and the water in the extraction container 9 is discharged to the waste tank T together with the residue of the ground beans. After that, the plug members 903 and 913 are set in the closed state, and the processing ends.

Since the water used for cleaning is sent from the communicating holes 901*a* different from the communicating holes 911*a* used to send a coffee beverage, the communicating holes 911*a* can be prevented from being contaminated.

Note that the communicating hole 901*a* may be larger than ten communicating hole 911*a*. This facilitates discharge of the residue and the like. In addition, pressure rising in the extraction container 9 may be started halfway through the water pouring in step S22. This makes it possible to more effectively discharge the water and the residue in step S23. As for the pressure rising in the extraction container 9, for example, the pressure is raised to about 5 atm (4 atm in the gauge pressure) at once, the residue can be discharged more powerfully. In addition, the water is whirled up in the extraction container 9 and supplied to every part in the extraction container 9, and the cleaning capability of the entire interior can be improved.

In addition, after the end of the process of step S23, the plug members 903 and 913 may be kept in the open state without being set in the closed state.

One coffee beverage production processing thus ends. The same processing as described above is repeated in accordance with each production instruction. The time needed for one coffee beverage production is for example, about 60 to 90 sec.

Second Embodiment

Another example of processing associated with cleaning in an extraction container 9 will be described.

<Discharge Processing>

Figure 22:
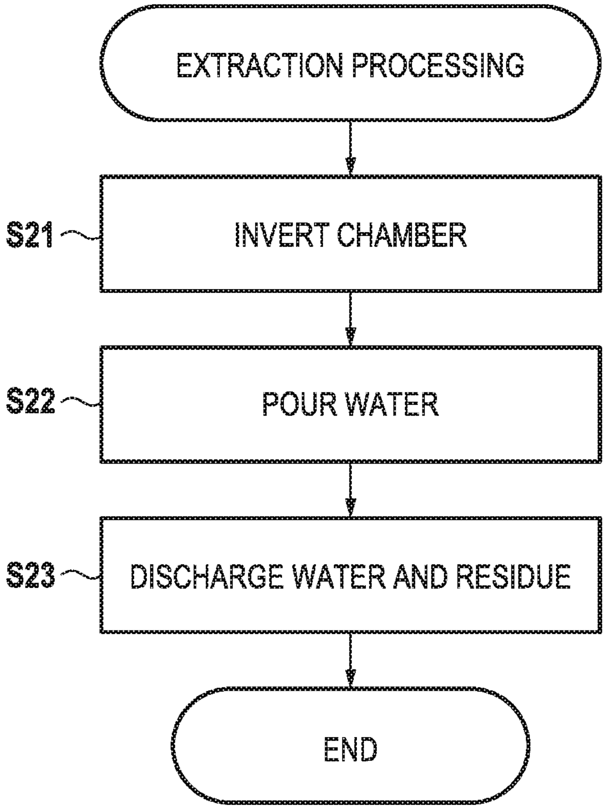
FIG. 22 is a flowchart showing an example of control executed by the control apparatus shown in FIG. 2.
Figure 25:
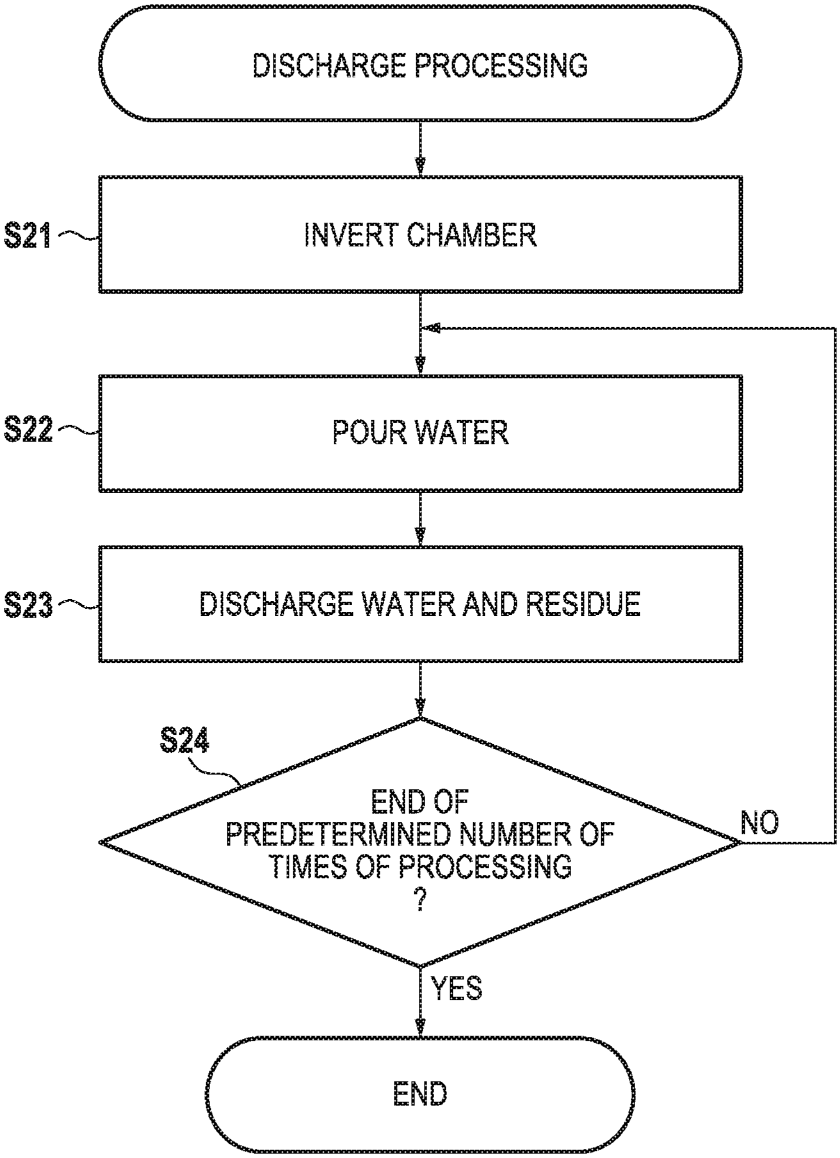
FIG. 25 is a flowchart showing an example of control executed by the control apparatus shown in FIG. 2.

In the discharge processing shown in FIG. 22, the water pouring and the water and residue discharge in steps S22 and S23 are performed only once. However, these processes may be performed a plurality of times. This makes it possible to maintain the interior of the extraction container 9 cleaner. FIG. 25 is a flowchart showing an example of discharge processing that replaces the discharge processing in FIG. 22.

The processes of steps S21 to S23 in FIG. 25 are the same as the processes of steps S21 to S23 in FIG. 22. After the process of step S23, in step S24, it is determined whether a predetermined number of times of cleaning are completed. The predetermined number of times is, for example, two. If the cleaning is not completed, the process returns to step S22, and the processes of steps S22 and S23 are executed again. If the cleaning is completed, one discharge processing ends.

Note that when repeating the processes of steps S22 and S23, the amount of water or the degree or timing of pressure rising may be changed.

In addition, at the time of water pouring in step S22, a plug member 903 may be set in a closed state. In this case, water may be stored in the extraction container 9, a plug member 913 may also be set in the closed state, and the inverting operation of the extraction container 9 may be performed once or a plurality of times. This can improve the cleaning effect in the extraction container 9. Note that when the water pouring processing in step S22 is performed a plurality of times as in the example of FIG. 25, such an inverting operation of the extraction container 9 may be performed in the second and subsequent water pouring processing. This is because a large amount of residue remains in the extraction container 9 in an initial state, and scattering of the residue in the container should be avoided.

<Re-Cleaning Processing>

Figure 26:
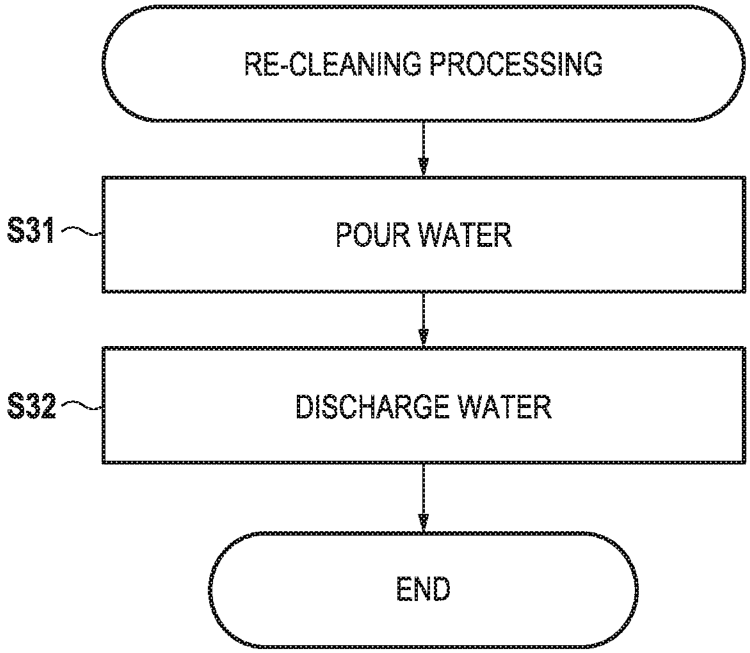
FIG. 26 is a flowchart showing an example of control executed by the control apparatus shown in FIG. 2.

The cleaning of the extraction container 9 may be performed at a timing other than after coffee liquid extraction. For example, the cleaning can be done in a standby state. Alternatively, the cleaning can be done when a user instructs it from an operation unit 12. The cleaning processing of the extraction container 9 performed at a timing other than immediately after the coffee liquid extraction is called re-cleaning processing. FIG. 26 is a flowchart showing an example of re-cleaning processing.

In step S31, water pouring processing is performed. This is the same processing as in step S22. In step S32, the water poured in step S31 is discharged. This is the same processing as in step S23. Processing of one unit thus ends.

Note that at the time of water pouring in step S31, the plug member 903 may be set in the closed state. In the discharge processing shown in FIG. 22 or 25, the plug member 903 may not be set in the closed state at the time of water pouring, and only in the re-cleaning processing shown in FIG. 26, the plug member 903 may be set in the closed state at the time of water pouring. Alternatively, in the discharge processing shown in FIG. 22 or 25 as well, the plug member 903 may be set in the closed state at the time of water pouring, but the water pouring amount may be changed between the discharge processing and the re-cleaning processing. Furthermore, the user may be able to instruct the water pouring amount from the operation unit 12.

In addition, the re-cleaning processing is basically executed in a case in which the extraction container 9 is in the erect posture. However, the re-cleaning processing may be executed after inverting the extraction container 9 to the inverted posture.

When a predetermined time elapses from the production of a coffee beverage, re-washing processing using hot water in a water tank 72 may automatically be executed. When this operation is performed, the oil component of a coffee liquid, which is cooled and solidified in the channel, can be washed away.

Third Embodiment

Another example of the arrangements of a bean processing apparatus 2 and an extracting apparatus 3 will be described. In the following explanation, the same components as in the first embodiment or components having common functions are denoted by the same reference numerals as in the first embodiment, and a description thereof will be omitted. Different components or functions will mainly be described.

In this embodiment, the extracting apparatus 3 is arranged on the lower side of the bean processing apparatus 2, as in the first embodiment, and the basic structures are common. The bean processing apparatus 2 includes a storage apparatus 4 and a grinding apparatus 5. The grinding apparatus 5 includes a grinder 5A for coarse particles, a grinder 5B for fine particles and a separation apparatus 6 that separates an unwanted substance from ground beans between the grinders.

A forming unit 6B of the separation apparatus 6 and the grinder 5B are connected by a conveyance tube 500 extending obliquely downward from the rear side to the front side. The ground beans after the unwanted substance is removed by the separation apparatus 6 are supplied to the grinder 5B through the conveyance tube 500 (substantially makes a free fall).

The grinder 5B is provided with a nozzle type sending tube 501. The ground beans finely ground by the grinder 5B are discharged through the sending tube 501. The sending tube 501 is arranged such that its outlet is located immediately above an opening 90*a* of a container main body 90 when the container main body 90 is located at the bean inputting position. In the form shown in FIG. 27, the container main body 90 is located at the extraction position, and the outlet of the sending tube 501 is located slightly above in front of the container main body 90.

In this embodiment, the container main body 90 at the extraction position is located at a position shifted in the horizontal direction from the point immediately under the grinder 5B. For this reason, the sending tube 501 is curved to send the ground beans to the position shifted from the point immediately under the grinder 5B.

A main body portion 53 is provided with a gear 536 that adjusts the particle size of the ground beans. The gear 53*b*' is operated by a particle size adjusting mechanism (not shown).

<Suction Unit>

The arrangement of a suction unit 6A will be described with reference to FIGS. 27 and 28. FIG. 28 is a vertical sectional view of the suction unit 6A. The suction unit 6A according to this embodiment is a centrifugal mechanism, like the suction unit 6A according to the first embodiment. The basic operation is also the same as in the first embodiment. That is, air in a collection container 60B is discharged upward by a blower unit 60A. Accordingly, the air containing an unwanted substance from the forming unit 6B via a connecting portion 61*c* turns around an exhaust stack 61*b*. An unwanted substance D falls by the weight of its own in the collection container 60B. When the air turns around the exhaust stack 61*b*, turning of the air and separation of the unwanted substance D are accelerated by fins 61*d*.

In this embodiment, a lower portion 62 of the collection container 60B includes a bending portion 62A on the upper side and a collecting portion 62B on the lower side, which are separably engaged. The bending portion 62A is a cylindrical body extending downward from the upper portion 61 and then bending to the front side.

The collecting portion 62B is a cylindrical body with a closed bottom, which is straight without bending, and is fitted on the lower end of the bending portion 62A. For this reason, the collecting portion 62B is attached while tilting obliquely downward from the rear side to the front side. The unwanted substance D is collected to a portion of the collecting portion 62B (accumulates on the bottom portion). To discard the unwanted substance D, the collecting portion 62B is detached from the bending portion 62A. At this time, pulling the collecting portion 62B downward to the front side suffices. Hence, the user can easily perform the detaching operation of the collecting portion 62B from the front of the apparatus.

An upper portion 61 of the collection container 60B preferably extends in the vertical direction for centrifugal separation. Since the bending portion 62A is provided, centrifugal separation performance and easy detachment of the collecting portion 62B can simultaneously be implemented.

The lower portion 62 of the collection container 60B may have a transmissive portion that makes the interior visible from the outside. Alternatively, the bending portion 62A may be a non-transmissive member, and only the collecting portion 62B may be a member with transparency. In any case, the user can visually confirm the accumulation amount of the unwanted substance D.

<Middle Unit>

Figure 29:
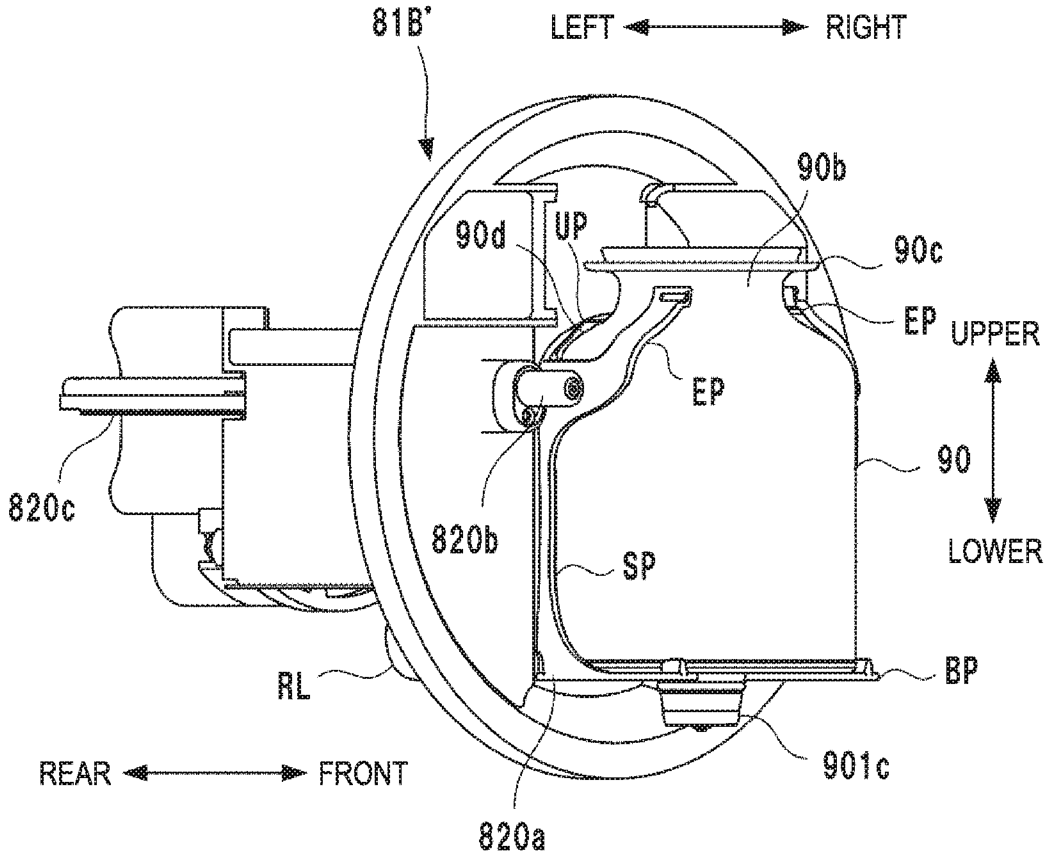
FIG. 29 is a partial perspective view of a horizontal moving mechanism.
Figure 30:
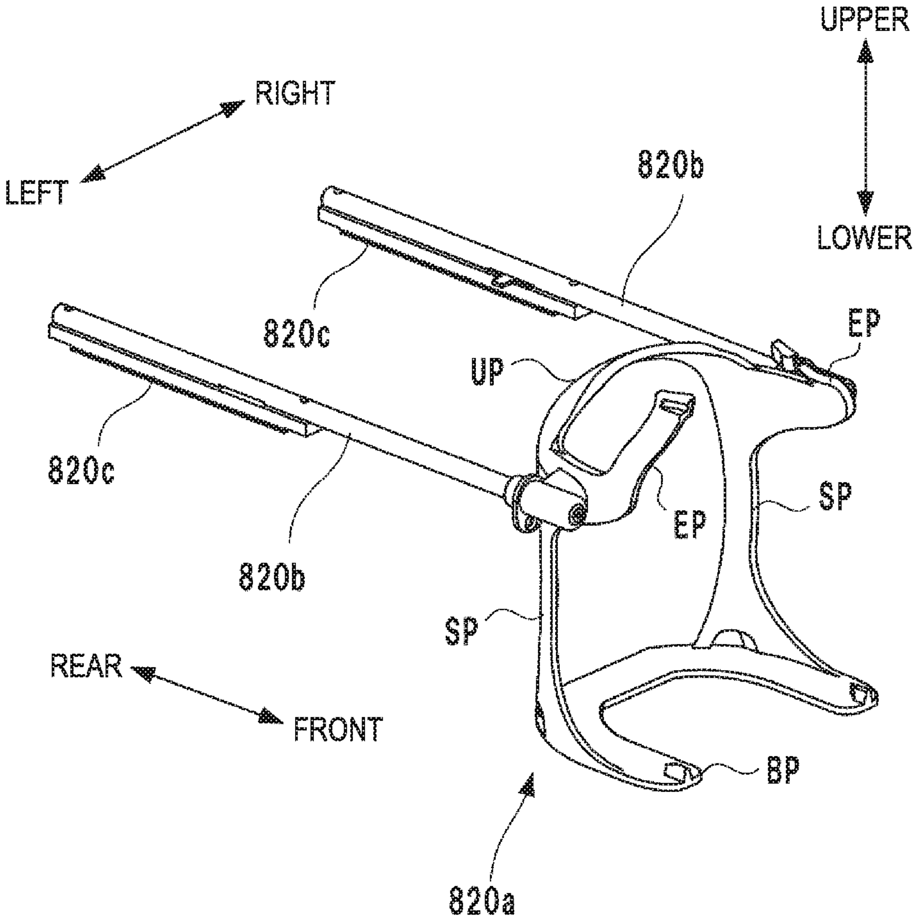
FIG. 30 is a partial perspective view of an arm member.

The arrangement of a middle unit 8B, particularly, the arrangement that moves the container main body 90 in the horizontal direction and the like will be described with reference to FIGS. 27, 29 and 30. FIG. 29 is a partial perspective view of a horizontal moving mechanism provided in the middle unit 8B. FIG. 30 is a partial perspective view of an arm member 820.

As in the first embodiment the arm member 820 includes a holding member 820*a* and a pair of shaft members 820*b* spaced apart to the left and right sides. The pair of shaft members 820*b* are guided and supported by a unit main body 81B' to be movable in the longitudinal direction. Note that in this embodiment, the number of shaft members 820*b* is two. However, the number of shaft members 820*b* may be one or may be three or more.

A rack 820*c* is provided at the rear end of each of the pair of shaft members 820*b*. A pinion driven by a motor 823 (FIG. 17) meshes with the rack 820*c*. The arm member 820 moves in the longitudinal direction when the pinion rotates. The front and rear ends of the rack 820*c* interfere with other components (for example, the disc portion of the unit main body 81B' on the front side and the like), thereby limiting the moving range. Note that in this embodiment, the arm member 820 is moved in the horizontal direction by the rack-pinion mechanism. However, another driving mechanism such as a ball screw mechanism may be used.

The holding member 820*a* is fixed to the front ends of the pair of shaft members 820*b*. As in the first embodiment, the holding member 820*a* is an elastic member made of a resin or the like and holds the container main body 90 by the elastic force. Attachment/detachment of the container main body 90 to/from the holding member 820*a* is done by a manual operation. When the container main body 90 is pressed against the holding member 820*a* rearward in the longitudinal direction, the container main body 90 is attached to the holding member 820*a*. In addition, when the container main body 90 is removed frontward in the longitudinal direction from the holding member 820*a*, the container main body 90 can be separated from the holding member 820*a*.

The holding member 820*a* forms an annular frame body integrally including a bottom portion BP, left and right side portions SP, an upper portion UP and left and right engaging portions EP. When the holding member 820*a* is formed as an annular frame body, it is possible to ensure a high strength as a whole while allowing its elastic deformation.

The bottom portion BP has a C shape open on the front side in a plan view. The container main body 90 is placed on the bottom portion BP. The left and right side portions SP are extended upward from the left and right ends of the bottom portion BP on the rear side and fixed to the front ends of the pair of shaft members 820*b*. In a state in which the container main body 90 is held, the left and right side portions SP are located on the rear side of portions of the container main body 90 right beside. The upper portion UP is formed to connect the upper ends of the left and right side portions SP, and has an arch shape projecting upward in this embodiment. In a state in which the container main body 90 is held, the upper portion UP is located on the rear side of the container main body 90 and its arch portion overlaps a shoulder portion 90*d* a little. This suppresses unintentional upward displacement of the container main body 90.

The left and right engaging portions EP extend upward on the front side from the upper ends of the left and right side portions SP and face inside a little. In a state in which the container main body 90 is held, the left and right engaging portions EP are located from the lateral sides of the container main body 90 to the front side, and their distal ends press a neck portion 90*b* from the front side. This suppresses falling of the container main body 90 from the holding member 820*a* to the front side.

As described above, the holding member 820*a* according to this embodiment is configured to facilitate visual recognition of the front side of the container main body 90 from the front in a state in which the container main body 90 is held, and the user can easily confirm the operation of the container main body 90. In addition, if the container main body 90 has a transmissive portion wholly or partially, the interior can be easily viewed from the front, and the coffee liquid extraction state can be easily visually recognized.

A roller RL is provided on the rear side of the unit main body 81B'. The roller RL is configured to slide on a circular edge provided on the main body frame when the unit main body 81B rotates. Three or four rollers RL may be provided at an interval of 120° or 90° along the circumference of the unit main body 81B'. At any rotation angle of the unit main body 81B', at least one of the rollers RL supports the weight of the unit main body 81B' by the circular edge of the main body frame. When the distance from the roller RL to the holding member 820*a* is made shorter than the distance from the portion to support on the rear side of the unit main body 81W, distortion in the vertical direction can be reduced.

<Storage Apparatus>

<Canister and Attachment/Detachment Structure Thereof (First Example)>

Figure 31:
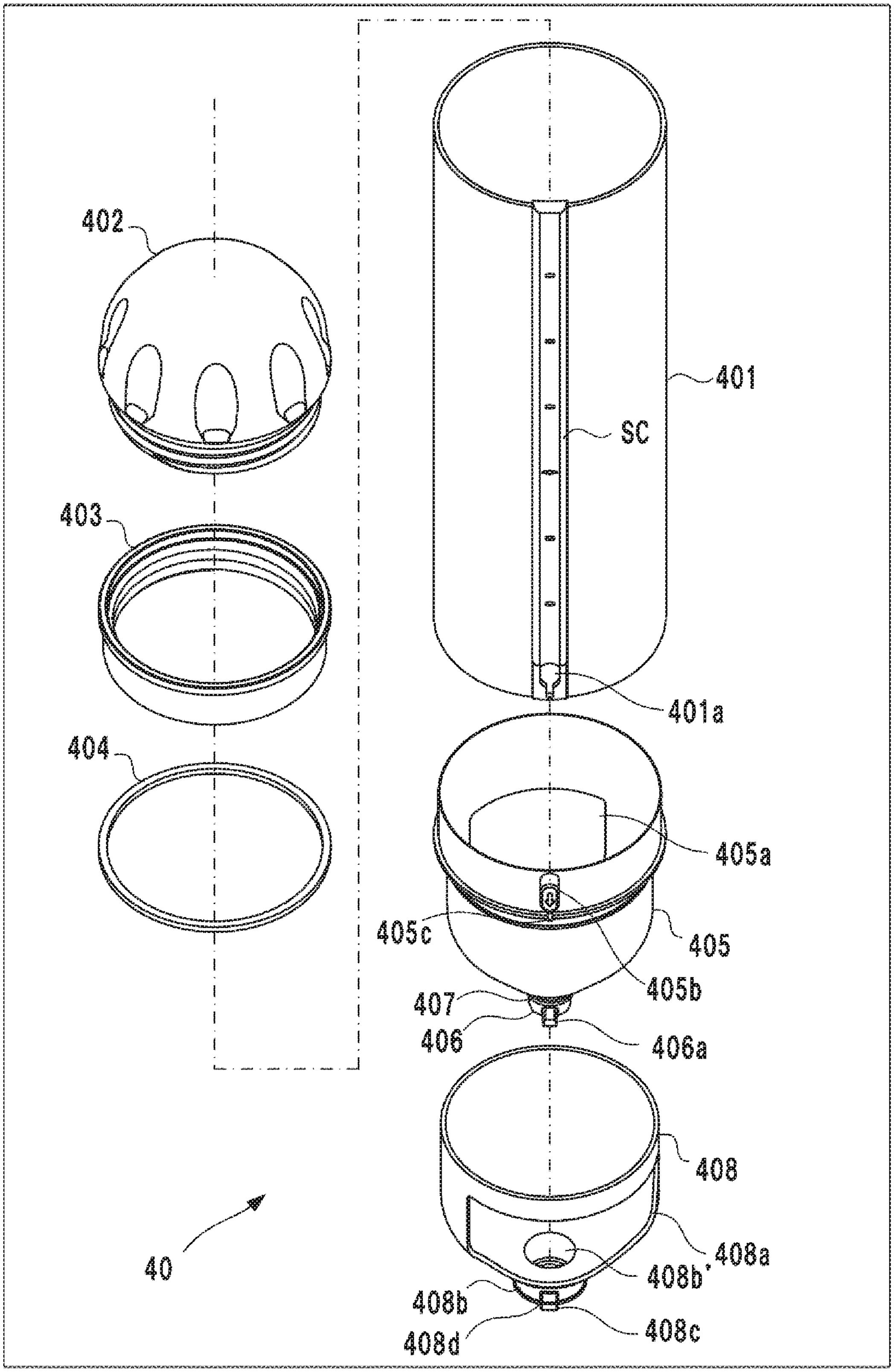
FIG. 31 is an exploded perspective view of a canister.
Figure 32:
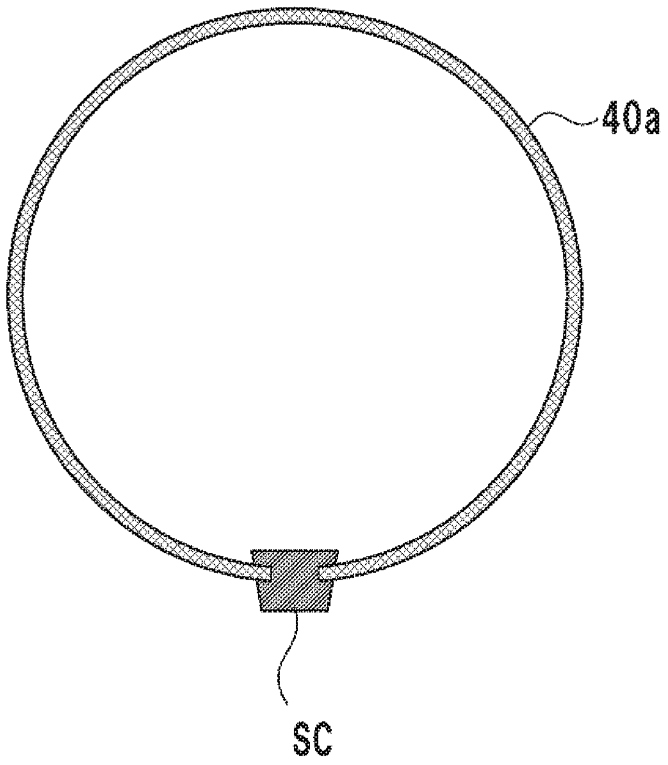
FIG. 32 is a sectional view of the tube portion of the canister.
Figure 33:
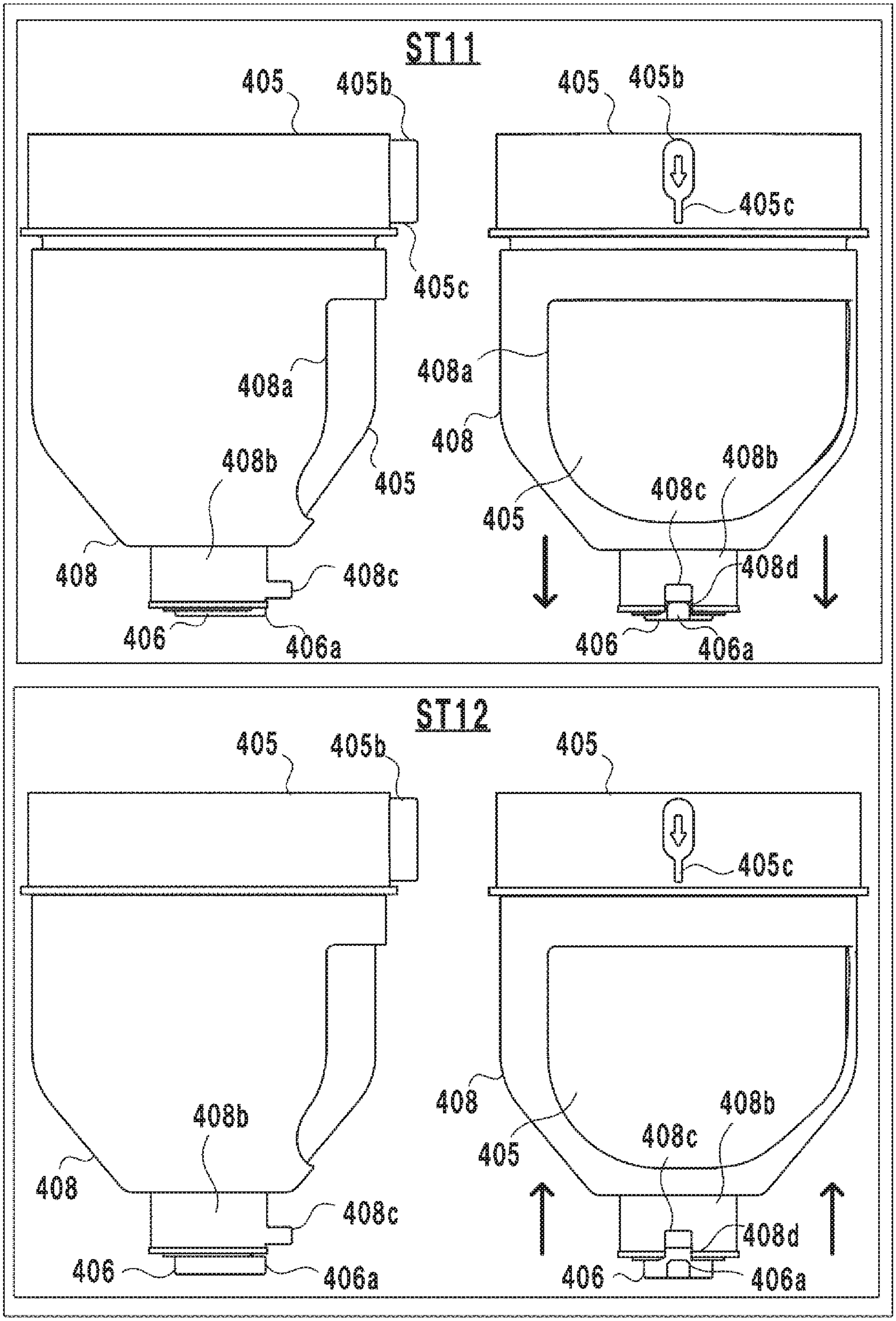
FIG. 33 is an explanatory view of the operations of the constituent components of the canister.
Figure 34:
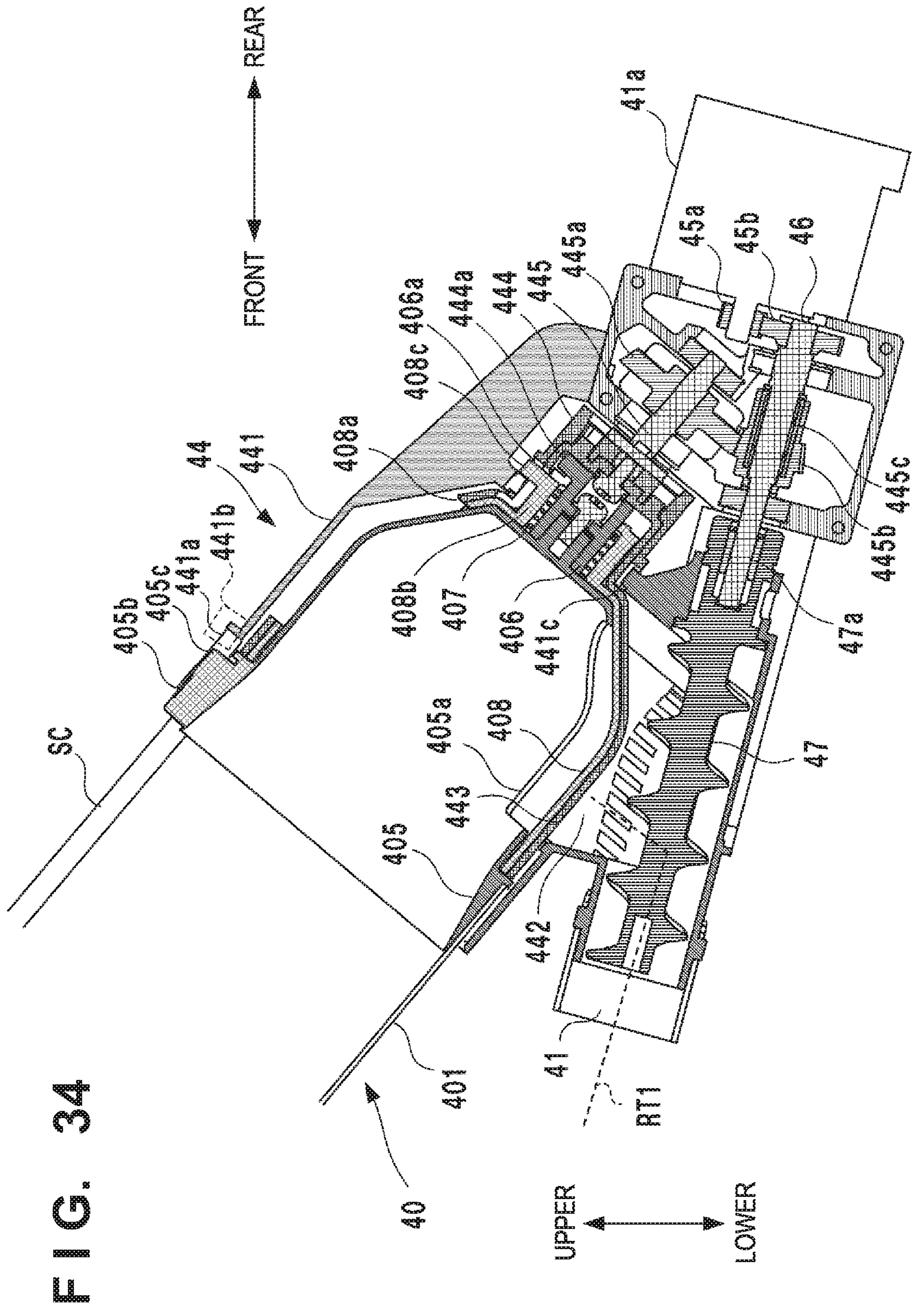
FIG. 34 is a vertical sectional view of the periphery of the canister in an attached state.

The storage apparatus 4 will be described with reference to FIGS. 27 and 31 to 34. In this embodiment, a canister 40 is configured as a cartridge detachable from a holder unit 43. With this arrangement, for example, the type of roasted coffee beans can easily and quickly be exchanged. FIG. 31 is an exploded perspective view of the canister 40. FIG. 32 is a sectional view of the tube portion of the canister 40. FIG. 33 is an explanatory view of the operations of the constituent components of the canister 40. FIG. 34 is a vertical sectional view of the periphery of the canister 40 in an attached state.

The holder unit 43 includes a plurality of attachment portions 44. One canister 40 is detachably attached to one attachment portion 44. In this embodiment, the holder unit 43 includes three attachment portions 44. Hence, three canisters 40 can be attached simultaneously. When discriminating the three canisters 40, they will be referred to as canisters 40A, 40B and 40C.

The canister 40 according to this embodiment is a long hollow bean container that stores roasted coffee beans. The canister 40 includes members such as a tube portion 401, a lid portion 402, a connecting portion 403, a packing 404, an outlet forming portion 405 and an outlet opening/closing portion 408.

The tube portion 401 has a cylindrical shape with two open ends and defines the storage space of roasted coffee beans. Both of the two ends of the tube portion 401 form ports that allow the roasted coffee beans to enter/exit. The port of the tube portion 401 at the end on the side of the lid portion 402 is a port that does not pass the roasted coffee beans when the roasted coffee beans move from the canister 40 into a beverage producing apparatus 1 (to a conveyor 41). This is a port that passes the roasted coffee beans when the lid portion 402 is opened to refill the canister with the roasted coffee beans.

In this embodiment, the tube portion 401 is formed by a member with transparency. This makes the remaining amount of stored roasted coffee beans visible from the outside. A scale SC is extended on the peripheral wall of the tube portion 401 in parallel to the axial direction. Divisions serving as a guideline for the remaining amount of roasted coffee beans are formed on the scale SC. As shown in the sectional view of FIG. 32, the scale SC also functions as a connecting portion for connecting the ends of a plate-shaped member that forms the tube portion 401.

The connecting portion 403 having a cylindrical shape is fitted in one end of the tube portion 401 via the annular packing 404. The packing 404 seals between the flange portion of the connecting portion 403 and the edge of the tube portion 401 but may be omitted. A female screw is formed in the inner circumferential surface of the connecting portion 403. A male screw to be threadably engaged with the female screw is formed in the lid portion 402 so that the lid portion 402 is detachable from the connecting portion 403. Hence, in a state in which the canister 40 is attached to the attachment portion 44, as shown in FIG. 27, it is possible to rotate and detach the lid portion 402 and refill the canister with the roasted coffee beans.

The lid portion 402 has a hemispherical shell shape and closes one end of the tube portion 401. A plurality of concave portions are formed in the outer peripheral surface of the lid portion 402 in the circumferential direction, and the user can easily rotate the lid portion 402 by placing fingers on the concave portions.

The outlet forming portion 405 is fixed to the other end of the tube portion 401 by adhesion or the like. The outlet forming portion 405 is a cup-shaped member that is open upward, and has an outlet 405*a* formed in the peripheral wall. The outlet 405*a* is a port that allows the roasted coffee beans to enter/exit. The roasted coffee beans stored in the tube portion 401 can be discharged from the outlet 405*a* to the outside. That is, the outlet 405*a* is a port that passes the roasted coffee beans when the roasted coffee beans move from the canister 40 into the beverage producing apparatus 1 (to the conveyor 41). This is a port used to supply the beans to the grinding apparatus 5.

In addition, a projecting portion 405*b* is formed on the outlet forming portion 405, and projects to the outside of the peripheral wall of the tube portion 401 through an opening portion 401*a* of the tube portion 401. A mark representing the attaching direction of the canister 40 to the attachment portion 44 is formed on the projecting portion 405*b*.

Furthermore, a detection piece 405*c* extending downward from the projecting portion 405*b* is formed on the outlet forming portion 405. The detection piece 405*c* also projects to the outside of the peripheral wall of the tube portion 401 through the opening portion 401*a*. The detection piece 405*c* is used to detect the presence/absence of attachment of the canister 40 to the attachment portion 44.

A coil spring 407 is provided on the bottom portion of the outlet forming portion 405. In addition, a fixed member 406 is assembled to the bottom portion of the outlet forming portion 405. FIG. 31 shows a state in which the fixed member 406 is assembled to the outlet forming portion 405. In fact, after the outlet opening/closing portion 408 is attached to the outlet forming portion 405, the fixed member 406 is assembled to the outlet forming portion 405 such that the outlet opening/closing portion 408 is sandwiched by the outlet forming portion 405 and the fixed member 406.

The outlet opening/closing portion 408 is a cup-shaped member that is open upward and receives the outlet forming portion 405, and forms a lid mechanism or a lid member that opens/closes the outlet 405*a*. An opening portion 408*a* is formed in the peripheral wall of the outlet opening/closing portion 408. When the opening portion 408*a* overlaps the outlet 405*a*, the outlet 405*a* is set in an open state. When the peripheral wall of the outlet opening/closing portion 408 overlaps the outlet 405*a*, the outlet 405*a* is set in a closed state. That is, the outlet opening/closing portion 408 is attached to the outlet forming portion 405 to be rotatable relative to the outlet forming portion 405 about the central axis of the tube portion 401. In this embodiment, the outlet opening/closing portion 408 is operated by a mechanism on the side of the attachment portion 44 (to be described later) and opens/closes the outlet 405*a*.

A tube portion 408*b* projecting downward is provided on the bottom portion of the outlet opening/closing portion 408. A space 408' inside the tube portion 408*b* forms a concave portion in which the coil spring 407 is arranged. The above-described fixed member 406 is assembled to the outlet forming portion 405 through the tube portion 408*b*. The coil spring 407 always biases the outlet opening/closing portion 408 in a direction to separate from the outlet forming portion 405.

A projection 408*c* is formed on the periphery of the tube portion 408*b*, and a notch 408*d* with which a pawl portion 406*a* formed on the fixed member 406 engages is formed on the lower side of the projection 408*c*.

The rotation restriction state and the rotation permission state of the outlet opening/closing portion 408 will be described with reference to FIG. 33. FIG. 33 shows a state in which the outlet forming portion 405, the outlet opening/closing portion 408 and the fixed member 406 are assembled.

A state ST11 shows views of the outlet forming portion 405, the outlet opening/closing portion 408 and the like viewed from two directions in a state in which the canister 40 is not attached to the attachment portion 44. The pawl portion 406*a* engages with the notch 408*d*, and the rotation of the outlet opening/closing portion 408 relative to the outlet forming portion 405 about the central axis of the tube portion 401 is restricted. The outlet 405*a* is in the closed state. By biasing of the coil spring 407, the outlet forming portion 405 is biased in a direction to separate from the outlet opening/closing portion 408, as indicated by arrows. The engagement between the notch 408*d* and the pawl portion 406*a* is thus firmly maintained. The notch 408*d* and the pawl portion 406*a* thus function as a restriction mechanism that restricts opening of the outlet 405*a* by the outlet opening/closing portion 408 in a case in which the canister 40 is not attached to the attachment portion 44.

A state ST12 shows views of the outlet forming portion 405, the outlet opening/closing portion 408 and the like viewed from two directions in a state in which the canister 40 is attached to the attachment portion 44. The attachment portion 44 is provided with an abutment portion (a shutter portion 443 to be described later) that abuts against the outlet opening/closing portion 408. When the canister 40 is attached to the attachment portion 44, the outlet opening/closing portion 408 relatively displaces to the side of the outlet opening/closing portion 408 against the biasing of the coil spring 407, as indicated by arrows.

Accordingly, the notch 408*d* separates from the pawl portion 406*a*, and the engagement between them is canceled. The rotation of the outlet opening/closing portion 408 relative to the outlet forming portion 405 about the central axis of the tube portion 401 is permitted. In the state ST12 shown in FIG. 33, the outlet 405*a* is in the closed state. However, the outlet 405*a* can be set in the open state by rotating the outlet opening/closing portion 408.

FIG. 34 is a vertical sectional view including a peripheral structure in a state in which the canister 40 is attached to the attachment portion 44. The attachment portion 44 includes a cup-shaped main body portion 441 into which an end of the canister 40 is inserted. The main body portion 441 is open upward on the front side where the end of the tube portion 401, the outlet forming portion 405 and the outlet opening/closing portion 408 of the canister 40 are stored. The rear side of the main body portion 441 is formed into a lattice shape (rib shape).

A groove 441*a* with which the projecting portion 405*b* engages is formed in the edge of the peripheral wall of the main body portion 441. A sensor 441*b* that detects the detection piece 405*c* is arranged next to the groove 441*a*. The sensor 441*b* is, for example, a photointerrupter. When the sensor 441*b* detects the detection piece 405*c*, a processing unit 11*a* recognizes that the canister 40 is attached. If the sensor 441*b* does not detect the detection piece 405*c*, the processing unit 11*a* recognizes that the canister 40 is not attached.

A receiving portion 442 that receives the roasted coffee beans from the canister 40 is formed on the peripheral wall of the main body portion 441. In this embodiment, the receiving portion 442 is an opening communicating with the interior of the conveyor 41. The roasted coffee beans discharged from the outlet 405*a* of the canister 40 are guided to the conveyor 41 via the receiving portion 442.

The shutter portion 443 that is a cup-shaped member fitting the outer shape of the outlet opening/closing portion 408 is provided in the main body portion 441. In the main body portion 441, the shutter portion 443 is supported to be rotatable about the central axis of the canister 40 and opens/closes the receiving portion 442. In this embodiment, a plurality of rollers 441*d* are arranged in the circumferential direction on the peripheral wall of the main body portion 441 (see FIG. 27). Openings that expose the rollers 441*d* to the inside are formed in the peripheral wall of the main body portion 441. The rollers 441*d* are supported to be rotatable about axes parallel to the radial direction of the canister 40. The shutter portion 443 has the outer peripheral surface abutting against the plurality of rollers 441*d* inside the main body portion 441 and is rotatably supported.

When the canister 40 is not attached, the shutter portion 443 closes the receiving portion 442 and prevents a foreign substance from entering the conveyor 41. FIG. 34 shows a state in which the shutter portion 443 closes the receiving portion 442. After the canister 40 is attached, the receiving portion 442 can be opened by driving a motor 41*a* and rotating the shutter portion 443.

The shutter portion 443 is attached to a rotating member 444. The rotating member 444 is rotated by operating the outlet opening/closing portion 408 to open/close the outlet 405*a*. The rotating member 444 is connected to a drive shaft 445. The drive shaft 445 is one element that is arranged to be located on the same axis as the central axis of the canister 40 when the canister 40 is attached and transmits the driving force of the motor 41*a* to the rotating member 444. The rotating member 444 is a cylindrical member open upward on the front side. A groove 444*a* is formed in the edge of the peripheral wall of the rotating member 444. The projection 408*c* of the outlet opening/closing portion 408 engages with the groove 444*a*. By the engagement, when the rotating member 444 is rotated, the outlet opening/closing portion 408 also rotates, and opens/closes the outlet 405*a*. FIG. 34 shows a state in which the outlet opening/closing portion 408 sets the outlet 405*a* in the closed state.

With the above arrangement, the state of the storage apparatus 4 can be switched by the rotation of the rotating member 444 between a state (the state shown in FIG. 34, which is called a closed state) in which the shutter portion 443 closes the receiving portion 442, and the outlet opening/closing portion 408 sets the outlet 405*a* in the closed state and a state (a state in which the roasted coffee beans are supplied into the apparatus, which is called an open state) in which the shutter portion 443 opens the receiving portion 442, and the outlet opening/closing portion 408 sets the outlet 405*a* in the open state. When the rotation position of the shutter portion 443 is detected by a sensor (not shown), the processing unit 11*a* can recognize these states (feedback control). As another example, a stepping motor may be used as the motor 41*a*, and recognition and switching of the state of the storage apparatus 4 may be done by the control amount (number of steps) (open loop control).

A bevel gear 445*a* is provided on the drive shaft 445. The bevel gear 445*a* meshes with a bevel gear 445*b* provided on a drive shaft 46.

The drive shaft 46 is provided with a gear 45*b* that meshes with a pinion gear 45*a* provided on the output shaft of the motor 41*a*, and rotated by driving of the motor 41*a*. A one-way clutch 445*c* intervenes between the drive shaft 46 and the bevel gear 445*b*. The one-way clutch 445*c* transmits only rotation of the drive shaft 46 in one direction to the bevel gear 445*b*. That is, when the motor 41*a* is rotated in one direction, the driving force of the motor 41*a* is transmitted to the rotating member 444 via the path of the bevel gear 445*b*, the bevel gear 445*a*, and the drive shaft 445. However, when the motor 41*a* is rotated in the other direction, the driving force is not transmitted.

The conveyor 41 is a conveyance mechanism that conveys the roasted coffee beans from the canister 40. In this embodiment, the conveyor 41 is provided not on the side of the canister 40 but on the side of the attachment portion 44. That is, the conveyor 41 is provided to remain on the side of the attachment portion 44 when the canister 40 is detached from the attachment portion 44. An arrangement that integrates the canister 40 and the conveyor 41 can also be employed. However, if they are formed as separate members, as in this embodiment, the canister 40 can be simplified and made lightweight.

The screw shaft of the conveyor 41 is connected to the drive shaft 46 via a one-way clutch 47*a*. The driving transmission direction of the one-way clutch 47*a* is reverse to that of the one-way clutch 445*c*. That is, when the motor 41*a* is rotated in the other direction, the driving force of the motor 41*a* is transmitted to a screw shaft 47, and the roasted coffee beans are conveyed. However, when the motor 41*a* is rotated in one direction reverse to the other direction, the driving force is not transmitted.

In this embodiment, the rotation direction of the motor 41*a* is switched between forward rotation and reverse rotation, thereby exclusively performing the rotation of the rotating member 444 (that is, the rotation of the shutter portion 443 and the outlet opening/closing portion 408) and the rotation of the screw shaft 47.

An example of control of the processing unit 11*a* concerning attachment and detachment of the canister 40 will be described. When the user attaches the canister 40 to the attachment portion 44, the sensor 441*b* detects this. The processing unit 11*a* drives the motor 41*a* to set the shutter portion 443 and the outlet opening/closing portion 408 in the open state. The projection 408*c* engages with a stopper 441*c* provided on the inner circumferential wall of the main body portion 441 in the axial direction of the canister 40, so the canister 40 does not fall from the attachment portion 44 even if the user takes the hand off. In other words, the projection 408*c* functions as a restricting portion that restricts detachment of the canister 40 from the attachment portion 44 in a case in which the outlet opening/closing portion 408 opens the outlet 405*a*. This makes it possible to prevent the canister 40 from being detached to cause the roasted coffee beans in the canister 40 to spill out in a state in which the outlet 405*a* is kept open.

Since the shutter portion 443 and the outlet opening/closing portion 408 are set in the open state, the roasted coffee beans in the canister 40 are introduced into the conveyor 41 via the receiving portion 442. The processing waits in this state.

When producing a coffee beverage, the motor 41*a* is driven to rotate and stop the screw shaft 47. The roasted coffee beans are thus conveyed to a collective conveyance path 42. The amount of roasted coffee beans to be used to produce the coffee beverage is automatically calculated by the rotation amount of the screw shaft 47. When producing a coffee beverage by blending a plurality of types of roasted coffee beans in one coffee beverage production, the ratio of conveyance amounts to the collective conveyance path 42 by the conveyors 41 may be changed between the canisters 40. Accordingly, ground beans in which the plurality of types of roasted coffee beans are blended can be supplied to the extraction container 9.

When exchanging the canister 40, the user inputs an exchange instruction from an operation unit 12. The processing unit 11*a* drives the motor 41*a* to return the shutter portion 443 and the outlet opening/closing portion 408 to the closed state. The user can detach the canister 40 from the attachment portion 44.

<Canister and Attachment/Detachment Structure Thereof (Second Example)>

The canister 40 and the attachment portion 44 according to the second example, which are partially different from the canister 40 and the attachment portion 44 according to the first example described with reference to FIGS. 31 to 34, will be described with reference to FIGS. 35 to 47. In the components of the second example, the same components as in the first example or components having common functions are denoted by the same reference numerals as in the first example, and a description thereof will be omitted. Different components or functions will mainly be described.

Figure 35:
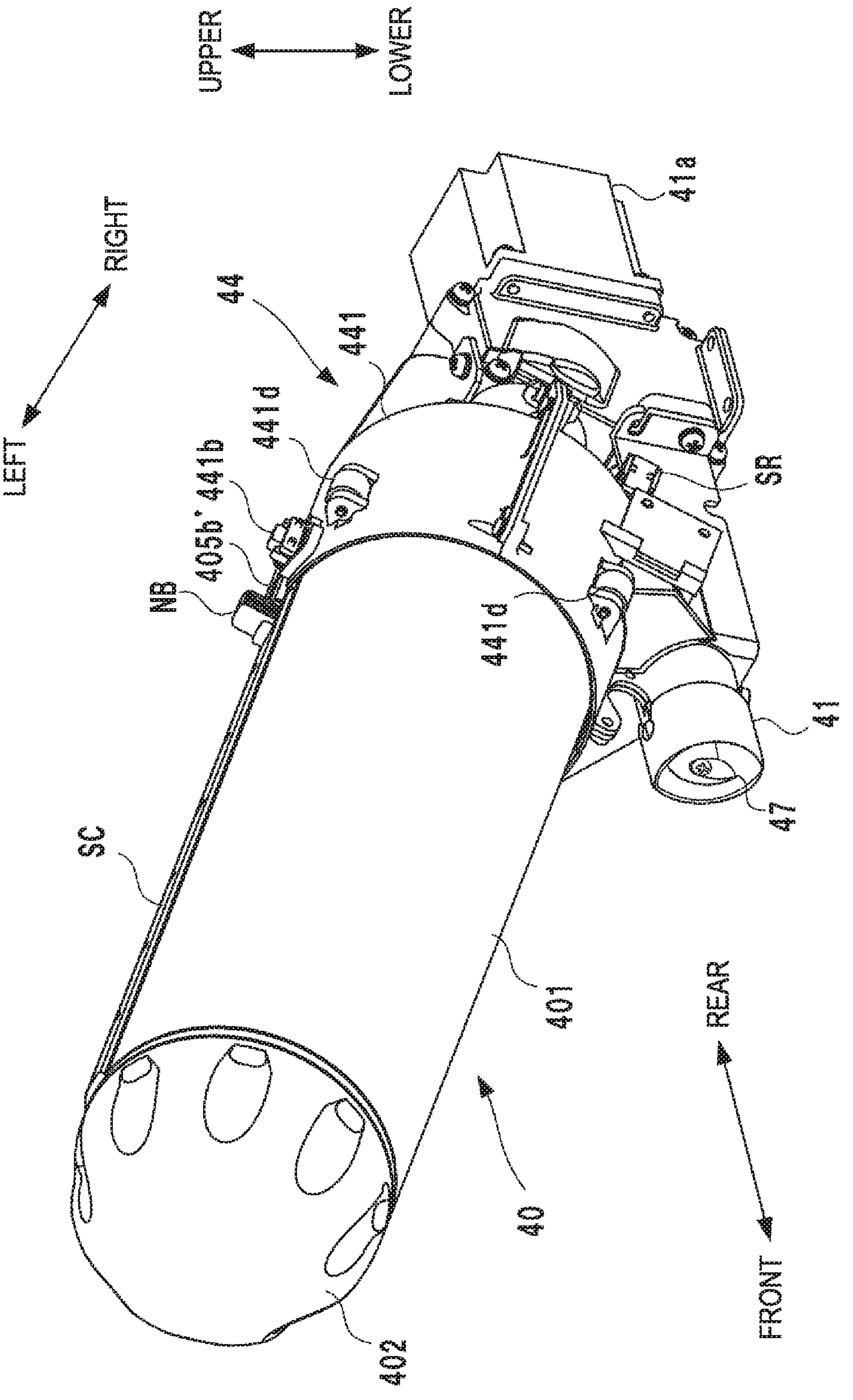
FIG. 35 is a perspective view of the periphery of a canister according to another example in the attached state.
Figure 36:
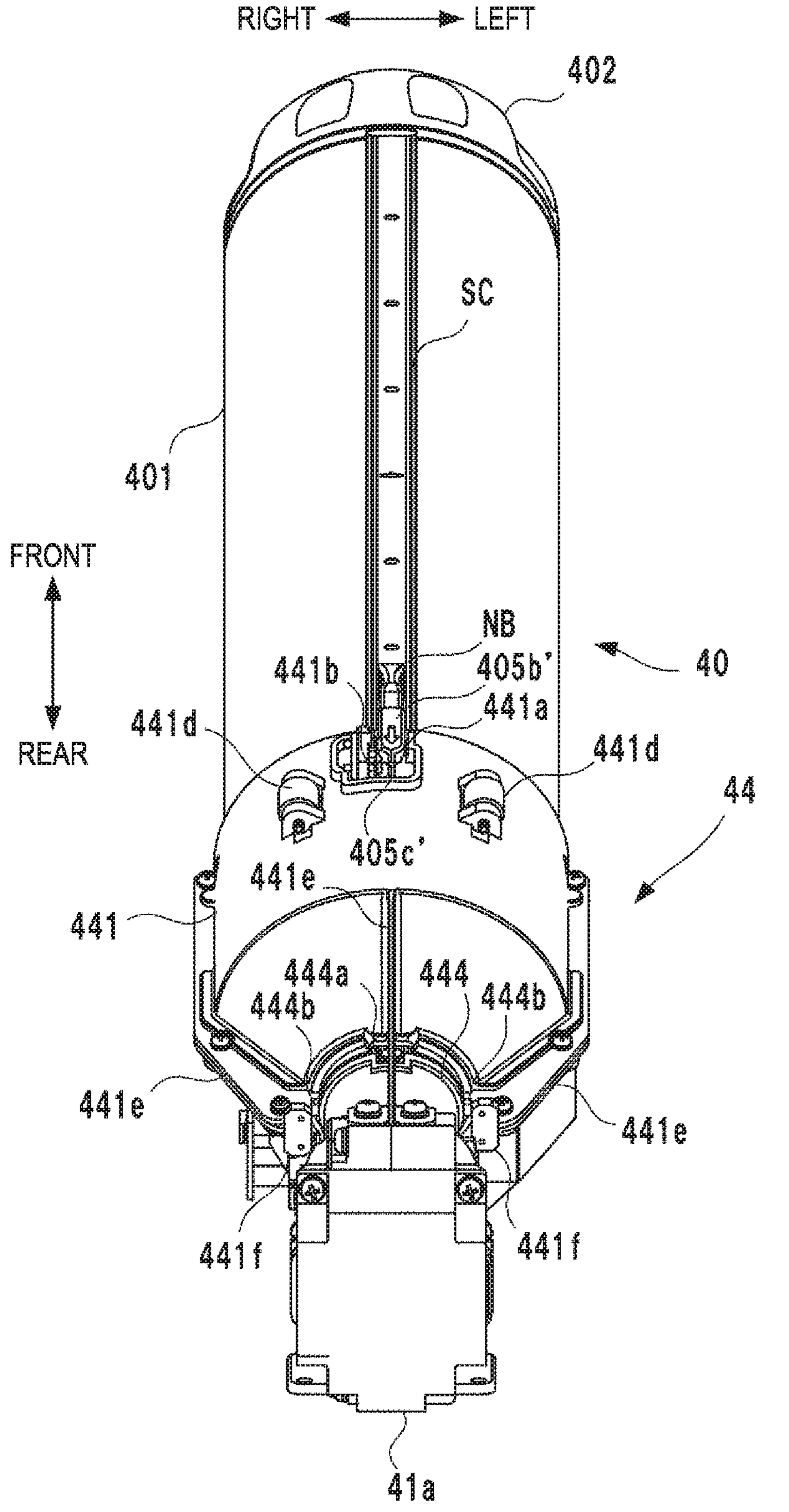
FIG. 36 is a view showing the periphery of the canister according to another example viewed from the upper side in the attached state.
Figure 37:
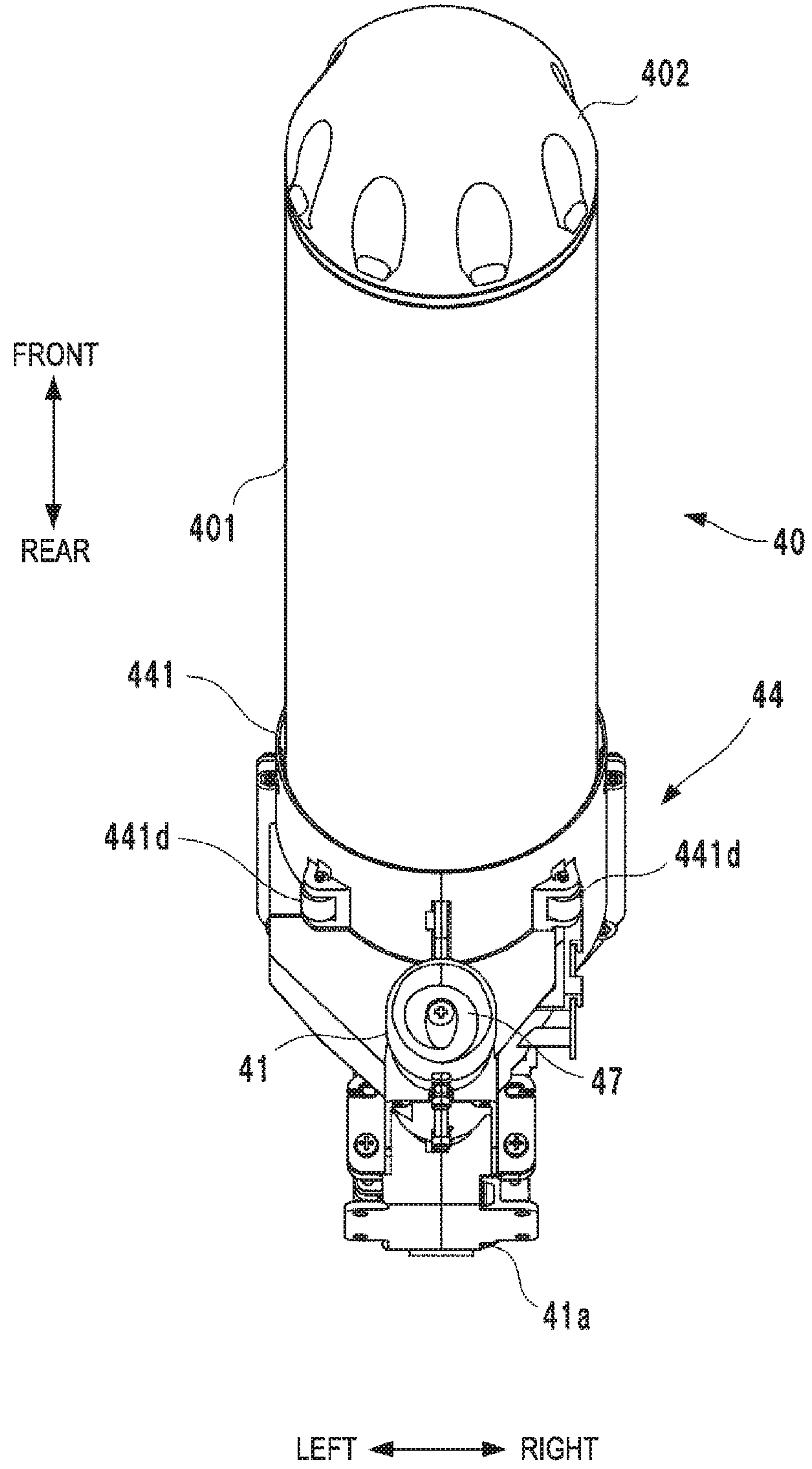
FIG. 37 is a view showing the periphery of the canister according to another example viewed from the lower side in the attached state.

FIGS. 35 to 37 are views showing the outer appearance of the canister 40 and the attachment portion 44 according to the second example viewed from multiple directions. The rear side of the main body portion 441 of the attachment portion 44 according to the first example is formed into a lattice shape (rib shape), as described above. The main body portion 441 according to the second example also has the same arrangement, and the structure is understood from FIG. 36 and the like. The rear side of the main body portion 441 is formed by a plurality of ribs 441*e*, and the rotating member 444 and the like on the inner side are visible.

The rotating member 444 includes two detection pieces 444*b* spaced apart by 180° in the circumferential direction. Two sensors 441*f* such as photointerrupters are provided. They detect the two detection pieces 444*b*. The processing unit 11*a* recognizes the rotation position of the rotating member 444 based on the detection results of the sensors 441*f*. That is, the processing unit 11*a* recognizes whether the shutter portion 443 and the outlet opening/closing portion 408 described in the first example are in the closed state or open state.

Figure 38:
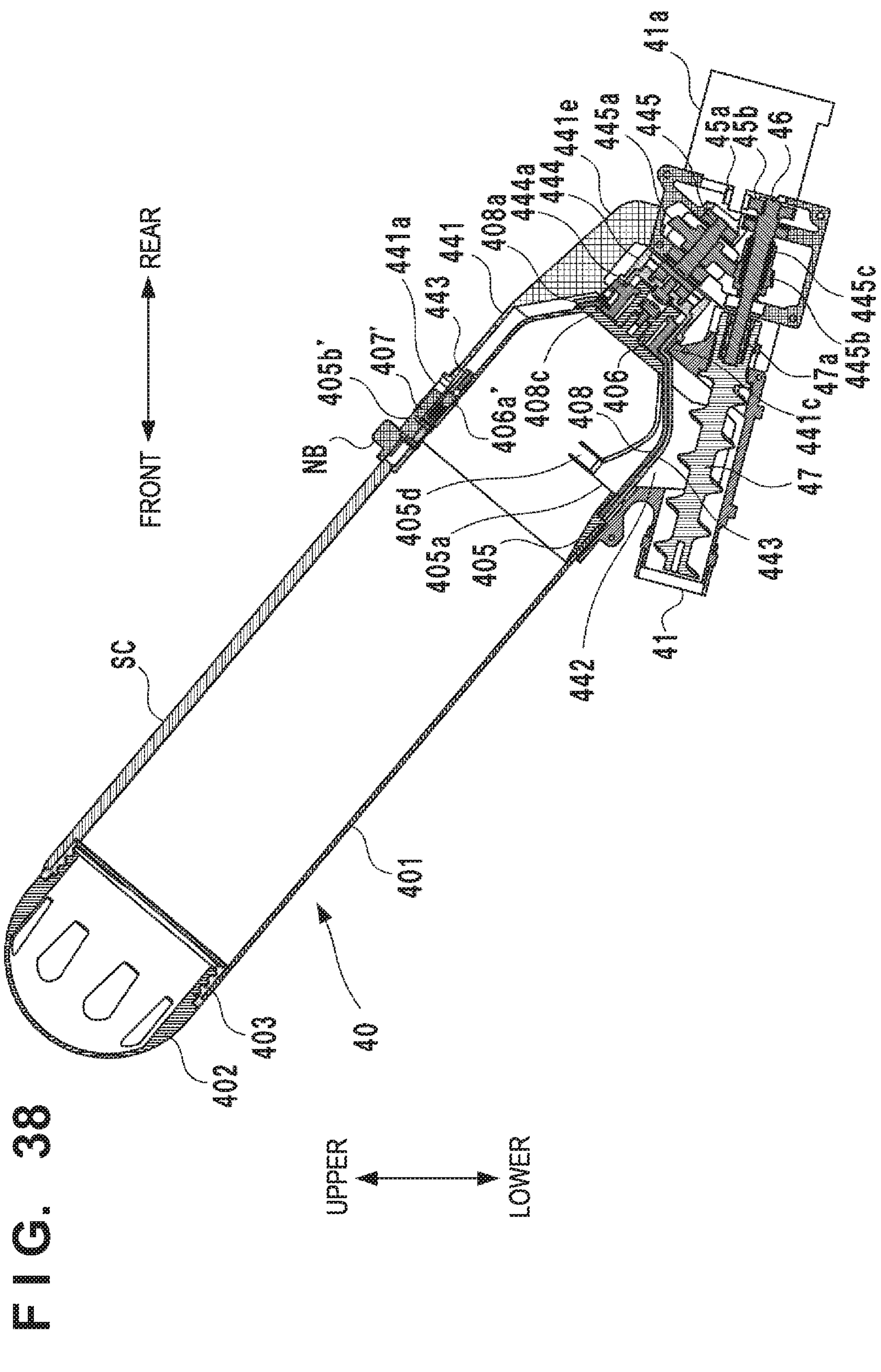
FIG. 38 is a vertical sectional view of the periphery of the canister according to another example in the attached state.

FIG. 38 is a vertical sectional view including the peripheral structure in a state in which the canister 40 is attached to the attachment portion 44. The structure of the second example is basically the same as that of the first example except that at the edge of the outlet 405*a*, an elastic deforming portion 405*d* is formed in the peripheral wall of the outlet forming portion 405. The elastic deforming portion 405*d* is a portion formed by forming parallel slits in the peripheral wall of the outlet forming portion 405 from the edge of the outlet 405*a* and is configured to be deformed more readily than the peripheral portion. The function of the elastic deforming portion 405*d* will be described later.

Figure 39:
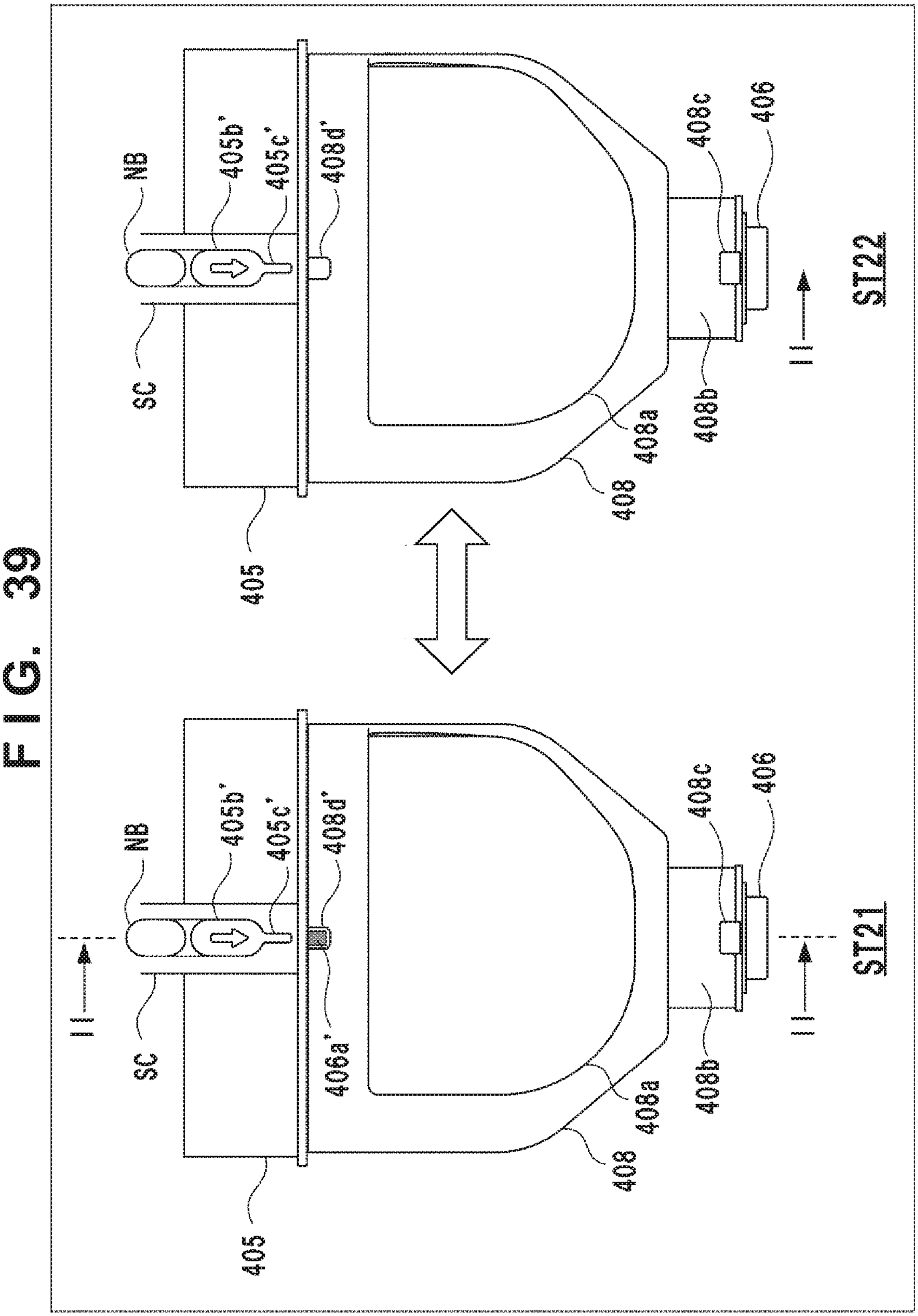
FIG. 39 is an explanatory view of the operations of the constituent components of the canister according to another example.
Figure 40:
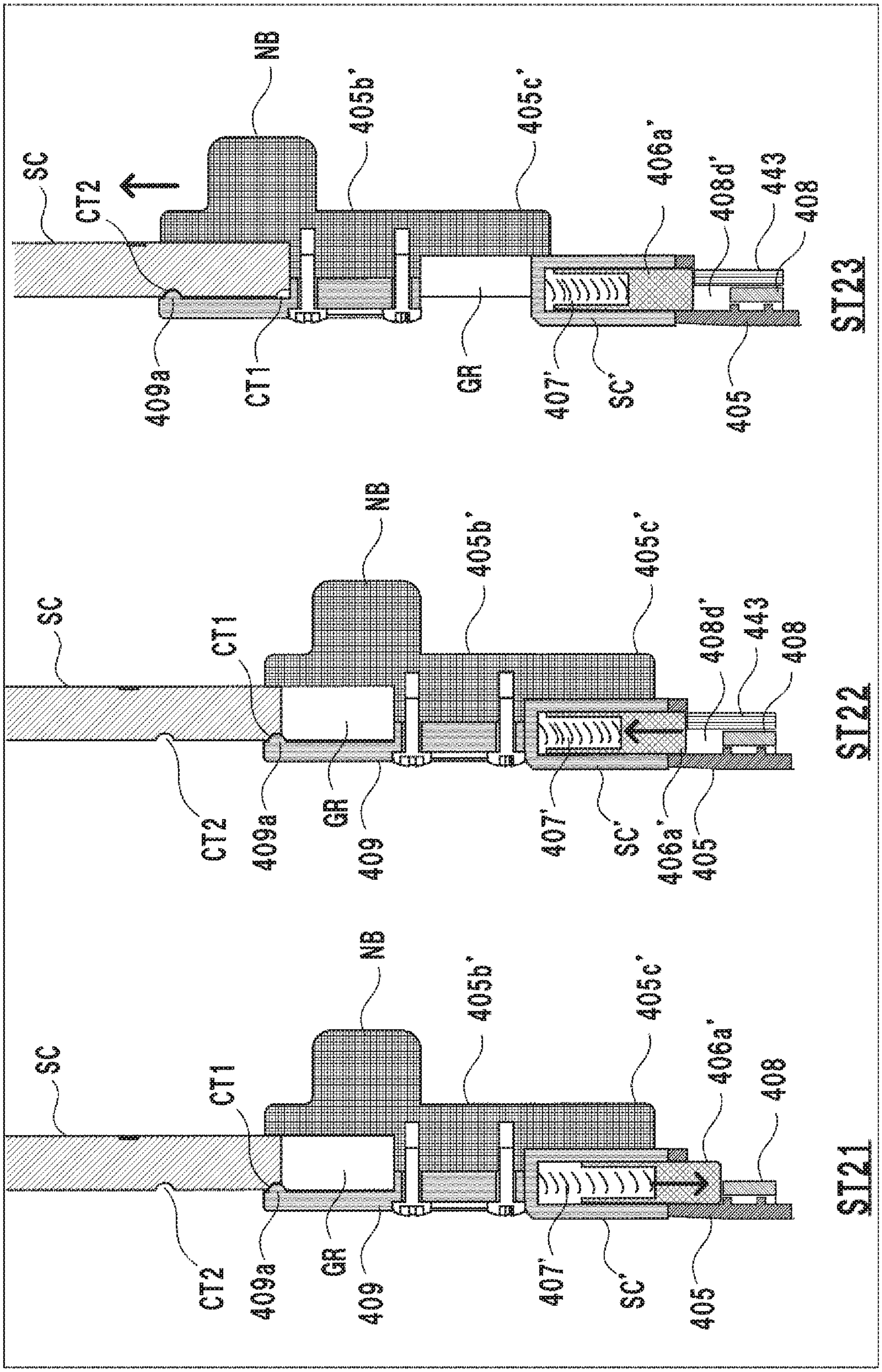
FIG. 40 is an explanatory view of the operations of the constituent components of the canister according to another example.

The second example is different from the first example in the arrangement associated with rotation restriction and rotation permission of the outlet opening/closing portion 408. This point will be described with reference to FIGS. 39 and 40. A state ST1 shown in FIG. 39 represents a case in which the outlet opening/closing portion 408 is in a rotation restriction state, and a state ST22 shown in FIG. 39 represents a case in which the outlet opening/closing portion 408 is in a rotation permission state. FIG. 40 shows sectional views taken along a line II-II in FIG. 39. The states ST21 and ST22 in FIG. 40 correspond to steps ST21 and ST22 in FIG. 39.

In the second example, the coil spring 407 of the outlet forming portion 405 and the pawl portion 406*a* of the fixed member 406 in the first example are not provided. The outlet opening/closing portion 408 is not be relatively displaced in the axial direction of the tube portion 401 with respect to the outlet forming portion 405 and can only relatively rotate about the axis.

A scale SC of the second example includes a groove GR, and a slider 409 is assembled in it. The slider 409 is formed by fastening the member on the obverse side and the member on the reverse side of the scale SC by two bolts and can slide along the groove GR in the longitudinal direction of the scale SC. As components corresponding to the projecting portion 405*b* and the detection piece 405*c* of the first example, the slider 409 includes a projecting portion 4056 and a detection piece 405*c*'. The slider 409 also includes a grip portion NB that the user grips by fingers.

The slider 409 includes a convex portion 409*a* that can engage with one of concave portions CT1 and CT2 formed on the scale SC. The slider 409 can slide between a first position at which the convex portion 409*a* engages with the concave portion CT1 and a second position at which the convex portion 409*a* engages with the concave portion CT2. The state ST21 or ST22 represents a state in which the slider 409 is located at the first position, and a state ST23 shown in FIG. 40 represents a state in which the slider 409 is located at the second position. The slider 409 is basically located at the first position and manually slid to the second position at the time of roasted coffee bean biting cancel to be described later.

A tubular support portion SC' that is open to the side of the outlet forming portion 405 is fixed to the end of the scale SC according to the second example. A coil spring 407' and a movable member 406*a*', which replace the coil spring 407 and the pawl portion 406*a* according to the first example, are supported by the support portion SC'. A notch 408*d*' that replaces the notch 408*d* according to the first example is formed at the edge of the outlet opening/closing portion 408. As shown in the state ST21, when the movable member 406*a*' engages with the notch 408*d*', the rotation of the outlet opening/closing portion 408 relative to the outlet forming portion 405 about the central axis of the tube portion 401 is restricted. At this time, the outlet 405*a* is in the closed state. The movable member 406*a*' is always biased by the coil spring 407' to the side of the notch 408*d*'. The engagement between the notch 408*d*' and the movable member 406*a*' is thus firmly maintained. The notch 408*d*' and the movable member 406*a*' thus function as a restriction mechanism that restricts opening of the outlet 405*a* by the outlet opening/closing portion 408 in a case in which the canister 40 is not attached to the attachment portion 44.

When the canister 40 is attached to the attachment portion 44, as shown in the state ST22, the movable member 406*a*' abuts against the edge of the shutter portion 443 and is pressed into the support portion SC' against the biasing of the coil spring 407'. Accordingly, the engagement between the movable member 406*a*' and the notch 408*d*' is canceled, and the rotation of the outlet opening/closing portion 408 relative to the outlet forming portion 405 about the central axis of the tube portion 401 is permitted.

An example of control of the processing unit 11*a* concerning attachment and detachment of the canister 40 in the second example will be described mainly with reference to FIGS. 38 to 41. When the user attaches the canister 40 to the attachment portion 44, the movable member 406*a*' abuts against the edge of the shutter portion 443, and accordingly, the engagement between the movable member 406*a*' and the notch 408*d*' is canceled (a state of the state ST22).

Figure 41:
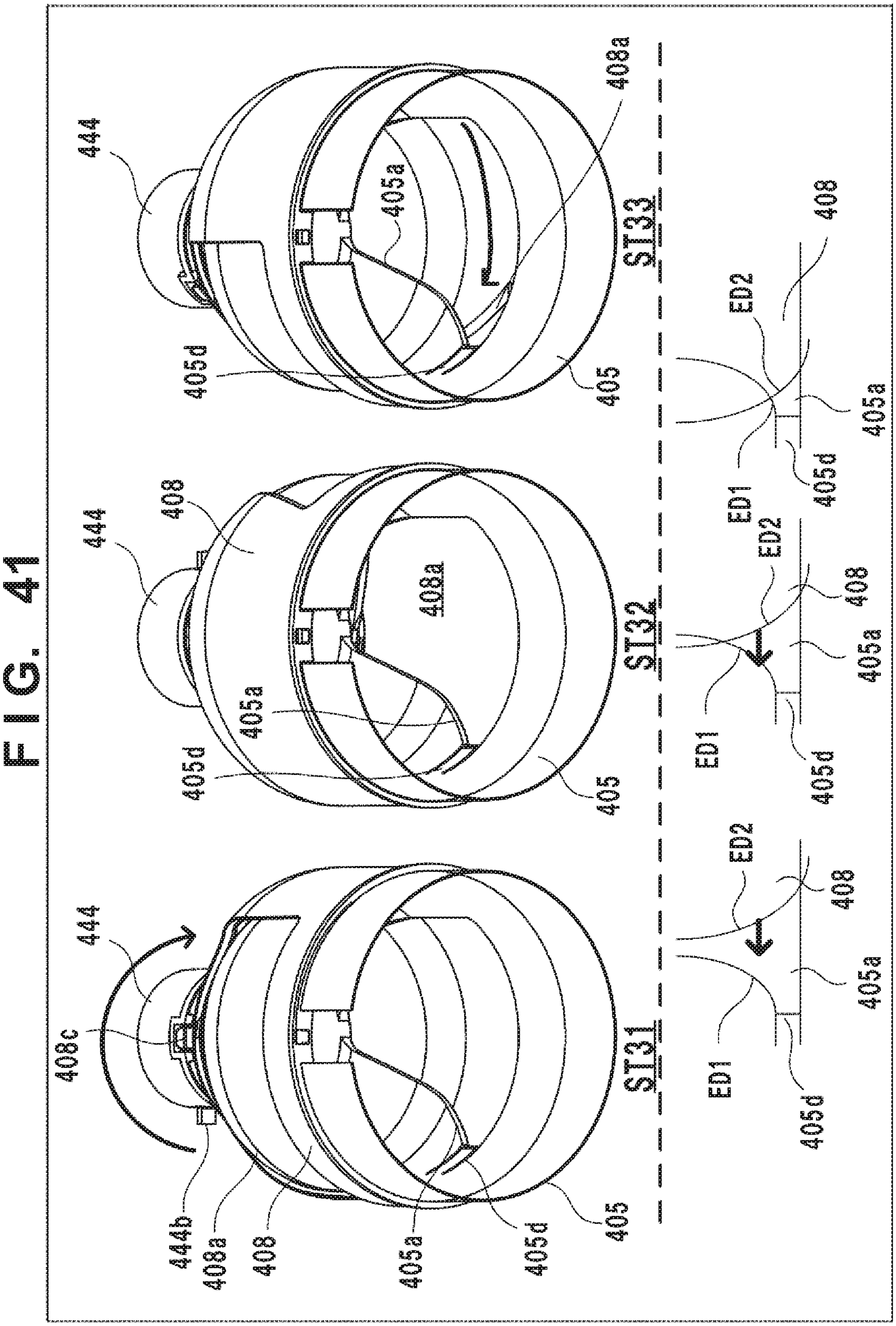
FIG. 41 is an explanatory view of the operations of the constituent components of the canister according to another example.

The attachment of the canister 40 is detected by the sensor 441*b*. The processing unit 11*a* drives the motor 41*a* to set the shutter portion 443 and the outlet opening/closing portion 408 in the open state. A state ST31 shown in FIG. 41 represents a case in which the outlet opening/closing portion 408 is in the closed state, and a state ST32 shows a case in which the outlet opening/closing portion 408 shifts from the state ST31 to the open state.

When the shutter portion 443 and the outlet opening/closing portion 408 are set in the open state, the projection 408*c* engages with the stopper 441*c* provided on the inner circumferential wall of the main body portion 441 in the axial direction of the canister 40, so the canister 40 does not fall from the attachment portion 44 even if the user takes the hand off. In other words, the projection 408*c* functions as a restricting portion that restricts detachment of the canister 40 from the attachment portion 44 in a case in which the outlet opening/closing portion 408 opens the outlet 405*a*. This makes it possible to prevent the canister 40 from being detached to cause the roasted coffee beans in the canister 40 to spill out in a state in which the outlet 405*a* is kept open.

Since the shutter portion 443 and the outlet opening/closing portion 408 are set in the open state, the roasted coffee beans in the canister 40 are introduced into the conveyor 41 via the receiving portion 442. The processing waits in this state.

When producing a coffee beverage, the motor 41*a* is driven to rotate and stop the screw shaft 47. The roasted coffee beans are thus conveyed to the collective conveyance path 42. The amount of roasted coffee beans to be used to produce the coffee beverage is automatically calculated by the rotation amount of the screw shaft 47.

A remaining bean amount detection sensor SR is provided at the base of the receiving portion 442. The remaining bean amount detection sensor SR is, for example, a transmissive sensor (photointerrupter). When the absence of beans is detected at this position, and coffee beverage production is performed a predetermined number of times (for example, twice) after that, the user may be notified that the canister 40 is empty.

When exchanging the canister 40, for example, the user inputs an exchange instruction from the operation unit 12. The processing unit 11*a* drives the motor 41*a* to return the shutter portion 443 and the outlet opening/closing portion 408 to the closed state. A state ST33 shown in FIG. 41 represents a state in which the outlet opening/closing portion 408 is returning from the state ST32 to the closed state.

When the shutter portion 443 and the outlet opening/closing portion 408 are set in the closed state, the engagement between the projection 408*c* and the stopper 441*c* is canceled, and the user can detach the canister 40 from the attachment portion 44. When the canister 40 is detached from the attachment portion 44, the movable member 406*a*' engages with the notch 408*d*' again by the biasing of the coil spring 407' (a state of the state ST21). Accordingly, the rotation of the outlet opening/closing portion 408 relative to the outlet forming portion 405 about the central axis of the tube portion 401 is restricted again, and the roasted coffee beans remaining in the canister 40 are prevented from unintentionally spilling out from the outlet 405*a*.

<Measure Against Biting>

When returning the shutter portion 443 and the outlet opening/closing portion 408 from the open state to the closed state, the degree of exposure (opening area) of the outlet 405*a* gradually decreases as it overlaps the peripheral wall of the outlet opening/closing portion 408. The view on the lower side of the broken line in FIG. 41 shows a change in the degree of exposure of the outlet 405*a* in the process of returning the outlet opening/closing portion 408 from the open state to the closed state.

An edge ED1 of the peripheral wall of the outlet forming portion 405, which defines the outlet 405*a*, and an edge ED2 of the peripheral wall of the outlet opening/closing portion 408, which defines the opening portion 408*a* are formed into shapes that project in directions to face each other and make the width of the outlet 405*a* larger on the side of the tube portion 401. With this structure, the roasted coffee beans located between the edge ED1 and the edge ED2 are readily pushed to the side of the tube portion 401, and biting of beans hardly occurs at a plurality of points. Note that the edges ED1 and ED2 may have not the projecting shapes but linear shapes and make the width of the outlet 405*a* larger on the side of the tube portion 401.

An end of the edge ED1 is formed by the elastic deforming portion 405*d*. For this reason, if the roasted coffee beans are going to be bitten between the elastic deforming portion 405*d* and the edge ED2 immediately before the outlet 405*a* is closed, the elastic deforming portion 405*d* is deformed to readily flip the beans. This can further prevent biting of the roasted coffee beans.

Figure 42:
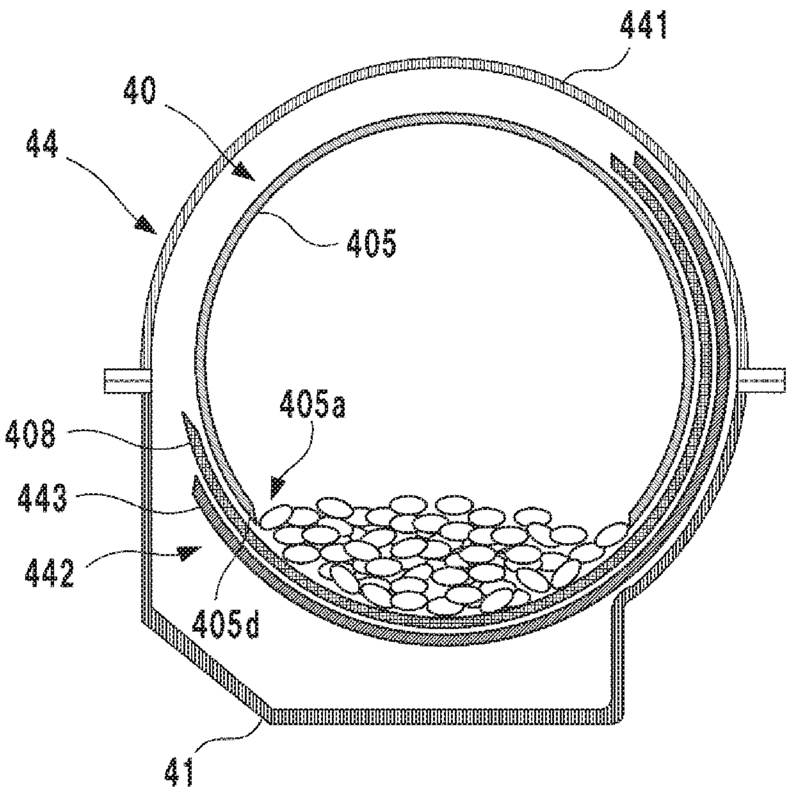
FIG. 42 is an explanatory view of the operations of the constituent components of the canister according to another example.
Figure 43:
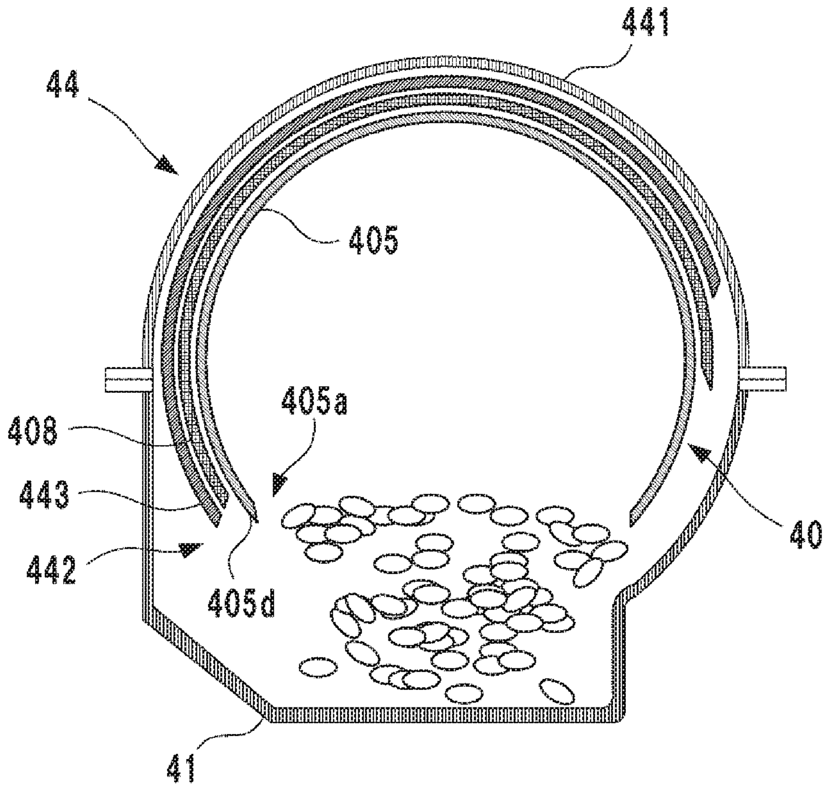
FIG. 43 is an explanatory view of the operations of the constituent components of the canister according to another example.
Figure 44:
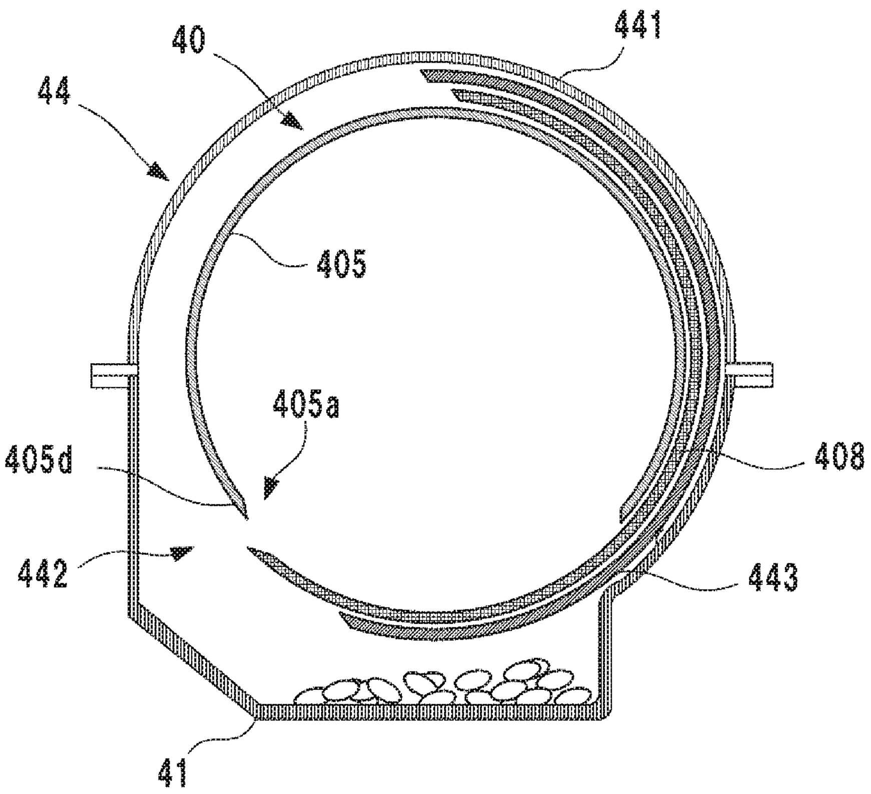
FIG. 44 is an explanatory view of the operations of the constituent components of the canister according to another example.

An example of control associated with roasted coffee bean biting prevention will be described here. FIGS. 42 to 44 are sectional views of the canister 40 in the radial direction, and the state of stored roasted coffee beans is shown. FIGS. 42 to 44 show control from attachment to detachment of the canister 40.

FIG. 42 shows a state immediately after the canister 40 is attached to the attachment portion 44. The shutter portion 443 and the outlet opening/closing portion 408 are in the closed state. FIG. 43 shows a state in which the shutter portion 443 and the outlet opening/closing portion 408 are switched from the state shown in FIG. 42 to the open state. The outlet 405*a* and the receiving portion 442 are opened, and the roasted coffee beans flow into the conveyor 41.

FIG. 44 shows again a state in which the shutter portion 443 and the outlet opening/closing portion 408 are returned to the closed state. Before the outlet 405*a* is completely closed, the rotation of the shutter portion 443 and the outlet opening/closing portion 408 is temporarily stopped. The outlet 405*a* is set in a state in which it is partially closed, and opened so as to allow, for example, one roasted coffee bean to pass. If the motor 41*a* is a stepping motor, the degree of opening of the outlet 405*a* can be controlled by the control amount (the number of steps).

In this state, the conveyor 41 is driven, and the roasted coffee beans are removed from the periphery of the receiving portion 442. After that, the conveyor 41 is stopped, and the shutter portion 443 and the outlet opening/closing portion 408 are wholly closed and completely returned to the closed state. This can more reliably prevent biting of the roasted coffee beans.

As shown in FIGS. 42 to 44, the sectional shapes of the edges of the outlet forming portion 405, the outlet opening/closing portion 408 and the shutter portion 443 are wedge shapes or tapered shapes. Since the contact area between the edges and the roasted coffee beans becomes small, this contributes to prevention of biting.

Additionally, as shown in the sectional view of FIG. 34 or 38, the space on the periphery of the receiving portion 442 has a larger capacity on the front side than on the rear side. Hence, when returning the shutter portion 443 and the outlet opening/closing portion 408 from the open state to the closed state, a larger space can be ensured on the periphery of the outlet 405*a* that gradually narrows, and biting of the roasted coffee beans can be prevented. When the rear side is made narrow, the amount of roasted coffee beans remaining there can be decreased. When the conveyor 41 is driven in the state shown in FIG. 44, the amount of roasted coffee beans (for example, beans to be wasted) taken out by the conveyor 41 can be decreased.

Figure 45:
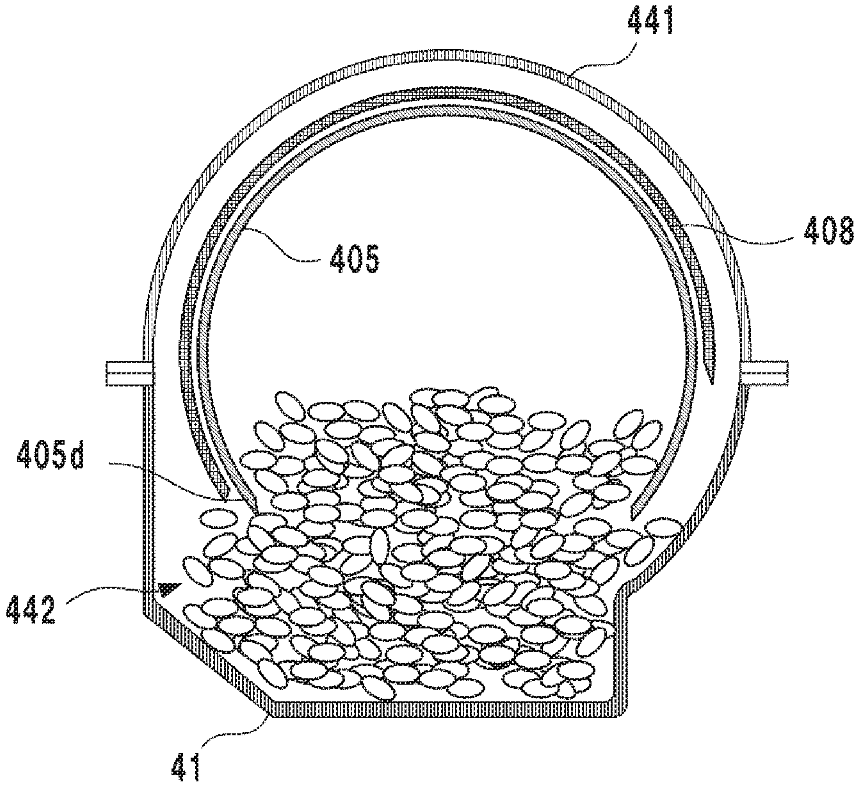
FIG. 45 is an explanatory view of the operations of the constituent components of the canister according to another example.
Figure 46:
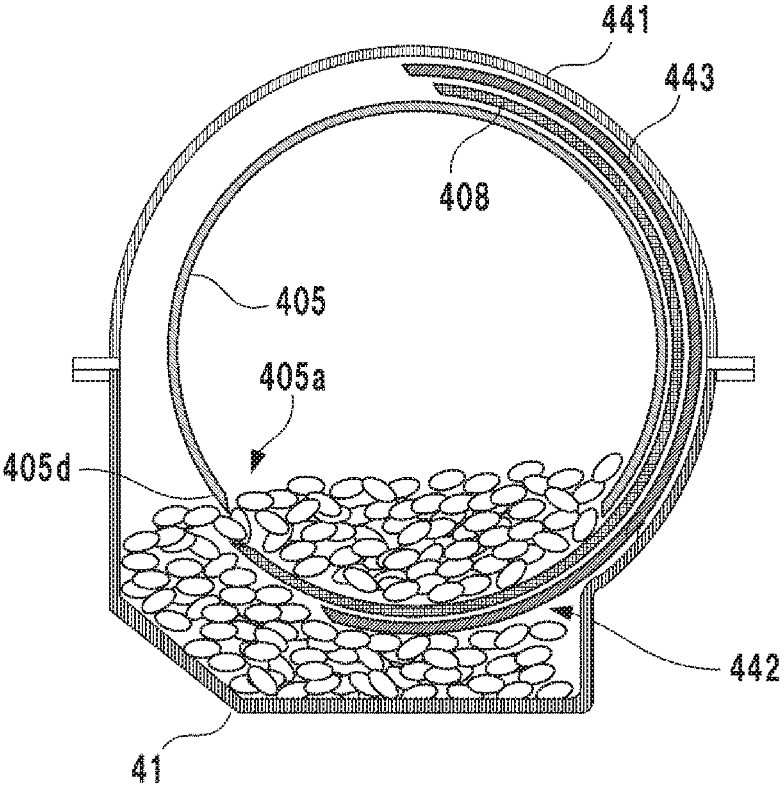
FIG. 46 is an explanatory view of the operations of the constituent components of the canister according to another example.
Figure 47:
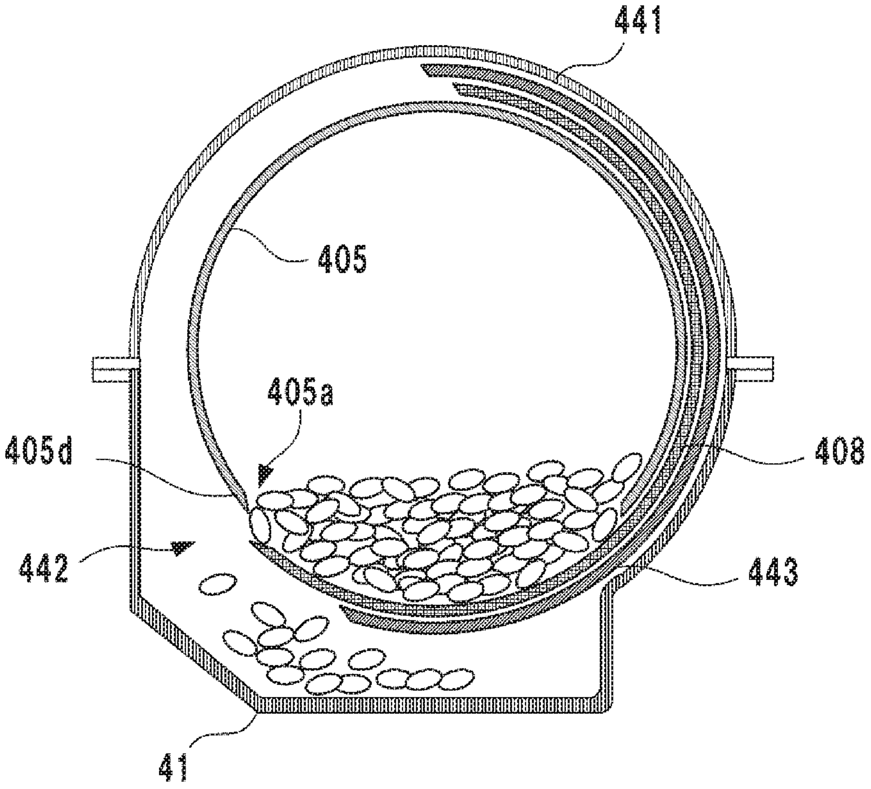
FIG. 47 is an explanatory view of the operations of the constituent components of the canister according to another example.

FIGS. 45 to 47 are also sectional views of the canister 40 in the radial direction, and show the state of the stored roasted coffee beans. FIGS. 45 to 47 show a state in which a relatively large amount of roasted coffee beans remains in the receiving portion 442 and the canister 40, and show a case in which the shutter portion 443 and the outlet opening/closing portion 408 are returned from the open state to the closed state.

FIG. 45 shows a case in which the shutter portion 443 and the outlet opening/closing portion 408 are in the open state. A relatively large amount of roasted coffee beans remains near the outlet 405*a* and the receiving portion 442.

FIG. 46 shows a state in which the shutter portion 443 and the outlet opening/closing portion 408 are returned to the closed state. As in the example of FIG. 44, before the outlet 405*a* is completely closed, the rotation of the shutter portion 443 and the outlet opening/closing portion 408 is temporarily stopped. In this state, the conveyor 41 is driven, and the roasted coffee beans are removed from the periphery of the receiving portion 442. After that, the conveyor 41 is stopped, and the shutter portion 443 and the outlet opening/closing portion 408 are completely returned to the closed state. However, the roasted coffee beans are bitten in some cases, as shown in FIG. 47.

For example, if it is not confirmed that the shutter portion 443 and the outlet opening/closing portion 408 are returned to the closed state within a predetermined time, the processing unit 11*a* notifies the user of the occurrence of biting. Biting of the roasted coffee beans is often solved by making the outlet 405*a* slightly larger. Hence, the outlet 405*a* is made slightly larger by manually rotating the outlet forming portion 405 (tube portion 401) a little. However, in a state in which the canister 40 is attached to the attachment portion 44, the outlet forming portion 405 (tube portion 401) cannot manually be rotated because of the engagement between the projecting portion 4056 and the groove 441*a*.

Hence, as shown in the state ST23 of FIG. 40, the user manually slides the slider 409 to the second position. Accordingly, the projecting portion 4056 separates from the groove 441*a*, and the engagement between them is canceled. It is possible to manually rotate the outlet forming portion 405 (tube portion 401) and solve the biting. After that, the user manually returns the slider 409 to the first position and instructs resumption of the operation to the closed state from the operation unit 12. The processing unit 11*a* drives the motor 41*a* to completely return the shutter portion 443 and the outlet opening/closing portion 408 to the closed state.

<Receiving Portion and Collective Conveyance Path>

The storage apparatus 4 may include a receiving portion at a part different from the attachment portion 44, independently of the receiving portion 442 for each attachment portion 44. An example of the arrangement will be described with reference to FIG. 27 again.

Figure 27:
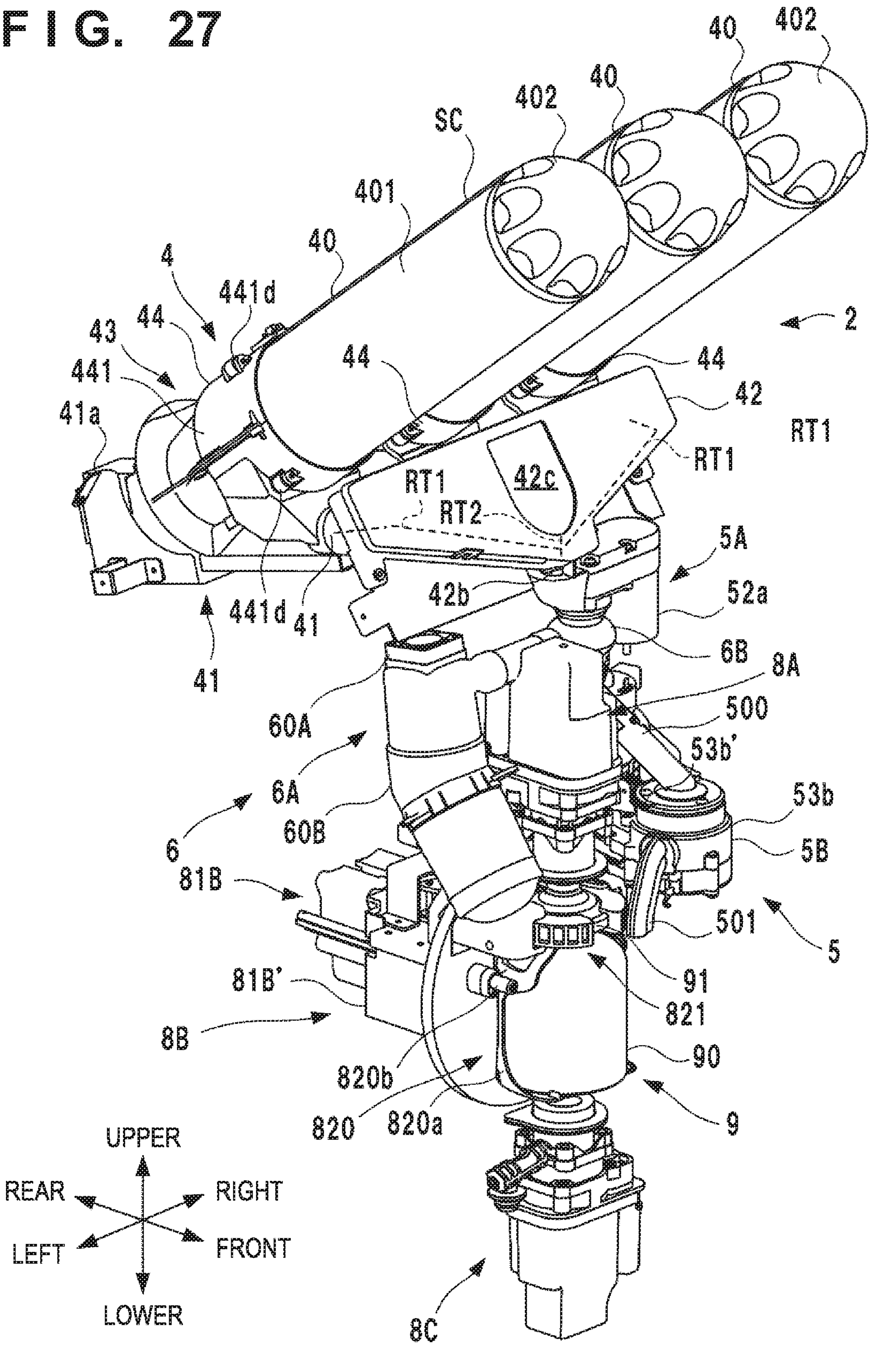
FIG. 27 is a perspective view showing other examples of the arrangements of the bean processing apparatus 2 and an extracting apparatus 3.
Figure 28:
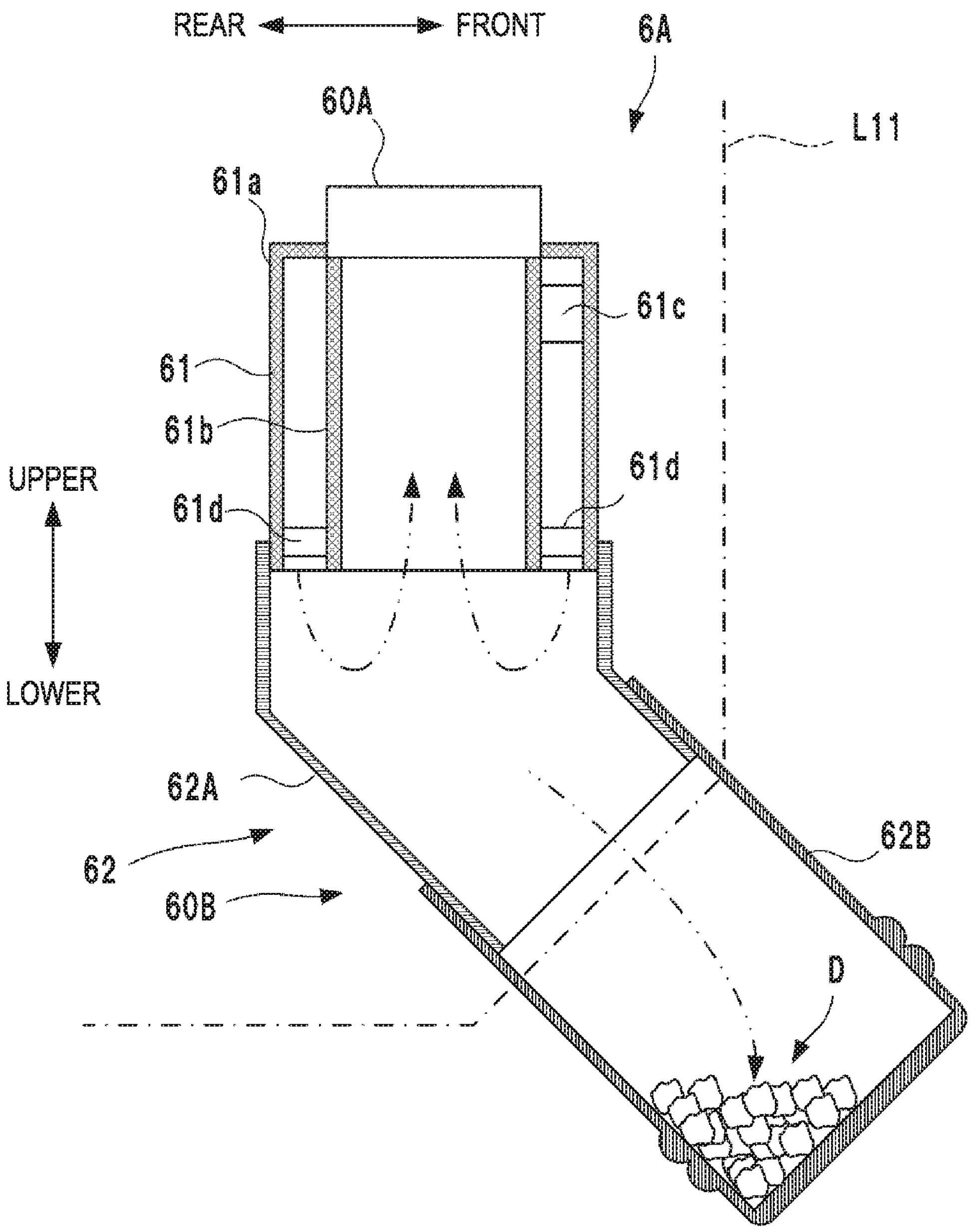
FIG. 28 is a sectional view of a suction unit.

In the example shown in FIG. 27, a receiving portion 42*c* different from the receiving portion 442 is provided. The receiving portion 42*c* is an opening portion formed in the wall portion of the collective conveyance path 42 on the front side. The user can input the roasted coffee beans from the receiving portion 42*c* into the collective conveyance path 42 manually or using a funnel-shaped tool. The inputted roasted coffee beans are supplied by the weight of their own from an outlet 42*b* to the grinding apparatus 5, and the coffee beverage can be produced.

The receiving portion 42*c* can be used to, for example, produce a coffee beverage using special roasted coffee beans that are not stored in the canister 40. A production processing program used to manufacture a cup of such special coffee beverage may be selectable or may be a production processing program that operates under production conditions set by the user.

As described above, in this embodiment, the receiving portion 442 that receives supply of roasted coffee beans from the canister 40 and the receiving portion 42*c* that individually receives supply of roasted coffee beans are provided. It is therefore possible to provide the beverage producing apparatus 1 capable of coping with individual needs by the receiving portion 42*c* while ensuring the mass productivity of the coffee beverage of the same type by the receiving portion 442.

In this embodiment, the path length of a supply path RT2 from the receiving portion 42*c* to the grinding apparatus 5 (particularly the coarse grinder 5A) is smaller than the path length of a supply path RT1 (see FIG. 34 as well, in addition to FIG. 27) from the receiving portion 442 to the grinding apparatus 5 (particularly the coarse grinder 5A). When the roasted coffee beans are input from the receiving portion 42*c*, they generally directly fall to the outlet 42*b* and are supplied to the grinding apparatus 5. This makes it possible to supply the total amount of inputted roasted coffee beans more reliably to the grinding apparatus 5 and suppress wasted beans or occurrence of a measurement error. The supply path RT2 is a path combined with a halfway point of the supply path RT1. The structure can be simplified as compared to an arrangement in which the paths are independently formed.

The conveyor 41 does not exist on the supply path RT2. Hence, the roasted coffee beans inputted from the receiving portion 42*c* are not automatically measured. For this reason, the user can freely measure and input the roasted coffee beans as much as he/she wants from the receiving portion 42*c*, thereby producing a coffee beverage. However, a mechanism that automatically measures the roasted coffee beans can be provided on the supply path RT2.

The collective conveyance path 42 according to this embodiment has a front wall tilting upward on the front side and is arranged in a tilting posture as a whole. When the collective conveyance path 42 is tilted, the receiving portion 42*c* readily receives the roasted coffee beans. In addition, the roasted coffee beans conveyed from the conveyor 41 can also be directed to the grinding apparatus 5.

Since the receiving portion 42*c* is an opening portion, the state of the conveyor 41 can also be visually inspected through the receiving portion 42*c*. That is, the receiving portion 42*c* can also be used as an inspection window.

Other examples of the collective conveyance path 42 and the receiving portion 42*c* will be described below.

Figure 48:
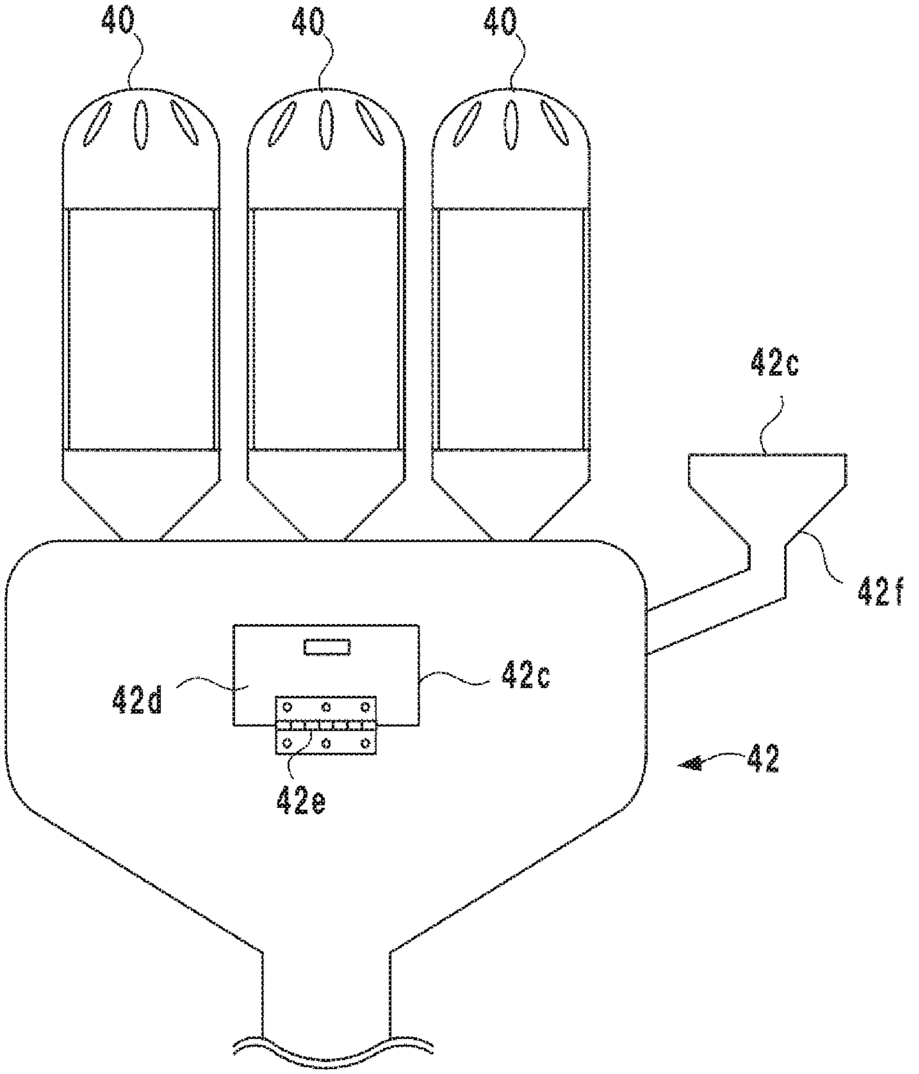

In the example shown in FIG. 48, two receiving portions 42*c* are provided. In this way, a plurality of receiving portions 42*c* may be provided. One receiving portion 42*c* is provided with a lid 42*d* configured to be opened/closed by a hinge 42*e*. When the receiving portion 42*c* is not used, the receiving portion 42 is closed by the lid 42*d*, thereby preventing a foreign substance from entering the collective conveyance path 42. The portion where the hinge 42*e* is provided can be any one of the upper side, lower side, reverse side and obverse side of the lid 42*d*. The other receiving portion 42*c* is formed by a hopper-shaped tube member 42*f*.

Figure 49:
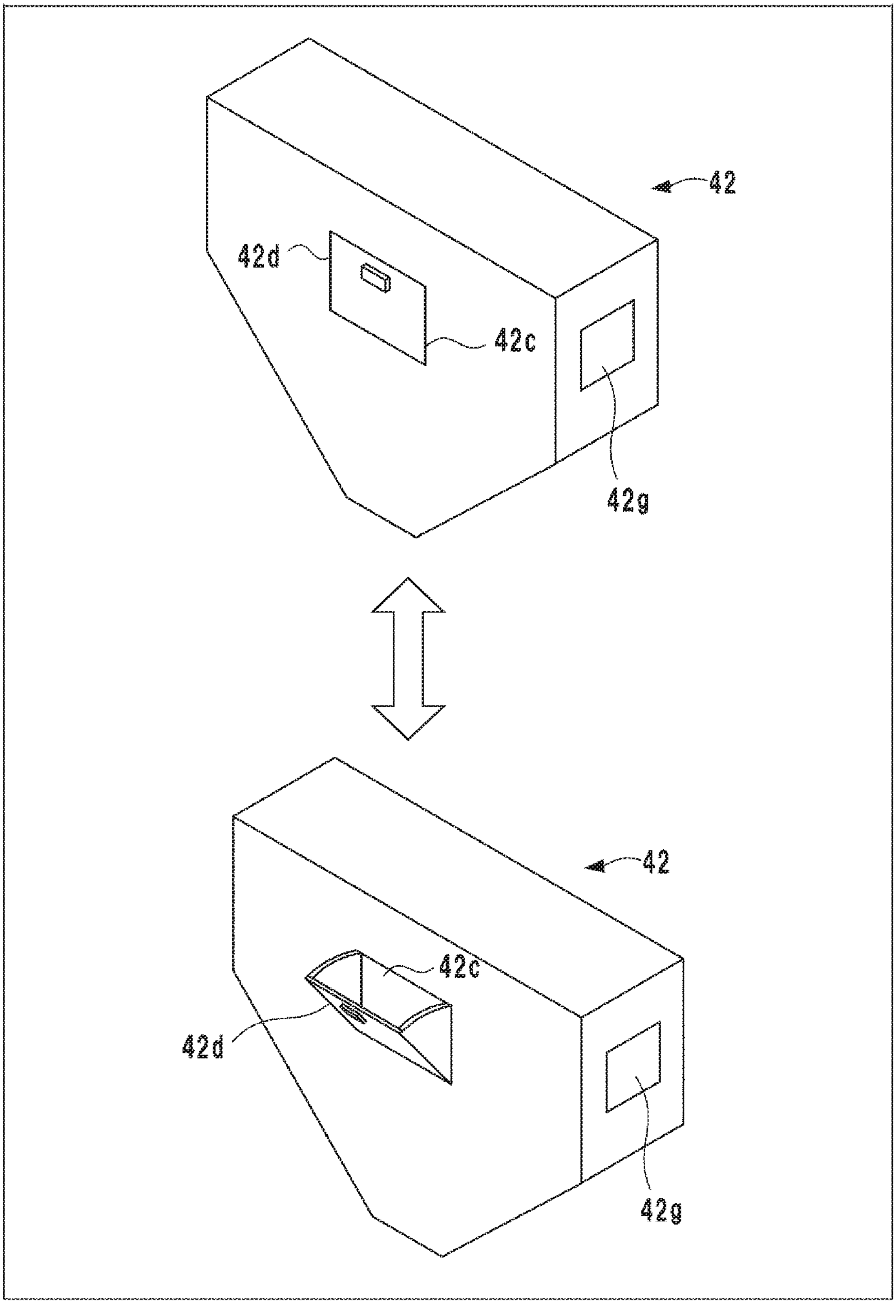

As shown in FIG. 49, the tube member 42*f* may be separable from the collective conveyance path 42. An opening portion 42*g* is a hole used to attach the tube member 42*f*. The opening portion 42*g* can also be used as an inspection hole used to visually inspect the interior of the collective conveyance path 42 or the conveyor 41. FIG. 49 also shows the lid 42*d* including wall portions on the left and right sides. Since the left and right wall portions are provided, when the lid 42*d* is opened to input the roasted coffee beans, the roasted coffee beans hardly spill out to the sides of the lid 42*d*. The user can visually recognize, via the receiving portion 42*c*, not only the state of the conveyor 41 but also the state of the roasted coffee beans received from the receiving portion 442, a state in which the roasted coffee beans received from the receiving portion 442 are sent into the machine, a state in which the roasted coffee beans are not sent although an operation of sending the roasted coffee beans received from the receiving portion 442 into the machine is performed or an operation of instructing sending is performed and the like. In addition, a state in which the roasted coffee beans received from the receiving portion 442 flow to the downstream side (for example, mill side) can visually be recognized. Furthermore, the user may be able to impede, via the receiving portion 42*c*, the flow of the roasted coffee beans received from the receiving portion 442 to downstream side (for example, mill side). Furthermore, the roasted coffee beans received from the receiving portion 42*c* may be made invisible from the receiving portion 442.

Figure 50:
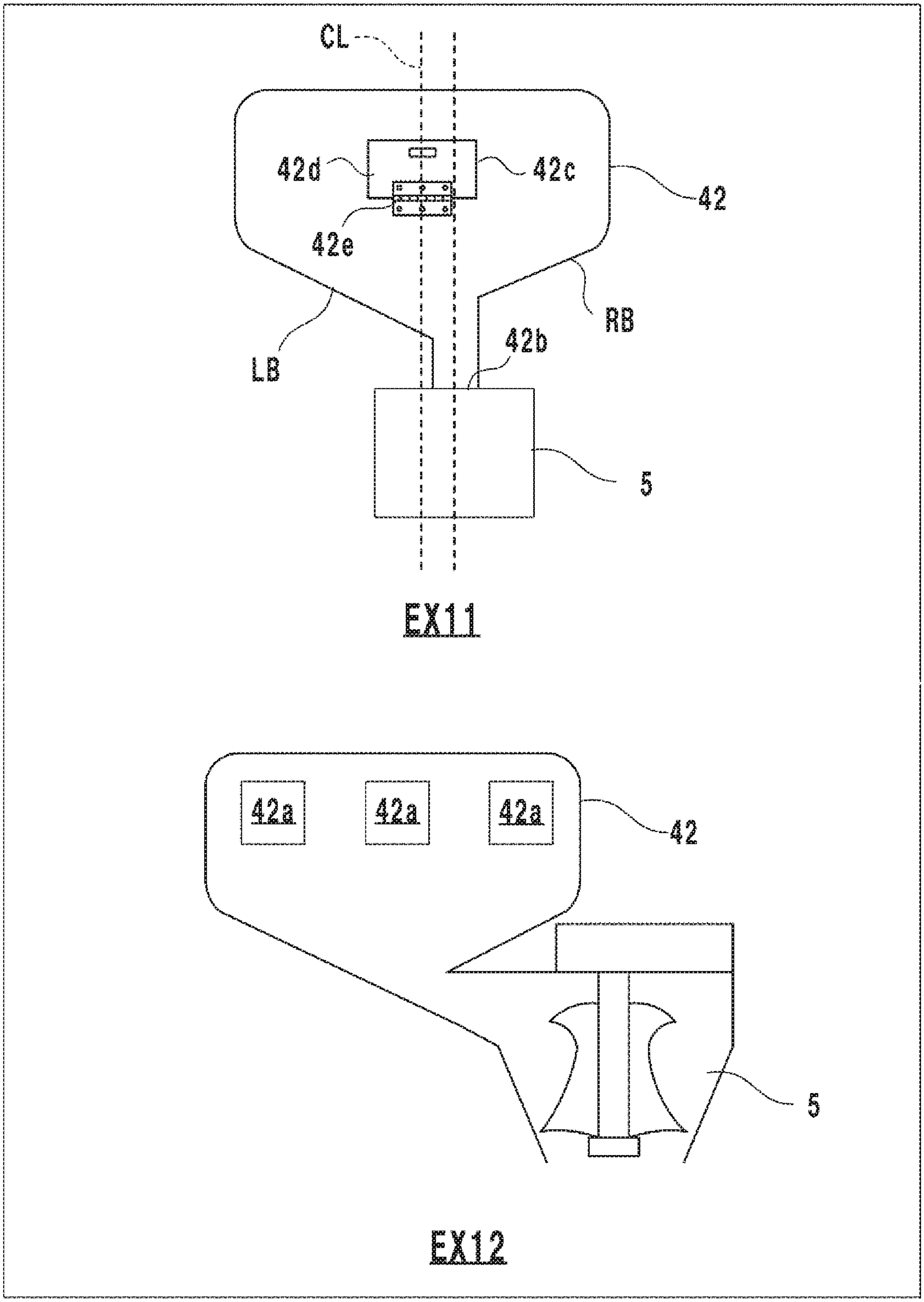

In an arrangement example EX11 shown in FIG. 50, the outlet 42*b* is located at a position shifted in the horizontal direction with respect to a center line CL of the width of the receiving portion 42*c* or the collective conveyance path 42 in the horizontal direction. In addition, the tilt changes between a bottom portion LB on the left side of the collective conveyance path 42 and a bottom portion RB on the right side. When the collective conveyance path 42 has the asymmetrical shape in the horizontal direction, it may be possible to suppress stay of the roasted coffee beans at a specific portion in the collective conveyance path 42.

An arrangement example EX12 shown in FIG. 50 shows an example in which the outlet 42*b* is connected to a side portion of the grinding apparatus 5 (particularly the coarse grinder 5A) to supply the roasted coffee beans. According to the arrangement of the grinder, the operation becomes smoother when the roasted coffee beans are supplied from a lateral side of the cutter than in a case in which the roasted coffee beans are supplied from above. The position of the outlet 42*b* can be not the bottom portion of the collective conveyance path 42 but the left or right side portion, the front portion and the rear portion.

Figure 51:
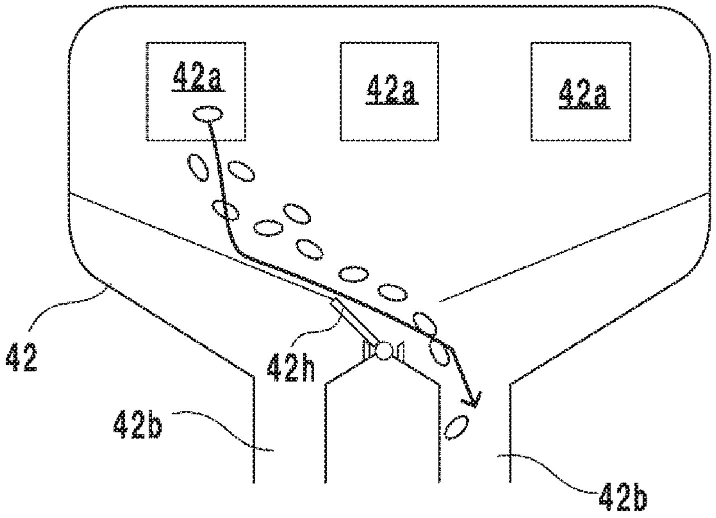

The example shown in FIG. 51 shows an example in which a plurality of outlets 42*b* are provided, and a distribution mechanism 42*h* that distributes the roasted coffee beans to one of the outlets 42*b* is provided in the collective conveyance path 42. In the example shown in FIG. 51, two outlets 42*b* are provided. For example, one is connected to the grinding apparatus 5, and the other is connected to a disposal box. For example, when discarding the roasted coffee beans remaining in the conveyor 41, the distribution mechanism 42*h* distributes the roasted coffee beans introduced into the collective conveyance path 42 to the outlet 42*b* on the disposal box side. In addition, the roasted coffee beans inputted via the receiving portion 42*c* (not shown in FIG. 51) are distributed to the outlet 42*b* on the side of the grinding apparatus 5.

Figure 52:
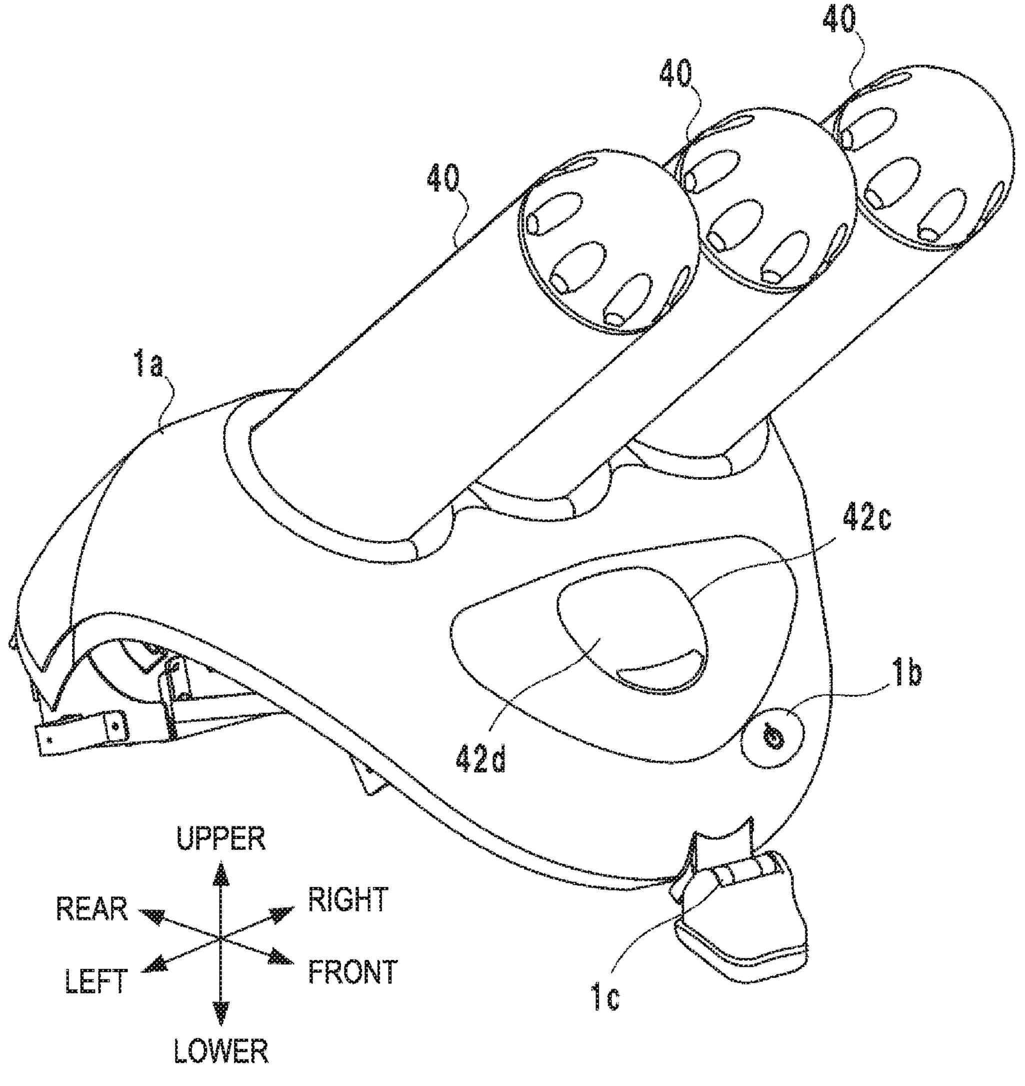
Figure 53:
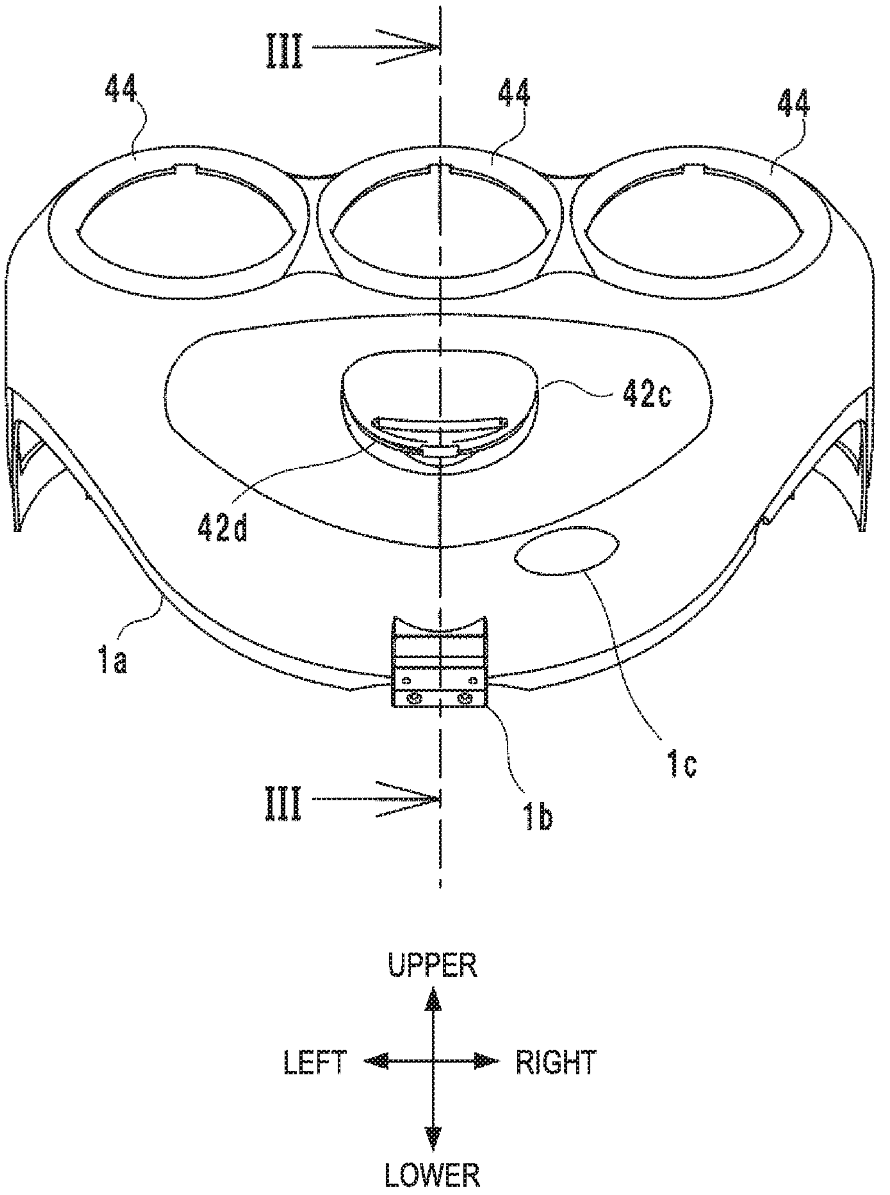
Figure 54:
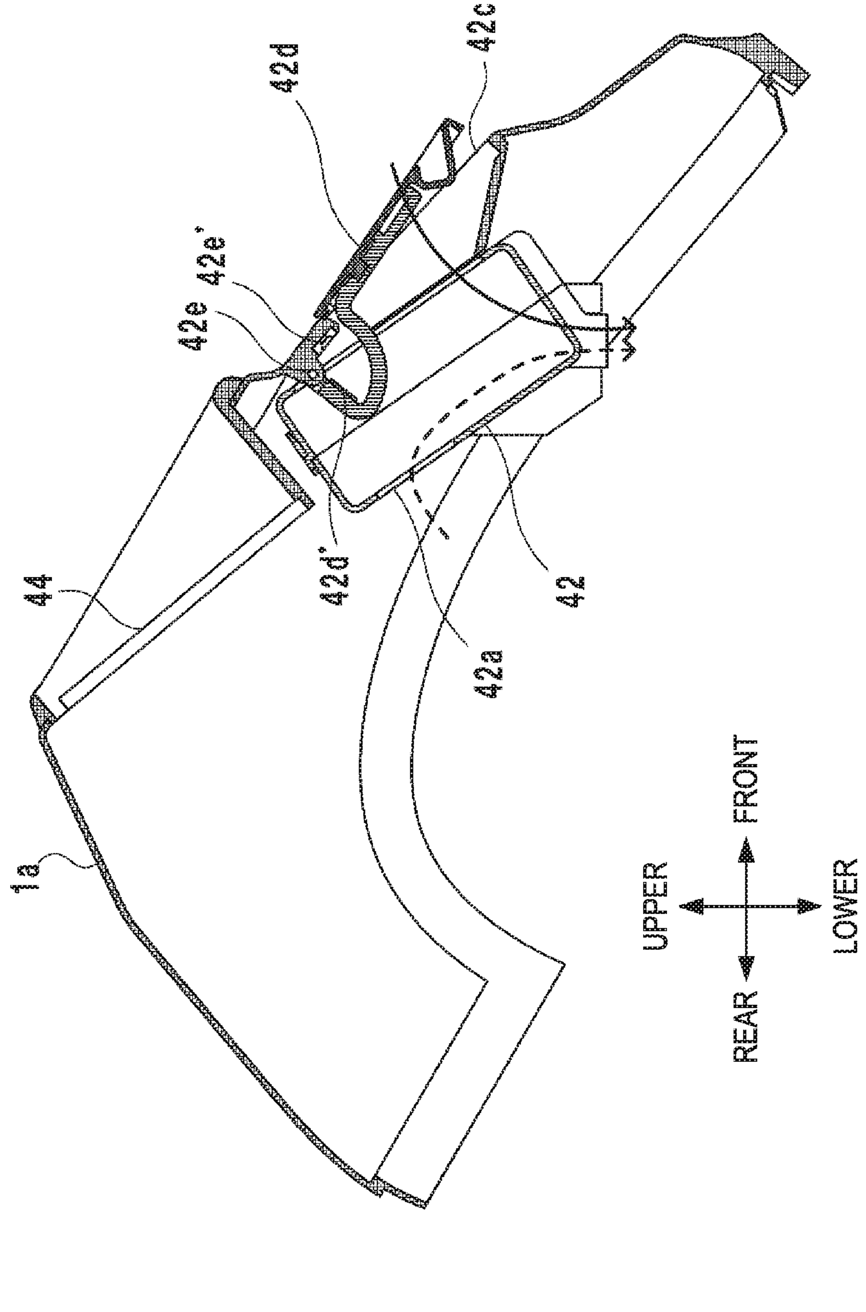

FIGS. 52 to 54 show an example of a housing 1*a* that covers the storage apparatus 4. The housing 1*a* forms the exterior of the beverage producing apparatus 1. FIG. 52 is a perspective view of the housing 1*a* in a state in which the canister 40 is attached. FIG. 53 is a front view of the housing 1*a*. FIG. 54 is a sectional view taken along a line III-III in FIG. 53

The housing 1*a* is configured to freely close/open with respect to a main body housing (not shown) by a hinge portion 1*c*. A case in which the housing 1*a* is in a closed state will be described below. In addition, a power switch 1*b* is disposed on the housing 1*a*.

The receiving portion 42*c* is formed in the housing 1*a*. The receiving portion 42*c* is opened/closed by the lid 42*d*. The outline of the opening of the receiving portion 42*c* is defined by the lid 42*d* on the upper side and the housing 1*a* on the lower side.

As shown in FIG. 54, the collective conveyance path 42 is disposed behind the receiving portion 42*c*, and the receiving portion 42*c* communicates with the collective conveyance path 42. When the lid 42*d* is opened, and the roasted coffee beans are inputted into the receiving portion 42*c*, the roasted coffee beans are guided to the collective conveyance path 42, as indicated by the solid arrow, and discharged from the collective conveyance path 42 to the grinding apparatus 5 (not shown in FIG. 54). The inner circumferential wall of the receiving portion 42*c* has a mortar shape tilting toward the front surface of the collective conveyance path 42, and the inputted roasted coffee beans are smoothly guided to the collective conveyance path 42.

An inlet 42*a* of the collective conveyance path 42 is formed in the rear wall of the collective conveyance path 42. The roasted coffee beans conveyed from the canister 40 via the conveyor 41 (not shown) are introduced into the collective conveyance path 42, as indicated by the broken arrow, and discharged to the grinding apparatus 5 (not shown in FIG. 54). When the lid 42*d* is opened, the internal conveyor 41 (not shown) can visually be recognized via the receiving portion 42*c* and inspected.

A magnet 42*e*' is arranged near the hinge 42*e*. The lid 42*d* includes a metal plate 42*d*' at a portion that abuts against the magnet 42*e*' upon opening. The magnet 42*e*' attracts the metal plate 42*d*', thereby easily maintaining the open state of the lid 42*d*. In addition, concave portions are formed at the distal end of the lid 42*d*. Hence, the user can easily place fingers on the concave portions and easily operate the lid 42*d*.

Fourth Embodiment

An example of the arrangement of a housing that forms the exterior of a beverage producing apparatus 1 will be described.

<Housing Arrangement Example 1>

Figure 55:
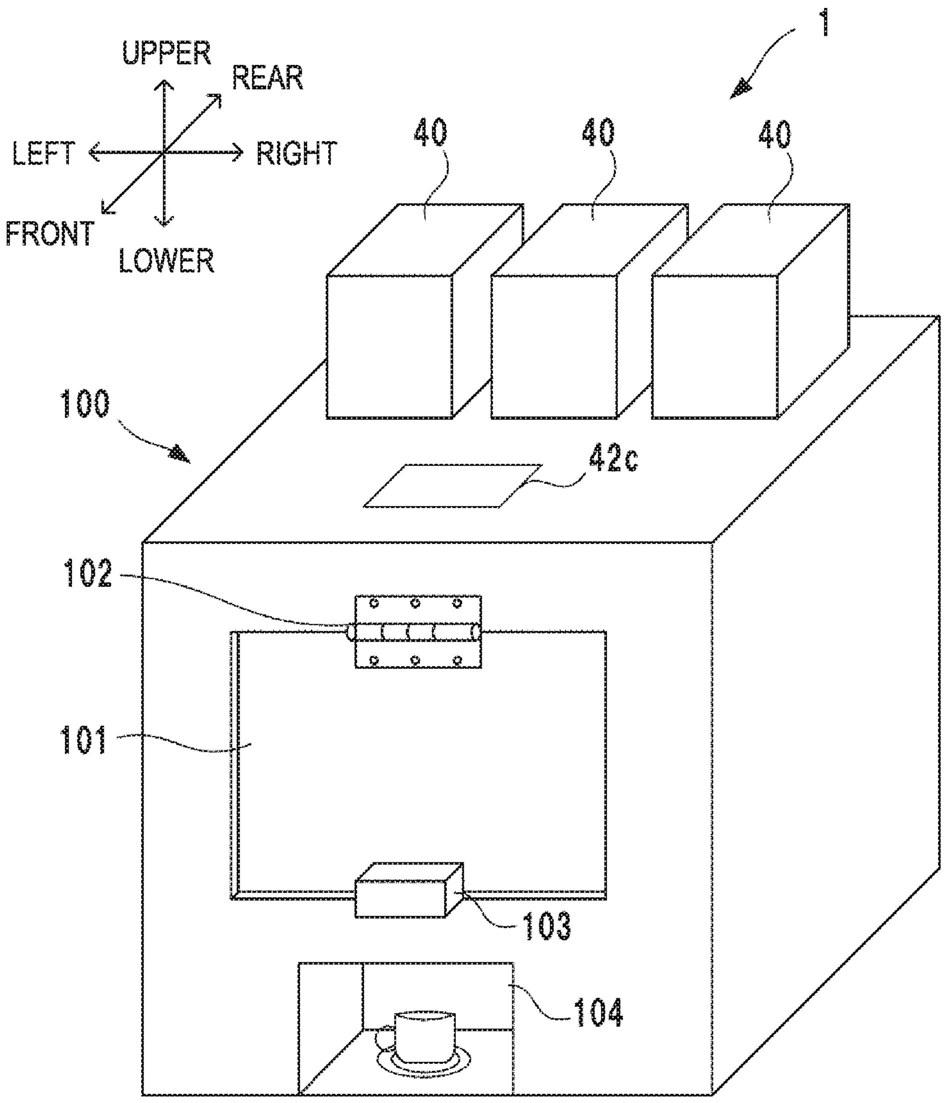
FIG. 55 is a view showing an example of the arrangement of a housing.

FIG. 55 is a perspective view schematically showing the beverage producing apparatus 1 whose internal mechanism is enclosed in a housing 100. The housing 100 has a rectangular parallelepiped shape including a front wall, a rear wall, an upper wall and left and right side walls. On the upper wall, canisters 40 are arranged, and a receiving portion 42*c* is arranged. An extraction outlet 104 is formed in the lower portion of the front wall, and a coffee beverage is poured into a cup placed here.

A transmissive portion 101 through which the interior of the housing 100 is visible from the outside is formed in the front wall. When the transmissive portion 101 is provided, the internal mechanism can visually be recognized from the front side of the beverage producing apparatus 1, and the operation can easily be confirmed. Additionally, the buyer of a coffee beverage or the like can observe the process of coffee beverage production. In the housing 100, portions other than the transmissive portion 101 are basically non-transmissive portions. However, other transmissive portions may be included.

The transmissive portion 101 can be formed by a through hole or a transparent member. When the transmissive portion 101 is formed by a transparent member such as glass or an acrylic resin, leakage of steam or the like in the housing 100 to the outside can be suppressed. The transparent member may be colorless transparent or color transparent. A steam path that sends steam to the outside of the housing 100 may be provided. The steam path may be formed from, for example, a steam inlet provided at a predetermined location in the housing 100, a steam outlet in the rear surface portion of the beverage producing apparatus 1, a steam tube that connects the steam inlet and the steam outlet and a steam sending fan that sends air or steam in the steam path at or near the stem outlet to the outside of the beverage producing apparatus 1. The steam inlet may be provided at one position or each of a plurality of positions near the inlet of a grinder 5A, near the outlet of the grinder 5A, near the inlet of a grinder 5B, near the outlet of the grinder 5B, near an opening 90*a* of an extraction container 9 located at the bean inputting position, near the opening 90*a* of the extraction container 9 located at the bean inputting position and the like. When the transmissive portion 101 is formed by a transparent member, and a steam release portion formed by providing a hole or a notch to release steam in the transmissive portion 101 or providing a hole, a notch, a gap or the like in the housing is mounted, the steam release portion may have a positional relationship in which the extraction container 9 located at the bean inputting position is closer than the steam inlet, the steam release portion may have a positional relationship in which the extraction container 9 located at the extraction position is closer than the steam inlet, the steam release portion may have a positional relationship in which the grinder (for example, at least one of the grinders 5A and 5B) is closer than the steam inlet, the steam release portion may have a positional relationship in which the extraction container 9 located at the bean inputting position is farther than the steam inlet, the steam release portion may have a positional relationship in which the extraction container 9 located at the extraction position is farther than the steam inlet, or the steam release portion may have a positional relationship in which the grinder (for example, at least one of the grinders 5A and 5B) is farther than the steam inlet.

Figure 56:
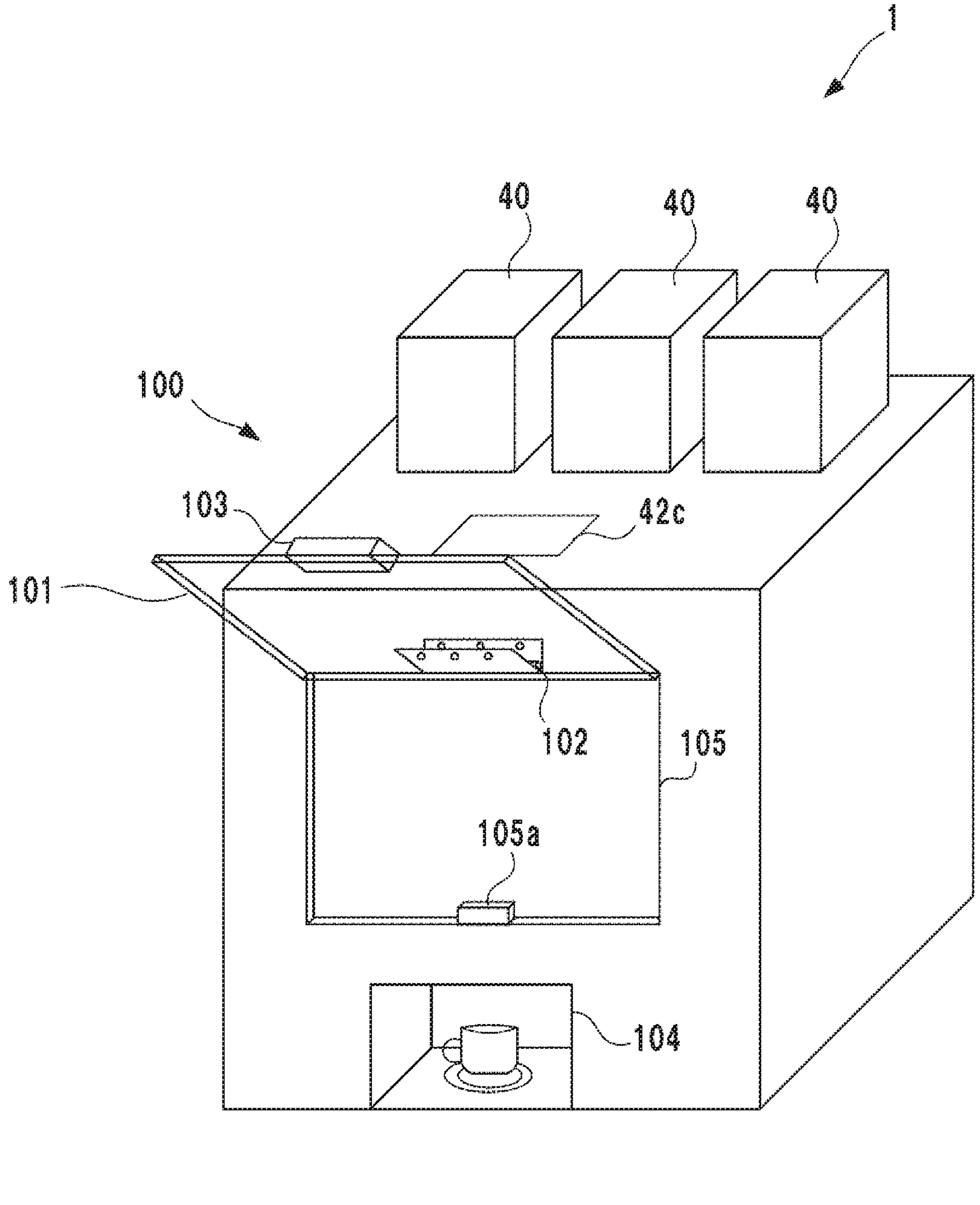
FIG. 56 is an explanatory view of the operation of the housing shown in FIG. 55.

In this embodiment, the transmissive portion 101 is formed by a plate-shaped transparent member and configured to be opened/closed by a hinge 102. Accordingly, when the transmissive portion 101 is opened, access to the internal mechanism is possible, and maintenance can also be performed. FIG. 56 shows a state in which the transmissive portion 101 is open.

A handle 103 is provided at the lower portion of the transmissive portion 101. The user can easily open/close the transmissive portion 101 by gripping the handle 103. A stopper 105*a* that restricts the pivot range of the transmissive portion 101 is provided at a position corresponding to the handle 103 on the lower edge of an opening portion 105 opened/closed by the transmissive portion 101.

In this embodiment, the opening direction of the transmissive portion 101 is the upward direction. However, the hinge 102 may be arranged at the lower portion of the transmissive portion 101 to change the opening direction to the downward direction. Alternatively, the opening/closing direction of the transmissive portion 101 may be not the vertical direction but the horizontal direction. In addition, a mechanism configured to maintain the open state of the transmissive portion 101 may be provided. Such a mechanism may be provided in, for example, the hinge 102. The transmissive portion 101 may be provided in a side wall or the upper wall as well.

<Housing Arrangement Example 2>

Figure 57:
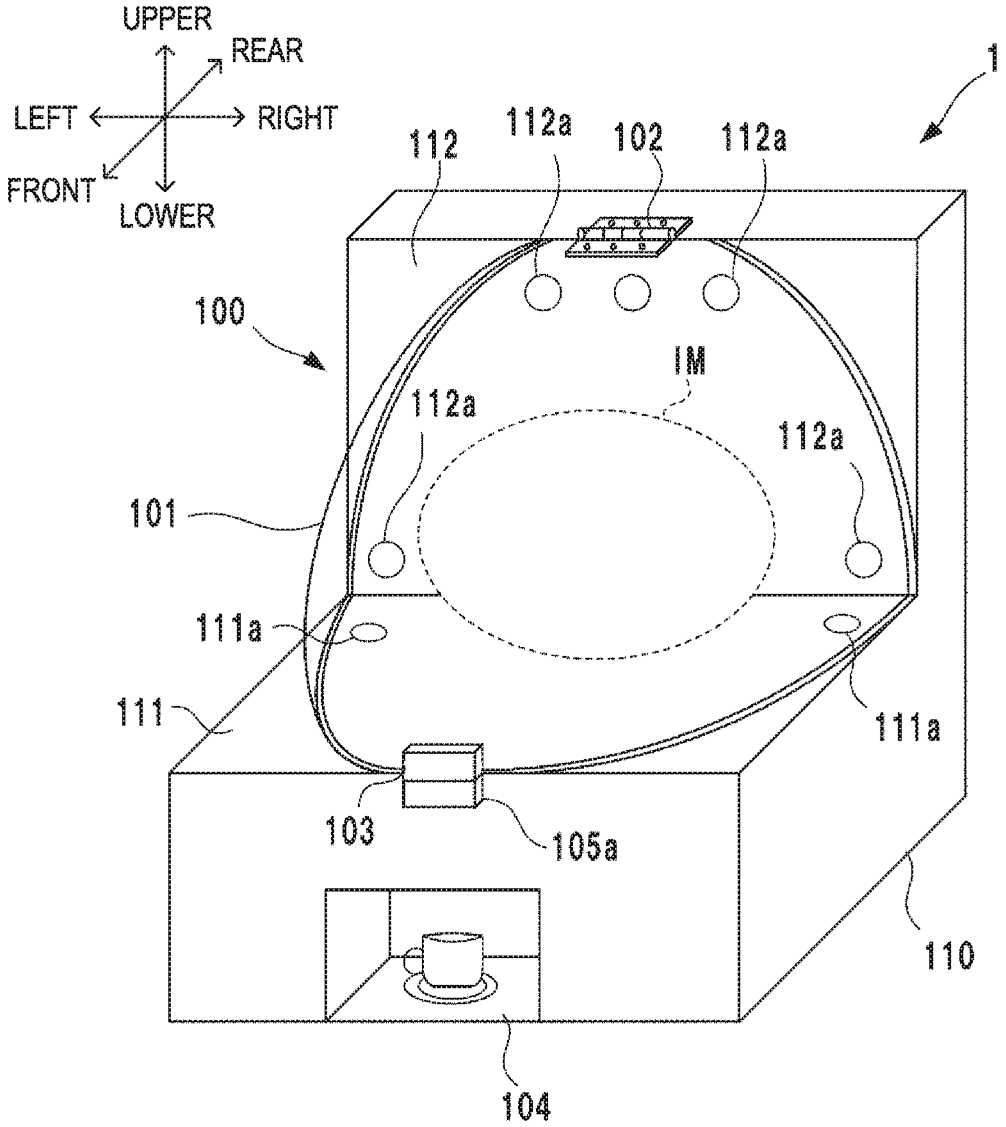
FIG. 57 is a view showing another example of the arrangement of the housing.

Another example of the arrangement of the housing 100 will be described. FIG. 57 is a perspective view schematically showing the beverage producing apparatus 1 whose internal mechanism is enclosed in the housing 100 according to the other arrangement example. As for the housing 100 according to Arrangement Example 2, the same components as in the housing 100 shown in FIGS. 55 and 56 or components having common functions are denoted by the same reference numerals as in the housing 100 shown in FIGS. 55 and 56, and a description thereof will be omitted. Different components will mainly be described.

The housing 100 includes an L-shaped main body 110 and the transmissive portion 101 that encloses an internal mechanism IM arranged on a stage 111 of the main body 110. The transmissive portion 101 is formed by a shell-shaped transparent member, and its surface forms a curved surface from the front side to the rear side. The transmissive portion 101 is extended to the front side, the left and right lateral sides and the upper side of the internal mechanism IM, and the internal mechanism IM can visually be recognized from the front side, the lateral sides and the upper side of the beverage producing apparatus 1.

The transmissive portion 101 is sometimes fogged up by the heat or steam in the internal mechanism IM. To prevent this, ventilation portions 112*a* are formed in a backboard 112 at portions inside the transmissive portion 101. The ventilation portions 112*a* may be holes communicating with the outer air or ducts. In this embodiment, the plurality of ventilation portions 112*a* are provided at the upper and lower portions. As for the arrangement, however, an arrangement other than the illustrated form can also be employed.

The upper surface of the stage 111 sometimes becomes wet due to steam or water leakage from the internal mechanism IM. To prevent this, drain portions 111*a* are provided in the stage 111. A pipe connected to a waste tank (not shown) is connected to the drain portions 111*a*.

In Arrangement Example 2 as well, the transmissive portion 101 is configured to be freely opened/closed by the hinge 102, as in above-described Arrangement Example 1. Accordingly, when the transmissive portion 101 is opened, access to the internal mechanism IM is possible, and maintenance can also be performed. The handle 103 is provided at the lower portion of the transmissive portion 101. The user can easily open/close the transmissive portion 101 by gripping the handle 103. The stopper 105*a* that abuts against the handle 103 is provided at a position corresponding to the handle 103 at the front end of the stage 111. A metal plate attracted by a magnetic force and a magnet may be provided on the handle 103 and the stopper 105*a*, respectively.

Figure 58:
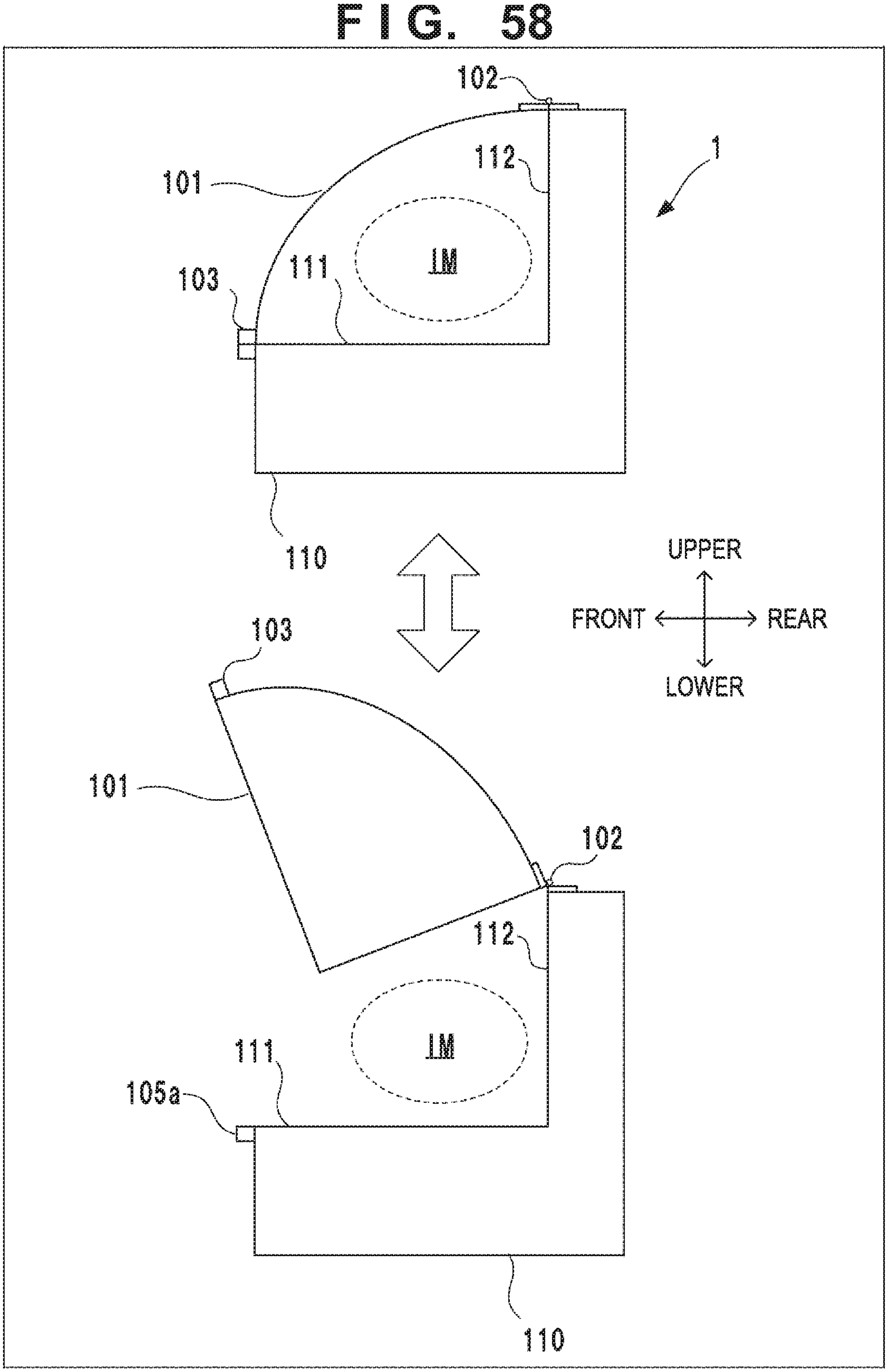
FIG. 58 is an explanatory view of the operation of the housing shown in FIG. 57.

FIG. 58 shows the open and closed states of the transmissive portion 101. In the closed state shown on the upper side of FIG. 58, the beverage producing apparatus 1 can be seen from one lateral side to the other lateral side through the transmissive portion 101 except the portion of the internal mechanism IM. In Arrangement Example 2, the hinge 102 is arranged on the rear side at the upper portion of the transmissive portion 101, and the opening direction of the transmissive portion 101 is the upward direction. However, the hinge 102 may be arranged at the lower portion of the transmissive portion 101 to change the opening direction to the front direction. Alternatively, the opening/closing direction of the transmissive portion 101 may be not the vertical direction but the horizontal direction. In addition, a mechanism configured to maintain the open state of the transmissive portion 101 may be provided. Such a mechanism may be provided in, for example, the hinge 102. A sensor that detects the opening/closing of the transmissive portion 101 may be provided. When the opening operation of the transmissive portion 101 is detected, control to stop the coffee beverage producing operation may be performed. In addition, a lock mechanism that restricts opening/closing of the transmissive portion 101 may be provided. During the coffee beverage producing operation, the lock mechanism may be operated to do control to inhibit opening of the transmissive portion 101.

<Mechanism Enclosed in Housing and Visible Mechanism>

Mechanisms enclosed in the housing 100 shown in Arrangement Example 1 or Arrangement Example 2 may include all or some mechanisms of a bean processing apparatus 2 and an extracting apparatus 3. As in Arrangement Example 1, at least a portion of the canister 40 may be located outside the housing 100. The extraction outlet 104 may be located outside the housing 100 or may be located inside. Ground beans sent from the grinder 5A may be invisible from the outside of the housing 100 via the transmissive portion 101, and ground beans sent from the grinder 5B may be visible from the outside of the housing 100 via the transmissive portion 101.

Internal mechanisms visible from the outside via the transmissive portion 101 can include all or some mechanisms of a storage apparatus 4, a grinding apparatus 5 and the extracting apparatus 3. Mechanisms adjacent in the longitudinal direction may be arranged while being shifted to the left and right sides such that as many mechanisms as possible are visible from the front side of the beverage producing apparatus 1 via the transmissive portion 101.

More about the grinding apparatus 5, the internal mechanisms can include all or some mechanisms of a separation apparatus 6.

In the separation apparatus 6, particularly, if all or some parts of a collection container 62B can visually be recognized from the outside via the transmissive portion 101, an unwanted substance in the collection container 62B can visually be recognized from the outside of the housing 100. A state in which the unwanted substance in the collection container 62B is swirled by a wind from a blower unit 60A can also visually be recognized from the outside of the housing 100 via the transmissive portion 101. In the arrangement example shown in FIG. 28, it may be possible to visually recognize only portions on the front side of a broken line L11 from the outside of the housing 100 via the transmissive portion 101.

Additionally, more about the grinding apparatus 5, it may be possible to visually recognize all or some parts of the coarse grinder 5A or the fine grinder 5B from the outside of the housing 100 via the transmissive portion 101.

More about the extracting apparatus 3, it may be possible to visually recognize all or some parts of the extraction container 9 from the outside of the housing 100 via the transmissive portion 101. It may be possible to visually recognize all or some operations such as a change in the posture of the extraction container 9 caused by an inverting operation of the extraction container 9 and the horizontal movement of the extraction container 9 (container main body 90) in the longitudinal direction from the outside of the housing 100 via the transmissive portion 101. It may be possible or impossible to visually recognize opening/closing of a first plug member (for example, 913) in the extraction container 9 from the outside of the housing 100 via the transmissive portion 101. It may be possible or impossible to visually recognize opening/closing of a second plug member (for example, 903) in the extraction container 9 from the outside of the housing 100 via the transmissive portion 101. It may be possible or impossible to visually recognize opening/closing of a lid unit (for example, 91) in the extraction container 9 from the outside of the housing 100 via the transmissive portion 101.

Fifth Embodiment

An example of information management of roasted coffee beans will be described.

<Tag>

Figure 59:
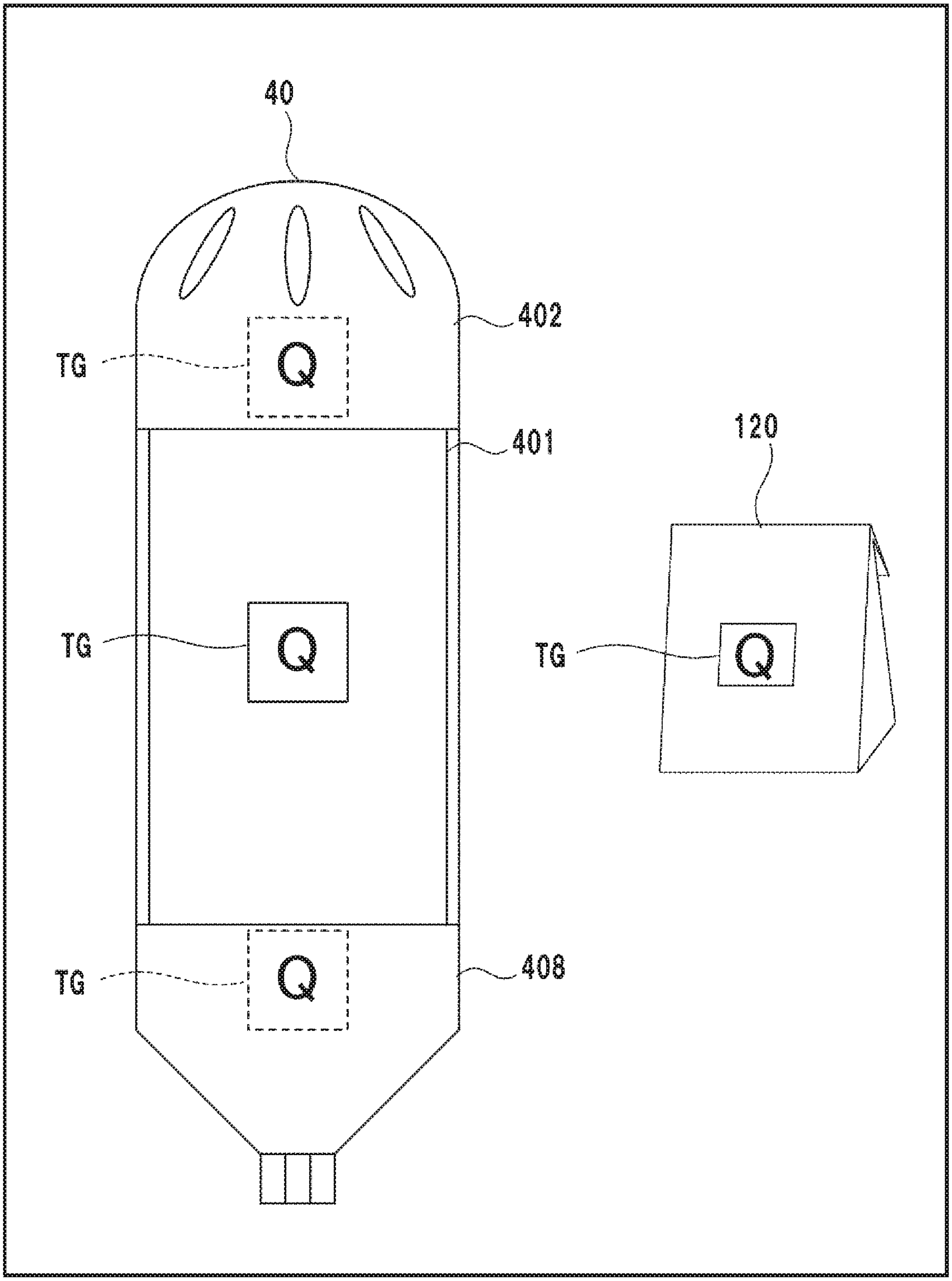
FIG. 59 is a view showing examples of a canister and a storage bag to which a tag is added.

When storing roasted coffee beans of different types in a plurality of canisters 40, it is necessary to manage to which attachment portion 44 the canister 40 of a certain kind of roasted coffee beans is attached. As a method, a tag that holds information concerning the type of stored roasted coffee beans may be provided on the canister 40. FIG. 59 shows an example.

A tag TG is provided on a tube portion 401 of the canister 40 shown in FIG. 59. The tag TG is, for example, an RFID tag or a tag with a bar code. The tag TG may be affixed to the tube portion 401 by an adhesive. The portion where the tag TG is provided is not limited to the tube portion 401, and may be a lid portion 402 or an outlet opening/closing portion 408, as indicated by broken lines. The tag TG may be provided at a plurality of portions of the canister 40. In addition, the tag TG may be provided on a storage bag 120 storing roasted coffee beans before they are stored in the canister 40.

A beverage producing apparatus 1 may include a reader that reads the information of the tag TG, and may be configured to allow a processing unit 11*a* to acquire the read information. The reader may be provided for each attachment portion 44. In this case, the correspondence relationship between the canister 40 and the attachment portion 44 (the correspondence relationship between the type of roasted coffee beans and the attachment portion 44) can be specified from the correspondence relationship between the reader that has read information and the attachment portion 44.

Reading of the tag TG may be performed by a portable terminal, and the processing unit 11*a* may acquire the read information from the portable terminal by wireless communication.

Information concerning the type of stored roasted coffee beans may include information of the origin, the degree of roasting, the roasting date, the roaster, and the taste, flavor, and the like of a resultant coffee beverage. In addition, the tag TG may include information concerning producing conditions (recipe) to produce a coffee beverage from the stored roasted coffee beans. The processing unit 11*a* may control production of the coffee beverage from the roasted coffee beans in accordance with the production information read from the tag TG. The production information may include a hot water temperature, a pressure at the time of extraction, an extraction time, and the like.

<Stocker>

Figure 60:
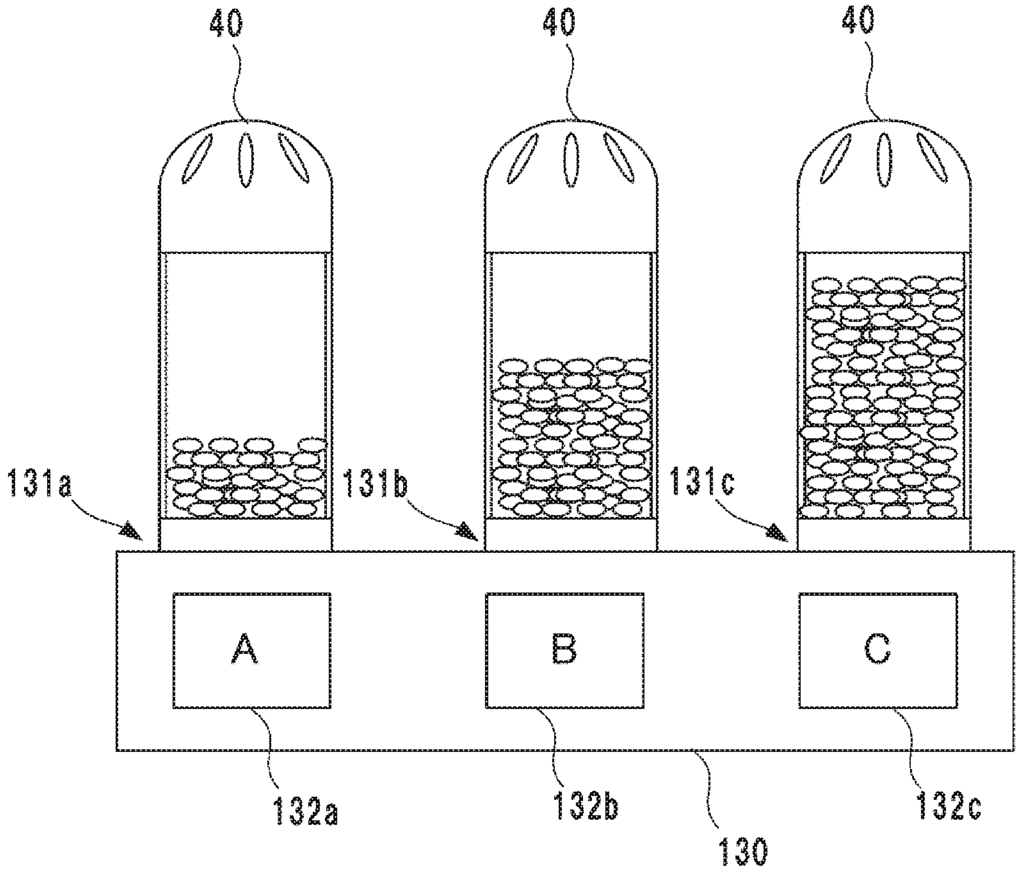
FIG. 60 is a schematic view of a stocker.

As an accessory of the beverage producing apparatus 1, a stocker that keeps the canister 40 that is not used will be described. FIG. 60 is a schematic view of a stocker 130 as an example.

Figure 61:
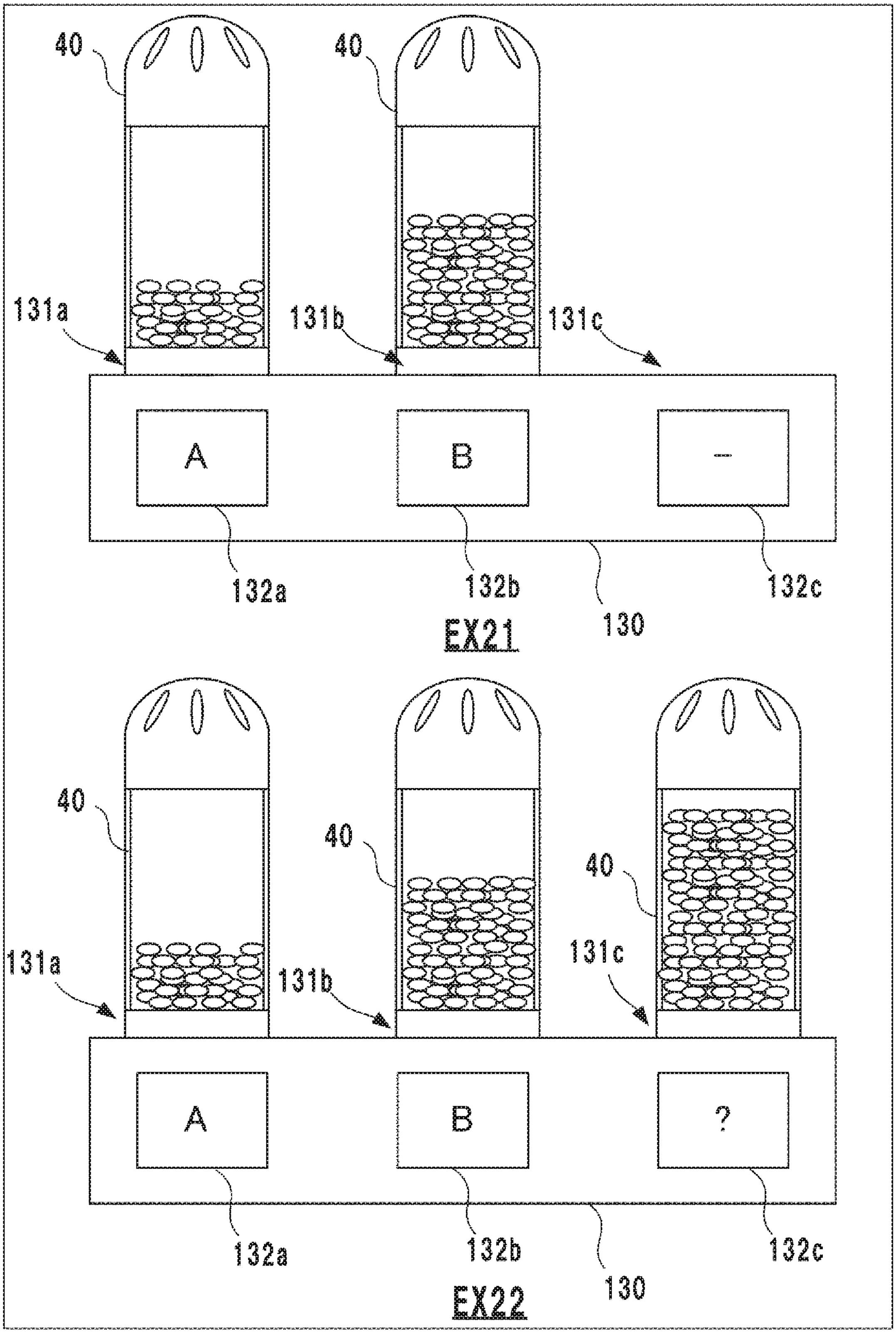
FIG. 61 is a view showing an example of display on the stocker.

A stocker 130 includes a plurality of attachment portions 131*a* to 131*c* (to be generically referred to as an attachment portion 131) to which the canisters 40 are attached. In the example shown in FIG. 61, three attachment portions 131*a* to 131*c* are provided, and the canisters 40 not in use are attached. The stocker 130 includes display portions 132*a* to 132*c* (to be generically referred to as a display portion 132 hereinafter) corresponding to the attachment portions 131. The display portion 132*a* corresponds to the attachment portion 131*a*, and the display portion 132*b* corresponds to the attachment portion 131*b*. In addition, the display portion 132*c* corresponds to the attachment portion 131*c*. The display portion 132 is, for example, a liquid crystal display.

The display portion 132 displays the information of roasted coffee beans stored in the canister 40 attached to the corresponding attachment portion 131. In the example shown in FIG. 61, the type of roasted coffee beans is displayed. For example, the display portion 132*a* on the left side shows that roasted coffee beans of type "A" are stored in the canister 40 attached to the corresponding attachment portion 131*a*. The information displayed on the display portion 132 may be acquired from the above-described tag TG. Each attachment portion 131 may include a reader configured to read the tag TG.

If the canister 40 is not attached to the attachment portion 131, information representing non-attachment may be displayed on the corresponding display portion 132. In EX21 of FIG. 61, the canister 40 is not attached to the attachment portion 131*c*, and a symbol representing non-attachment is displayed on the display portion 132*c*. Note that each attachment portion 131 may be provided with a sensor configured to detect the attachment of the canister 40.

If the information of roasted coffee beans stored in the canister 40 is unregistered, information representing non-registration may be displayed on the corresponding display portion 132. An example is a case in which no information is stored in the tag TG. In EX22 of FIG. 61, although the canister 40 is attached to the attachment portion 131*c*, the information of roasted coffee beans is not registered, and a symbol representing non-registration is displayed on the display portion 132*c*. When such display is performed, the user can be promoted to register the information.

The stocker 130 may include a writer configured to write information in the tag TG. If the empty canister 40 (or the canister 40 refilled with new beans) is attached to the stocker 130, the information of roasted coffee beans stored in the canister 40 can be stored from the writer to the tag TG. This obviates the necessity of always associating the roasted coffee beans and the canister 40 in a one-to-one correspondence. As an information registration method, for example, information may be transmitted from a portable terminal to the stocker 130. As another method, the tag TG on the storage bag 120 (FIG. 59) of roasted coffee beans may be read by a reader attached to the stocker 130 and registered.

Sixth Embodiment

A beverage producing apparatus 1 can be used as a beverage providing apparatus for business use, which is installed in a store or a facility. In this embodiment, an example of a user interface in a case in which an operation unit 12 is a touch panel having an image display function will be described. A user interface corresponding to a person (for example, a customer) who receives providing of a coffee beverage or a provider (a clerk or a barista) as a user will be described here.

If the target is a person who receives providing of a coffee beverage, the operation unit 12 may be a terminal that is arranged on, for example, each table in a restaurant and is usable by a customer at the table. If the target is a provider, the operation unit 12 may be installed in a management room of a store. A control apparatus 11 performs display control of the display device (for example, a liquid crystal display device) of the operation unit 12, and operation control of a bean processing apparatus 2 and an extracting apparatus 3 corresponding to an instruction to the operation unit 12.

Figure 62:
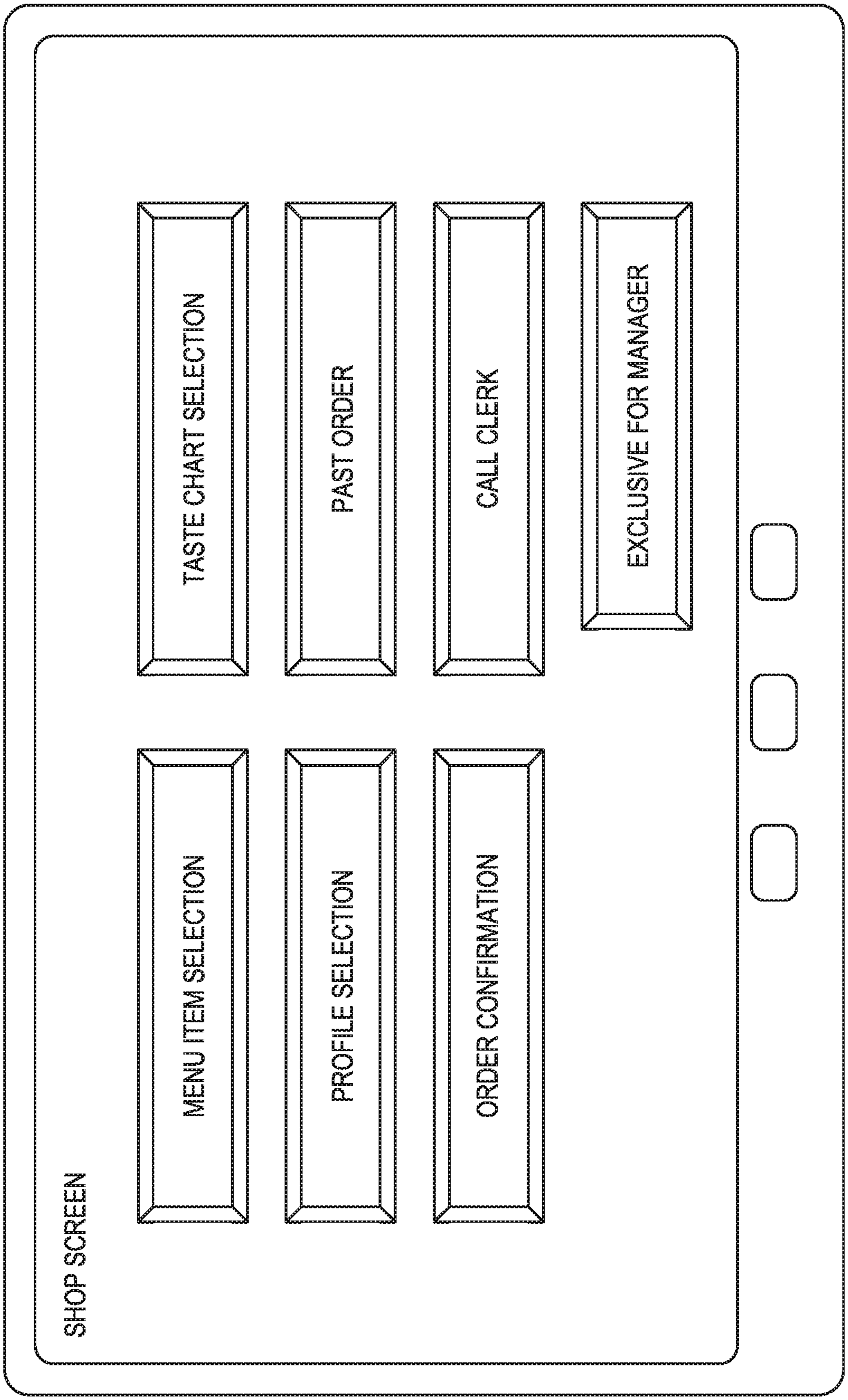
FIG. 62 is a view showing an example of display on an operation unit.

FIG. 62 shows an example of an initial screen (SHOP screen) displayed on the operation unit 12. On the initial screen, icons of "menu item selection", "profile selection", "order confirmation", "taste chart selection", "past orders", "call clerk", and "exclusive for manager" are displayed. If the user selects one of the icons, the display screen transitions. In this embodiment, an icon functioning as a function button is displayed in a three-dimensional button shape with a name on the front surface.

"Menu item selection" is a function button suitable for the user to mainly select a coffee beverage from types of roasted coffee beans. "Menu item" basically corresponds to a type of roasted coffee beans. In this embodiment, "menu item" as control information is a combination of a type of roasted coffee beans and an extraction profile to be described later. "Profile selection" is a function button suitable for the user to mainly select a coffee beverage from types of coffee beverage producing conditions (characteristics concerning a producing operation).

"Order confirmation" is a function button used to confirm a currently accepted order of a coffee beverage. "Taste chart selection" is a coffee beverage selection method using a taste chart to be described later, and is a function button suitable for the user to mainly select a coffee beverage from a plurality of types of characteristics such as a taste and an aroma, which characterize roasted coffee beans. "Past order" is a function button suitable to select a coffee beverage by referring to orders made in the past. "Call clerk" is a function button used to call a person in charge of service providing. "Exclusive for manager" is a function button used to perform an operation that a specific person is permitted to do.

<Menu Item Selection>

Figure 63:
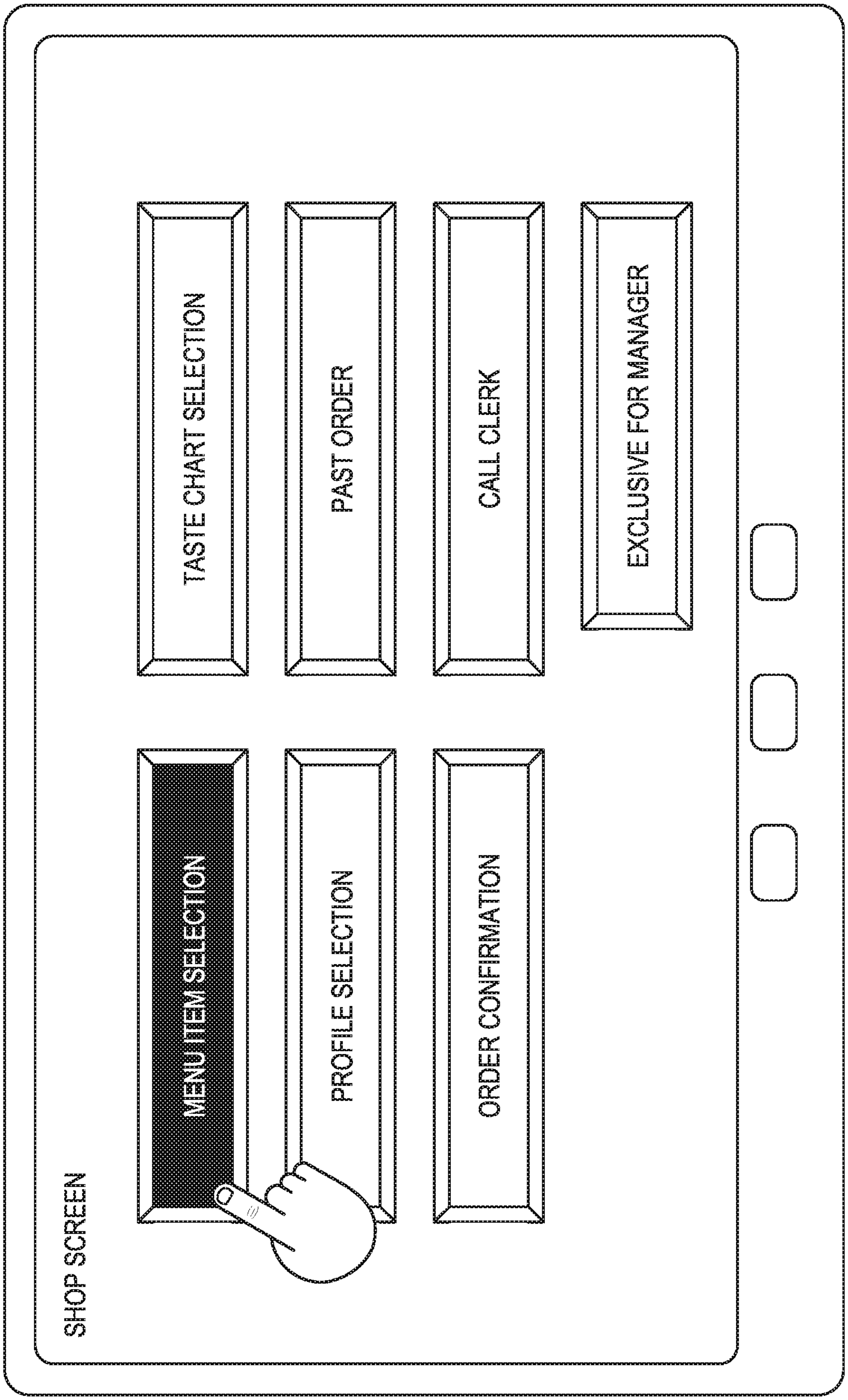
FIG. 63 is a view showing an example of display on an operation unit.

FIG. 63 exemplarily shows a case in which "menu item selection" is selected by the user. In this embodiment, the selected function button is indicated by white/black reverse display, as shown in FIG. 63.

Figure 64:
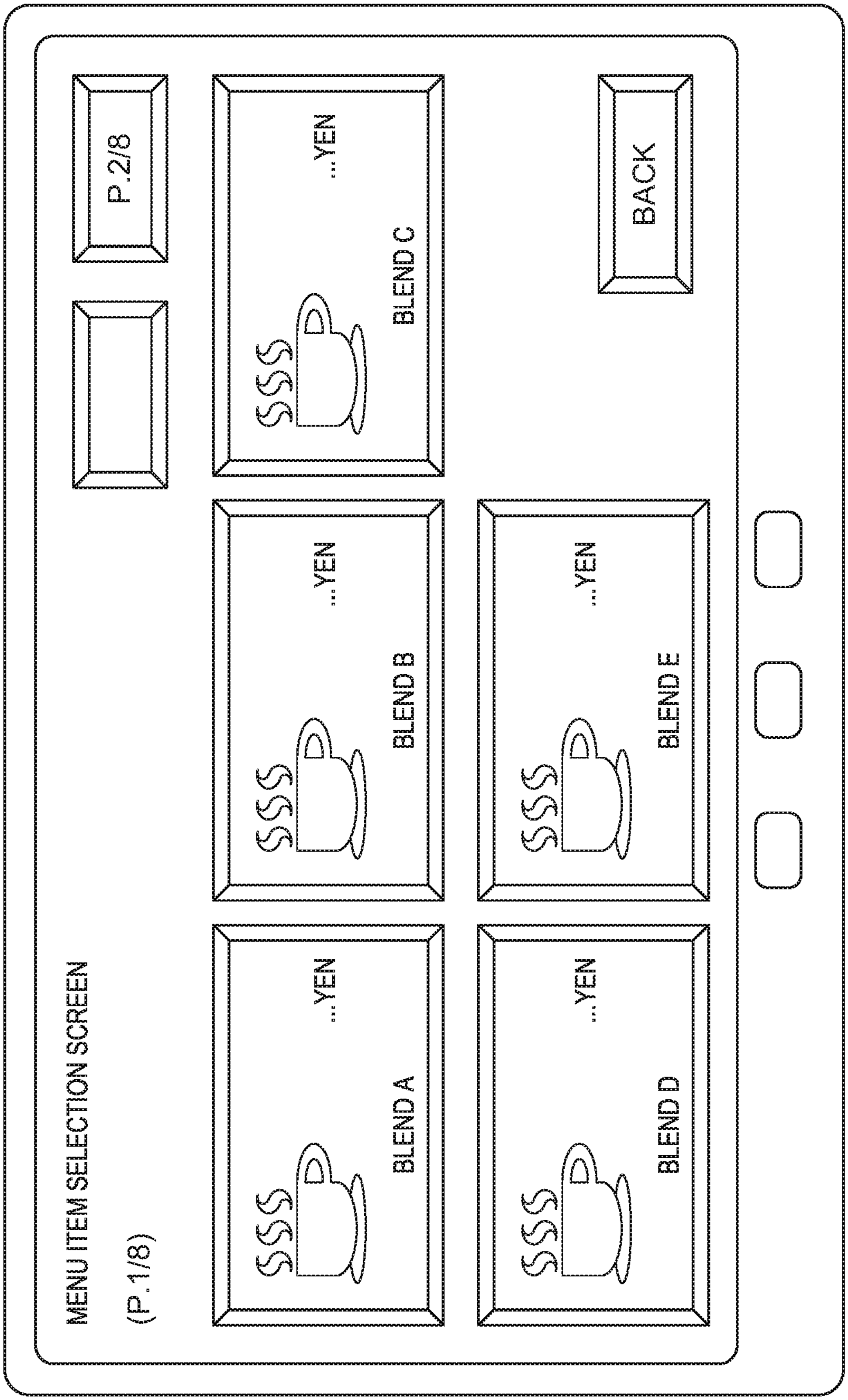
FIG. 64 is a view showing an example of display on an operation unit.

FIG. 64 shows an example of display in a case in which "menu item selection" is selected in the display shown in FIG. 63. Here, five menu item icons for menu item selection, which are displayed as blends A to E, are displayed here. Each menu item icon is a function button including an illustration of a coffee cup, a menu item name such as blend A, and display of a price ( . . . yen). "P.1/8" is displayed on the upper left of the screen, and shows that there exist eight pages of menu item selection screens.

A "BACK" icon is a function button that instructs return to the initial screen. A "P.2/8" icon is a function button that instructs advance to the next screen, and shows that there exist eight pages of menu item selection screens. A blank function button on the left side of the "P.2/8" icon is a function button that instructs return to the previous screen. In the example shown in FIG. 64, since the menu item selection screen under display is the first page, and no previous screen (previous page) exists, a blank is displayed. Even if this icon is touched, the operation is invalid. In this embodiment, the icon of a function button whose operation is invalid is shown as a blank.

Figure 65:
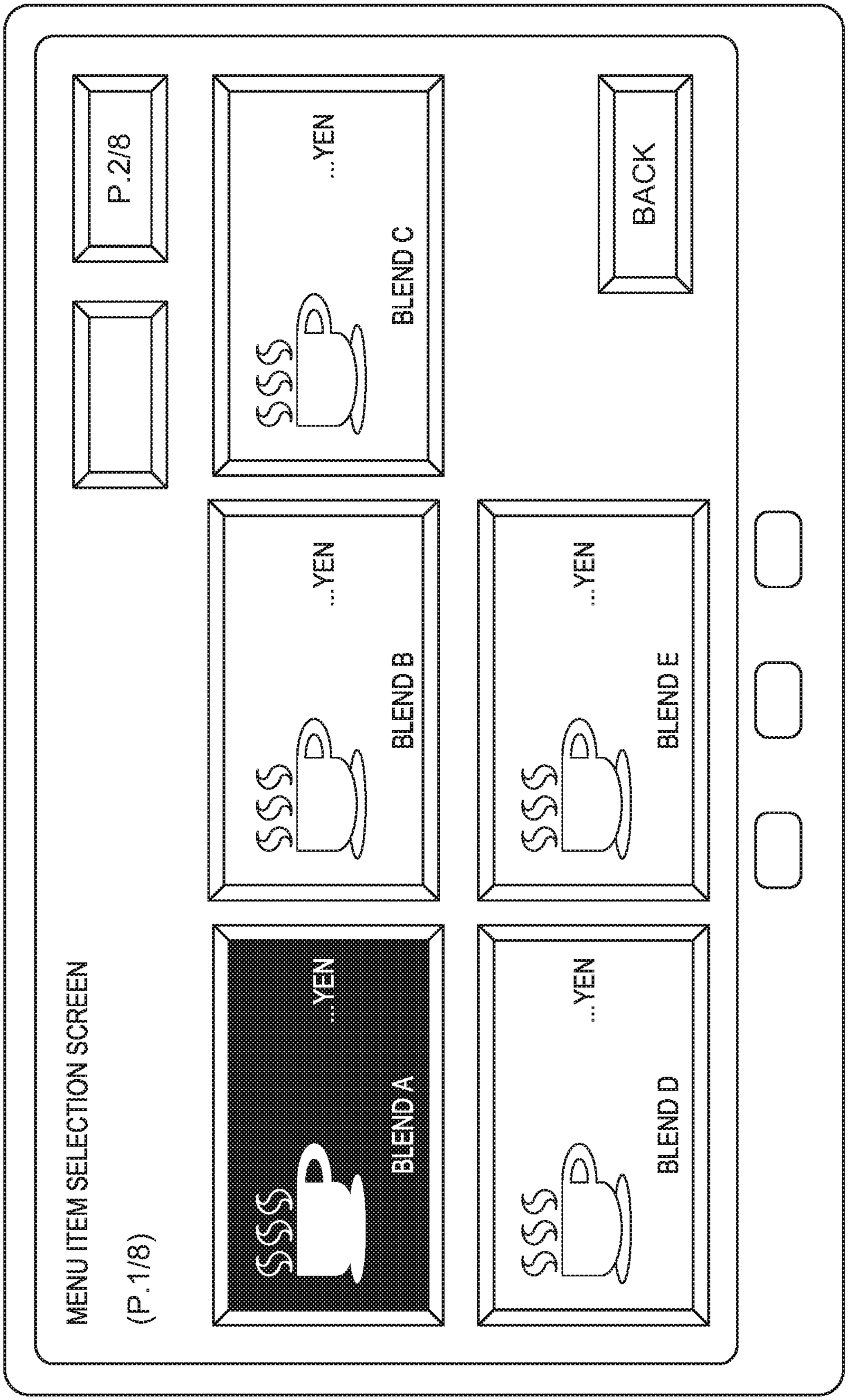
FIG. 65 is a view showing an example of display on an operation unit.
Figure 66:
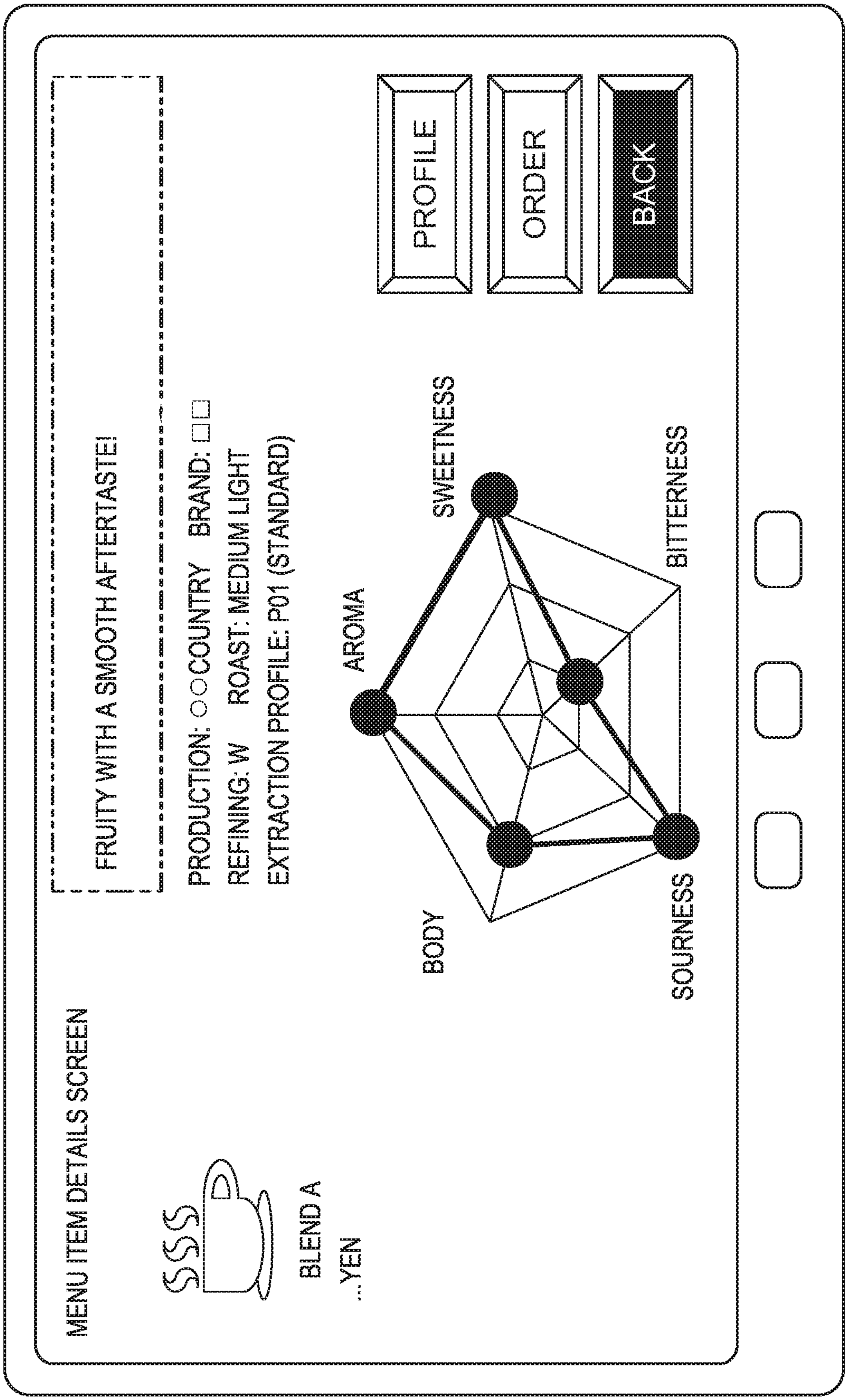
FIG. 66 is a view showing an example of display on an operation unit.

FIG. 65 shows an example of display in a case in which "blend A" is selected by the user in the display shown in FIG. 64. FIG. 66 shows an example of display after that.

The display shown in FIG. 66 is a menu item details screen showing the detailed information of the blend A. The producing country of the roasted coffee beans of the blend A, the brand, the refining method, the roasting method, and the extraction PROFILE that is P01 (standard) are displayed here. "Extraction PROFILE" is the type of producing conditions (to be sometimes referred to as an extraction profile hereinafter) in a case in which a coffee beverage is produced by the beverage producing apparatus 1 using the roasted coffee beans. "P01 (standard)" indicates standard producing conditions.

In the menu item details screen, additionally, a comment of a taster who actually tried the coffee beverage of the blend A is displayed as "features fruity feeling and refreshing aftertaste!".

In addition, a taste chart is displayed in the menu item details screen. The taste chart is a chart displaying the levels of a plurality of types of characteristics such as a taste and an aroma, which characterize a coffee beverage. In the example shown in FIG. 66, five types of characteristics "aroma", "sweetness", "bitterness", "sourness", and "body" are displayed in three levels.

The user can examine whether the coffee meets his/her taste by referring to these pieces of information. In particular, since the taste chart is displayed, the user can comprehensively understand the features of the coffee beverage and easily select a type of coffee beverage of his/her taste.

A "PROFILE" icon is a function button that instructs to customize the extraction profile. Details will be described later. An "ORDER" icon is a function button that instructs order of the selected coffee beverage. Details will be described later.

Figure 67:
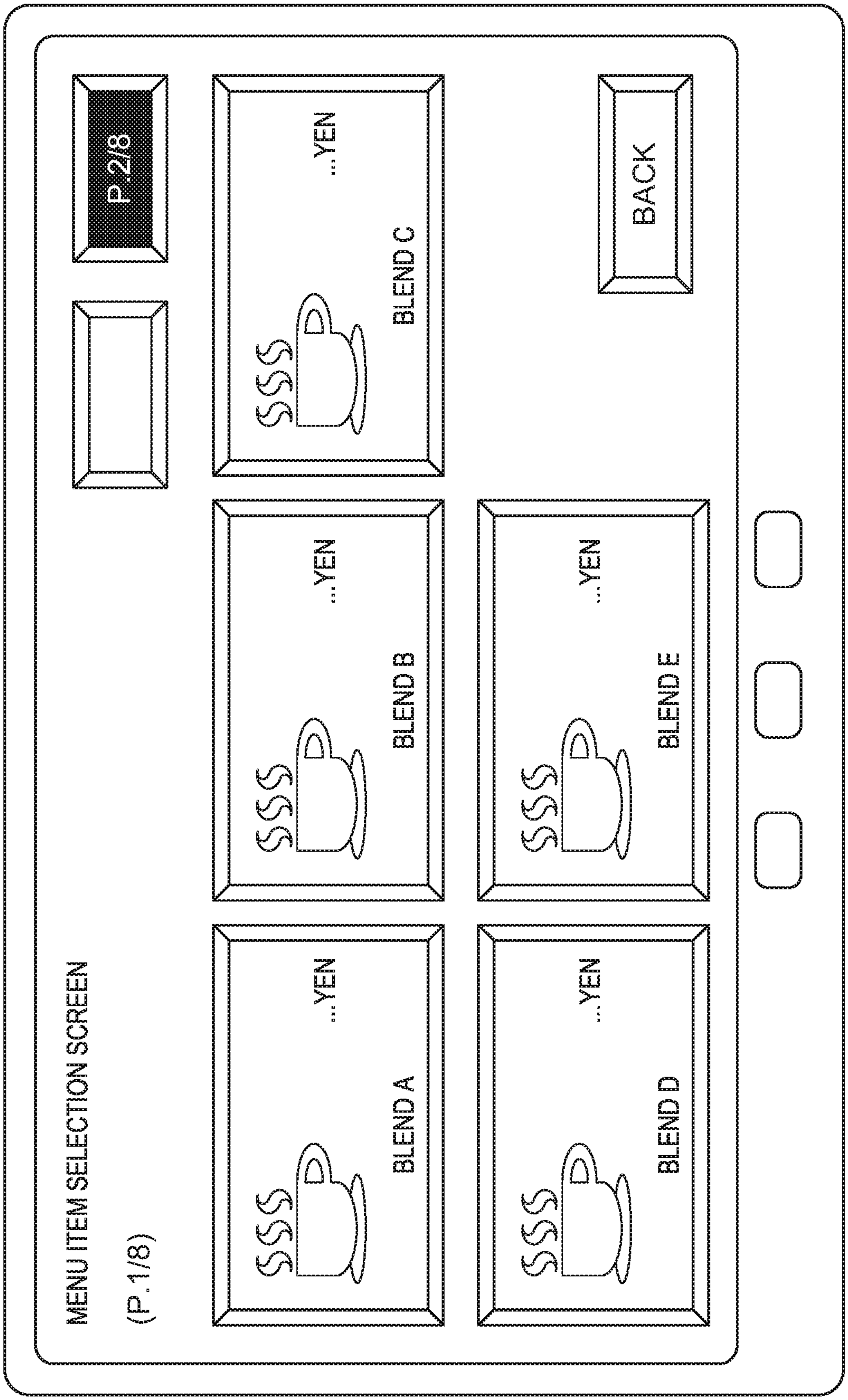
FIG. 67 is a view showing an example of display on an operation unit.
Figure 68:
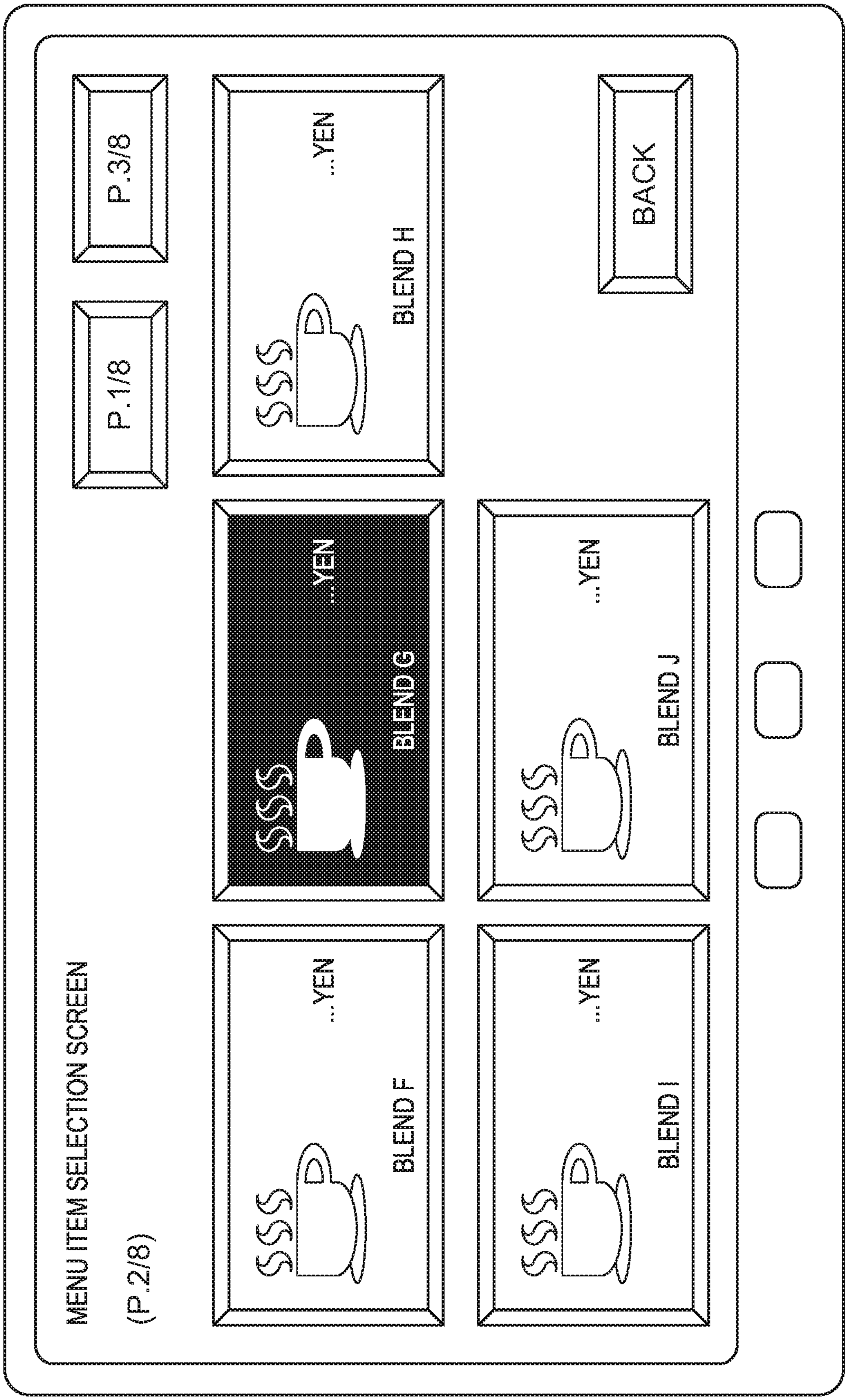
FIG. 68 is a view showing an example of display on an operation unit.
Figure 69:
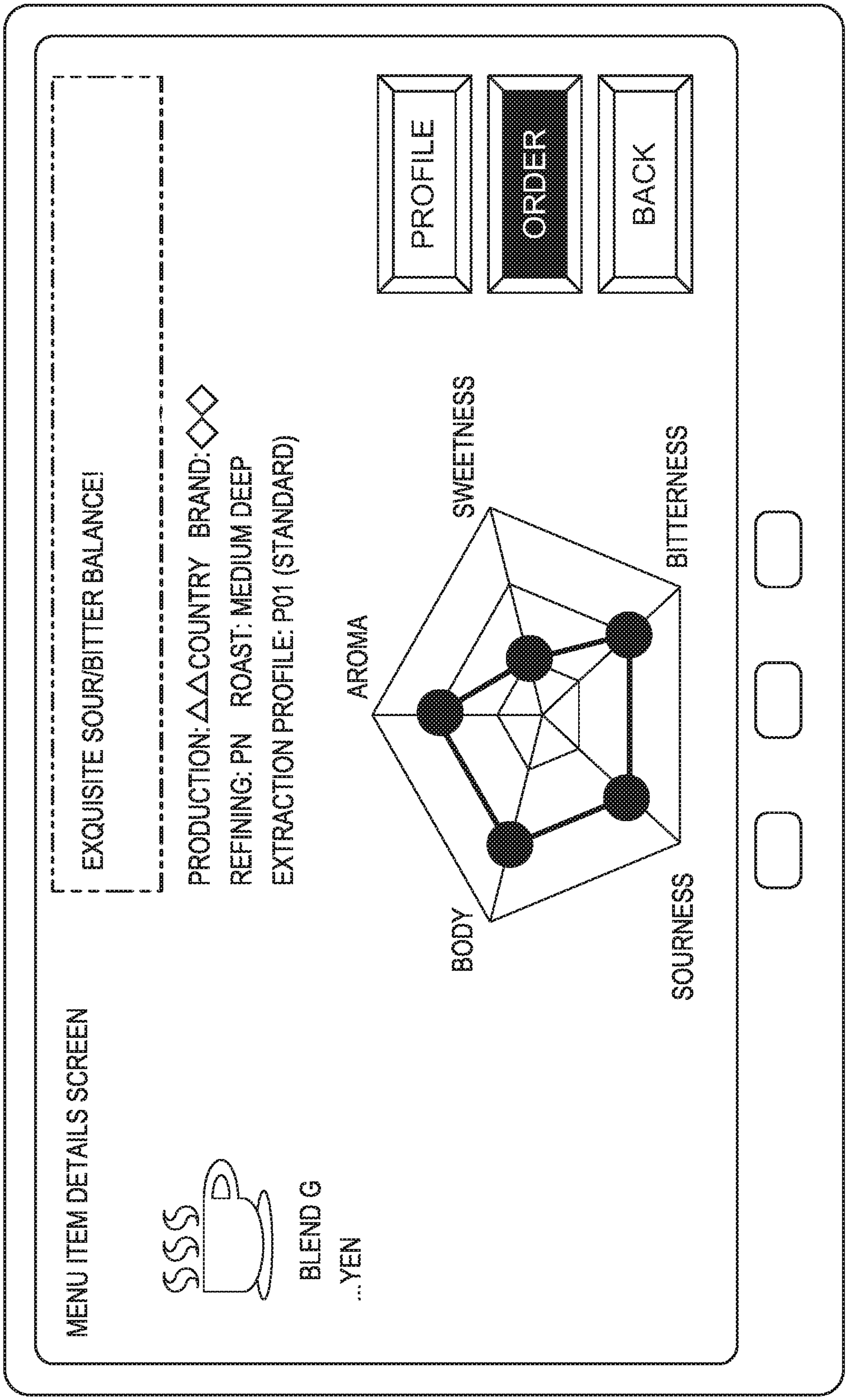
FIG. 69 is a view showing an example of display on an operation unit.

In the example shown in FIG. 66, the "BACK" icon is selected. FIG. 67 shows an example of display after that. In the example shown in FIG. 67, the "P.2/8" icon is selected. The screen advances to the next screen, and a screen shown in FIG. 68 is displayed. In the example shown in FIG. 68, "blend G" is selected by the user. FIG. 69 shows an example of display after that.

The display shown in FIG. 69 is the menu item details screen of "blend G". The components of the screen are common to those of the menu item details screen of "blend A" shown in FIG. 66. In the taste chart, five types of characteristics "aroma", "sweetness", "bitterness", "sourness", and "body" are displayed in three levels, that is, the items of features are the same as in "blend A". This allows the user to easily recognize the difference between the blend A and the blend G based on the same standard. However, the items of features need not always be common, and the item of features may change depending on the menu item.

Figure 70:
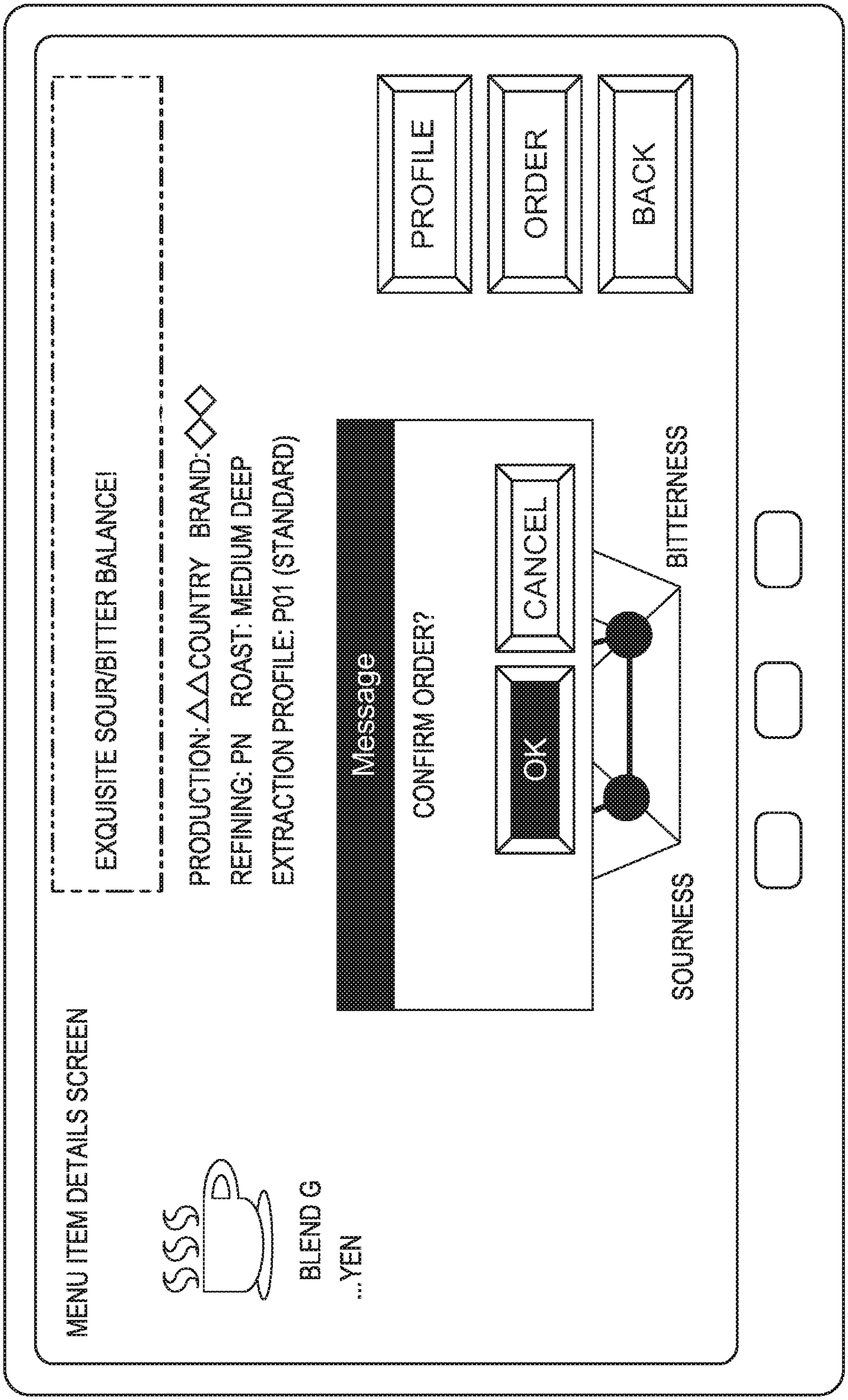
FIG. 70 is a view showing an example of display on an operation unit.

In the example shown in FIG. 69, the "ORDER" icon is selected. FIG. 70 shows an example of display after that. FIG. 70 shows an order confirmation screen, and "OK" is selected by the user. The screen thus transitions to a screen shown in FIG. 71. The menu item details screen of "blend G" whose order has been accepted is displayed again, and an acceptance confirmation message "order has been accepted"

is displayed. After that, a processing unit 11*a* reads out settings concerning “blend G”, supplies corresponding roasted coffee beans from a storage apparatus 4, controls the beverage producing apparatus 1 in accordance with the producing conditions, and automatically produces the coffee beverage. In the display shown in FIG. 71, a “SHOP” icon is selected, and the screen returns to the initial screen shown in FIG. 62.

Figure 72:
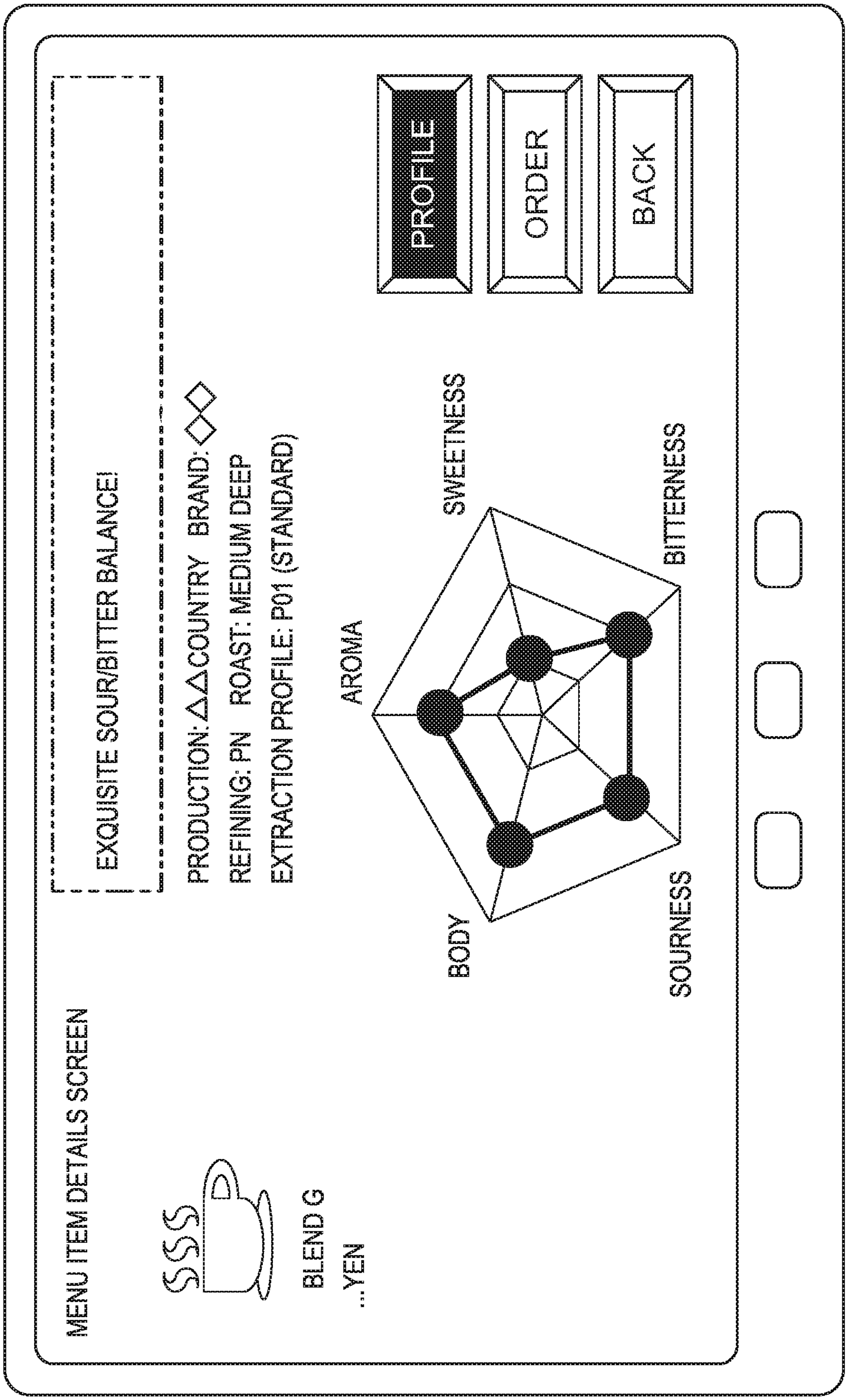
FIG. 72 is a view showing an example of display on an operation unit.

A case in which the “PROFILE” icon is selected in the menu item details screen will be described next. FIG. 72 shows a state in which “blend G” is selected in the screen shown in FIG. 68, and the “PROFILE” icon is selected in the menu item details screen. The display screen transitions to an example shown in FIG. 73.

Figure 73:
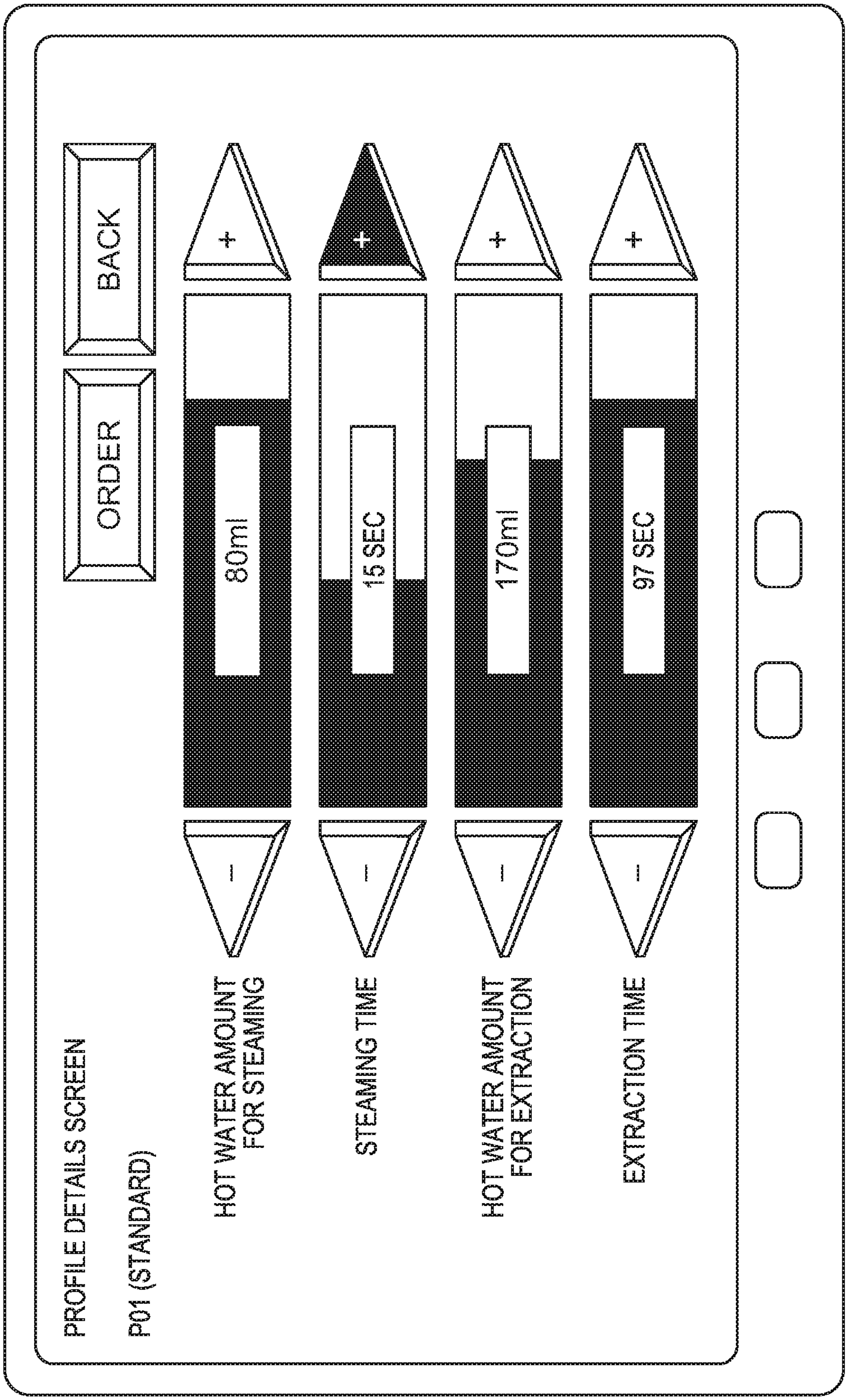
FIG. 73 is a view showing an example of display on an operation unit.

For “blend G”, “P01 (standard)” is set as the extraction profile. The screen shown in FIG. 73 is a profile details screen of “P01 (standard)”. Here, “hot water amount for steaming”, “steaming time”, “hot water amount for extraction”, and “extraction time” are listed as producing conditions, and initial set values are displayed as 80 ml, 15 sec, 170 ml, and 97 sec. “Hot water amount for steaming” is, for example, a hot water amount used for steaming in step S11 in the extraction processing shown in FIG. 21, and “steaming time” is the time of steaming. “Hot water amount for extraction” is, for example, a hot water amount (the hot water amount for steaming and the remaining hot water amount in step S12) used to extract a coffee liquid in the extraction processing shown in FIG. 21, and “extraction time” is the immersion type coffee liquid extraction time in step S14.

Figure 74:
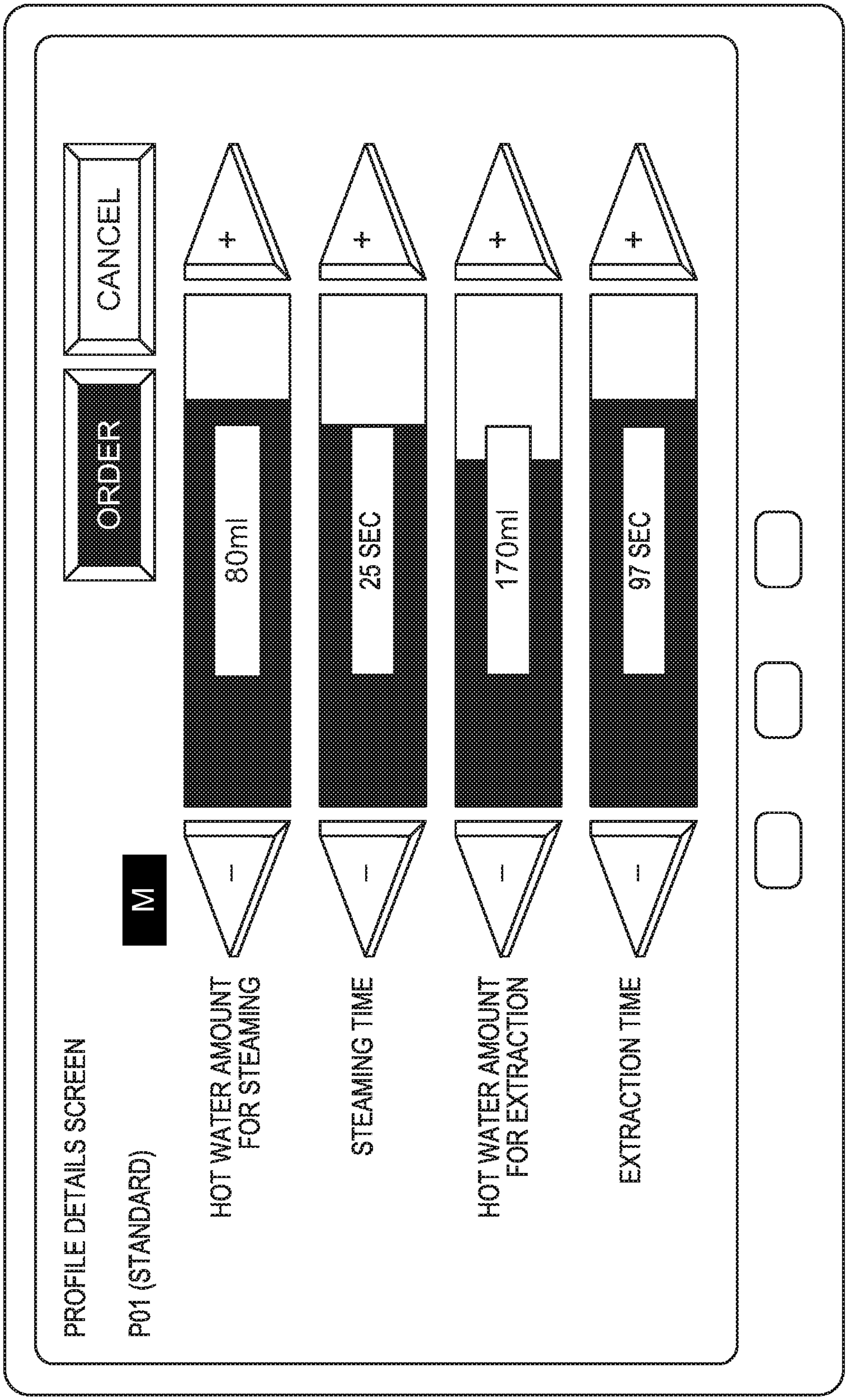
FIG. 74 is a view showing an example of display on an operation unit.

The user can adjust these set values. A “+” icon is a function button that instructs an increase, and a “−” icon is a function button that instructs a decrease. In the example shown in FIG. 73, an increase in “steaming time” is instructed. FIG. 74 shows an example of display after the increase. “Steaming time” increases from an initial set value of 15 sec to 25 sec. An “M” icon in white/black reverse display is an attention arousing icon representing that the extraction profile is being corrected by the user.

Figure 75:
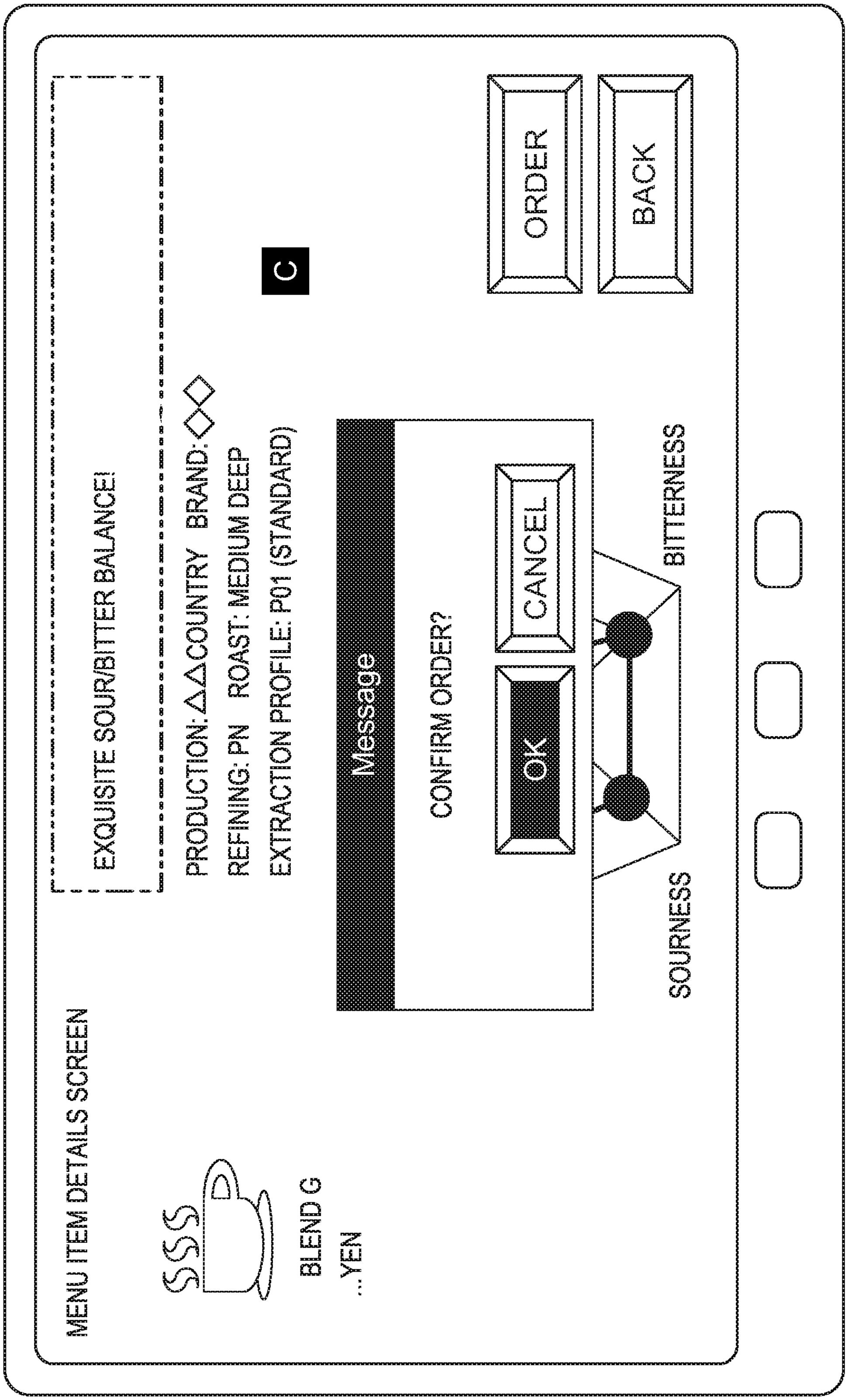
FIG. 75 is a view showing an example of display on an operation unit.

In the example shown in FIG. 74, the “ORDER” icon is selected. FIG. 75 shows an example of display after that. In FIG. 75, an order confirmation screen is displayed, and “OK” is selected by the user. A “C” icon in white/black reverse display is an attention arousing icon representing that the extraction profile is customized by the user.

Figure 71:
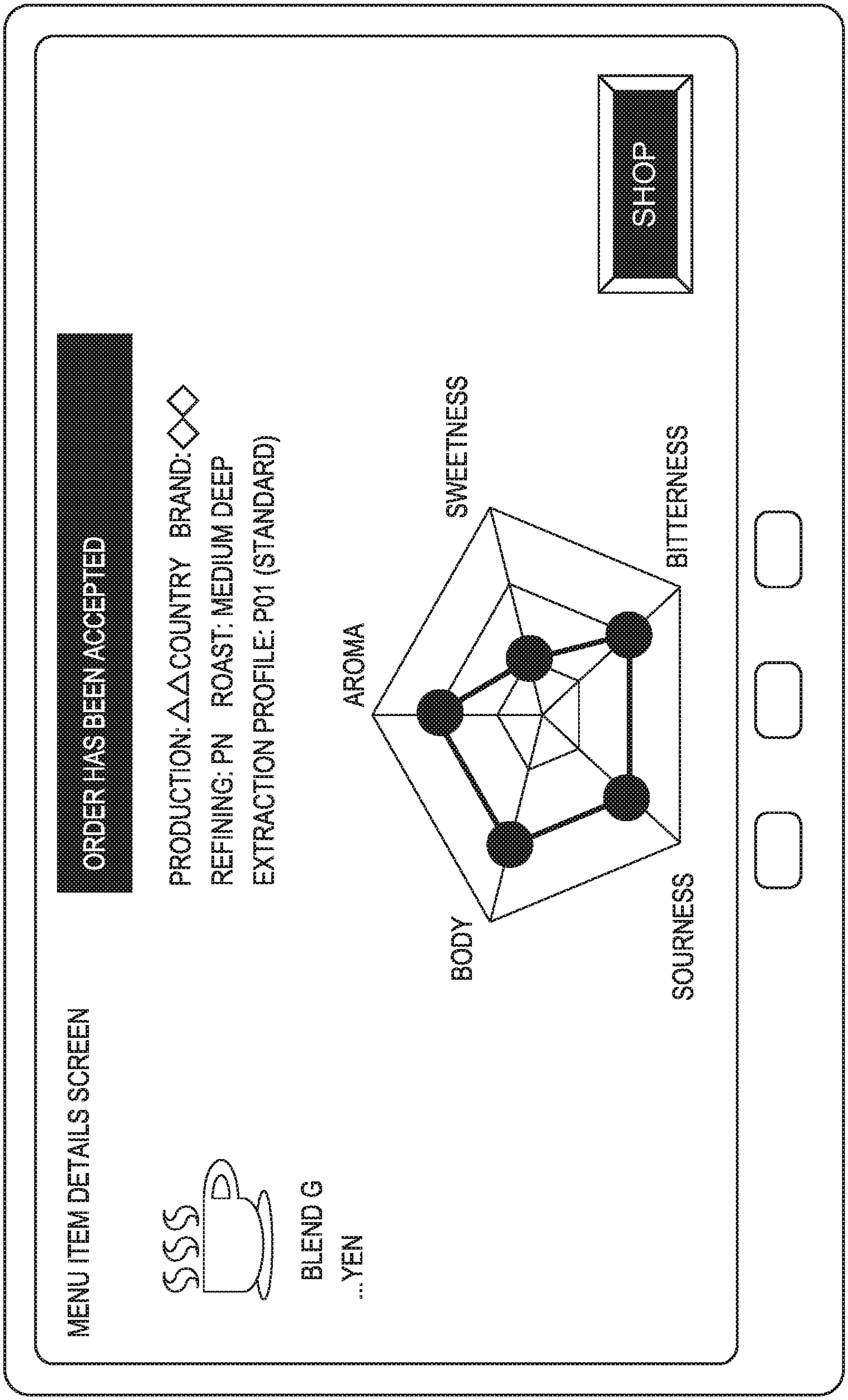
FIG. 71 is a view showing an example of display on an operation unit.
Figure 76:
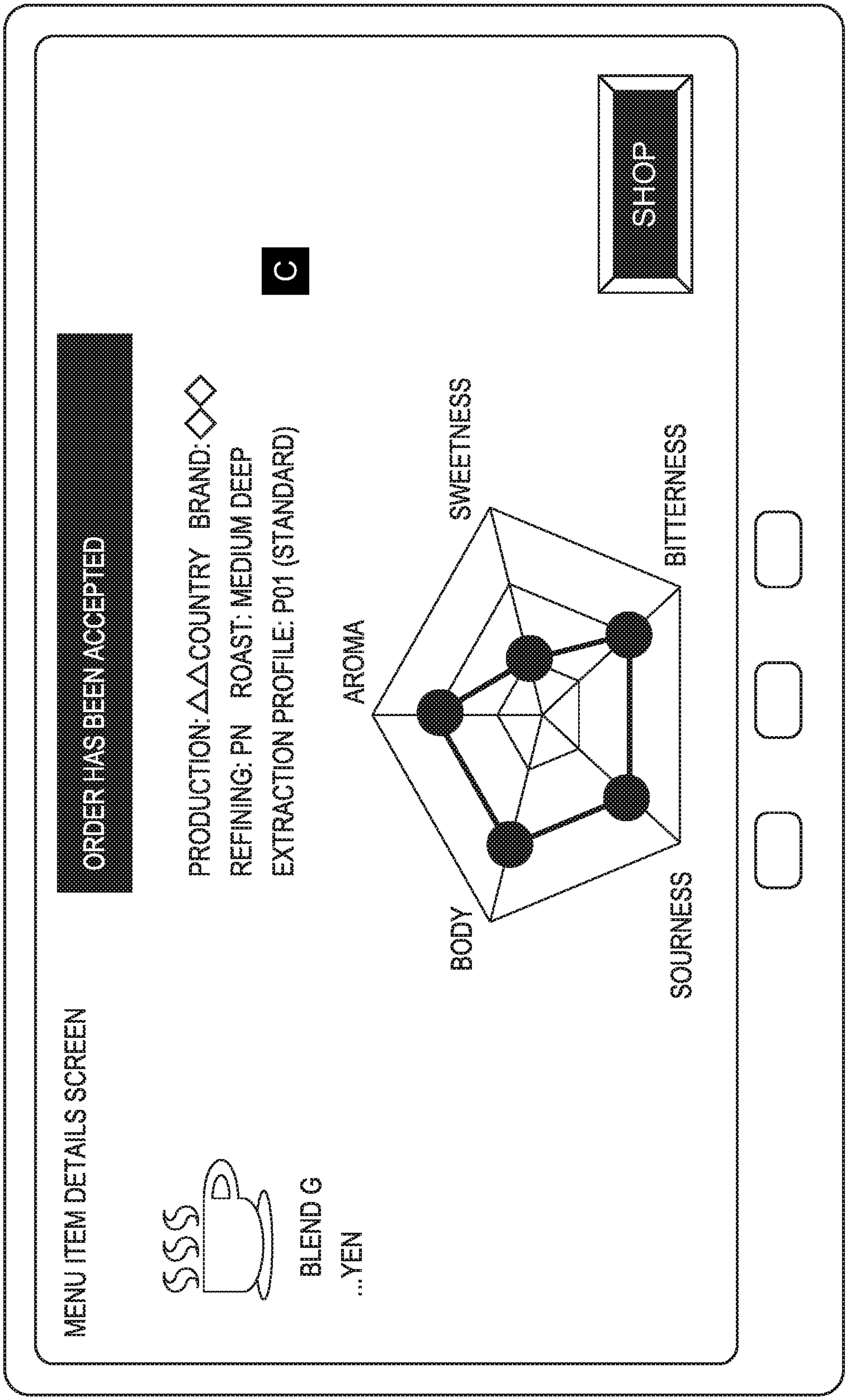
FIG. 76 is a view showing an example of display on an operation unit.

The screen thus transitions to a screen shown in FIG. 76. The menu item details screen of “blend G” whose order has been accepted is displayed again, and an acceptance confirmation message “order has been accepted” is displayed. The difference from the example shown in FIG. 71 is that the “C” icon is displayed, and it is indicated that “extraction PROFILE” is customized by the user.

After that, the processing unit 11*a* reads out settings concerning “blend G”, supplies corresponding roasted coffee beans from the storage apparatus 4, controls the beverage producing apparatus 1 in accordance with the producing conditions, and automatically produces the coffee beverage. At this time, for “extraction PROFILE”, control is performed based on values according to the customization by the user.

In the display shown in FIG. 76, the “SHOP” icon is selected, and the screen returns to the initial screen shown in FIG. 62.

Note that the information displayed in the menu item details screen and the information of initial set values displayed in the profile details screen are stored in a storage unit 11*b*. FIGS. 77 and 78 show, as examples, menu item information used to display the menu item details screen, and FIGS. 79 and 80 show extraction profile information.

The menu item information is information of each menu item, and includes a various kinds of information displayed in the menu item details screen, such as the producing country of the roasted coffee beans, the brand, the refining method (for example, “W” representing washed, “PN” representing pulped natural, or the like), the roasting method (for example, “medium light” representing roast lighter than medium, “deep” representing deep roast, “medium deep” representing roast deeper than medium, or the like), a flavor confirmed in advance such as the degree of sourness, the degree of bitterness, the degree of body, and the degrees of other tastes, the type of aroma (for example, information representing a fruity aroma), a comment, and an extraction PROFILE. These pieces of information are used as basic data of the taste chart.

The extraction profile information is information representing the type of extraction profile and the contents thereof. In this embodiment, there are seven types of extraction profiles including “P02”, . . . , “P07” in addition to “P01 (standard)” described above. On the display screen shown in FIGS. 73 and 74, “hot water amount for steaming”, “steaming time”, “hot water amount for extraction”, and “extraction time” can be customized as the producing conditions. There also exists “particle size”. “Particle size” concerns the size of a particle of ground beans and is set to ten levels from particle size 1 to particle size 10. The size of a particle of ground beans is adjusted by a particle size adjusting mechanism that acts on a gear 53*b*'. Alternatively, the particle size can be controlled by, for example, the operation time or operation form of a coarse grinder 5A or a fine grinder 5B.

<Profile Selection>

A case in which “profile selection” is selected in the initial screen shown in FIG. 62 will be described next. In “menu item selection” described above, the type of extraction profile is associated with the type of roasted coffee beans. The contents can be customized, but the type cannot be changed. “Profile selection” is a function of allowing the user to freely select the type of extraction profile.

Figure 81:
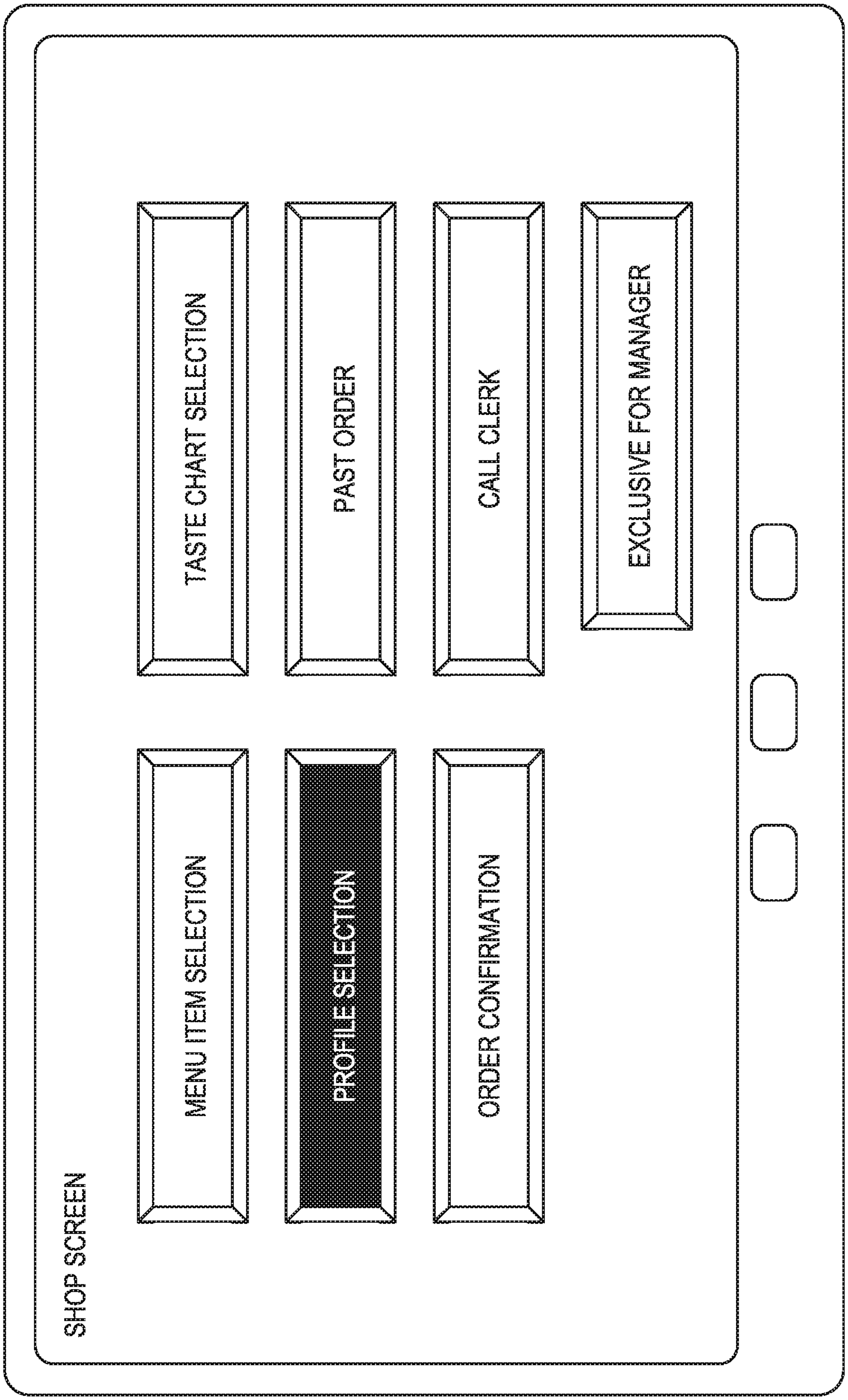
FIG. 81 is a view showing an example of display on an operation unit.
Figure 82:
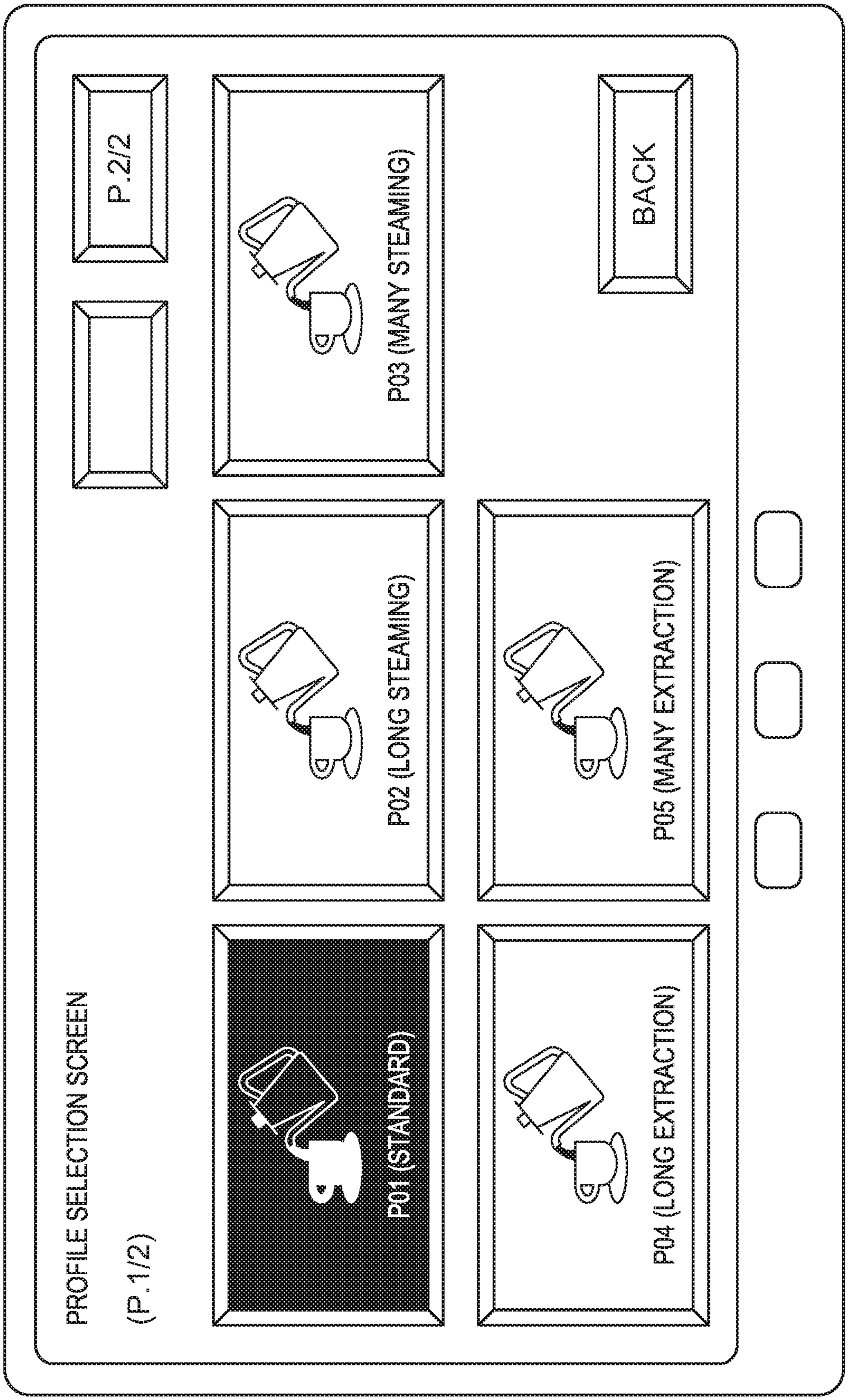
FIG. 82 is a view showing an example of display on an operation unit.

FIG. 81 shows a case in which “profile selection” is selected by the user. FIG. 82 shows an example of display after that. FIG. 82 shows a profile selection screen, and icons representing types of extraction profiles are displayed. In FIG. 82, the “P01 (standard)” icon is selected by the user, and a profile details screen shown in FIG. 83 is thus displayed.

Figure 83:
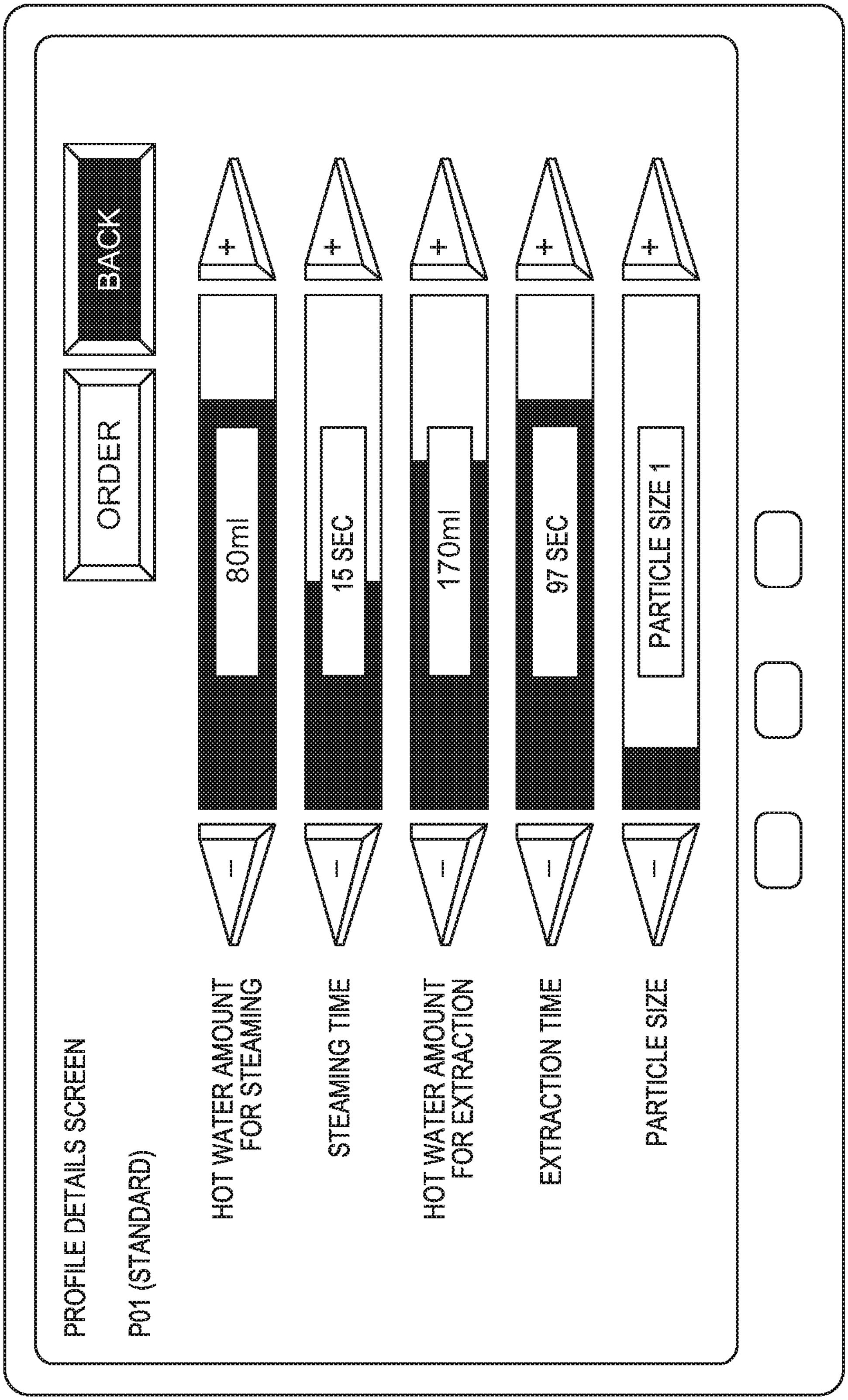
FIG. 83 is a view showing an example of display on an operation unit.

The components of the profile details screen shown in FIG. 83 are similar to the screen components shown in FIGS. 73 and 74, and “particle size” is added. That is, in “profile selection”, the set value of “particle size” is also a customization target.

Figure 84:
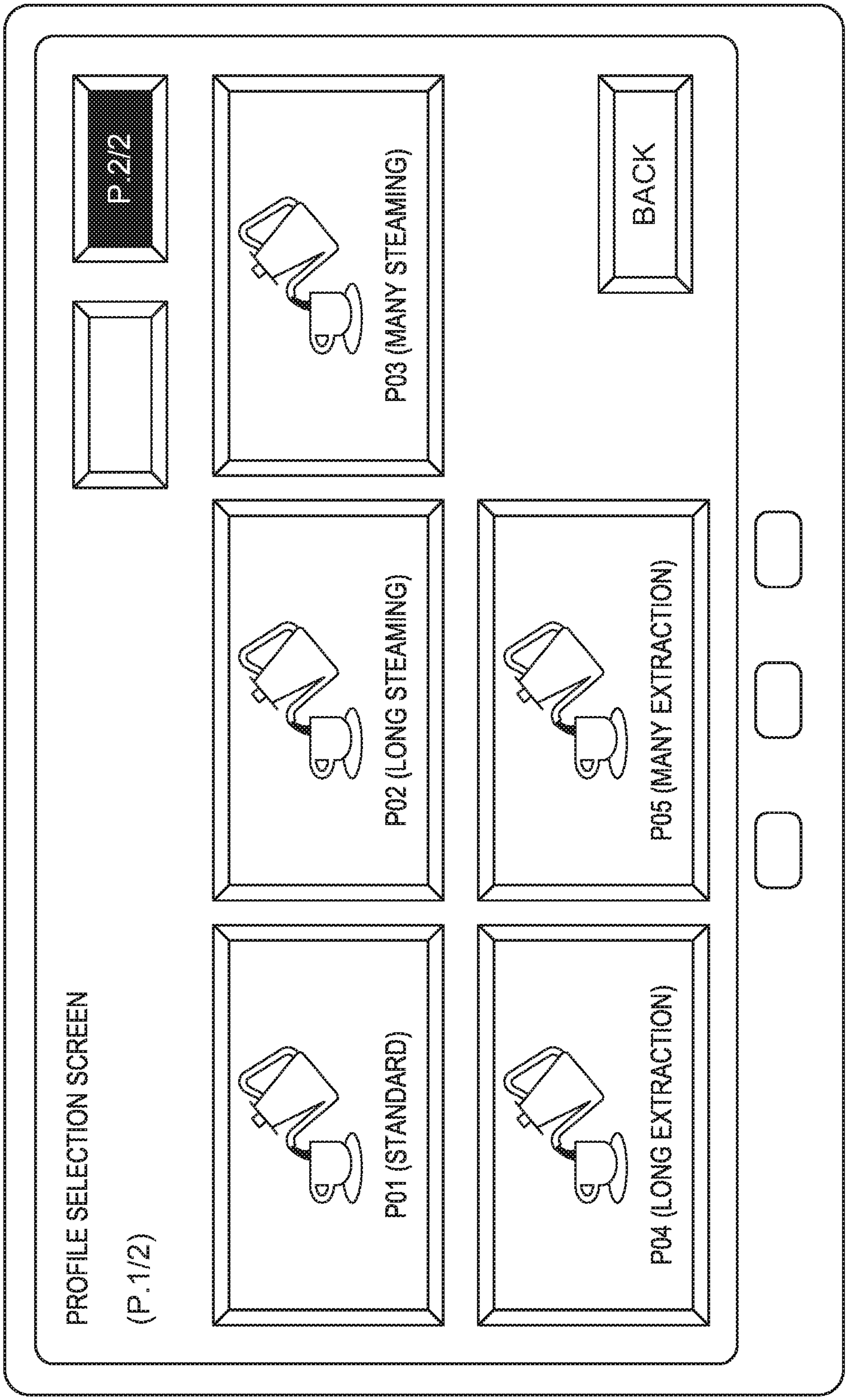
FIG. 84 is a view showing an example of display on an operation unit.
Figure 85:
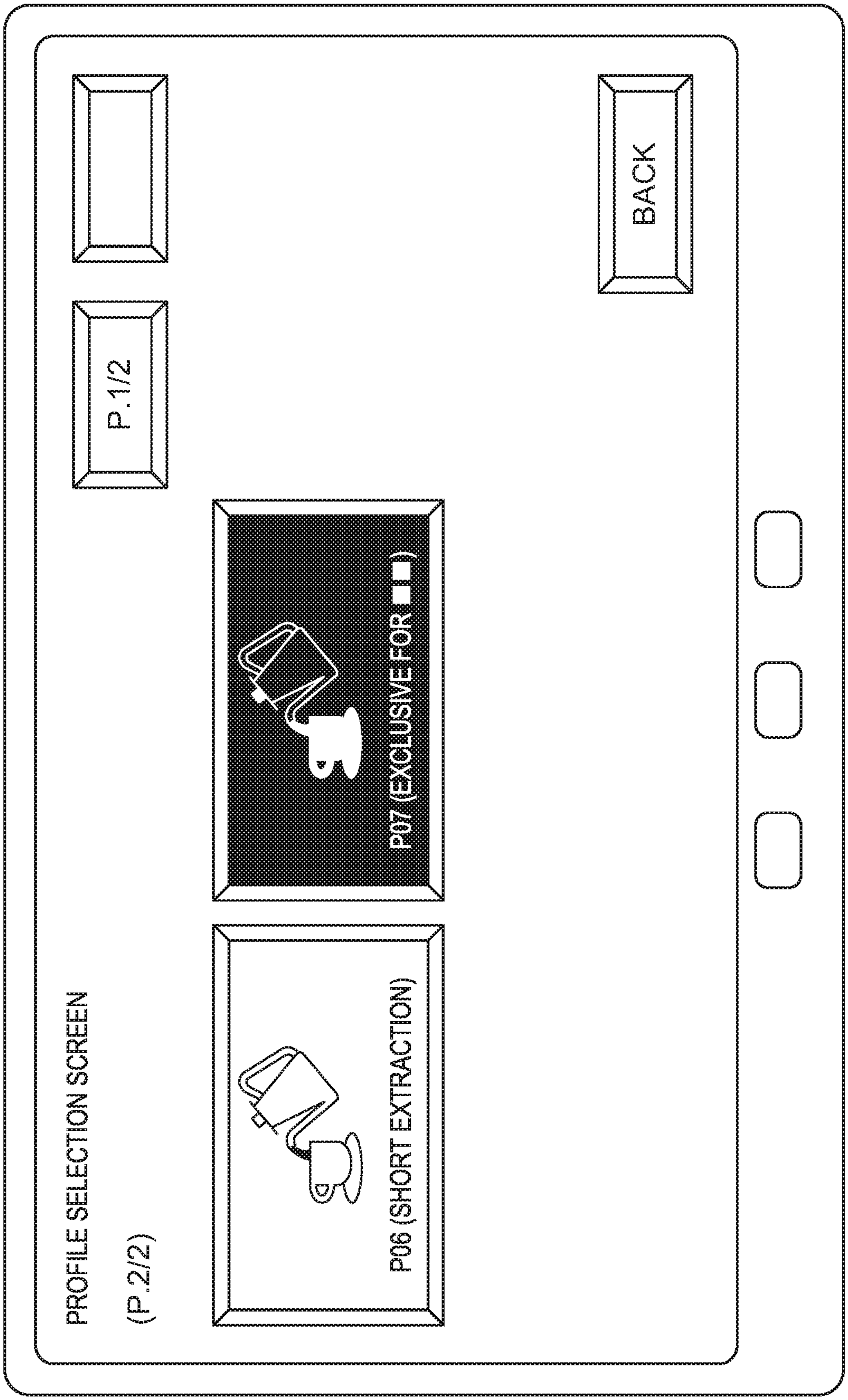
FIG. 85 is a view showing an example of display on an operation unit.
Figure 86:
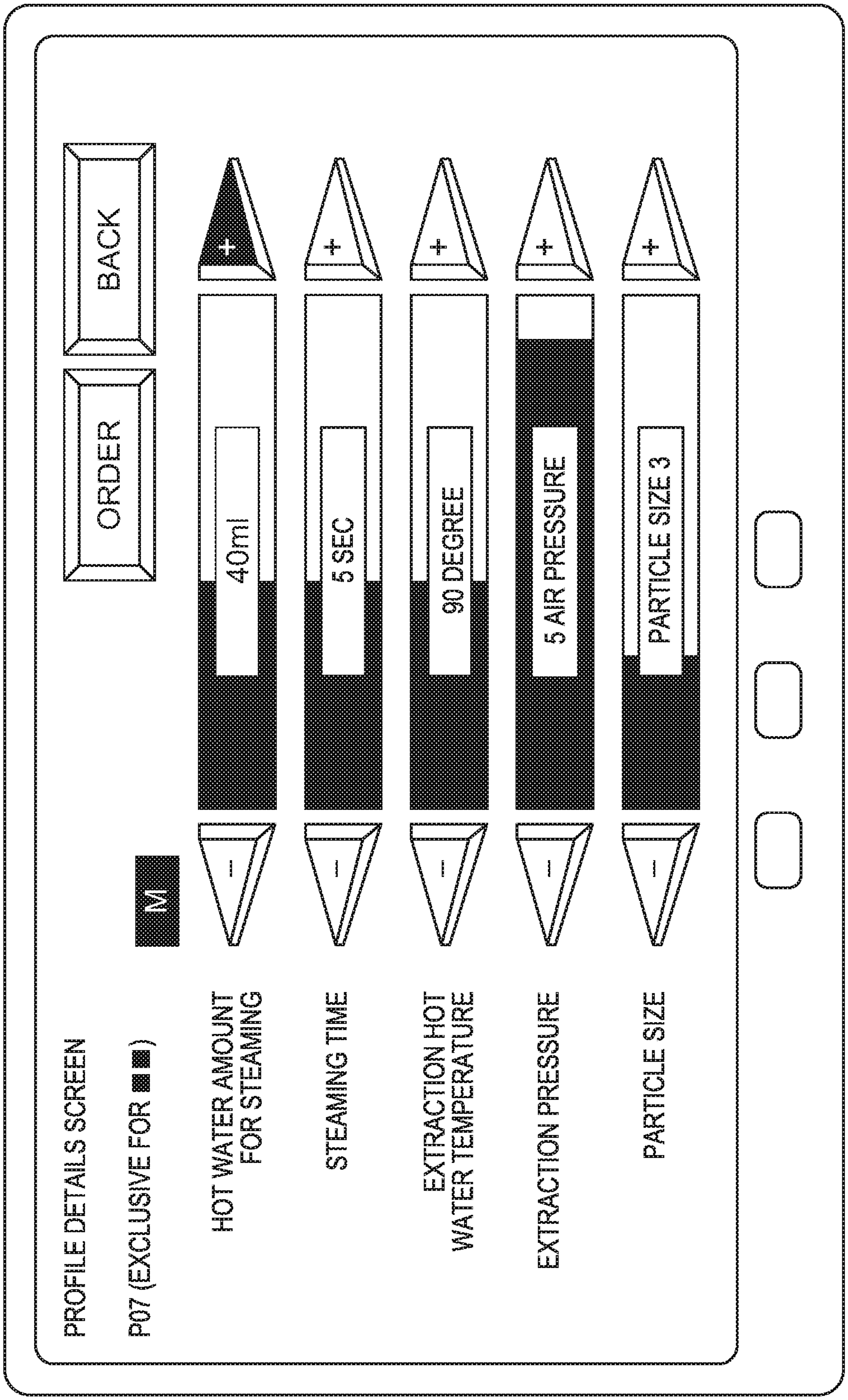
FIG. 86 is a view showing an example of display on an operation unit.

In the example shown in FIG. 83, the “BACK” icon is selected. FIG. 84 shows an example of display after that. In the example shown in FIG. 84, a “P.2/2” icon is selected. The screen advances to the next screen, and a screen shown in FIG. 85 is displayed. In the example shown in FIG. 85, “P07 (exclusive to ■■)” is selected by the user. FIG. 86 shows an example of display after that. Note that “P07 (exclusive to ■■)” is an extraction profile prepared exclusively for coffee beans of a specific brand (■■). The extraction profile may include a type specialized to the features of beans such as a brand.

Figure 87:
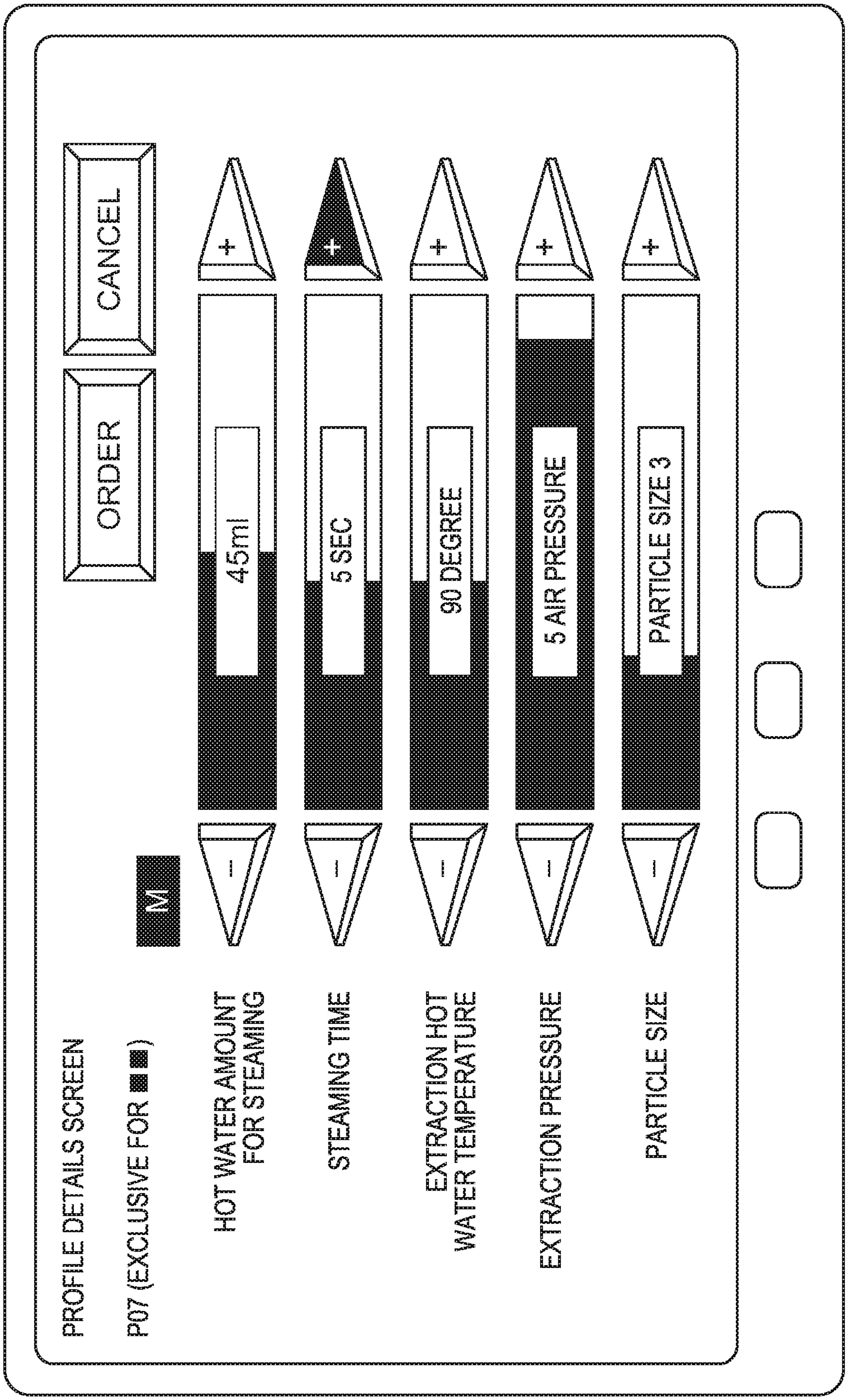
FIG. 87 is a view showing an example of display on an operation unit.
Figure 88:
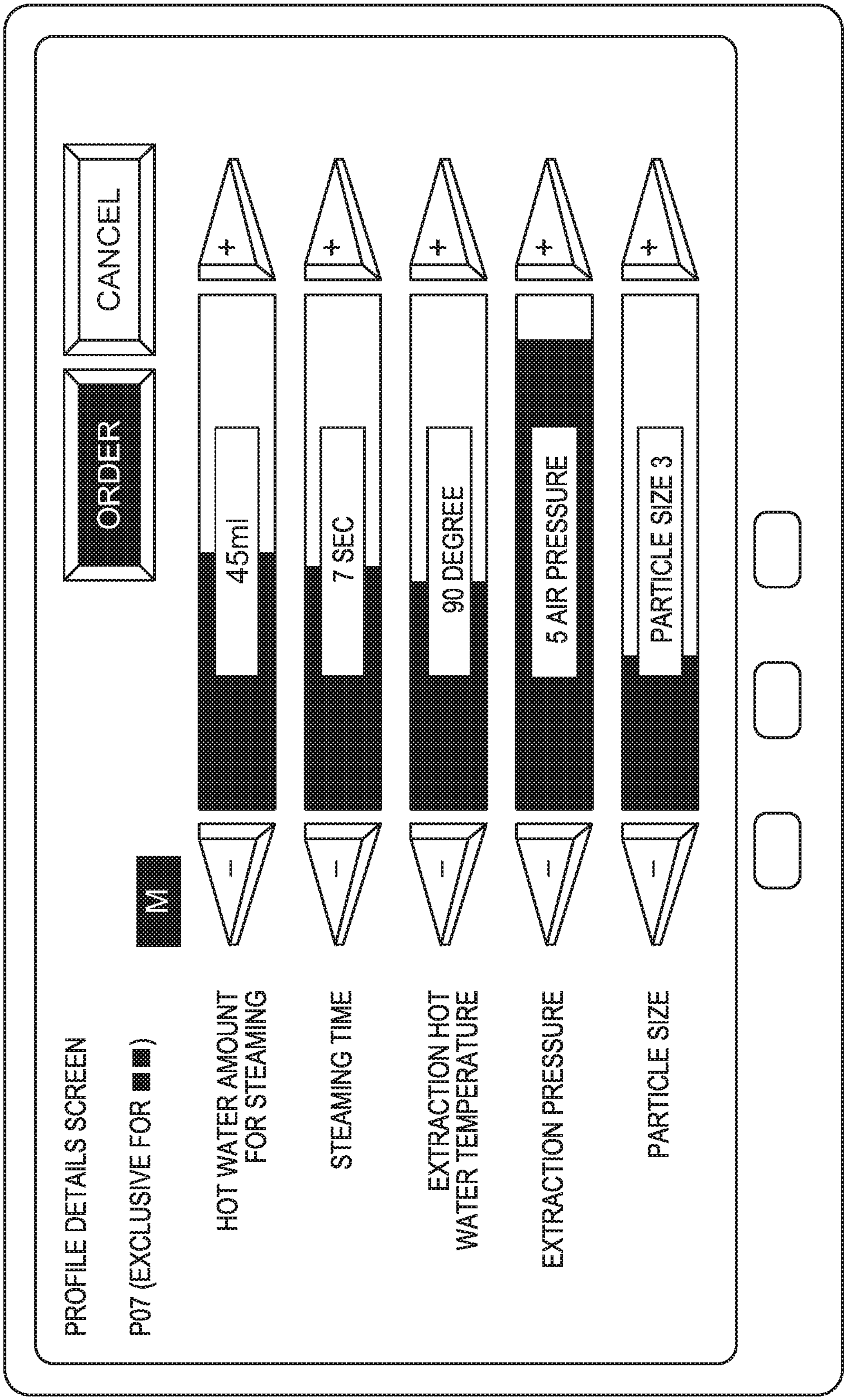
FIG. 88 is a view showing an example of display on an operation unit.
Figure 89:
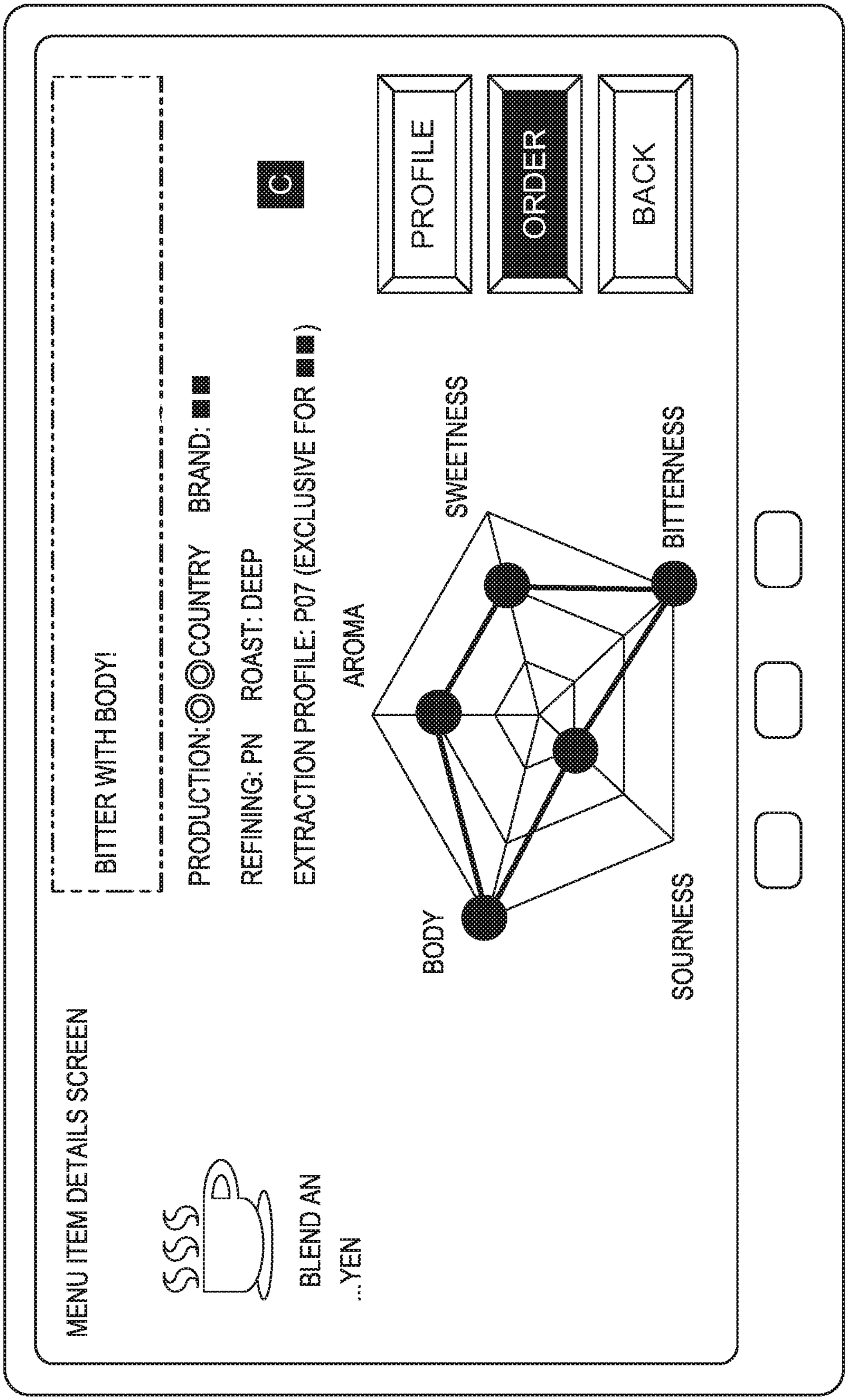
FIG. 89 is a view showing an example of display on an operation unit.

In the screen shown in FIG. 86, an increase in “hot water amount for steaming” is instructed. FIG. 87 shows an example of display after the increase. “Hot water amount for steaming” increases from an initial set value of 40 ml to 45 ml. In the screen shown in FIG. 87, an increase in "steaming time" is instructed. FIG. 88 shows an example of display after the increase. "Steaming time" increases from an initial set value of 5 sec to 7 sec. In the screen shown in FIG. 88, "ORDER" is selected. The target menu item of "ORDER" is a menu item (here, a blend AN) associated with the extraction profile of "P07 (exclusive to ■■)". As shown in FIG. 89, a menu item details screen is displayed.

Figure 90:
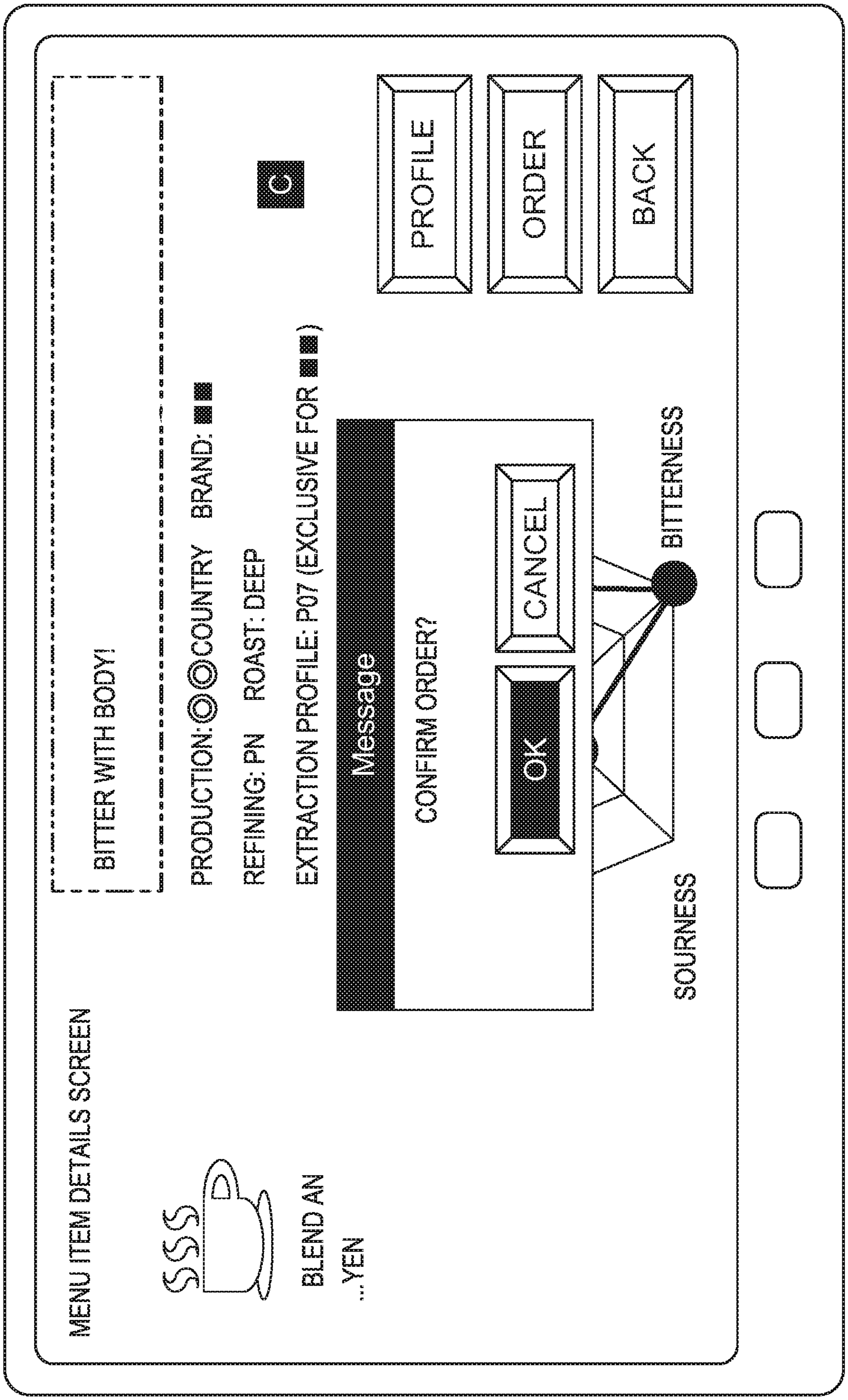
FIG. 90 is a view showing an example of display on an operation unit.

In the screen shown in FIG. 89, the "ORDER" icon is selected. FIG. 90 shows an example of display after that. In FIG. 90, an order confirmation screen is displayed, and "OK" is selected by the user. The "C" icon is displayed to represent that the extraction profile is customized by the user.

Figure 91:
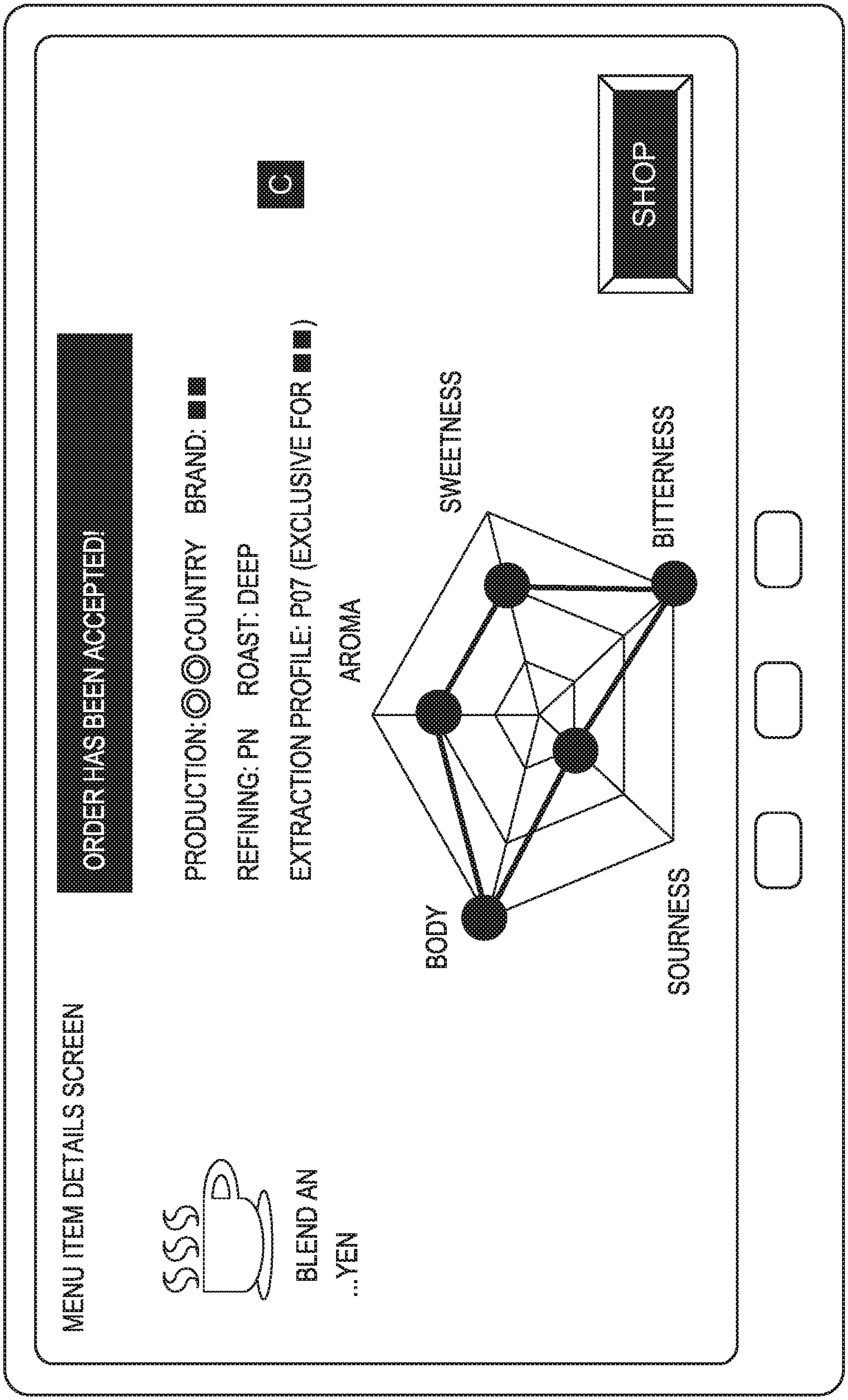
FIG. 91 is a view showing an example of display on an operation unit.

The screen thus transitions to a screen shown in FIG. 91. The menu item details screen of "blend AN" whose order has been accepted is displayed again, and an acceptance confirmation message "order has been accepted" is displayed.

After that, the processing unit 11*a* supplies roasted coffee beans corresponding to "blend AN" from the storage apparatus 4, controls the beverage producing apparatus 1 in accordance with the producing conditions corresponding to "blend AN" or the producing conditions after customization of the extraction profile of "P07 (exclusive to ■■)", and automatically produces the coffee beverage. In the display shown in FIG. 91, the "SHOP" icon is selected, and the screen returns to the initial screen shown in FIG. 62.

<Taste Chart Selection>

A case in which "taste chart selection" is selected in the initial screen shown in FIG. 62 will be described next. As described above, the "taste chart" is information that allows the user to comprehensively understand the features of a coffee beverage and contributes to coffee beverage selection by the user with priority on the taste or aroma.

Figure 92:
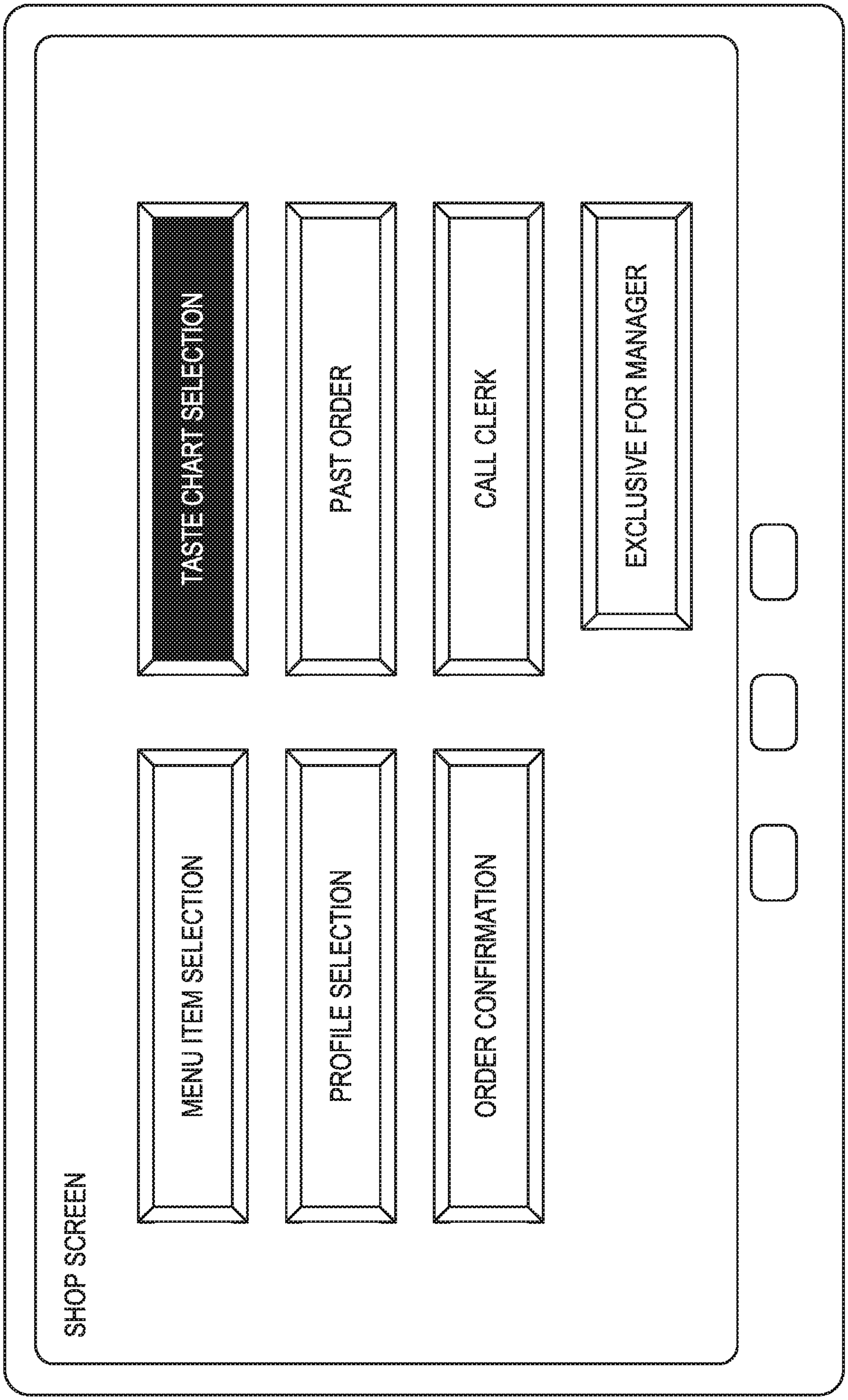
FIG. 92 is a view showing an example of display on an operation unit.
Figure 93:
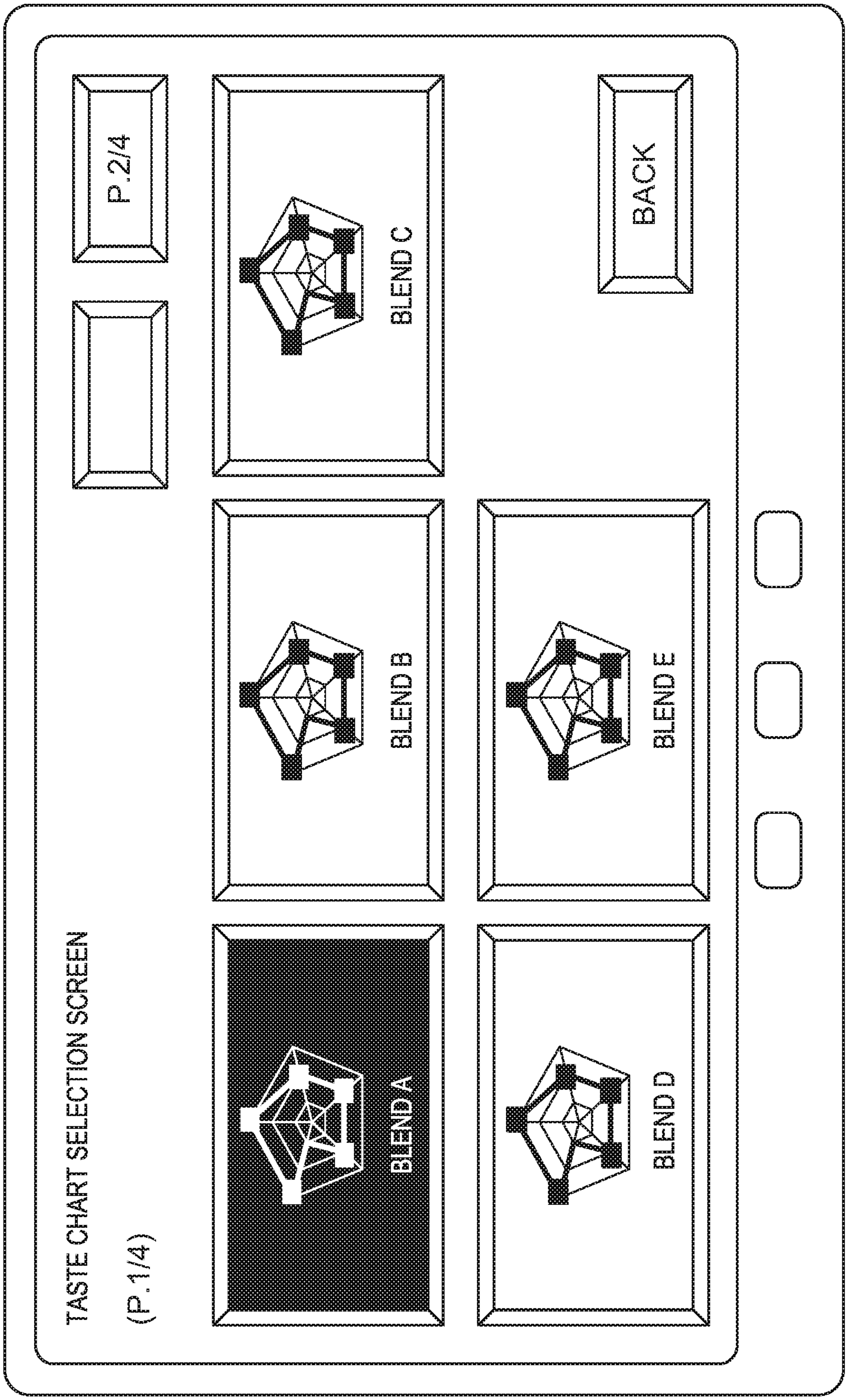
FIG. 93 is a view showing an example of display on an operation unit.

FIG. 92 exemplarily shows a case in which "taste chart selection" is selected by the user. FIG. 93 shows an example of display after that. FIG. 93 shows a taste chart selection screen, and icons representing types of taste charts are displayed. A taste chart basically corresponds to a type of roasted coffee beans. Hence, in the screen shown in FIG. 93, a type of roasted coffee beans (blend A or the like) is added to each icon. However, there are roasted coffee beans that have the same taste chart but are of different types. In this case, discrimination can be made by "comment" in this embodiment. For example, blend D and blend G shown in FIG. 77 have the same characteristics such as "roast", "sourness", "bitterness", and "body", "comments" are different, as shown in FIG. 78.

Figure 94:
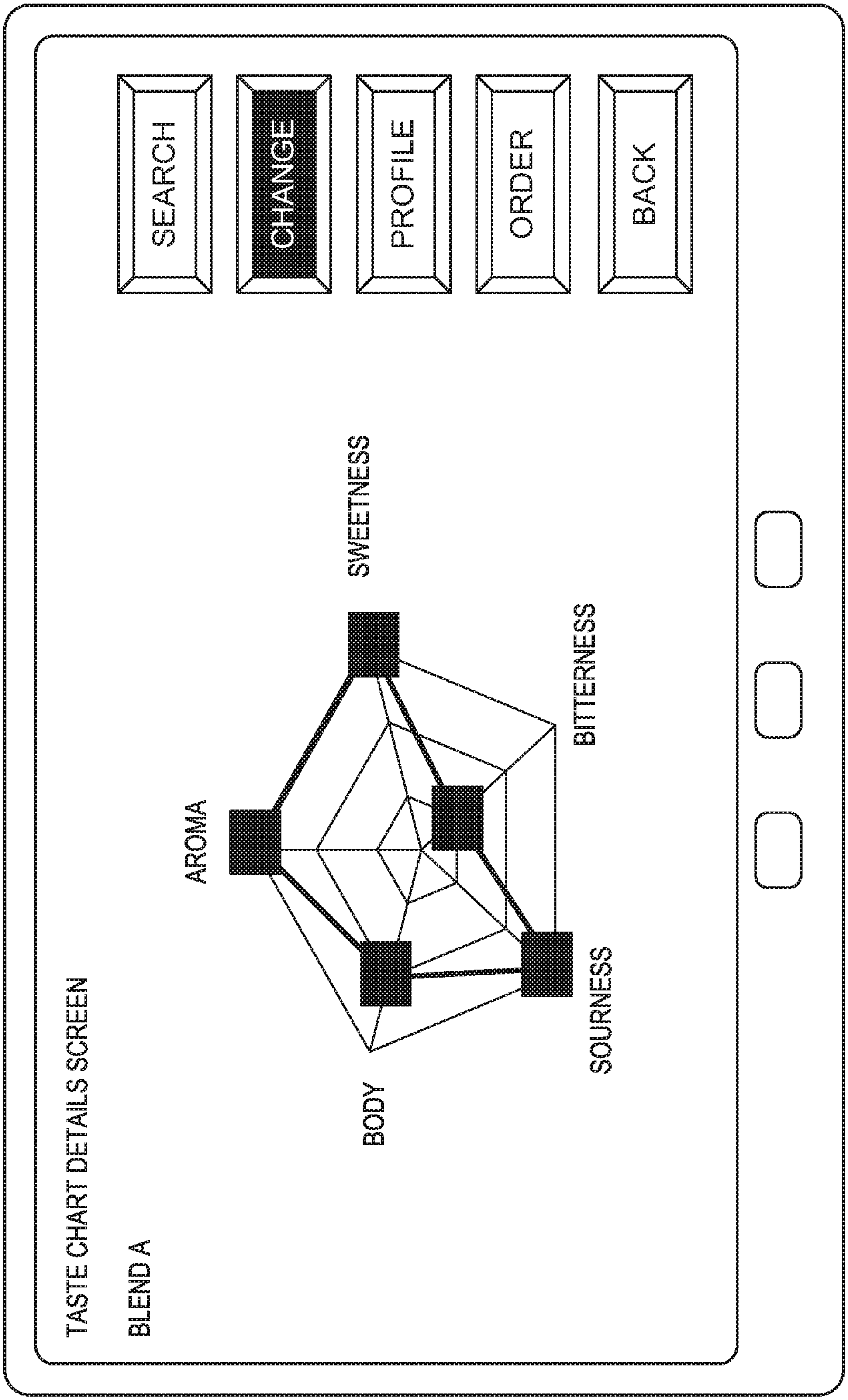
FIG. 94 is a view showing an example of display on an operation unit.

In FIG. 93, the "blend A" icon is selected by the user, and a taste chart details screen shown in FIG. 94 is thus displayed. FIG. 94 shows the taste chart of "blend A". In the example shown in FIG. 94, five types of characteristics "aroma", "sweetness", "bitterness", "sourness", and "body" concerning the blend A are displayed in three levels. For example, the aroma of the blend A is of the highest level in a strong/weak three-level evaluation, and the bitterness is of the lowest level in the three-level evaluation. Such characteristics can be selected from menu item information (FIG. 77 or 78) or corresponding extraction profile information (FIGS. 79 and 80).

A "CHANGE" icon is a function button used to instruct display of a taste chart concerning other characteristics. In "taste chart selection", the number of types of information of the taste chart provided to the user is larger than in "menu item selection". In the screen shown in FIG. 94, the "CHANGE" icon is selected, and a screen shown in FIG. 95 is thus displayed.

Figure 95:
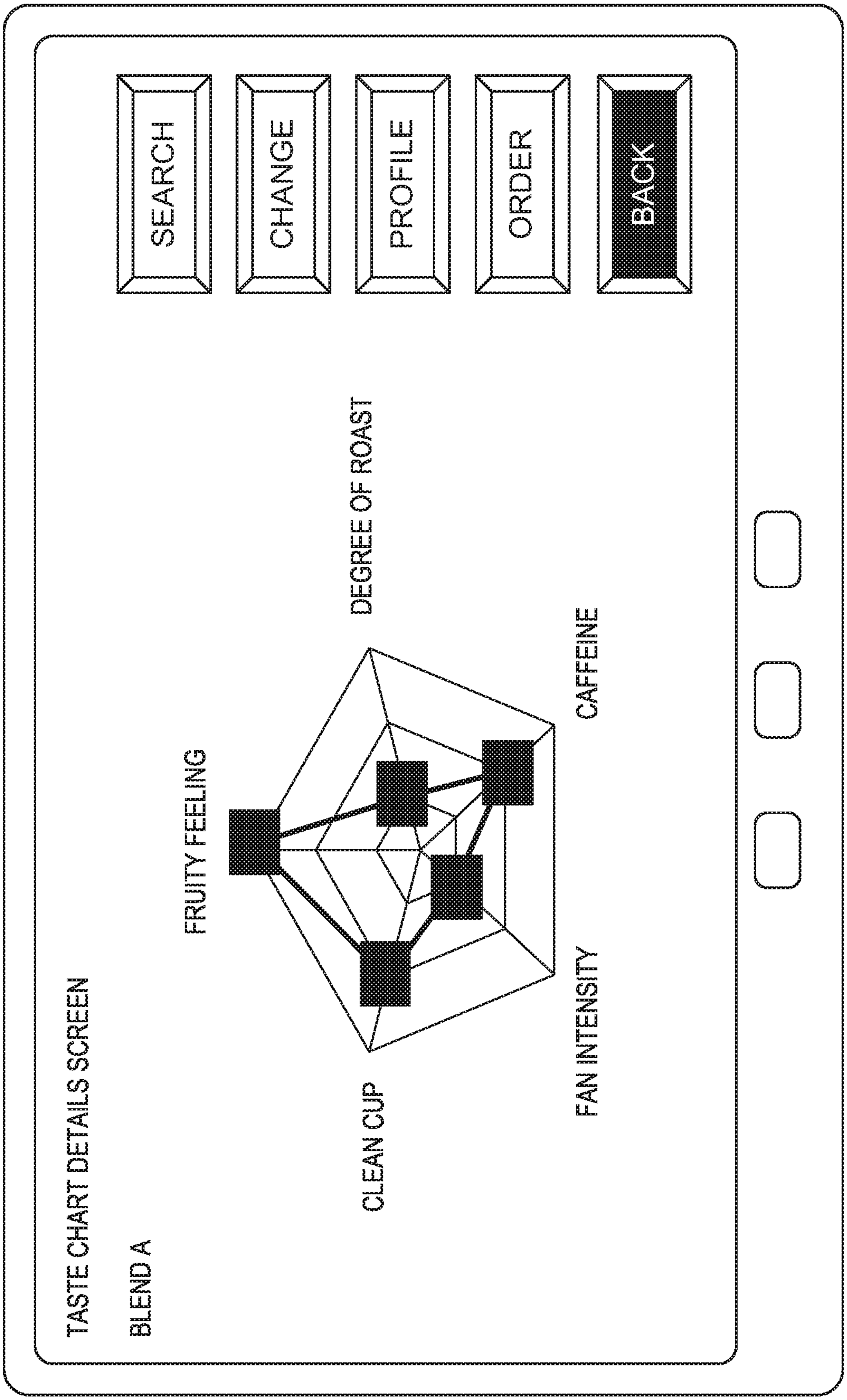
FIG. 95 is a view showing an example of display on an operation unit.

FIG. 95 shows the taste chart of other characteristics concerning the blend A. Five types of characteristics "fruity feeling", "degree of roast", "caffeine", "fan intensity", and "clean cup" concerning the blend A shown in FIG. 95 are displayed in three levels. "Fan intensity" means the air volume of a blower unit 60A when removing an unwanted substance, and is one of the producing conditions. If the fan intensity is high, unwanted substance removal intensively acts, and an undesirable flavor weakens. If the fan intensity is low, unwanted substance removal weakly acts, and an undesirable flavor readily increases. "Clean cup" means the cleanliness of an extraction container 9, and is one of the producing conditions. This is a condition to control the degree of, for example, the residual aroma of a coffee beverage produced immediately before in the extraction container 9. To increase the cleanliness, for example, the precleaning time of the extraction container 9 is made long.

A function at the time of "SEARCH" icon selection will be described next. When the user instructs desired characteristics and selects the "SEARCH" icon, roasted coffee beans of types having taste charts close to the instructed characteristics are searched for.

Figure 96:
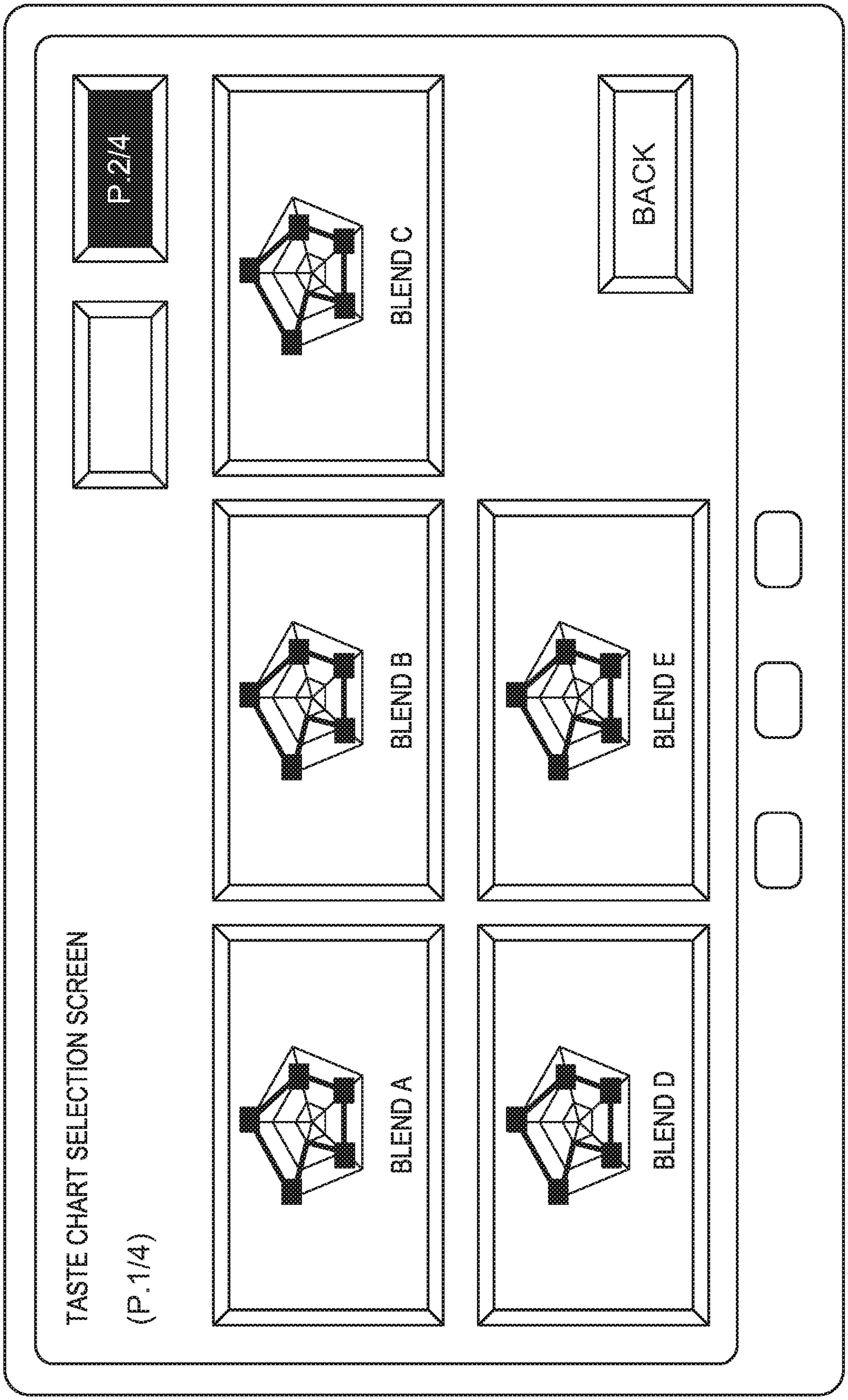
FIG. 96 is a view showing an example of display on an operation unit.
Figure 97:
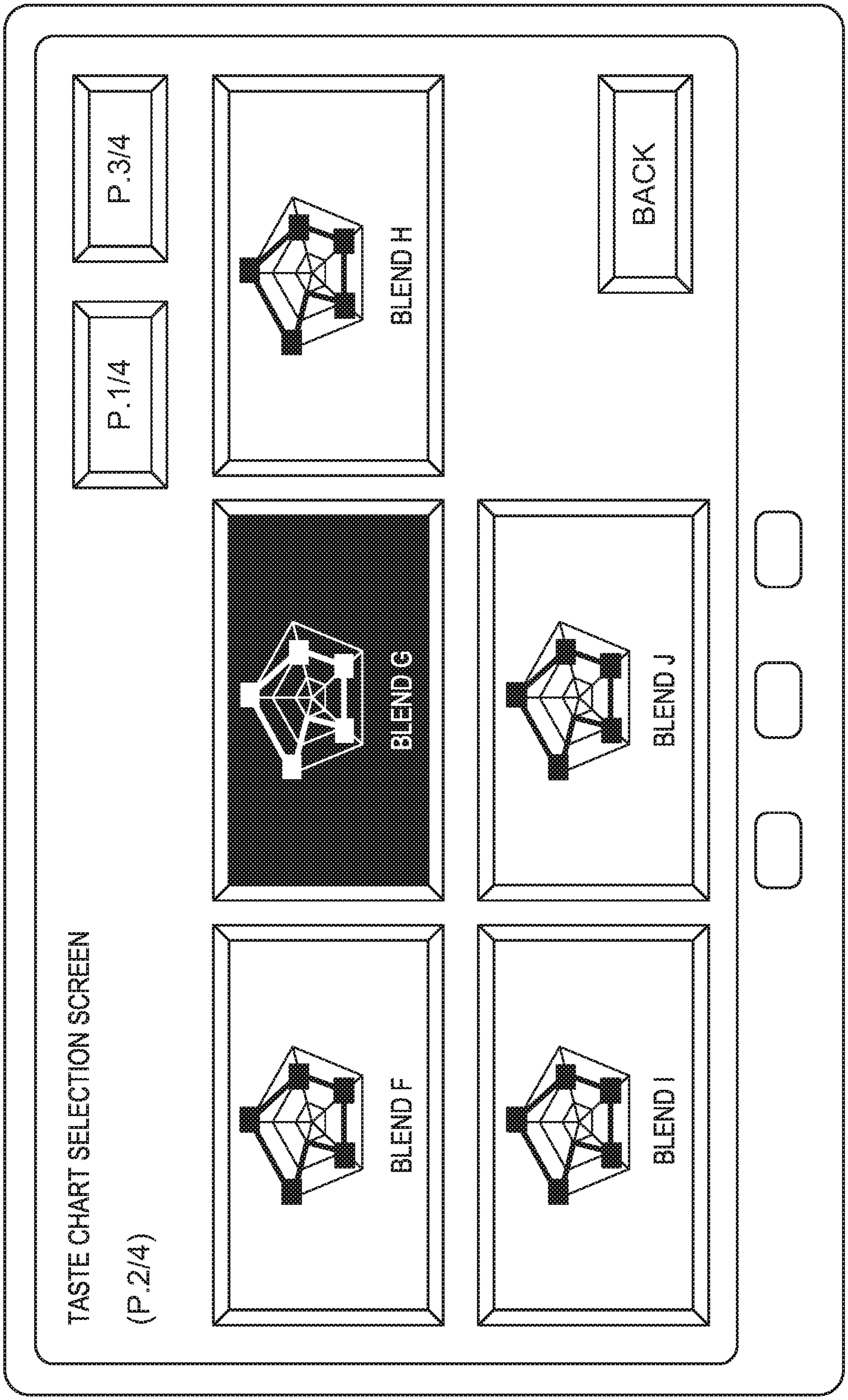
FIG. 97 is a view showing an example of display on an operation unit.
Figure 98:
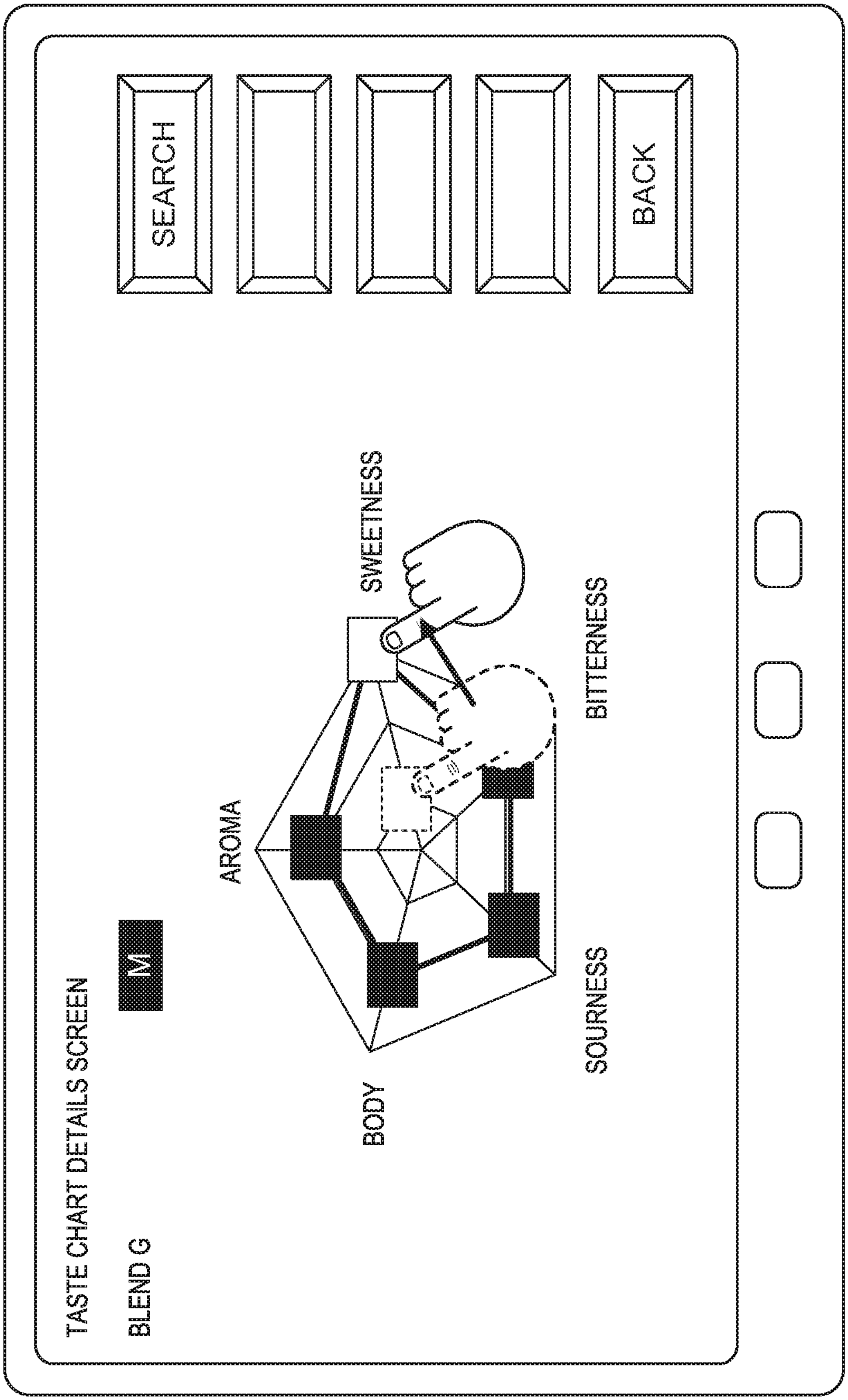
FIG. 98 is a view showing an example of display on an operation unit.
Figure 99:
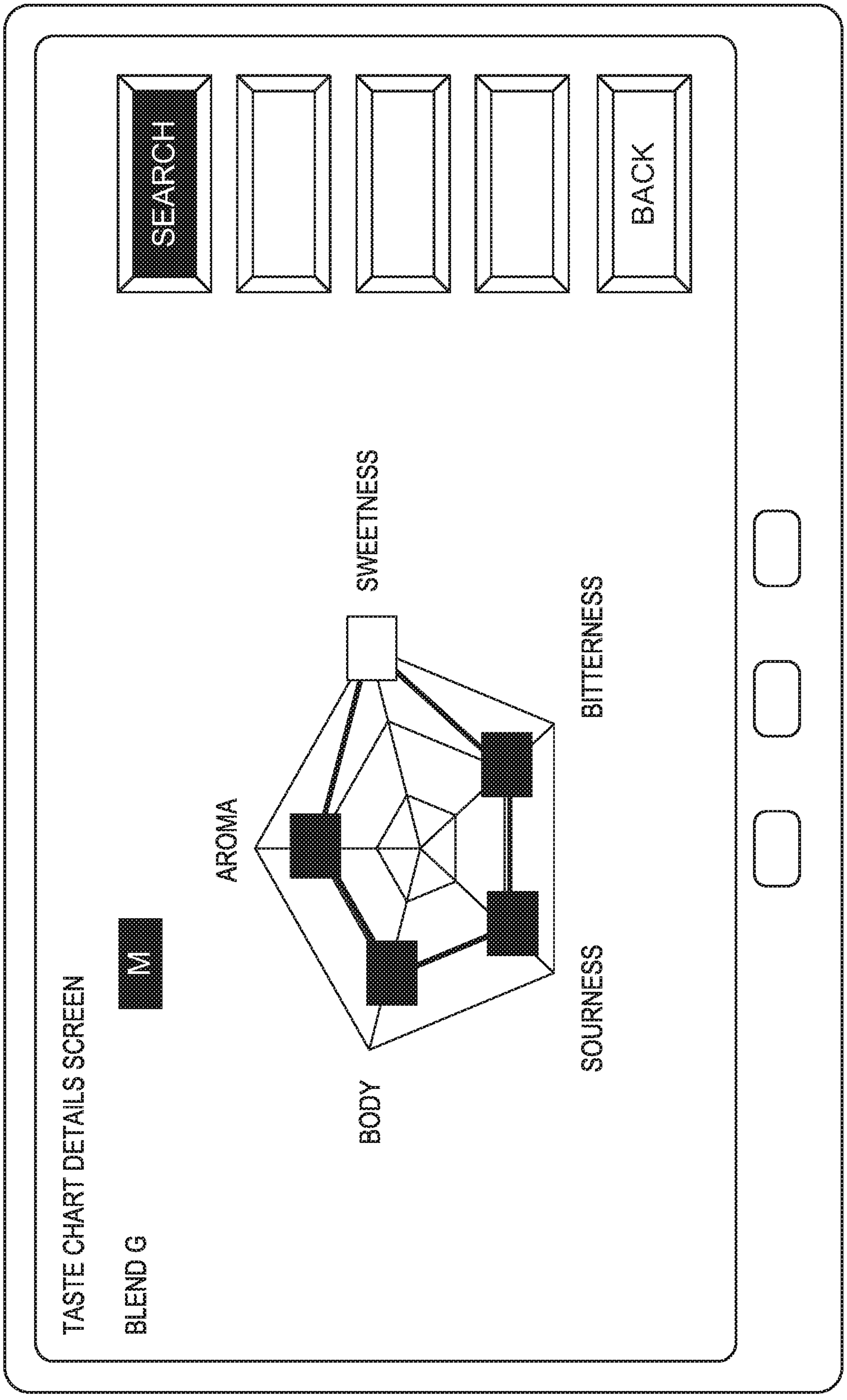
FIG. 99 is a view showing an example of display on an operation unit.

In the example shown in FIG. 95, the "BACK" icon is selected, and the screen returns to the taste chart selection screen, as shown in FIG. 96. In the example shown in FIG. 96, a "P.2/4" icon is selected. The screen advances to the next screen, and a screen shown in FIG. 97 is displayed. In the example shown in FIG. 97, the "blend G" icon is selected by the user. FIG. 98 shows an example of display after that. In this screen, the user performs a change operation (drag operation) of shifting the level of "sweetness" from "medium" to "high". By the drag operation, the "M" icon representing that correction is progressing is displayed. In the next screen shown in FIG. 99, the "SEARCH" icon is selected by the user. Thus, roasted coffee beans of types having the taste chart displayed in the screen shown in FIG. 99 or taste charts close to this are searched for.

Figure 100:
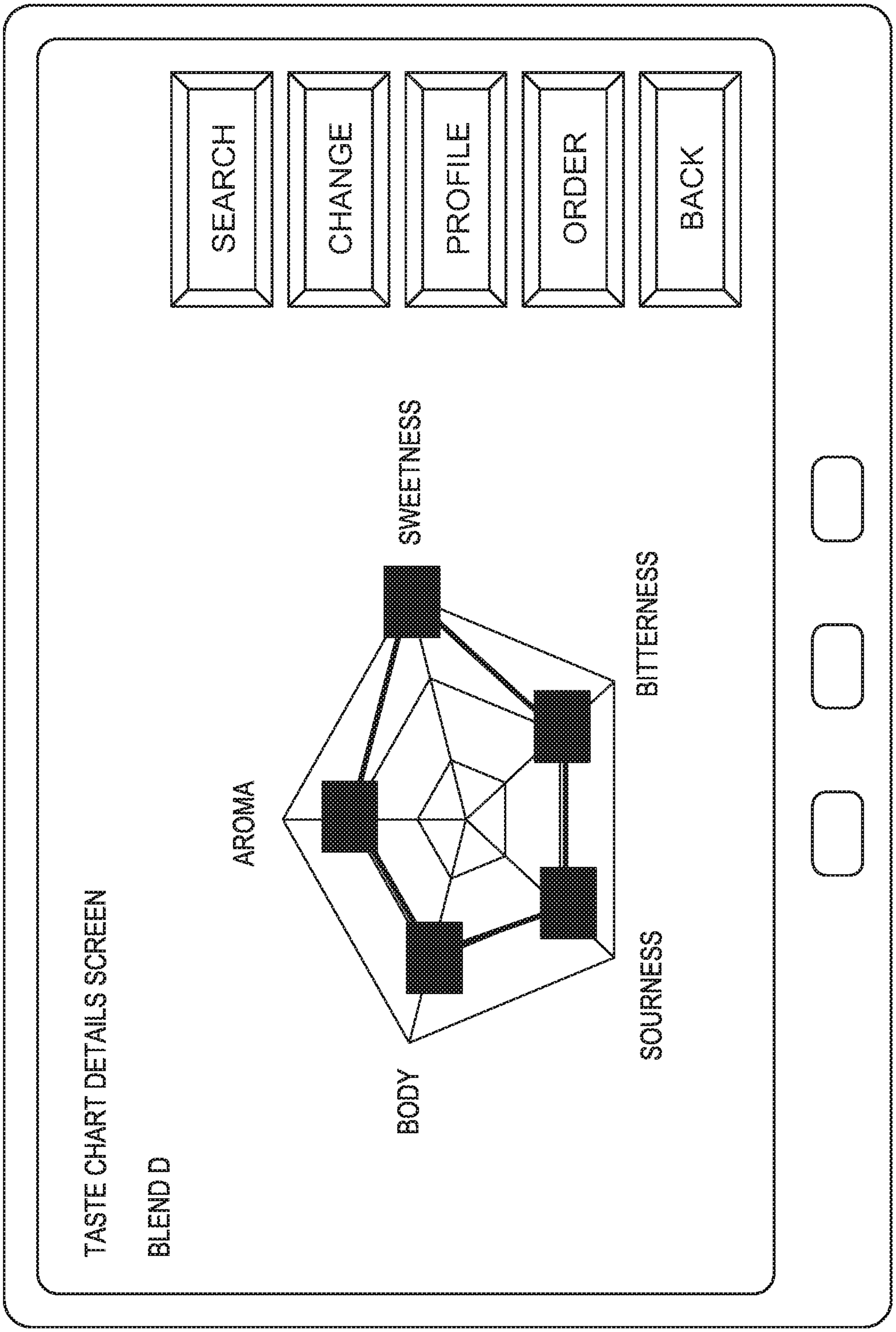
FIG. 100 is a view showing an example of display on an operation unit.

FIG. 100 shows an example of a screen showing the search result. Since there is one search result, a taste chart is displayed. In FIG. 100, the taste chart of the blend D is displayed. As can be seen, this taste chart is the same as the taste chart shown in FIG. 99 in which "aroma", "sweetness", "bitterness", "sourness", and "body" are "medium", "high", "medium", "medium", and "medium", respectively.

Figure 101:
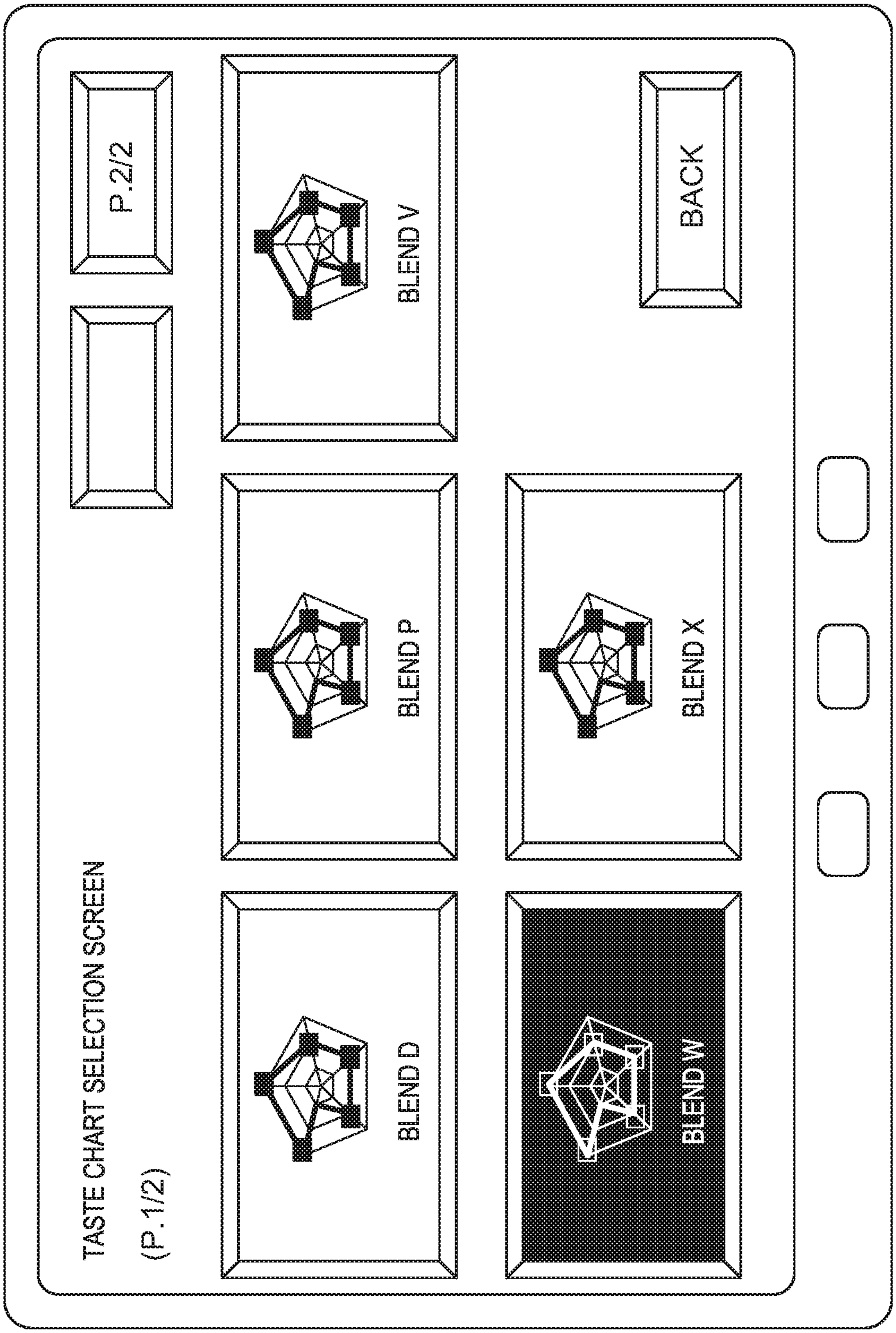
FIG. 101 is a view showing an example of display on an operation unit.
Figure 102:
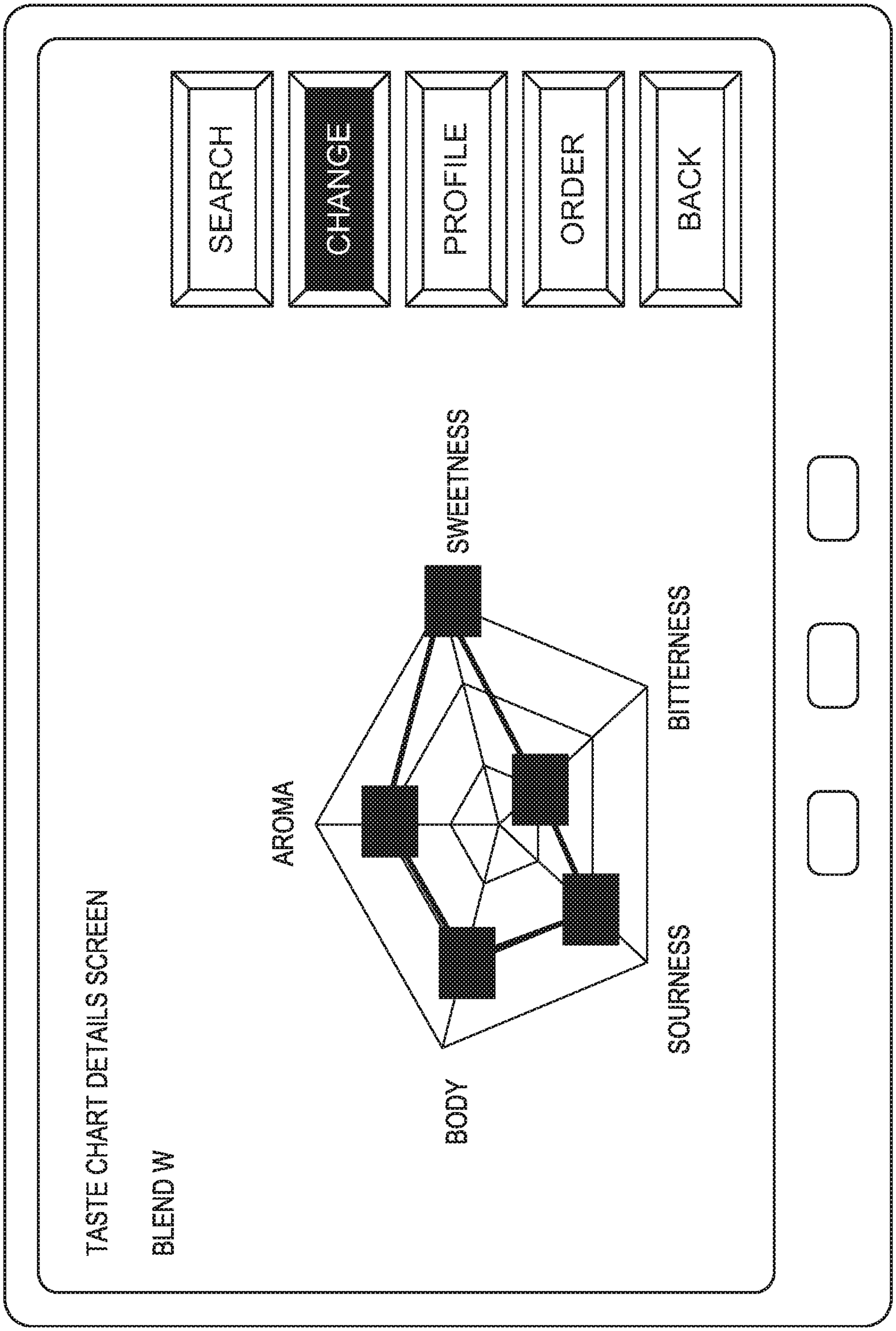
FIG. 102 is a view showing an example of display on an operation unit.

FIG. 101 shows a case in which roasted coffee beans of types of a matching taste chart do not exist, and shows an example of a screen that is displayed when roasted coffee beans of a plurality of types having close taste charts are found instead. Here, the icons of "blend D", "blend P", "blend V", and the like are listed, and the user selects "blend W". The taste chart of "blend W" is thus displayed, as shown in FIG. 102. The user selects the "CHANGE" icon, and the taste chart of other characteristics of "blend W" is thus displayed, as shown in FIG. 103.

Figure 103:
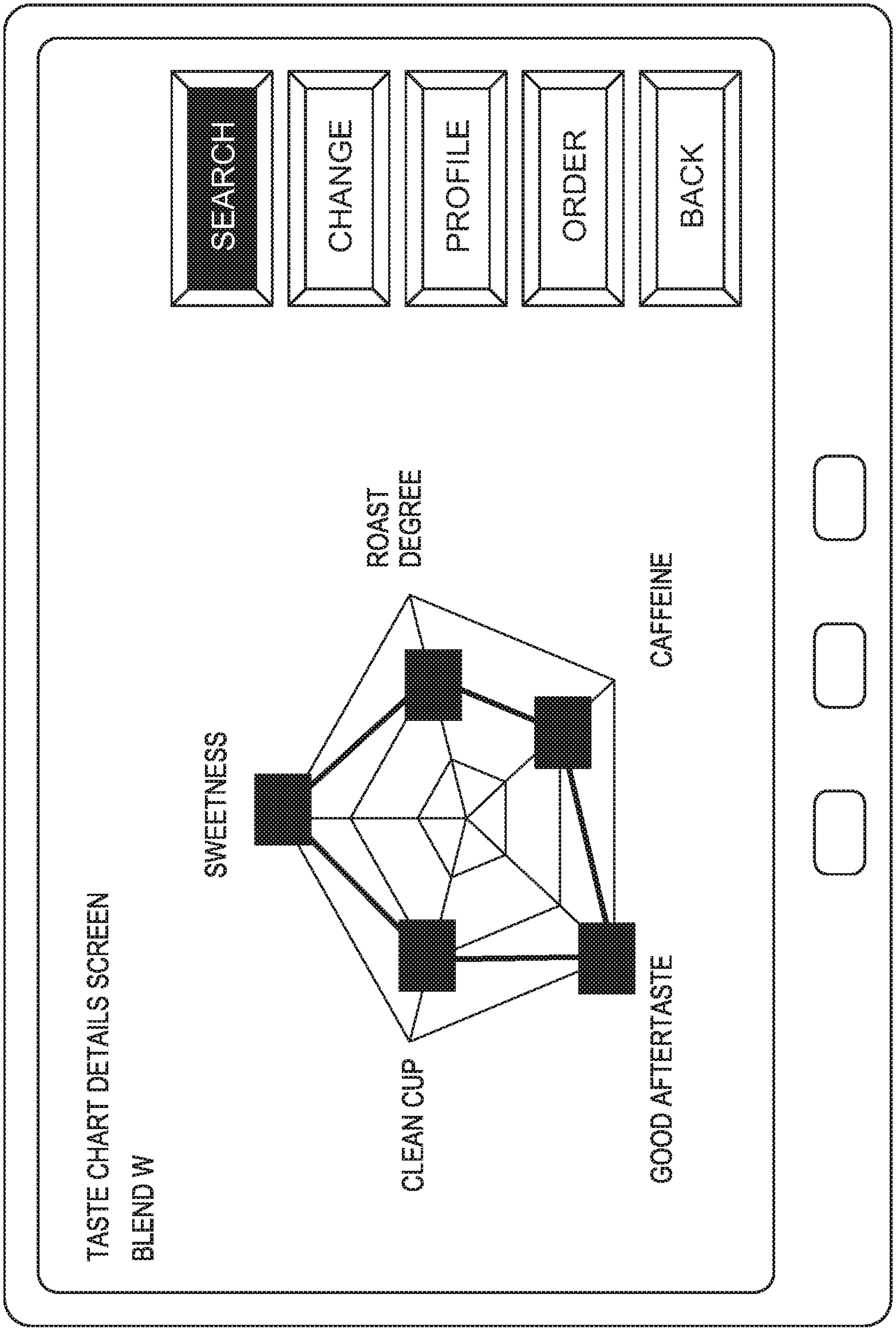
FIG. 103 is a view showing an example of display on an operation unit.

In the screen shown in FIG. 103, the "SEARCH" icon is selected by the user. Thus, roasted coffee beans of types having the taste chart displayed in the screen shown in FIG. 103 or taste charts close to this are searched for.

Figure 104:
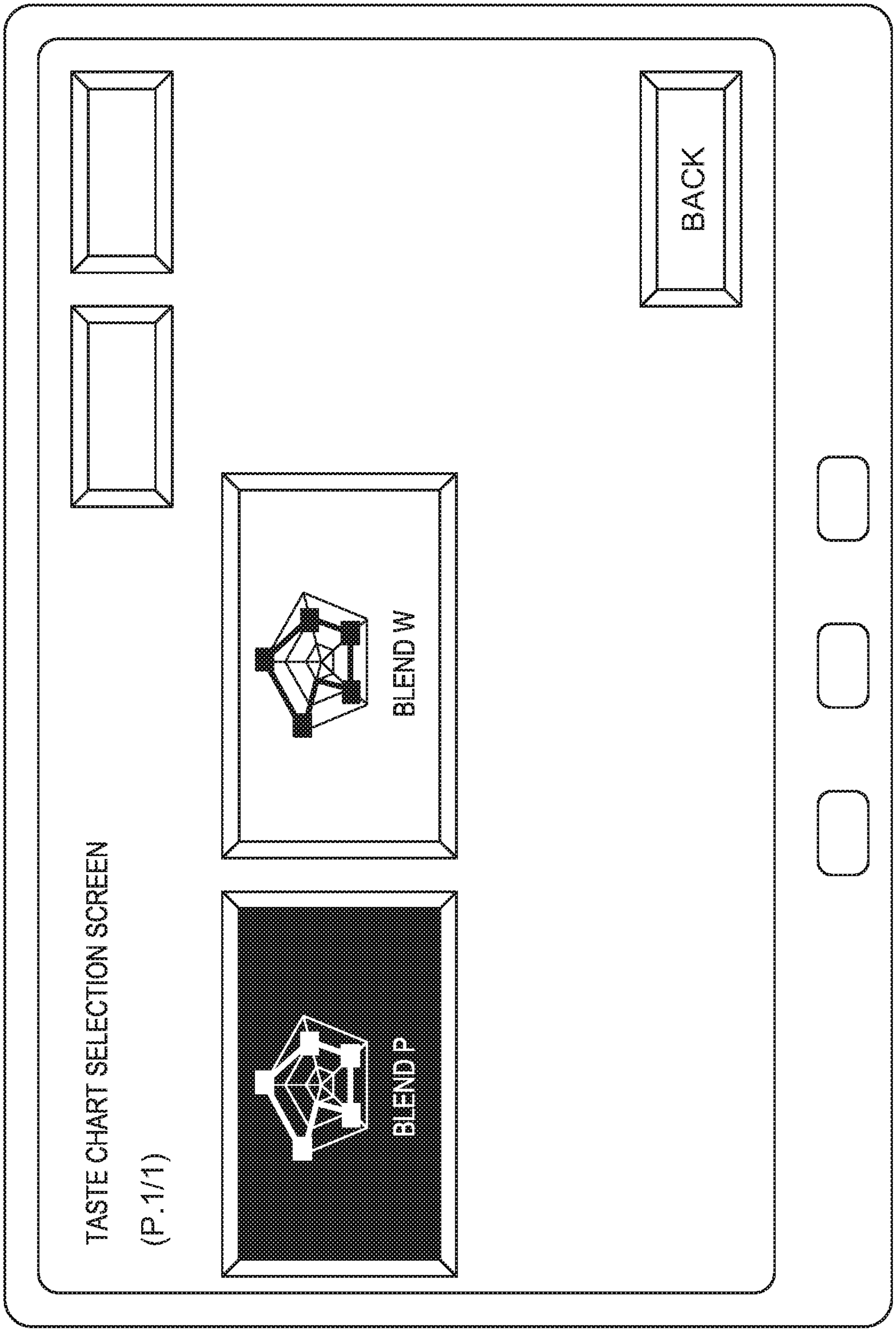
FIG. 104 is a view showing an example of display on an operation unit.
Figure 105:
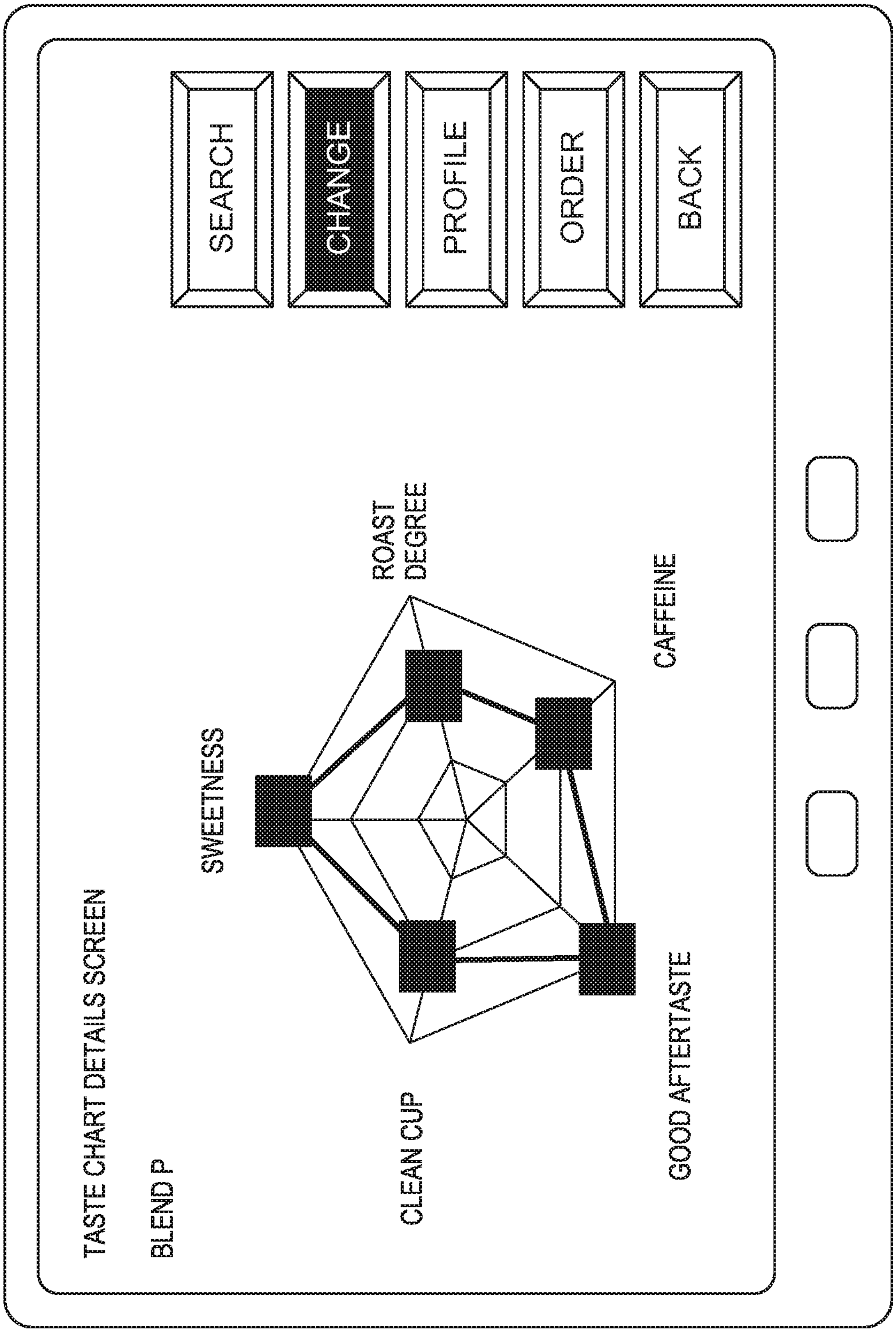
FIG. 105 is a view showing an example of display on an operation unit.

FIG. 104 shows search results. The icons of roasted coffee beans of two types "blend P" and "blend W" are displayed, and the user selects the "blend P". The taste chart of "blend P" is thus displayed, as shown in FIG. 105. The user selects the "CHANGE" icon, and the taste chart of other characteristics of "blend P" is thus displayed, as shown in FIG.

106. In the taste chart shown in FIG. 105 and the taste chart shown in FIG. 106, some characteristics overlap. In the taste chart switched by the "CHANGE" icon, not all the characteristics need be different.

Figure 106:
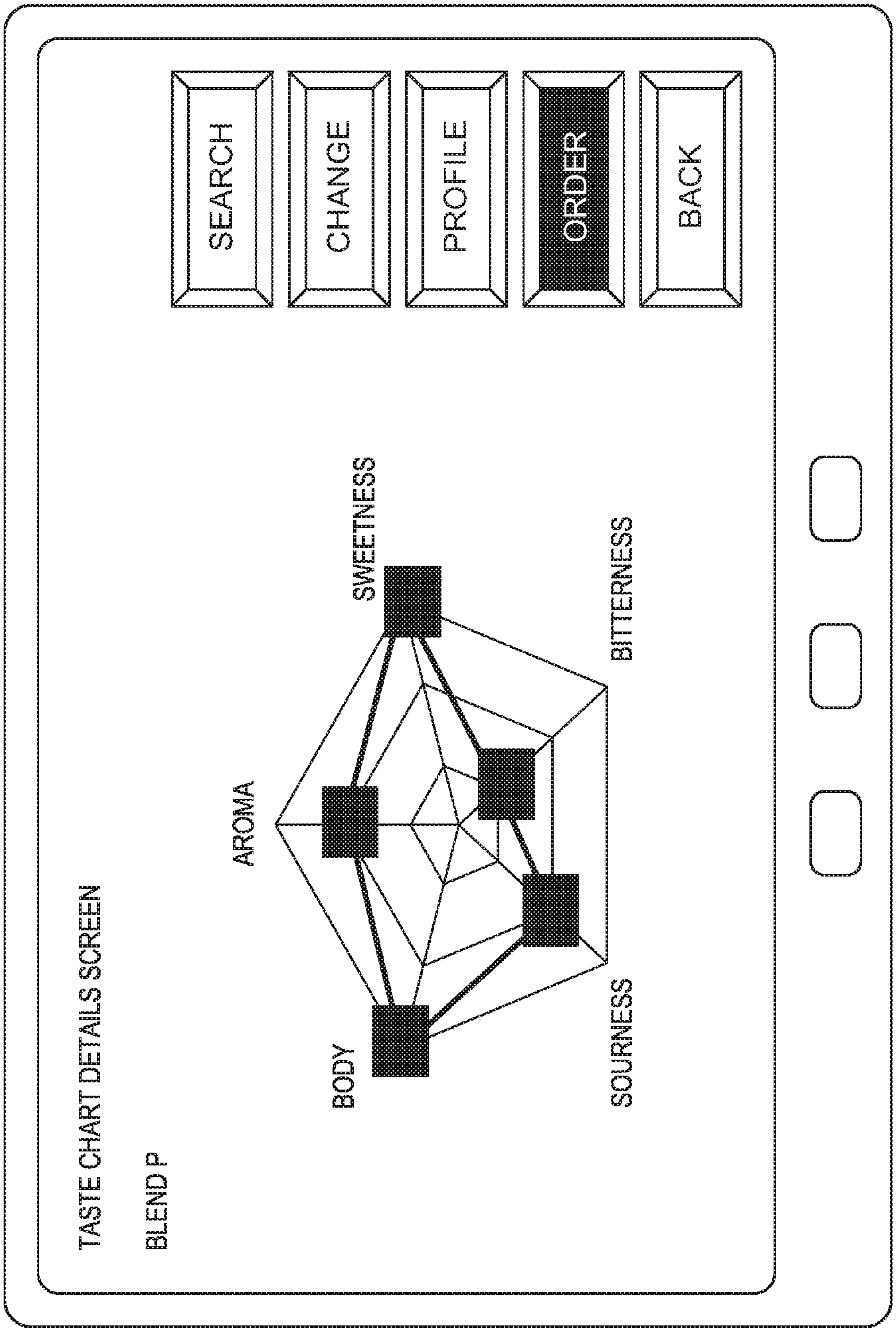
FIG. 106 is a view showing an example of display on an operation unit.
Figure 107:
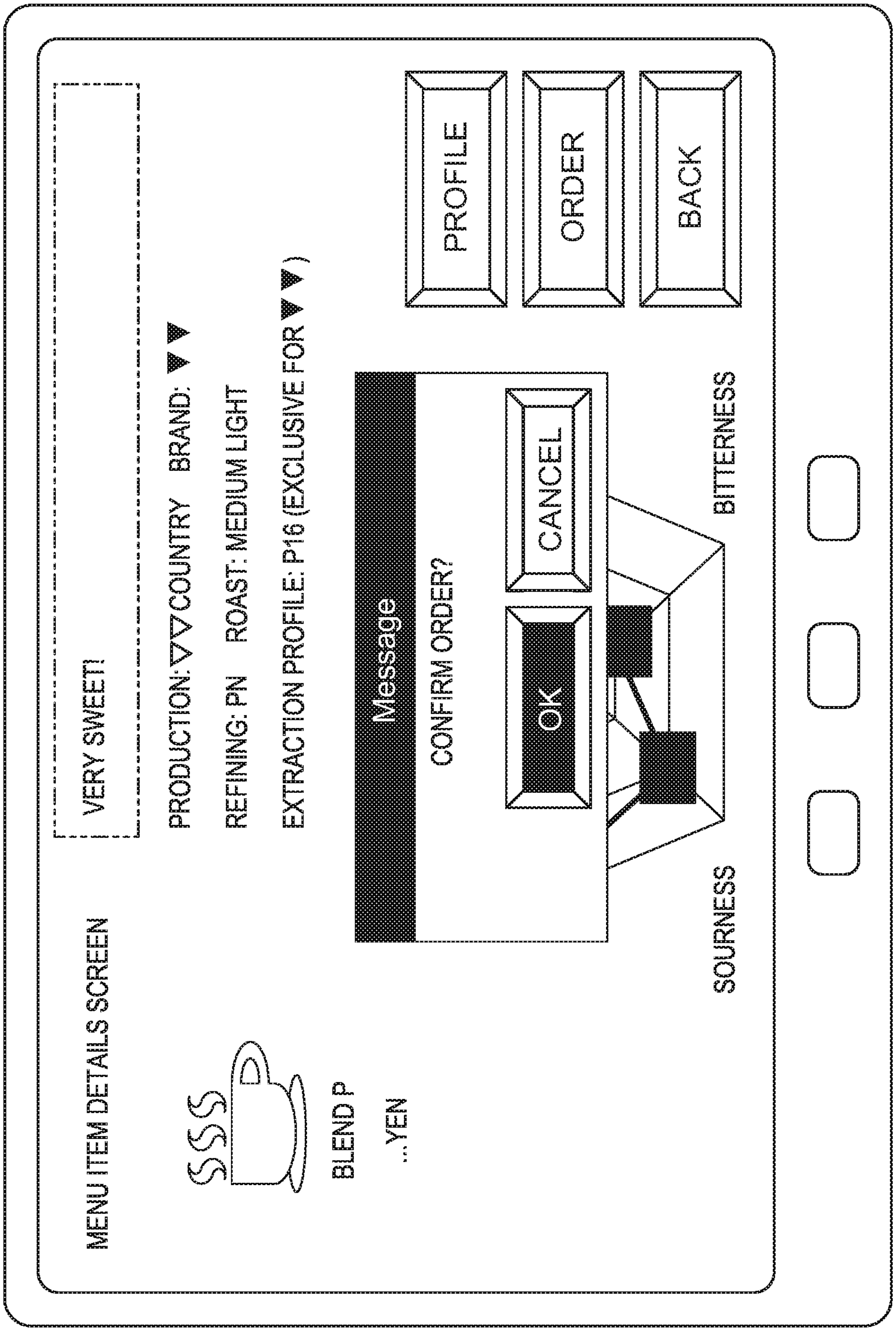
FIG. 107 is a view showing an example of display on an operation unit.

In the screen shown in FIG. 106, the "ORDER" icon is selected. FIG. 107 shows an example of display after that. In FIG. 107, an order confirmation screen is displayed, and "OK" is selected by the user.

Figure 108:
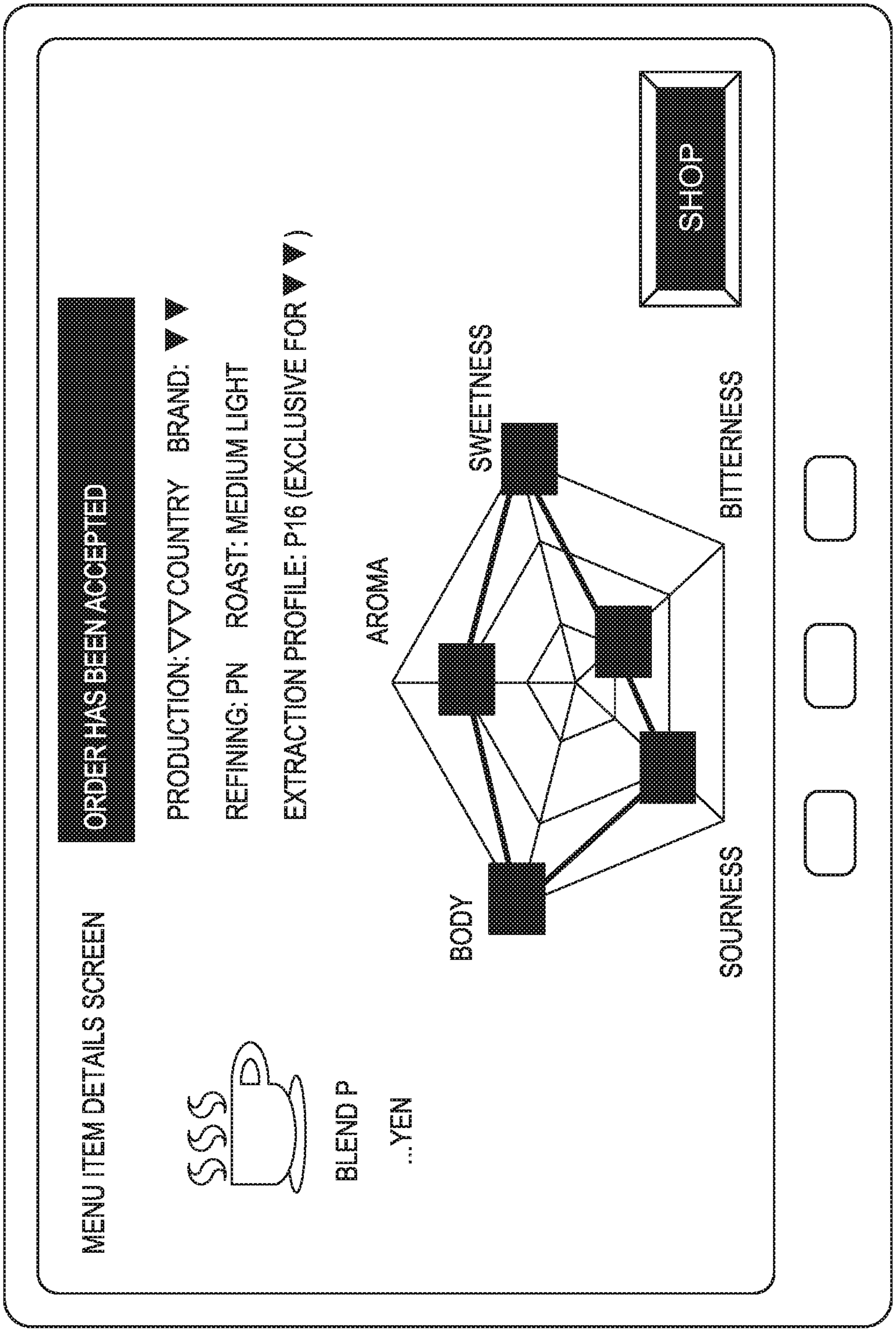
FIG. 108 is a view showing an example of display on an operation unit.

The screen thus transitions to a screen shown in FIG. 108. The menu item details screen of "blend P" whose order has been accepted is displayed again, and an acceptance confirmation message "order has been accepted" is displayed.

After that, the processing unit 11*a* supplies roasted coffee beans corresponding to "blend P" from the storage apparatus 4, controls the beverage producing apparatus 1 in accordance with the producing conditions corresponding to "blend P", and automatically produces the coffee beverage. In the display shown in FIG. 108, the "SHOP" icon is selected, and the screen returns to the initial screen shown in FIG. 62.

Figure 109:
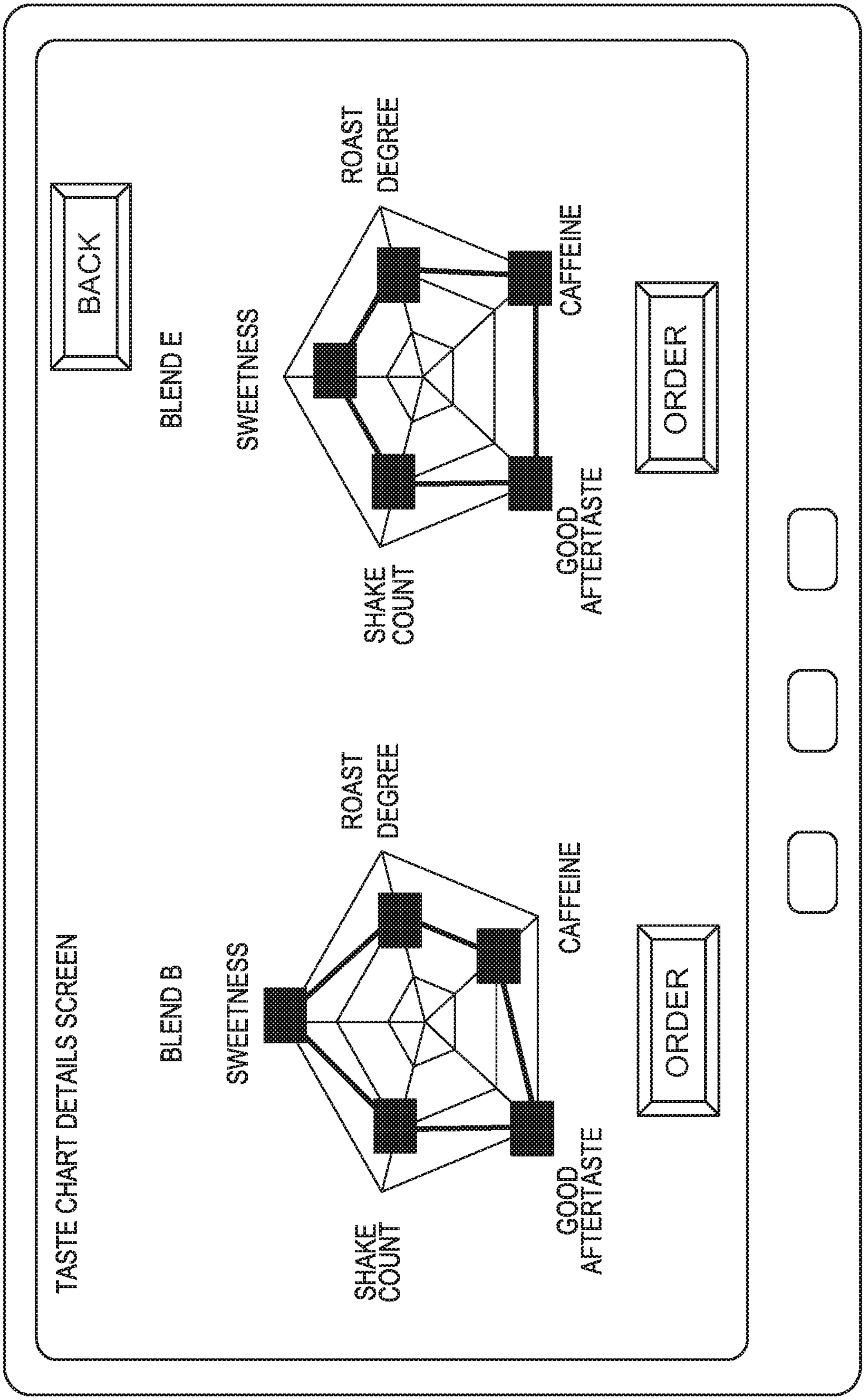
FIG. 109 is a view showing an example of display on an operation unit.

Note that in the above-described example, a taste chart concerning roasted coffee beans of one type is displayed in one screen. However, taste charts concerning roasted coffee beans of two or more types may simultaneously be displayed. FIG. 109 shows its example.

In the screen shown in FIG. 109, the taste chart of "blend B" and the taste chart of "blend E" are simultaneously displayed. In addition, "shake count" is included as a characteristic. "Shake count" is the count of the above-described shaking operation that is performed for the purpose of stirring the contents in the extraction container 9 before or after the inverting operation in step S16. Smoothness may change depending on the count. The characteristics of the operation of the extraction container 9 can also be included in the characteristics of the taste chart.

<Past Order>

A case in which "past order" is selected in the initial screen shown in FIG. 62 will be described next. "Past order" is used to allow the user to easily order a coffee beverage to be ordered from the types of coffee beverages ordered in the past. That is, the history of orders is saved and used. The history of orders can be, for example, a history in a day or during a table use time at each table in a store.

Figure 110:
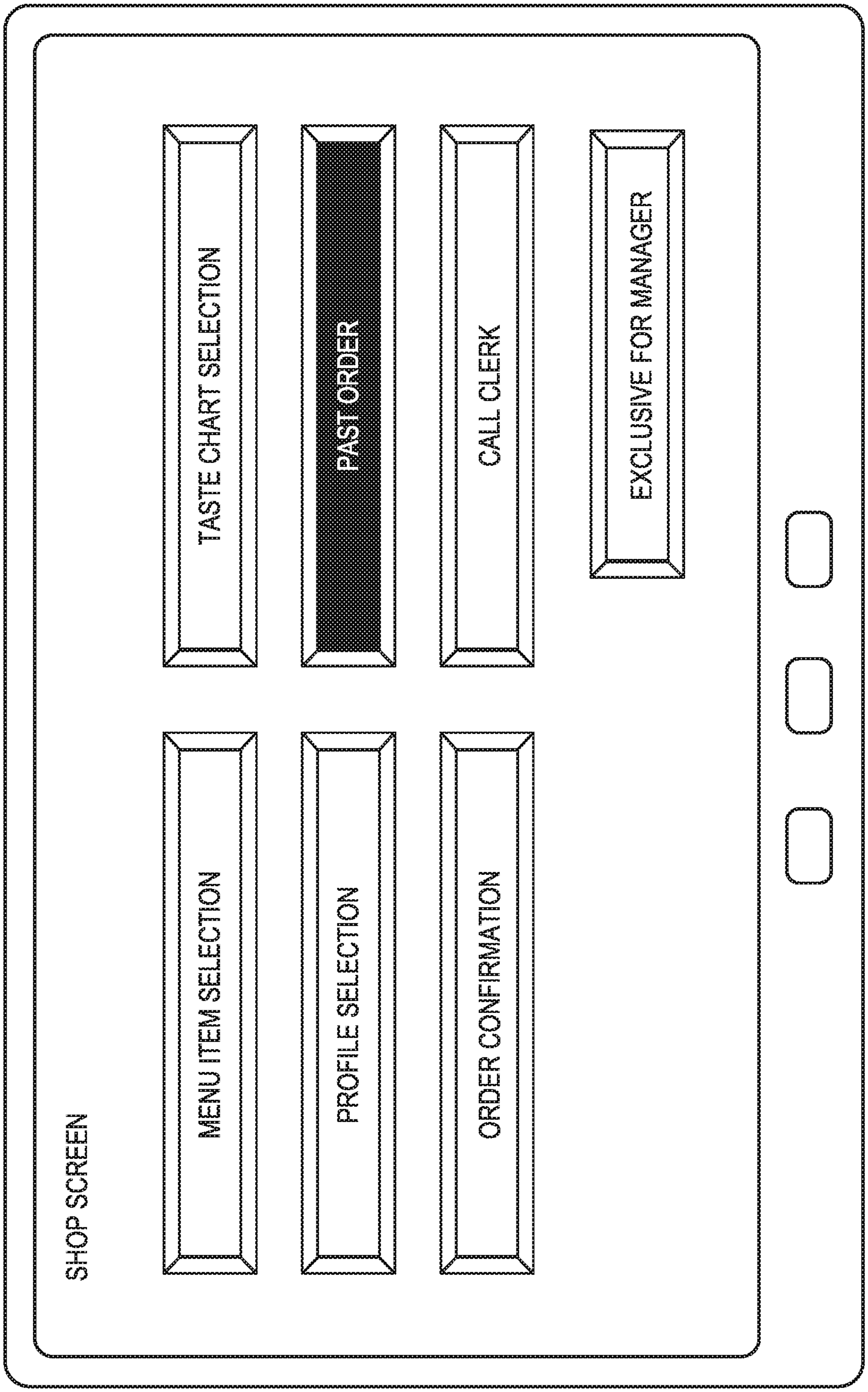
FIG. 110 is a view showing an example of display on an operation unit.
Figure 111:
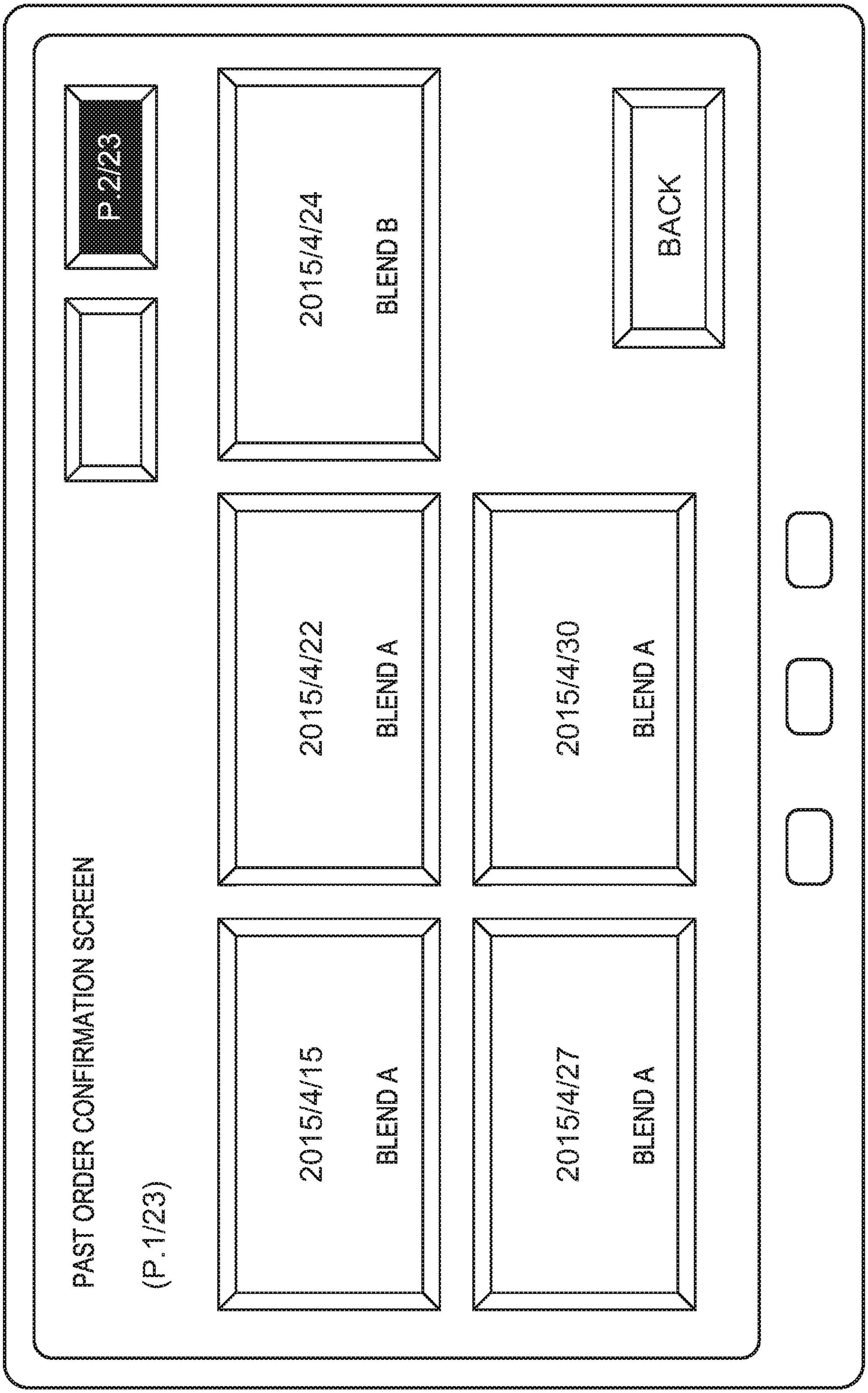
FIG. 111 is a view showing an example of display on an operation unit.
Figure 112:
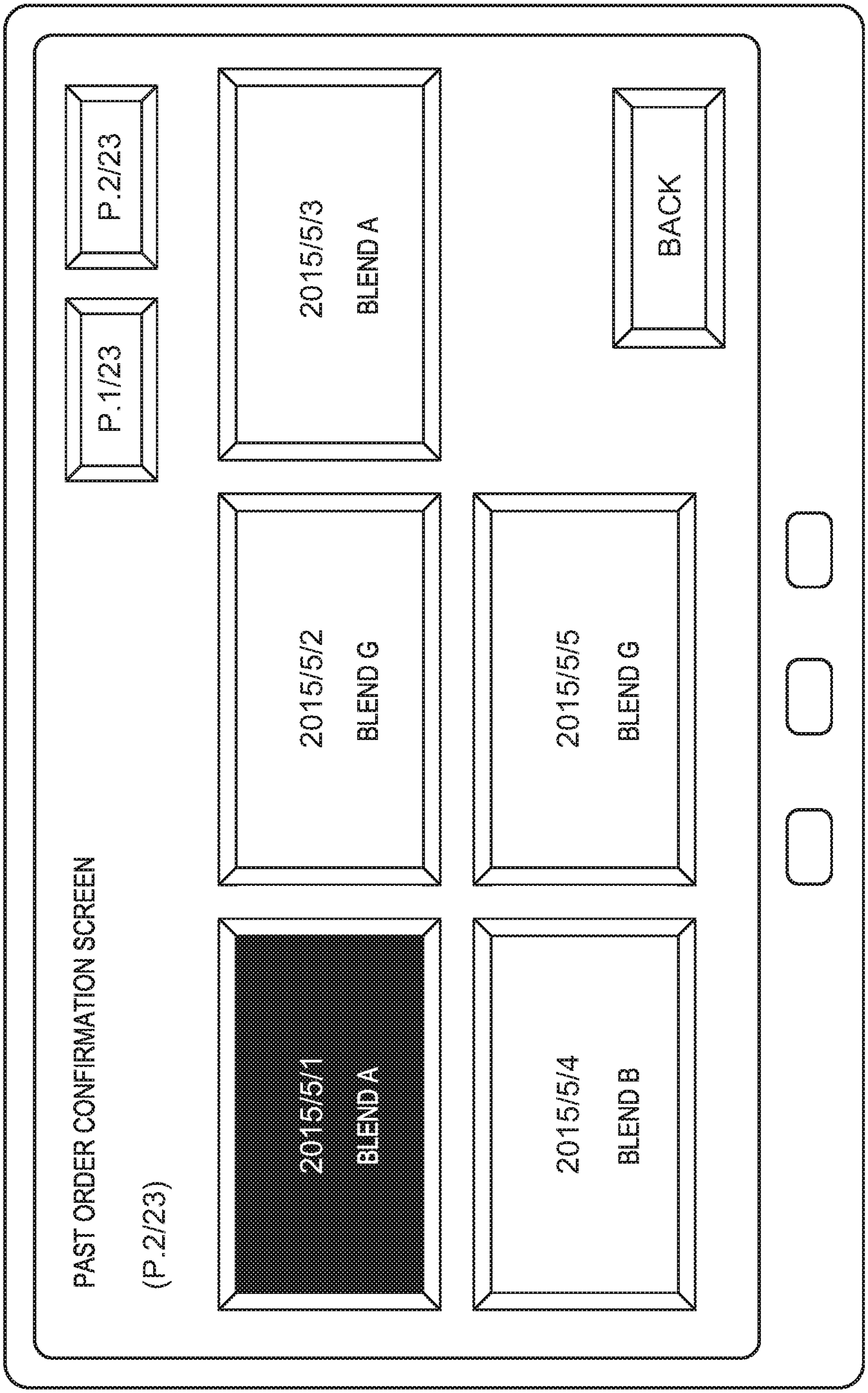
FIG. 112 is a view showing an example of display on an operation unit.

FIG. 110 exemplarily shows a case in which "past order" is selected by the user. After confirmation processing of the user, the icons of history orders are displayed, as shown in FIG. 111. In the example shown in FIG. 111, a "P.2/23" icon is selected. The screen advances to the next screen, and a screen shown in FIG. 112 is displayed. The icon of "May 1, 2015 blend A" is selected. This icon represents that "blend A" was ordered on May 1, 2015.

Figure 113:
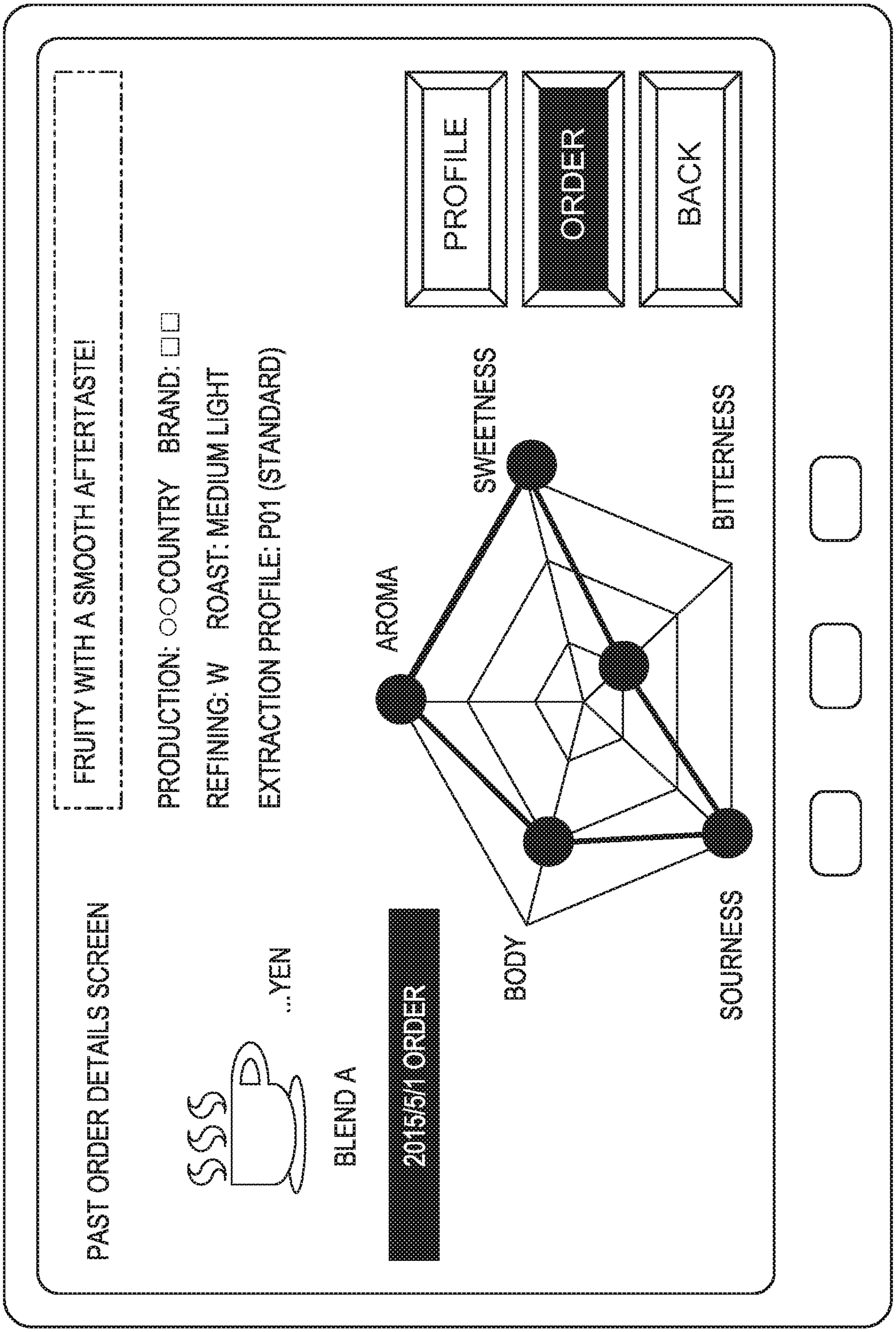
FIG. 113 is a view showing an example of display on an operation unit.
Figure 114:
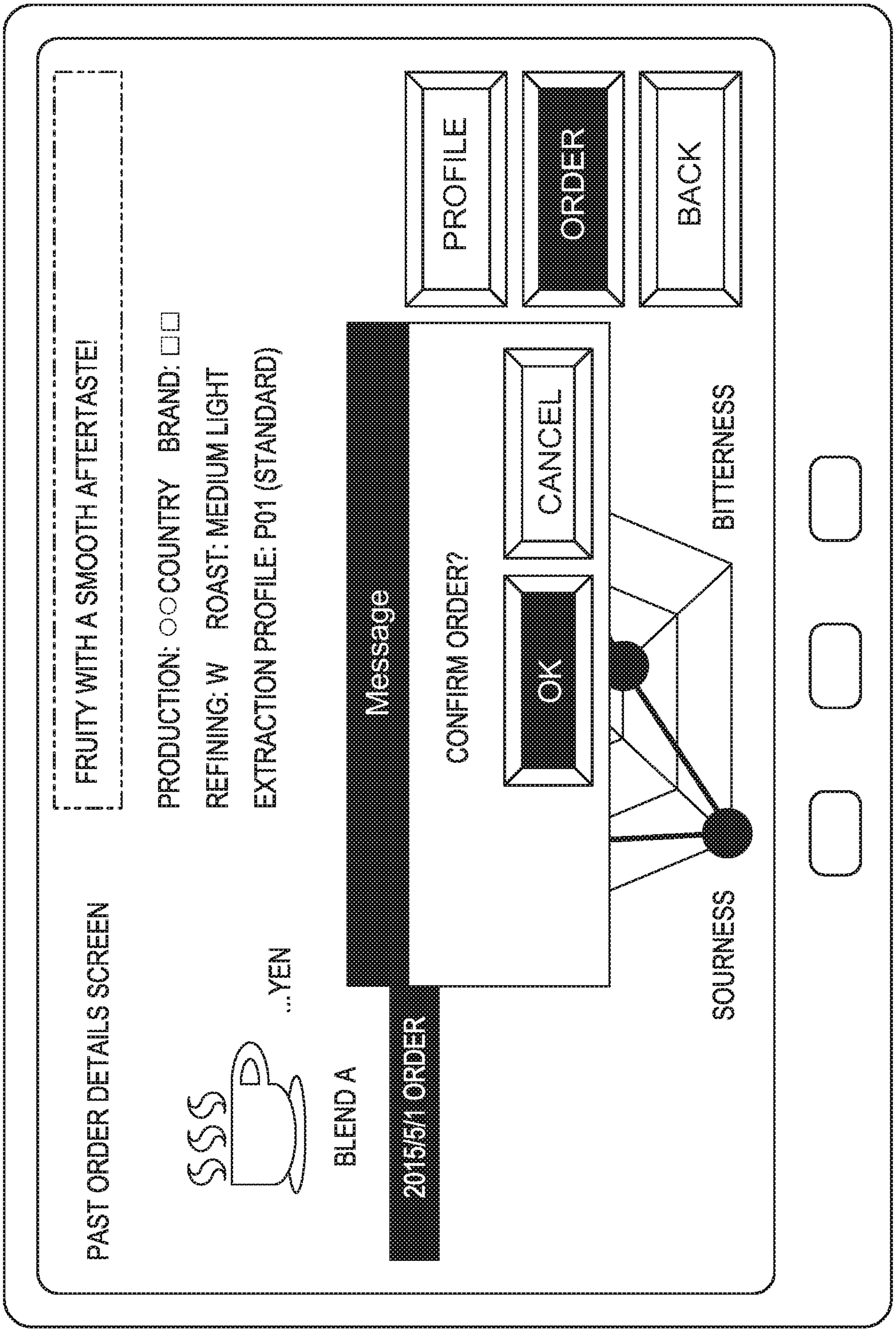
FIG. 114 is a view showing an example of display on an operation unit.

The display screen thus transitions to display shown in FIG. 113. A past order details screen representing detailed contents of the past order is displayed. In the screen shown in FIG. 113, the "ORDER" icon is selected. FIG. 114 shows an example of display after that. FIG. 114 shows an order confirmation screen, and "OK" is selected by the user.

Figure 115:
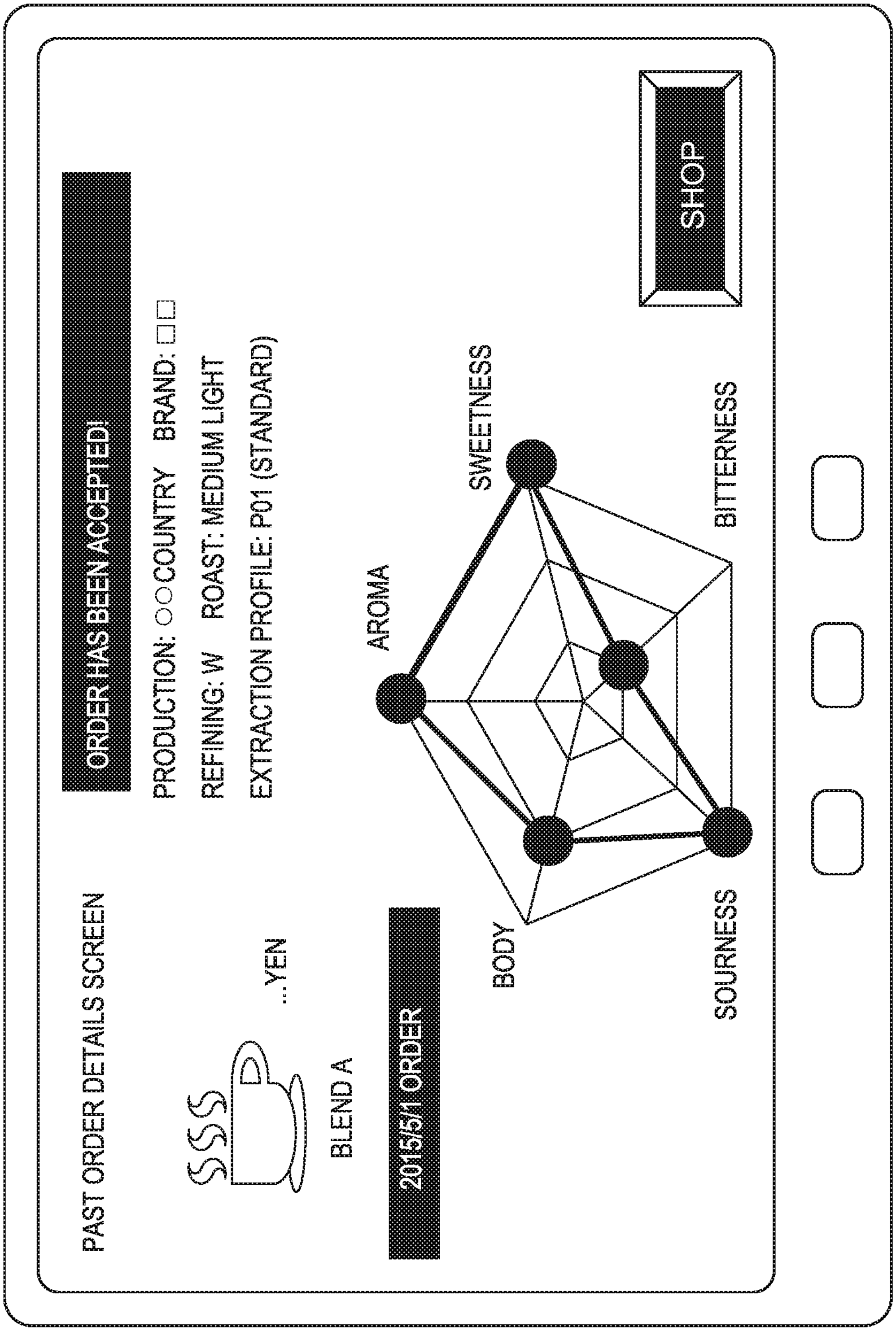
FIG. 115 is a view showing an example of display on an operation unit.

The screen thus transition to a screen shown in FIG. 115. The past order details screen of "blend A" whose order has been accepted is displayed again, and an acceptance confirmation message "order has been accepted" is displayed.

After that, the processing unit 11*a* supplies roasted coffee beans corresponding to "blend A" from the storage apparatus 4, controls the beverage producing apparatus 1 in accordance with the producing conditions corresponding to "blend A", and automatically produces the coffee beverage. In the display shown in FIG. 115, the "SHOP" icon is selected, and the screen returns to the initial screen shown in FIG. 62.

<Order Confirmation>

A case in which "order confirmation" is selected in the initial screen shown in FIG. 62 will be described next. "Order confirmation" is used to provide information concerning the producing state of an ordered coffee beverage or perform processing concerning cancel of an order. The information concerning the producing state and the like is stored in the storage unit 11*b* and updated by the processing unit 11*a*.

Figure 116:
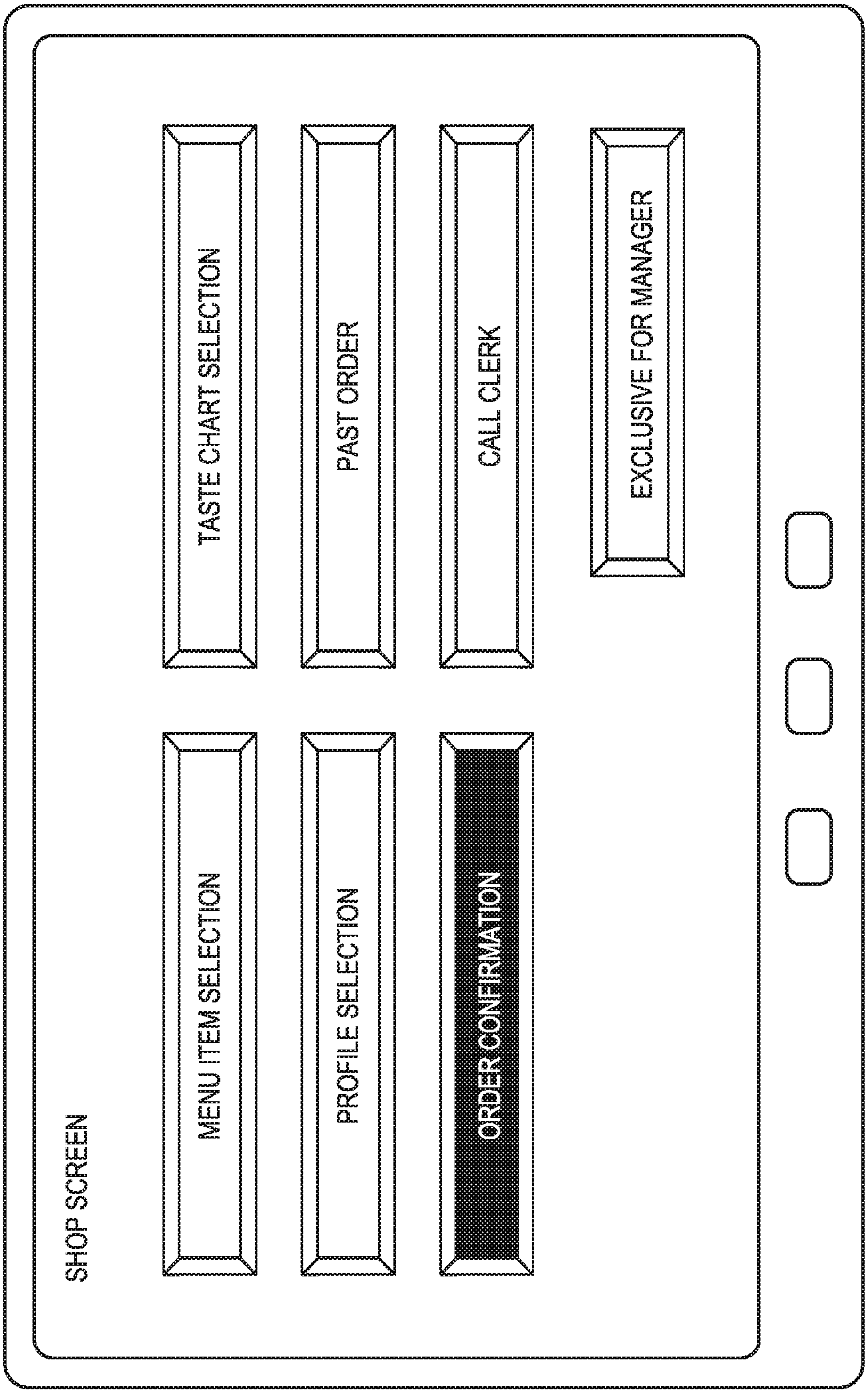
FIG. 116 is a view showing an example of display on an operation unit.
Figure 117:
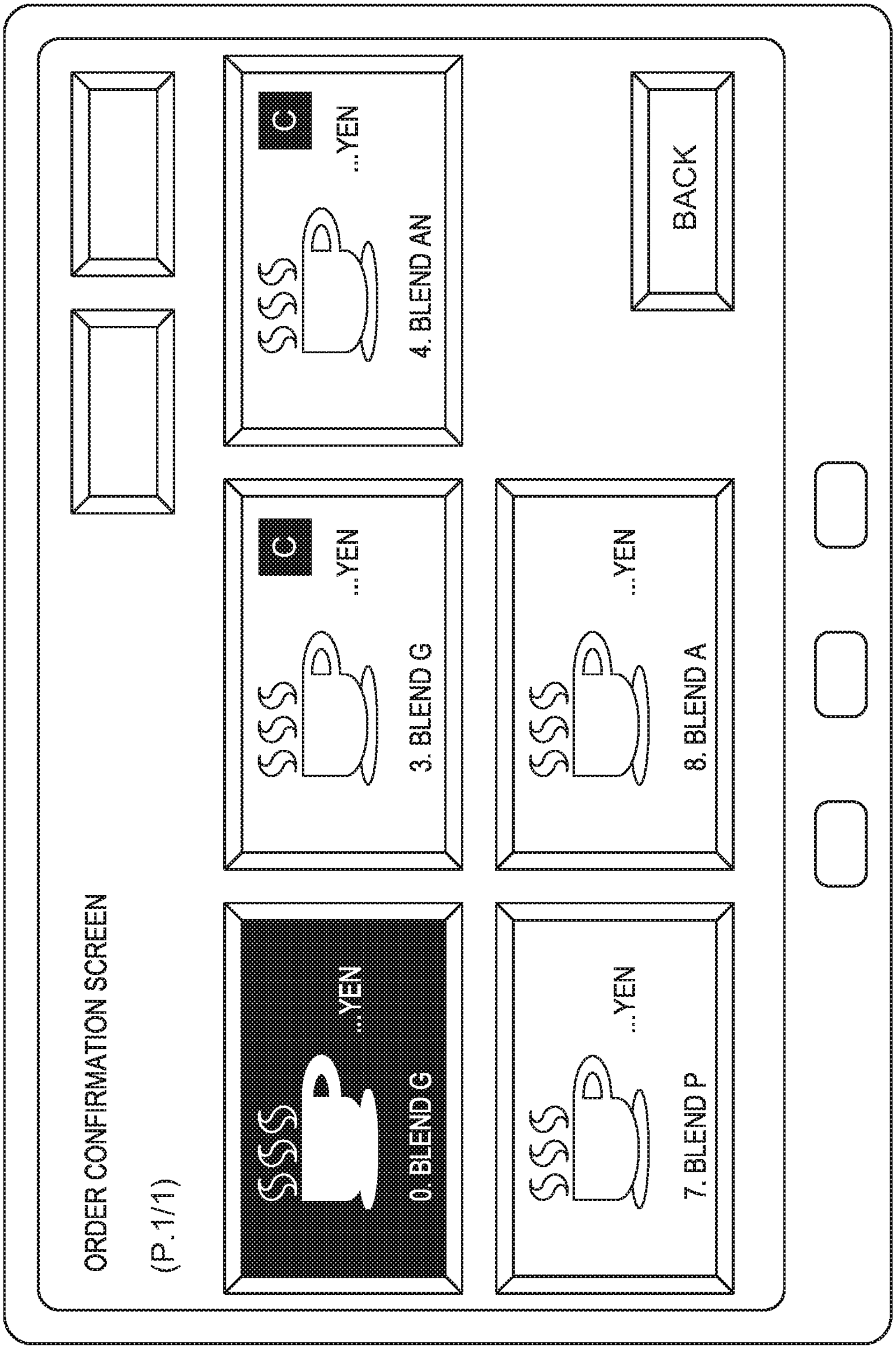
FIG. 117 is a view showing an example of display on an operation unit.

FIG. 116 exemplarily shows a case in which "order confirmation" is selected by the user, and the screen thus transitions to an order confirmation screen shown in FIG. 117. In the order confirmation screen, order icons each representing an accepted order are displayed. An order icon includes an illustration of a coffee cup, a wait number, a menu item name such as blend A, and display of a price such as "... yen". A customized order also includes the "C" icon. In the example shown in FIG. 117, an order icon with a wait number "0" is selected by the user, and the screen transitions to an order details screen shown in FIG. 118. The wait number "0" indicates that the coffee beverage is currently being produced. A wait number "3" indicates that there are three preceding orders (the order of the user himself/herself is the fourth order).

Figure 118:
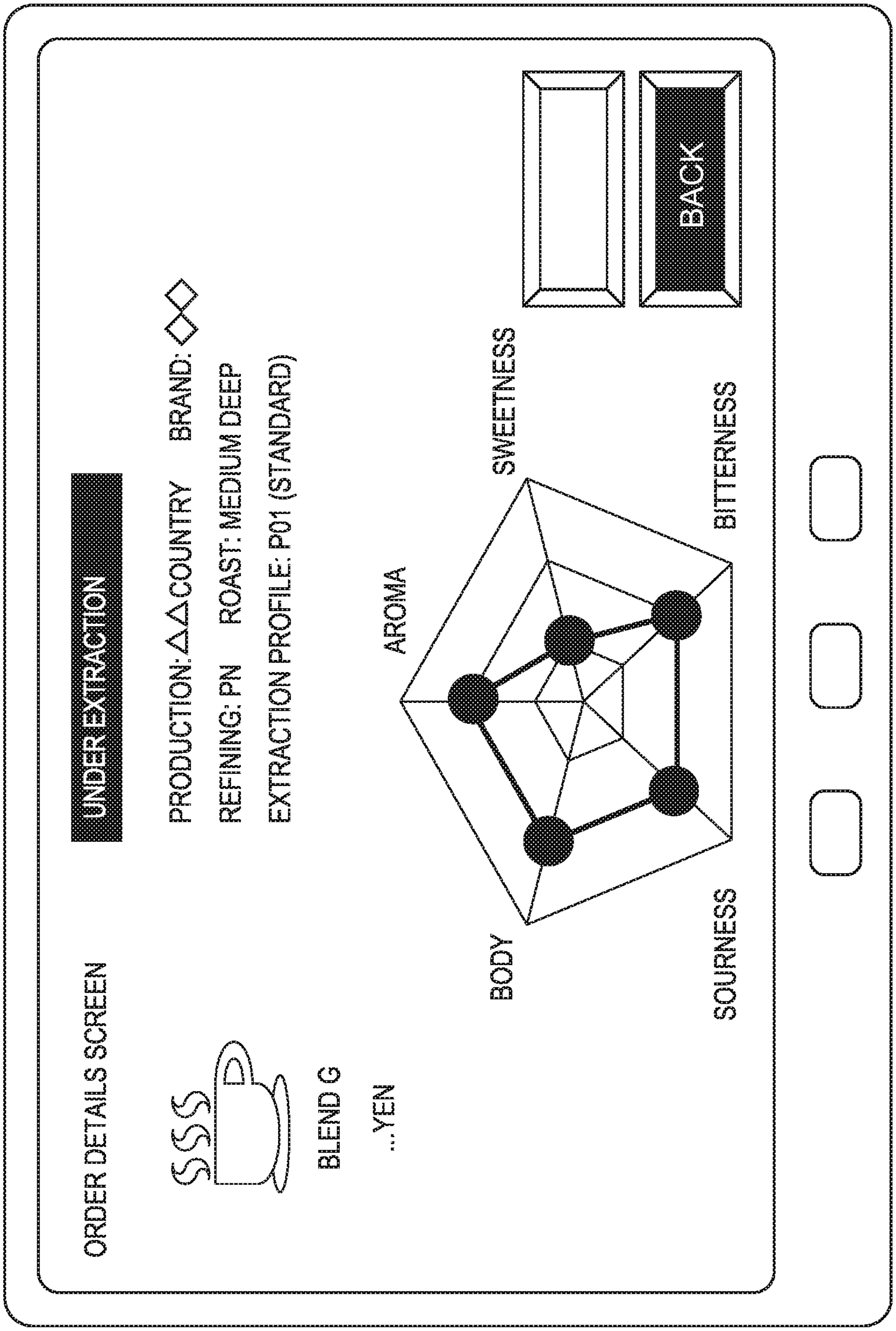
FIG. 118 is a view showing an example of display on an operation unit.

The order details screen shown in FIG. 118 displays the contents of the coffee beverage as the order target and that the coffee beverage is currently ordered (display of "under extraction"). In the example shown in FIG. 118, the "BACK" icon is selected, and the screen returns to the order confirmation screen, as shown in FIG. 119.

Figure 119:
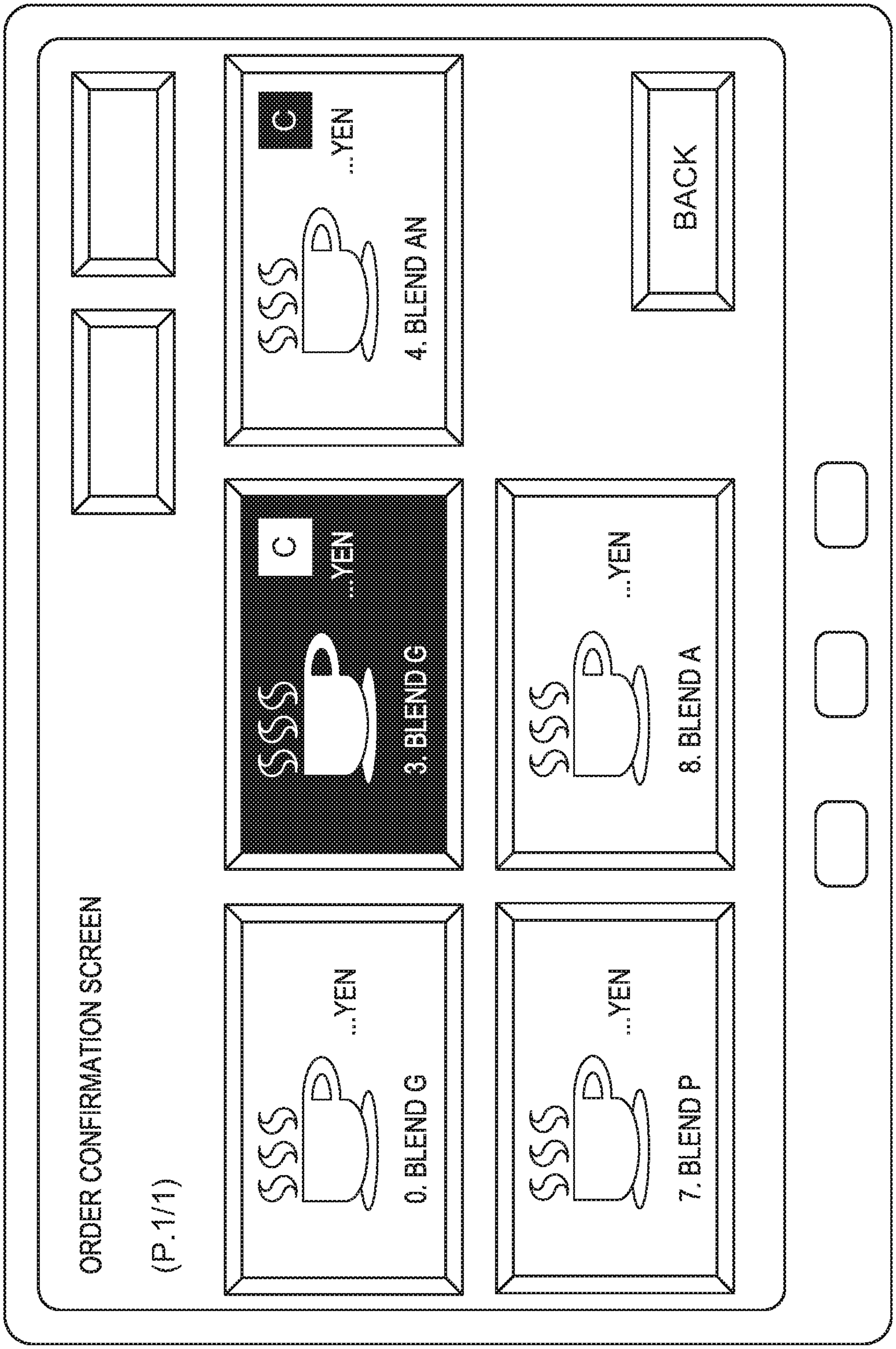
FIG. 119 is a view showing an example of display on an operation unit.
Figure 120:
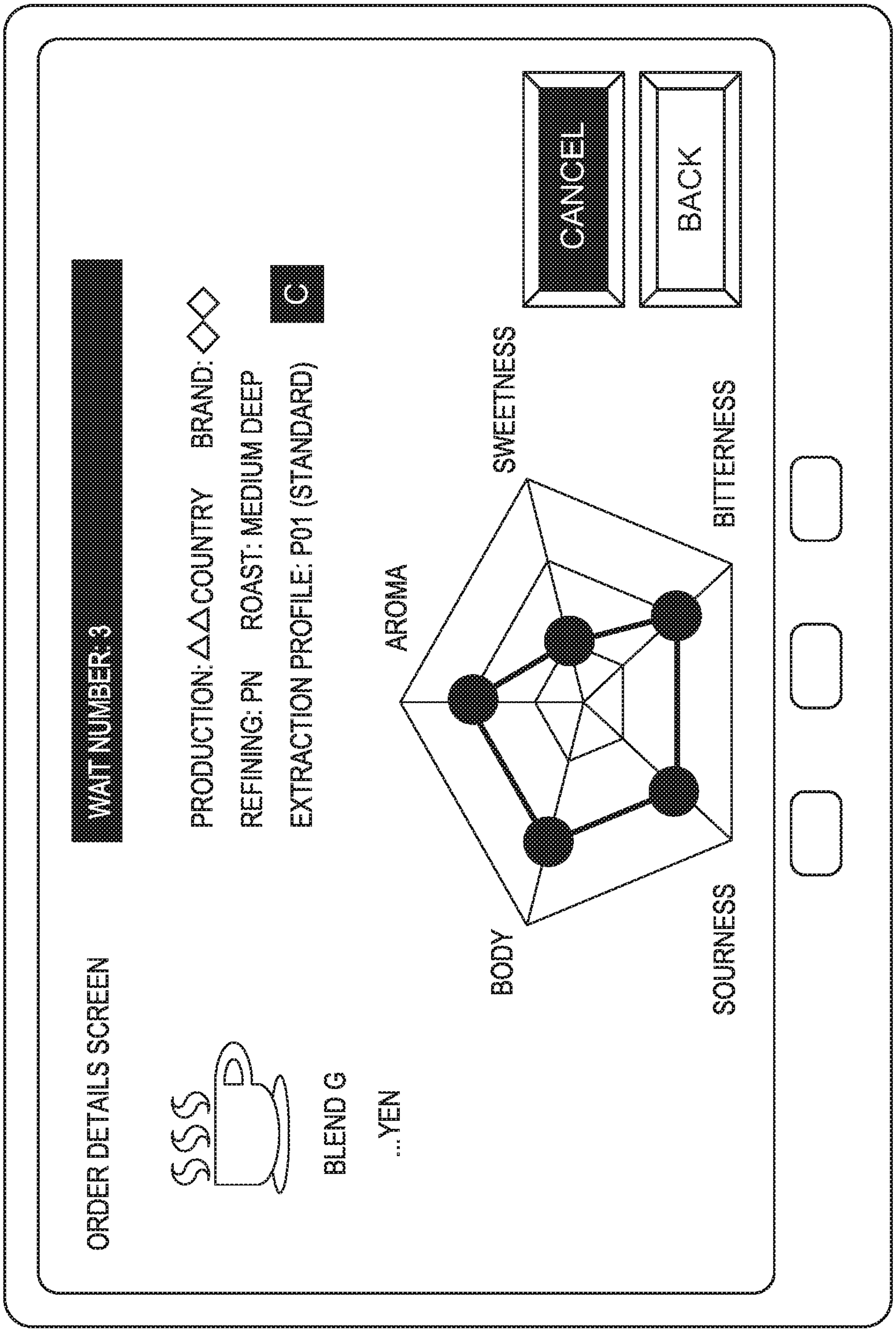

In the example shown in FIG. 119, the order icon of "blend G" with a wait number "3" is selected by the user, and the screen transitions to the order details screen shown in FIG. 120. The order details screen shown in FIG. 120 displays the contents of the coffee beverage as the order target and that there are three orders until production of the coffee beverage (display of "wait number: 3").

Here, in the screen shown in FIG. 120, a "CANCEL" icon is selected. The "CANCEL" icon is a function button used to instruct cancel of an order. In the display screen shown in FIG. 118, the "CANCEL" icon is absent (the icon is blank). This means that the order cannot be canceled. An order for which production of the coffee beverage has started cannot be canceled.

Figure 121:
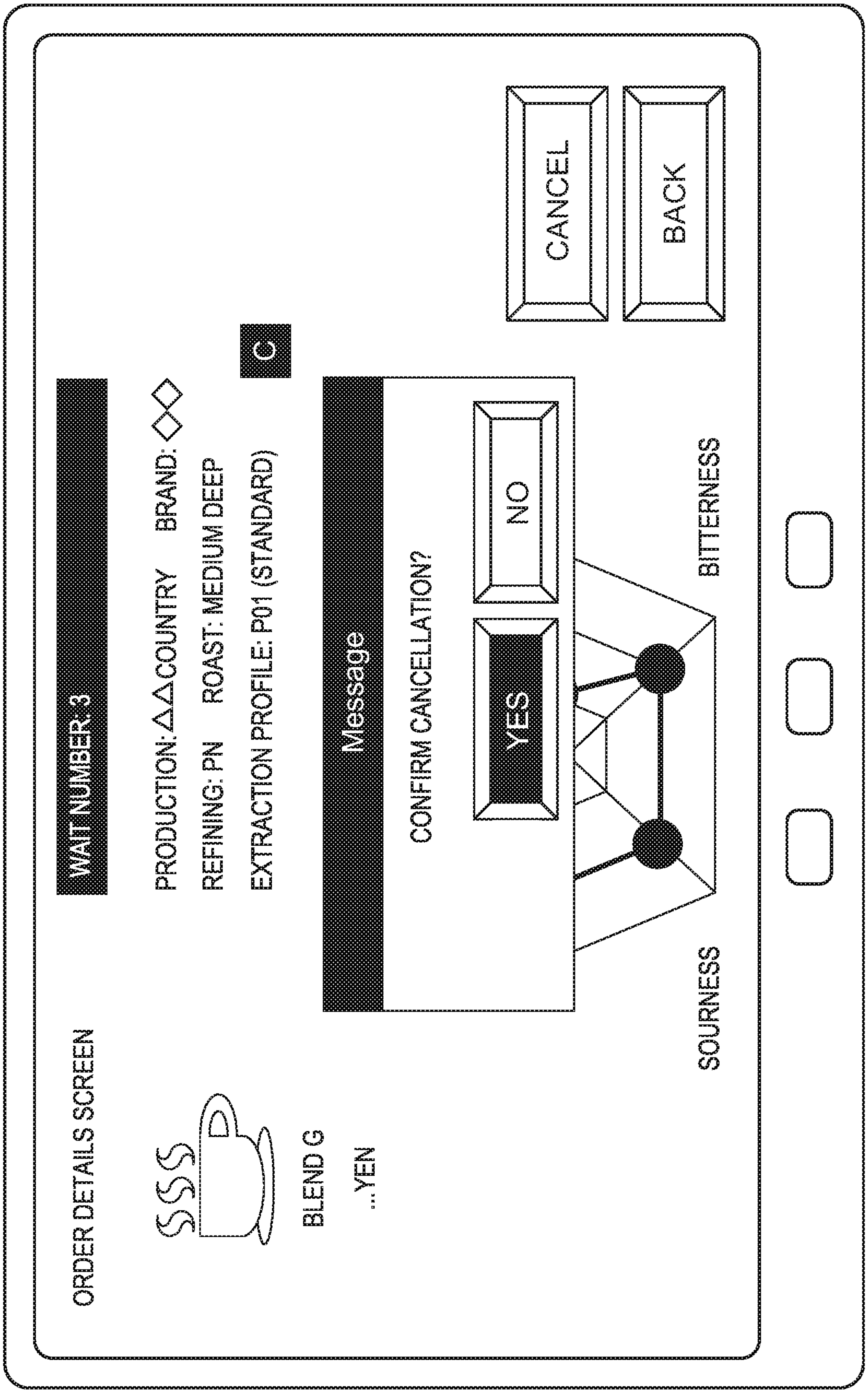

When the "CANCEL" icon is selected, the screen transitions to a cancel confirmation screen shown in FIG. 121. "OK" is selected by the user, and the screen thus transitions to a screen shown in FIG. 122. In the screen shown in FIG. 122, the contents of the canceled order are displayed, and a cancel confirmation message "order is canceled!" is displayed.

Figure 122:
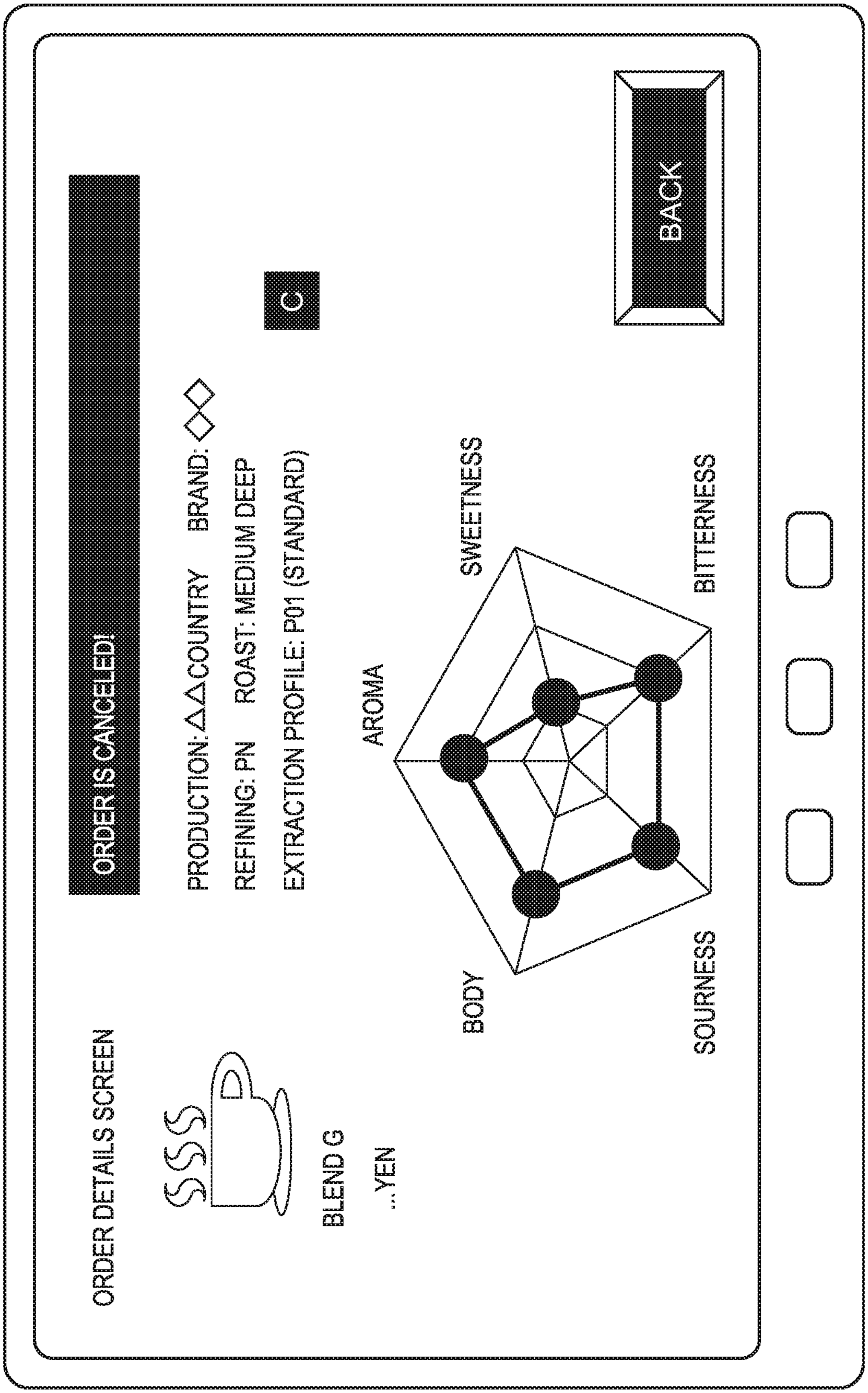
Figure 123:
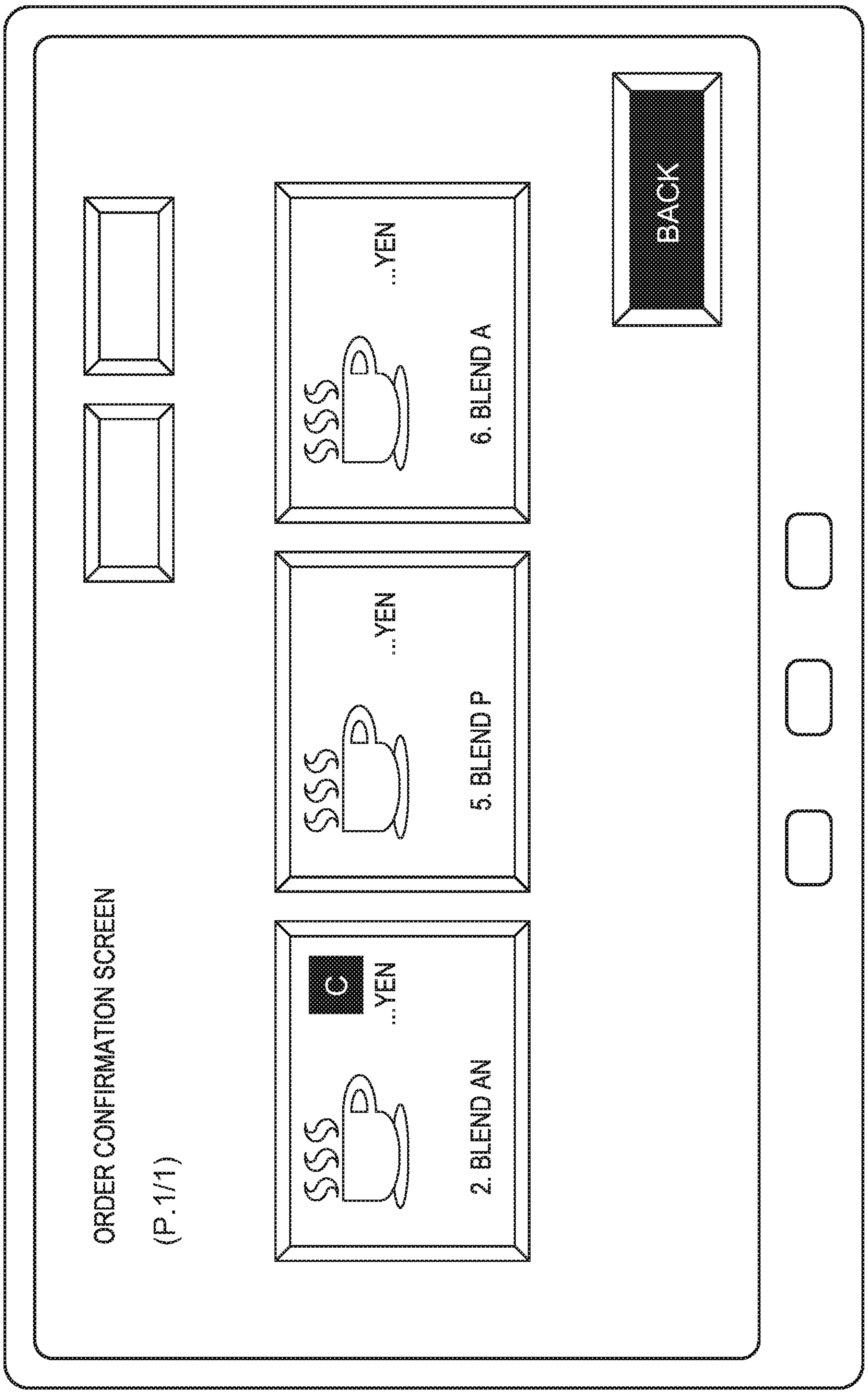

In the example shown in FIG. 122, the "BACK" icon is selected, and the screen returns to the order confirmation screen, as shown in FIG. 123. It can be confirmed that the order icon of canceled "blend G" with the wait number "3" has disappeared. In the example shown in FIG. 123, the "BACK" icon is selected, and the screen returns to the initial screen shown in FIG. 62.

<Call Clerk>

A case in which "call clerk" is selected in the initial screen shown in FIG. 62 will be described next. "Call clerk" is a function button that instructs to call a person in charge of coffee beverage providing.

Figure 124:
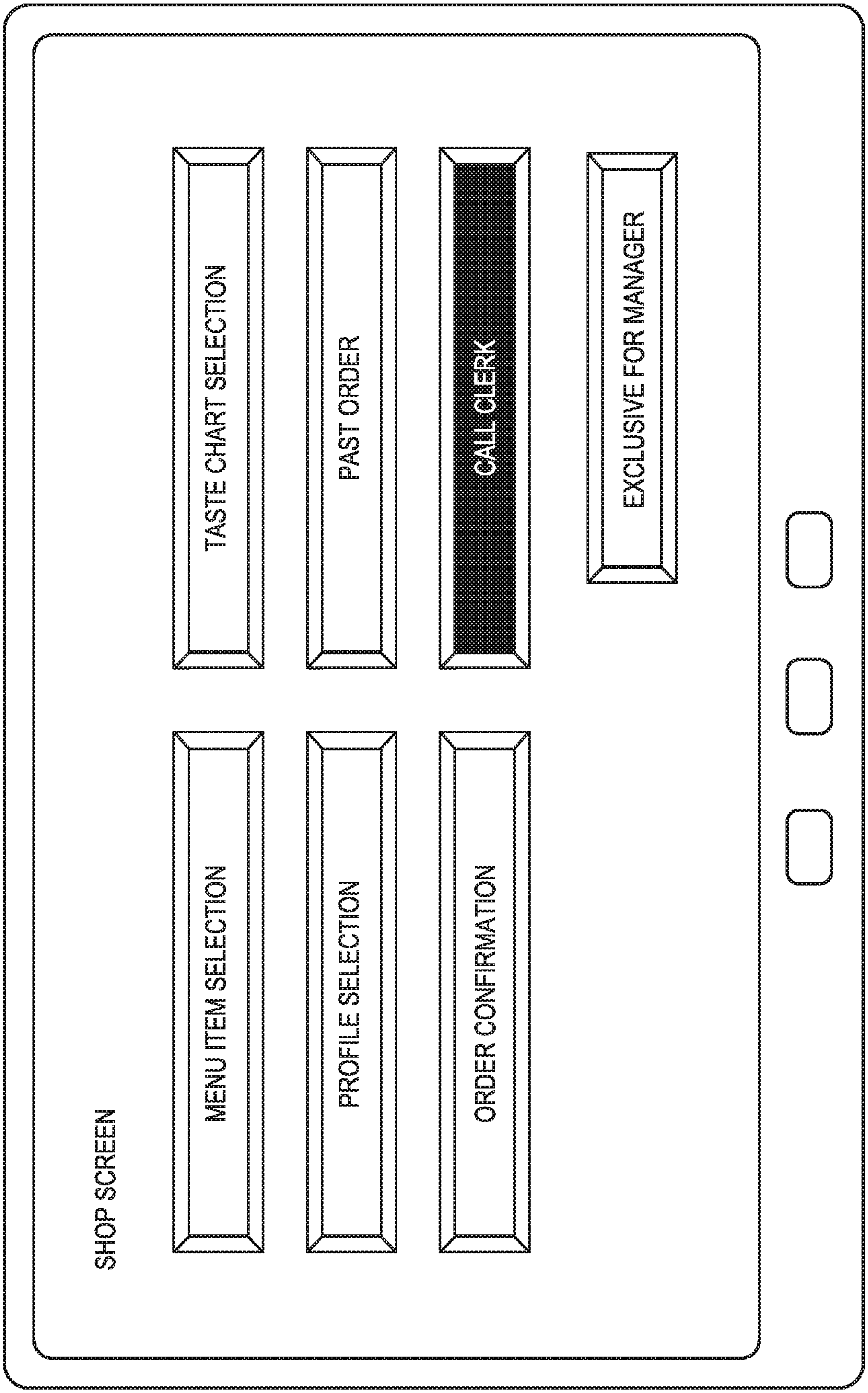
Figure 125:
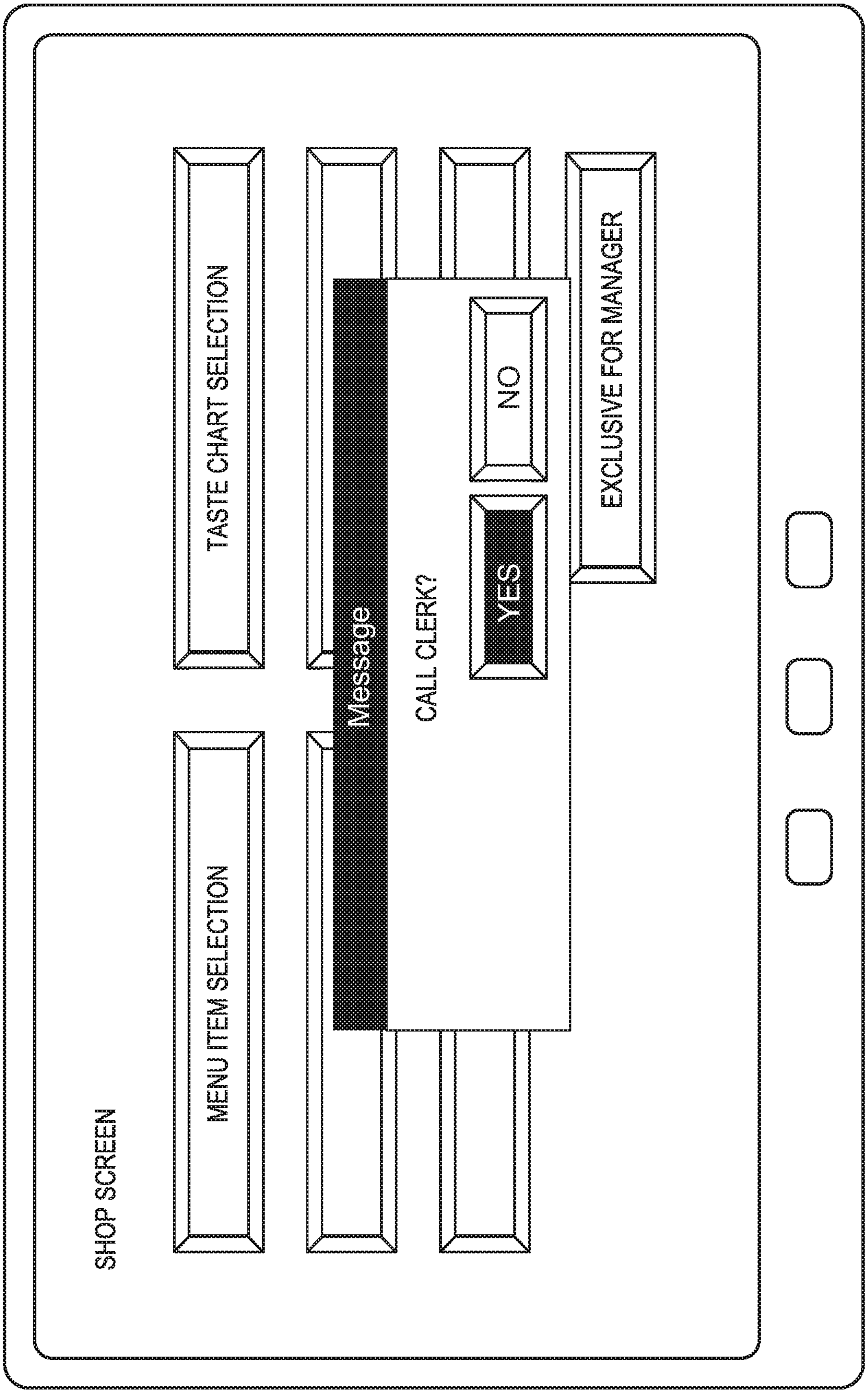

In a screen shown in FIG. 124, the "call clerk" icon is selected. FIG. 125 shows an example of display after that. In FIG. 125, a confirmation screen concerning call of a clerk is displayed, and "YES" is selected by the user. A notification or the like to call a person in charge is thus made in the store.

Figure 126:
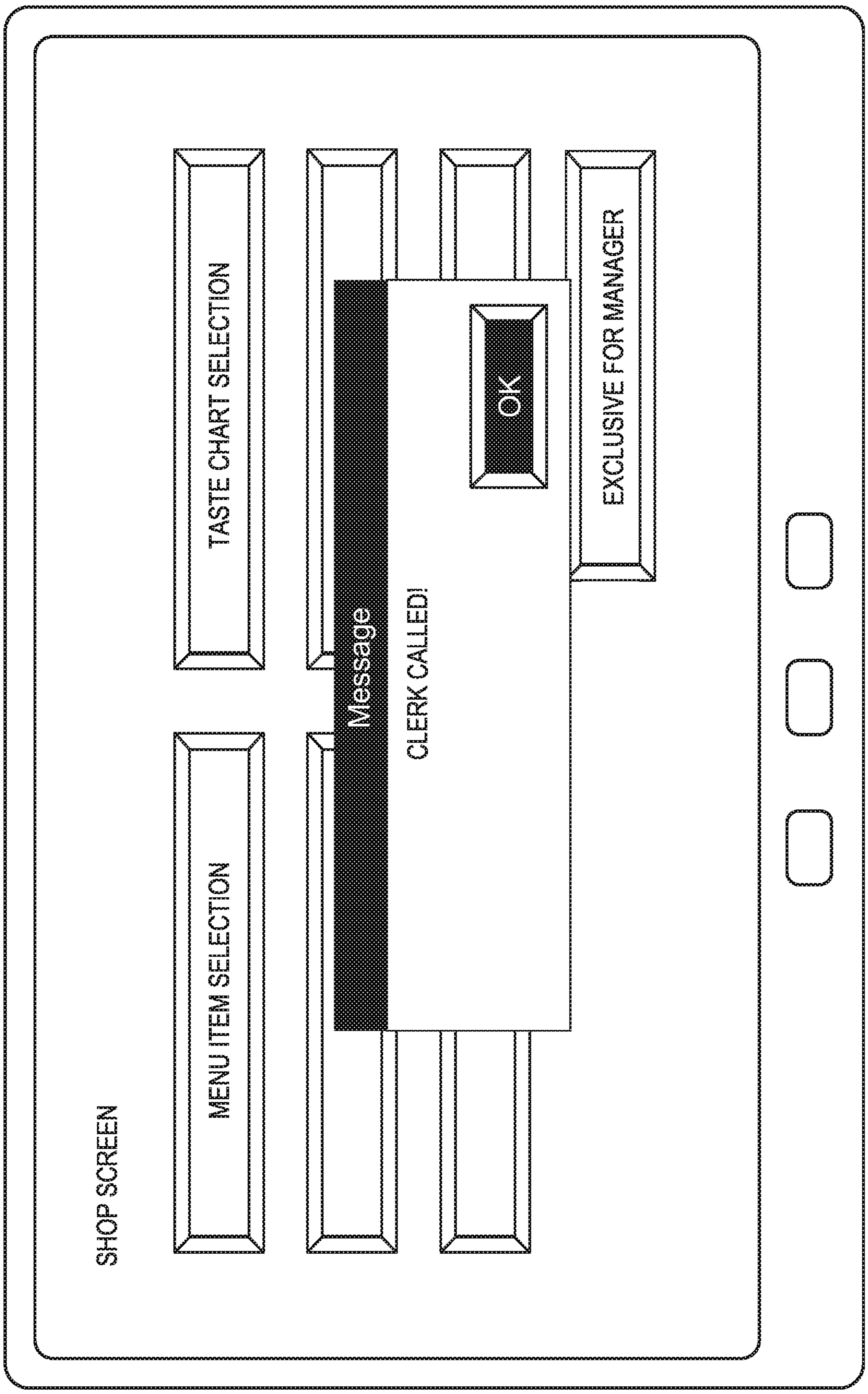

The screen thus transitions to a screen shown in FIG. 126, and a confirmation message "clerk is called!" is displayed. When the "OK" icon is selected, the screen returns to the initial screen shown in FIG. 62.

<Exclusive for Manager>

A case in which "exclusive for manager" is selected in the initial screen shown in FIG. 62 will be described next. "Exclusive for manager" is a function button that is not scheduled to be operated by a user who receives providing of a coffee beverage, and is a function button scheduled to be operated by a person in charge in a store or a facility, particularly, by the operator of the beverage producing apparatus 1. If the "exclusive for manager" icon is selected, input of information known by only the person scheduled to do an operation, for example, input of a password may be requested.

Figure 127:
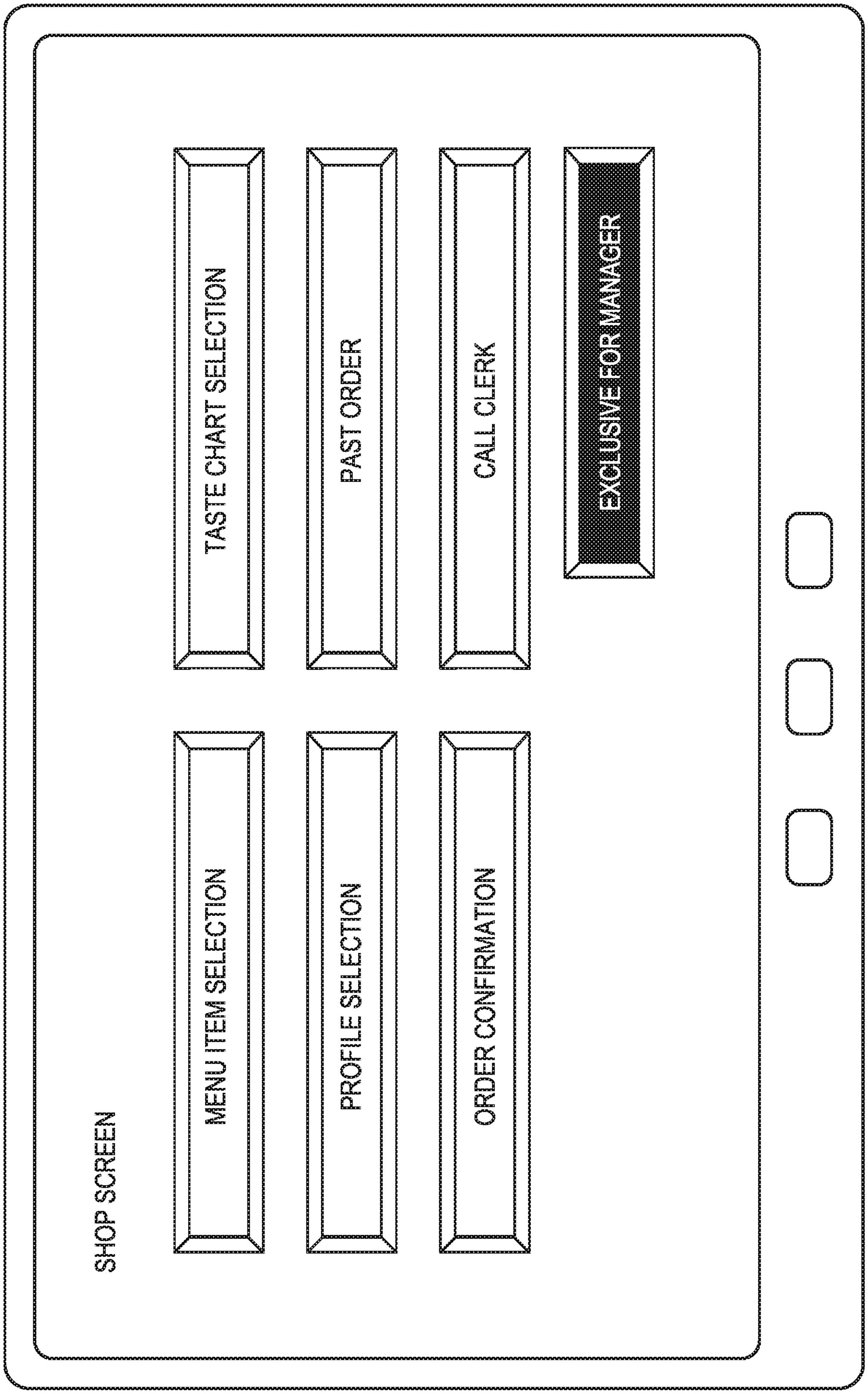
Figure 128:
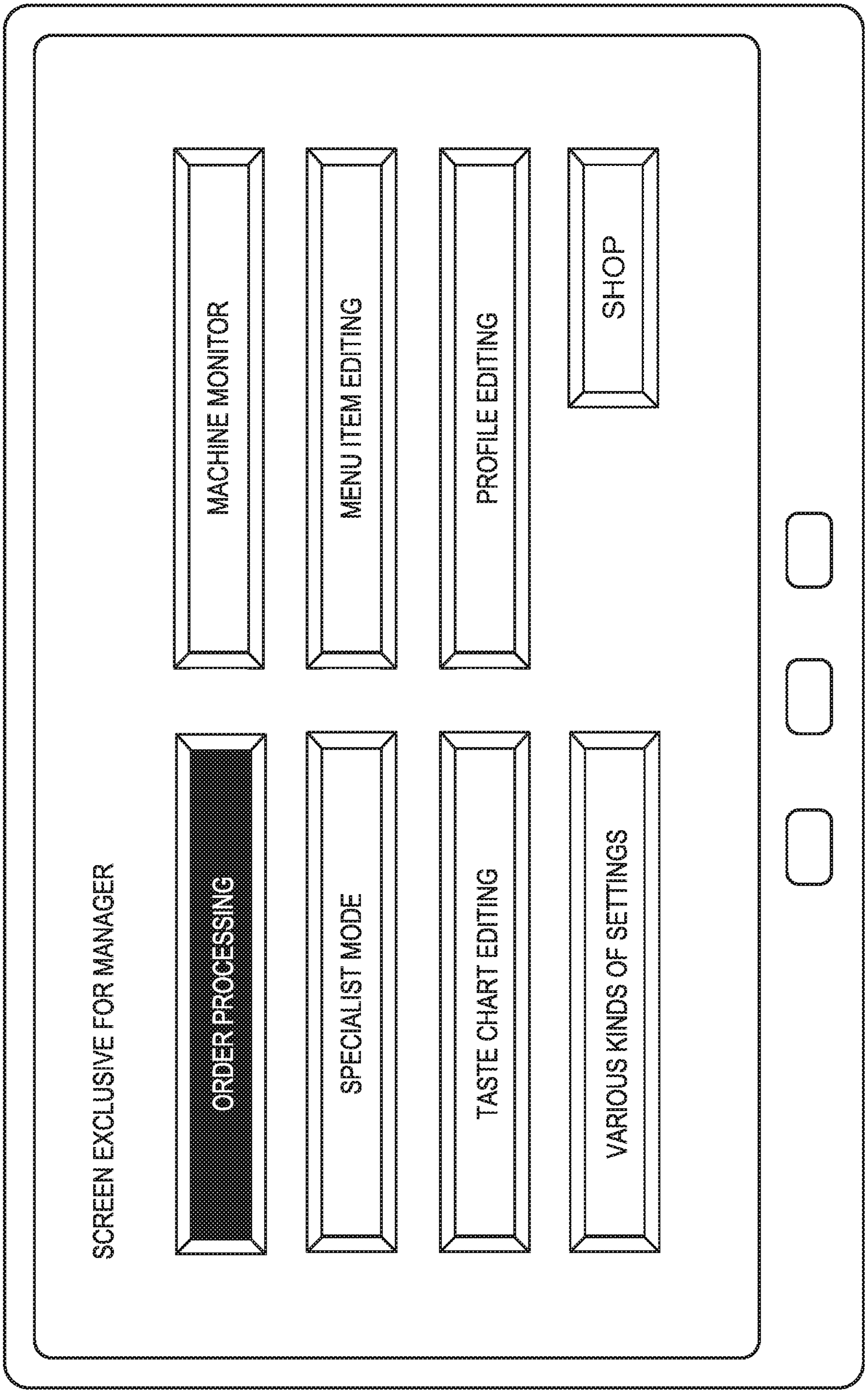

In the screen shown in FIG. 127, the "exclusive for manager" icon is selected. FIG. 128 shows an example of display of a screen exclusive for manager displayed after that. In the screen exclusive for manager, icons of "order processing", "machine monitor", "specialist mode", "menu item editing", "taste chart editing", "profile editing", "various kinds of settings", and "SHOP" are displayed as function buttons. "Menu item editing", "taste chart editing", "profile editing", "various kinds of settings", and "SHOP" are function buttons used to edit or set various kinds of information. "Order processing", "machine monitor", and "specialist mode" will be described below.

<Order Processing>

In the example shown in FIG. 128, "order processing" is selected. The screen thus transitions to an order processing screen shown in FIG. 129.

In the order processing screen, order processing icons each representing a processing state for a table in a restaurant are displayed. An order processing icon includes an order wait state (processing, wait: 1, or the like), the contents (blend G or the like) of the order, and a table number. In case of an order in which the extraction profile is customized, the "C" icon is displayed.

Figure 129:
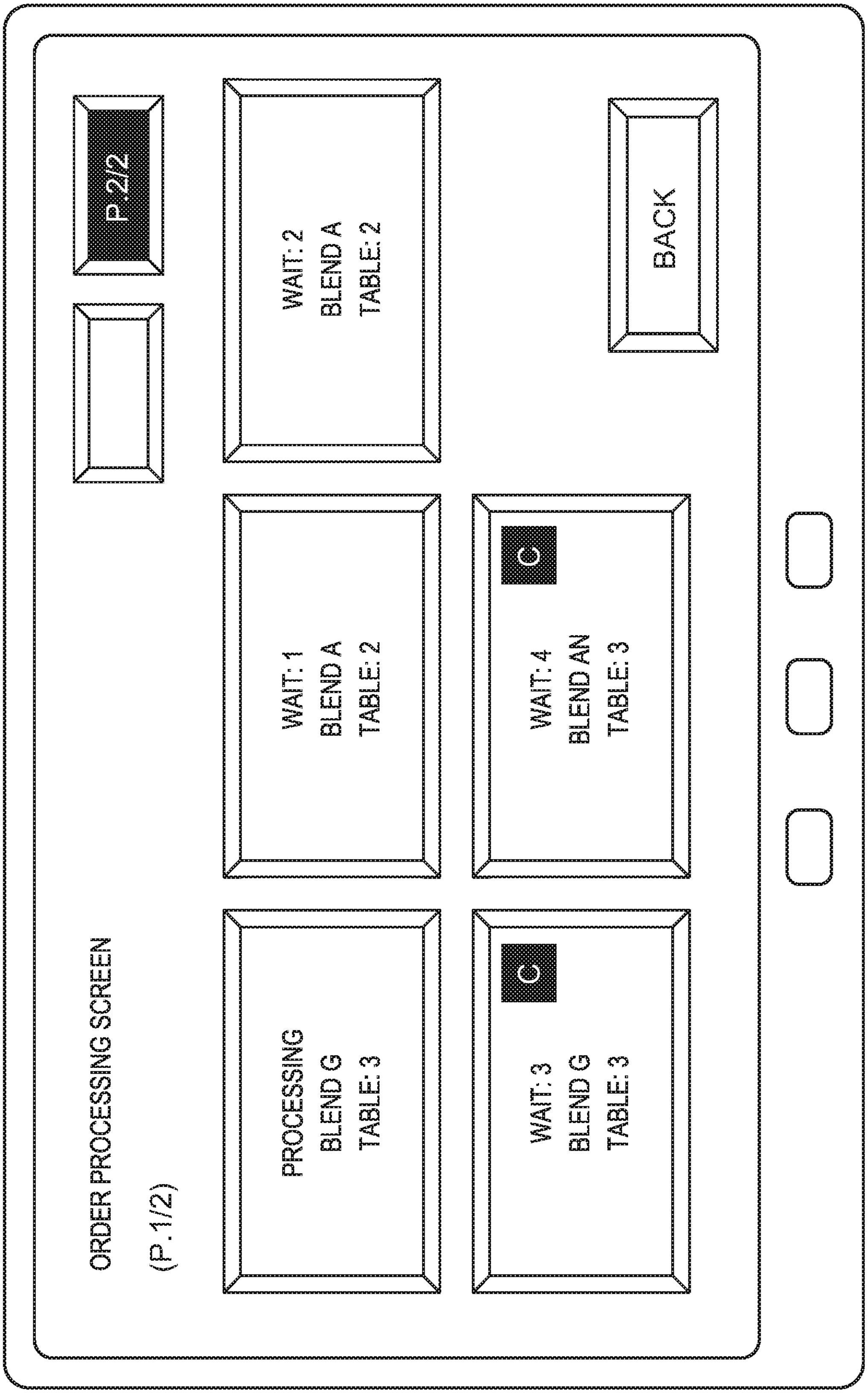
Figure 130:
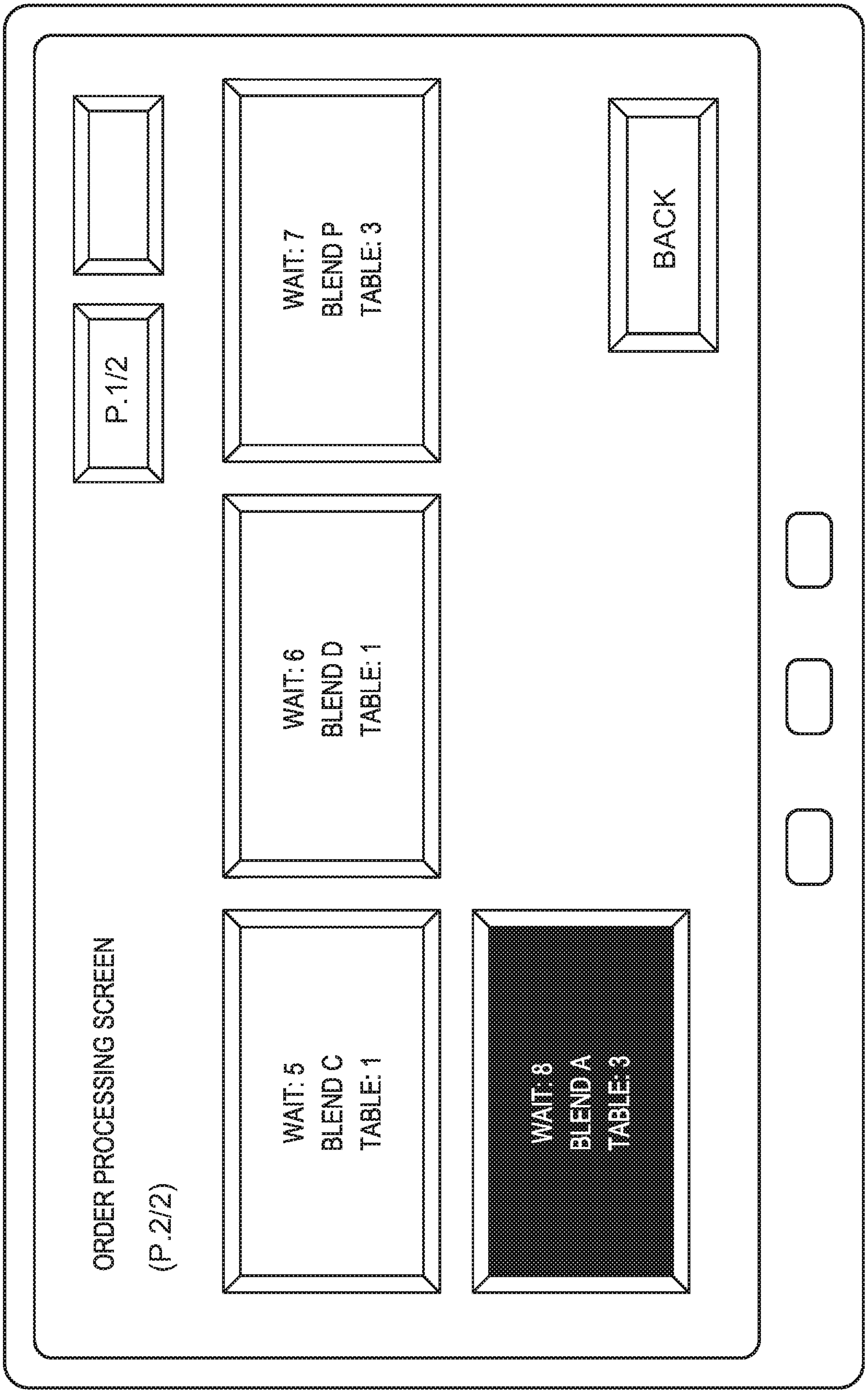
Figure 131:
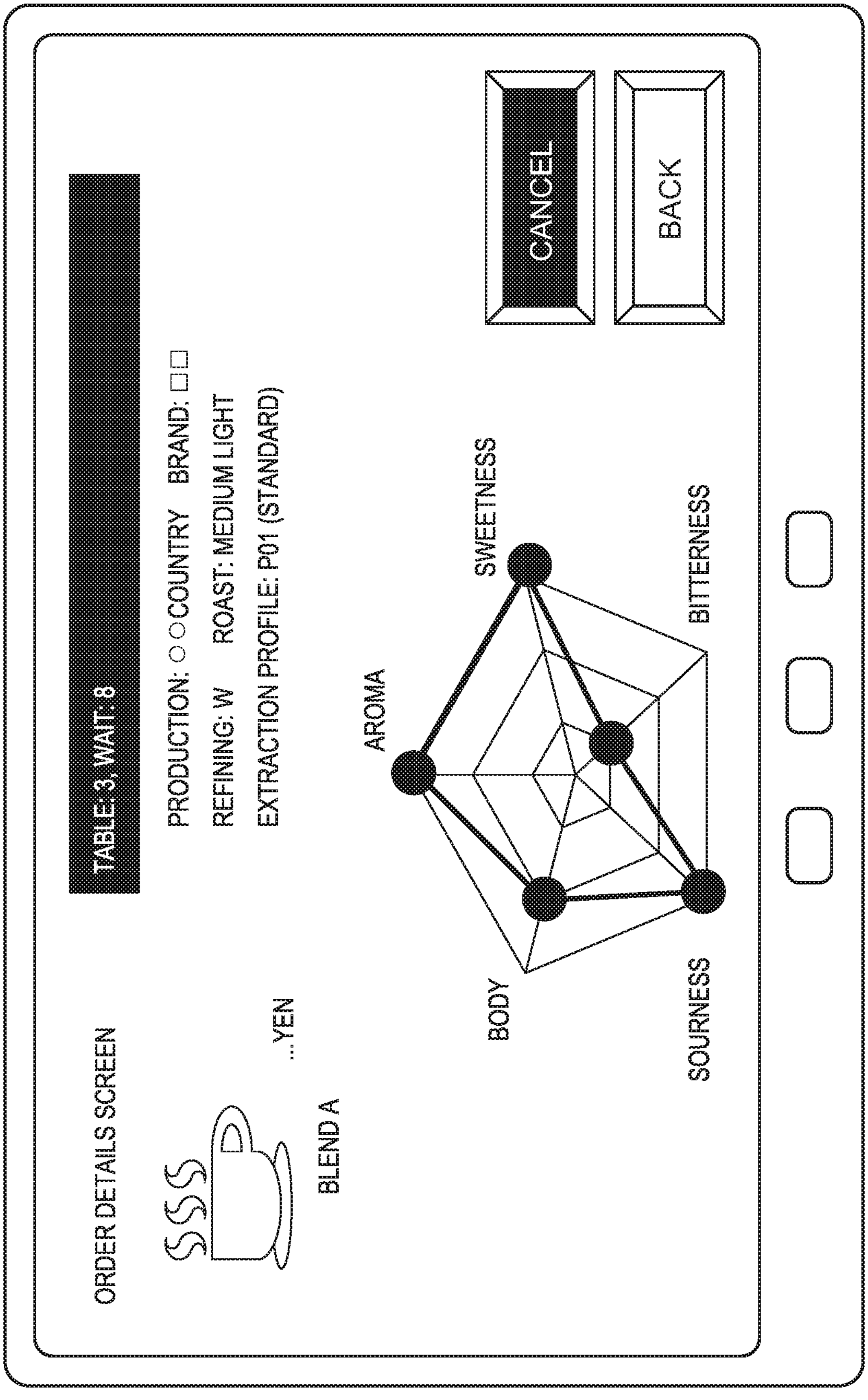

In the example shown in FIG. 129, a "P.2/2" icon is selected. The screen advances to the next screen, and a screen shown in FIG. 130 is displayed. In the example shown in FIG. 130, an order processing icon with "wait: 8", "blend A", and "table: 3" is selected, and an order details screen shown in FIG. 131 is displayed. In the order details screen, the order contents, the table number, the wait number, and the like are displayed. In the screen shown in FIG. 131, the "CANCEL" icon is selected. For example, a case in which the clerk cancels the order based on the desire of the customer is assumed.

When the "CANCEL" icon is selected, the screen transitions to a cancel confirmation screen shown in FIG. 132. "YES" is selected, and the screen thus transitions to a screen shown in FIG. 133. In the screen shown in FIG. 133, the contents of the canceled order are displayed, and a cancel confirmation message "table: 3, canceled!" is displayed. In the example shown in FIG. 133, the "BACK" icon is selected, and the screen returns to the order processing screen, as shown in FIG. 134. It can be confirmed that the canceled order processing icon has disappeared.

In an example shown in FIG. 134, a "P.1/2" icon is selected. The screen returns to the previous screen (previous page), and an order processing screen shown in FIG. 135 is displayed. In the example shown in FIG. 135, an order processing icon with "processing", "blend G", and "table: 3" is selected, and a machine monitor screen shown in FIG. 136 is displayed. If the selected order processing icon is "processing", the machine monitor screen used to confirm the production state in the beverage producing apparatus 1 is displayed. Note that according to the example of the arrangement of the housing according to the fourth embodiment, the operation state can directly be confirmed from the transmissive portion 101 of the actual machine.

In the machine monitor screen, coffee beverage production steps such as "rinse", "standby", "preheat", "bean input", "steaming", and "extraction" are listed, and the current step item is indicated by white/black reverse display. "Rinse" is cleaning of the extraction container 9. "Preheat" is preheat in step S1 of FIG. 20. "Steaming" and "extraction" are processes shown in FIG. 21. In the example shown in FIG. 136, the step of "steaming" is being performed.

In a "machine" field, the operation state of the beverage producing apparatus 1 is displayed. "Pressure in container" is the air pressure in the extraction container 9. "Tank pressure" is the air pressure in a water tank 72, "hot water temperature" is the water temperature in the water tank 72, "hot water amount" is the water amount (water level) in the water tank 72, and "menu item" is roasted coffee beans as the raw material of the coffee beverage under production. "Beans" indicates types of roasted coffee beans stored canisters 40A to 40C of the storage apparatus 4. The canister 40 (here, A) of the roasted coffee beans used for the coffee beverage under production is indicated by white/black reverse display. "Special cup" indicates a case in which roasted coffee beans are inputted from a receiving portion 42*c* to produce a coffee beverage.

In "PROFILE", producing conditions are displayed, In an extraction profile type (in the example shown in FIG. 136, "P01 (standard)"), the contents are displayed.

As the production state progresses, the machine monitor screen is updated in real time. FIG. 137 shows an example of display updated from the display shown in FIG. 136, and shows that the production state is in the stage of the "extraction" step.

FIG. 138 shows an example of display updated from the display shown in FIG. 137, and shows that the production of one cup of coffee beverage under production is ended, and the state is in the stage of the "rinse" step as preparation for the next production step. Since information concerning the next order is not determined, "menu item", "PROFILE", and the like are not displayed.

FIG. 139 shows an example of display updated from the display shown in FIG. 138, and it is displayed that the "rinse" step is ended, information concerning the next order is determined, and the "standby" step is being performed.

FIG. 140 shows an example of display updated from the display shown in FIG. 139, and it is displayed that preparation in the "standby" step is completed, and the production of a coffee beverage concerning the next order can be started. More specifically, a "START" icon is displayed, and the production of the coffee beverage can be started by operating the icon. In the stage of the display shown in FIG. 139, the "START" icon is not displayed, indicating that the preparation is not completed.

In FIG. 141, the "START" icon is selected, and the production of the coffee beverage is started.

FIG. 142 shows an example of display updated from FIG. 141, and it is displayed that the "preheat" step is started. FIG. 143 shows an example of display updated from FIG.

142, and it is displayed that the "bean input" step is being performed. Roasted coffee beans are supplied from the storage apparatus 4 to the grinding apparatus 5, and ground beans are supplied to the extraction container 9.

FIG. 144 shows an example of display updated from FIG. 143, and it is displayed that the "steaming" step is being performed. FIG. 145 shows an example of display updated from FIG. 144, and it is displayed that the "extraction" step is being performed. FIG. 146 shows an example of display updated from the display shown in FIG. 145, and shows that the production of one cup of coffee beverage under production is ended, and the state is in the stage of the "rinse" step as preparation for the next production step.

FIG. 147 shows an example of display updated from the display shown in FIG. 146, and it is displayed that the "rinse" step is ended, information concerning the next order is determined, and the "standby" step is being performed. FIG. 147 shows a case in which a "RINSE" icon is selected during the "standby" step. The "RINSE" icon is a function button selected to execute re-cleaning processing according to the second embodiment.

In FIG. 149, the display screen shown in FIG. 147 is switched, and a confirmation screen to confirm whether to use hot water for the re-cleaning processing is displayed. In the example shown in FIG. 148, "YES" is selected to instruct to use hot water. If NO is selected, normal temperature water is used.

FIG. 150 shows an example of display updated from the display shown in FIG. 149, and it is displayed that the "rinse" step as the re-cleaning processing is being executed. FIG. 151 shows a case in which a "STOP" icon is selected. The "STOP" icon is a function button that instructs to forcibly stop the operation of the beverage producing apparatus 1 in the current step.

In FIG. 152, the display screen shown in FIG. 151 is switched, and a confirmation screen to confirm whether to make a forcible stop is displayed. In the example shown in FIG. 152, "YES" is selected to forcibly stop the "rinse" step. In FIG. 153, the display screen shown in FIG. 152 is switched, and a confirmation screen to confirm whether to resume the "rinse" step that is being stopped is displayed. In the example shown in FIG. 153, "YES" is selected to resume the "rinse" step. After that, the display is updated as shown in FIGS. 154 and 155, and it is shown that the "rinse" step and the "standby" step progress.

FIG. 156 shows a case in which "NO" is selected in the display screen shown in FIG. 153. The "rinse" step is not resumed, and the process advances to the next "standby" step. The display screen shown in FIG. 157 shows that the process advances to the "standby" step.

FIG. 158 shows an example of display updated from the display shown in FIG. 157, and it is displayed that preparation in the "standby" step is completed, and the production of a coffee beverage concerning the next order can be started. That is, the "START" icon is displayed. In FIG. 159, the "START" icon is selected, and the production of the coffee beverage is started.

FIG. 142 shows an example of display updated from FIG. 141, and it is displayed that the "preheat" step is started. FIG. 143 shows an example of display updated from FIG. 142, and it is displayed that the "bean input" step is being performed. Roasted coffee beans are supplied from the storage apparatus 4 to the grinding apparatus 5, and ground beans are supplied to the extraction container 9.

FIG. 160 shows a case in which the "BACK" icon is selected during the "standby" step. In this case, the screen returns to the order processing screen, as shown in FIG. 161. In FIG. 161, the "BACK" icon is selected again, and the screen thus returns to the screen exclusive for manager, as shown in FIG. 162.

<Machine Monitor>

In the examples shown in FIGS. 136 to 161, the process of displaying a machine monitor from selection of "order processing" has been described. If the machine monitor icon is selected in the screen exclusive for manager, as shown in FIG. 163, a similar display screen is displayed, as shown in FIG. 164.

In the display screen shown in FIG. 164, the blend P is selected as "menu item". Which canister 40 stores roasted coffee beans corresponding to the blend P is automatically searched for. If corresponding roasted coffee beans exist, the corresponding type among "beans" A to C is indicated by white/black reverse display. If corresponding roasted coffee beans do not exist, the white/black reverse display is not performed. If the reverse display is not performed, the operator can select any beans including "special cup". In the example shown in FIG. 164, roasted coffee beans stored in the canister 40C are selected. For this reason, "beans C" is indicated by white/black reverse display.

However, since the roasted coffee beans are not optimum for the blend P because of the settings of the apparatus, in the display screen shown in FIG. 165, a confirmation screen is displayed to confirm whether to produce a coffee beverage using "beans C". In the example shown in FIG. 165, the operator reconsiders and selects "NO". An exchange operation of the canister 40 is thus performed. That is, in this example, use of the cartridge-type canister 40 is assumed, as in the third embodiment.

When "NO" is selected, a confirmation screen for detachment of the canister 40C is displayed in the display screen shown in FIG. 166. In the example shown in FIG. 166, "YES" is selected. Accordingly, an operation of returning a shutter portion 443 and an outlet opening/closing portion 408 to a close state in the third embodiment is started, and this is displayed, as shown in FIG. 167. If a message representing that the canister is detached is displayed, as shown in FIG. 168, the canister 40C is removed from an attachment portion 44, and another canister 40 can be attached. The detachment can be performed.

Until the other canister 40 is attached, the display screen shows the "standby" step, as shown in FIG. 169, and the field of "beans C" becomes blank. If the attachment of the other canister 40 is detected, an operation of rotating the shutter portion 443 and the outlet opening/closing portion 408 to an open state in the third embodiment is started, and a message "attachment of canister C is progressing" is displayed, as shown in FIG. 170. The type of stored roasted coffee beans is also recognized, and a message representing that the attachment is completed is displayed, as shown in FIG. 171. When the "OK" icon is selected in the display screen shown in FIG. 171, the display screen is switched to FIG. 172, and it is displayed that a coffee beverage is produced using the roasted coffee beans stored in the exchanged canister 40C.

<Change of Extraction Profile>

On the machine monitor screen, the operator can also change a part of an extraction profile. FIG. 173 shows its example. In the example shown in FIG. 173, the "particle size" field is touched to instruct to change it. The display screen thus transitions to a display screen shown in FIG. 174, and a "particle size" input screen is displayed. In the example shown in FIG. 174, "particle size" 5" is selected.

In FIG. 175, it is displayed that the particle size adjusting mechanism is adjusting the particle size. In FIG. 176, it is displayed that the adjustment of the particle size is completed. When the "OK" icon is selected, the screen returns to the original screen. Since the extraction profile is customized, the "C" icon is displayed in the subsequent display.

FIG. 177 shows a machine monitor screen concerning another change example of the extraction profile. Here, a change of "hot water amount for steaming" is selected. The machine monitor screen is switched to a screen shown in FIG. 178. Hot water amount increase and decrease icons (+ and −), the OK icon, and the "CANCEL" icons are displayed. If a desired hot water amount is displayed, the setting change of "hot water amount for steaming" can be determined by selecting the OK icon, as in a display screen shown in FIG. 179.

FIG. 180 shows a machine monitor screen concerning still another change example of the extraction profile. Here, a change of "steaming time" is selected. The machine monitor screen is switched to a screen shown in FIG. 181. Time increase and decrease icons (+ and −), the OK icon, and the "CANCEL" icons are displayed. If a desired time is displayed, the setting change of "steaming time" can be determined by selecting the OK icon, as in a display screen shown in FIG. 182.

Note that "hot water amount for extraction" and "extraction time" can also be changed by a method similar to that for "hot water amount for steaming" and "steaming time". That is, as for the information in the extraction profile, not only specific information but also information that is not displayed here can be changed in the machine monitor screen.

In a display screen shown in FIG. 183, the "START" icon is selected, and production of a coffee beverage is started. In a display screen shown in FIG. 184, it is displayed that the "preheat" step is started. In a display screen shown in FIG. 185, the "BACK" icon is selected. The display of the machine monitor screen is ended, and the screen returns to the screen exclusive for manager. The production of the coffee beverage is continued.

<Specialist Mode>

A case in which "specialist mode" is selected in the screen exclusive for manager shown in FIG. 128 will be described next. The above-described coffee beverage production is production in an automatic mode in which the producing operations and steps are automatically controlled in accordance with operation conditions set in advance based on a menu item, an extraction profile, or a corrected extraction profile. When "specialist mode" is selected, coffee beverage production in a manual mode is possible. In the manual mode, the producing operations and steps are executed roasted coffee beans operator instructions to the operation unit 12. Hence, when "specialist mode" is selected, it is possible to develop a new menu item or provide so-called temporary special coffee beverage to a specific customer. When the automatic mode and the manual mode are provided, mass production and distinctiveness of a coffee beverage can simultaneously be implemented.

In FIG. 186, the "specialist mode" icon is selected, and the display screen transitions to a screen shown in FIG. 187. In FIG. 187, a specialist mode screen is displayed. In the manual mode, the operator operates the beverage producing apparatus 1 using the specialist mode screen.

The specialist mode screen includes a "state display" region, a "state display/settings" region, a "step/instruction" region, a "log" region, and function buttons (START, BACK, and STOP to be described later).

FIG. 188 is an explanatory view of the "state display" region and the "state display/settings" region. In the "state display" region, the detection results of various kinds of sensors provided in the beverage producing apparatus 1 and the information of settings of beans are displayed. In the example shown in FIG. 188, "pressure in container" is the air pressure in the extraction container 9. "Tank pressure" is the air pressure in the water tank 72, "hot water temperature" is the water temperature in the water tank 72, "hot water amount" is the water amount (water level) in the water tank 72, and "particle size" is the setting of the size of a particle of ground beans in 10 levels described above. The pieces of information in the "state display" region are updated in real time, and the operator can advance the operation while monitoring a change in each information.

In the "state display/settings" region, the operation states of various kinds of movable mechanisms provided in the beverage producing apparatus 1 an extraction profile, and the information of the settings of beans are displayed. Each item also serves as a function button capable of changing the operation state when touched by the operator.

In "PROFILE", the information of a currently set extraction profile is displayed. In the example shown in FIG. 188, "P01 (standard)" is set. If the operator does not particularly instruct any operation, production control of a coffee beverage is executed based on the set extraction profile. The setting can be changed by touching "PROFILE". "Beans" indicate the types of roasted coffee beans stored in the canisters 40A to 40C of the storage apparatus 4. In the "specialist mode", the operator can freely input roasted coffee beans from the receiving portion 42*c* or mix the roasted coffee beans stored in the canisters 40A to 40C.

The fields on the lower side "beans" display information concerning the operation states of various kinds of movable mechanisms. In the example shown in FIG. 188, for each of the various kinds of movable mechanisms, a total of two operation states are displayed in the left field and the right field. A field indicated by white/black reverse display shows the current state. In the example shown in FIG. 188, all the left fields are indicated by white/black reverse display. The operation state in the left field is the initial state. Representative components will be explained below.

"Container" represents the position of a container main body 90 of the extraction container 9, "extraction" (initial state) represents an extraction position, and "mill" represents a bean inputting position. When the operator touches "mill", the container main body 90 is moved to the bean inputting position. When the operator touches "extraction", the container main body 90 returns to the extraction position.

"Posture" represents the posture of the extraction container 9, "up" (initial state) represents an erect posture, and "down" represents an inverted posture. When the operator touches "down", the extraction container 9 is changed to the inverted posture. When the operator touches "up", the extraction container 9 is changed to the erect posture. Stop at a halfway position is also possible.

"Lid" represents the state of a lid unit 91, "open" (initial state) represents a state in which the lid unit 91 opens the container main body 90, and "close" represents a closed state. When the operator touches "close", the lid unit 91 moves to a position to close the container main body 90. When the operator touches "open", the lid unit 91 moves to a separated position.

"Retainer" represents the state of a lock mechanism 821, "release" (initial state) represents a state in which the lock between the container main body 90 and the lid unit 91 is released, and "fix" represents a locked. When the operator touches “fix”, the lock mechanism 821 changes to the lock state. When the operator touches “release”, the lock is released.

“Probe A” and “probe B” concern the states of an elevating shaft 802 and an elevating shaft 812, and “inner lid A” and “inner lid B” concern the states of a plug member 903 and a plug member 913. “Hot water supply valve”, “pressurization valve”, “pressure reducing valve”, “water supply valve”, and “outlet value” are solenoid valves provided in a fluid supply unit 7 and a switching unit 10. “Beans A”, “beans B”, and “beans C” concern the supply states of roasted coffee beans in the canisters 40A to 40C. “Mill A” and “mill B” concern operation states of the coarse grinder 5A and the fine grinder 5B, and “fan” concerns the operation state of the blower unit 60A. These can also switch the operation states by the touch of the operator.

Note that as operation switching (touch operation) of the various kinds of movable mechanisms in the “state display/settings” field, basically, an arbitrary touch operation is accepted. An operation that neglects a step or an operation in a case corresponding to the relationship between the operation and a state inhibited in advance is disabled.

The operator can complete all production steps of the coffee beverage by performing operation switching (touch operation) of the various kinds of movable mechanisms in the “state display/settings” field. However, in this field, only the operations of the various kinds of movable mechanisms are listed, and the correspondence with the steps is not displayed. Hence, a skill is needed to manage this. The “step/instruction” region is a display to do assist.

The “step/instruction” region displays, as function buttons, icons concerning steps concerning the production of a coffee beverage and representative operations, thereby allowing the operator to complete all production steps of the coffee beverage without needing a skill. The operator can easily create an original producing method using both operations for the “step/instruction” region and operations for the “state display/settings” region.

FIG. 189 shows an example of display in the “step/instruction” region. As will be described later, display that is not related to a current step and display of icons of disabled operations are not made in this field. However, almost all displays are done in FIG. 189 for the descriptive convenience.

A step display field in the uppermost row is a display field showing a current step. “Rinse”, “preheat”, “bean input”, “steaming”, and “extraction” are the steps of production of a coffee beverage, and their meanings have already been described in this embodiment.

In a progress instruction field in the second row, icons such as “AUTO” “NEXT”, and “manual” are displayed for each step. The “AUTO” icon and the “manual” icon are icons alternatively selected. The “AUTO” icon is a function button that instructs to control the step in accordance with the currently set extraction profile. In this case, control of the step is, so to speak, semiautomated (to be referred to as single step automation processing hereinafter). The “manual” icon is a function button that instructs sequential instructions by the operator himself/herself for control of the step. “NEXT” is a function button that instructs to end the current step and advance to the next step.

Instruction icons that instruct execution of individual operations of each step are displayed on the lower side of the progress instruction field. Instruction icons assigned to the “rinse” step are “<1> container preparation”, “<2> water supply”, “<3> hot water discharge”, “<4> container open” “<a> posture→down”, “<b> posture→up” “<c> pressurization”, “<d> pressure reduction”, and “<e> hot water supply”. As indicated by <1> to <4>, instruction icons assigned numbers concern instructions of high use frequency. As indicated by <a> to <e>, instruction icons assigned English letters concern instructions of low use frequency.

The “log” region will be described next. FIG. 190 shows an example of display of the “log” region. In this embodiment, the production processes (control contents) of a coffee beverage in the “specialist mode” are recorded step by step and saved in the storage unit 11*b*. In the “log” region, the recorded control contents are displayed as a history in real time. The recorded control contents can also be registered as a new “menu item” or an extraction profile.

<Operation Example>

An example of a production process of a coffee beverage using the specialist mode screen will be described. First, an extraction profile to be used in single step automation processing is set. To change the current setting, “PROFILE” in the “state display/settings” region is touched. Then, a profile selection screen rises, as shown in FIG. 191. In this selection screen, icons representing types of profiles are displayed. As shown in FIG. 192, when a “P.2/2” icon is selected, the screen advances to the next screen, and a screen shown in FIG. 193 is displayed. A “P07 (exclusive for [redacted])” icon is selected, and a screen shown in FIG. 194 is displayed.

The screen shown in FIG. 194 is a profile details screen of “P07 (exclusive for [redacted])”. The screen is similar to the profile details screen described with reference to FIG. 83, and various kinds of set values can be increased/decreased. A “SELECT” icon is selected, and the extraction profile is set to “P07 (exclusive for [redacted])”.

The screen returns to the specialist mode screen as shown in FIG. 195, and the “START” icon is selected to start production. Accordingly, the “STOP” icon is displayed, as shown in FIG. 196, and production stop can be instructed. Note that in the stage shown in FIG. 195, since production is not started, the “STOP” icon is not displayed. In the stage shown in FIG. 196, since production is started, the “START” icon is not displayed. A disabled icon is not displayed.

FIG. 197 shows an example of display in the “step/instruction” region immediately after the start of production. “Rinse” is indicated by white/black reverse display to display that the current step is “rinse”. In addition, instruction icons other than the “rinse” step have no character display, implying that a selection operation is disabled. As shown in FIG. 198, the information in the “log” region is also updated.

Since “rinse” is performed to clean the extraction container 9 at the end of the producing operation of a coffee beverage, the step may be skipped when continuously performing the producing operation of the coffee beverage. If a certain time has elapsed from the previous producing operation, the step is preferably performed first. In the example shown in FIG. 197, a “NEXT” icon is selected. The “rinse” step is immediately skipped, and the process advances to the preheat step in FIG. 199.

FIG. 199 shows an example of display in the “step/instruction” region when the “preheat” step is started. In the example shown in FIG. 199, a case in which the “AUTO” icon is touched, and the “preheat” step is advanced by single step automation processing is exemplarily shown. In the single step automation processing, operation control of the beverage producing apparatus 1 sequentially progresses in accordance with the set extraction profile, and the state is displayed in the specialist mode screen. Note that if the operator touches the “manual” icon, the above-described is canceled.

FIGS. 200 to 206 show states in which the single step automation processing progresses, and the display in the specialist mode screen transitions. FIG. 200 shows a state in which even if there is no operator touch, "<1> container preparation" is performed, and the instruction icon is indicated by white/black reverse display. In FIG. 201, it is displayed that after "<1> container preparation", "<2> particle size setting" is started.

Note that "<1> container preparation" is an instruction to automatically set the state of the extraction container 9 in "preheat" to an appropriate state. With this instruction, an initial state is set in which the container main body 90 is located at the extraction position, and the lid unit 91 is closed and locked by the lock mechanism 821. That the instruction is executed can be confirmed by the display in the "state display/settings" field. FIG. 202 shows an example of display. As is apparent, "lid" "retainer", "probe A", and "probe B" change from the initial state. In "<2> particle size setting", the particle size adjusting mechanism that acts on the gear 53*b*' is controlled in correspondence with the particle size defined by the set extraction profile.

Note that in this embodiment, the "<1> container preparation" icon is arranged as the first instruction icon in each step. Even if another instruction icon is touched first, the other touched instruction icon can be executed after "<1> container preparation" is executed.

For example, in the "preheat" step, after the process advances to the step, even if "<3> hot water supply" icon is touched without touching the "<1> container preparation" icon, "<3> hot water supply" is executed after the container is changed to the same state as the state of the container when "<1> container preparation" is performed. In addition, if, for example, hot water is supplied into the extraction container 9 by the instruction icon "<3> hot water supply", and after that, the lock of the lock mechanism 821 is released by an external force due to some reason, and a "<4> hot water discharge" icon is then touched, control is performed to change the lock mechanism 821 to the lock state and then discharge the hot water. Such control also applies to an operation corresponding to each instruction icon in other steps.

FIGS. 203 and 204 show states in which controls of "<3> hot water supply" and "<4> hot water discharge" are performed in the single step automation processing, and FIGS. 205 and 206 show states in which the display in the "state display/setting" field changes accordingly. FIG. 207 shows that after the "preheat" step is ended, the operator selects the "NEXT" icon to instruct to advance to the next "bean input" step. FIG. 208 shows an example of display in the "state display/setting" field at this stage.

FIGS. 209 to 219 show examples of display of the specialist mode screen in a case in which the operator performs the "bean input" step by a manual operation. According to the example of the arrangement of the housing according to the fourth embodiment, the operation state can directly be confirmed from the transmissive portion 101 of the actual machine. It is possible to make use of this for the manual operation.

In FIG. 209, the "<1> container preparation" icon is selected, and the preparation operation of the extraction container 9 is performed accordingly. In FIG. 210, both a "<3> beans B input" icon and a "<a> <5> to <7>" icon are selected. The display in the "state display/setting" field at this point of time is a display shown in FIG. 211.

Here, the "<a> <5> to <7>" icon is an instruction icon that instructs to repeat the instructions of <5> to <7>. That is, the same operations as those in a case in which three instruction icons of "<5> mill A rotation", "<6> mill B rotation" and "<7> fan rotation" are touched are performed. For this reason, the instruction icons of "<5> mill A rotation", "<6> mill B rotation" and "<7> fan rotation" are also indicated by white/black reverse display, as shown in FIG. 212, showing that the operations are currently being executed. When the instruction icons are selected, the beans "■■" in the canister 40B are inputted into the grinding apparatus 5, and the driving of the coarse grinder 5A, the fine grinder 5B, and the blower unit 60A is continued during the period of touch. The display in the "state display/setting" field at this point of time is a display shown in FIG. 213. It is displayed that "beans B" is in a sending state, and "mill A", "mill B", and "fan" are in a rotation state. The ground beans in the canister 40B are supplied to the container main body 90.

FIG. 214 shows an example of display when selection of the "<3> beans B input" icon and the "<a> <5> to <7>" icon is ended. The display in the "state display/setting" field is thus updated as shown in FIG. 215, and changes to display representing that the sending of "beans B" and rotation of "mill A", "mill B", and "fan" are stopped.

Here, when the operator selects sending of "beans C", rotation of "mill A", and rotation of "mill B" on the "state display/setting" field, as shown in FIG. 216, the roasted coffee beans in the canister 40C are supplied to the grinding apparatus 5, and the ground beans are supplied to the container main body 90. Since "fan" remains in the stop state, the ground beans of the roasted coffee beans in the canister 40C are supplied to the container main body 90 together with residual chaff, and mixed with the already supplied ground beans of the roasted coffee beans in the canister 40B. Such mixing or arrangement of beams can easily be performed.

As described above, an operation instruction from the "state display/setting" field is also possible. Similar operation instructions can be performed by selectin the instruction icons of "<4> beans C input", "<5> mill A rotation", and "<6> mill B rotation" in the "step/instruction" region. In the "state display/setting" field, the icons are arranged such that the operations of the movable mechanisms can easily be instructed. Hence, this is easier for a skilled person to use in some cases.

Next, in the example shown in FIG. 217, the instruction icons of "<5> mill A rotation" and "<6> mill B rotation" are selected. The example shown in FIG. 218 shows that the display in the "state display/setting" field is updated accordingly. In FIG. 219, the "NEXT" icon is selected, and the process advances to the next "steaming" step. The display in the "state display/setting" field at this point of time is display shown in FIG. 220.

A case in which the "steaming" step is performed by the manual operation will be described. FIGS. 221 and 222 exemplarily show a case in which the operator selects a "<2> hot water supply" icon in the "steaming" step without selecting the "<1> container preparation" icon. As already described, in this case, after control corresponding to "<1> container preparation" is executed, after control corresponding to "<2> hot water supply" is executed. For this reason, as for the display transition in the "state display/setting" field, display corresponding to "<1> container preparation" is performed in correspondence with the control that is actually being executed, as shown in FIG. 223, and after that, display corresponding to "<2> hot water supply" shown in FIG. 224 is performed.

FIGS. 225 to 230 show an example in which the operator causes the apparatus to perform the operation of shaking the extraction container 9. In the stage shown in FIG. 225, an "<a> posture→down" icon is selected. Accordingly, control to make the extraction container 9 change the posture from the erect posture to the inverted posture is executed, and the display in the "state display/setting" field transitions to display shown in FIGS. 226 and 227. In FIG. 227, regarding "posture", neither "up" nor "down" is indicated by white/black reverse display. This means that the extraction container 9 is in a posture halfway from the erect posture to the inverted posture.

FIG. 228 shows a case in which a "<b> posture→up" icon is selected before the extraction container 9 reaches the inverted state. The extraction container 9 is returned from the halfway posture to the erect posture. In the stage shown in FIG. 229, the "<a> posture→down" icon is selected again. Additionally, in the stage shown in FIG. 230, the "<b> posture→up" icon is selected again. The extraction container 9 is thus repetitively shaken in a shaking width of, for example, 30° to 60° to add a variety specific to the operator to the "steaming" step.

FIG. 231 shows a state in which the "NEXT" icon is selected in the "step/instruction" region. FIG. 232 shows an example of display in the "state display/setting" field at this time. The "steaming" step is ended, and the process advances to the next "extraction" step.

A case in which the "extraction" step is performed by the manual operation will be described. In the stage shown in FIG. 233, the "<1> container preparation" icon is selected. After that, the "<2> hot water supply" icon is selected as shown in FIG. 234. These control operations are sequentially executed, and the "state display/setting" field transitions to display shown in FIGS. 235 and 234 to display that hot water supply is being executed.

In the stage shown in FIG. 237, the "<3> pressurization" icon is selected, and pressurization control in the extraction container 9 is executed. The "state display/setting" field transitions to display shown in shown in FIGS. 238 and 239 to display that pressurization processing is being executed.

FIGS. 240 to 244 show an example in which the operator causes the apparatus to perform the operation of shaking the extraction container 9. In the stage shown in FIG. 240, the "<a> posture→down" icon is selected. Accordingly, control to make the extraction container 9 change the posture from the erect posture to the inverted posture is executed, and the display in the "state display/setting" field transitions to display shown in FIGS. 241 and 242. In FIG. 242, regarding "posture", neither "up" nor "down" is indicated by white/black reverse display. This means that the extraction container 9 is in a posture halfway from the erect posture to the inverted posture.

FIG. 243 shows a case in which a "<a> posture→up" icon is selected before the extraction container 9 reaches the inverted state. The extraction container 9 is returned from the halfway posture to the erect posture. The display in the "state display/setting" field transitions to display shown in FIG. 244. The operation of shaking the extraction container 9 is thus performed to add a variety specific to the operator to the immersion type coffee liquid extraction.

In the stage shown in FIG. 245, a "<4> pressure reduction" icon is selected, and pressure reduction control in the extraction container 9 is executed. The "state display/setting" field transitions to display shown in shown in FIGS. 246 and 247 to display that pressure reduction processing is being executed. The hot water in the extraction container 9 boils.

In the stage shown in FIG. 248, a "<5> posture→down" icon is selected, and the extraction container 9 is made to pivot from the erect posture to the inverted posture. The "state display/setting" field transitions to display shown in shown in FIG. 249 to display that the extraction container 9 has changed to the inverted state.

The process advances to processing of sending the coffee beverage from the extraction container 9. In the stage shown in FIG. 250, the "<3> pressurization" icon is selected, and the pressurization control in the extraction container 9 is executed. This is pressurization control to smoothly perform sending of the coffee beverage. The "state display/setting" field transitions to display shown in FIG. 251 to display that pressurization is being performed in the extraction container 9. In the stage shown in FIG. 252, a "<6> send" icon is selected, control to send the coffee beverage in the extraction container 9 to the outside is executed, and the "state display/setting" field transitions to display shown in FIG. 252 accordingly.

FIG. 254 shows a state in which the "NEXT" icon is selected in the "step/instruction" region. The "extraction" step is ended, and the process advances to the next "rinse" step. FIG. 255 shows a screen to execute the "rinse" step. FIG. 256 shows that "AUTO" icon is selected. The "rinse" step is sequentially executed in accordance with the set extraction profile by single step automation processing. FIGS. 257 to 263 time-serially show examples of display in the "step/instruction" field and the "state display/setting" field in the stages.

FIG. 264 shows a state in which the "NEXT" icon is selected in the "step/instruction" region. The series of steps of production of the coffee beverage is ended. Then, as shown in FIG. 265, a query screen to ask whether to register the control contents as "menu item" appears. In the example shown in FIG. 265, "YES" is selected, and the information of the series of control instructions recorded in "log" is registered as a new menu item. In FIG. 266, the registered contents (the ID of the menu item and the ID of a corresponding extraction profile) are displayed.

If "No" is selected in the query screen shown in FIG. 265, a query screen to ask whether to register not "menu item" but only the extraction profile appears, as shown in FIG. 267. In the example shown in FIG. 267, "YES" is selected, and the information of the series of control instructions recorded in "log" is registered as a new extraction profile. In FIG. 268, the registered contents (the ID of the extraction profile) are displayed.

Other Embodiments

The above-described embodiments can be combined with each other. Additionally, in the above embodiments, a coffee beverage has been handled exclusively. However, teas such as Japanese tea and black tea and various kinds of beverages such as a soup can also be handled. Furthermore, coffee beans, raw coffee beans, ground beans of coffee beans, roasted coffee beans, ground beans of roasted coffee beans, unroasted coffee beans, ground beans of unroasted coffee beans, coffee bean powder, instant coffee, coffee in a pot and the like have been exemplified as the extraction target. As the beverage, a coffee beverage and the like have been exemplified. As the beverage liquid, a coffee liquid has been exemplified. However, the present invention is not limited to these. The extraction target need only be an extraction material such as tea leaves of Japanese tea, black tea, oolong tea or the like, powdered tea, a vegetable, a ground vegetable, a fruit, a ground fruit, grain, ground grain, a mushroom such as a shiitake mushroom, a ground product of a mushroom such as a shiitake mushroom, a heated and dried product of a mushroom such as a shiitake mushroom, a ground product of a heated and dried product of a mushroom such as a shiitake mushroom, fish such as a skipjack, a ground product of fish such as a skipjack, a heated and dried product of fish such as a skipjack, a ground product of a heated and dried product of fish such as a skipjack, seaweed such as kelp, a ground product of seaweed such as kelp, a heated and dried product of seaweed such as kelp, a ground product of a heated and dried product of seaweed such as kelp, a heated and dried product of a meat such as pork, beef, chicken or the like, a ground product of a heated and dried product of the meat, a heated and dried product of a meat such as pork bone, beef bone, chicken bone or the like or a ground product of a heated and dried product of the bone. The beverage need only be a beverage such as Japanese tea, black tea, oolong tea, vegetable juice, fruit juice, soup, dashi or soup. The beverage liquid need only be an extract such as an extract of Japanese tea, an extract of black tea, an extract of oolong tea, an extract of a vegetable, an extract of a fruit, an extract of a mushroom, an extract of fish or the like, an extract of a meat or an extract of a bone. Note that in the embodiments, expressions such as water, tap water, pure water, hot water and wash water are used in some portions. For example, water may be replaced with hot water, and hot water may be replaced with water. That is, an expression may be replaced with another expression, and all expressions may be replaced with liquid, steam, high-temperature water, cooling water, cold water or the like. For example, an expression "an extraction target (for example, ground beans of roasted coffee beans) and hot water are put in the extraction container 9" may be replaced with an expression "an extraction target (for example, ground beans of roasted coffee beans) and cold water (or simply water) are put in the extraction container 9". In this case, the method and apparatus may be regarded as an extracting method and beverage producing apparatus for cold brew coffee or the like.

Summary of Embodiments

The above-described embodiments disclose at least the following apparatuses or methods.

A1. There is provided a separation apparatus (for example, 6) for separating an unwanted substance from ground beans of roasted coffee beans, comprising:

a forming unit (for example, 6B) configured to form a separation chamber (for example, SC) through which the ground beans pass; and a suction unit (for example, 6A) communicating with the separation chamber in a direction crossing a passage direction of the ground beans and configured to suck air in the separation chamber, wherein the forming unit includes:

an inlet (for example, 65*a*, 65*a*') for the ground beans, which communicates with the separation chamber; and an outlet (for example, 66) for the ground beans, which communicates with the separation chamber, and the air is sucked from the outlet into the separation chamber by suction of the suction unit.

A2. There is provided the separation apparatus wherein an opening area (for example, SC2) of the outlet is larger than an opening area (for example, SC1') of the inlet.

A3. There is provided the separation apparatus wherein the forming unit comprises a tubular portion (for example, 65), a one-end opening portion (for example, 65*a*) of the tubular portion forms the inlet, an other-end opening portion (for example, 65*b*) of the tubular portion faces the separation chamber, and an opening area of the outlet is larger than an opening area of the other-end opening portion.

A4. There is provided the separation apparatus wherein an internal space of the tubular portion has a shape that decreases a sectional area from a side of the one-end opening portion to a side of the other-end opening portion (for example, FIG. 6).

A5. There is provided the separation apparatus wherein the tubular portion is extended in a vertical direction, and at least a part of a lower end of the tubular portion on a side of the suction unit projects downward with respect to at least a part of the lower end on an opposite side (for example, FIG. 9, EX3).

A6. There is provided the separation apparatus wherein the air is sucked from the inlet into the separation chamber by suction of the suction unit.

A7. There is provided the separation apparatus wherein the tubular portion is extended in a vertical direction, and the other-end opening portion is within a region formed by extending the outlet in the vertical direction (for example, FIG. 8).

A8. There is provided the separation apparatus wherein the one-end opening portion, the other-end opening portion, and the outlet have circular shapes and are arranged on the same center line (for example, CL) (for example, FIG. 8).

A9. There is provided the separation apparatus wherein the forming unit includes:

a pipe portion (for example, 63) extending in a direction crossing the same center line and configured to form a communicating path to the suction unit; and a separation chamber forming portion (for example, 64) connected to the pipe portion and configured to form the separation chamber, and the separation chamber forming portion has an annular shape with respect to the same center line as a center (for example, FIG. 8).

A10. There is provided the separation apparatus wherein a turbulence promoting portion (for example, 67) configured to generate turbulence in the air sucked from the outlet into the separation chamber is formed on a peripheral wall of the outlet.

A11. There is provided the separation apparatus wherein the turbulence promoting portion includes a plurality of turbulence promoting elements (for example, 67*a*).

A12. There is provided the separation apparatus wherein the plurality of turbulence promoting elements are repetitively formed in a peripheral direction of the outlet.

A13. There is provided the separation apparatus wherein the plurality of turbulence promoting elements comprise a plurality of projections, a plurality of notches, or a plurality of holes.

A14. There is provided the separation apparatus wherein the tubular portion projects into the separation chamber, the one-end opening portion of the tubular portion is located outside the separation chamber, and the other-end opening portion of the tubular portion is located inside the separation chamber.

A15. There is provided a grinding apparatus (for example, 5) comprising:

a first grinder (for example, 5A) configured to coarsely grind roasted coffee beans;

the above-described separation apparatus configured to separate an unwanted substance from ground beans discharged from the first grinder; and a second grinder (for example, 5B) configured to finely grind the ground beans discharged from the separation apparatus.

A16. There is provided a beverage producing apparatus (for example, 1) comprising:

the above-described grinding apparatus; and an extracting apparatus (for example, 3) configured to extract a coffee liquid from ground beans discharged from the grinding apparatus.

B1. There is provided an extracting method of extracting a coffee liquid from ground beans of roasted coffee beans, comprising:

a pressure reduction step (for example, S15) of switching an interior of an extraction container in which the ground beans and a liquid are stored from a first air pressure to a second air pressure lower than the first air pressure; and an extraction step (for example, S17) of extracting the coffee liquid from the ground beans, wherein the first air pressure is an air pressure at which the liquid at a predetermined temperature does not boil, the second air pressure is an air pressure at which the liquid that does not boil at the first air pressure boils, and the switching from the first air pressure to the second air pressure is done by releasing the air pressure in the extraction container.

B2. There is provided the extracting method wherein in the extraction step, the coffee liquid is extracted by a permeation method while discharging the liquid in the extraction container from the extraction container.

B3. There is provided the extracting method wherein in the extraction step, the coffee liquid is extracted by an immersion method in the extraction container.

B4. There is provided the extracting method wherein the liquid is high-temperature water, the predetermined temperature is a temperature not less than a boiling point of the liquid at the first air pressure, the first air pressure is an air pressure more than an atmospheric pressure, and the second air pressure is the atmospheric pressure.

B5. There is provided the extracting method wherein the liquid supplied to the extraction container is a warmed liquid and is pressure-fed into the extraction container at a third air pressure at which the liquid does not boil, and the third air pressure is an air pressure lower than the first air pressure and higher than the second air pressure.

B6. There is provided the extracting method further comprising a steaming step (for example, S11) of steaming the ground beans by the liquid supplied to the extraction container before the pressure reduction step, wherein in the steaming step, the air pressure in the extraction container is maintained at the third air pressure.

B7. There is provided the extracting method further comprising a step (for example, S14) of extracting coffee by an immersion method in the extraction container before the pressure reduction step.

B8. There is provided an extracting apparatus (for example, 3) for extracting a coffee liquid from ground beans of roasted coffee beans, comprising:

an extraction container (for example, 9);

a supply unit (for example, 7) configured to supply a liquid and an air pressure to the extraction container; and a control unit (for example, 11) configured to control the supply unit, wherein the control unit executes pressure reduction control of switching an interior of the extraction container in which the ground beans and the liquid are stored from a first air pressure to a second air pressure lower than the first air pressure (for example, S15), the first air pressure is an air pressure at which the liquid at a predetermined temperature does not boil, the second air pressure is an air pressure at which the liquid that does not boil at the first air pressure boils, and the switching from the first air pressure to the second air pressure is done by releasing the air pressure in the extraction container.

C1. There is provided an extracting apparatus (for example, 3) for extracting a coffee liquid from ground beans of roasted coffee beans, comprising:

an extraction container (for example, 9) including a neck portion (for example, 90*b*) with an opening (for example, 90*a*) and a trunk portion (for example, 90*e*) and configured to store the ground beans and a liquid;

a filter (for example, 910) arranged on the opening of the neck portion and configured to restrict leakage of the ground beans; and a driving unit (for example, 8B) configured to change a posture of the extraction container from a first posture in which the neck portion is located on an upper side to a second posture in which the neck portion is located on a lower side.

C2. There is provided the extracting apparatus wherein the extraction container includes a lid unit (for example, 91) including the filter, and the lid unit opens the opening when inputting the ground beans into the extraction container (for example, S2), and covers the opening when extracting the coffee liquid in the extraction container (for example, S3).

C3. There is provided the extracting apparatus wherein in the first posture, the ground beans accumulate in the trunk portion, in the second posture, the ground beans accumulate in the neck portion, and the extraction container is formed such that an accumulation thickness of the ground beans in the second posture is larger than in the first posture.

C4. There is provided the extracting apparatus wherein a sectional area of an internal space is smaller in the neck portion than in the trunk portion.

C5. There is provided the extracting apparatus wherein the extraction container includes a shoulder portion (for example, 90*d*) between the trunk portion and the neck portion, and in the shoulder portion, a sectional area of an internal space is gradually reduced toward the neck portion.

C6. There is provided the extracting apparatus wherein the neck portion has a cylindrical shape.

C7. There is provided the extracting apparatus wherein the first posture is maintained for at least a predetermined immersion time (for example, S14).

C8. There is provided the extracting apparatus wherein the second posture is maintained for at least a predetermined permeation time (for example, S17).

C9. There is provided an extracting method of extracting a coffee liquid from ground beans of roasted coffee beans, comprising:

an immersion step (for example, S14) of immersing, in a liquid in an extraction container with a first posture, the ground beans accumulated in the extraction container in a first form;

an inverting step (for example, S16) of inverting a posture of the extraction container from the first posture to a second posture and accumulating the ground beans in a second form; and a permeation step (for example, S17) of sending the liquid from the extraction container in the second form, wherein the second form is a form in which an accumulation thickness of the ground beans is larger than in the first form, and in the permeation step, the liquid is sent through the ground beans accumulated in the second form.

C10. There is provided the extracting method wherein the extraction container includes a thick portion (for example, 90*e*) and a thin portion (for example, 90*b*), in the first posture, the ground beans accumulate in the thick portion, and in the second posture, the ground beans accumulate in the thin portion.

D1. There is provided a beverage producing apparatus (for example, 1) including:

a separation apparatus (for example, 6) configured to separate an unwanted substance from ground beans of roasted coffee beans; and an extracting apparatus (for example, 3) configured to extract a coffee liquid from the ground beans from which the unwanted substance is separated by the separation apparatus, comprising:

a housing (for example, 100) configured to form an exterior of the beverage producing apparatus, wherein the housing includes a first transmissive portion (for example, 101) configured to make at least a part of the separation apparatus visible from an outside.

D2. There is provided a beverage producing apparatus (for example, 1) including an extracting apparatus (for example, 3) configured to extract a coffee liquid from ground beans of roasted coffee beans, comprising:

a housing (for example, 100) configured to form an exterior of the beverage producing apparatus, wherein the extracting apparatus includes an extraction container (for example, 9) in which the ground beans and a liquid are stored, and a driving unit (for example, 8B) configured to move the extraction container when extracting the coffee liquid, the housing includes a first transmissive portion (for example, 101) configured to make at least a part of the extraction container visible from an outside.

D3. There is provided the beverage producing apparatus wherein the separation apparatus includes a collection container (for example, 60B) configured to store the unwanted substance, the collection container includes a second transmissive portion (for example, 62) configured to make the stored unwanted substance visible from the outside, and the unwanted substance stored in the collection container is visible from the outside via the first transmissive portion and the second transmissive portion.

D4. There is provided the beverage producing apparatus wherein the separation apparatus includes a blower unit (for example, 60A) configured to expel air in the collection container, and the blower unit and the collection container form a centrifugal separation apparatus configured to collect the unwanted substance to a portion of the collection container.

D5. There is provided the beverage producing apparatus wherein the collection container is detachable from the separation apparatus.

D6. There is provided the beverage producing apparatus further comprising:

a first grinder (for example, 5A) configured to coarsely grind the roasted coffee beans; and a second grinder (for example, 5B) configured to finely grind the roasted coffee beans, wherein the separation apparatus separates the unwanted substance from ground beans discharged from the first grinder, the second grinder finely grinds the ground beans from which the unwanted substance is separated by the separation apparatus, and in the second grinder, at least a part of the second grinder is visible via the first transmissive portion.

D7. There is provided the beverage producing apparatus wherein the first transmissive portion is configured to be freely opened/closed (for example, FIG. 56, FIG. 58).

D8. There is provided the beverage producing apparatus wherein the first transmissive portion has a shape that makes an interior of the apparatus visible at least from a front side and a lateral side of the beverage producing apparatus (for example, FIG. 58).

D9. There is provided the beverage producing apparatus wherein the first transmissive portion includes a curved surface (for example, FIG. 58).

D10. There is provided the beverage producing apparatus wherein a posture of the extraction container is changed by driving of the driving unit when extracting the coffee liquid, and the change in the posture of the extraction container is visible via the first transmissive portion.

E1. There is provided a beverage producing apparatus (for example, 1) for producing a beverage using roasted coffee beans as a material, comprising:

a bean container (for example, 40) configured to store the roasted coffee beans;

an attachment portion (for example, 44) to which the bean container is attached;

a first receiving portion (for example, 442) configured to receive the roasted coffee beans; and a second receiving portion (for example, 42*c*) configured to receive the roasted coffee beans, wherein the first receiving portion receives the roasted coffee beans from the bean container attached to the attachment portion, and the second receiving portion is an opening portion formed in a portion different from the attachment portion.

E2. There is provided the beverage producing apparatus further comprising a sending unit (for example, 41) configured to automatically send a predetermined amount of roasted coffee beans received by the first receiving portion to a downstream side, wherein the roasted coffee beans received by the second receiving portion are not automatically sent by the sending unit and can be used to produce the beverage.

E3. There is provided the beverage producing apparatus further comprising a grinder (for example, 5A) configured to grind the roasted coffee beans, wherein the roasted coffee beans received by one of the first receiving portion and the second receiving portion are supplied to the grinder.

E4. There is provided the beverage producing apparatus wherein a path length of a supply path (for example, RT2) of the roasted coffee beans from the second receiving portion to the grinder is smaller than a path length of a supply path (for example, RT1) of the roasted coffee beans from the first receiving portion to the grinder.

E5. There is provided the beverage producing apparatus further comprising:

a first supply path (for example, RT1) configured to pass the roasted coffee beans received by the first receiving portion; and a second supply path (for example, RT2) configured to pass the roasted coffee beans received by the second receiving portion, wherein the second supply path is combined with a halfway point of the first supply path.

E6. There is provided the beverage producing apparatus wherein the sending unit comprises a screw conveyor and is a unit configured to send the predetermined amount of roasted coffee beans by a rotation amount of a screw shaft (for example, 47).

E7. There is provided the beverage producing apparatus wherein the sending unit is visible via the opening portion (for example, 42*c*).

E8. There is provided the beverage producing apparatus wherein the bean container comprises an outlet (for example, 405*a*) of the roasted coffee beans for the first receiving portion, and a lid mechanism (for example, 408) configured to open/close the outlet, and the beverage producing apparatus comprises a driving mechanism (for example, 41*a*, 444, 445*c*) configured to operate the lid mechanism and automatically open the outlet from a closed state to an open state after the bean container is attached to the attachment portion.

E9. There is provided the beverage producing apparatus wherein the driving mechanism can operate the lid mechanism and automatically close the outlet from the open state to the closed state.

F1. There is provided an extracting apparatus (for example, 3) for extracting a coffee liquid from ground beans of roasted coffee beans, comprising:

a container (for example, 90) in which the ground beans and a liquid are stored, and the coffee liquid is extracted from the ground beans; and a driving unit (for example, 8B) configured to move the container to a ground bean supply position (for example, a bean inputting position indicated by a broken line in FIG. 9) at which the ground beans are supplied to the container and a liquid supply position (for example, an extraction position indicated by a solid line in FIG. 9) at which the liquid is supplied to the container.

F2. There is provided the extracting apparatus further comprising a housing (for example, 100) configured to form an exterior of the extracting apparatus, wherein the housing includes a transmissive portion (for example, 101) configured to make the movement of the container visible from an outside.

F3. There is provided the extracting apparatus wherein the driving unit reciprocally moves the container between the ground bean supply position and the liquid supply position (for example, FIG. 9).

F4. There is provided the extracting apparatus wherein the driving unit translates the container in a horizontal direction (for example, FIG. 9).

F5. There is provided the extracting apparatus wherein the driving unit includes a support member (for example, 820) configured to support the container.

F6. There is provided the extracting apparatus wherein the support member includes:

a holding member (for example, 820*a*) configured to hold the container; and a shaft member (for example, 820*b*) connected to the holding member and extending in a moving direction of the container, when the moving direction of the container is a front surface to rear surface direction of the container, the holding member is extended along left and right side portions and a bottom portion of the container (for example, FIG. 29, FIG. 30), the shaft member is connected to the holding member on each side portion of the container, and the shaft member is moved in the moving direction.

F7. There is provided the extracting apparatus wherein after the ground beans are supplied to the container at the ground bean supply position, the liquid is supplied to the container at the liquid supply position.

F8. There is provided the extracting apparatus wherein after a liquid for preheating is supplied to the container at the liquid supply position, the ground beans are supplied to the container at the ground bean supply position, and the liquid is then supplied to the container at the liquid supply position.

F9. There is provided the extracting apparatus wherein when the moving direction of the container is a front surface to rear surface direction of the container, a front surface of the container is visible via the transmissive portion, and the liquid supply position is a position on a far side of the ground bean supply position.

F10. There is provided the extracting apparatus further comprising a lid unit (for example, 91) detachably attached to an opening (for example, 90*a*) of the container at the liquid supply position, wherein the lid unit includes a hole (for example, 911*a*) configured to make an interior of the container communicate with an outside, and in a state in which the lid unit is attached to the opening at the liquid supply position, the liquid is supplied into the container via the hole.

F11. There is provided the extracting apparatus wherein in a state in which the lid unit is separated from the opening at the liquid supply position, the container moves to the ground bean supply position, and the ground beans are supplied into the container via the opening.

F12. There is provided the extracting apparatus wherein the driving unit includes a mechanism configured to invert the container and the lid unit to a first posture in which the lid unit is located on the upper side at the liquid supply position and a second posture in which the lid unit is located on a lower side, and a plug member (for example, 913) configured to open/close the hole, in the first posture, the liquid is supplied into the extraction container, and in the second posture, the plug member opens the hole, and a coffee beverage is sent from the container via the hole.

G1. There is provided an extracting apparatus (for example, 3) for extracting a coffee liquid from ground beans of roasted coffee beans, comprising:

an extraction container (for example, 9) in which the ground beans and a liquid are stored, and the coffee liquid is extracted from the ground beans; and a supply unit (for example, 7) configured to supply the liquid to the extraction container, wherein the extraction container includes:

a first hole (for example, 911*a*) configured to send a coffee beverage in the extraction container; and a second hole (for example, 901*a*) configured to send a liquid used to cleaning in the extraction container.

G2. There is provided the extracting apparatus further comprising a driving unit (for example, 8B) configured to invert a posture of the extraction container between a first posture and a second posture, wherein the first hole is located at a lower end of the extraction container in the first posture and at an upper end of the extraction container in the second posture, and the second hole is located at the upper end of the extraction container in the first posture and at the lower end of the extraction container in the second posture.

G3. There is provided the extracting apparatus wherein after the coffee beverage in the extraction container is sent via the first hole in a state in which the extraction container is in the first posture, the extraction container is changed to the second posture by the driving unit, and the liquid for cleaning is supplied by the supply unit into the extraction container via the first hole.

G4. There is provided the extracting apparatus further comprising a filter (for example, 910) configured to restrict leakage of the ground beans in the extraction container from the first hole.

G5. There is provided the extracting apparatus wherein the filter comprises a metal filter.

G6. There is provided the extracting apparatus wherein the metal filter is located on a side of the lower end of the extraction container in the first posture and on a side of the upper end of the extraction container in second posture.

G7. There is provided the extracting apparatus wherein the extraction container includes a first plug member (for example, 913) configured to open/close the first hole, and a second plug member (for example, 903) configured to open/close the second hole.

G8. There is provided the extracting apparatus wherein the extraction container includes a transmissive portion (for example, 90) configured to make an interior visible.

G9. There is provided the extracting apparatus wherein the second hole is larger than the first hole, and when the liquid for cleaning is supplied from the first hole into the extraction container, air is sent from the first hole.

H1. There is provided a beverage producing apparatus (for example, 1) for producing a beverage using roasted coffee beans as a material, comprising:

a bean container (for example, 40) configured to store the roasted coffee beans;

an attachment portion (for example, 44) to which the bean container is detachably attached; and a conveyance mechanism (for example, 41) capable of conveying the roasted coffee beans from the bean container, wherein the conveyance mechanism is provided to remain on a side of the attachment portion in a case in which the bean container is detached from the attachment portion.

H2. There is provided the beverage producing apparatus wherein the bean container includes:

a first port (for example, an end of the tube portion 401) configured to allow the roasted coffee beans to exit/enter; and a second port (for example, 405*a*) configured to allow the roasted coffee beans to exit/enter, the first port is a port through which the roasted coffee beans do not pass when moving from the bean container into the beverage producing apparatus, and the second port is a port through which the roasted coffee beans pass when moving from the bean container into the beverage producing apparatus.

H3. There is provided the beverage producing apparatus wherein the bean container includes an opening/closing member (for example, 408) configured to open/close the second port.

H4. There is provided the beverage producing apparatus wherein the bean container includes:

a tube portion (for example, 401); and a forming member (for example, 405) provided at an end of the tube portion and configured to form the second port, and the opening/closing member is attached to the forming member to be rotatable about a central axis of the tube portion.

H5. There is provided the beverage producing apparatus wherein the attachment portion is provided with a driving mechanism (for example, 41*a*, 444, 445*c*) capable of operating the opening/closing member and opening the second port.

H6. There is provided the beverage producing apparatus wherein the driving mechanism can operate the opening/closing member and close the second port.

H7. There is provided the beverage producing apparatus wherein the attachment portion is provided with a restriction unit (for example, 408*a*) configured to restrict detachment of the bean container in a case in which the second port is open.

H8. There is provided the beverage producing apparatus wherein the conveyance mechanism conveys the roasted coffee beans received by a receiving portion (for example, 442), the receiving portion receives the roasted coffee beans from the bean container attached to the attachment portion, and after the conveyance mechanism is driven (for example, FIG. 44) in a state in which the second port is partially closed by the opening/closing member, the second port is completely closed by the opening/closing member.

H9. There is provided the beverage producing apparatus wherein the conveyance mechanism conveys the roasted coffee beans received by a receiving portion (for example, 442), the receiving portion receives the roasted coffee beans from the bean container attached to the attachment portion, and the attachment portion is provided with a shutter (for example, 443) configured to open/close the receiving portion.

H10. There is provided the beverage producing apparatus wherein the bean container comprises a restriction unit (for example, 406*a*, 408*d*, 406*a*', 408*d*') configured to restrict opening of the second port by the opening/closing member in a case in which the bean container is not attached to the attachment portion.

I1. There is provided a beverage producing apparatus (for example, 1) configured to produce a coffee beverage using roasted coffee beans as a raw material, characterized by comprising:

a housing (for example, 100) configured to form an exterior of the beverage producing apparatus;

a control unit (for example, 11) configured to control each producing operation of the beverage producing apparatus; and an operation unit (for example, 12) configured to accept an operation of an operator wherein the housing includes a transmissive portion (for example, 101) configured to make an interior of the housing visible from an outside, the control unit can control each producing operation in an automatic mode (for example, menu item selection, taste chart selection) or a manual mode (for example, specialist mode), in the automatic mode, each producing operation is automatically controlled in accordance with a condition set in advance, and in the manual mode, each producing operation is controlled in accordance with an operation for the operation unit.

I2. There is provided the beverage producing apparatus characterized by further comprising a separation apparatus (for example, 6) configured to separate an unwanted substance from ground beans of the roasted coffee beans, wherein the separation apparatus includes a suction unit (for example, 6A) configured to suck the unwanted substance, and each producing operation includes a suction operation of the unwanted substance by the suction unit.

I3. There is provided the beverage producing apparatus characterized by further comprising a container (for example, 90) configured to store the ground beans of the roasted coffee beans and a liquid and extract a coffee liquid from the ground beans, wherein each producing operation includes an operation of the container.

I4. There is provided the beverage producing apparatus characterized in that the operation of the container includes at least a change in a posture of the container.

I5. There is provided the beverage producing apparatus characterized in that the operation of the container includes at least translation of the container.

I6. There is provided the beverage producing apparatus characterized in that each producing operation includes a change in an internal pressure of the container.

I7. There is provided the beverage producing apparatus characterized in that the control unit saves control contents of each producing operation in the manual mode.

I8. There is provided the beverage producing apparatus characterized in that the control unit can execute the saved control contents in the automatic mode.

J1. There is provided a beverage producing apparatus capable of producing a plurality of types of beverages, characterized by comprising:

a display unit (for example, 12) configured to display levels (for example, a taste chart) of a plurality of types of characteristics concerning a beverage of a type instructed by a user; and a control unit (for example, 11) configured to control a producing operation of the beverage of the type selected by the user.

J2. There is provided the beverage producing apparatus characterized in that the display unit displays information concerning a type of a beverage having a level corresponding to a change instruction (for example, FIG. 100, FIG. 101) in accordance with the change instruction of the user concerning the level displayed on the display unit (for example, FIG. 98).

J3. There is provided the beverage producing apparatus characterized in that the plurality of types of beverages include a first beverage and a second beverage, and the plurality of types of characteristics of the first beverage and the plurality of types of characteristics of the second beverage, which are displayed on the display unit, are different.

J4. There is provided the beverage producing apparatus characterized in that the display unit can simultaneously display the levels of the plurality of types of characteristics of not less than two types of beverages (for example, FIG. 109).

J5. There is provided the beverage producing apparatus characterized in that the plurality of types of beverages include a first beverage and a second beverage, and the plurality of types of characteristics of the first beverage and the plurality of types of characteristics of the second beverage, which are displayed on the display unit, equal.

J6. There is provided the beverage producing apparatus characterized in that the display unit can display another information (for example, comment) different from the levels of the plurality of types of characteristics concerning the beverage of the type instructed by the user, and the other information of the first beverage and that of the second beverage are different.

J7. There is provided the beverage producing apparatus characterized in that the plurality of types of characteristics include a characteristic (for example, fan intensity, clean cup, or shake count) concerning the producing operation.

J8. There is provided the beverage producing apparatus characterized in that the beverage is a coffee beverage using roasted coffee beans as a raw material, the beverage producing apparatus comprises an extraction container (for example, 9) configured to store ground beans of the roasted coffee beans and a liquid and extract a coffee liquid from the ground beans, and the characteristic concerning the producing operation includes a characteristic (for example, shake count) of an operation of the extraction container.

J9. There is provided the beverage producing apparatus characterized in that the beverage is a coffee beverage using roasted coffee beans as a raw material, the beverage producing apparatus comprises a separation apparatus (for example, 6) configured to separate an unwanted substance from ground beans of the roasted coffee beans, the separation apparatus includes a suction unit (for example, 6A) configured to suck the unwanted substance, and the characteristic concerning the producing operation includes a characteristic (for example, fan intensity) of an operation of the suction unit.

J10. There is provided the beverage producing apparatus characterized in that the beverage is a coffee beverage using roasted coffee beans as a raw material, and the plurality of types of characteristics include characteristics concerning a taste and an aroma of the coffee beverage.

The present invention is not limited to the above embodiments, and various changes and modifications can be made within the spirit and scope of the present invention. Therefore, to apprise the public of the scope of the present invention, the following claims are made.

What is claimed is:

1. A beverage producing apparatus configured to produce a beverage using an extraction target as a raw material, comprising:

a housing configured to form an exterior of the beverage producing apparatus;

a control unit configured to control a series of producing operations for producing one cup of the beverage; and an operation unit configured to accept an operation of an operator, wherein the housing includes a transmissive portion configured to make an interior of the housing visible from an outside, the control unit can control the series of producing operations in an automatic mode in which a menu is selected or a manual mode, in the automatic mode, each producing operation in the series of producing operations is performed automatically and sequentially, in the manual mode, one producing operation in the series of producing operations ends and a next producing operation in the series of producing operations starts in accordance with an operation accepted by the operation unit, the control unit saves control contents of the series of the producing operations executed in the manual mode as a new menu, and the control unit can execute the saved new menu in the automatic mode.

2. The beverage producing apparatus according to claim 1, further comprising a separation apparatus configured to separate an unwanted substance from the extraction target, wherein the separation apparatus includes a suction unit configured to suck the unwanted substance, and each producing operation includes a suction operation of the unwanted substance by the suction unit.

3. The beverage producing apparatus according to claim 1, further comprising a container configured to store the extraction target and a liquid and extract a beverage liquid from the extraction target, wherein the series of producing operations includes an operation of the container.

4. The beverage producing apparatus according to claim 3, wherein the operation of the container includes at least a change in a posture of the container.

5. The beverage producing apparatus according to claim 4, wherein the operation of the container includes at least translation of the container.

6. The beverage producing apparatus according to claim 3, wherein the series of producing operations includes a change in an internal pressure of the container.

* * * * *